US012656930B2

(12) United States Patent
Stauber et al.

(10) Patent No.: US 12,656,930 B2
(45) Date of Patent: Jun. 16, 2026

(54) DEVICES, METHODS, AND GRAPHICAL USER INTERFACES FOR INTERACTING WITH WINDOW CONTROLS IN THREE-DIMENSIONAL ENVIRONMENTS

(71) Applicant: Apple Inc., Cupertino, CA (US)

(72) Inventors: Matan Stauber, San Francisco, CA (US); Lee S. Broughton, Santa Cruz, CA (US); Israel Pastrana Vicente, Spring, TX (US); Jonathan R. Dascola, San Francisco, CA (US); Stephen O. Lemay, Palo Alto, CA (US); Zoey C. Taylor, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 113 days.

(21) Appl. No.: 18/371,372

(22) Filed: Sep. 21, 2023

(65) Prior Publication Data

US 2024/0103681 A1 Mar. 28, 2024

Related U.S. Application Data

(60) Provisional application No. 63/539,566, filed on Sep. 20, 2023, provisional application No. 63/535,012, (Continued)

(51) Int. Cl.
*G06F 3/04815* (2022.01)
*G06F 3/01* (2006.01)
(Continued)

(52) U.S. Cl.
CPC .......... *G06F 3/04815* (2013.01); *G06F 3/013* (2013.01); *G06F 3/0482* (2013.01); (Continued)

(58) Field of Classification Search
CPC .......... G06F 3/01; G06F 3/0354; G06F 3/033; G06F 3/041; G06F 3/0481; G06F 3/0482; G06F 3/0484; G06F 3/0488
See application file for complete search history.

(56) References Cited

U.S. PATENT DOCUMENTS 10,614,616 B1 4/2020 Tedesco et al.
11,126,320 B1 9/2021 Thompson et al.
(Continued)

OTHER PUBLICATIONS

Office Action, dated Apr. 2, 2025, received in U.S. Appl. No. 18/371,378, 7 pages.
(Continued)

*Primary Examiner* — Rayeez R Chowdhury
(74) *Attorney, Agent, or Firm* — Morgan, Lewis & Bockius LLP

(57) ABSTRACT

A computer system displays a first user interface object and a first control element with a first appearance that is associated with performing a first operation with respect to the first user interface object, in a first view of a three-dimensional environment. The computer system detects a first gaze input that is directed to the first control element, and in response, updates an appearance of the first control element from to a second appearance that is different from the first appearance. While displaying the first control element with the second appearance, the computer system detects a first user input directed to the first control element, and in accordance with a determination that the first user input meets first criteria, updates the appearance of the first control element from the second appearance to a third appearance that is different from the first appearance and the second appearance.

48 Claims, 104 Drawing Sheets

Related U.S. Application Data filed on Aug. 28, 2023, provisional application No. 63/470,909, filed on Jun. 4, 2023, provisional application No. 63/409,600, filed on Sep. 23, 2022.

(51) Int. Cl.

| | |
|---|---|
| *G06F 3/0482* | (2013.01) |
| *G06F 3/04845* | (2022.01) |
| *G06F 3/04883* | (2022.01) |
| *G06T 19/20* | (2011.01) |

(52) U.S. Cl.
CPC ...... *G06F 3/04845* (2013.01); *G06F 3/04883* (2013.01); *G06T 19/20* (2013.01); *G06T 2219/2004* (2013.01); *G06T 2219/2016* (2013.01)

(56) References Cited

U.S. PATENT DOCUMENTS

| | | | |
|---|---|---|---|
| 11,204,678 B1 | 12/2021 | Baker et al. | |
| 11,409,402 B1 | 8/2022 | Cole et al. | |
| 11,861,145 B2 | 1/2024 | Wohlstadter et al. | |
| 2014/0361971 A1* | 12/2014 | Sala | G06F 3/013 |
| | | | 345/156 |
| 2015/0130740 A1* | 5/2015 | Cederlund | G02B 27/01 |
| | | | 345/173 |
| 2015/0309570 A1 | 10/2015 | Landford et al. | |
| 2016/0216761 A1* | 7/2016 | Klingström | G06F 3/04883 |
| 2018/0095635 A1 | 4/2018 | Valdivia et al. | |
| 2018/0095636 A1* | 4/2018 | Valdivia | G06F 3/011 |
| 2018/0239423 A1* | 8/2018 | Mardanbegi | A61B 3/113 |
| 2019/0057620 A1* | 2/2019 | Eggert | G06T 19/006 |
| 2019/0113969 A1* | 4/2019 | Borge | G06F 3/0484 |
| 2021/0191600 A1* | 6/2021 | Lemay | G06F 3/013 |
| 2022/0091722 A1 | 3/2022 | Faulkner et al. | |
| 2022/0134220 A1* | 5/2022 | Dang | A63F 13/22 |
| | | | 463/37 |
| 2022/0214743 A1* | 7/2022 | Dascola | G06F 3/017 |
| 2023/0298242 A1 | 9/2023 | Djuric et al. | |
| 2024/0045207 A1 | 2/2024 | Singh et al. | |

OTHER PUBLICATIONS

International Search Report and Written Opinion, dated Jan. 23, 2024, received in International Application No. PCT/US2023/033530, which corresponds with U.S. Appl. No. 19/371,368, 18 pages.

Notice of Allowance, dated Jun. 25, 2025, received in U.S. Appl. No. 18/371,378, 6 pages.

Office Action, dated Jun. 16, 2025, received in U.S. Appl. No. 18/371,374, 7 pages.

Notice of Allowance, dated Oct. 20, 2025, received in U.S. Appl. No. 18/371,374, 8 pages.

Office Action, dated Feb. 24, 2026, received in Japanese Patent Application No. 2025-515861, which corresponds with U.S. Appl. No. 18/371,909, 5 pages.

* cited by examiner

Figure 1A

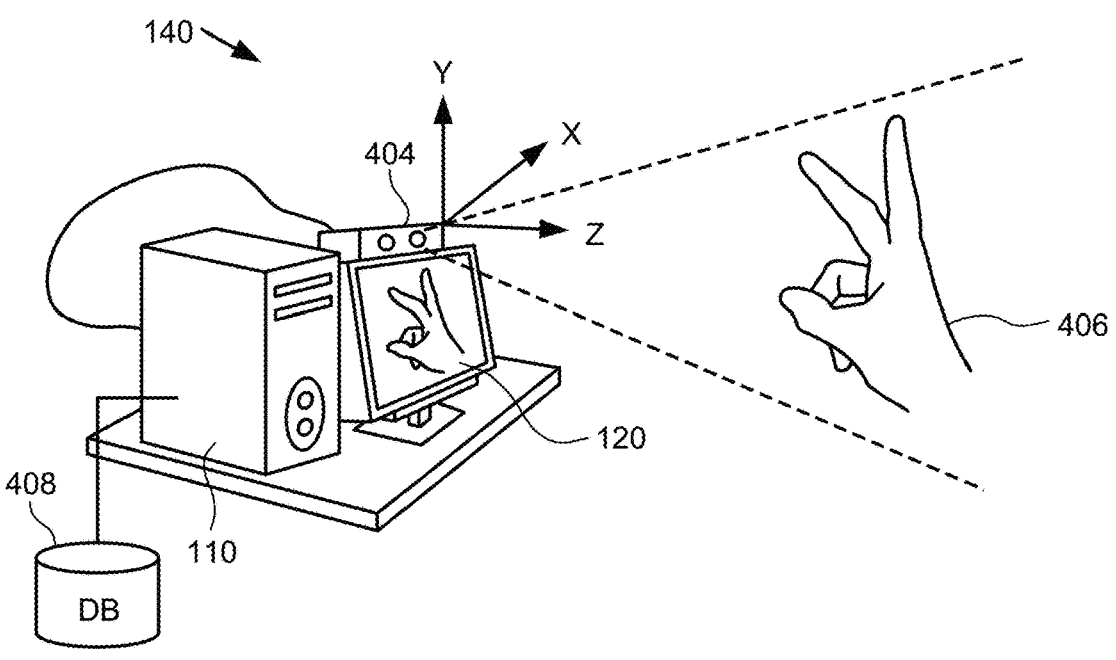
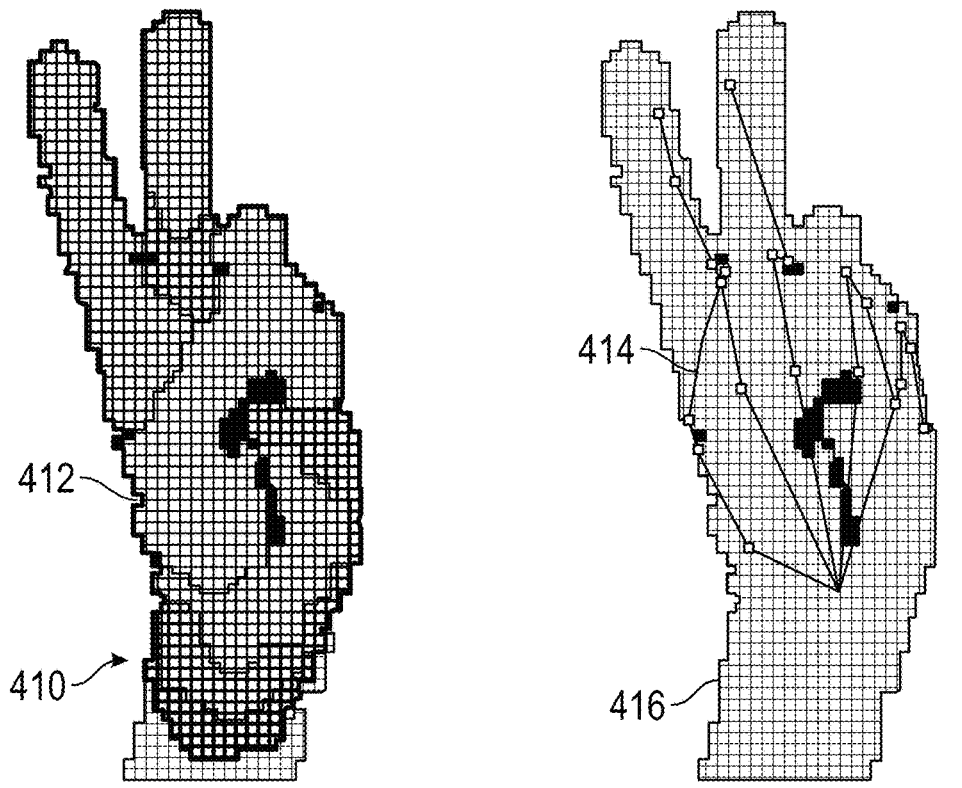
Figure 4

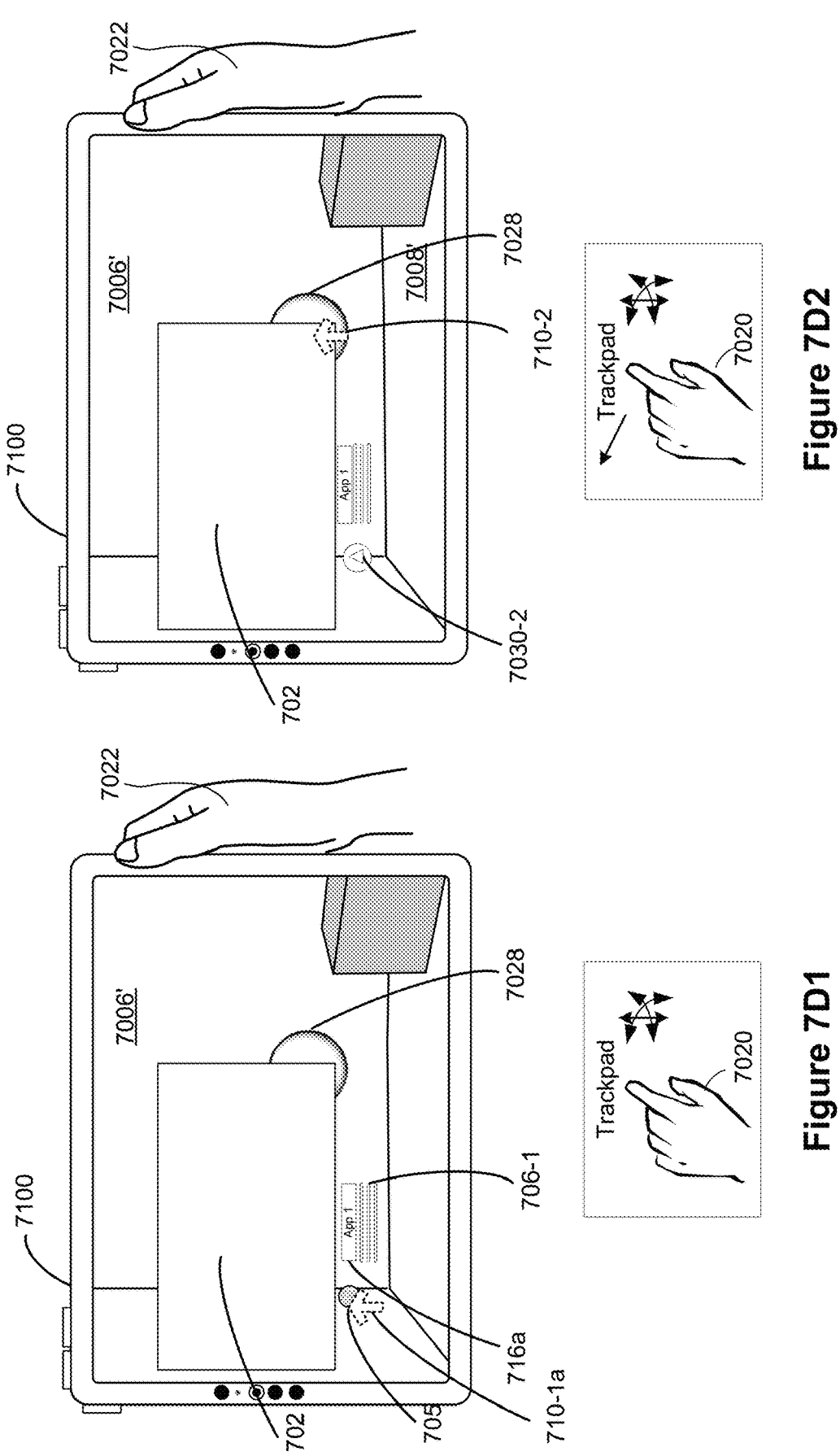
Figure 7D2
Figure 7D1

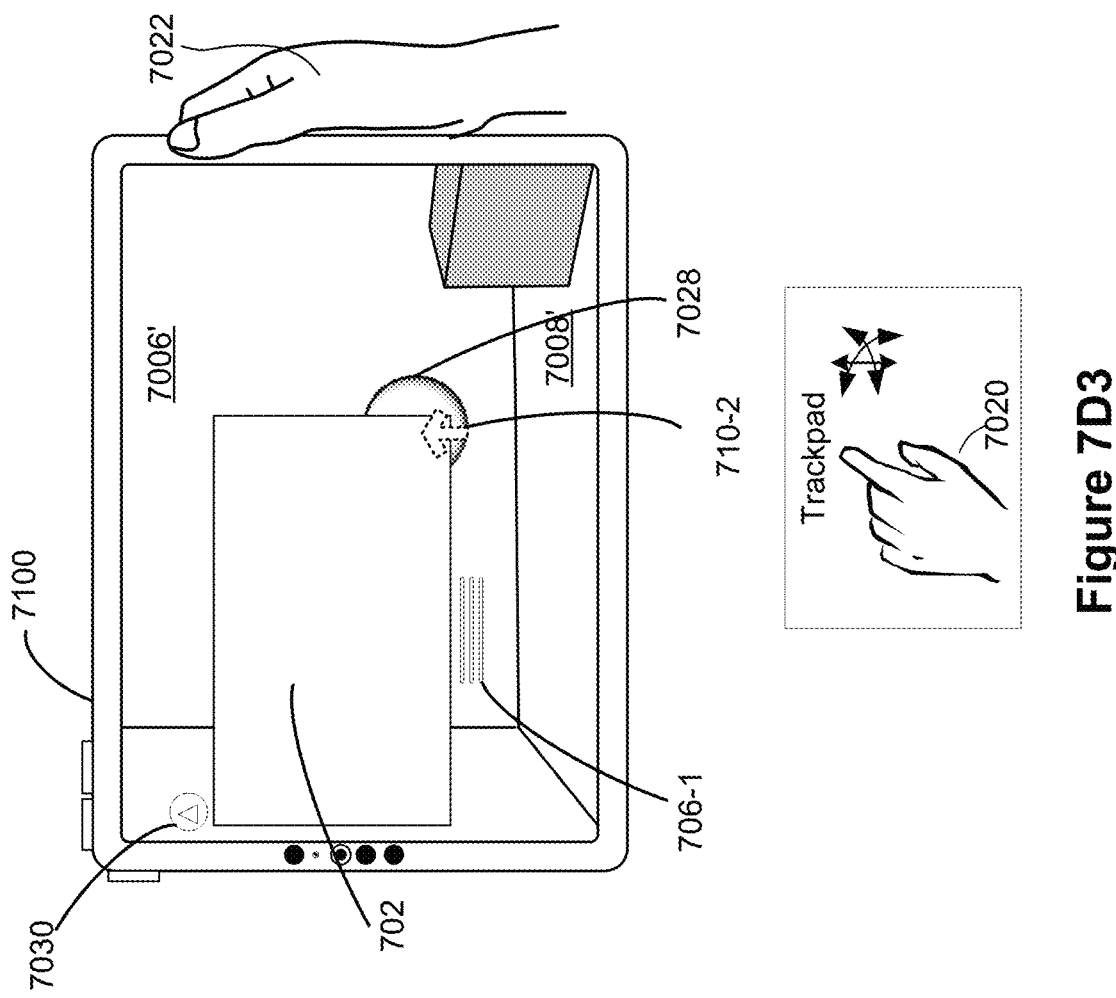
Figure 7D3

Figure 7F1

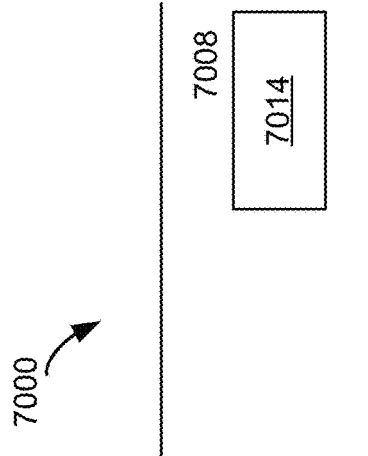
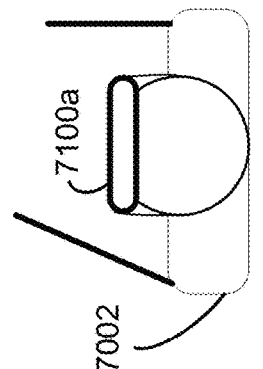
Figure 7F3
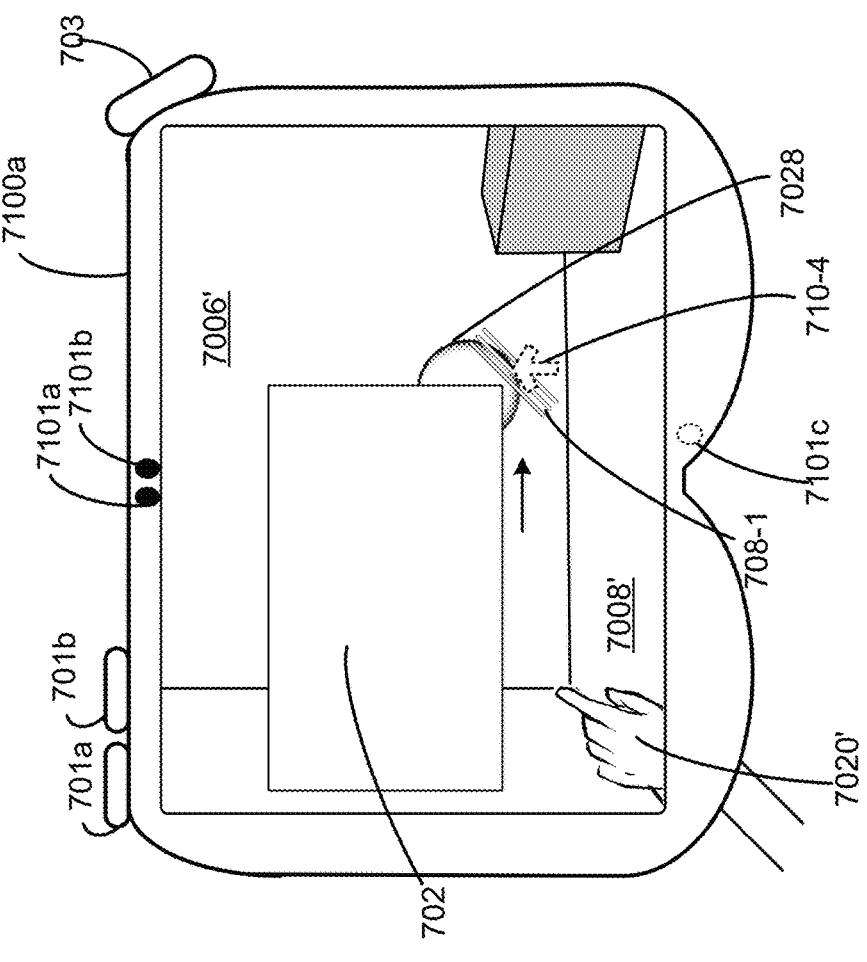
Figure 7F2

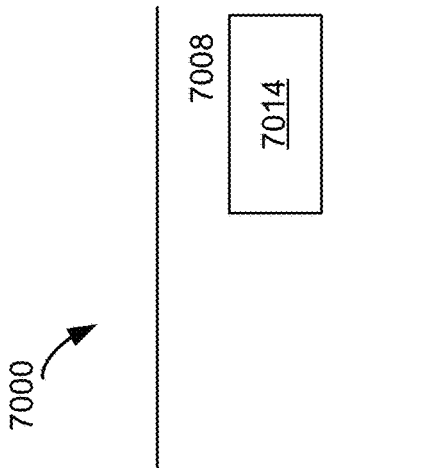
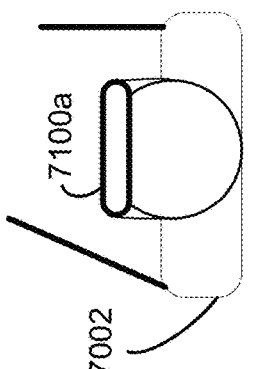
Figure 7K2
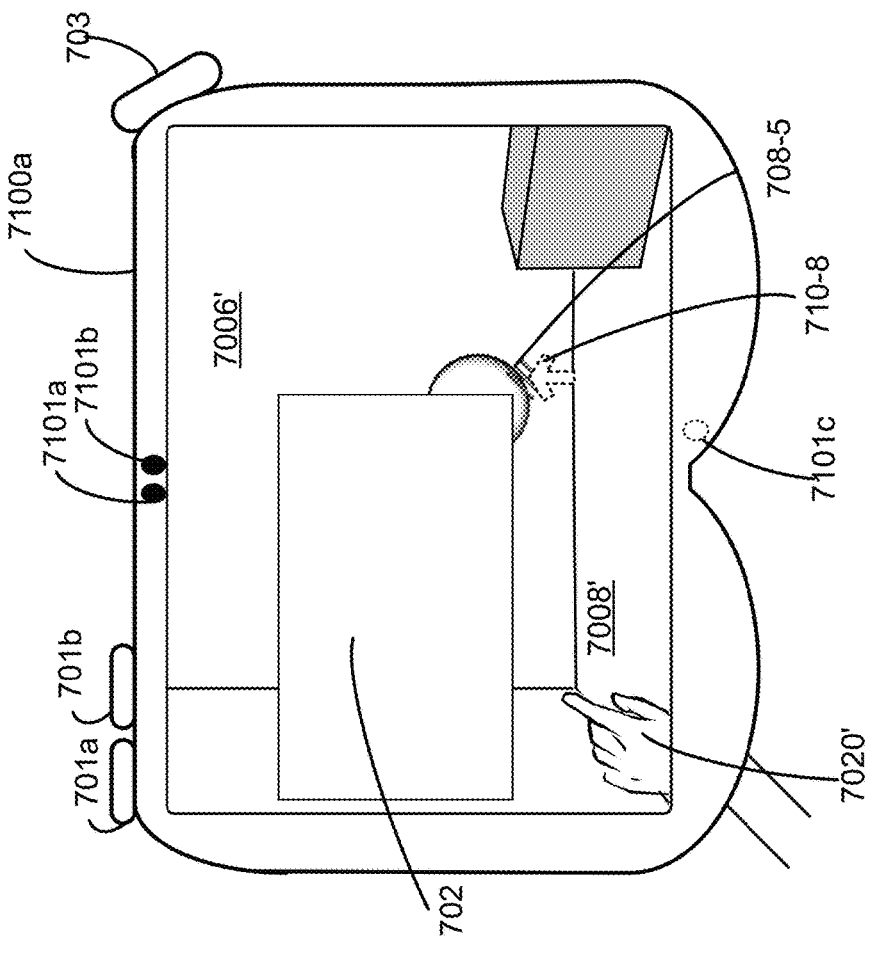
Figure 7K1

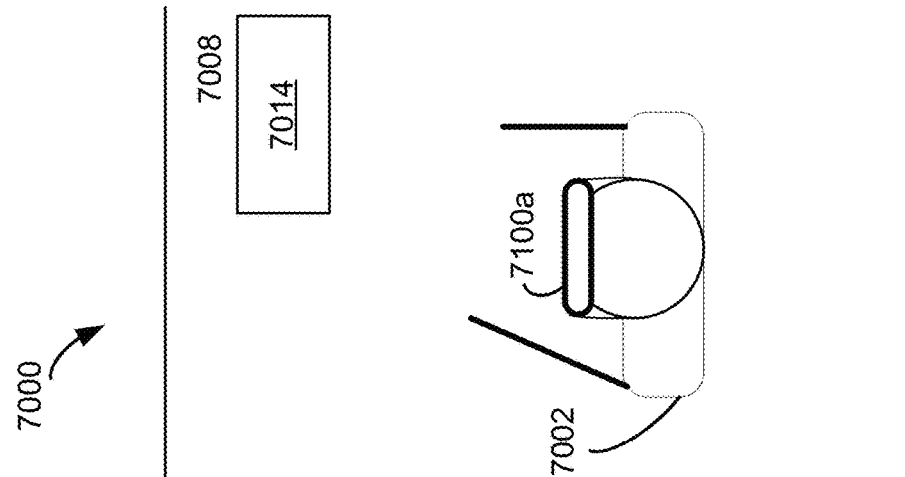
Figure 7T3
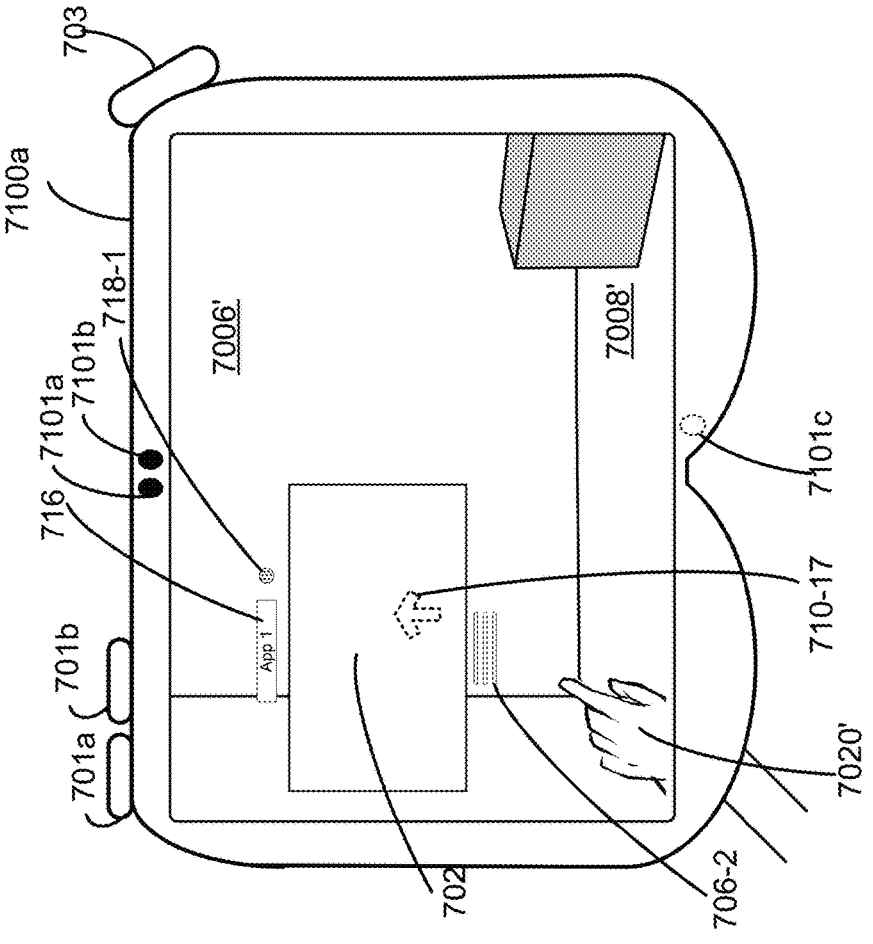
Figure 7T2

Figure 7AD1

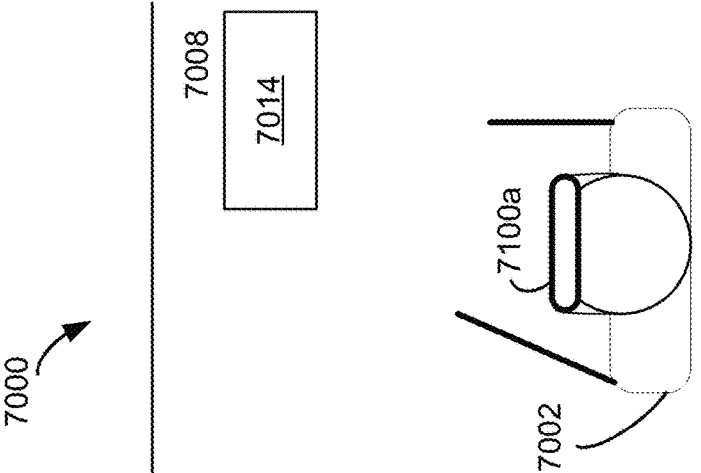
Figure 7AD3
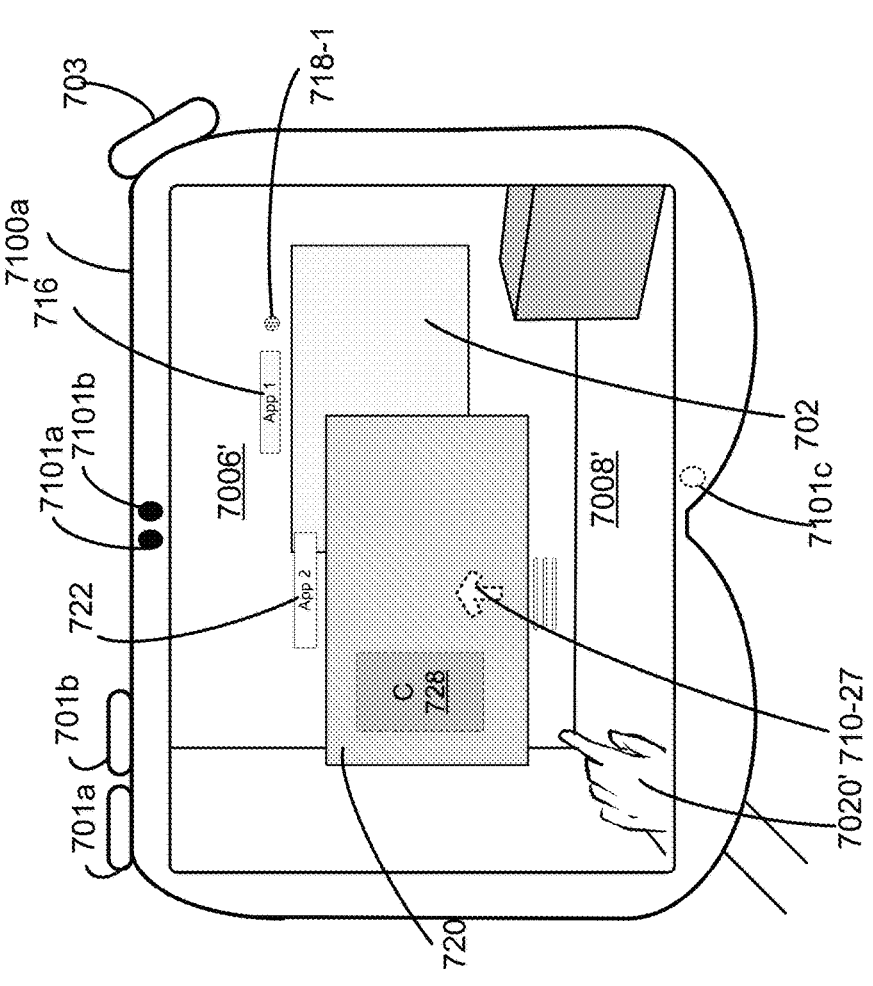
Figure 7AD2

Figure 7AN1

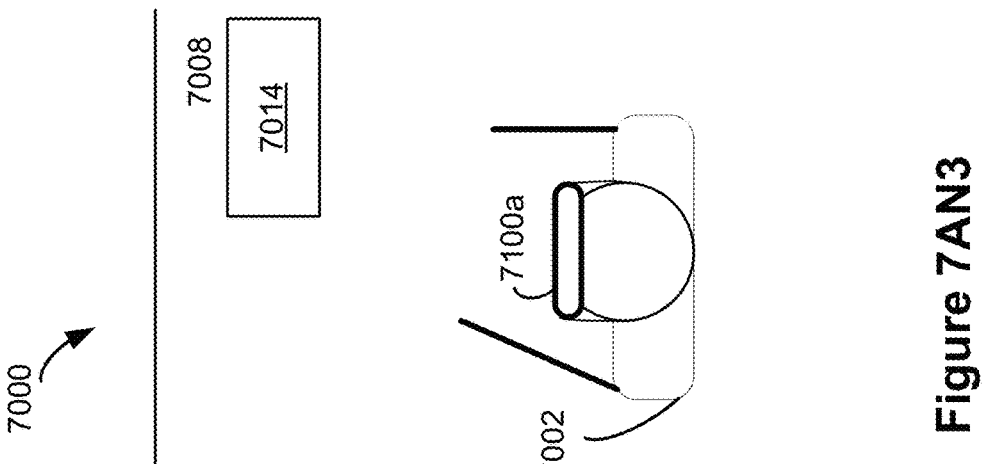
Figure 7AN3
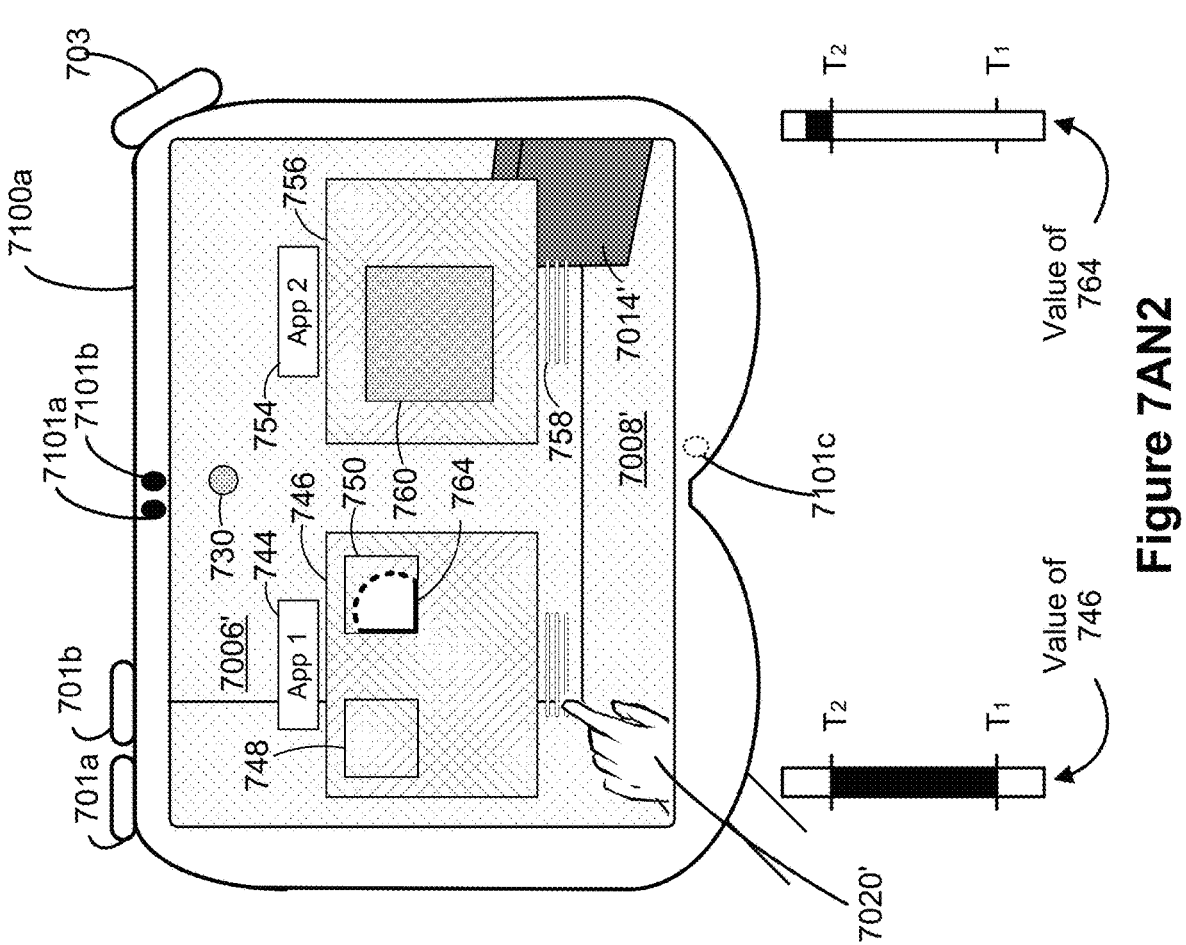
Figure 7AN2

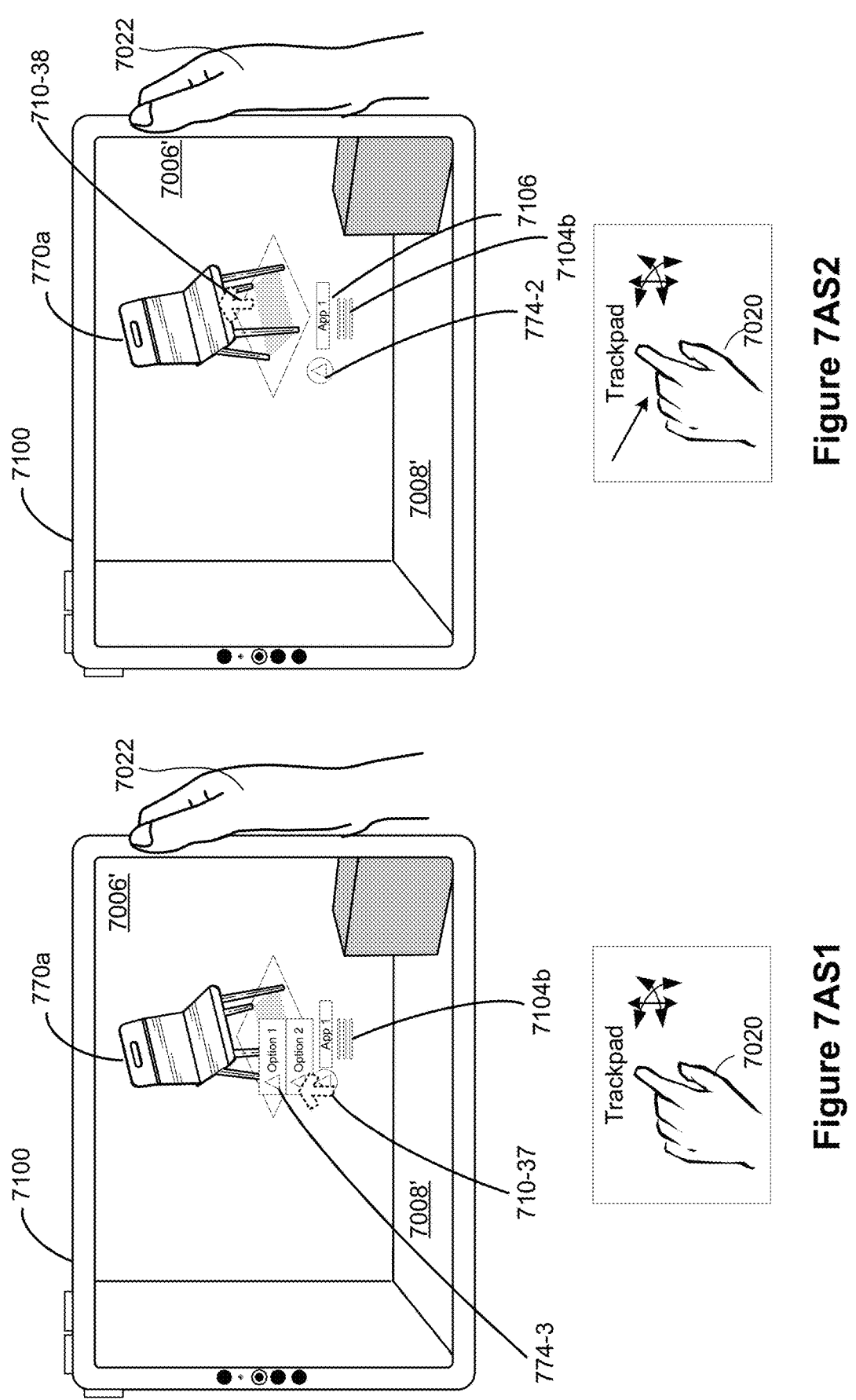
Figure 7AS2
Figure 7AS1

Figure 7AU1

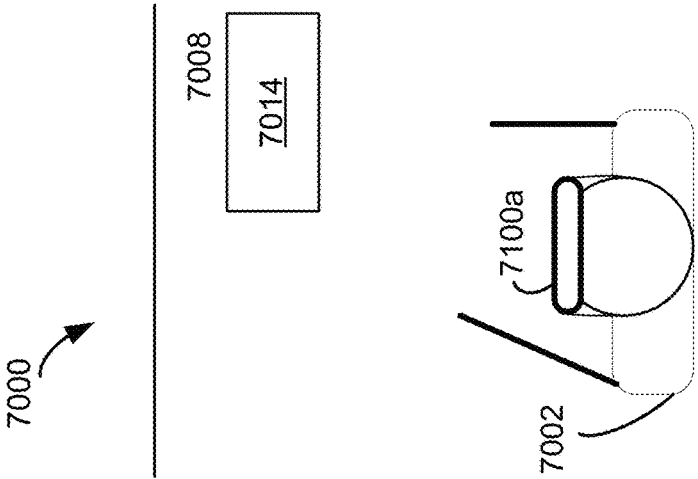
Figure 7AU3
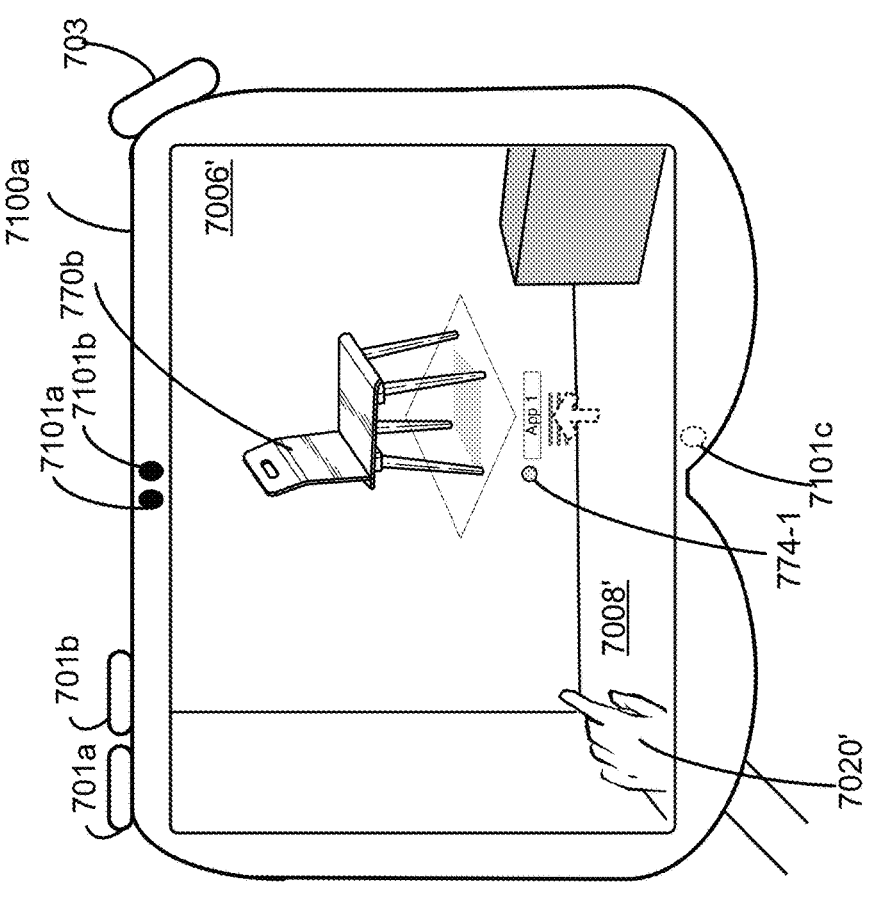
Figure 7AU2

Figure 7BA1

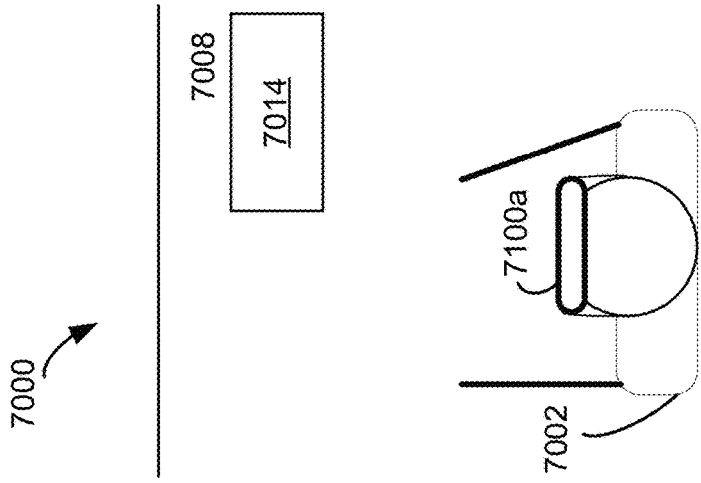
Figure 7BA3
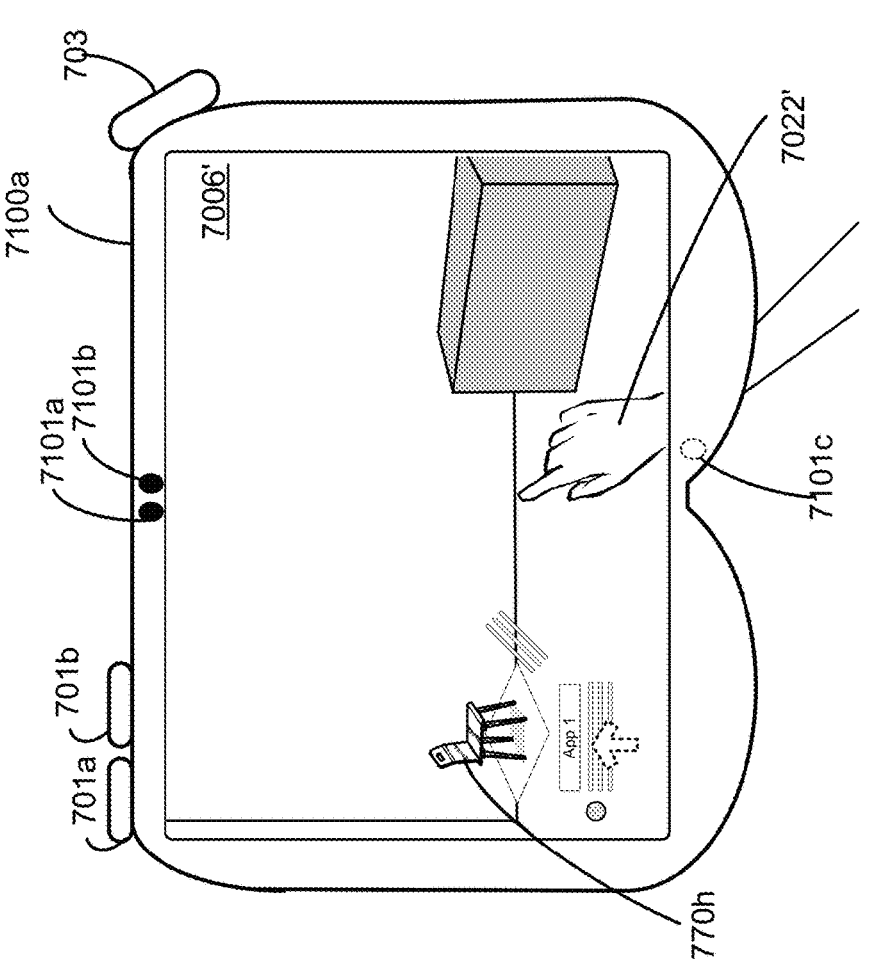
Figure 7BA2

Figure 7BD1

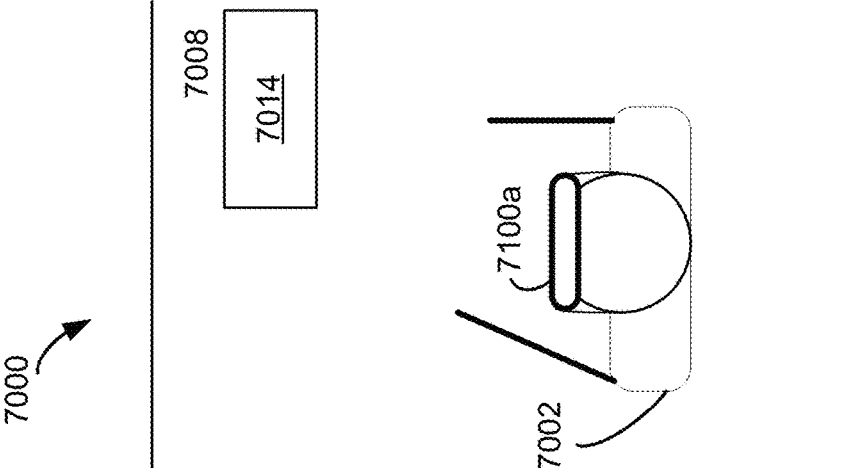
Figure 7BD3
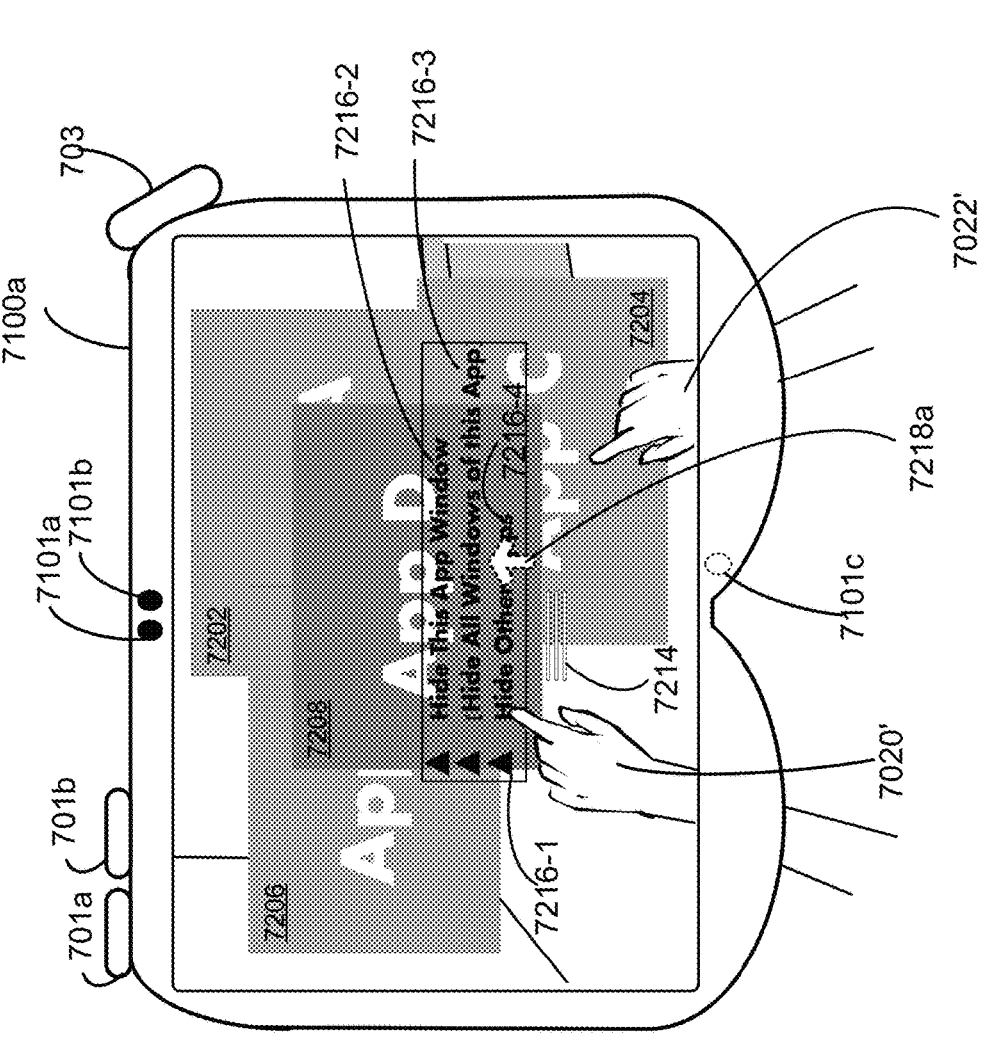
Figure 7BD2

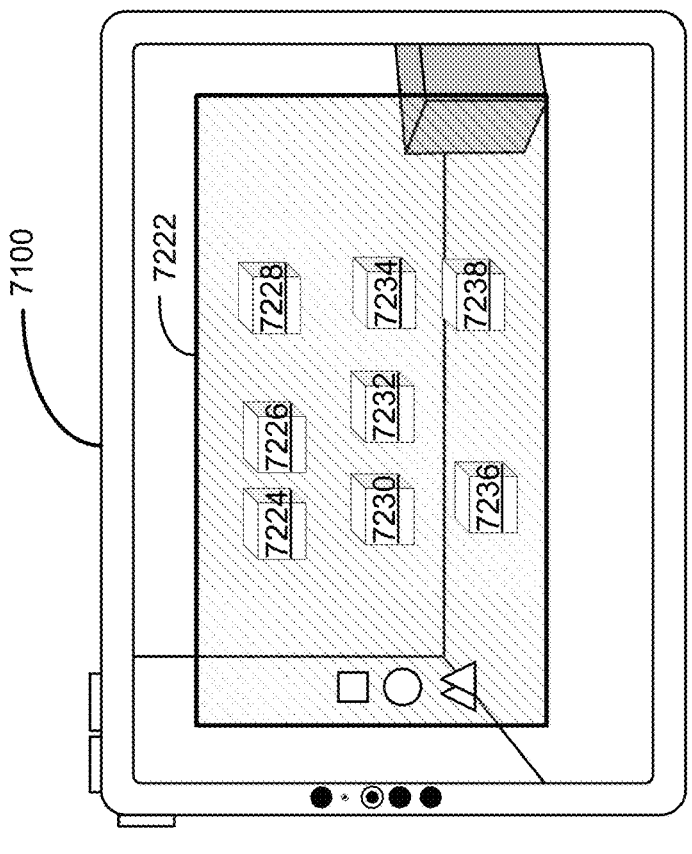
Figure 7BN1
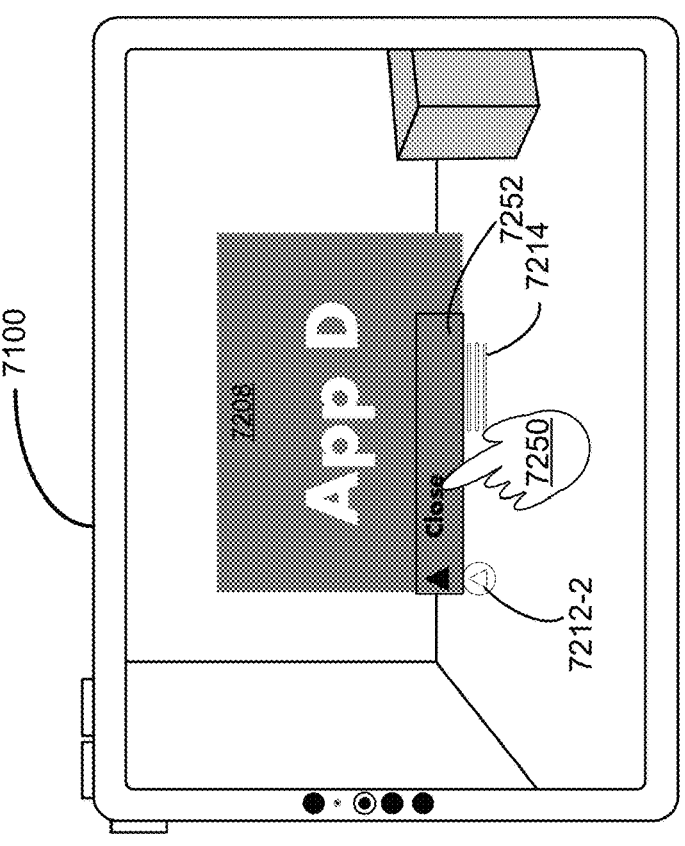
Figure 7BM1

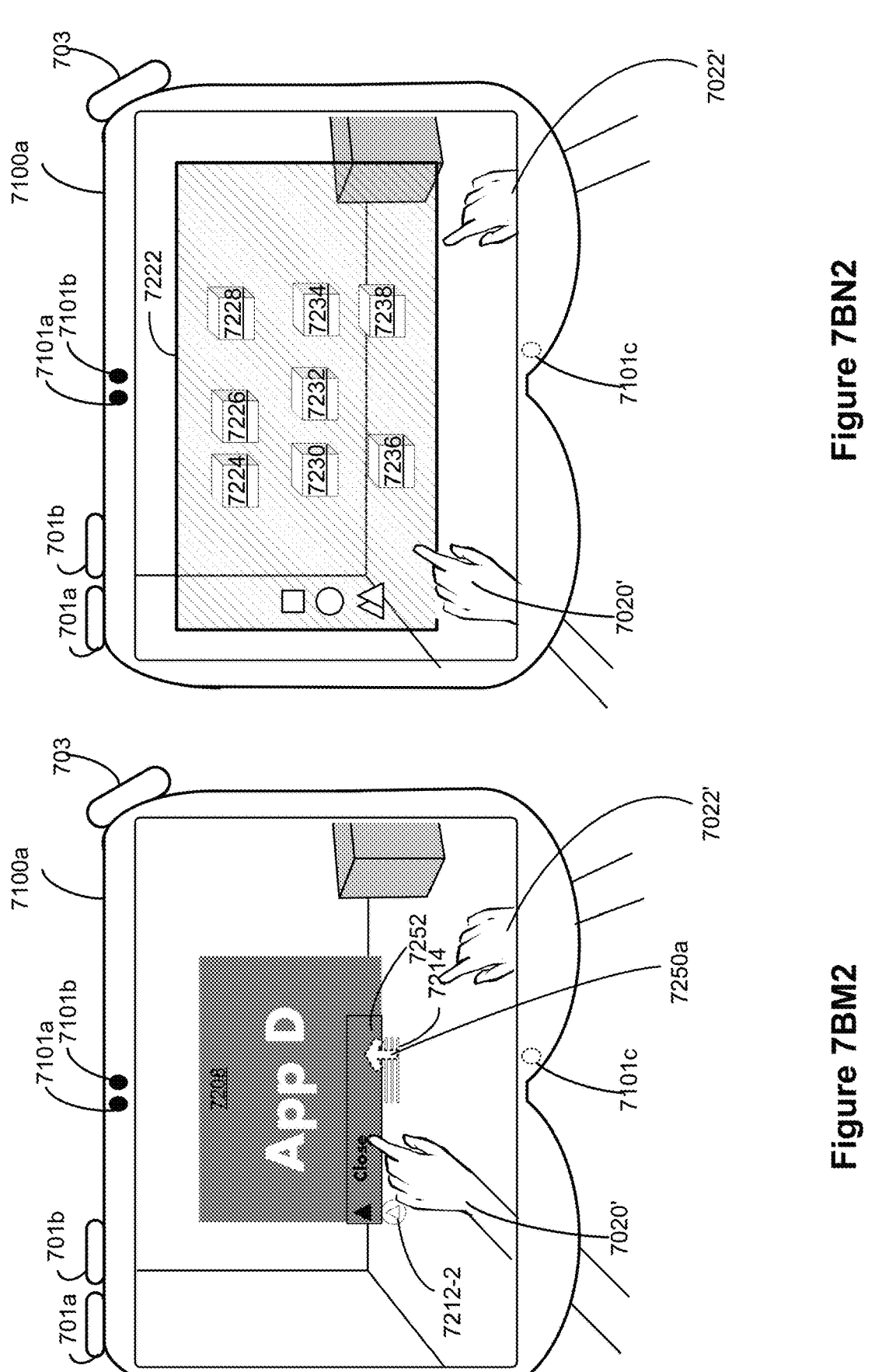
Figure 7BN2
Figure 7BM2

Top view 7229

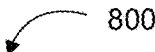 800

802 Display, via the first display generation component, a first object in a first view of a three-dimensional environment, wherein the first object includes at least a first portion of the first object and a second portion of the first object.

804 While displaying the first object, detect, via the one or more input devices, a first gaze input that meets first criteria, wherein the first criteria require that the first gaze input is directed to the first portion of the first object in order for the first criteria to be met.

806 In response to detecting that the first gaze input meets the first criteria, display a first control element that corresponds to a first operation associated with the first object, wherein the first control element was not displayed prior to detecting that the first gaze input met the first criteria.

808 While displaying the first control element, detect, via the one or more input devices, a first user input directed to the first control element.

810 In response to detecting the first user input directed to the first control element, perform the first operation with respect to the first object.

Figure 8

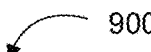
900

902 Display, via the first display generation component, a first user interface object and a first control element that is associated with performing a first operation with respect to the first user interface object, in a first view of a three-dimensional environment, wherein the first control element is spaced apart from the first user interface object in the first view of the three-dimensional environment, and wherein the first control element is displayed with a first appearance.

↓

904 While displaying the first control element with the first appearance, detect, via the one or more input devices, a first gaze input that is directed to the first control element.

↓

906 In response to detecting the first gaze input that is directed to the first control element, update an appearance of the first control element from the first appearance to a second appearance that is different from the first appearance.

↓

908 While displaying the first control element with the second appearance, detect, via the one or more input devices, a first user input directed to the first control element.

↓

910 In response to detecting the first user input directed to the first control element, in accordance with a determination that the first user input meets first criteria, update the appearance of the first control element from the second appearance to a third appearance that is different from the first appearance and the second appearance and that indicates that additional movement associated with the first user input will cause the first operation associated with the first control element to be performed.

Figure 9

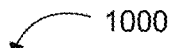

1000

1002 Concurrently display, via the first display generation component, a first application window and a first title bar of the first application window, wherein the first title bar of the first application window is separate from the first application window on a first side of the first application window and displays a respective identifier of the first application window.

1004 While displaying the first application window with the first title bar separate from the first application window, detect, via the one or more input devices, that a user's attention is directed to the first title bar.

1006 In response to detecting that the user's attention is directed to the first title bar:

1008 In accordance with a determination that the user's attention meets first criteria with respect to the first title bar, expand the first title bar to display one or more first selectable controls for interacting with a first application corresponding to the first application window, wherein the one or more first selectable controls were not displayed prior to expanding the first title bar.

Figure 10

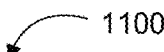 1100

1102 Display, via the first display generation component, a first application window of a first application at a first window position in the first display area.

1104 In accordance with a determination that the first application is accessing one or more sensors of the computer system, display a first indicator at a first indicator position in the first display area with a first spatial relationship to the first application window as an indication that the first application is accessing the one or more sensors of the computer system.

1106 While displaying the first indicator at the first indicator position in the first display area with the first spatial relationship to the first application window, detect a first user input that corresponds to a request to move the first application window of the first application to a second window position in the first display area, the second window position being different from the first window position.

1108 In response to detecting the first user input that corresponds to the request to move the first application window of the first application from the first window position to the second window position in the first display area:

1110 Display the first application window of the first application at the second window position in the first display area.

1112 In accordance with a determination that the first application is accessing the one or more sensors of the computer system, display the first indicator at a second indicator position in the first display area that is different from the first indicator position in the first display area, wherein the second indicator position in the display area has the first spatial relationship to the first application window displayed at the second window position.

Figure 11

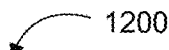
1200

1202 Display a user interface, wherein displaying the user interface includes concurrently displaying a content region with first content, a first user interface object, and a second user interface object in the user interface, wherein:

1204 Respective content in the content region is constrained to having an appearance in which a respective parameter is within a first range of values.

1206 The first user interface object is displayed with an appearance in which the respective parameter has a value that is outside of the first range of values.

1208 The second user interface object is displayed with an appearance in which the respective parameter has a value that is outside of the first range of values.

1210 While concurrently displaying the first content, the first user interface object, and the second user interface object, update the user interface 1212 Change the first content to second content while the respective content in the content region continues to be constrained to having an appearance in which the respective parameter is within the first range of values.

1214 Update the first user interface object in appearance and continue to display the first user interface object with an appearance in which the respective parameter has a value that is outside of the first range of values.

1216 Update the first user interface object in appearance and continue to display the first user interface object with an appearance in which the respective parameter has a value that is outside of the first range of values.

Figure 12

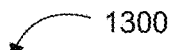 1300

1302 Display, via the first display generation component, a first view of a three-dimensional environment that corresponds to a first viewpoint of a user.

1304 While displaying, via the first display generation component, the first view of the three-dimensional environment that corresponds to the first viewpoint of the user, detect a first event that corresponds to a request to display a first virtual object in the first view of the three-dimensional environment.

1306 In response to detecting the first event that corresponds to a request to display the first virtual object in the first view of the three-dimensional environment, display, in the first view of the three-dimensional environment, the first virtual object a first position in the three-dimensional environment, wherein the first virtual object is displayed with a first object management user interface that corresponds to the first virtual object, and wherein the first object management user interface has a first appearance relative to the first virtual object at the first position in the three-dimensional environment.

1308 Detect, via the one or more input devices, a first user input that corresponds to a request to move the first virtual object in the three-dimensional environment.

1310 In response to detecting the first user input that corresponds to a request to move the first virtual object in the three-dimensional environment:
      display, in the first view of the three-dimensional environment, the first virtual object at a second position, different from the first position, in the three-dimensional environment, wherein, the first virtual object is displayed concurrently with the first object management user interface at the second position in the three-dimensional environment, and wherein the first object management user interface has a second appearance relative to the first virtual object, different from the first appearance.

Figure 13

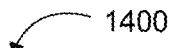
1400

1402 While displaying, via one or more display generation components, a user interface of a first application concurrently with a close affordance associated with the user interface of the first application, detect a first input directed to the close affordance 1404 In response to detecting the first input: in accordance with a determination that the first input is a first type of input, display a first option to close applications other than the first application

Figure 14

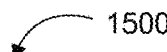
1500

1502 Display, via the first display generation component, a first object at a first position in a first view of a three-dimensional environment.

1504 While displaying, via the first display generation component, the first object at the first position in the first view of the three-dimensional environment, display a first set of one or more control objects, wherein a respective control object of the first set of one or more control objects corresponds to a respective operation applicable to the first object.

1506 Detect, via the one or more input devices, a first user input that corresponds to a request to move the first object in the three-dimensional environment.

1508 In response to detecting the first user input that corresponds to a request to move the first object in the three-dimensional environment:

move the first object from the first position to a second position; and while moving the first object from the first position to the second position, visually deemphasize, relative to the first object, at least one of the first set of one or more control objects that corresponds to the respective operation that is applicable to the first object.

Figure 15

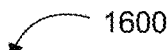
1600

1602 While displaying, via a display generation component, a first application user interface at a first location in a three-dimensional environment, detect, at a first time via one or more input devices, a first input corresponding to a request to close the first application user interface 1604 In response to detecting the first input corresponding to a request to close the first application user interface:

1606 Close the first application user interface, including ceasing to display the first application user interface in the three-dimensional environment 1608 In accordance with a determination that respective criteria are met, display a home menu user interface at a respective home menu position that is determined based on the first location of the first application user interface in the three-dimensional environment.

Figure 16

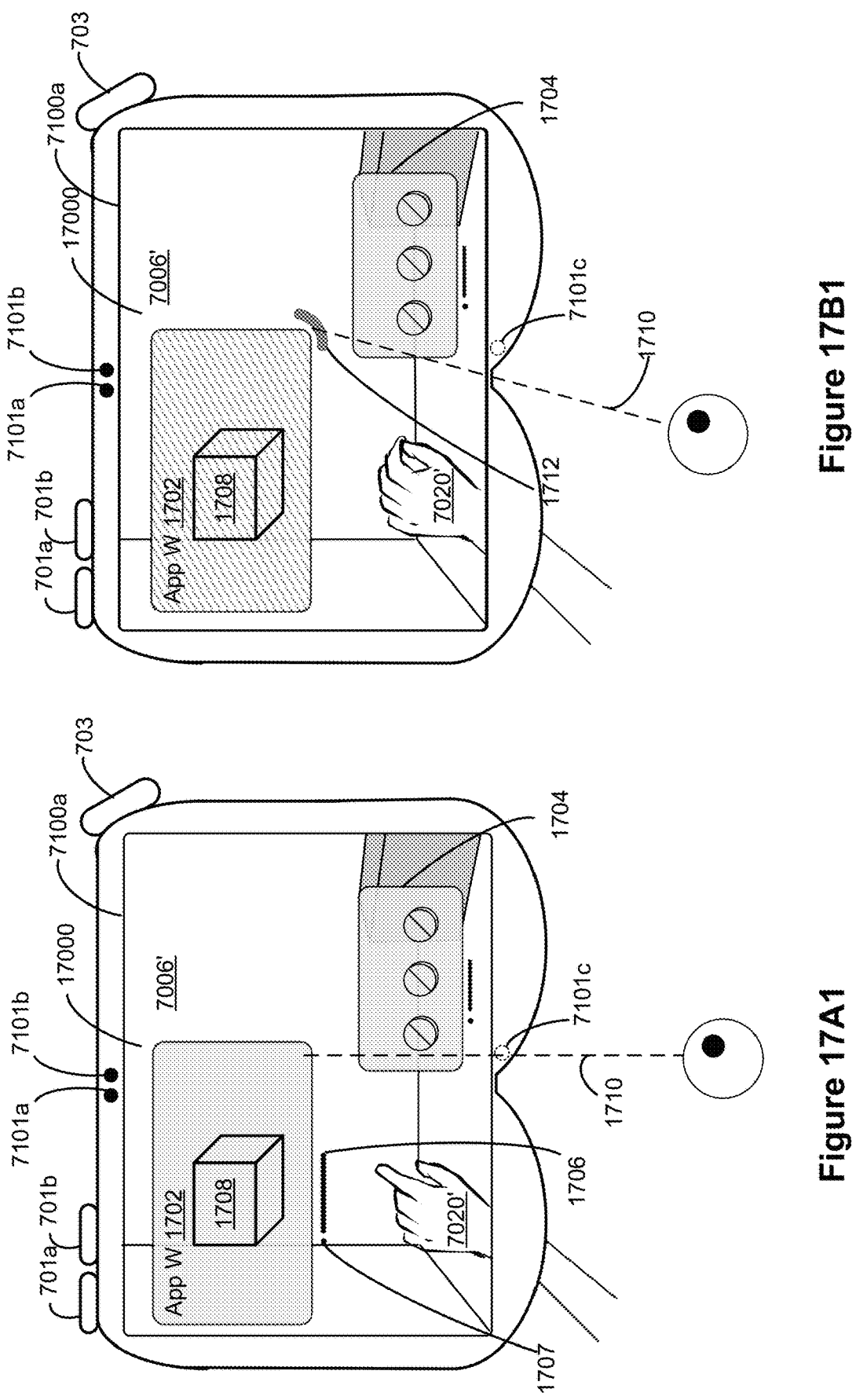
Figure 17B1
Figure 17A1

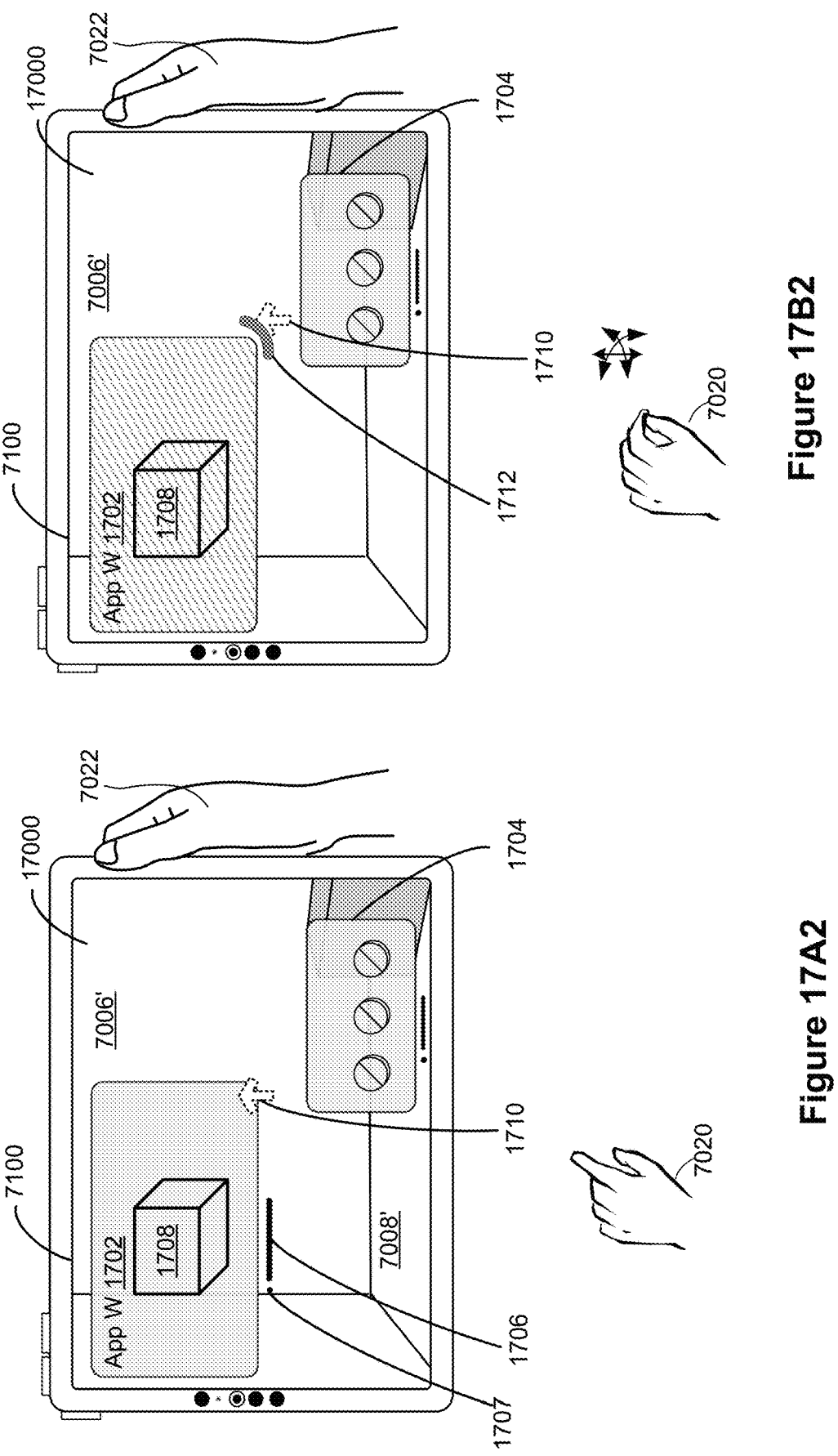
Figure 17B2
Figure 17A2

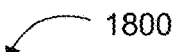
1800

1802 Display, via the display generation component, a first user interface object, wherein the first user interface object includes first content.

1804 While displaying the first user interface object including the first content via the display generation component, detect, via the one or more input devices, a first user input that is directed to the first user interface object.

1806 In response to detecting the first user input that is directed to the first user interface object, in accordance with a determination that the first user input corresponds to a request to resize the first user interface object, resize the first user interface object in accordance with the first user input, wherein resizing the first user interface object in accordance with the first user input includes:

1808 One or more temporary resizing operations, including:

1810 In accordance with a determination that a characteristic refresh rate of the first content within the first user interface object is a first refresh rate, scaling the first user interface object with the first content by a first amount of scaling before the first content is updated within the first user interface object in accordance with a first updated size of the first user interface object that is specified by the first user input.

1812 In accordance with a determination that the characteristic refresh rate of the first content within the first user interface object is a second refresh rate different from the first refresh rate, scaling the first user interface object with the first content by a second amount of scaling different from the first amount of scaling before the first content is updated within the first user interface object in accordance with the first updated size of the first user interface object that is specified by the first user input.

1814 After the one or more temporary resizing operations, displaying the first user interface object at the first updated size that is specified by the first user input, and updating the first content within the first user interface object in accordance with the first updated size that is specified by the first user input.

Figure 18

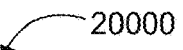

20000

20002 Display, via the one or more display generation components, a first application window at a first scale.

20004 While displaying the first application window at the first scale, detect, via the one or more input devices, a first gesture directed toward the application window.

20006 In response to detecting the first gesture, in accordance with a determination that the first gesture is directed toward a respective portion of the first application window that is not associated with an application-specific response to the first gesture, change a respective scale of the first application window from the first scale to a second scale that is different from the first scale.

Figure 20

DEVICES, METHODS, AND GRAPHICAL USER INTERFACES FOR INTERACTING WITH WINDOW CONTROLS IN THREE-DIMENSIONAL ENVIRONMENTS

RELATED APPLICATIONS

This application claims priority to U.S. Provisional Patent Application No. 63/539,566, filed Sep. 20, 2023, U.S. Provisional Patent Application No. 63/535,012, filed Aug. 28, 2023, U.S. Provisional Patent Application No. 63/470,909, filed Jun. 4, 2023, and U.S. Provisional Patent Application No. 63/409,600, filed Sep. 23, 2022, each of which is hereby incorporated by reference in its entirety.

TECHNICAL FIELD

The present disclosure relates generally to computer systems that are in communication with a display generation component and, optionally, one or more input devices that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Some examples of virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing users with conditionally displayed controls and user interface elements that indicate information about content to make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is a portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with a three-dimensional environment. Such methods and interfaces may complement or replace conventional methods for interacting with a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

A method is performed at a computer system that is in communication with a first display generation component and one or more input devices. The method includes displaying, via the first display generation component, a first object in a first view of a three-dimensional environment, wherein the first object includes at least a first portion of the first object and a second portion of the first object. The method includes, while displaying the first object, detecting, via the one or more input devices, a first gaze input that meets first criteria, wherein the first criteria require that the first gaze input is directed to the first portion of the first object in order for the first criteria to be met. The method includes, in response to detecting that the first gaze input meets the first criteria, displaying a first control element that corresponds to a first operation associated with the first object, wherein the first control element was not displayed prior to detecting that the first gaze input met the first criteria. The method includes, while displaying the first control element, detecting, via the one or more input devices, a first user input directed to the first control element, and, in response to detecting the first user input directed to the first control element, performing the first operation with respect to the first object.

A method is performed at a computer system that is in communication with a first display generation component and one or more input devices. The method includes displaying, via the first display generation component, a first user interface object and a first control element that is associated with performing a first operation with respect to the first user interface object, in a first view of a three-dimensional environment, wherein the first control element is spaced apart from the first user interface object in the first view of the three-dimensional environment, and wherein the first control element is displayed with a first appearance. The method includes, while displaying the first control element with the first appearance, detecting, via the one or more input devices, a first gaze input that is directed to the first control element. The method includes, in response to detecting the first gaze input that is directed to the first control element, updating an appearance of the first control element from the first appearance to a second appearance that is different from the first appearance. The method includes, while displaying the first control element with the second appearance, detecting, via the one or more input devices, a first user input directed to the first control element. The method includes, in response to detecting the first user input directed to the first control element, and in accordance with a determination that the first user input meets first criteria, updating the appearance of the first control element from the second appearance to a third appearance that is different from the first appearance and the second appearance and that indicates that additional movement associated with the first user input will cause the first operation associated with the first control element to be performed.

A method is performed at a computer system that is in communication with a first display generation component and one or more input devices. The method includes concurrently displaying, via the first display generation component, a first application window and a first title bar of the first application window, wherein the first title bar of the first application window is separate from the first application window on a first side of the first application window and displays a respective identifier of the first application window. The method includes, while displaying the first application window with the first title bar separate from the first application window, detecting, via the one or more input devices, that a user's attention is directed to the first title bar. The method includes, in response to detecting that the user's attention is directed to the first title bar, in accordance with a determination that the user's attention meets first criteria with respect to the first title bar, expanding the first title bar to display one or more first selectable controls for interacting with a first application corresponding to the first application window, wherein the one or more first selectable controls were not displayed prior to expanding the first title bar.

A method is performed at a computer system that is in communication with a first display generation component having a first display area and one or more input devices. The method includes displaying, via the first display generation component, a first application window of a first application at a first window position in the first display area. The method includes, in accordance with a determination that the first application is accessing one or more sensors of the computer system, displaying a first indicator at a first indicator position in the first display area with a first spatial relationship to the first application window as an indication that the first application is accessing the one or more sensors of the computer system. The method includes, while displaying the first indicator at the first indicator position in the first display area with the first spatial relationship to the first application window, detecting a first user input that corresponds to a request to move the first application window of the first application to a second window position in the first display area, the second window position being different from the first window position. The method includes, in response to detecting the first user input that corresponds to the request to move the first application window of the first application from the first window position to the second window position in the first display area, displaying the first application window of the first application at the second window position in the first display area; and in accordance with a determination that the first application is accessing the one or more sensors of the computer system, displaying the first indicator at a second indicator position in the first display area that is different from the first indicator position in the first display area, wherein the second indicator position in the first display area has the first spatial relationship to the first application window displayed at the second window position.

A method is performed at a computer system that is in communication with a first display generation component and one or more input devices. The method includes displaying a user interface, wherein displaying the user interface includes concurrently displaying a content region with first content, a first user interface object, and a second user interface object in the user interface, wherein: respective content in the content region is constrained to having an appearance in which a respective parameter is within a first range of values, the first user interface object is displayed with an appearance in which the respective parameter has a value that is outside of the first range of values, and the second user interface object is displayed with an appearance in which the respective parameter has a value that is outside of the first range of values. The method includes, while concurrently displaying the first content, the first user interface object, and the second user interface object, updating the user interface, including: changing the first content to second content while the respective content in the content region continues to be constrained to having an appearance in which the respective parameter is within the first range of values, updating the first user interface object in appearance and continuing to display the first user interface object with an appearance in which the respective parameter has a value that is outside of the first range of values, and updating the second user interface object in appearance and continuing to display the second user interface object with an appearance in which the respective parameter has a value that is outside of the first range of values.

A method is performed at a computer system that is in communication with a first display generation component and one or more input devices. The method includes displaying, via the first display generation component, a first view of a three-dimensional environment that corresponds to a first viewpoint of a user. The method further includes, while displaying, via the first display generation component, the first view of the three-dimensional environment that corresponds to the first viewpoint of the user, detecting a first event that corresponds to a request to display a first virtual object in the first view of the three-dimensional environment. The method further includes, in response to detecting the first event that corresponds to a request to display the first virtual object in the first view of the three-dimensional environment, displaying, in the first view of the three-dimensional environment, the first virtual object at a first position in the three-dimensional environment, wherein the first virtual object is displayed with a first object management user interface that corresponds to the first virtual object, and wherein the first object management user interface has a first appearance relative to the first virtual object at the first position in the three-dimensional environment. The method includes, detecting, via the one or more input devices, a first user input that corresponds to a request to move the first virtual object in the three-dimensional environment. The method further includes, in response to detecting the first user input that corresponds to a request to move the first virtual object in the three-dimensional environment: displaying, in the first view of the three-dimensional environment, the first virtual object at a second position, different from the first position, in the three-dimensional environment, wherein the first virtual object is displayed concurrently with the first object management user interface at the second position in the three-dimensional environment, and wherein the first object management user interface has a second appearance relative to the first virtual object, different from the first appearance.

A method is performed at a computer system that is in communication with one or more display generation components and one or more input devices. The method includes, while displaying, via the one or more display generation components, a user interface of a first application concurrently with a close affordance associated with the user interface of the first application, detecting a first input directed to the close affordance. The method includes, in response to detecting the first input, in accordance with a determination that the first input is a first type of input, displaying a first option to close applications other than the first application.

A method is performed at a computer system that is in communication with a first display generation component and one or more input devices. The method includes displaying, via the first display generation component, a first object at a first position in first view of a three-dimensional environment. The method further includes, while displaying, via the first display generation component, the first object at the first position in the first view of the three-dimensional environment, displaying a first set of one or more control objects, wherein a respective control object of the first set of one or more control objects corresponds to a respective operation applicable to the first object. The method includes, detecting, via the one or more input devices, a first user input that corresponds to a request to move the first object in the three-dimensional environment. The method further includes, in response to detecting the first user input that corresponds to a request to move the first object in the three-dimensional environment: moving the first object from the first position to a second position and, while moving the first object from the first position to the second position, visually deemphasizing relative to the first object, at least one of the first set of one or more control objects that corresponds to the respective operation that is applicable to the first object.

A method is performed at a computer system that is in communication with a display generation component and one or more input devices. The method includes, while displaying, via the display generation component, a first application user interface at a first location in a three-dimensional environment, detecting, at a first time via the one or more input devices, a first input corresponding to a request to close the first application user interface. The method includes, in response to detecting the first input corresponding to a request to close the first application user interface: closing the first application user interface, including ceasing to display the first application user interface in the three-dimensional environment; and, in accordance with a determination that respective criteria are met, displaying a home menu user interface at a respective home menu position that is determined based on the first location of the first application user interface in the three-dimensional environment.

A method is performed at a computer system that is in communication with a first display generation component and one or more input devices. The method includes displaying, via the display generation component, a first user interface object, wherein the first user interface object includes first content. The method includes, while displaying the first user interface object including the first content via the display generation component, detecting, via the one or more input devices, a first user input that is directed to the first user interface object. The method further includes, in response to detecting the first user input that is directed to the first user interface object: in accordance with a determination that the first user input corresponds to a request to resize the first user interface object, resizing the first user interface object in accordance with the first user input, wherein resizing the first user interface object in accordance with the first user input includes: one or more temporary resizing operations, including, in accordance with a determination that a characteristic refresh rate of the first content within the first user interface object is a first refresh rate, scaling the first user interface object with the first content by a first amount of scaling before the first content is updated within the first user interface object in accordance with a first updated size of the first user interface object that is specified by the first user input; and in accordance with a determination that the characteristic refresh rate of the first content within the first user interface object is a second refresh rate different from the first refresh rate, scaling the first user interface object with the first content by a second amount of scaling different from the first amount of scaling before the first content is updated within the first user interface object in accordance with the first updated size of the first user interface object that is specified by the first user input. The method includes, after the one or more temporary resizing operations, displaying the first user interface object at the first updated size that is specified by the first user input, and updating the first content within the first user interface object in accordance with the first updated size that is specified by the first user input.

A method is performed at a first computer system that is in communication with one or more display generation components and one or more input devices. The method includes displaying, via the one or more display generation components, a first application window at a first scale. The method includes, while displaying the first application window at the first scale, detecting, via the one or more input devices, a first gesture directed toward the first application window. The method includes, in response to detecting the first gesture, in accordance with a determination that the first gesture is directed toward a respective portion of the first application window that is not associated with an application-specific response to the first gesture, changing a respective scale of the first application window from the first scale to a second scale that is different from the first scale.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1A:
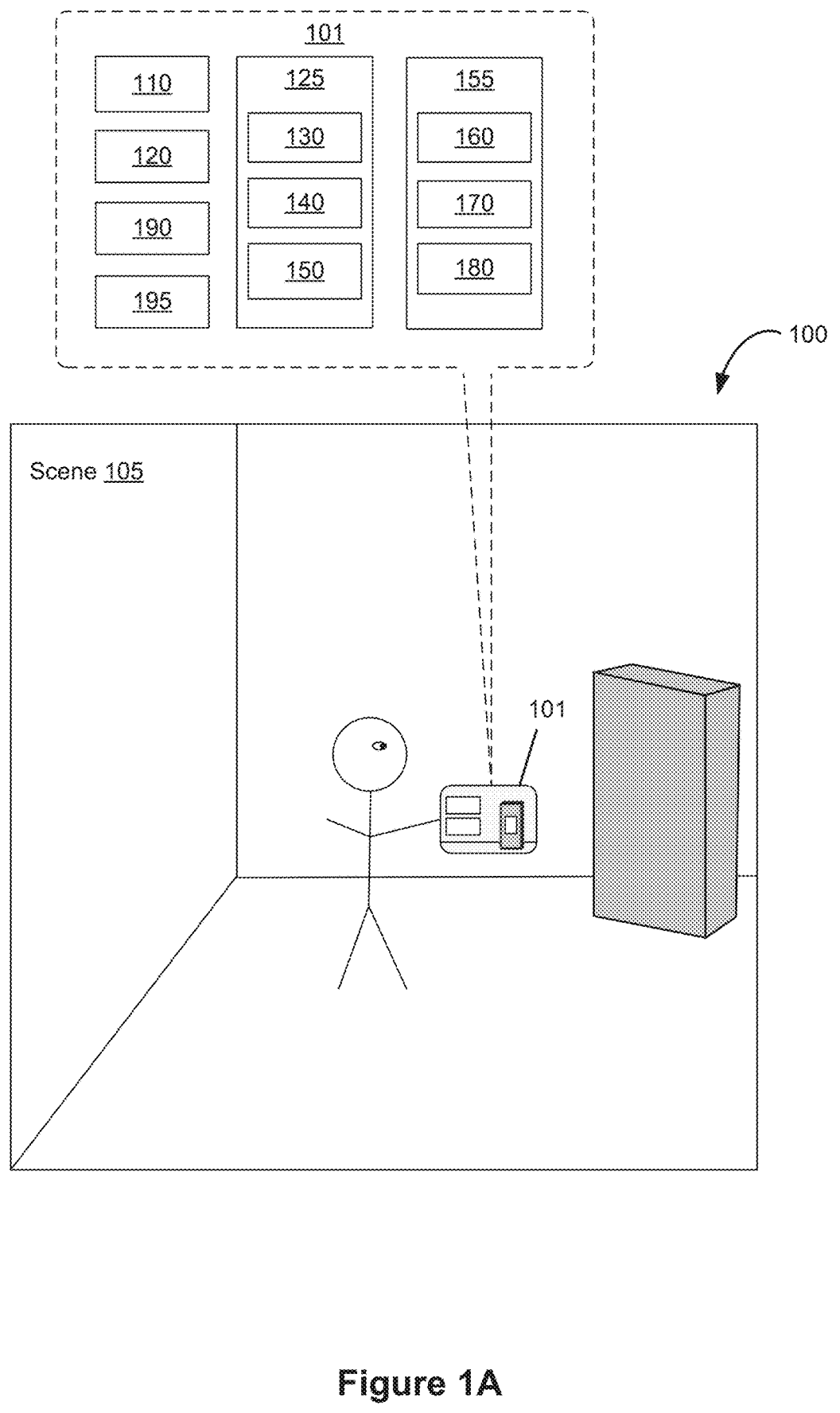

FIG. 1A is a block diagram illustrating an operating environment of a computer system for providing extended reality (XR) experiences in accordance with some embodiments.

FIG. 4 is a block diagram illustrating a hand tracking unit of a computer system that is configured to capture gesture inputs of the user in accordance with some embodiments.

FIGS. 7S-7AD3 illustrate example techniques for displaying a title bar with information for an application, in accordance with some embodiments.

FIGS. 7AE-7AH illustrate example techniques for displaying privacy indicators, in accordance with some embodiments.

FIGS. 7A1-7AP illustrate example techniques for displaying some user interface elements with values for a parameter constrained to a first range, and displaying other user interface elements with values for the parameter that are outside the first range, in accordance with some embodiments.

FIGS. 7AQ-7BB illustrate example techniques for displaying controls for a virtual object and automatically updating the displayed controls as the virtual object is moved within the AR/VR environment, in accordance with some embodiments.

FIGS. 7BM1-7CH illustrate example techniques for displaying a home menu user interface after closing one or more application user interfaces, in accordance with some embodiments.

FIG. 8 is a flow diagram of methods of conditionally displaying controls for applications, in accordance with various embodiments.

FIG. 9 is a flow diagram of methods of updating visual properties of controls in response to user interactions, in accordance with various embodiments.

FIG. 10 is a flow diagram of methods of displaying a title bar with information for an application, in accordance with various embodiments.

FIG. 11 is a flow diagram of methods of displaying privacy indicators, in accordance with various embodiments.

FIG. 12 is a flow diagram of methods of displaying some user interface elements with values for a parameter constrained to a first range, and displaying other user interface elements with values for the parameter that are outside the first range, in accordance with various embodiments.

FIG. 13 is a flow diagram of methods of displaying controls for a virtual object and automatically updating the displayed controls as the virtual object is moved within the AR/VR environment, in accordance with various embodiments.

FIG. 14 is a flow diagram of methods of closing different applications or groups of applications in a three-dimensional environment in response to different inputs, in accordance with various embodiments.

FIG. 15 is a flow diagram of methods of displaying controls for an object and automatically reducing a prominence of the controls while the object is moved within the AR/VR environment, in accordance with various embodiments.

FIG. 16 is a flow diagram of methods of displaying a home menu user interface after closing one or more application user interfaces, in accordance with various embodiments.

FIGS. 17A1-17T illustrate example techniques for scaling a user interface object, during a resize operation of the user interface object, by different scaling factors based on a refresh rate of content in the user interface object, in accordance with various embodiments.

FIG. 18 is a flow diagram of methods for scaling a user interface object, during a resize operation of the user interface object, by different scaling factors based on a refresh rate of content in the user interface object, in accordance with various embodiments.

FIG. 20 is a flow diagram of methods for scaling a user interface object based on respective gestures, in accordance with various embodiments.

DESCRIPTION OF EMBODIMENTS

Figure 1B:
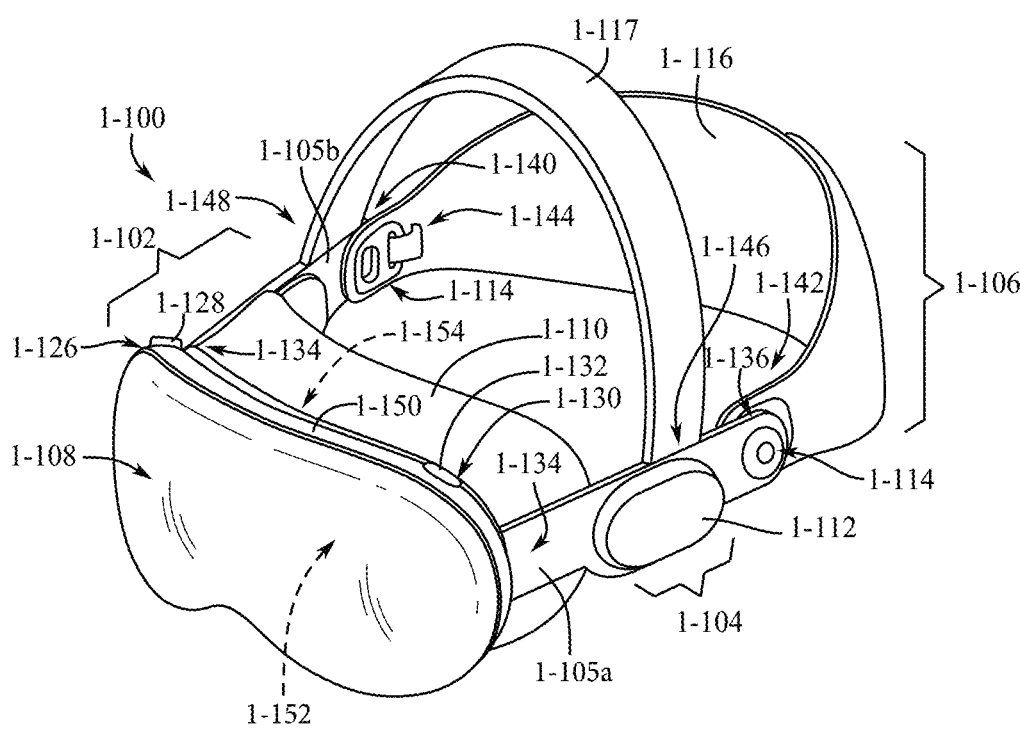
FIGS. 1B-1P are examples of a computer system for providing XR experiences in the operating environment of FIG. 1A.

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, a computer system displays an application window. In response to detecting the user's gaze is directed to a respective portion of the application window, the computer system displays a respective control associated with the respective portion of the application window. Conditionally displaying a control in response to detecting a user's gaze directed to an area of the control, without requiring additional user input, enables the user to access a particular control to perform an operation by shifting the user's gaze, without cluttering the user interface with display of all the available controls.

In some embodiments, a computer system displays a control for an application with a first appearance in response to the user gazing at the control. The computer system updates display of the control to be displayed with a second appearance after detecting the user is interacting with the control, such as performing a gesture, to perform an operation. Automatically updating an appearance of the control when the user is gazing at the control and further updating the appearance of the move control when the user is interacting with the control provides the user with improved visual feedback of the user's interactions.

In some embodiments, a computer system displays an application window for a first application. The computer system concurrently displays, with the application window, a title bar for the application window. The title bar dynamically increases in size, and displays additional controls in the title bar, in response to detecting a user's attention is directed to the title bar. Dynamically increasing the title bar in size to provide the user with access to additional controls, reduces a number of inputs required to access additional controls for the application window and provides visual feedback about a state of the device.

In some embodiments, a computer system displays an application window in a display area. The computer system determines if an application is accessing sensitive user data and displays a privacy indicator near an application window of the application that is accessing sensitive user data. In some embodiments, the computer system detects a user input to move the application window in the display area. Continuing to provide a privacy indicator for an application window, even as the application window is repositioned to be displayed at a different location in the display area, improves security and privacy of the system by providing real-time information about the specific application window that is accessing the sensitive user data and maintaining the information as the application window moves within the display area.

In some embodiments, a computer system displays a user interface, wherein displaying the user interface includes concurrently displaying a content region with first content, a first user interface object, and a second user interface object in the user interface. The respective content in the content region is constrained to having an appearance in which a respective parameter is within a first range of values, the first user interface object is displayed with an appearance in which the respective parameter has a value that is outside of the first range of values, and the second user interface object is displayed with an appearance in which the respective parameter has a value that is outside of the first range of values. While concurrently displaying the first content, the first user interface object, and the second user interface object, updating the user interface. Updating the user interface includes changing the first content to second content while the respective content in the content region continues to be constrained to having an appearance in which the respective parameter is within the first range of values; updating the first user interface object in appearance and continuing to display the first user interface object with an appearance in which the respective parameter has a value that is outside of the first range of values; and updating the second user interface object in appearance and continuing to display the second user interface object with an appearance in which the respective parameter has a value that is outside of the first range of values.

In some embodiments, a computer system, in response to detecting a first event that corresponds to a request to display a first virtual object in a three-dimensional environment, displays the first virtual object at first position in the three-dimensional environment with a first object management user interface that corresponds to the first virtual object, and wherein the first object management user interface has a first appearance relative to the first virtual object at the first position. In response to detecting a first user input that corresponds to a request to move the first virtual object in the three-dimensional environment, the computer system displays, in the first view of the three-dimensional environment, the first virtual object at a second position concurrently with the first object management user interface at the second position in the three-dimensional environment, the first object management user interface having a second appearance relative to the first virtual object. Automatically updating a control for a virtual object in response to detecting that the virtual object is moving within the AR/VR environment, without requiring additional user input, enables the user to continue to access the control to perform an operation, and provides improved visual feedback by dynamically adjusting the controls to be easily viewed by the user, even as the position of the virtual object changes.

In some embodiments, a computer system displays a user interface of a first application concurrently with a close affordance associated with the user interface of the first application. In response to detecting a first input directed to the close affordance, the computer system displays a first option to close applications other than the first application. Providing different options for closing one or more user interfaces reduces the number of inputs needed to display one or more user interfaces of interest.

In some embodiments, a computer system while displaying, a first object at a first position in a first view of a three-dimensional environment, displays a first set of one or more control objects, wherein a respective control object of the first set of one or more control objects corresponds to a respective operation applicable to the first object. In response to detecting a first user input that corresponds to a request to move the first object in the three-dimensional environment, the computer system: moves the first object from the first position to a second position and, while moving the first object from the first position to the second position, visually deemphasizes relative to the first object, at least one of the first set of one or more control objects that corresponds to the respective operation that is applicable to the first object. Automatically updating a control for a virtual object in response to detecting that the object is moving within the AR/VR environment, without requiring additional user input, enables the user to continue to access the control to perform an operation, and provides improved visual feedback by indicating the controls are not available for interaction while the object is being moved.

In some embodiments, a computer system displays a first application user interface at a first location in a three-dimensional environment. In response to detecting a first input corresponding to a request to close the first application user interface, the computer system closes the first application user interface and displays a home menu user interface at a respective home menu position that is determined based on the first location of the first application user interface in the three-dimensional environment. Automatically displaying the home menu user interface allows the user to continue navigating through one or more collections of selectable representations of the home menu user interface when no application user interface remains in a viewport of the three-dimensional environment, without displaying additional controls.

In some embodiments, a computer system, in response to detecting a user input corresponding to a request to resize a first user interface object, resizes the first user interface object in accordance with the user input, including performing one or more temporary resizing operations, including: in accordance with a determination that a characteristic refresh rate of the first content is a first refresh rate, scaling the first user interface object with the first content by a first amount; and in accordance with a determination that the characteristic refresh rate of the first content is a second refresh rate, scaling the first user interface object with the first content by a second amount. After the one or more temporary resizing operations, the computer system displays the first user interface object at the first updated size that is specified by the first user input, and updates the first content within the first user interface object.

In some embodiments, a computer system displays a first application window at a first scale. The computer system, while displaying the first application window at the first scale, detects a first gesture directed toward the first application window. In response to detecting the first gesture, in accordance with a determination that the first gesture is directed toward a respective portion of the first application window that is not associated with an application-specific response to the first gesture, the computer system changes a respective scale of the first application window from the first scale to a second scale that is different from the first scale.

Figures 19A, 19B:
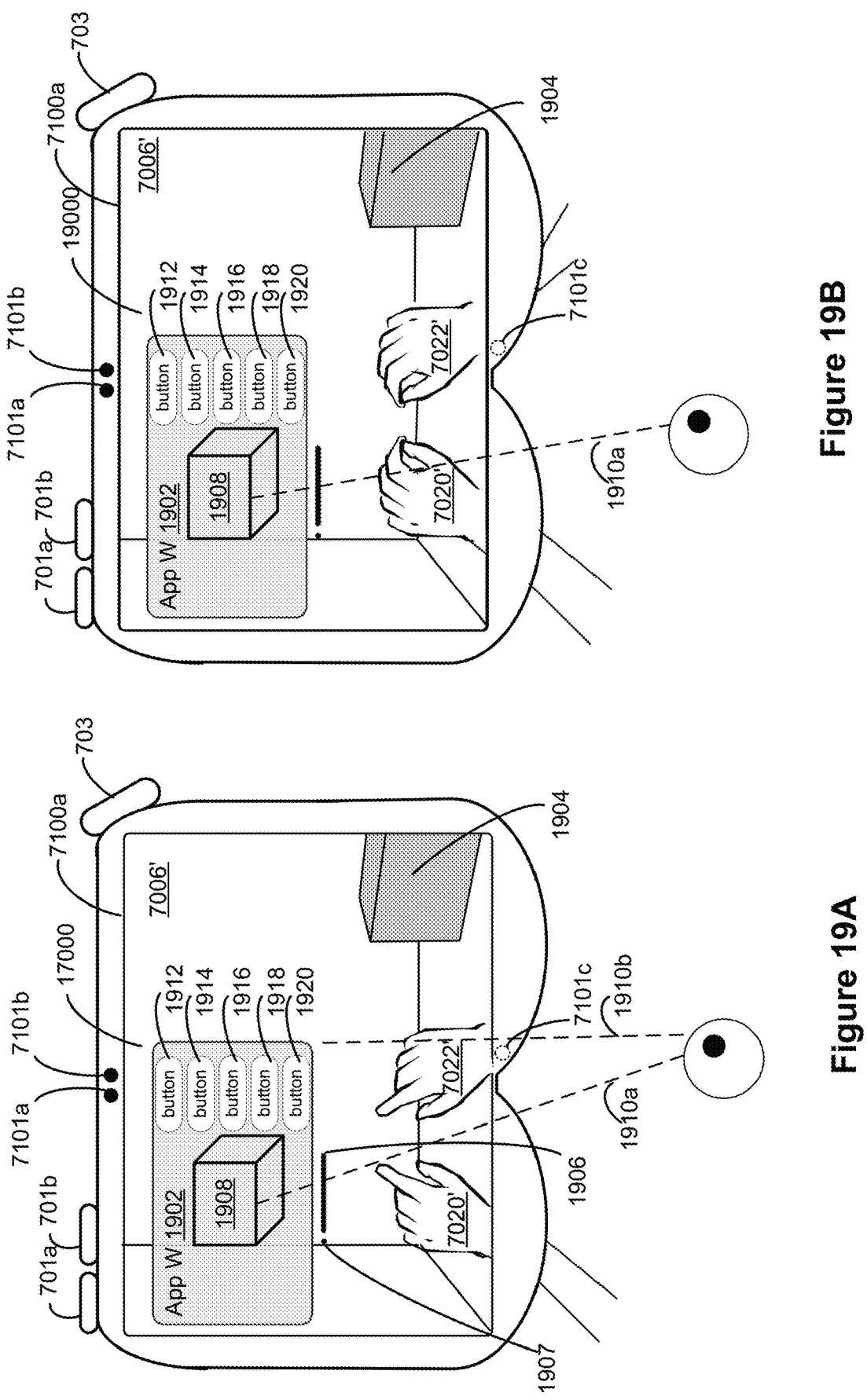
FIGS. 19A-19S illustrate example techniques for scaling a user interface object based on respective gestures, in accordance with various embodiments.

FIGS. 1A-6 provide a description of example computer systems for providing XR experiences to users. FIGS. 7A-7R illustrate example techniques for conditionally displaying controls for an application window and updating visual properties of the controls in response to user interactions, in accordance with some embodiments. FIG. 8 is a flow diagram of methods of conditionally displaying controls for an application window, in accordance with various embodiments. FIG. 9 is a flow diagram of methods of updating visual properties of the controls in response to user interactions, in accordance with various embodiments. The user interfaces in FIGS. 7A-7R are used to illustrate the processes in FIGS. 8 and 9. FIGS. 7S-7AD3 illustrate example techniques for displaying a title bar with information for an application, in accordance with some embodiments. FIG. 10 is a flow diagram of methods of displaying a title bar with information for an application, in accordance with various embodiments. The user interfaces in FIGS. 7S-7AD3 are used to illustrate the processes in FIG. 10. FIG. 7T (e.g., FIGS. 7T1, 7T2 and 7T3)-7AH illustrate example techniques for displaying privacy indicators, in accordance with some embodiments. FIG. 11 is a flow diagram of methods of displaying privacy indicators, in accordance with various embodiments. The user interfaces in FIGS. 7T-7AH are used to illustrate the processes in FIG. 11. FIGS. 7A1-7AP illustrate example techniques for displaying some user interface elements with values for a parameter constrained to a first range, and displaying other user interface elements with values for the parameter that are outside the first range, in accordance with some embodiments. FIG. 12 is a flow diagram of methods for displaying some user interface elements with values for a parameter constrained to a first range, and displaying other user interface elements with values for the parameter that are outside the first range, in accordance with various embodiments. The user interfaces in FIGS. 7A1-7AP are used to illustrate the processes in FIG. 12. FIGS. 7AQ-7BB illustrate example techniques for displaying controls for a virtual object and automatically updating the displayed controls as the virtual object is moved within the AR/VR environment and for displaying controls for an object and automatically reducing a prominence of the controls while the object is moved within the AR/VR environment, in accordance with some embodiments. FIG. 13 is a flow diagram of methods of displaying controls for a virtual object and automatically updating the displayed controls as the virtual object is moved within the AR/VR environment, in accordance with various embodiments. FIG. 15 is a flow diagram of methods of displaying controls for an object and automatically reducing a prominence of the controls while the object is moved within the AR/VR environment, in accordance with various embodiments. The user interfaces in FIGS. 7AQ-7BB are used to illustrate the processes in FIGS. 13 and 15. FIGS. 7BC-7BL illustrate example techniques for closing different applications or groups of applications in a three-dimensional environment in response to different inputs. FIG. 14 is a flow diagram of methods of closing different applications or groups of applications in a three-dimensional environment in response to different inputs, in accordance with various embodiments. The user interfaces in FIGS. 7BC-7BL are used to illustrate the processes in FIG. 14. FIGS. 7BM-7CH illustrate example techniques for displaying a home menu user interface after closing one or more application user interfaces, in accordance with some embodiments. FIG. 16 is a flow diagram of methods of displaying a home menu user interface after closing one or more application user interfaces, in accordance with various embodiments. The user interfaces in FIGS. 7BM-7CH are used to illustrate the processes in FIG. 16. FIGS. 17A1-17T illustrate example techniques for scaling a user interface object, during a resize operation of the user interface object, by different scaling factors based on a refresh rate of content in the user interface object, in accordance with various embodiments. FIG. 18 is a flow diagram of methods for scaling a user interface object, during a resize operation of the user interface object, by different scaling factors based on a refresh rate of content in the user interface object, in accordance with various embodiments. The user interfaces in FIGS. 17A1-17T are used to illustrate the processes in FIG. 18. FIGS. 19A-19S illustrate example techniques for scaling a user interface object based on respective gestures, in accordance with various embodiments. FIG. 20 is a flow diagram for scaling a user interface object based on respective gestures, in accordance with various embodiments. The user interfaces in 19A-19S are used to illustrate the processes in FIG. 20.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in an XR environment may be made in response to representations of physical motions (e.g., vocal commands). A person may sense and/or interact with an XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location and direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate an XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is an XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1C:
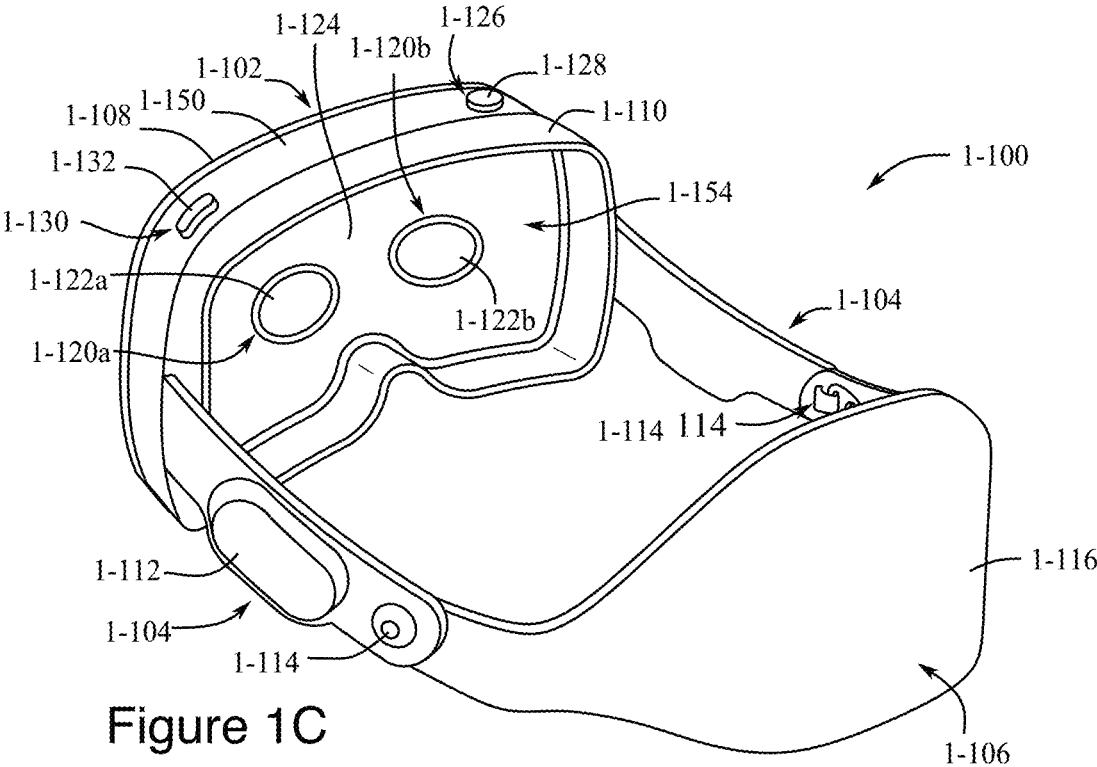
Figure 1D:
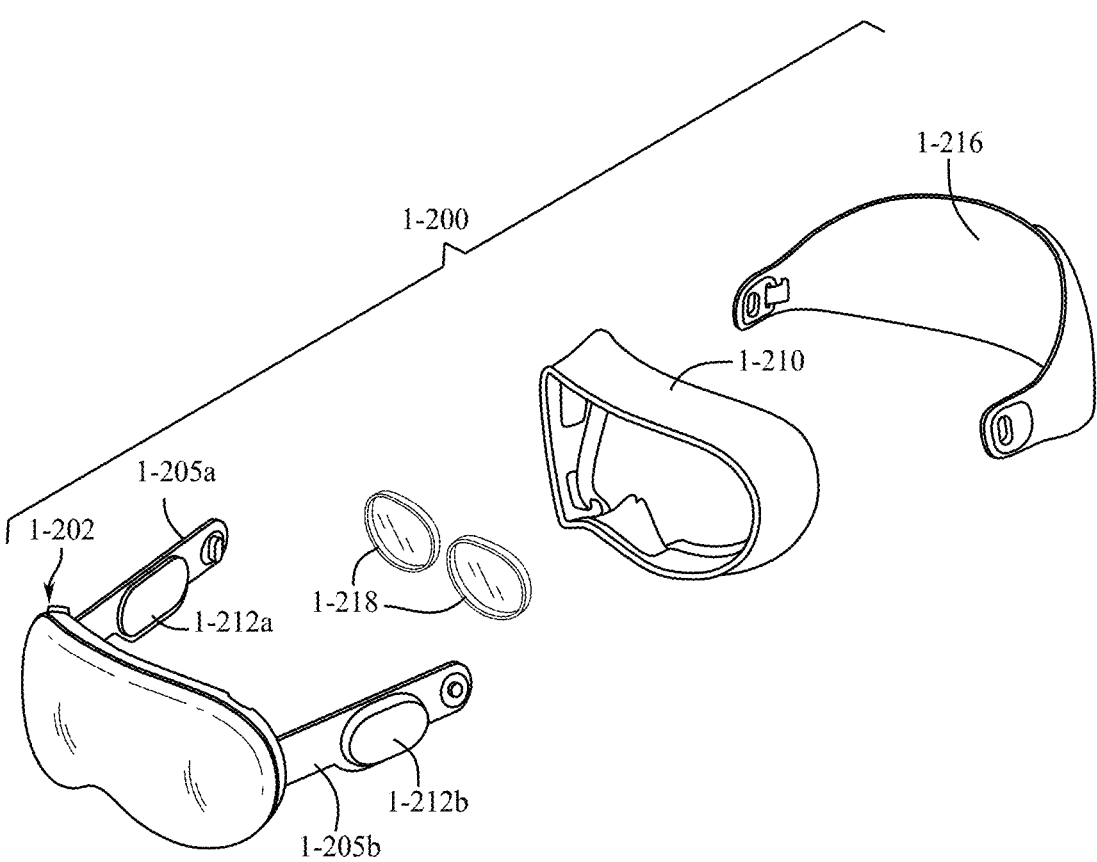
Figure 1E:
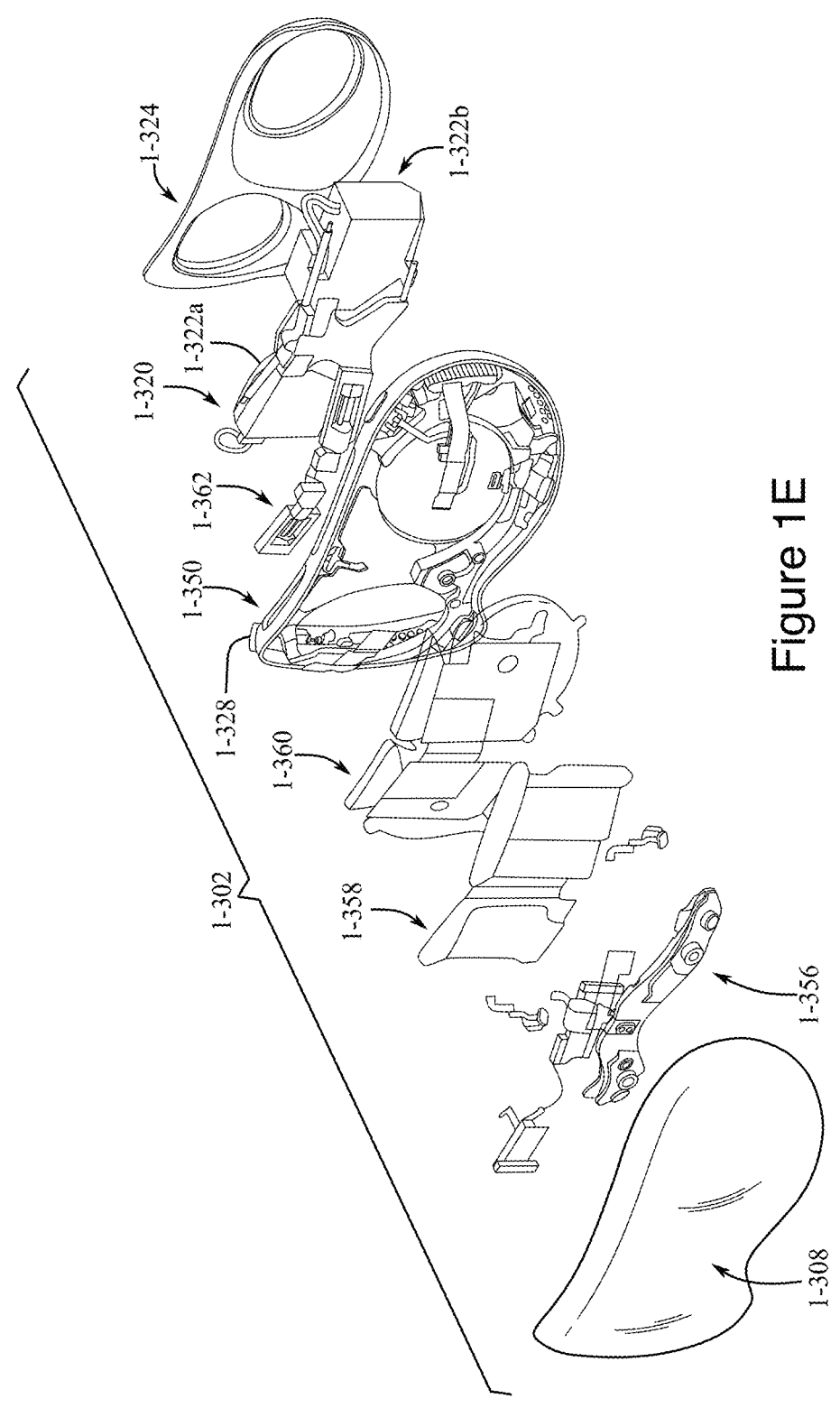
Figure 1F:
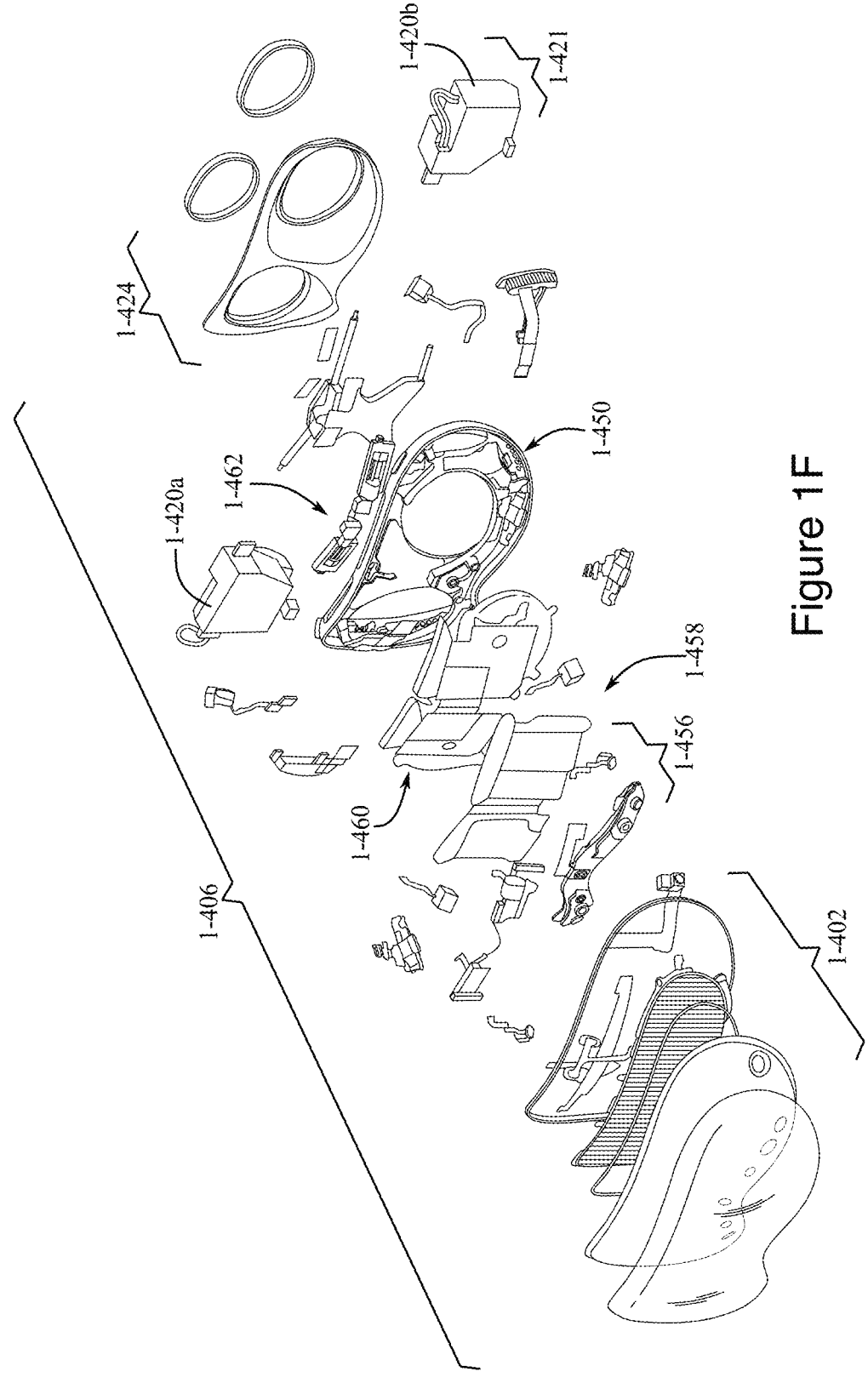
Figure 1G:
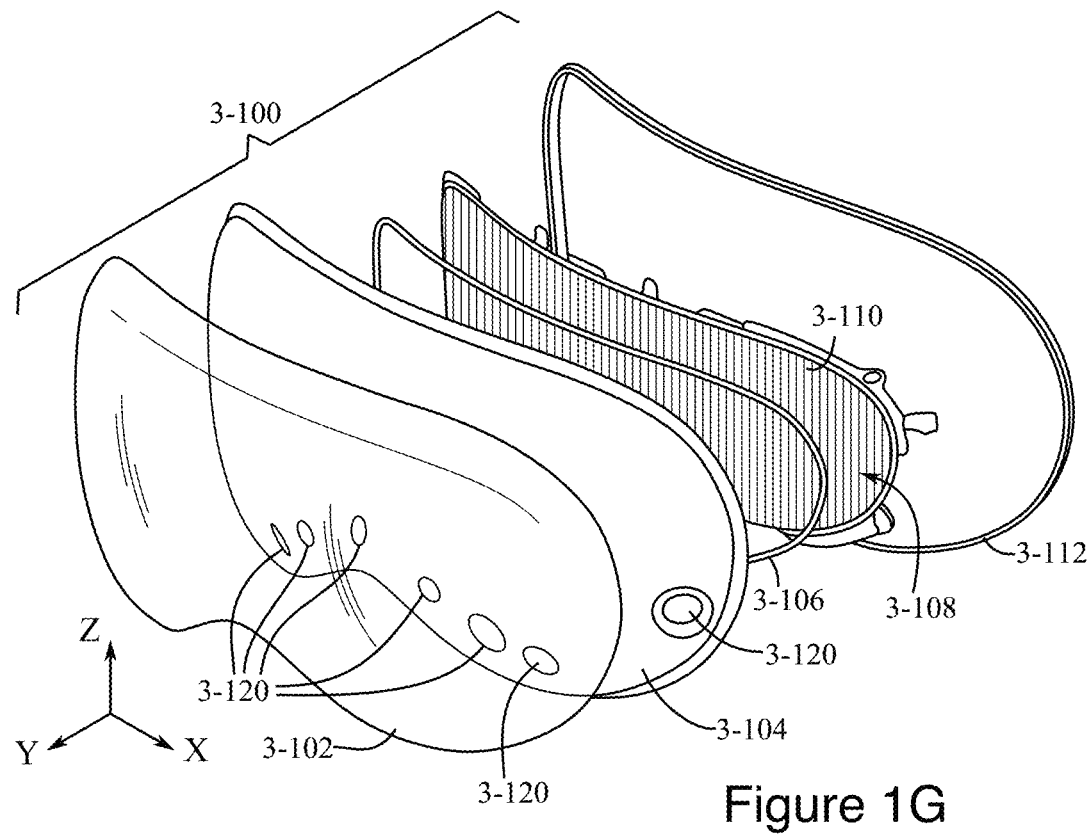
Figure 1H:
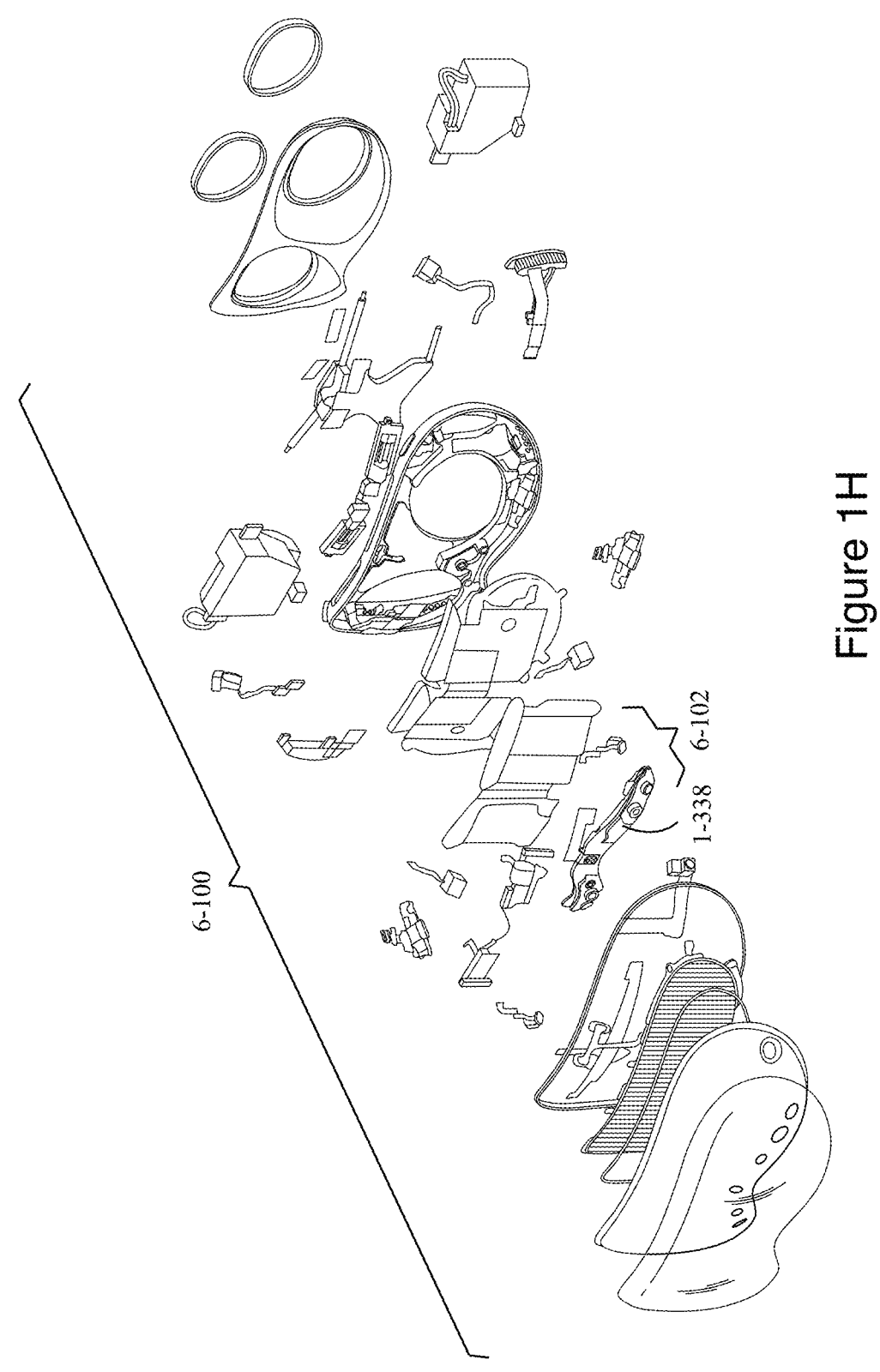
Figure 1I:
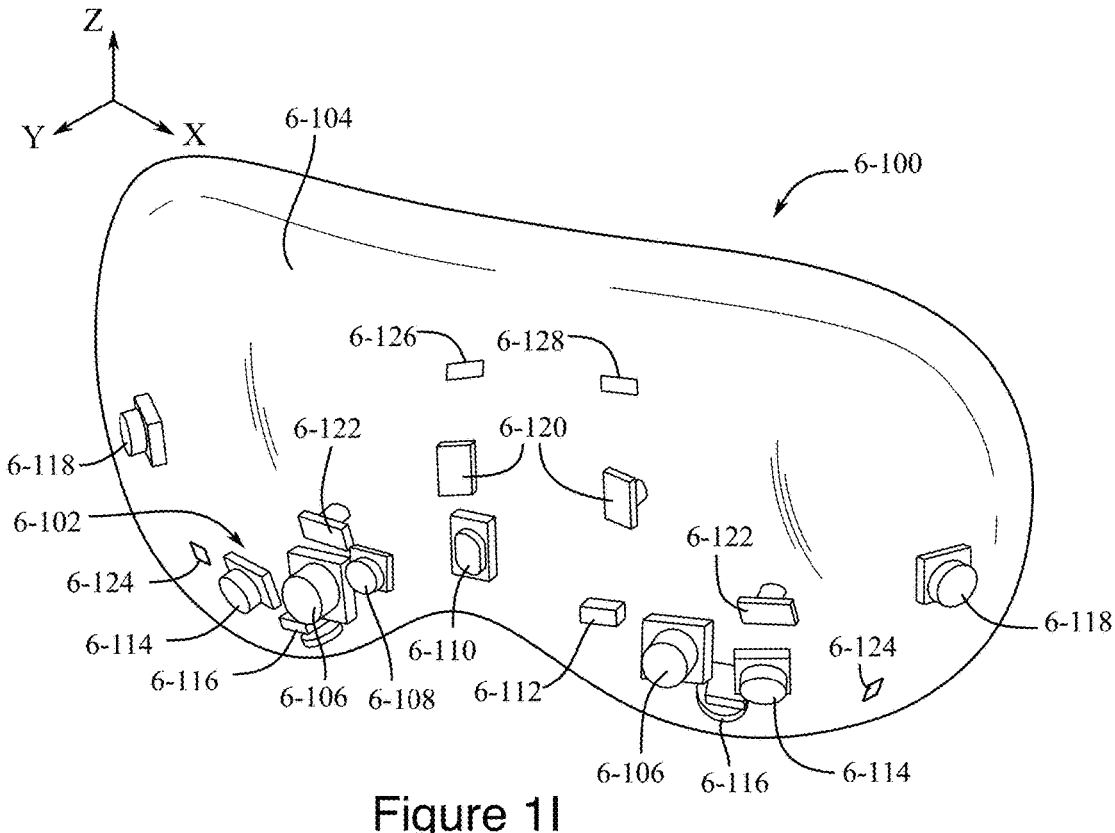
Figure 1J:
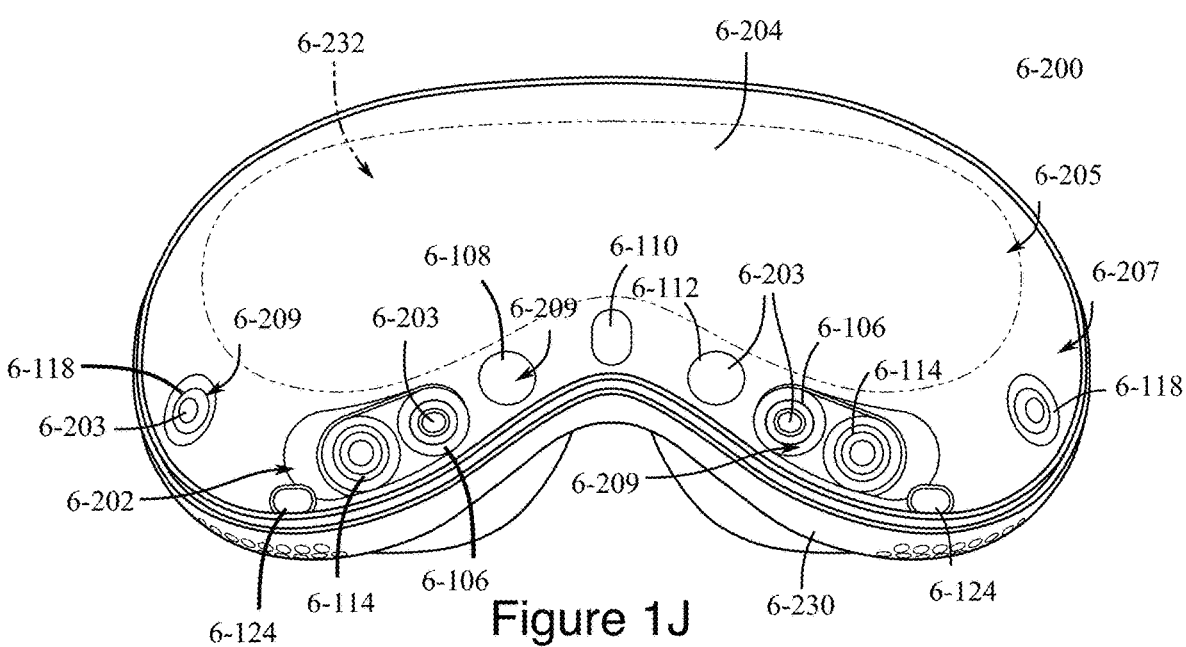
Figure 1K:
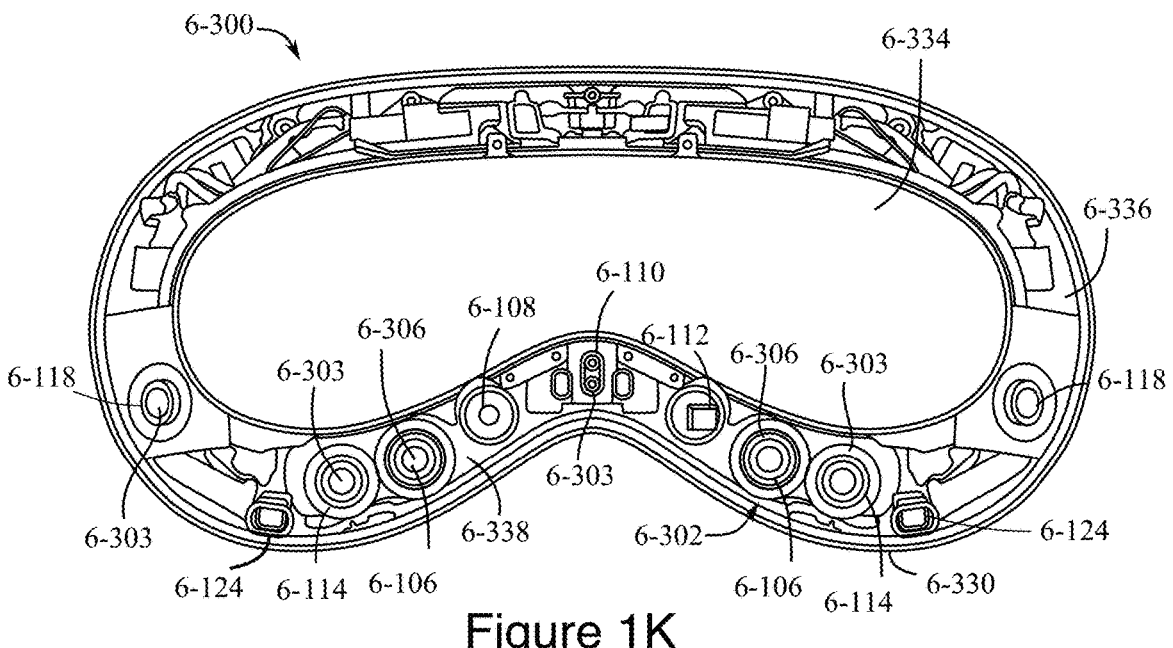
Figure 1L:
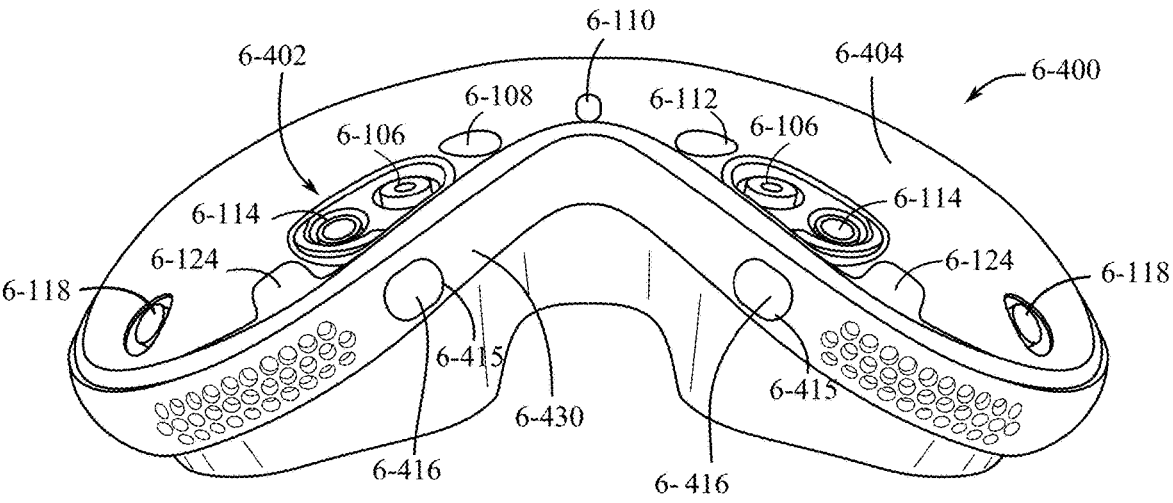
Figure 1M:
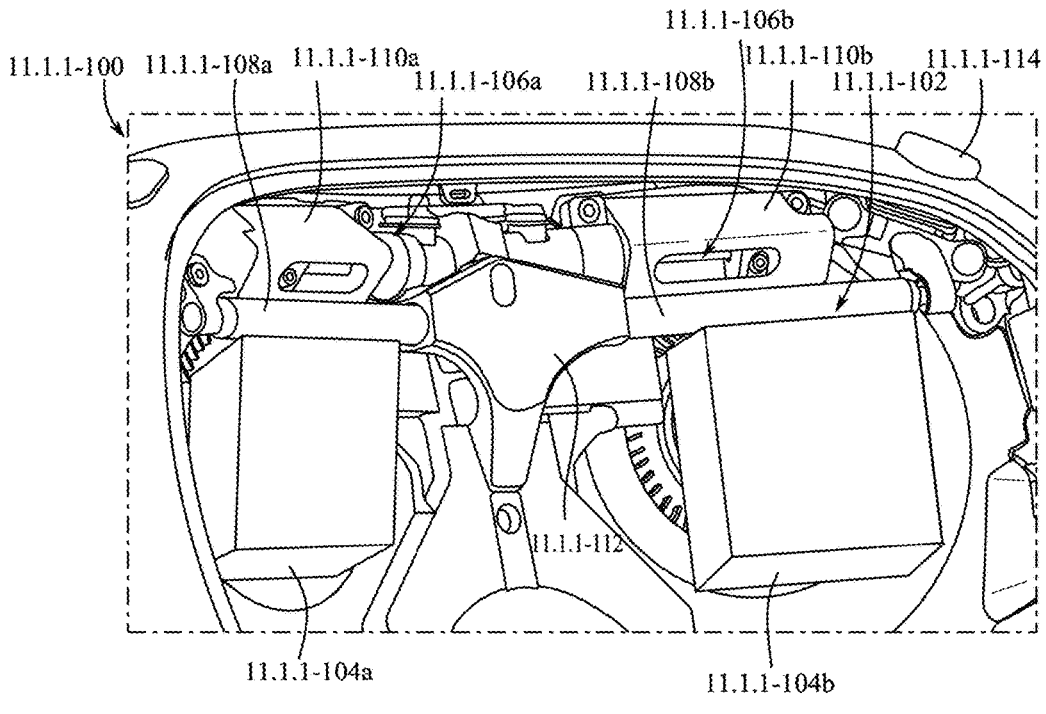
Figure 1N:
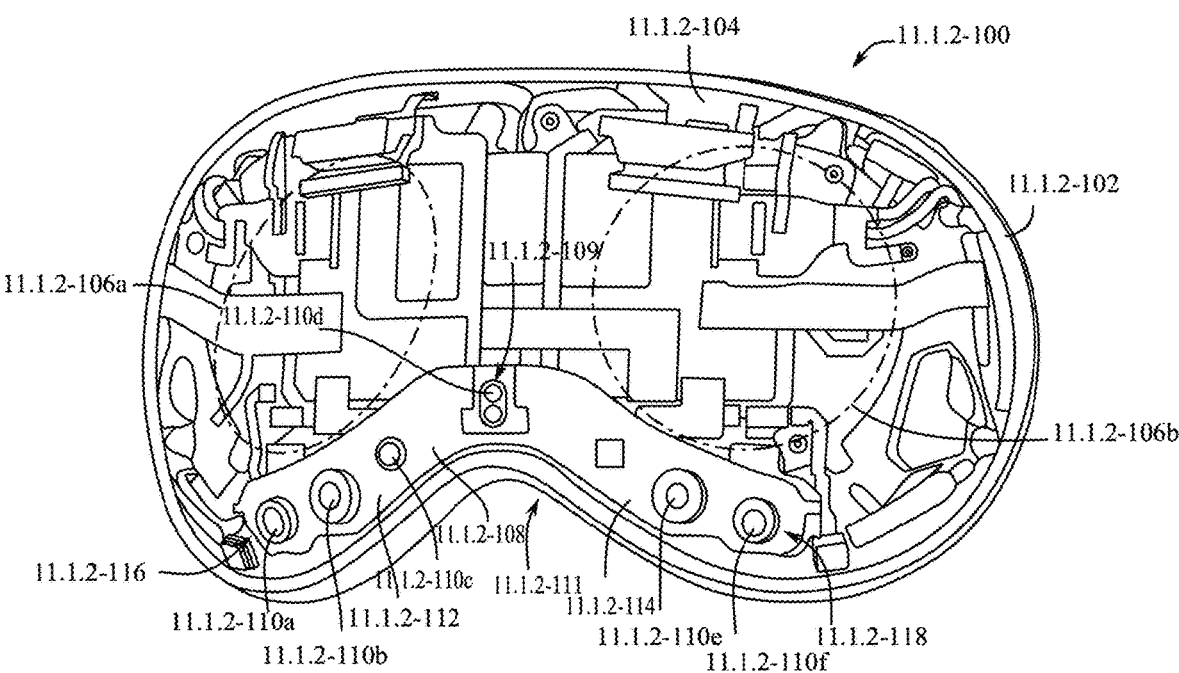
Figure 1O:
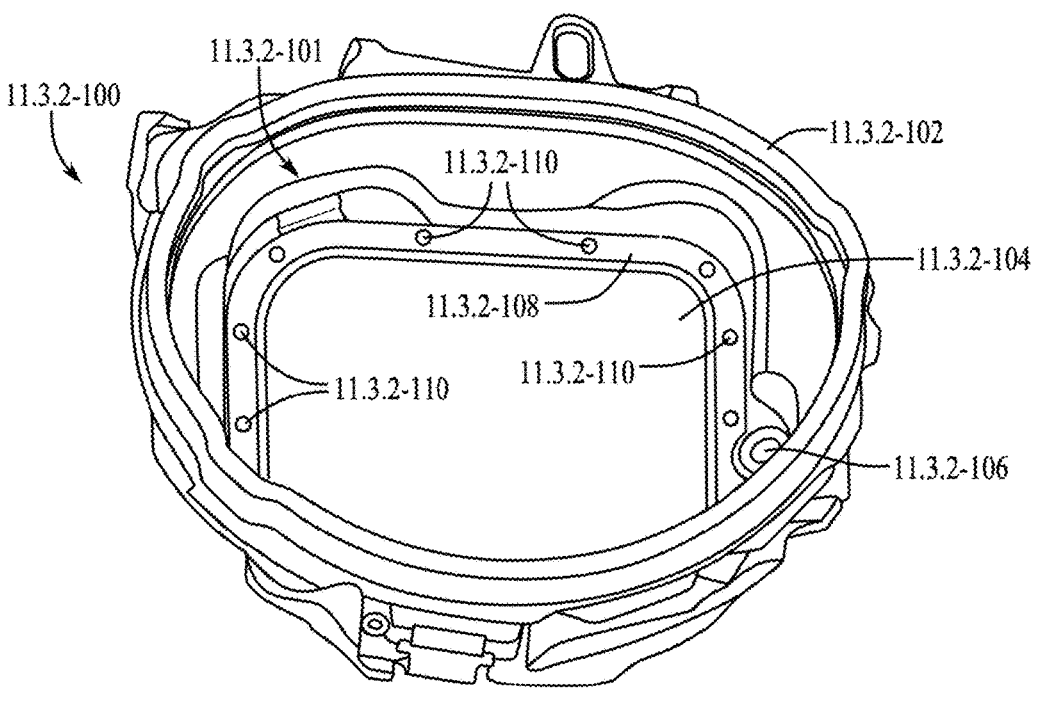
Figure 1P:
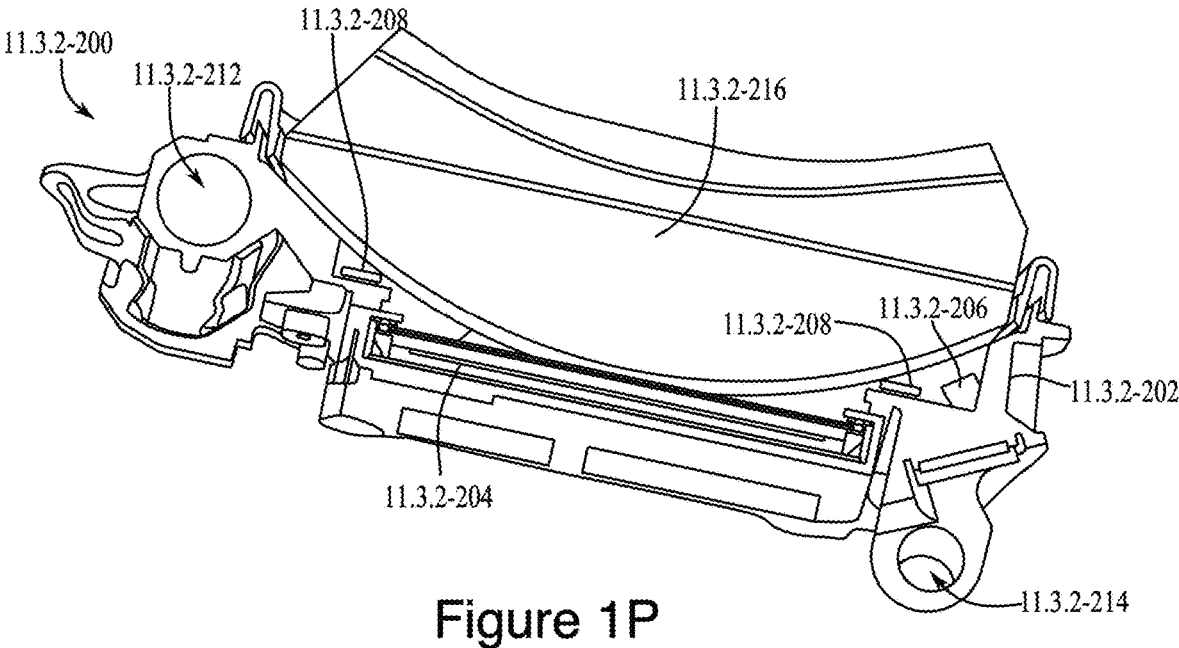

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104a and 11.1.1-104b) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120a, 1-120b and/or first and second optical modules 11.1.1-104a and 11.1.1-104b), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 10) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120a, 1-120b and/or first and second optical modules 11.1.1-104a and 11.1.1-104b).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105a including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105b including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105a and the second electronic strap 1-105b. The straps 1-105a-b and band 1-116 can be coupled via connection mechanisms or assemblies 1-114. In at least one example, the second band 1-117 includes a first end 1-146 coupled to the first electronic strap 1-105a between the first proximal end 1-134 and the first distal end 1-136 and a second end 1-148 coupled to the second electronic strap 1-105b between the second proximal end 1-138 and the second distal end 1-140.

In at least one example, the first and second electronic straps 1-105a-b include plastic, metal, or other structural materials forming the shape the substantially rigid straps 1-105a-b. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105a-b can define internal strap volumes and include one or more electronic components disposed in the internal strap volumes. In one example, as shown in FIG. 1B, the first electronic strap 1-105a can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120a, 1-120b disposed at or in the rearward facing second opening 1-154 defined by the housing 1-150 and/or disposed in the internal volume of the housing 1-150 and configured to project light through the second opening 1-154. In at least one example, each display assembly 1-120a-b can include respective display screens 1-122a, 1-122b configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122a-b can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120a-b. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205a, 1-205b. The first securement strap 1-205a can include a first electronic component 1-212a and the second securement strap 1-205b can include a second electronic component 1-212b. In at least one example, the first and second straps 1-205a-b can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205a-b can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322a, 1-322b disposed between the frame 1-350 and the curtain assembly 1-324.

In at least one example, the display unit 1-306 can also include a motor assembly 1-362 configured as an adjustment mechanism for adjusting the positions of the display screens 1-322a-b of the display assembly 1-320 relative to the frame 1-350. In at least one example, the display assembly 1-320 is mechanically coupled to the motor assembly 1-362, with at least one motor for each display screen 1-322a-b, such that the motors can translate the display screens 1-322a-b to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322a-b.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420a, 1-420b of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 11 illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 11. FIG. 11 shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. For hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 11 can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 11 can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 11.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 11, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 11 and 1K-1L and described herein. Likewise, any of the features, components, and/or parts, including the arrangements and configurations thereof shown and described with reference to FIGS. 11 and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-

108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-

109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 10 illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 10 can be replicated in another (e.g., second) optical module disposed with the HMD to interact (e.g., project light and capture images) of another eye of the user.

Any of the features, components, and/or parts, including the arrangements and configurations thereof shown in FIG. 10 can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 10.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
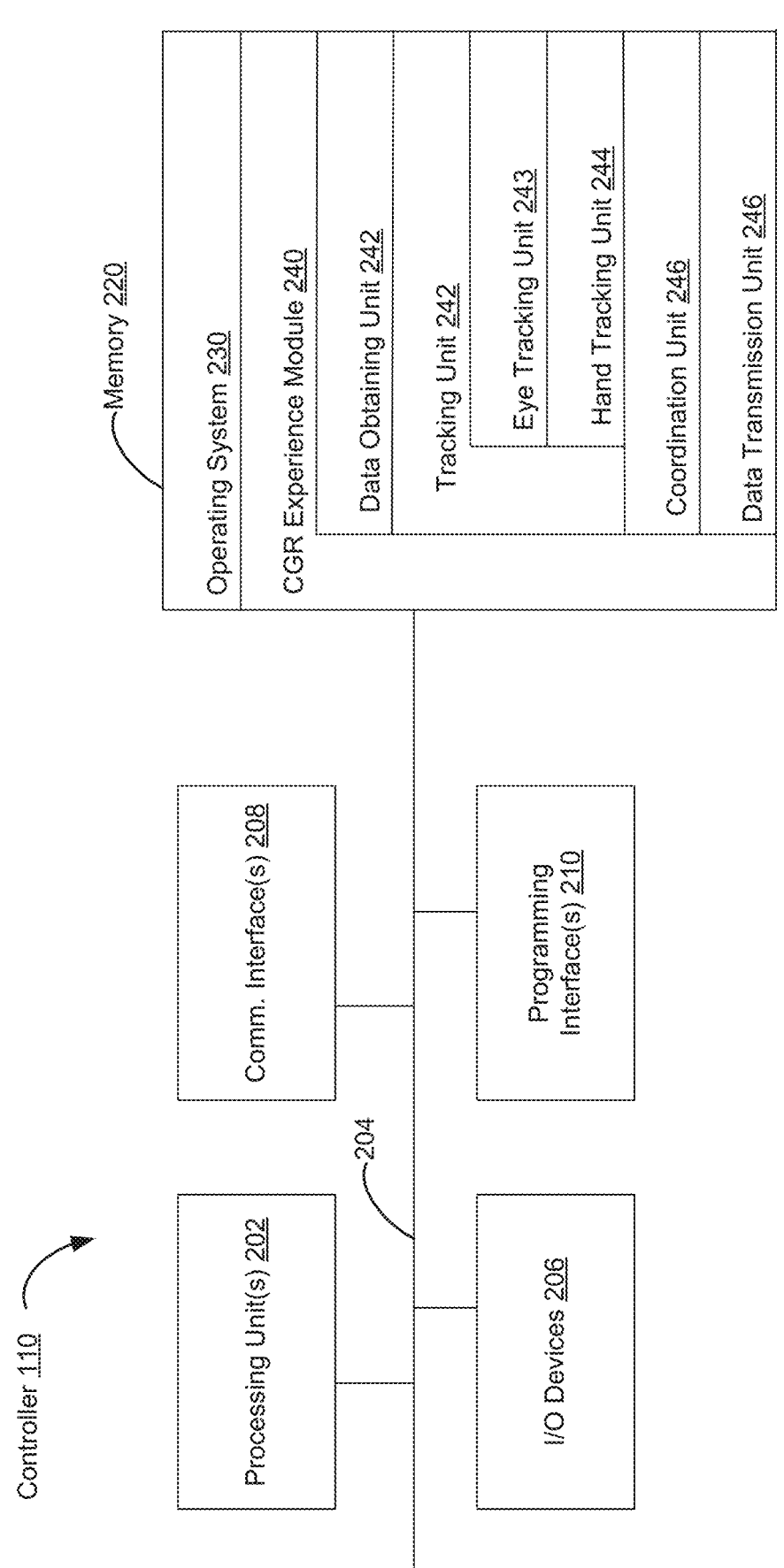
FIG. 2 is a block diagram illustrating a controller of a computer system that is configured to manage and coordinate an XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and an XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 245 and/or eye tracking unit 243. In some embodiments, the hand tracking unit 245 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 245 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 245), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 245), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
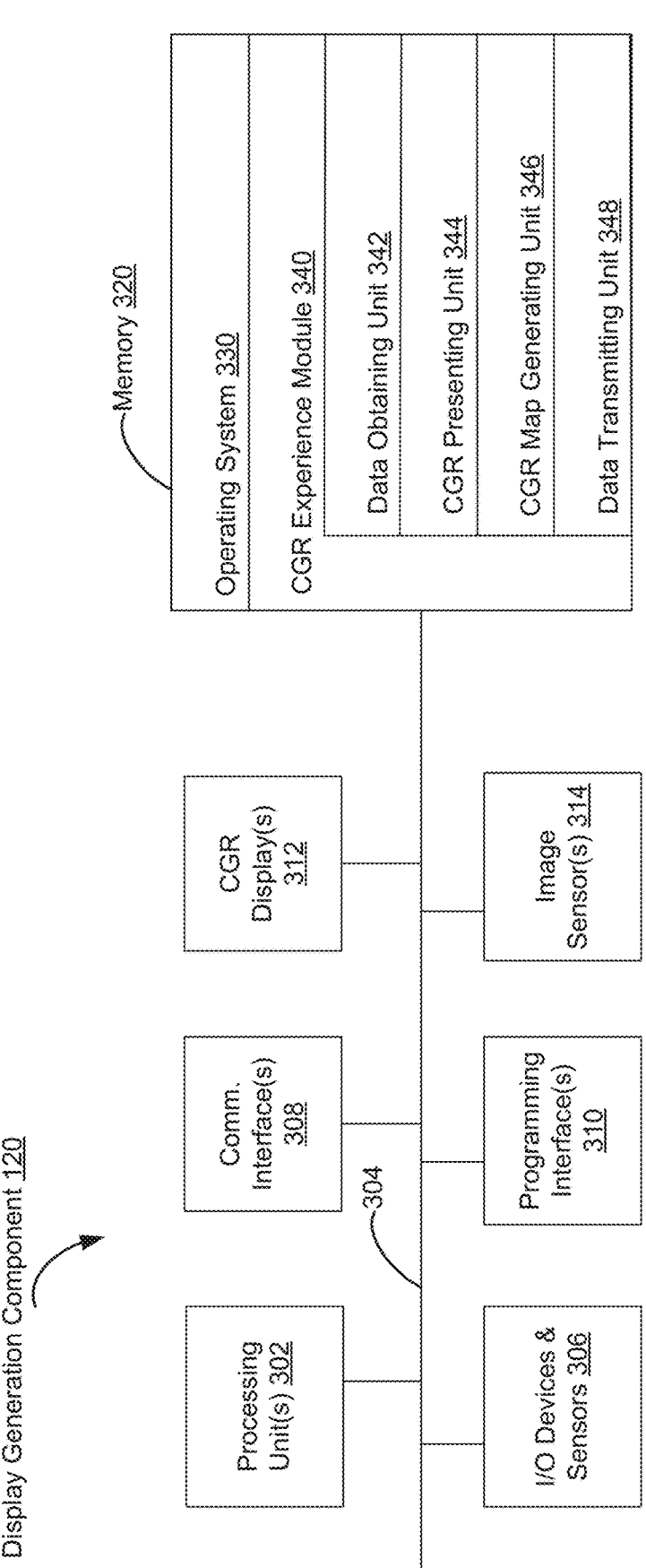
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LcoS), organic light-emitting field-effect transistor (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes an XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and an XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, an XR presenting unit 344, an XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate an XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 4 is a schematic, pictorial illustration of an example embodiment of the hand tracking device 140. In some embodiments, hand tracking device 140 (FIG. 1) is controlled by hand tracking unit 245 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environment of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving their hand 406 and/or changing their hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves their hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and fingertips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture (e.g., an air drag gesture or an air swipe gesture) includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture is performed using a first hand of the user (e.g., a pinch input, a long pinch input, or a pinch and drag input), and, in conjunction with performing the pinch input using the first hand, a second pinch input is performed using the other hand (e.g., the second hand of the user's two hands). In some embodiments, movement between the user's two hands is performed (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user, user inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, wherein the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag (e.g., an air drag gesture or an air swipe gesture) could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, fingertips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
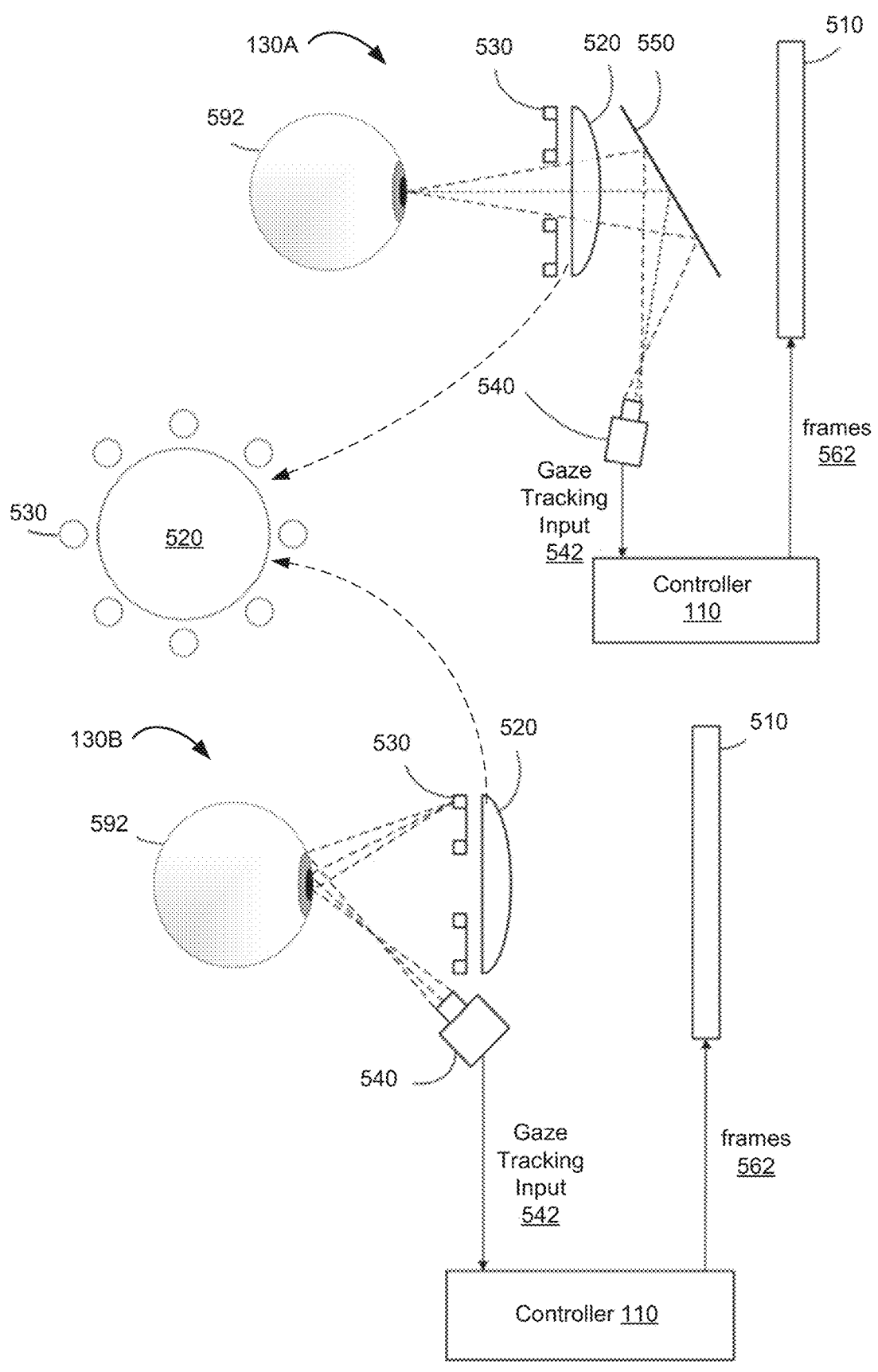
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or an XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to Adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
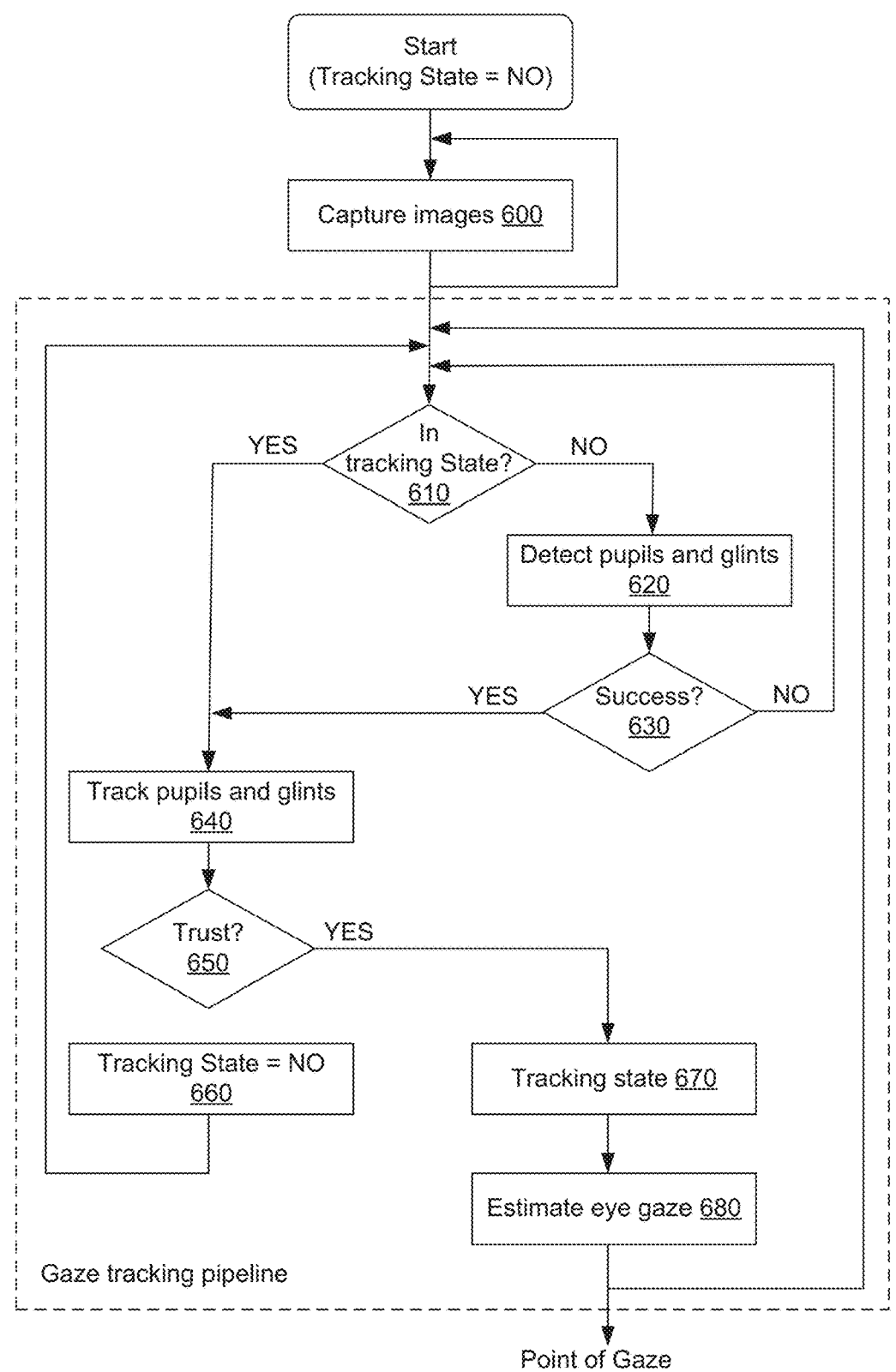
FIG. 6 is a flow diagram illustrating a glint-assisted gaze tracking pipeline in accordance with some embodiments.
Figures 7A, 7B:
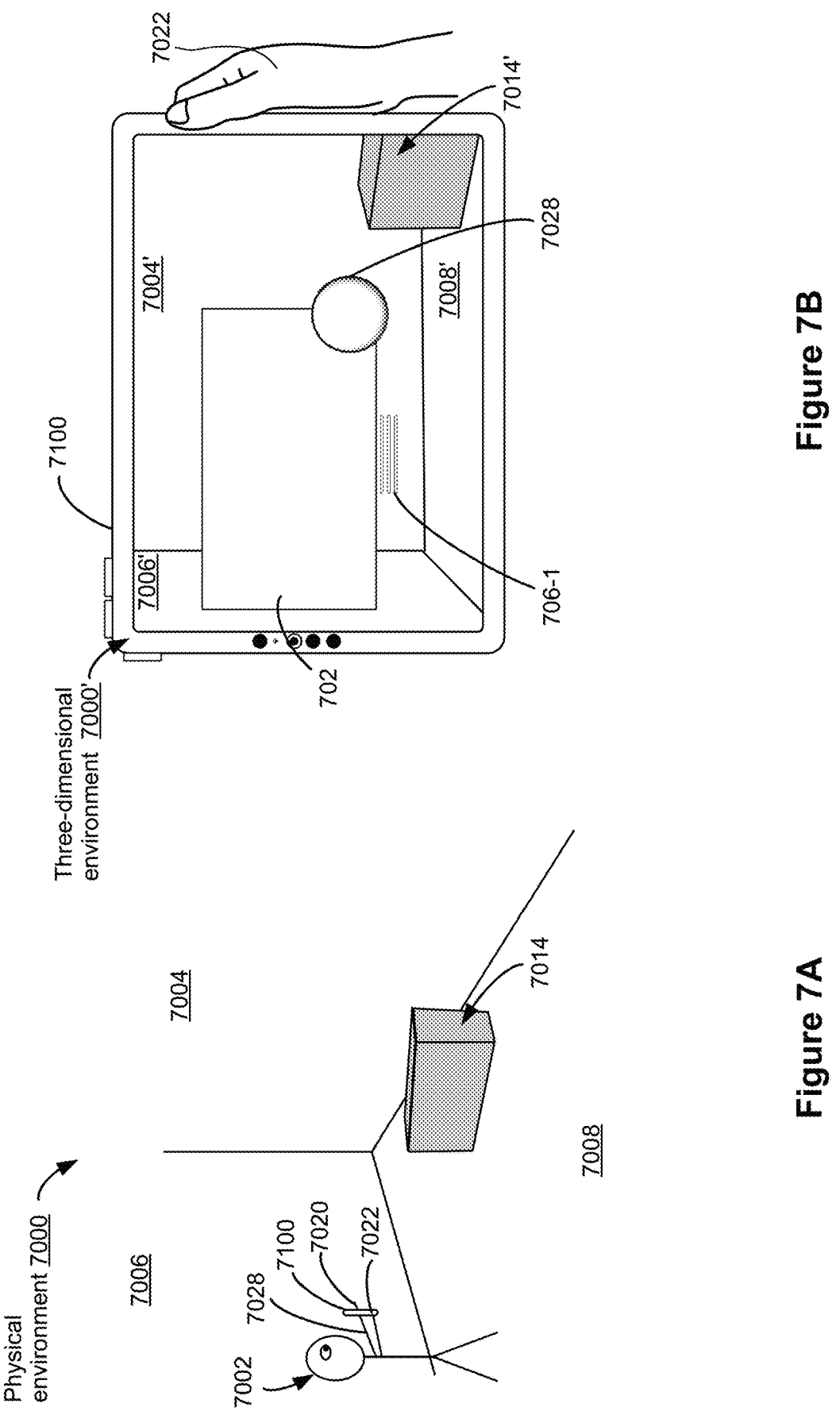
FIGS. 7A-7R illustrate example techniques for conditionally displaying controls for an application window and updating visual properties of the controls in response to user interactions, in accordance with some embodiments.
FIGS. 7BC-7BL illustrate example techniques for closing different applications or groups of applications in a three-dimensional environment in response to different inputs, in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real-world environment 602 are used to provide a XR experience to the user, for example, a mixed reality environment in which one or more virtual objects are superimposed over representations of real-world environment 602.

Thus, the description herein describes some embodiments of three-dimensional environments (e.g., XR environments)

that include representations of real-world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user Interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component, one or more input devices, and optionally one or cameras.

Figure 7C:
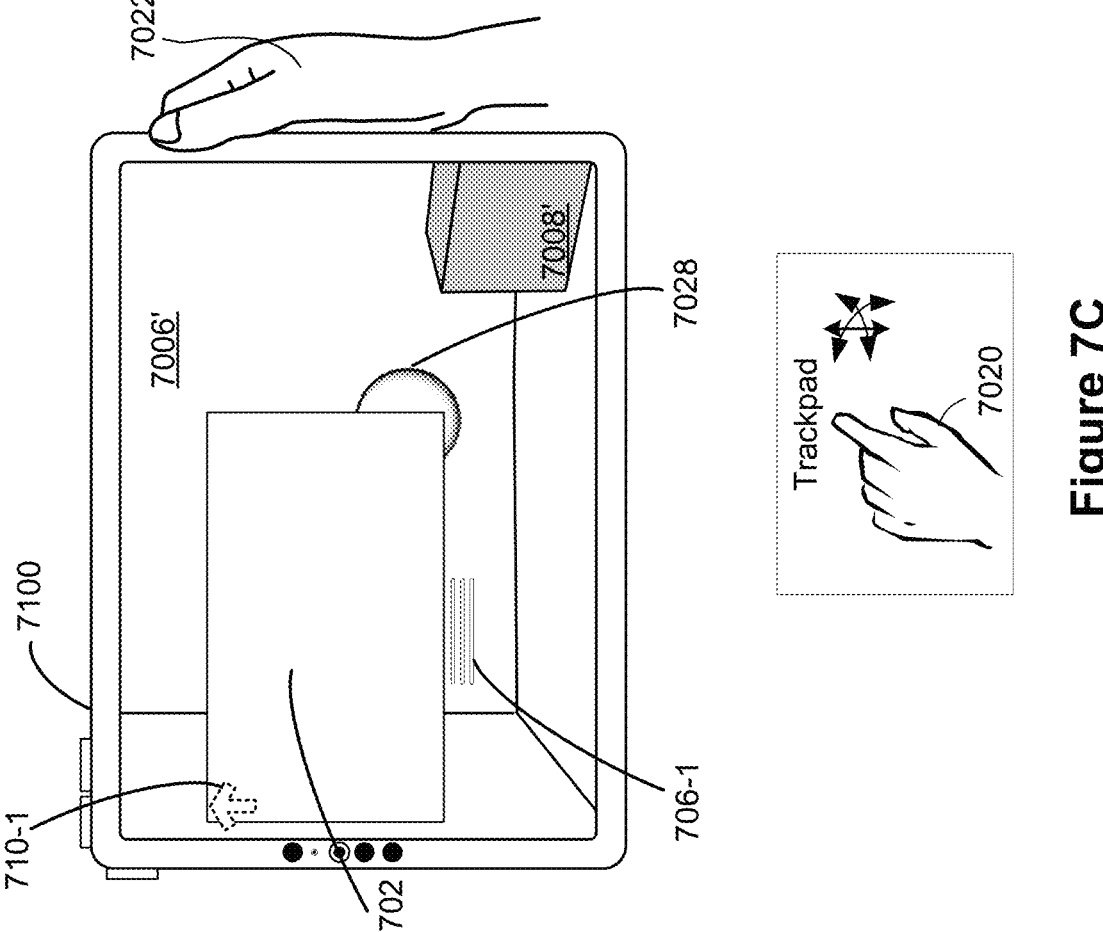

FIGS. 7A-7CH and FIGS. 17A1-17P include illustrations of three-dimensional environments that are visible via a display generation component (e.g., a display generation component 7100, or a display generation component 120) of a computer system (e.g., computer system 101) and interactions that occur in the three-dimensional environments caused by user inputs directed to the three-dimensional environments and/or inputs received from other computer systems and/or sensors. In some embodiments, an input is directed to a virtual object within a three-dimensional environment by a user's gaze detected in the region occupied by the virtual object, or by a hand gesture performed at a location in the physical environment that corresponds to the region of the virtual object. In some embodiments, an input is directed to a virtual object within a three-dimensional environment by a hand gesture that is performed (e.g., optionally, at a location in the physical environment that is independent of the region of the virtual object in the three-dimensional environment) while the virtual object has input focus (e.g., while the virtual object has been selected by a concurrently and/or previously detected gaze input, selected by a concurrently or previously detected pointer input, and/or selected by a concurrently and/or previously detected gesture input). In some embodiments, an input is directed to a virtual object within a three-dimensional environment by an input device that has positioned a focus selector object (e.g., a pointer object or selector object) at the position of the virtual object. In some embodiments, an input is directed to a virtual object within a three-dimensional environment via other means (e.g., voice and/or control button). In some embodiments, an input is directed to a representation of a physical object or a virtual object that corresponds to a physical object by the user's hand movement (e.g., whole hand movement, whole hand movement in a respective posture, movement of one portion of the user's hand relative to another portion of the hand, and/or relative movement between two hands) and/or manipulation with respect to the physical object (e.g., touching, swiping, tapping, opening, moving toward, and/or moving relative to). In some embodiments, the computer system displays some changes in the three-dimensional environment (e.g., displaying additional virtual content, ceasing to display existing virtual content, and/or transitioning between different levels of immersion with which visual content is being displayed) in accordance with inputs from sensors (e.g., image sensors, temperature sensors, biometric sensors, motion sensors, and/or proximity sensors) and contextual conditions (e.g., location, time, and/or presence of others in the environment). In some embodiments, the computer system displays some changes in the three-dimensional environment (e.g., displaying additional virtual content, ceasing to display existing virtual content, and/or transitioning between different levels of immersion with which visual content is being displayed) in accordance with inputs from other computers used by other users that are sharing the computer-generated environment with the user of the computer system (e.g., in a shared computer-generated experience, in a shared virtual environment, and/or in a shared virtual or augmented reality environment of a communication session). In some embodiments, the computer system displays some changes in the three-dimensional environment (e.g., displaying movement, deformation, and/or changes in visual characteristics of a user interface, a virtual surface, a user interface object, and/or virtual scenery) in accordance with inputs from sensors that detect movement of other persons and objects and movement of the user that may not qualify as a recognized gesture input for triggering an associated operation of the computer system.

In some embodiments, a three-dimensional environment that is visible via a display generation component described herein is a virtual three-dimensional environment that includes virtual objects and content at different virtual positions in the three-dimensional environment without a representation of the physical environment. In some embodiments, the three-dimensional environment is a mixed reality environment that displays virtual objects at different virtual positions in the three-dimensional environment that are constrained by one or more physical aspects of the physical environment (e.g., positions and orientations of walls, floors, surfaces, direction of gravity, time of day, and/or spatial relationships between physical objects). In some embodiments, the three-dimensional environment is an augmented reality environment that includes a representation of the physical environment. In some embodiments, the representation of the physical environment includes respective representations of physical objects and surfaces at different positions in the three-dimensional environment, such that the spatial relationships between the different physical objects and surfaces in the physical environment are reflected by the spatial relationships between the representations of the physical objects and surfaces in the three-dimensional environment. In some embodiments, when virtual objects are placed relative to the positions of the representations of physical objects and surfaces in the three-dimensional environment, they appear to have corresponding spatial relationships with the physical objects and surfaces in the physical environment. In some embodiments, the computer system transitions between displaying the different types of environments (e.g., transitions between presenting a computer-generated environment or experience with different levels of immersion, adjusting the relative prominence of audio/visual sensory inputs from the virtual content and from the representation of the physical environment) based on user inputs and/or contextual conditions.

In some embodiments, the display generation component includes a pass-through portion in which the representation of the physical environment is displayed or visible. In some embodiments, the pass-through portion of the display generation component is a transparent or semi-transparent (e.g., see-through) portion of the display generation component revealing at least a portion of a physical environment surrounding and within the field of view of a user (sometimes called "optical passthrough"). For example, the pass-through portion is a portion of a head-mounted display or heads-up display that is made semi-transparent (e.g., less than 50%, 40%, 30%, 20%, 15%, 10%, or 5% of opacity) or transparent, such that the user can see through it to view the real world surrounding the user without removing the head-mounted display or moving away from the heads-up display. In some embodiments, the pass-through portion gradually transitions from semi-transparent or transparent to fully opaque when displaying a virtual or mixed reality environment. In some embodiments, the pass-through portion of the display generation component displays a live feed of images or video of at least a portion of physical environment captured by one or more cameras (e.g., rear facing camera(s) of a mobile device or associated with a head-mounted display, or other cameras that feed image data to the computer system) (sometimes called "digital passthrough"). In some embodiments, the one or more cameras point at a portion of the physical environment that is directly in front of the user's eyes (e.g., behind the display generation component relative to the user of the display generation component). In some embodiments, the one or more cameras point at a portion of the physical environment that is not directly in front of the user's eyes (e.g., in a different physical environment, or to the side of or behind the user).

In some embodiments, when displaying virtual objects at positions that correspond to locations of one or more physical objects in the physical environment (e.g., at positions in a virtual reality environment, a mixed reality environment, or an augmented reality environment), at least some of the virtual objects are displayed in place of (e.g., replacing display of) a portion of the live view (e.g., a portion of the physical environment captured in the live view) of the cameras. In some embodiments, at least some of the virtual objects and content are projected onto physical surfaces or empty space in the physical environment and are visible through the pass-through portion of the display generation component (e.g., viewable as part of the camera view of the physical environment, or through the transparent or semi-transparent portion of the display generation component). In some embodiments, at least some of the virtual objects and virtual content are displayed to overlay a portion of the display and block the view of at least a portion of the physical environment visible through the transparent or semi-transparent portion of the display generation component.

In some embodiments, the display generation component displays different views of the three-dimensional environment in accordance with user inputs or movements that change the virtual position of the viewpoint of the currently displayed view of the three-dimensional environment relative to the three-dimensional environment. In some embodiments, when the three-dimensional environment is a virtual environment, the viewpoint moves in accordance with navigation or locomotion requests (e.g., in-air hand gestures, and/or gestures performed by movement of one portion of the hand relative to another portion of the hand) without requiring movement of the user's head, torso, and/or the display generation component in the physical environment. In some embodiments, movement of the user's head and/or torso, and/or the movement of the display generation component or other location sensing elements of the computer system (e.g., due to the user holding the display generation component or wearing the HMD), relative to the physical environment, cause corresponding movement of the viewpoint (e.g., with corresponding movement direction, movement distance, movement speed, and/or change in orientation) relative to the three-dimensional environment, resulting in corresponding change in the currently displayed view of the three-dimensional environment. In some embodiments, when a virtual object has a preset spatial relationship relative to the viewpoint (e.g., is anchored or fixed to the viewpoint), movement of the viewpoint relative to the three-dimensional environment would cause movement of the virtual object relative to the three-dimensional environment while the position of the virtual object in the field of view is maintained (e.g., the virtual object is said to be head locked). In some embodiments, a virtual object is body-locked to the user, and moves relative to the three-dimensional environment when the user moves as a whole in the physical environment (e.g., carrying or wearing the display generation component and/or other location sensing component of the computer system), but will not move in the three-dimensional environment in response to the user's head movement alone (e.g., the display generation component and/or other location sensing component of the computer system rotating around a fixed location of the user in the physical environment). In some embodiments, a virtual object is, optionally, locked to another portion of the user, such as a user's hand or a user's wrist, and moves in the three-dimensional environment in accordance with movement of the portion of the user in the physical environment, to maintain a preset spatial relationship between the position of the virtual object and the virtual position of the portion of the user in the three-dimensional environment. In some embodiments, a virtual object is locked to a preset portion of a field of view provided by the display generation component, and moves in the three-dimensional environment in accordance with the movement of the field of view, irrespective of movement of the user that does not cause a change of the field of view.

In some embodiments, as shown in FIGS. 7A-7CH and 17A2-17P, the views of a three-dimensional environment sometimes do not include representation(s) of a user's hand(s), arm(s), and/or wrist(s). In some embodiments, the representation(s) of a user's hand(s), arm(s), and/or wrist(s) are included in the views of a three-dimensional environment. In some embodiments, the representation(s) of a user's hand(s), arm(s), and/or wrist(s) are included in the views of a three-dimensional environment as part of the representation of the physical environment provided via the display generation component. In some embodiments, the representations are not part of the representation of the physical environment and are separately captured (e.g., by one or more cameras pointing toward the user's hand(s), arm(s), and wrist(s)) and displayed in the three-dimensional environment independent of the currently displayed view of the three-dimensional environment. In some embodiments, the representation(s) include camera images as captured by one or more cameras of the computer system(s), or stylized versions of the arm(s), wrist(s) and/or hand(s) based on information captured by various sensors). In some embodiments, the representation(s) replace display of, are overlaid on, or block the view of, a portion of the representation of the physical environment. In some embodiments, when the display generation component does not provide a view of a physical environment, and provides a completely virtual environment (e.g., no camera view and no transparent passthrough portion), real-time visual representations (e.g., stylized representations or segmented camera images) of one or both arms, wrists, and/or hands of the user are, optionally, still displayed in the virtual environment. In some embodiments, if a representation of the user's hand is not provided in the view of the three-dimensional environment, the position that corresponds to the user's hand is optionally indicated in the three-dimensional environment, e.g., by the changing appearance of the virtual content (e.g., through a change in translucency and/or simulated reflective index) at positions in the three-dimensional environment that correspond to the location of the user's hand in the physical environment. In some embodiments, the representation of the user's hand or wrist is outside of the currently displayed view of the three-dimensional environment while the virtual position in the three-dimensional environment that corresponds to the location of the user's hand or wrist is outside of the current field of view provided via the display generation component; and the representation of the user's hand or wrist is made visible in the view of the three-dimensional environment in response to the virtual position that corresponds to the location of the user's hand or wrist being moved within the current field of view due to movement of the display generation component, the user's hand or wrist, the user's head, and/or the user as a whole.

FIGS. 7A-7R illustrate examples of displaying window controls for a virtual object (e.g., an application window and/or three-dimensional object). FIG. 8 is a flow diagram of an exemplary method 800 for conditionally displaying window controls. FIG. 9 is a flow diagram of an exemplary method 900 for updating visual properties of window controls in response to user interactions. The user interfaces in FIGS. 7A-7R are used to illustrate the processes described below, including the processes in FIGS. 8 and 9.

FIG. 7A illustrates a view of a physical environment that includes a user 7002 interacting with a display generation component 7100. In the examples described below, the user 7002 uses one or both of their two hands, a hand 7020 and a hand 7022 to provide inputs or instructions to a computer system. In some of the examples described below, the computer system also uses the position or movement of an arm of the user, such as the user's left arm 7028, which is connected to the user's left hand 7020, as part of an input provided by the user to the computer system. A physical environment 7000 includes a physical object 7014, and physical walls 7004 and 7006. The physical environment 7000 further includes a physical floor 7008.

As shown in the examples in FIGS. 7A-7CH and 17A2-17P, display generation component 7100 of computer system 101 is a touchscreen held by user 7002. In some embodiments, the display generation component of computer system 101 is a head mounted display (e.g., head mounted display 7100a, as shown in FIGS. 7F2-7F3, 7K1-7K2, 7T2-7T3, 7AD2-7AD3, 7AN2-7AN3, 7AU2-7AU3, 7BA2-7BA3, 7BD2-7BD3, 7BM2-7BN2 and 17A1-17B1) worn on user 7002's head (e.g., what is shown in FIGS. 7A-7CH and 17A2-17P as being visible via display generation component 7100 of computer system 101 corresponds to user 7002's field of view when wearing a head mounted display). In some embodiments, the display generation component is a standalone display, a projector, or another type of display. In some embodiments, the computer system is in communication with one or more input devices, including cameras or other sensors and input devices that detect movement of the user's hand(s), movement of the user's body as whole, and/or movement of the user's head in the physical environment. In some embodiments, the one or more input devices detect the movement and the current postures, orientations, and positions of the user's hand(s), face, and/or body as a whole. For example, in some embodiments, while the user's hand 7020 is within the field of view of the one or more sensors of HMD 7100a (e.g., within the field of view of the user), a representation of the user's hand 7020' is displayed in the user interface displayed (e.g., as a passthrough representation and/or as a virtual representation of the user's hand 7020) on the display of HMD 7100a. in some embodiments, while the user's hand 7022 is within the field of view of the one or more sensors of HMD 7100a (e.g., within the field of view of the user), a representation of the user's hand 7022' is displayed in the user interface displayed (e.g., as a passthrough representation and/or as a virtual representation of the user's hand 7022) on the display of HMD 7100a. In some embodiments, the user's hand 7020 and/or the user's hand 7022 are used to perform one or more gestures (e.g., one or more air gestures), optionally in combination with a gaze input. In some embodiments, the one or more gestures performed with the user's hand(s) 7020 and/or 7022 include a direct air gesture input that is based on a position of the representation of the user's hand(s) 7020' and/or 7022' displayed within the user interface on the display of HMD 7100a. For example, a direct air gesture input is determined as being directed to a user interface object displayed at a position that intersects with the displayed position of the representation of the user's hand(s) 7020' and/or 7022' in the user interface. In some embodiments, the one or more gestures performed with the user's hand(s) 7020 and/or 7022 include an indirect air gesture input that is based on a virtual object displayed at a position that corresponds a position at which the user's attention is currently detected (e.g., and/or is optionally not based on a position of the representation of the user's hand(s) 7020' and/or 7022' displayed within the user interface). For example, an indirect air gesture is performed with respect to a user interface object while detecting the user's attention (e.g., based on gaze or other indication of user attention) on the user interface object, such as a gaze and pinch (e.g., or other gesture performed with the user's hand).

In some embodiments, user inputs are detected via a touch-sensitive surface or touchscreen. In some embodiments, the one or more input devices include an eye tracking component that detects location and movement of the user's gaze. In some embodiments, the display generation component, and optionally, the one or more input devices and the computer system, are parts of a head-mounted device that moves and rotates with the user's head in the physical environment, and changes the viewpoint of the user in the three-dimensional environment provided via the display generation component. In some embodiments, the display generation component is a heads-up display that does not move or rotate with the user's head or the user's body as a whole, but, optionally, changes the viewpoint of the user in the three-dimensional environment in accordance with the movement of the user's head or body relative to the display generation component. In some embodiments, the display generation component (e.g., a touchscreen) is optionally moved and rotated by the user's hand relative to the physical environment or relative to the user's head, and changes the viewpoint of the user in the three-dimensional environment in accordance with the movement of the display generation component relative to the user's head or face or relative to the physical environment.

In some embodiments, the display generation component 7100 comprises a head mounted display (HMD) 7100a. For example, as illustrated in FIG. 7F2 (e.g., and FIGS. 7K1, 7T2, 7AD2, 7AN2, 7AU2, 7BA2, 7BD2, and 7BM2-7BN2), the head mounted display 7100a includes one or more displays that displays a representation of a portion of the three-dimensional environment 7000' that corresponds to the perspective of the user, while an HMD typically includes multiple displays including a display for a right eye and a separate display for a left eye that display slightly different images to generate user interfaces with stereoscopic depth, in the figures a single image is shown that corresponds to the image for a single eye and depth information is indicated with other annotations or description of the figures. In some embodiments, HMD 7100a includes one or more sensors (e.g., one or more interior- and/or exterior-facing image sensors 314), such as sensor 7101a, sensor 7101b and/or sensor 7101c for detecting a state of the user, including facial and/or eye tracking of the user (e.g., using one or more inward-facing sensors 7101a and/or 7101b) and/or tracking hand, torso, or other movements of the user (e.g., using one or more outward-facing sensors 7101c). In some embodiments, HMD 7100a includes one or more input devices that are optionally located on a housing of HMD 7100a, such as one or more buttons, trackpads, touchscreens, scroll wheels, digital crowns that are rotatable and depressible or other input devices. In some embodiments input elements are mechanical input elements, in some embodiments input elements are solid state input elements that respond to press inputs based on detected pressure or intensity. For example, in FIGS. 7F2 (e.g., and FIGS. 7K1, 7T2, 7AD2, 7AN2, 7AU2, 7BA2, 7BD2, and 7BM2-7BN2), HMD 7100a includes one or more of button 701a, button 701b and digital crown 703 for providing inputs to HMD 7100a. It will be understood that additional and/or alternative input devices may be included in HMD 7100a.

FIG. 7F3 (e.g., and FIGS. 7K2, 7T3, 7AD3, 7AN3, 7AU3, 7BA3 and 7BD3) illustrates a top-down view of the user 7002 in the physical environment 7000. For example, the user 7002 is wearing HMD 7100a, such that the user's hand(s) 7020 and/or 7022 (e.g., that are optionally used to provide air gestures or other user inputs) are physically present within the physical environment 7000 behind the display of HMD 7100a.

FIG. 7F2 (e.g., and FIGS. 7K1, 7T2, 7AD2, 7AN2, 7AU2, 7BA2, 7BD2, and 7BM2-7BN2) illustrates an alternative display generation component of the computer system than the display illustrated in FIGS. 7A-7E, 7G-7J, 7L-7T1, 7U-7AD1, 7AE-7AN1, 7AO-7U1, 7V-7BA1, 7BC-7BD1, 7BL-7N1 and 7B0-7CH. It will be understood that the processes, features and functions described herein with reference to the display generation component 7100 described in 7A-7E, 7G-7J, 7L-7T1, 7U-7AD1, 7AE-7AN1, 7AO-7U1, 7V-7BA1, 7BC-7BD1, 7BL-7N1 and 7B0-7CH are also applicable to HMD 7100a, illustrated in FIGS.

7F2-7F3, 7K1-7K2, 7T2-7T3, 7AD2-7AD3, 7AN2-7AN3, 7AU2-7AU3, 7BA2-7BA3, 7BD2-7BD3, and 7BM2-7BN2.

As shown in FIG. 7B, the computer system (e.g., display generation component 7100) displays a view of a three-dimensional environment (e.g., an environment 7000', a virtual three-dimensional environment, an augmented reality environment, a pass-through view of a physical environment, or a camera view of a physical environment). In some embodiments, the three-dimensional environment is a virtual three-dimensional environment without a representation of the physical environment 7000. In some embodiments, the three-dimensional environment is a mixed reality environment that is a virtual environment that is augmented by sensor data corresponding to the physical environment. In some embodiments, the three-dimensional environment is an augmented reality environment that includes one or more virtual objects (e.g., an application window 702 and/or a virtual object 7028) and a representation of at least a portion of a physical environment (e.g., representations 7004', 7006' of walls, a representation 7008' of a floor, and/or a representation 7014' of a physical object 7014 in the physical environment 7000) surrounding the display generation component 7100. In some embodiments, the representation of the physical environment includes a camera view of the physical environment. In some embodiments, the representation of the physical environment includes a view of the physical environment through a transparent or semitransparent portion of the first display generation component.

In some embodiments, the application window 702 is displayed in a first view of the three-dimensional environment 7000' at a first position. In some embodiments, the application window 702 is associated with a first application that is executing on the computer system. For example, the application window 702 displays content for the first application. In some embodiments, the application window 702 is displayed with a first horizontal position, a first vertical position, and a first depth, or a perceived distance from the user, (e.g., a position defined by an x-axis, a y-axis, and a z-axis) within the first view of the three-dimensional environment 7000'. In some embodiments, the application window 702 is locked (also referred to as anchored) to the three-dimensional environment, such that as the field of view of the three-dimensional environment changes, the application window 702 is maintained at its position within the three-dimensional environment.

In embodiments where the display generation component 7100 of computer system 101 is a head-mounted display, the application window 702 would be displayed in a peripheral region of a field of view of the user's eyes while looking at the three-dimensional environment via the display generation component.

In some embodiments, the user is enabled to move a position of the application window 702 to place it in a different position in the three-dimensional environment 7000', such that the application window 702 becomes locked to the new position in the three-dimensional environment. For example, the grabber 706-1 is a selectable user interface object for the application window 702 that, when selected by the user (e.g., using gaze and/or gestures, such as air gestures), enables the user to reposition the application window 702 within the three-dimensional environment 7000'. In some embodiments, the grabber 706-1 is displayed along a bottom-center edge of the application window 702. In some embodiments, the grabber 706-1 is displayed at a different position relative to application window 702. In some embodiments, a shape and/or size of the grabber bar changes based on a size of the application window 702. For example, a size of grabber 706-1 increases and/or decreases as a size of the application window 702 increases and/or decreases. In some embodiments, the application window 702 is a two-dimensional object (e.g., the application window 702 appears flat from the viewpoint of the user).

In some embodiments, the grabber 706-1 is automatically, and without user input, displayed with the application window 702 while application window 702 is displayed in the three-dimensional environment. In some embodiments, the grabber 706-1 is only displayed while the user's attention is directed to the application window 702 and disappears in response to the user's attention moving away from the application window 702. In some embodiments, the grabber 706-1 is displayed in response to detecting the user's gaze at a bottom center portion, or other predefined portion, of application window 702.

FIG. 7B further illustrates a virtual object 7028 that optionally does not correspond to a physical object in the physical environment. In some embodiments, the virtual object 7028 is a three-dimensional object, such as a ball. In some embodiments, the virtual object 7028 is associated with a second application, distinct from the first application associated with the application window 702. In some embodiments, the first application associated with the application window 702 and/or the second application associated with the virtual object 7028 is a system application (e.g., associated with an operating system) of the computer system or is an application associated with a third-party that is executed by the computer system.

FIG. 7C illustrates the computer system detecting a user's attention 710-1 (e.g., a user's gaze) directed to a top left corner, or an area surrounding the top left corner (e.g., within a predefined area that overlaps the top left corner), of the application window 702. In some embodiments, the user's attention 710-1 is detected as a gaze input. In some embodiments, the display generation component 7100 optionally displays an indication (e.g., a cursor or other user interface object) that corresponds to the detected user's gaze input, such that the indication moves within the display area of the display generation component 7100 in accordance with movement of the user's gaze. In some embodiments, the user's attention 710-1 is detected as another type of input, such as an air gesture. In some embodiments, the user's attention 710-1 represents a position of a cursor (e.g., or other visual indicator) associated with an input device (e.g., controlled by the user's hand instead of the user's gaze). In some embodiments, in accordance with a determination that the user's attention is directed to at least a portion of the application window 702, the application window 702 is displayed in front of (e.g., closer to the user than) the virtual object 7028. For example, the computer system optionally visually deemphasizes the virtual object 7028 by dimming the virtual object 7028, pushing the virtual object 7028 back (e.g., further away from the viewpoint of the user 7002) within the three-dimensional environment 7000', and/or decreasing a size of the virtual object 7028. For example, the computer system automatically changes a perceived depth of respective objects in accordance with the detected user's attention.

In some embodiments, in response to detecting the user's attention 710-1 directed to the top left corner of the application window 702, the computer system displays a close affordance 7030 for closing the application window 702, as illustrated in FIG. 7D (e.g., FIGS. 7D1-7D3). In some embodiments, the computer system 101 displays the close affordance 7030 after detecting the user's attention 710-1 has been maintained for a threshold amount of time, and/or has satisfied other attention criteria. For example, in response to detecting a gaze input directed to the top left corner that is not maintained for a threshold amount of time (e.g., the user gazes elsewhere in the three-dimensional environment before satisfying the threshold amount of time), the computer system does not display the close affordance 7030. In some embodiments, the close affordance 7030 is displayed as a distinct user interface element from the application window 702. For example, the close affordance 7030 is separated from the application window 702 by a non-zero distance such that the portion of the three-dimensional environment 7000' between the application window 702 and the close affordance 7030 is visible. In some embodiments, the close affordance 7030 is displayed above the application window 702, near the corner of the application window 702. In some embodiments, while displaying the close affordance 7030, the computer system optionally maintains display of the grabber 706-1. In some embodiments, while displaying the close affordance 7030, the computer system ceases display of the grabber 706-1.

In some embodiments, as illustrated in FIG. 7D1, the title bar 716a is displayed below application window 702, optionally in response to detecting the user's attention directed to a bottom portion of application window 702. In some embodiments, a user interface object 705 is displayed concurrently with the grabber 706-1 and/or the title bar 716a (e.g., which has the same or analogous functionality as title bar 716, as described with reference to FIG. 7S). In some embodiments, the user interface object 705 is displayed proximate to (e.g., to the left and/or to the right of) the title bar 716a and/or grabber 706-1. In some embodiments, the user interface object 705 corresponds to a minimized version of a close icon and/or a minimized version of one or more other controls (e.g., a control menu, or another type of control object). In some embodiments, the user interface object 705 is displayed before detecting the user's attention directed to the bottom portion of application window 702 (e.g., and, optionally, user interface object 705 continues to be displayed after the user's attention is directed away from the bottom portion of application window 702).

In some embodiments, in response to detecting that the user's attention 710-1a is directed to the user interface object 705, the user interface object 705 is updated (e.g., from a minimized state, or a reduced state) to display close affordance 7030-2, as illustrated in FIG. 7D2. In some embodiments, close affordance 7030-2 has the same or analogous functionality as close affordance 7030, although close affordance 7030-2 is optionally displayed at a different position than close affordance 7030 relative to application window 702.

In some embodiments, while displaying the close affordance 7030 (or close affordance 7030-2), the computer system optionally detects a user input (e.g., a direct air gesture such as an air tap or air pinch at a location with which the user is interacting, an indirect air gesture such as an air pinch while attention of the user or gaze of the user is directed toward at a location with which the user is interacting, a pinch input, a tap input, or another selection input) directed to the close affordance 7030 (or close affordance 7030-2, as illustrated in FIG. 7D2). In some embodiments, in response to detecting the user input directed to the close affordance 7030 or 7030-2, the computer system ceases display of the application window 702. Thus, the user is enabled to close the application window 702 by selecting the close affordance 7030 or 7030-2.

FIG. 7D3 illustrates the computer system 101 detecting the user's attention 710-2 directed to a bottom right corner of the application window 702. In some embodiments, in response to detecting the user's attention 710-2 directed to the bottom right corner of the application window 702, the computer system displays a resize affordance 708-1 (e.g., the resize affordance 708-1 shown in FIG. 7F (e.g., FIGS. 7F1 and 7F2)) corresponding to the bottom right corner.

In some embodiments, before the resize affordance 708-1 is displayed, the computer system enables the user to access functionality and/or perform operations associated with the resize affordance 708-1. For example, without displaying resize affordance 708-1, the user is enabled to perform a gesture or other user input while directing the user's attention to the bottom right corner of the application window 702 to resize the application window 702 (e.g., and in response to detecting the gesture or other user input, the application window 702 is resized in accordance with the gesture or other user input). In some embodiments, resize affordance 708-1 is displayed during and/or after the user performing the gesture. In some embodiments, the resize affordance 708-1 is displayed in response to detecting the user's attention 710-2 satisfies attention criteria. For example, the user maintains the user's gaze at the bottom right corner for a threshold amount of time (e.g., 1 second, 2 seconds, 5 seconds, or another amount of time). In some embodiments, the resize affordance 708-1 is displayed with a size and/or shape that is based on the application window 702. For example, in some embodiments, a size of resize affordance 708-1 is based on a size of the application window 702. In some embodiments, the resize affordance 708-1 is displayed with an L-shape around the corner of application window 702 (e.g., to extend along a portion of the bottom edge and a portion of the right edge of application window 702), wherein a contour of the L-shape follows a contour of the corner of application window 702.

In some embodiments, the user's attention 710-2 satisfies attention criteria that includes a criterion that is met when the user's attention 710-2 is directed to a first area having a first size that corresponds to a respective portion of the application window 702. For example, the user's attention 710-2 is directed to an area having the first size that is centered about the bottom right corner of the application window 702.

Figure 7E:
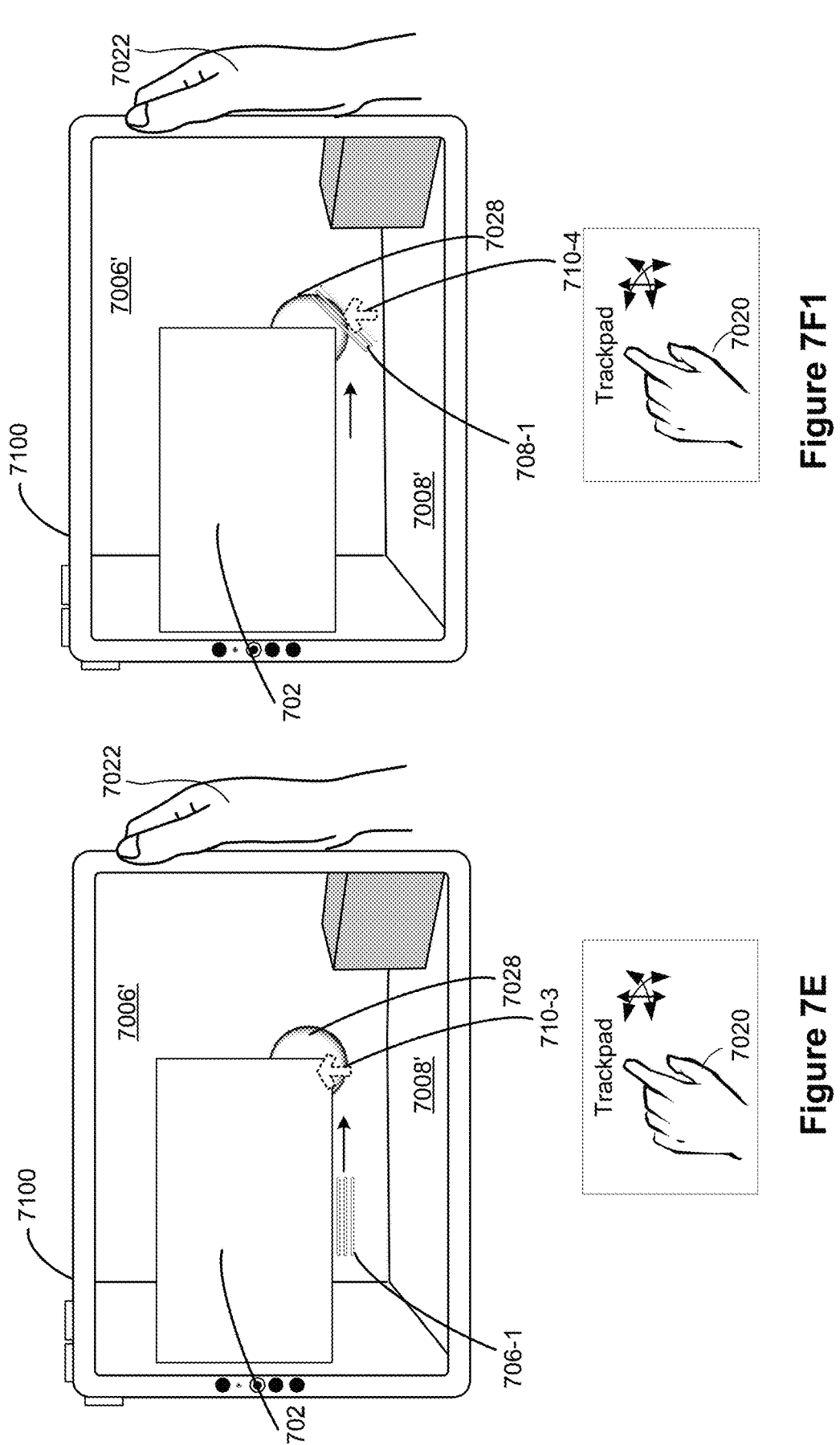

In some embodiments, in response to detecting the user's attention 710-2 directed to the bottom right corner of the application window 702, the computer system displays an animated transition from displaying the grabber 706-1 and the resize affordance 708-1. For example, the animated transition includes displaying the grabber 706-1 gradually shifting to the right, as illustrated in FIG. 7E, until it is replaced with the resize affordance 708-1 displayed at the bottom right corner of the application window 702. In some embodiments, the grabber 706-1 is displayed as a single bar that morphs into an L-shape of the resize affordance 708-1. In some embodiments, the animated transition includes reducing a size of the grabber 706-1 and/or fading the grabber 706-1, optionally without shifting a position of the grabber 706-1, until the grabber 706-1 is no longer displayed, and, optionally concurrently or after reducing the size of grabber 706-1, increasing a size of the resize affordance 708-1 and/or fading in the resize affordance 708-1. For example, the animated transition removes the grabber 706-1 and initiates display of the resize affordance 708-1 at the corner in which the gaze of the user is detected. In some embodiments, the grabber 706-1 is not displayed while the resize affordance 708-1 is displayed.

In some embodiments, the resize affordance 708-1 is displayed in accordance with a determination that the user's attention 710-2 is directed to the bottom right corner of the application window for at least a threshold amount of time. For example, display of resize affordance 708-1 is delayed until the threshold amount of time has been met (e.g., and the user is optionally enabled to resize application window 702 before resize affordance 708-1 is displayed).

In some embodiments, the animated transition between displaying grabber 706-1 and resize affordance 708-1 is one example of an animation displayed for displaying object management controls, including the resize affordance, the grabber, the close affordance, the title bar, and/or other affordances that are dynamically displayed in response to detecting the user's attention is directed to a respective portion of application window 702 (e.g., or other virtual object). For example, the affordances described herein are responsive to detecting the user's attention, such as the user's gaze, such that the affordances are displayed in accordance with a determination that the user's attention is directed to a portion of the displayed area that corresponds to the affordance (e.g., indicating that the user intends to interact with the affordance). As such, in some embodiments, in response to detecting the user's attention is directed to a respective portion of application window 702, the animation to display a respective affordance for the respective portion of application window 702 is initiated, and the user is enabled perform an operation associated with the affordance whether the animation is complete or incomplete. For example, while the animation is ongoing (e.g., or before the animation is initiated), the user is enabled to select or otherwise perform a respective operation associated with the respective affordance (e.g., even before the respective affordance is displayed), so long as the user's attention has dwelled at the respective position corresponding to the affordance for a threshold amount of time. For example, the animation to display the respective affordance is initiated after the user's attention has dwelled and the threshold amount of time has passed, but the user is enabled to interact with the affordance (e.g., by directing the user's attention to a position that corresponds to the position of the affordance) before the affordance is displayed.

In some embodiments, application window 702 (e.g., or other virtual object, such as a three-dimensional virtual object) is divided into a plurality of regions, such as a left edge region, a left corner region, bottom region, a right corner region, and a right edge region. In some embodiments, each of the plurality of regions optionally includes an area outside of and/or proximate to application window 702. For example, the left corner region includes an area that extends beyond the outside of the left corner of application window 702. In some embodiments, a respective affordance is enabled to appear at any one of the regions (e.g., the same affordance appears at any one of the regions, or a different affordance appears at different regions based on the region). For example, resize affordance 708-1 appears at a bottom left corner region of application window 702, at a bottom right corner region of application window 702, at a top left corner region of application window 702 and/or at a top right corner region of application window 702 based on which of the corner regions at which the user's attention is currently directed.

In some embodiments, the system determines a current state of each of the plurality of regions, and optionally performs an operation (e.g., and/or enables an operation to be performed in response to a user input) in accordance with the current state (e.g., and/or a change to the current state of a respective region). For example, the possible states include: the affordance is not visible and does not allow for user interaction, the affordance is not visible but does allow for interaction to perform an operation associated with the affordance, the affordance is displayed but the user's attention is not dwelled in the region (e.g., the user's attention is detected as being directed to the region for less than a threshold amount of time), the affordance is displayed and the user's attention is dwelled in the region (e.g., the user's attention is detected as directed to the region for at least the threshold amount of time), and the affordance is displayed and selected (e.g., pressed or otherwise interacted with).

In some embodiments, the title bar and/or other affordances are visible in only one of the plurality of regions (e.g., without being visible or available in the other regions of the plurality of regions). For example, in a first region of the plurality of regions, a user is enabled to perform an operation associated with a first respective affordance (e.g., even if the first respective affordance is inactive or not displayed), and/or the user is enabled to direct the user's attention to and/or select the first respective affordance within the first region, while in a second region of the plurality of regions, the first respective affordance is hidden and/or disabled (e.g., such that the user is not enabled to select or interact with the first respective affordance). In some embodiments, in response to detecting a user input directed to (e.g., the user's attention directed to) the first region that includes the first respective affordance (e.g., the user's gaze is directed to a respective region for at least a threshold amount of time), the computer system provides visual feedback (e.g., a change in opacity, blur, and/or other visual feedback) in the region where the affordance is currently displayed.

In some embodiments, in response to detecting that the user's attention is directed to a third region of the plurality of regions (e.g., a region other than the first region), where the first respective affordance is not displayed in the third region, the computer system displays an animation to display a second respective affordance (e.g., the same or a different affordance than the first respective affordance) for the third region to which the user is currently directing the user's attention. For example, as described with reference to FIGS. 7E-7F (e.g., FIGS. 7F1, 7F2 and 7F3), the grabber bar 706-1 is animated into a resize affordance 708-1 in response to detecting that the user's attention is directed to the bottom right corner region.

In some embodiments, the resize affordance 708-1 continues to be displayed while detecting the user's attention directed to the bottom right corner of application window 702. In some embodiments, in response to detecting that the user's attention is no longer directed to the bottom right corner of the application window 702, the resize affordance 708-1 is no longer displayed, and the grabber 706-1 is optionally redisplayed. In some embodiments, detecting that the user's attention is no longer directed to the bottom right corner of the application window 702 includes determining that the user's attention is directed outside of a second area having a second size (e.g., distinct from the first area having the first size that corresponds to a respective portion of the application window 702 used to determine that the user's attention satisfies attention criteria). For example, the second area having the second size is a larger region than the first area having the first size. In some embodiments, the second area completely encompasses the first area. Thus, detecting that the user's attention is no longer directed to the bottom right corner is based on whether the user's attention has moved outside of a larger sized region than the first area in which the user's attention is directed to determine that the user's attention satisfies attention criteria (e.g., and displaying the resize affordance in accordance with the determination that the user's attention satisfies the attention criteria).

In some embodiments, a resize affordance (e.g., analogous to the resize affordance 708-1) is displayed proximate to the bottom left corner in response to detecting the user's attention is directed to the bottom left corner. For example, a mirror image of the resize affordance 708-1 is displayed at the bottom left corner. Accordingly, based on detecting which of the bottom corners the user's attention is directed to, the computer system displays a corresponding resize affordance at the respective corner (e.g., the bottom right and/or bottom left corner).

In some embodiments, in response to detecting the user's attention being directed to another area of the application window 702, other than the bottom right and/or bottom left corners, the computer system displays a respective affordance and/or forgoes displaying respective affordances that do not correspond to the current location to which the user's attention is directed. For example, detecting the user's attention directed to the top left corner of the application window 702 causes the computer system to cease display of resize affordance 708-1 and display the close affordance 7030, and, optionally, display (e.g., or redisplays) the grabber 706-1. It will be understood that different affordances are associated with respective portions of the application window 702 (e.g., and/or the virtual object 7028), such that the user invokes display of a respective affordance by directing the user's attention to the respective portion of the application window 702 associated with the respective affordance. Although the examples described herein associate the bottom corners of the application window 702 with resize affordances, and a top left corner of application window 702 with a close affordance, it will be understood that the corners may be assigned to a different type of affordance based on the application window (e.g., different applications may associate different affordances with the corners). For example, some application windows and/or virtual objects cannot be resized, and a resize affordance is not displayed in response to the user gazing at a corner of the application window and/or virtual object. In some embodiments, one or more application windows and/or virtual objects cannot be repositioned within the three-dimensional object, and a grabber is not displayed for the one or more application windows and/or virtual objects.

Figures 7G, 7H:
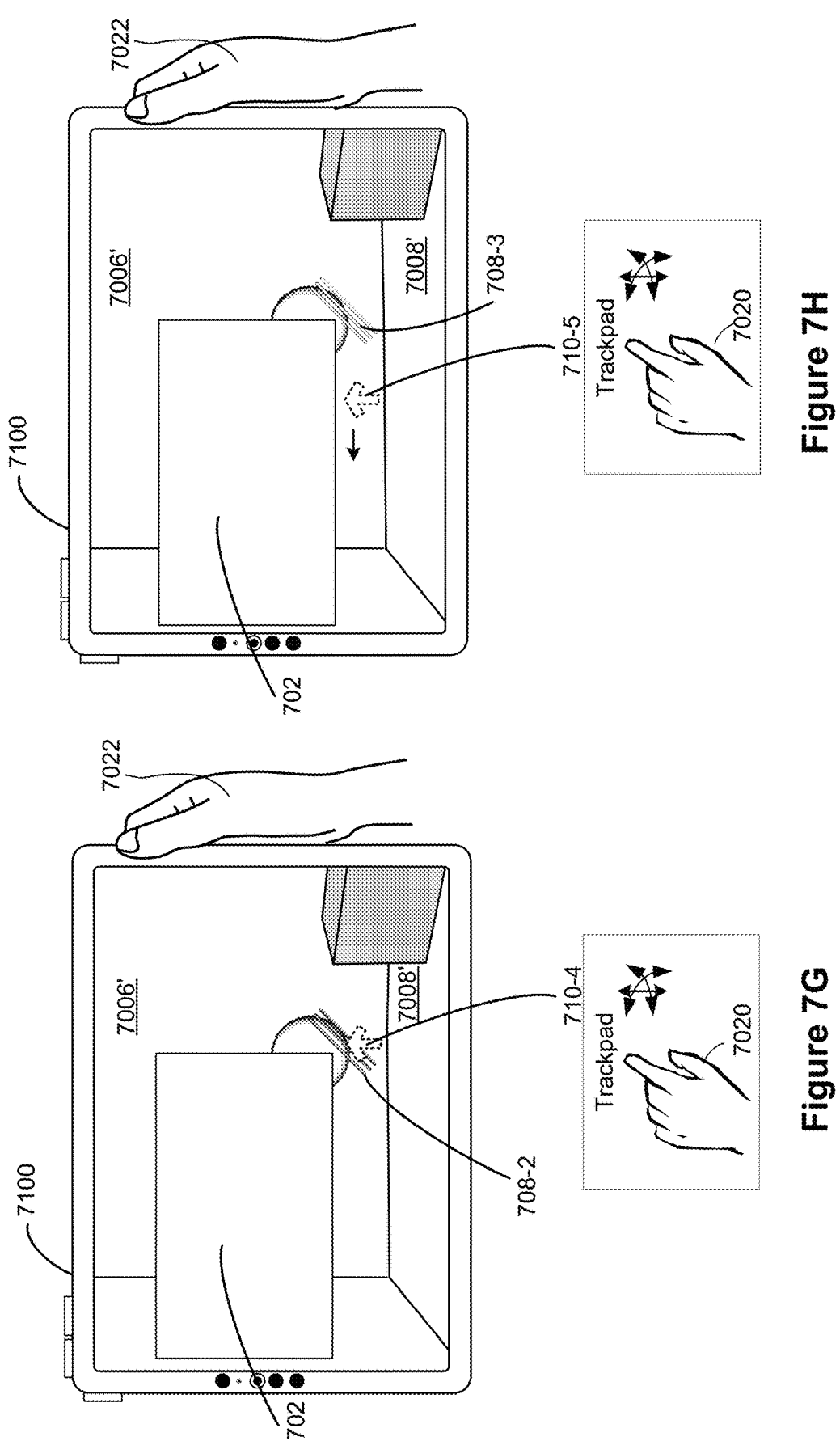

FIG. 7F (e.g., FIGS. 7F1, 7F2 and 7F3) illustrates the computer system 101 detecting the user's attention 710-4 directed to the resize affordance 708-1. In some embodiments, in response to detecting that the user's attention is directed to the resize affordance 708-1 (e.g., detecting that the user is gazing at resize affordance 708-1), the computer system updates one or more visual properties of the resize affordance 708-1 to indicate that the computer system detects the user's attention directed to the resize affordance 708-1. For example, FIG. 7G illustrates a resize affordance 708-2 (e.g., an updated version of the resize affordance 708-1) displayed with a color distinct from the color of the resize affordance 708-1 in FIG. 7F. In some embodiments, updating the one or more visual properties of the resize affordance 708-1 includes displaying the (updated) resize affordance 708-2 with a different size, color, and/or transparency while the user's attention 710-4 is detected as being directed to the resize affordance 708-2.

In some embodiments, after updating the one or more visual properties of resize affordance 708-1, and optionally before detecting additional user input (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of selection input) selecting (updated) resize affordance 708-2, the computer system detects that the user's attention is directed to another portion of the three-dimensional environment that does not correspond to the resize affordance 708-2. For example, as illustrated in FIG. 7H, the user's attention 710-5 shifts to the left of resize affordance 708-3 (e.g., which is analogous to the resize affordance 708-2, but with different properties as described below). In some embodiments, in response to detecting that the user's attention is no longer directed to the resize affordance 708-2 (e.g., and/or detecting that the user's attention is directed to another portion of the three-dimensional environment), the computer system reverses the updates to the one or more visual properties of the resize affordance, as represented by the resize affordance 708-3 in FIG. 7H. For example, the updated visual properties of resize affordance 708-2 are not maintained, and instead the resize affordance 708-3 is displayed with the same visual properties as the resize affordance 708-1 (e.g., is displayed with the same appearance as the resize affordance 708-1 in FIG. 7F).

In some embodiments, in response to detecting that the user's attention is not directed to the resize affordance 708-3, the computer system optionally maintains the update to the one or more visual properties of the resize affordance 708-2 (e.g., the resize affordance 708-3 has the same appearance as the resize affordance 708-2), depending on where the user's attention is directed (e.g., whether the user's attention is directed outside of a proximity of the resize affordance 708-3). For example, if the user looks away from the application window 702 completely, the resize affordance 708-3 ceases to be displayed, and if the user looks at another portion of the application window 702 (e.g., but not at the resize affordance 708-3), the appearance of the resize affordance 708-3 is optionally maintained (e.g., with the different size and/or color of the resized affordance 708-2). In some embodiments, the resize affordance 708-3 continues to be displayed, but with a different visual appearance (e.g., the color and/or size is changed, and is different from the color and/or size of the resized affordance 708-2 in FIG. 7G). As such, depending on where the user's gaze is detected, resize affordance 708-3 ceases to be displayed or is maintained, optionally with different visual properties.

In some embodiments, the computer system 101 detects that the user's attention is redirected to (e.g., after being directed away from) the resize affordance 708-3 before a threshold amount of time has passed. For example, the user had quickly looked away from resize affordance 708-3 before looking back at resize affordance 708-3, and the computer system maintains display of the resize affordance 708-3 (e.g., for up to the threshold amount of time).

Figures 7I, 7J:
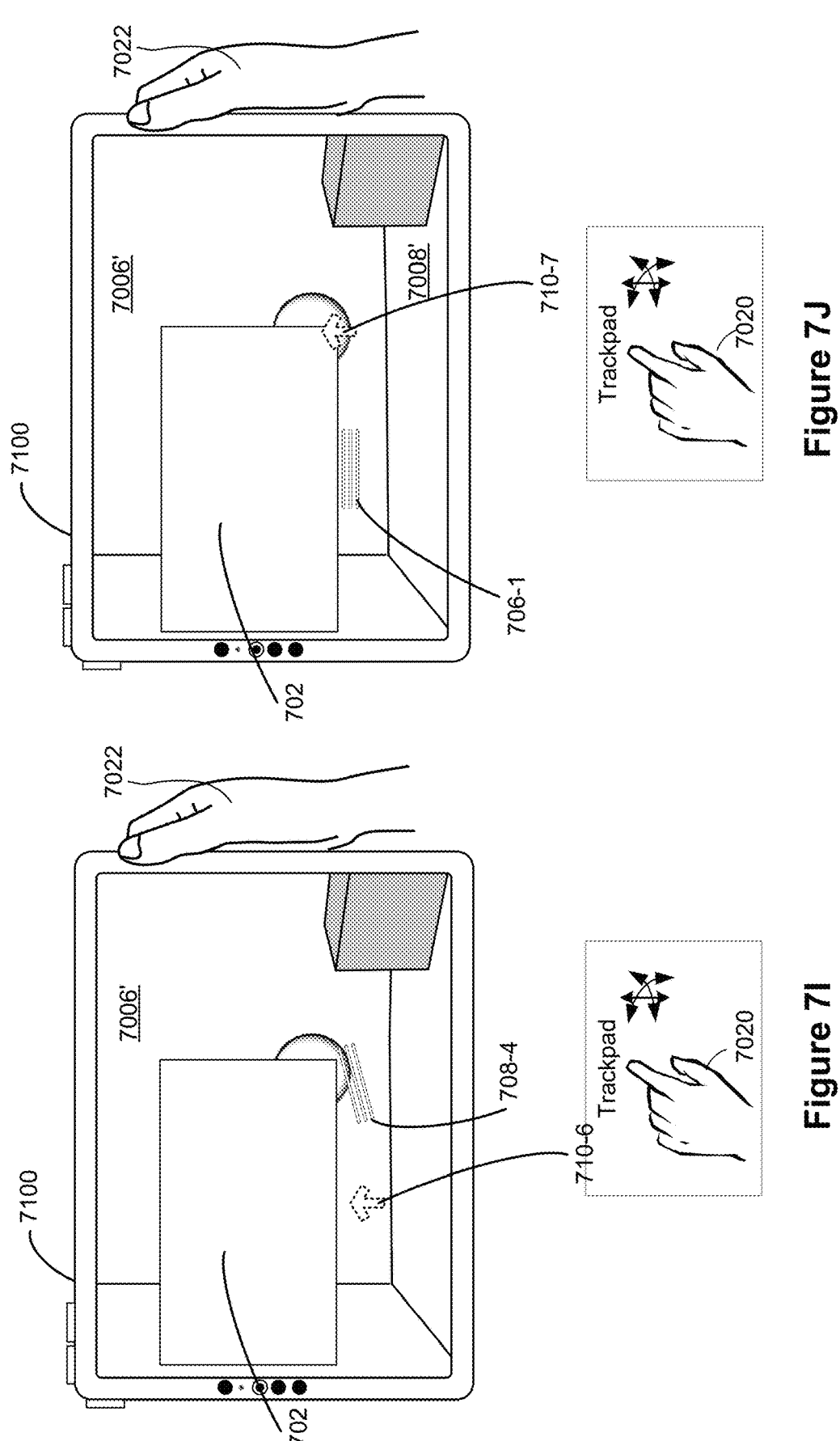

In some embodiments, the computer system 101 detects that the user's attention is directed to another portion of the three-dimensional environment that does not correspond to the resize affordance 708-3 for the threshold amount of time, and after the threshold amount of time has passed, the computer system ceases display of the resize affordance 708-3, and optionally redisplays the grabber 706-1, as illustrated in FIG. 7J. In some embodiments, the computer system ceases display of resize affordance 708-3 by displaying an animated transition, such as decreasing a size of the resize affordance 708-3 and/or fading the resize affordance 708-3 until it is no longer displayed. In some embodiments, the animated transition includes shifting the resize affordance down and/or around the respective corner of application window 702, optionally in a direction towards the grabber 706-1. For example, in FIG. 7I, the resize affordance 708-4 shifts down and to the left as if traveling and/or morphing into the grabber 706-1 in FIG. 7J. In some embodiments, the grabber 706-1 is optionally automatically redisplayed, without additional user input (e.g., without the user gazing at a bottom center edge of application window 702), in response to ceasing display of resize affordance 708-3. In some embodiments, the grabber 706-1 is redisplayed in response to detecting the user's attention 710-6 is directed to a bottom center edge of application window 702 (e.g., including an area outside of the application window 702 that is along the bottom edge of the application window 702, as illustrated in FIG. 7I). In some embodiments, in response to detecting the user's attention 710-6 directed to the bottom center edge of application window 702, the computer system 101 displays an animated transition of moving resize affordance 708-4 until it is displayed as grabber 706-1.

FIG. 7J illustrates detecting the user's attention 710-7 directed to the bottom right corner of the application window 702. In some embodiments, in response to detecting the user's attention 710-7, the computer system 101 displays (e.g., or redisplays) the resize affordance 708-1, and in response to detecting that the user's attention is directed to the resize affordance 708-1, updates the resize affordance (e.g., to the resize affordance 708-3) in a first manner, such as by changing the color of the resize affordance (e.g., as described above with reference to FIGS. 7F-7G).

In some embodiments, after updating the resize affordance in the first manner, while displaying the resize affordance 708-3 with the updated one or more visual properties (e.g., as in FIG. 7H), the computer system 101 detects a user input (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) directed to the resize affordance 708-3 (e.g., a user input performed by the user's hand 7020 in FIG. 7K (e.g., FIGS. 7K1, 7K2 and 7K3)). In some embodiments, the user input directed to the resize affordance 708-3 is an air gesture, such as a pinch gesture or a tap input, that is detected while the user's gaze is detected as being directed to the resize affordance 708-3. In some embodiments, in response to the user input directed to the resize affordance 708-3, the computer system updates display of the resize affordance 708-3 in a second manner (e.g., that is different from the first manner). For example, in response to the pinch gesture, the computer system changes a size of the resize affordance 708-3 to a (e.g., smaller) size of a resize affordance 708-5, optionally while maintaining the updated color of the resize affordance, as illustrated in FIG. 7K (e.g., FIGS. 7K1, 7K2 and 7K3). As such, the computer system provides two levels of visual feedback to the user as the user interacts with the resize affordance. For example, the computer system first changes a color of the resize affordance to indicate the computer system detects the user's attention is on the resize affordance, and upon detecting a further user input (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) to interact with the resize affordance, the computer system changes a size of the resize affordance to indicate that the resize affordance has been selected by the user input.

In some embodiments, changing a size of the resize affordance 708-3 to the size of resize affordance 708-5 includes changing a width, or thickness of the resize affordance without changing a length. For example, the resize affordance 708-3 and the resize affordance 708-5 differ with respect to a first dimension (e.g., width), but are the same with respect to other dimensions (e.g., thickness).

In some embodiments, the computer system detects that the user's attention is directed to another portion of the three-dimensional environment that does not correspond to the resize affordance 708-5 after detecting the user input (e.g., via the user's hand 7020, such as an air gesture) in FIG. 7K (e.g., FIGS. 7K1, 7K2 and 7K3). In some embodiments, in response to detecting that the user's attention 710-5 shifts away from resize affordance 708-5, after detecting the user input directed to resize affordance 708-5, the updates to the visual properties are optionally maintained (e.g., resize affordance 708-5 continues to be displayed with the updated size and the updated color) even while the user's attention is directed to a portion of the three-dimensional environment that does not correspond to resize affordance 708-5.

In some embodiments, after detecting the user input in FIGS. 7K, in response to detecting that the user's attention 710-5 shifts away from resize affordance 708-5, the computer system continues the user's interaction with resize affordance 708-5 (e.g., even while the user's attention 710-5 is not directed to resize affordance 708-5). For example, after the use's attention shifts outside of the first area having the first size and/or the second area having the second size, the user input detected via the user's hand 7020 is enabled to continue to interact with the resize affordance 708-5 (e.g., the user is enabled to continue resizing the window by dragging the resize affordance 708-5 in one or more directions).

Figure 7L:
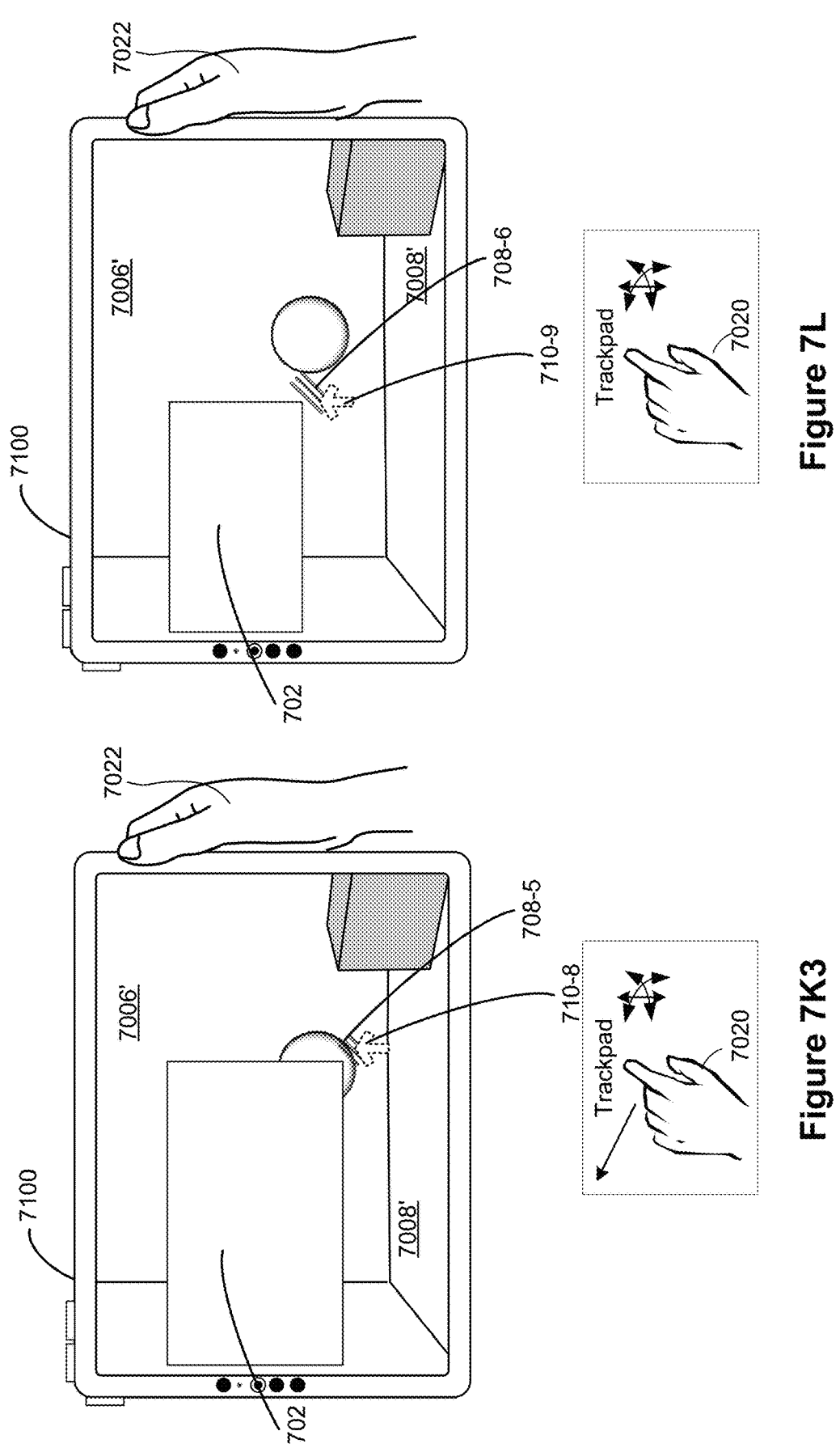

In some embodiments, the user input detected via the user's hand 7020 indicates movement of the user's hand 7020 that causes movement of the resize affordance 708-5. For example, while the resize affordance 708-5 is selected (e.g., in response to a gaze and air pinch gesture or other selection input), the user input continues by the user moving the user's hand 7020 in a respective direction and/or by a respective amount (e.g., the user performs a drag gesture or an air drag gesture), optionally while maintaining the pinch gesture. For example, the user performs a pinch and drag gesture while gazing at the resize affordance 708-5. In some embodiments, in response to detecting the user's drag gesture directed to the resize affordance 708-5, the computer system 101 moves the resize affordance by an amount and/or with a direction of movement corresponding to the user's drag gesture, and resizes the application window 702, as illustrated in FIG. 7L. For example, the application window 702 is resized in accordance with a direction and/or amount of movement of the user input detected via the user's hand 7020. For example, the user's hand 7020 moves up and to the left, and in response, the corner of the application window 702 moves up and to the left, thereby decreasing a size of the application window 702 by a corresponding amount. In some embodiments, movement of the user's hand 7020 in the opposite direction (e.g., down and to the right) causes the application window 702 to increase in size by an amount corresponding to the amount of movement of the user's hand 7020.

In some embodiments, resizing the application window 702 includes maintaining a position of one or more edges of the application window 702 within the three-dimensional environment. For example, in FIG. 7L, the top edge and the left edge of the application window 702 remain in a same position within the three-dimensional environment before and after resizing the application window 702. In some embodiments, the edge(s) that maintain their respective positions are the edge(s) opposite (e.g., that are not a part of) the corner of the resize affordance. For example, in FIG. 7K (e.g., FIGS. 7K1 and 7K3), the resize affordance 708-5 is displayed in a bottom right corner, such that the top edge and left edge of the application window 702 are maintained while resizing the application window 702, while the bottom right corner moves inward toward the top edge and left edge of the application window 702 to decrease the size of the application window 702.

In some embodiments, resizing the application window 702 includes maintaining a center of the application window 702 at a same position before, after and/or during the resizing of the application window 702. For example, as the application window 702 decreases in size, a plurality of (or, optionally, all of) the edges of application window 702 move inward (e.g., uniformly, and by the same distance), toward the center of application window 702 to decrease the size of the application window 702. Similarly, as the application window 702 increases in size, a plurality of (or, optionally, all of) the edges of application window 702 move outward, away from the center of the application window 702 while maintaining the center of the application window 702 at a same position.

In some embodiments, while the user is providing the user input directed to the resize affordance 708-5, the computer system increases or decreases a size of the resize affordance 708-5 to indicate that the resize affordance 708-5 is currently selected by the user. In some embodiments, the resize affordance 708-5 has a first size when currently selected by the user input, and the resize affordance 708-5 has a different size (e.g., a second size different from the first size) while the application window 702 is being resized. For example, the resize affordance 708-6 is displayed with a size that is based on (e.g., proportional to) a size of application window 702. For example, as compared to application window 702 in FIG. 7H, the application window 702 in FIG. 7L is decreased in size, and as compared to the resize affordance 708-3 in FIG. 7H, the resize affordance 708-6 is decreased in size (optionally by an amount proportional to an amount of the decrease in size of application window 702). Accordingly, the resize affordance 708-5 changes in size by an amount based on (i) being currently selected by a user input and/or (ii) a current size of application window 702. As such, the resize affordance 708-5 changes in size as the user resizes application window 702.

In some embodiments, as illustrated in FIG. 7L, while the user's attention 710-9 continues to be detected directed to the resize affordance 708-6, the resize affordance 708-6 is displayed in a first updated state (e.g., with a second color), but without a user input currently selecting resize affordance 708-6, the resize affordance 708-6 is not displayed in its second updated state (e.g., with a different size). For example, the computer system displays resize affordance 708-6 with a grey color to provide visual feedback that the computer system detects the user's gaze is directed to the resize affordance 708-6 (e.g., whereas the resize affordance 708-6 is displayed with a white color if the user's gaze is not directed to the resize affordance, as described above).

Figures 7M, 7N:
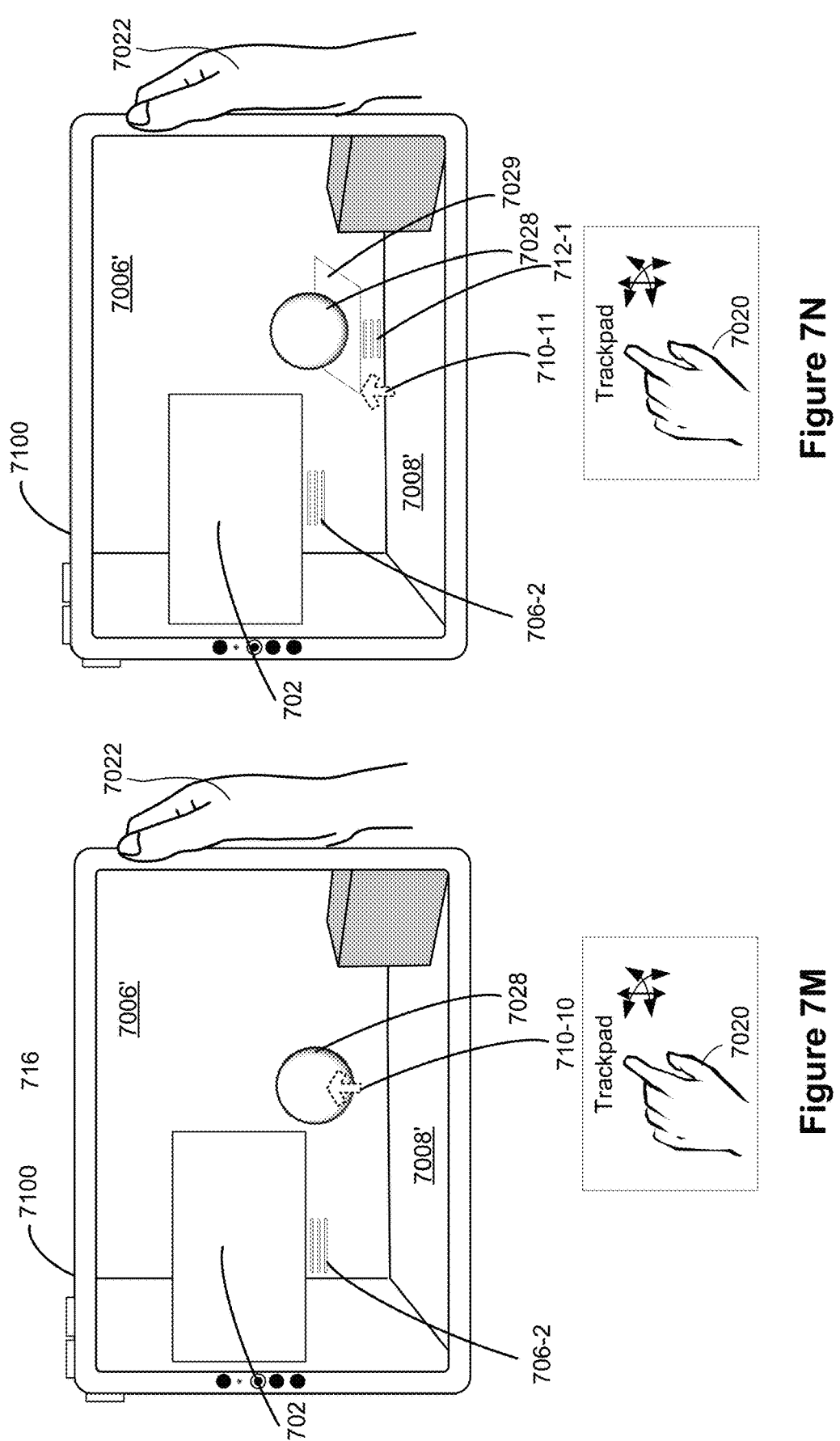

FIG. 7M illustrates detecting the user's attention 710-10 directed to the virtual object 7028. In some embodiments, the application window 702 continues to be displayed in the three-dimensional environment, even while the user's attention is not directed to the application window 702. In some embodiments, the grabber 706-2 is optionally displayed for the application window 702 even while the user's attention is not directed to application window 702. In some embodiments, the grabber 706-2 optionally ceases to be displayed while the user's attention is not directed to the application window 702, and in response to detecting the user's attention is directed to the application window 702 (e.g., or directed to a respective portion, such as a bottom center portion, of the application window 702), the grabber 706-2 is displayed.

In some embodiments, a size of the grabber 706-2 is decreased relative to a size of the grabber 706-1 after the application window 702 decreases in size. For example, the grabber 706-1 is displayed with a size proportional to the application window 702 and updates in size as a size of the application window 702 changes. In some embodiments, a size of application window 702 is dependent on a perceived distance away from the user (e.g., and/or the viewpoint of the user). For example, if the application window 702 is moved in position away from the user, the application window 702 decreases in size, and if the application window 702 (e.g., and its associated controls, such as the grabber 706-1) is moved in position towards the user, the application window 702 (e.g., and its associated controls, such as grabber 706-1) increases in size in accordance with the closer position to the user.

In some embodiments, in response to detecting that the user's attention 710-10 is directed to the virtual object 7028, a platter 7029 is displayed below the virtual object 7028. In some embodiments, the platter 7029 comprises a flat surface that appears substantially parallel to the floor 7008'. For example, the platter 7029 is displayed as a surface, optionally a floating surface, on which the virtual object 7028 is situated in the three-dimensional environment. In some embodiments, the platter 7029 is displayed for three-dimensional virtual objects, such as the virtual object 7028, while two-dimensional objects, such as the application window 702, are displayed without a platter. In some embodiments, a size of the platter 7029 is based on a size of the virtual object 7028. In some embodiments, the platter 7029 is displayed while the user's attention 710-10 continues to be directed to the virtual object 7028 and/or one or more controls (e.g., the grabber 712-1, the resize affordance 714-1, and/or the close affordance 717) for the virtual object 7028, and optionally is no longer displayed in response to detecting the user's attention has moved away from the virtual object 7028 and/or the one or more controls for the virtual object 7028.

FIG. 7N illustrates a grabber 712-1, for moving a position of the virtual object 7028. In some embodiments, the grabber 712-1 is displayed as a distinct user interface object from the platter 7029, and is displayed along an edge of the platter 7029 (e.g., the closest edge of the platter 7029). In some embodiments, the grabber 712-1 is automatically displayed, without additional user input, concurrently with display of the platter 7029 (e.g., in response to detecting the user's attention is directed to the virtual object 7028). In some embodiments, the grabber 712-1 is displayed in response to detecting that the user's attention is directed to a bottom portion of the virtual object 7028, such as to the edge of the platter 7029 in an area proximate to where the grabber 712-1 is displayed in FIG. 7N. For example, the user gazes at the closest edge of the platter 7029, and the grabber 712-1 is displayed. In some embodiments, the user selects the grabber 712-1 using a selection input (e.g., a direct air gesture such as an air tap or air pinch at a location with which the user is interacting, an indirect air gesture such as an air pinch while attention of the user or gaze of the user is directed toward at a location with which the user is interacting, a tap input, a pinch input, or other selection input) and moves the virtual object 7028 within the three-dimensional environment (e.g., via a drag gesture, an air drag gesture, or other movement of the user input).

Figures 7O, 7P:
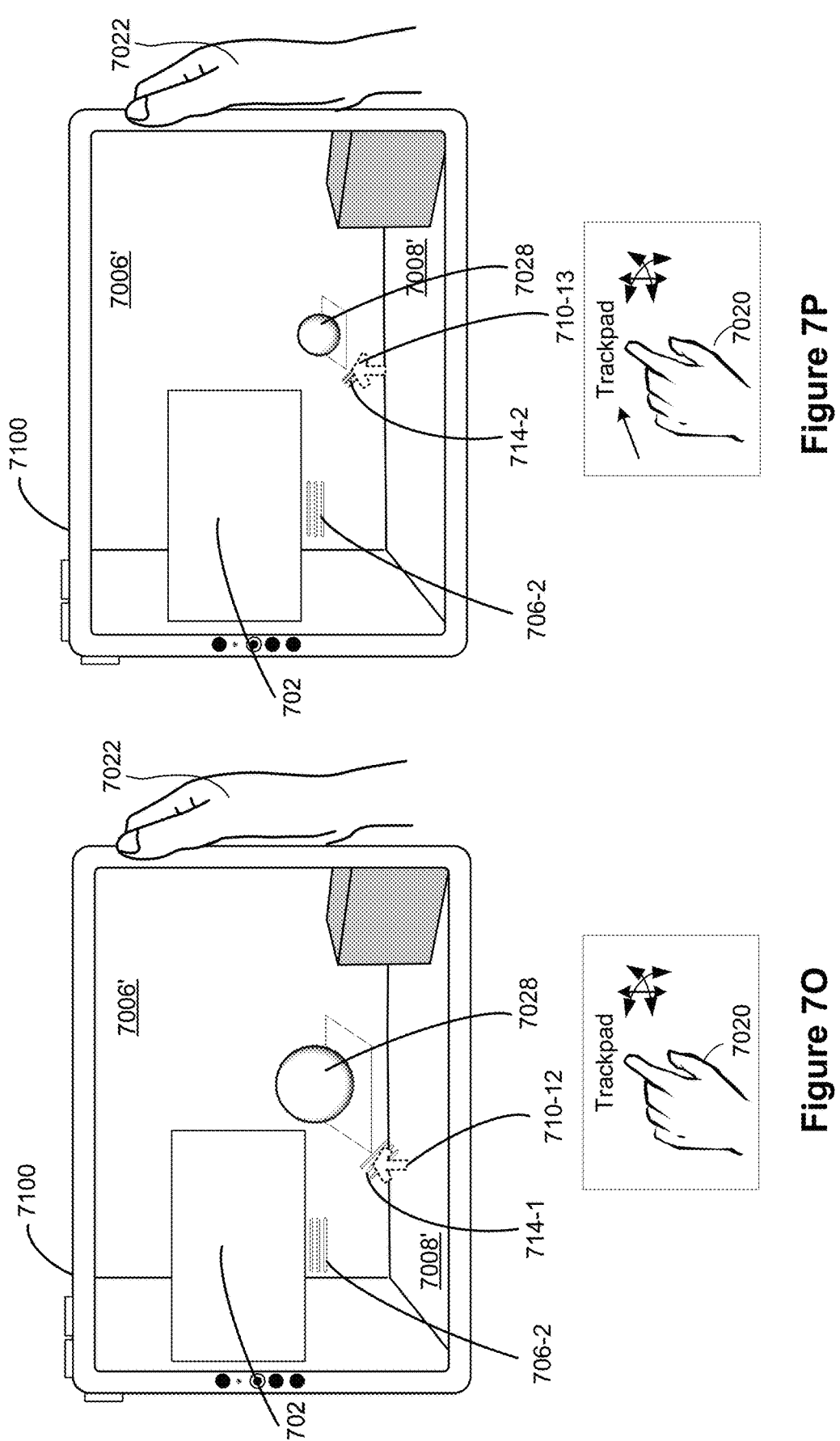
Figures 7Q, 7R:
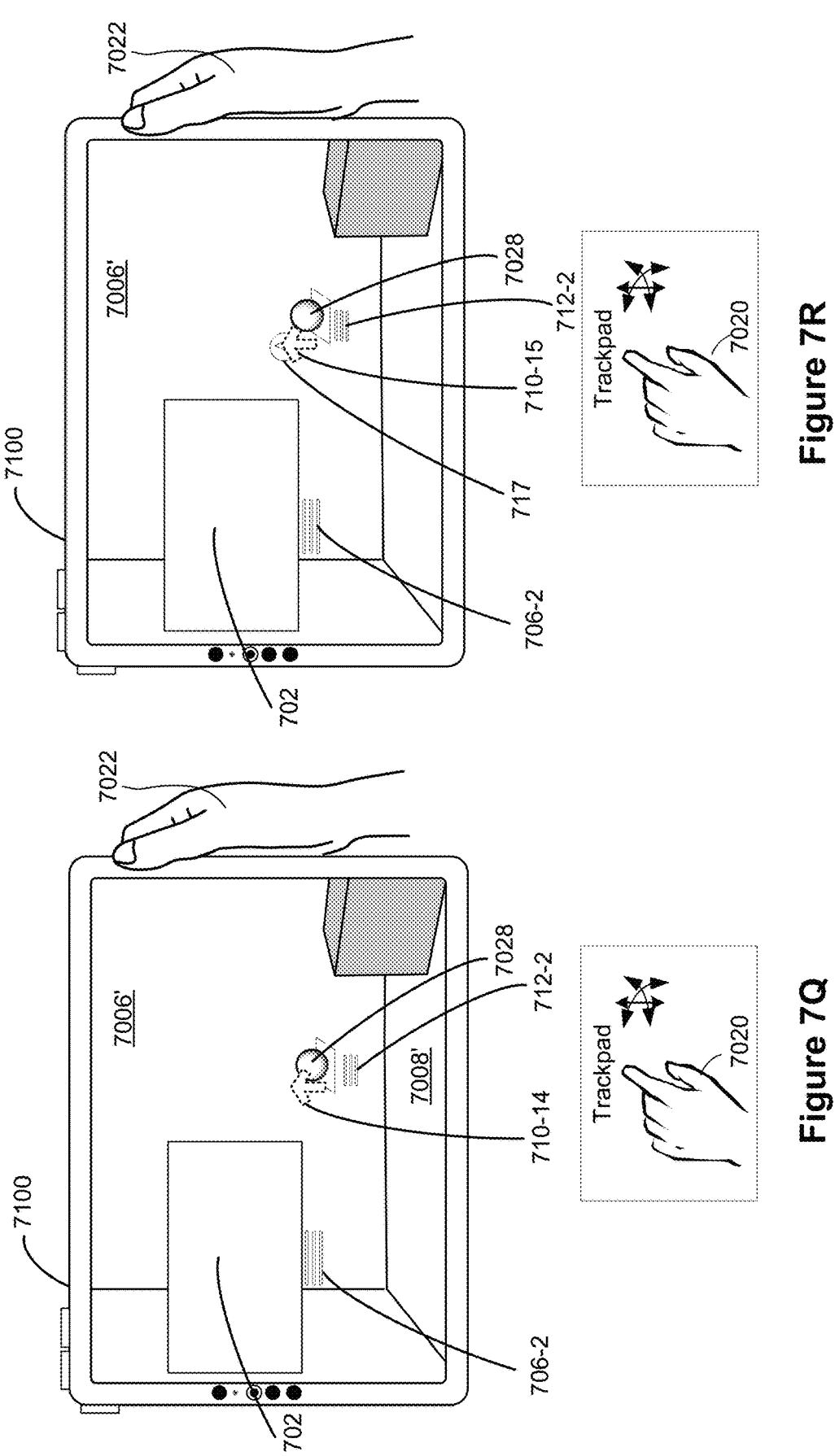
Figure 7S:
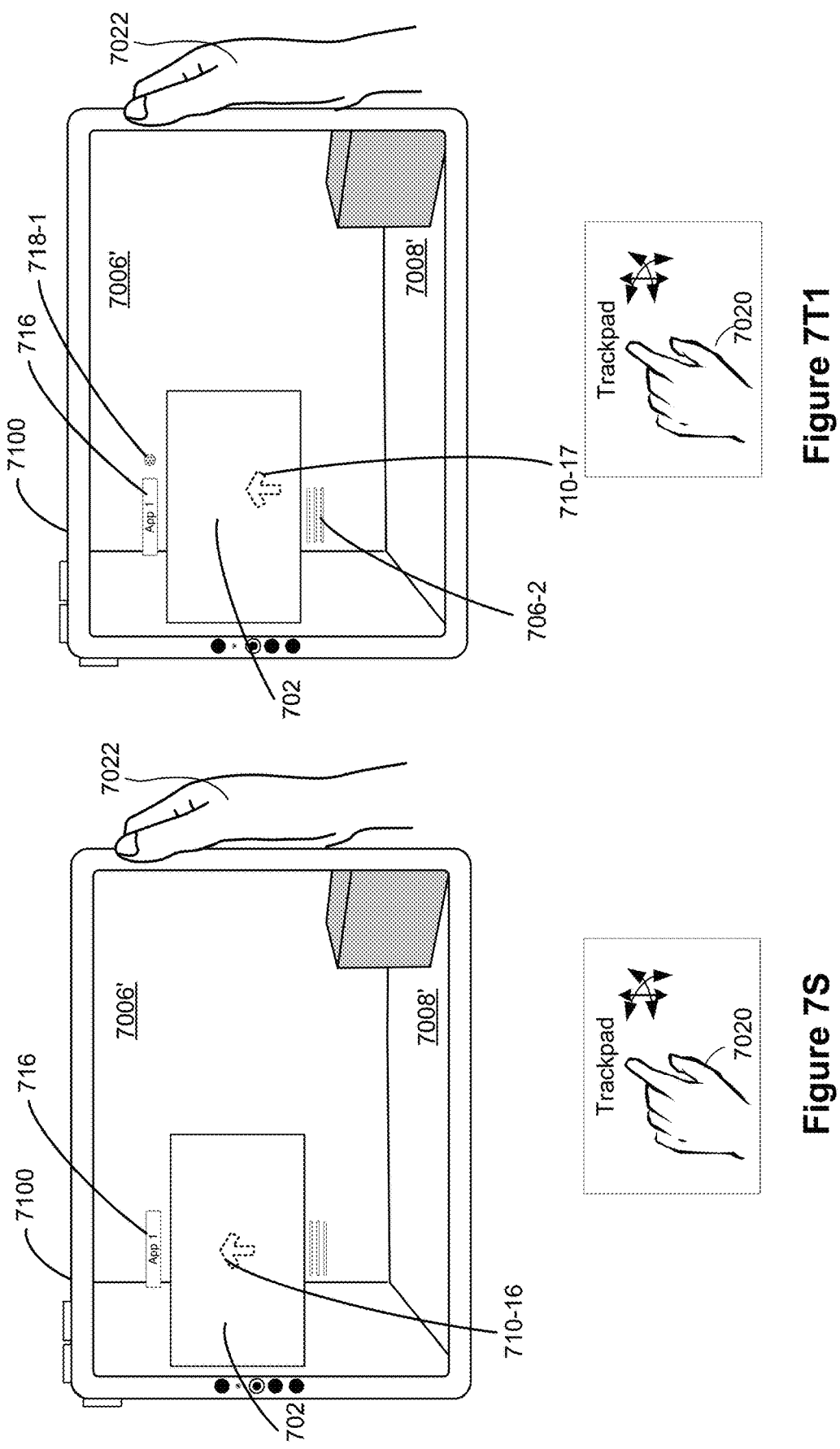

FIG. 7N further illustrates the computer system 101 detecting the user's attention 710-11 directed to a corner of the platter 7029. In some embodiments, in response to detecting that the user's attention 710-11 is directed to the bottom left corner of the platter 7029, the computer system 101 displays a resize affordance 714-1 at the bottom left corner, as illustrated in FIG. 7O. In some embodiments, the resize affordance 714-1 is displayed as an L-shape that extends along a portion of the edges of the platter 7029 with a contour that matches a contour of the corner of platter 7029. In some embodiments, the user gazes at the bottom left corner or the bottom right corner of platter 7029, and in response, a respective resize affordance is displayed at the respective corner of platter 7029. In some embodiments, an animated transition is displayed along the edge of platter 7029, and the animated transition includes ceasing display of grabber 712-1 and initiating display of resize affordance 714-1 (e.g., including any of the animated transitions between the grabber 706-1 and the resize affordance 708-1 described above with reference to FIGS. 7E-7F).

FIG. 7O illustrates the computer system 101 detecting the user's attention 710-12 directed to the resize affordance 714-1, and in response to detecting the user's attention 710-12, the computer system 101 changes a color of resize affordance 708-1 and/or updates one or more other visual properties of the resize affordance 708-1. In some embodiments, in response to detecting a user input, such as an air pinch gesture, selecting the resize affordance 708-1, the computer system changes a size of the resize affordance 708-1 (e.g., to indicate it has been selected by the user) and/or updates one or more other visual properties of the resize affordance 708-1.

FIG. 7P illustrates the computer system 101 detecting a user input (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) that indicates a direction and an amount of movement based on movement of the user's hand 7020, and changing a size of the virtual object 7028 in accordance with the user input (e.g., in accordance with the movement and/or direction of movement of the user's hand 7020). In some embodiments, while the user is interacting with resize affordance 714-2, the resize affordance 714-2 changes in size to indicate that the computer system detects the user interaction (e.g., gaze inputs and/or air gestures). For example, the resize affordance 714-2 optionally increases in size while the user is interacting with the resize affordance 714-2 (e.g., by moving the user's hand 7020 while the resize affordance 714-2 is selected), such as performing an air drag gesture on the resize affordance while the user's attention 710-13 is directed to the resize affordance 714-2.

In some embodiments, although the resize affordance 714-2 increases in size while the user is interacting with the resize affordance 714-2, because the user is decreasing a size of the virtual object 7028, the overall size of the resize affordance 714-2 appears to decrease (e.g., in accordance with the decrease in size of virtual object 7028). For example, resize affordance 714-2 is displayed with a size proportional to the virtual object 7028 such that, as the virtual object 7028 decreases in size, the resize affordance 714-2 also decreases in size. For example, the resize affordance 714-2 decreases in size by an amount that is less than the amount that the virtual object decreases in size, because the resize affordance 714-2 increases in size while the user is interacting with the resize affordance 714-2.

FIG. 7Q illustrates that, after the user input directed to the resize affordance 714-2 is no longer detected, the resize affordance 714-2 ceases to be displayed, and optionally, the grabber 712-2 is redisplayed under the platter 7029 of the virtual object 7028. In some embodiments, the grabber 712-2 is displayed with a size based on the resized virtual object 7028 (e.g., the grabber 712-2 decreases in size in accordance with the decrease in size of virtual object 7028). FIG. 7Q further illustrates the computer system 101 detecting that the user's attention 710-14 is directed to a top left corner of the virtual object 7028.

FIG. 7R illustrates that, in response to detecting the user's attention 710-14 directed to a top left corner of virtual object 7028, the computer system 101 displays the close affordance 717 for the virtual object 7028. In some embodiments, the close icon 717 is displayed at a different portion of the virtual object 7028 (e.g., in accordance with the virtual object 7028 being a three-dimensional object). For example, in some embodiments, the close affordance 717 is displayed below the platter 7029 of virtual object 7028. In some embodiments, while the close affordance 717 is displayed, the computer system detects a user input (e.g., via the user's hand 7020), such as a tap gesture (e.g., a touch gesture, air gesture, or other selection input) and/or a pinch gesture, such as an air pinch gesture, directed to the close affordance 717 while the user is gazing at the close affordance 717, indicating that the user's attention 710-15 is directed to the close affordance 717 (e.g., while the close affordance 717 is in a ready state, as described above).

In response to the user input selecting the close affordance 717, the computer system ceases display of the virtual object 7028 in the three-dimensional environment, as illustrated in FIG. 7S. For example, the computer system closes the virtual object 7028, including optionally closing an application associated with the virtual object 7028.

Additional descriptions regarding FIGS. 7A-7S are provided below in reference to methods 800 and 900 described with respect to FIGS. 8 and 9, respectively.

FIGS. 7S-7AD (e.g., FIGS. 7AD1, 7AD2 and 7AD3) illustrate examples of displaying a title bar that expands in response to detecting the user's attention directed to the title bar. FIG. 10 is a flow diagram of an exemplary method 1000 for displaying a title bar near an application window that provides additional control options for a user. The user interfaces in FIGS. 7S-7AD are used to illustrate the processes described below, including the processes in FIG. 10.

FIG. 7S illustrates detecting the user's attention 710-16, such as a gaze input, directed to the application window 702. In some embodiments, the application window 702 is displayed concurrently with the title bar 716. In some embodiments, the title bar 716 displays a name or other indication, such as an application icon, of an application associated with the application window 702 (e.g., "App 1"). In some embodiments, the title bar 716 indicates respective content that is currently displayed in the application window 702. For example, the title bar 716 includes a name of a document displayed in the application window 702 and/or a name of a website displayed in the application window 702. In some embodiments, multiple tabs, with each tab corresponding to distinct content, are displayed in a tab bar (optionally that includes the title bar 716), wherein the content associated with each tab is available for display in the application window 702. For example, a user is enabled to switch, or otherwise navigate, between tabs to display different content (e.g., different documents, different webpages, or other content) for a same application and/or other applications within the application window 702. In some embodiments, indications for other available tabs are displayed in a tab bar next to title bar 716, such that selecting another tab in the tab bar switches the content displayed in application window 702. In some embodiments, the currently selected tab is displayed as the current title bar for the content currently displayed in the application window 702. In some embodiments, the currently selected tab is displayed with a visual appearance that is different than the other tabs in the tab bar. For example, the currently selected tab bar is displayed with an application icon, a different level of translucency, a different size and/or a different color to indicate it is the currently active tab.

In some embodiments, the title bar 716 is displayed as a distinct user interface object with a nonzero distance between the application window 702 and the title bar 716. In some embodiments, the title bar 716 is displayed while the computer system detects that the user's attention 710-16 is directed to the application window 702. In some embodiments, the title bar 716 is displayed even if the user's attention is not detected as being directed to the application window 702 (e.g., the title bar 716 is optionally displayed in FIGS. 7M-7R while the user is gazing at the virtual object 7028). In some embodiments, the title bar 716 (and, optionally, the application window 702 and/or other controls of the application window 702) are visually deemphasized (e.g., dimmed, decreased in size, or otherwise deemphasized) if (e.g., and/or while) the user's attention is not detected as being directed to the application window 702.

FIGS. 7T-7AH illustrate examples of conditionally displaying privacy indicators. FIG. 11 is a flow diagram of an exemplary method 1100 for maintaining a privacy indicator with an application window as the application window moves in the display area. The user interfaces in FIGS. 7T-7AH are used to illustrate the processes described below, including the processes in FIG. 11.

FIG. 7T (e.g., FIGS. 7T1, 7T2 and 7T3) illustrates detecting that the user's attention 710-17 continues to be directed to the application window 702. In some embodiments, while the user's attention 710-17 is directed to the application window 702, the application associated with the application window 702 begins accessing, using, and/or collecting sensor data from one or more sensors of the computer system. For example, the application associated with the application window 702 accesses one or more of a microphone, a camera, a location, or other sensors of the computer system, that provides the application with access to sensitive, or private, data of the user. In some embodiments, in response to detecting that the application is accessing one or more of the sensors that provides access to sensitive data of the user, the computer system displays a privacy indicator 718-1 above the application window 702, while optionally also maintaining display of the title bar 716.

In some embodiments, the privacy indicator 718-1 is displayed with a first set of properties that indicates which of the one or more sensors are being accessed by the application associated with application window 702. For example, the privacy indicator 718-1 is displayed with a respective color that corresponds to the type of sensor (e.g., a red indicator represents a camera is being accessed, an orange indicator represents a microphone is being accessed, and/or a blue indicator represents location data is being accessed). It will be understood that different visual properties and/or colors may be assigned to particular sensors to indicate which of the sensors are currently being accessed by the application associated with the application window 702.

In some embodiments, the privacy indicator 718-1 is displayed even if the user is not currently directing the user's attention to the application window 702. As such, the computer system indicates to the user when an application is accessing sensitive data using one or more sensors of the computer system whether or not the user is currently interacting with, or paying attention to, the application window 702.

Figures 7U, 7V:
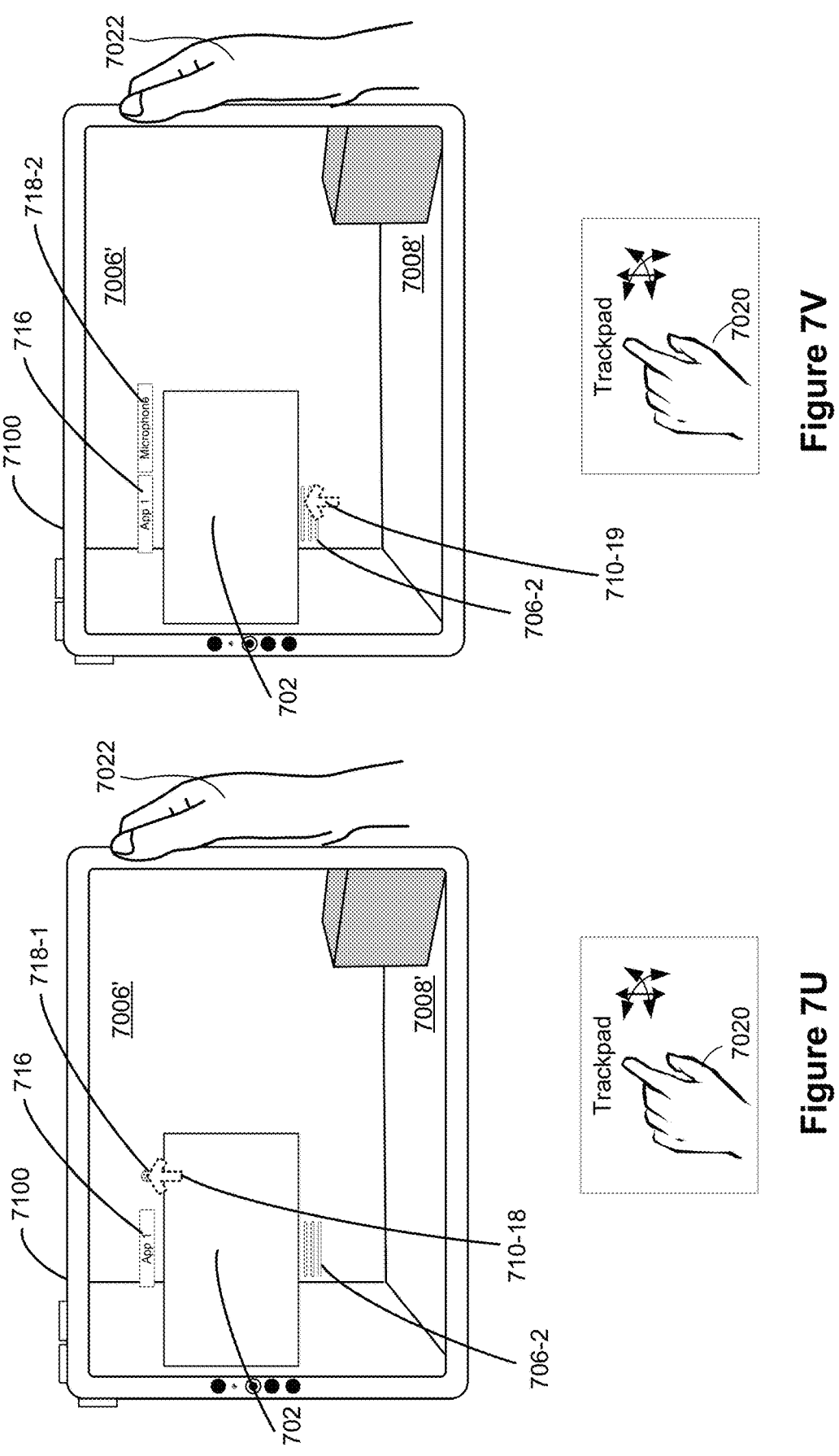

FIG. 7U illustrates the computer system 101 detecting that the user's attention 710-18 is directed to the privacy indicator 718-1. In some embodiments, in response to detecting that the user's attention 710-18 is directed to the privacy indicator 718-1, the computer system displays additional information about the sensor(s) being accessed by the application associated with the application window 702, as illustrated in FIG. 7V. For example, the privacy indicator 718-1 is expanded into an expanded privacy indicator 718-2 which includes a textual indication (e.g., and/or an icon representing the sensor) that the microphone is being accessed by the application associated with application window 702. In some embodiments, the expanded privacy indicator 718-2 optionally provides selectable options for the user to disable access to the sensor, such that the application is no longer able to use the sensor to collect sensitive data. In some embodiments, in accordance with a determination that two or more sensors are currently being accessed by the application, the expanded privacy indicator 718-2 lists, or otherwise indicates, each of the sensors that are being accessed by the application(s) associated with the application window 702.

FIG. 7V illustrates detecting that the user's attention 710-19 is directed to the grabber 706-2 for the application window 702. In some embodiments, as illustrated in FIG. 7W, in response to detecting that the user's attention 710-19 is directed to the grabber 706-2 (e.g., in FIG. 7V), the computer system displays a grabber 706-3 (e.g., updates the display of the grabber 706-2 to the grabber 706-3, and/or replaces display of the grabber 706-2 with the grabber 706-3) with a color distinct from the color of grabber 706-2 to indicate that the computer system detects that the user's attention was directed to grabber 706-2 (e.g., and is directed to the currently displayed grabber 706-3), similar to the change in visual properties of the resize affordance 708-2 described with reference to FIGS. 7F-7G.

Figures 7W, 7X:
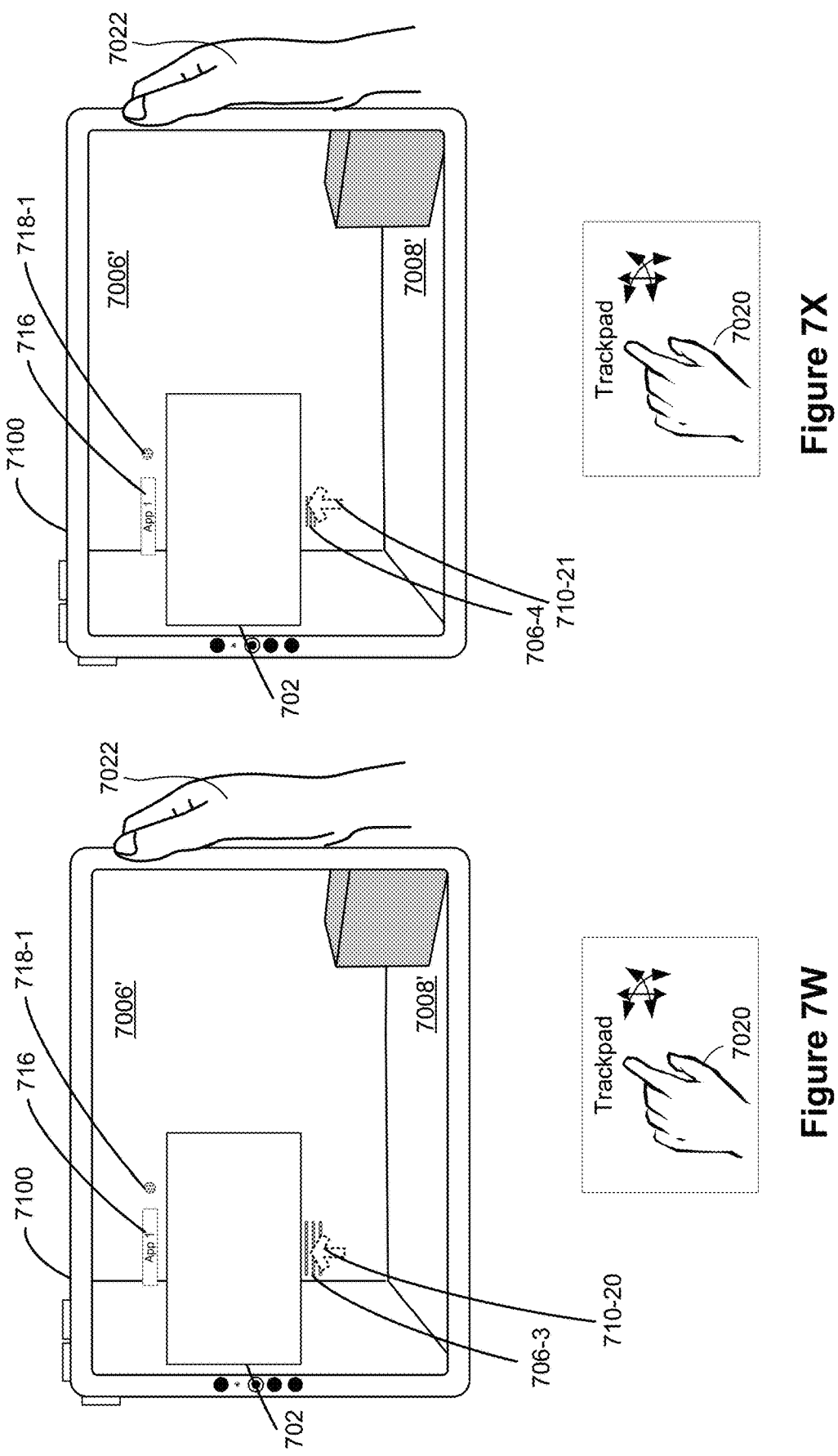

FIG. 7X illustrates detecting a user input via the user's hand 7020 selecting a grabber 706-4 (e.g., which is an updated display of the grabber 706-3 and/or replaces the grabber 706-3). In some embodiments, the user input is an air tap gesture, an air pinch gesture, or another selection gesture (e.g., air gesture) detected while the user is gazing at grabber 706-4. In some embodiments, in response to detecting the user input selecting the grabber 706-4, the user input continues by moving the user's hand 7020 to drag (e.g., via an air drag gesture) the grabber 706-4 from its respective position to another position within the three-dimensional environment. In some embodiments, the user is enabled to move the grabber 706-4 and associated application window 702 in three dimensions, including changing the position of the application window 702 in a horizontal direction (e.g., left and/or right), in a vertical direction (e.g., up and/or down), and/or in a depth (e.g., forwards and/or backwards) in the three-dimensional environment.

Figures 7Y, 7Z:
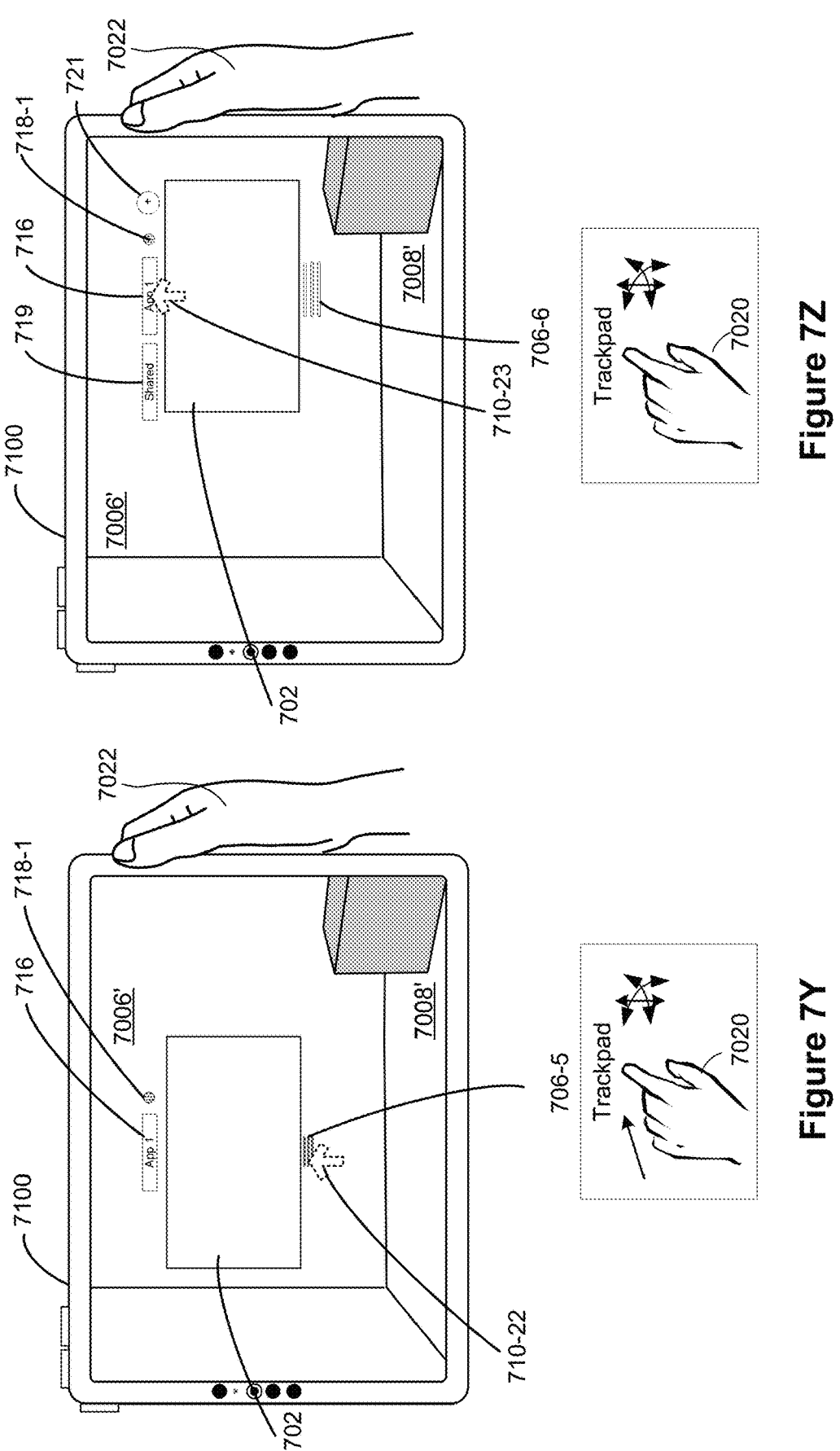
Figure 7A:
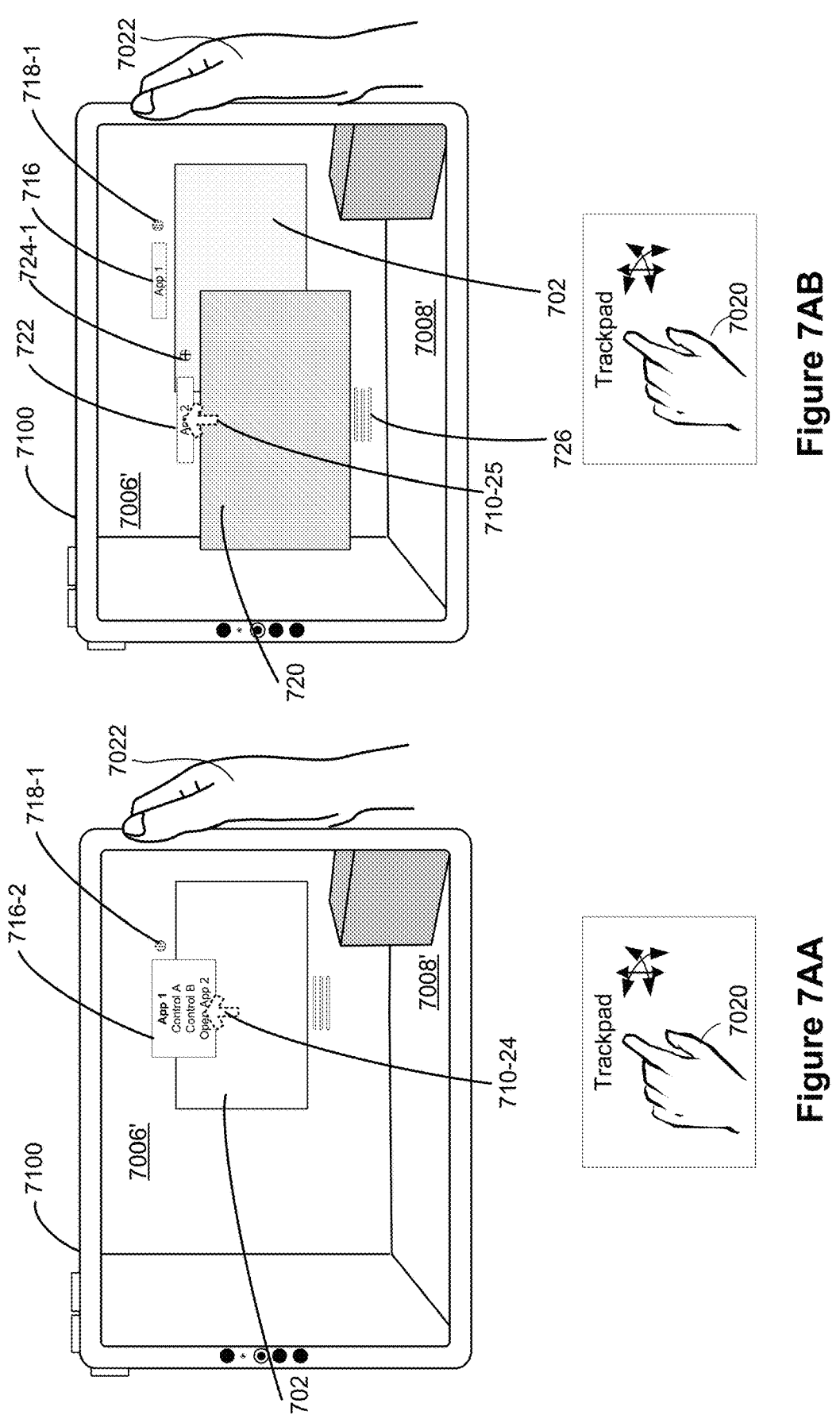
Figure 7A:
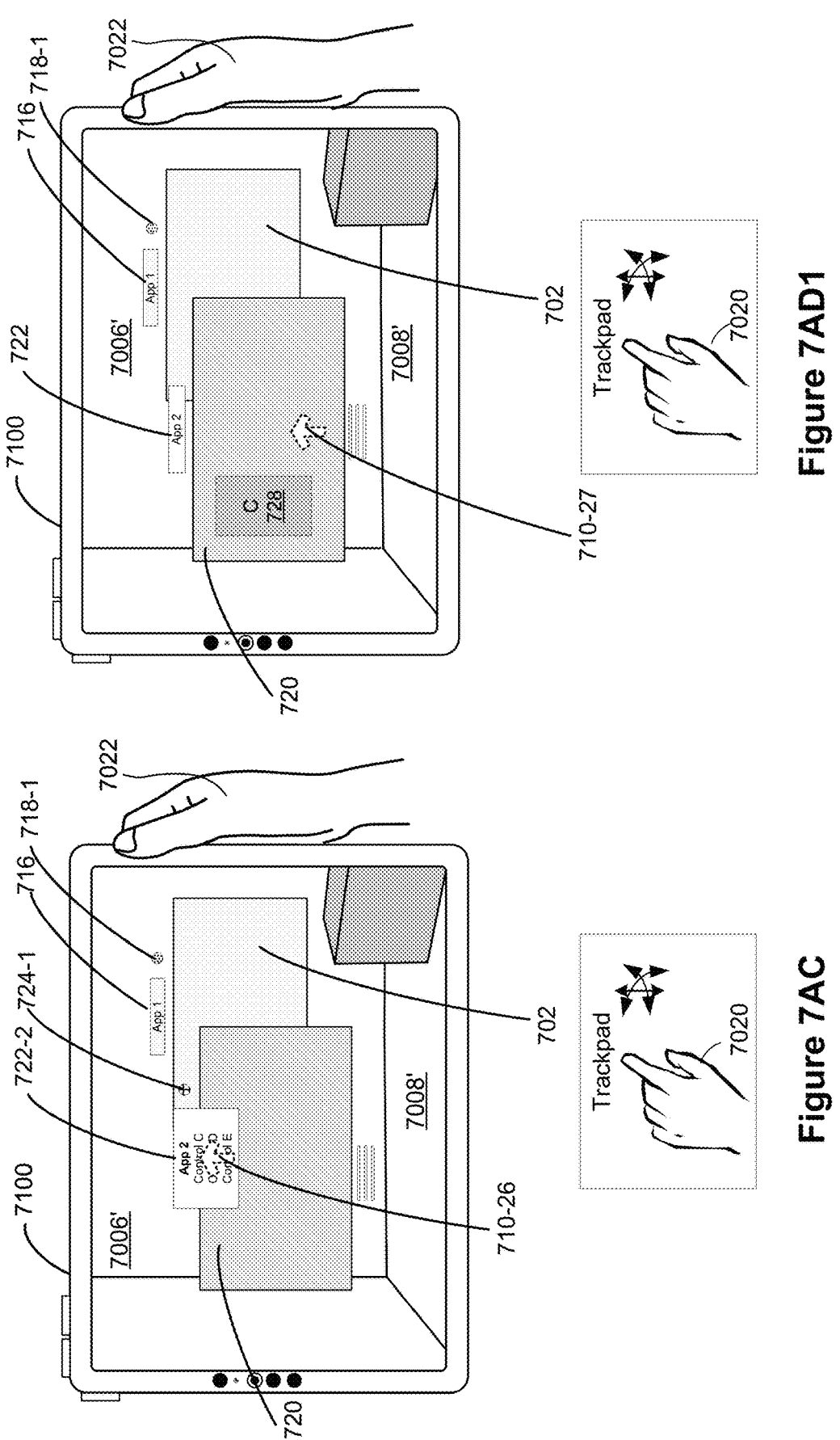
Figure 7A:
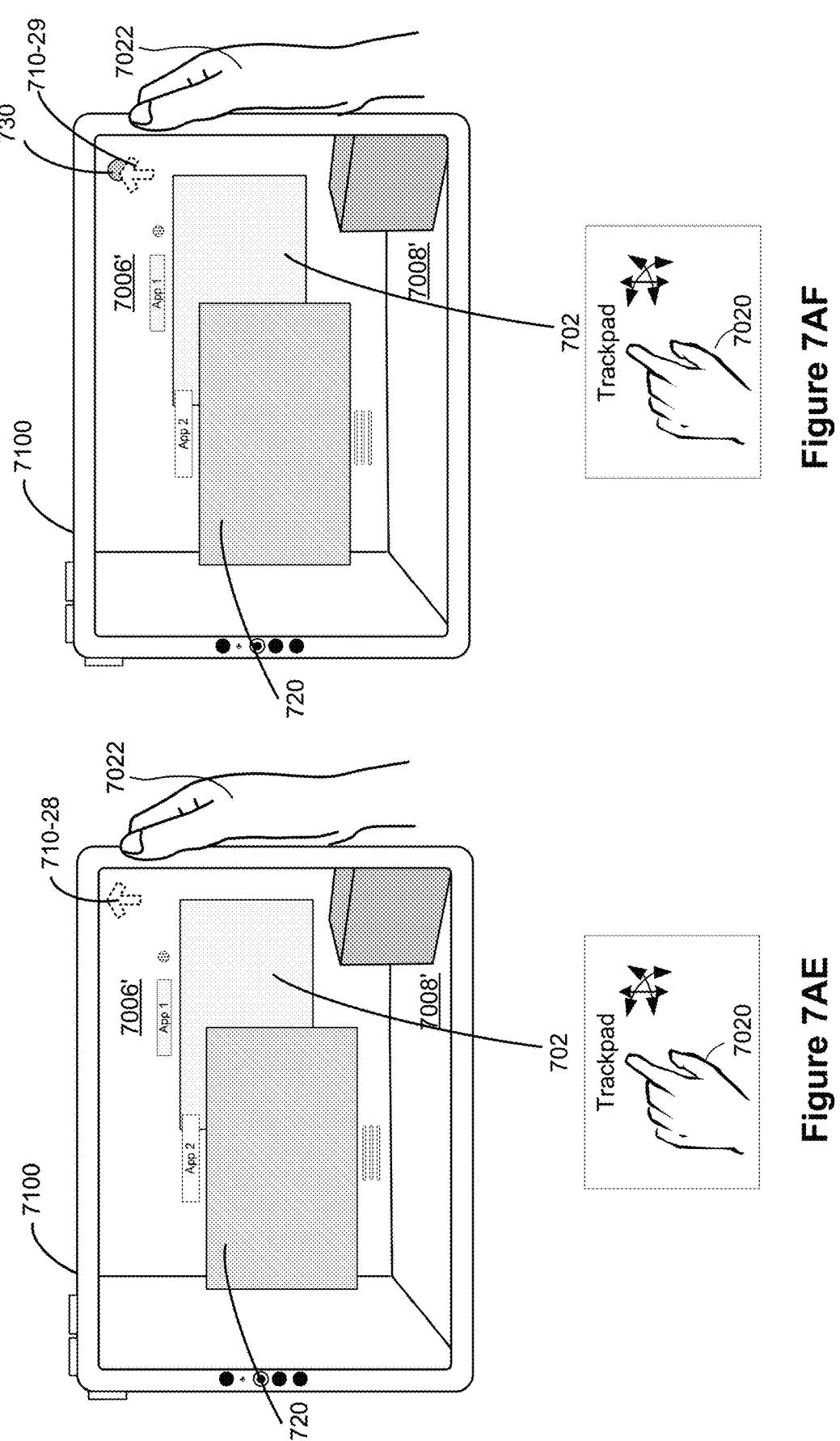
Figure 7A:
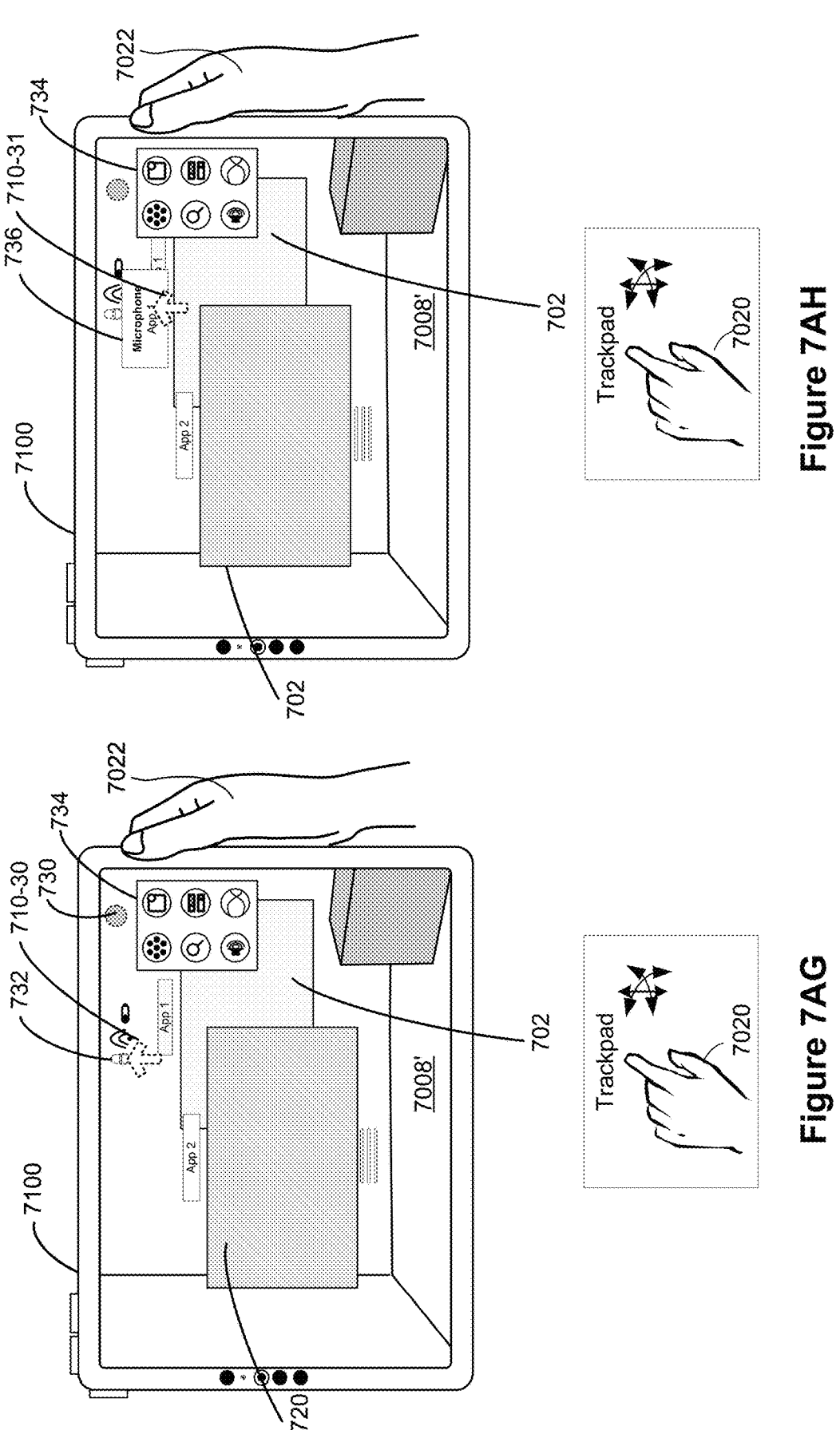
Figure 7A:
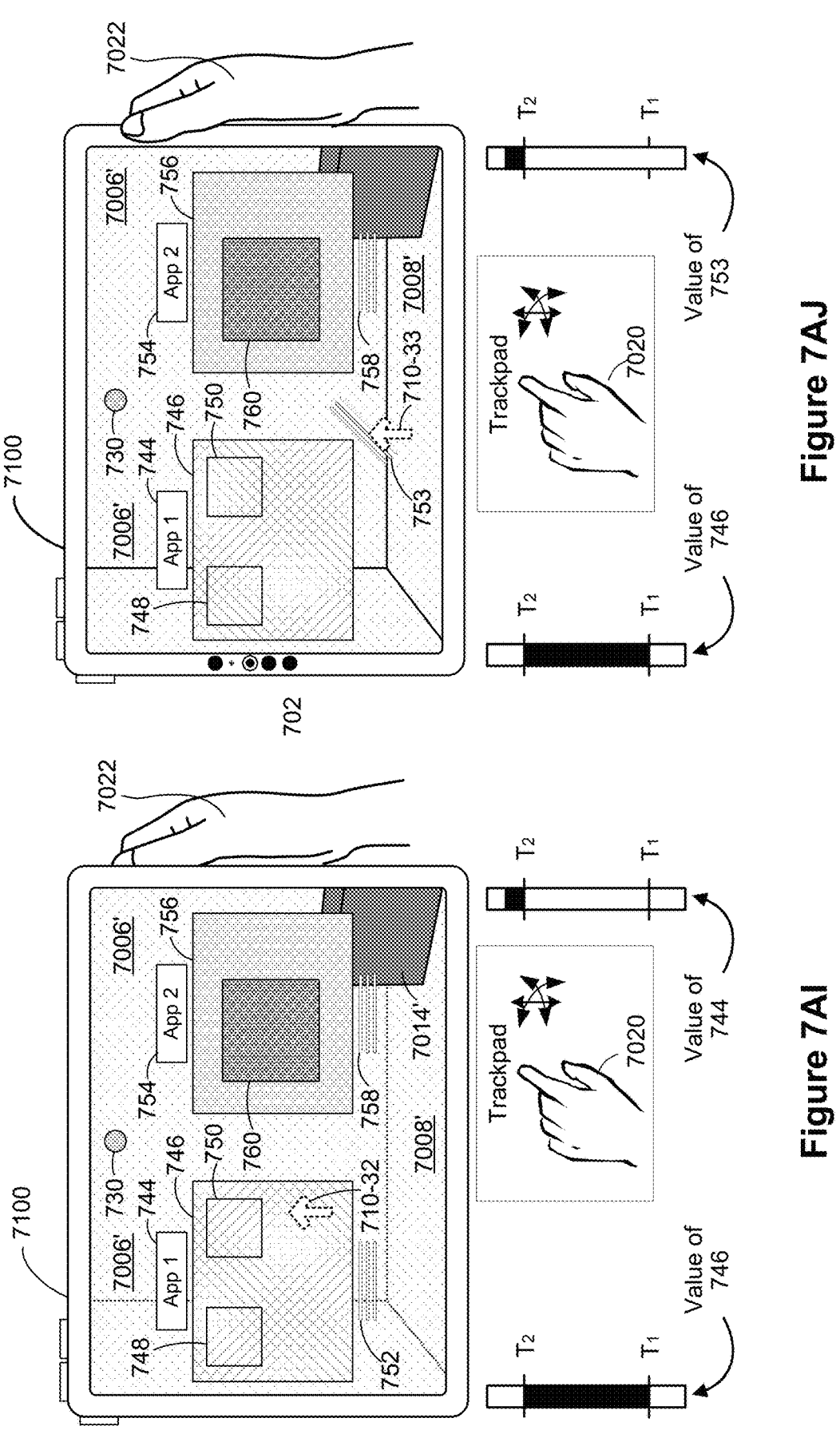
Figure 7A:
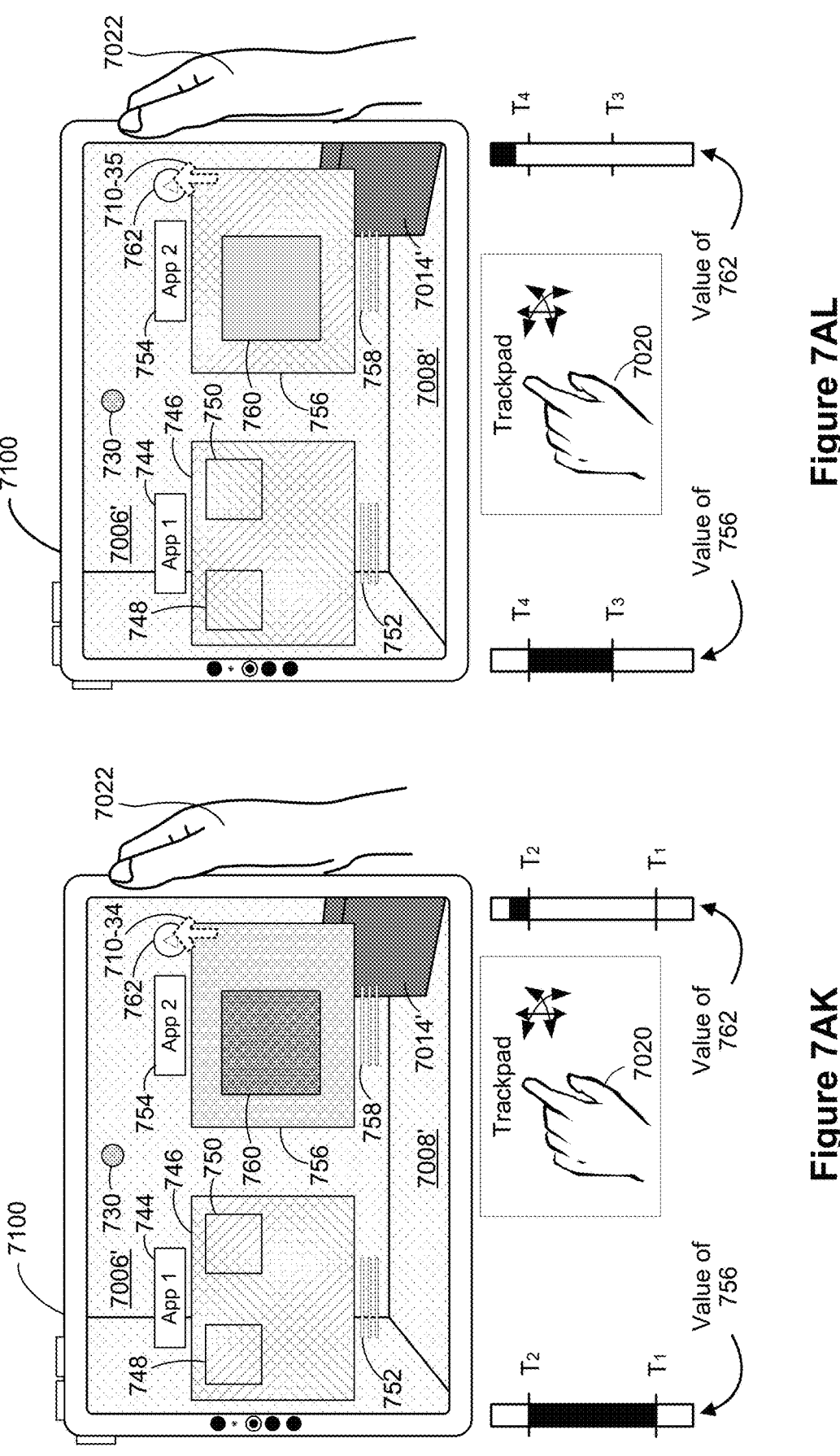
Figure 7A:
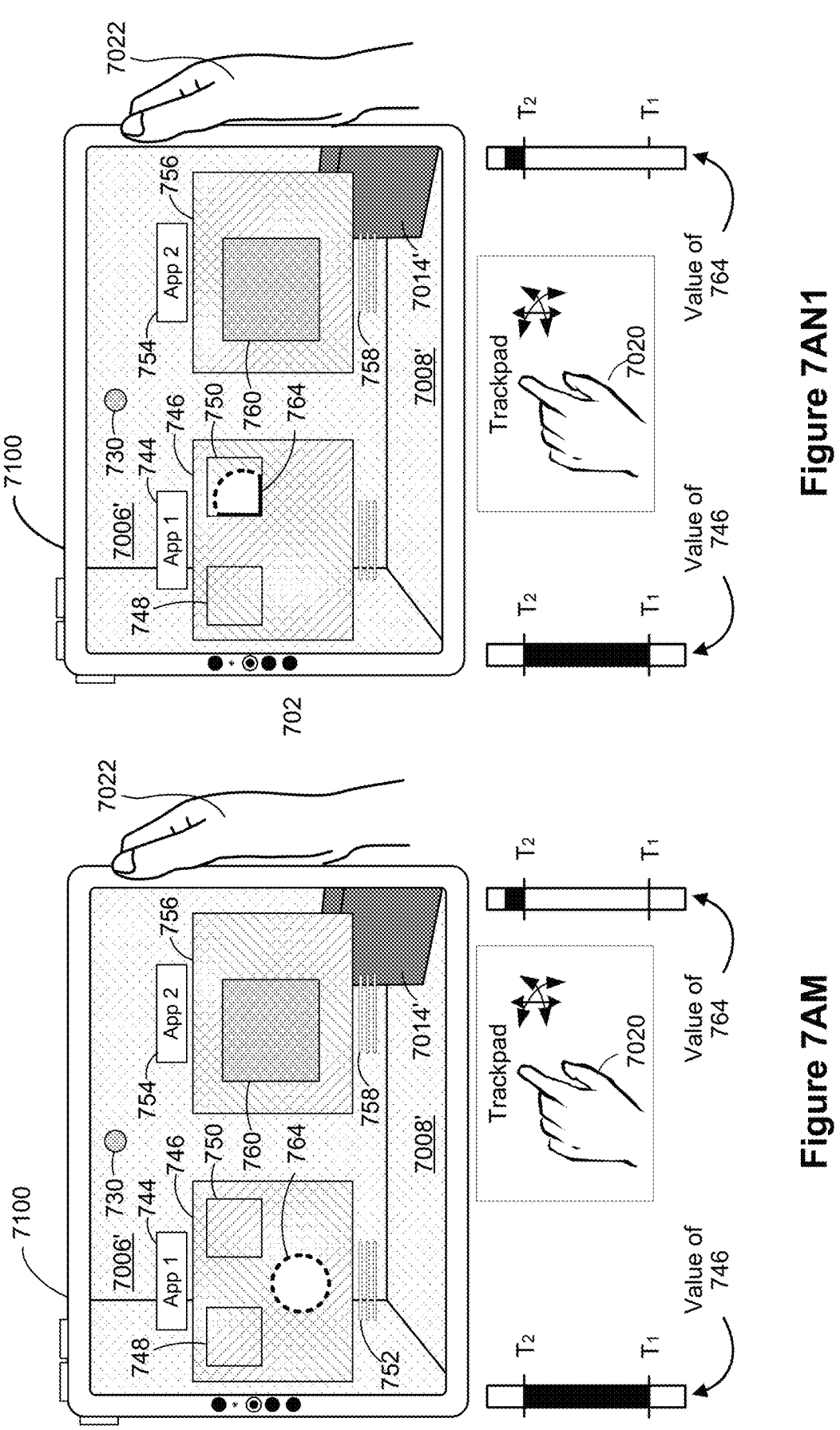
Figure 7A:
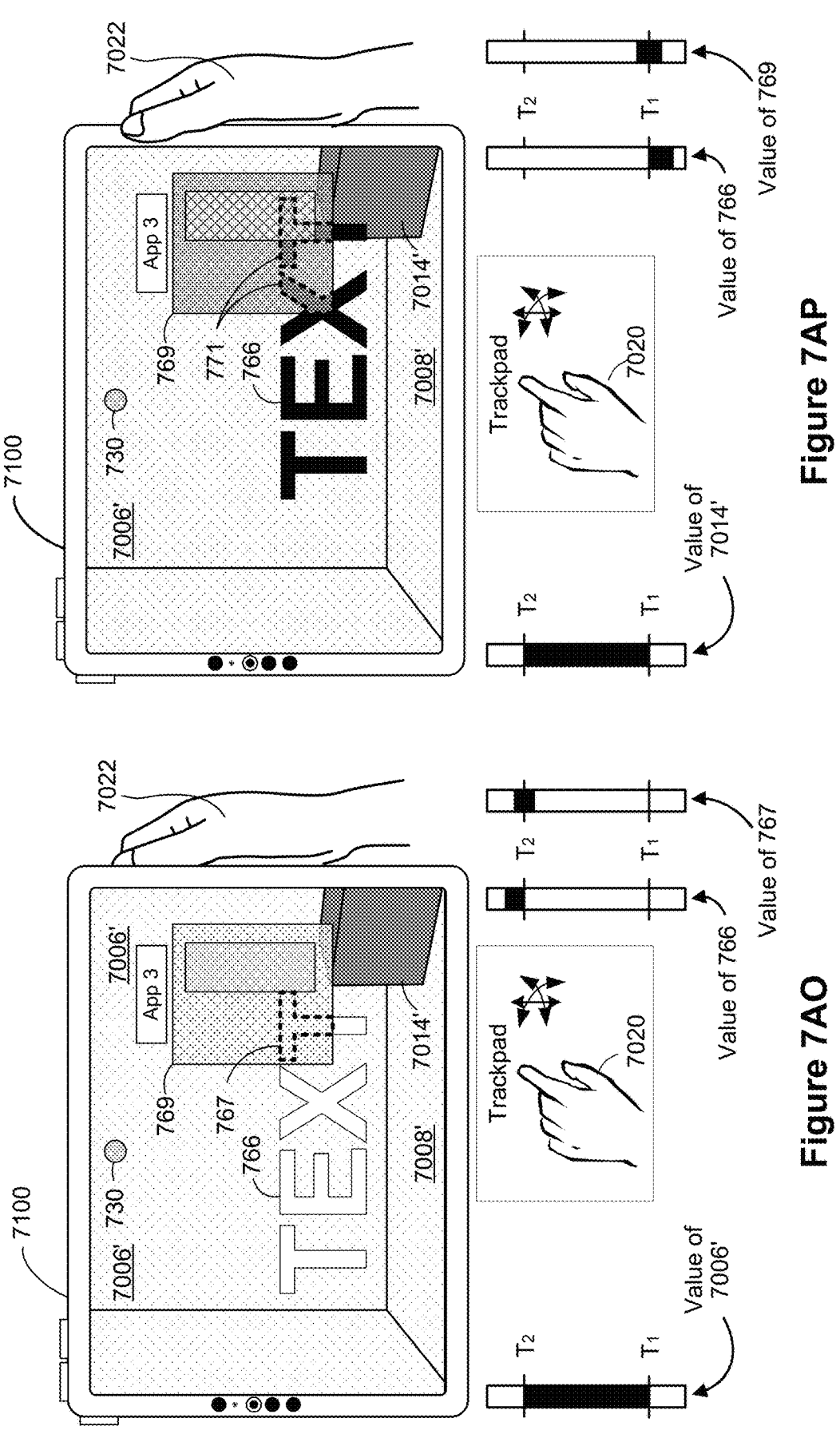
Figure 7A:
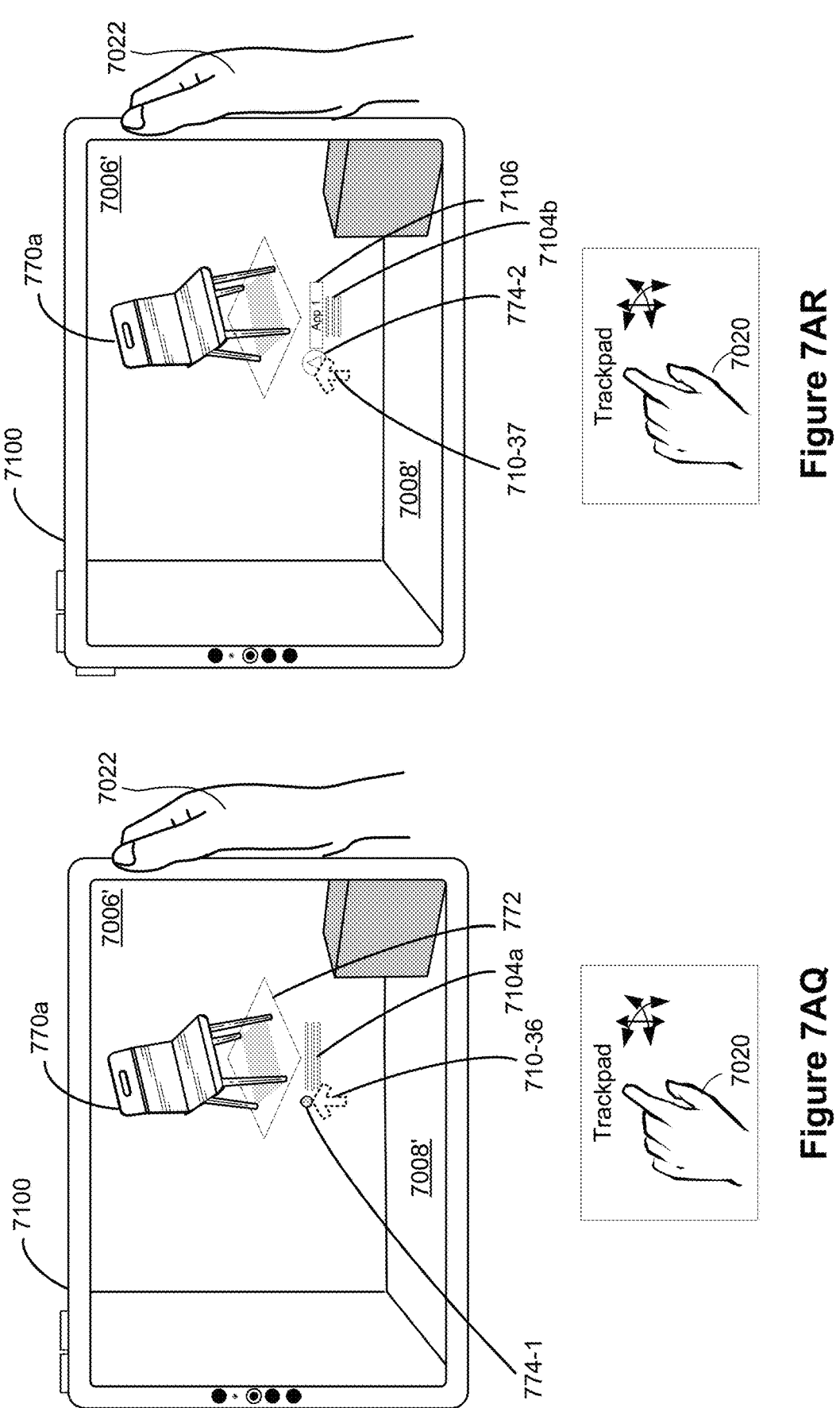
Figure 7A:
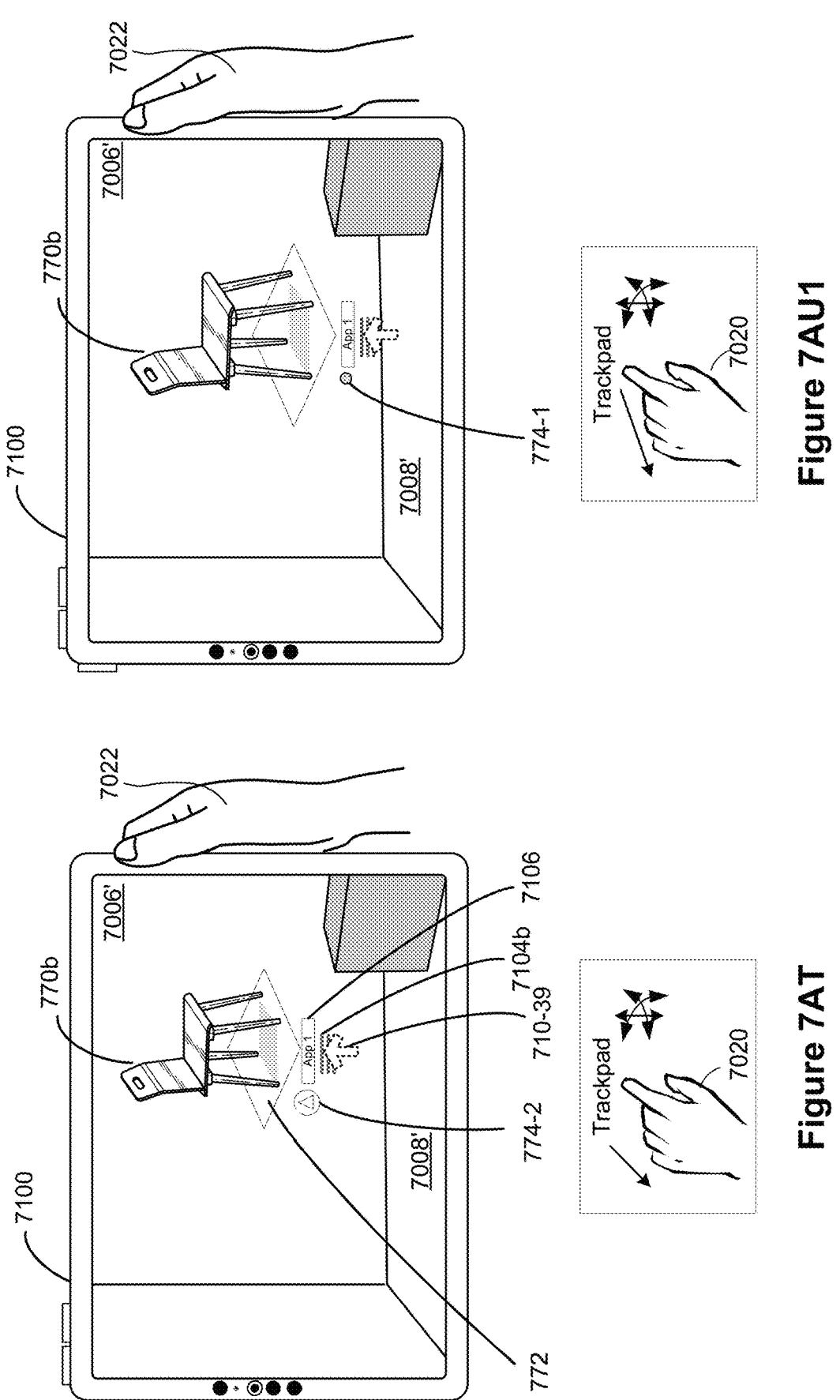
Figure 7A:
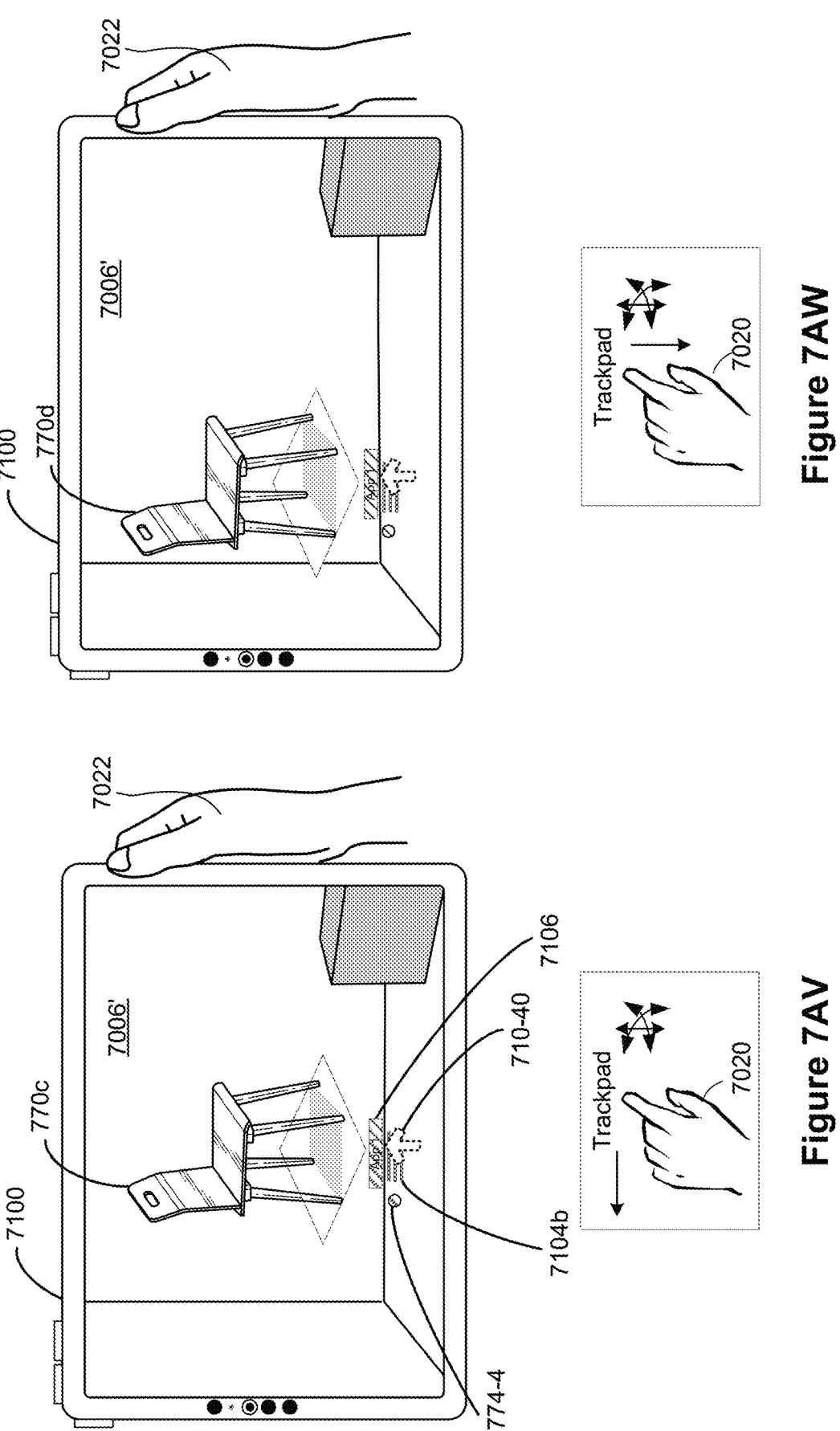
Figure 7A:
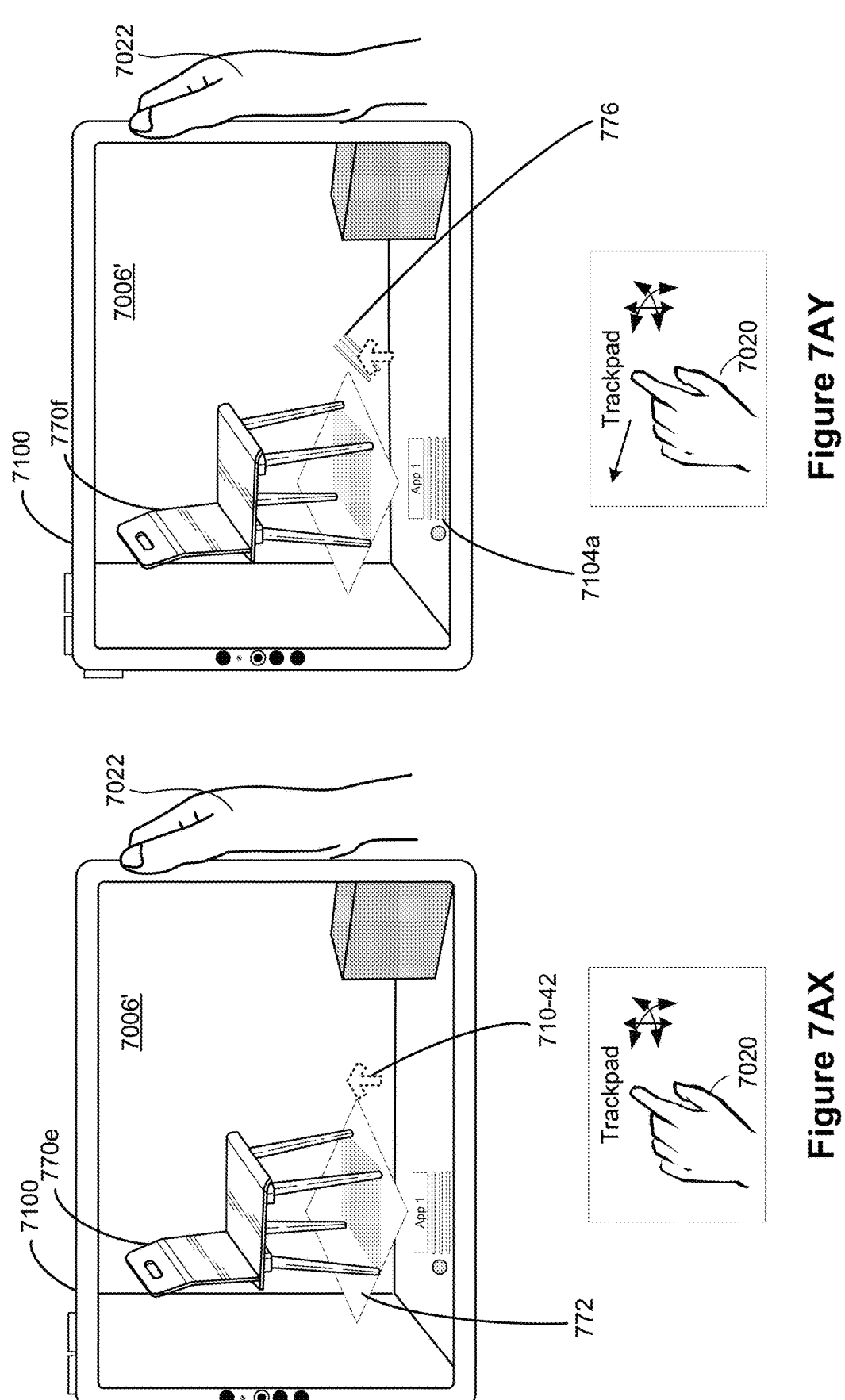
Figure 7A:
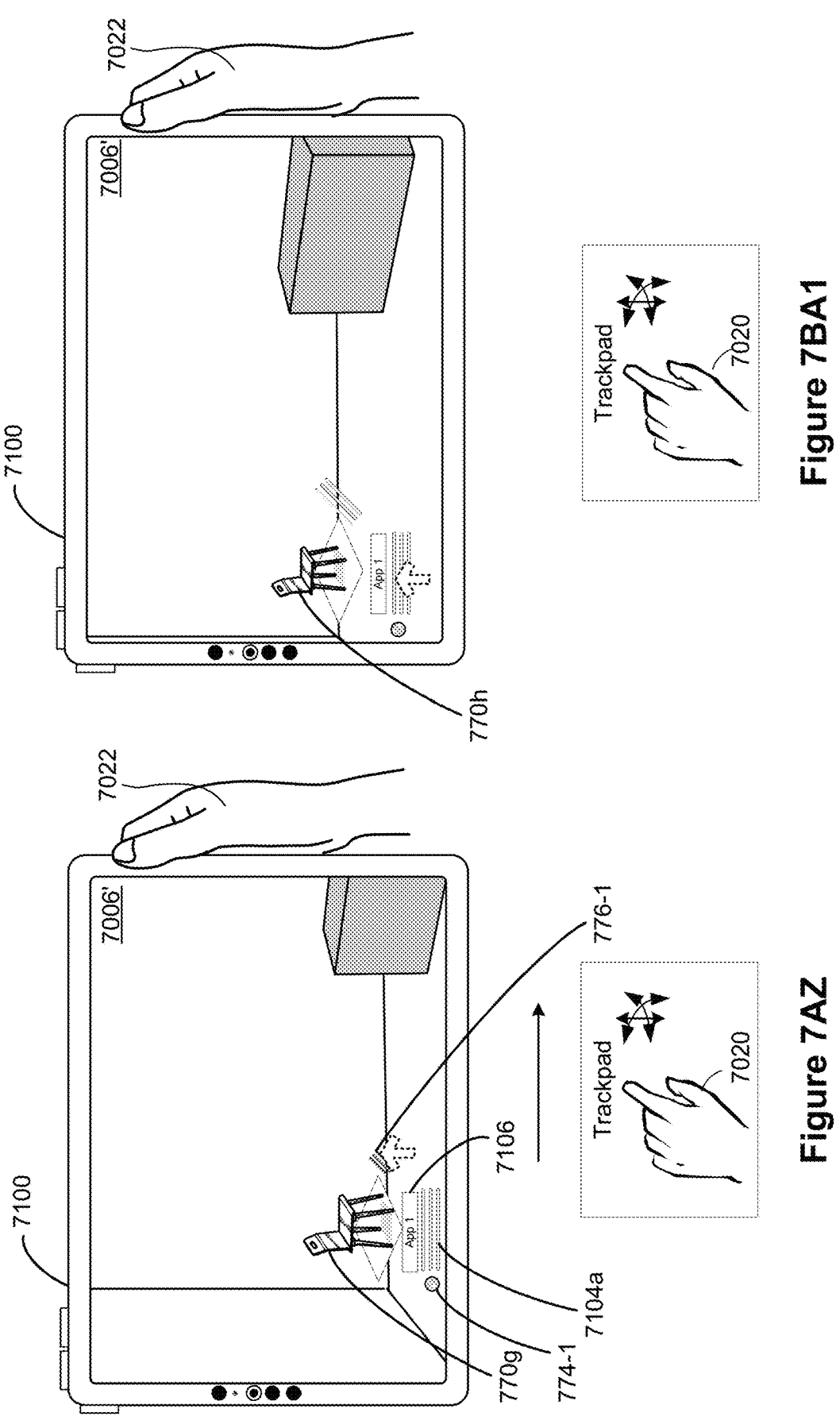
Figure 7B:
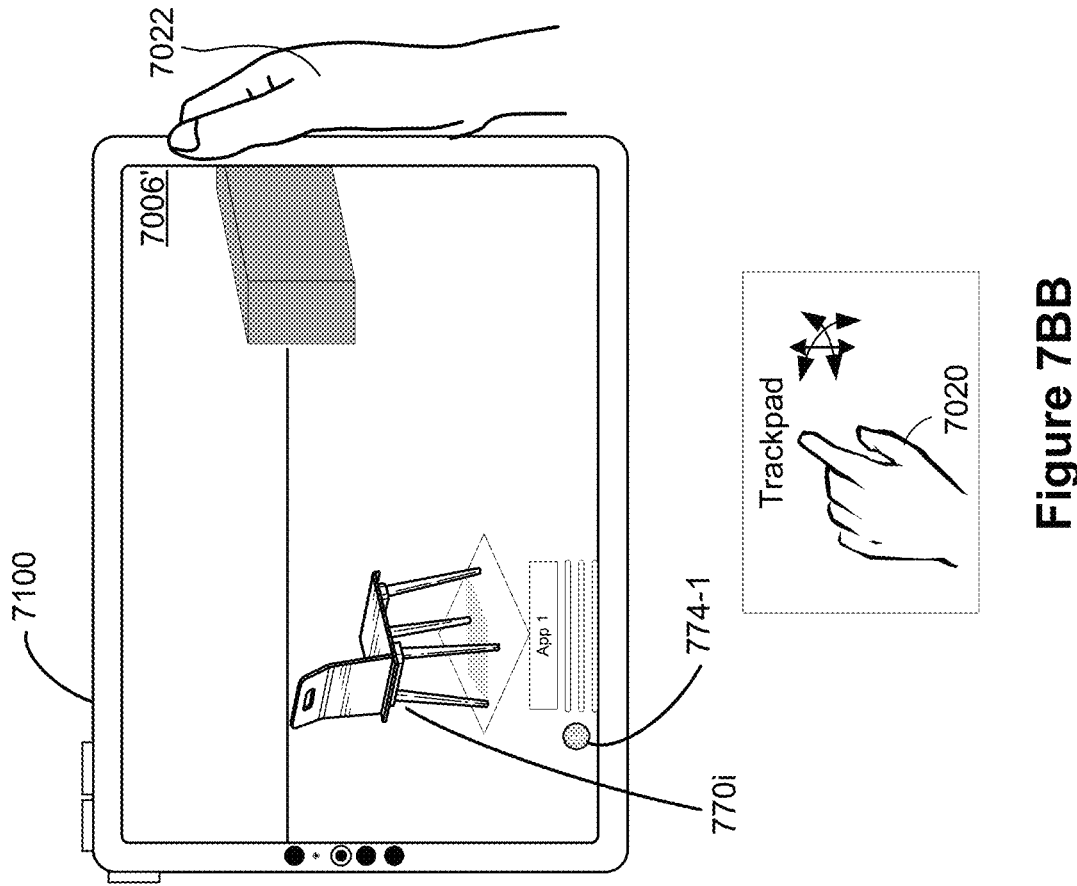
Figure 7B:
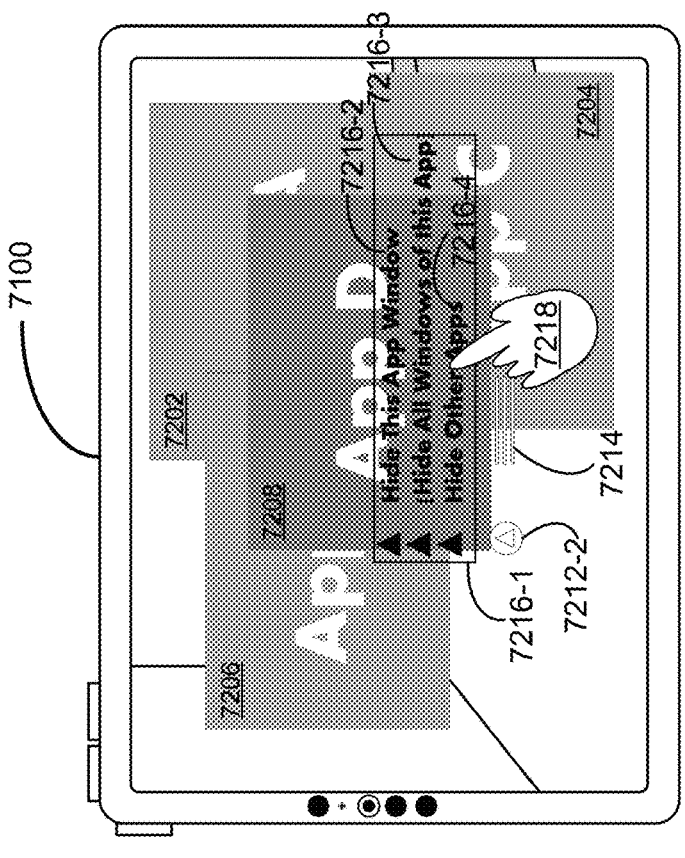
Figure 7B:
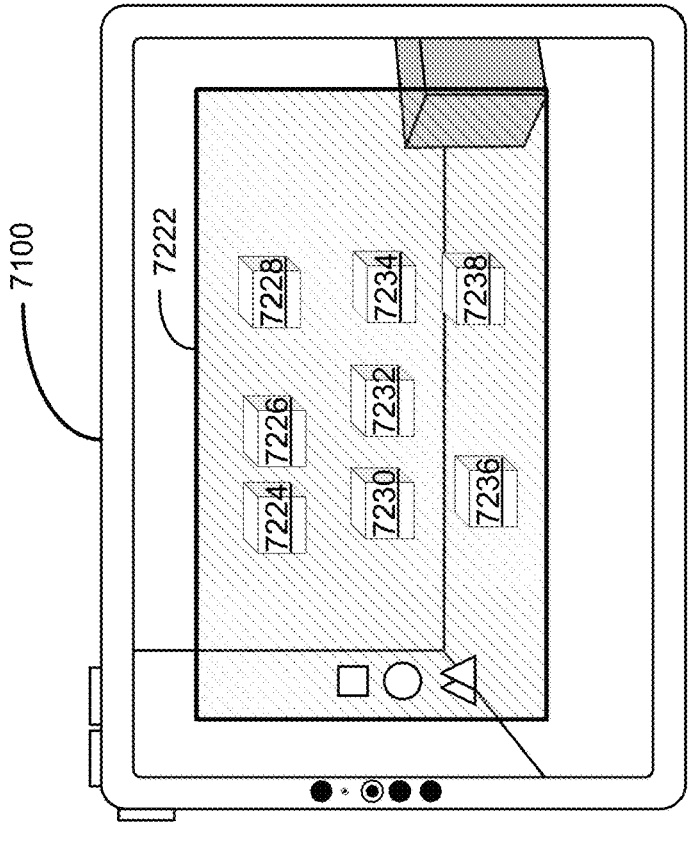
Figure 7B:
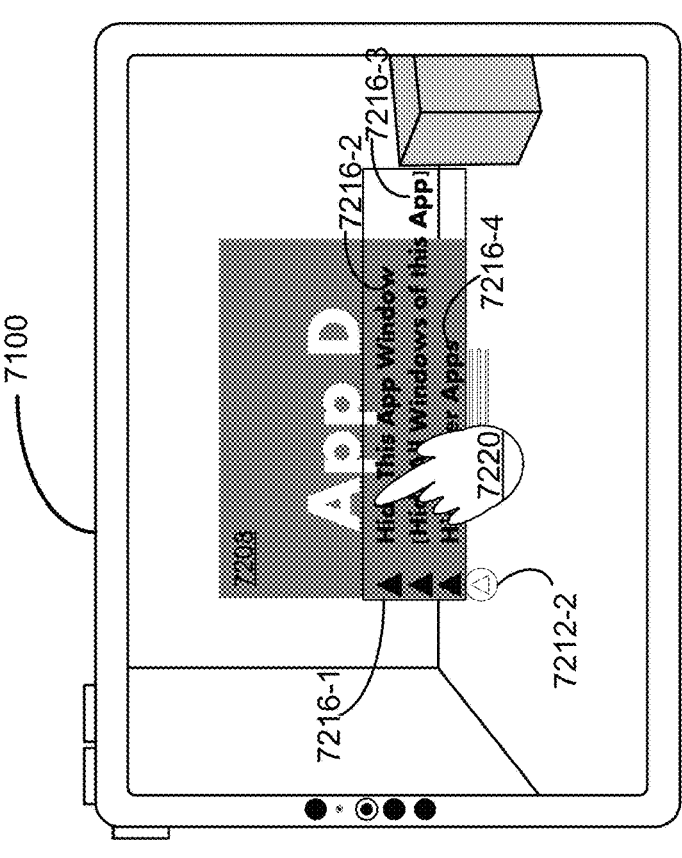
Figure 7B:
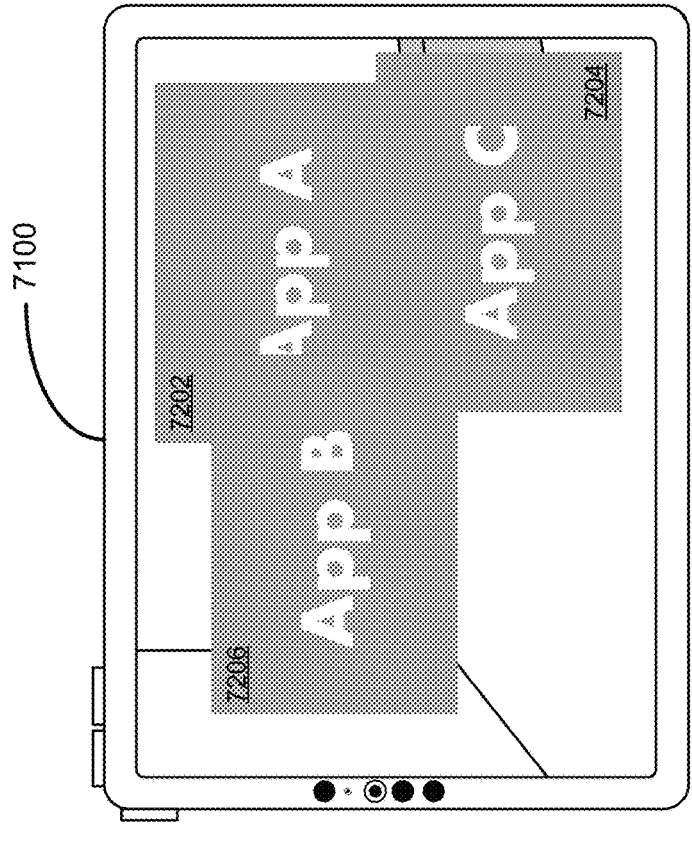
Figure 7B:
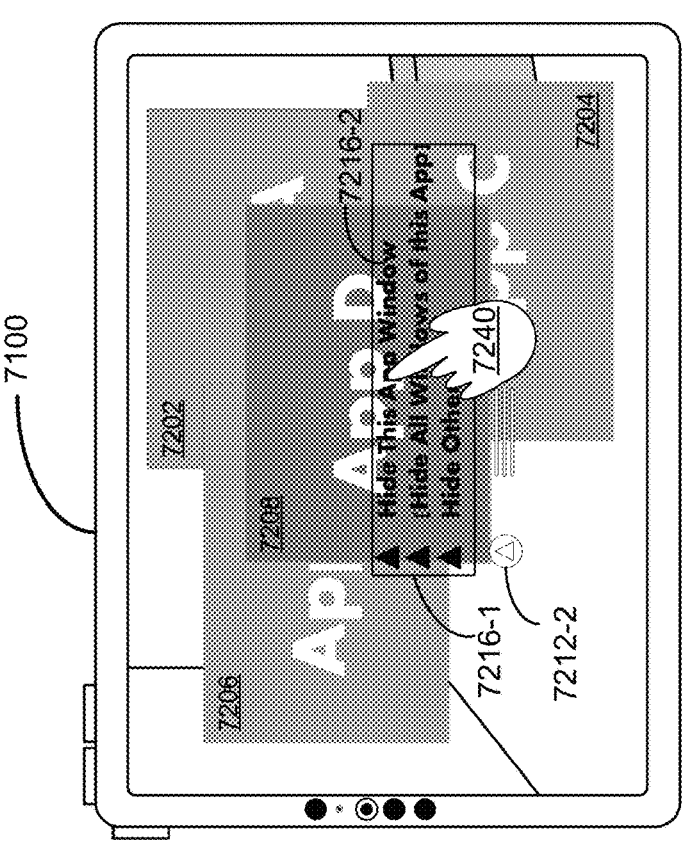
Figure 7B:
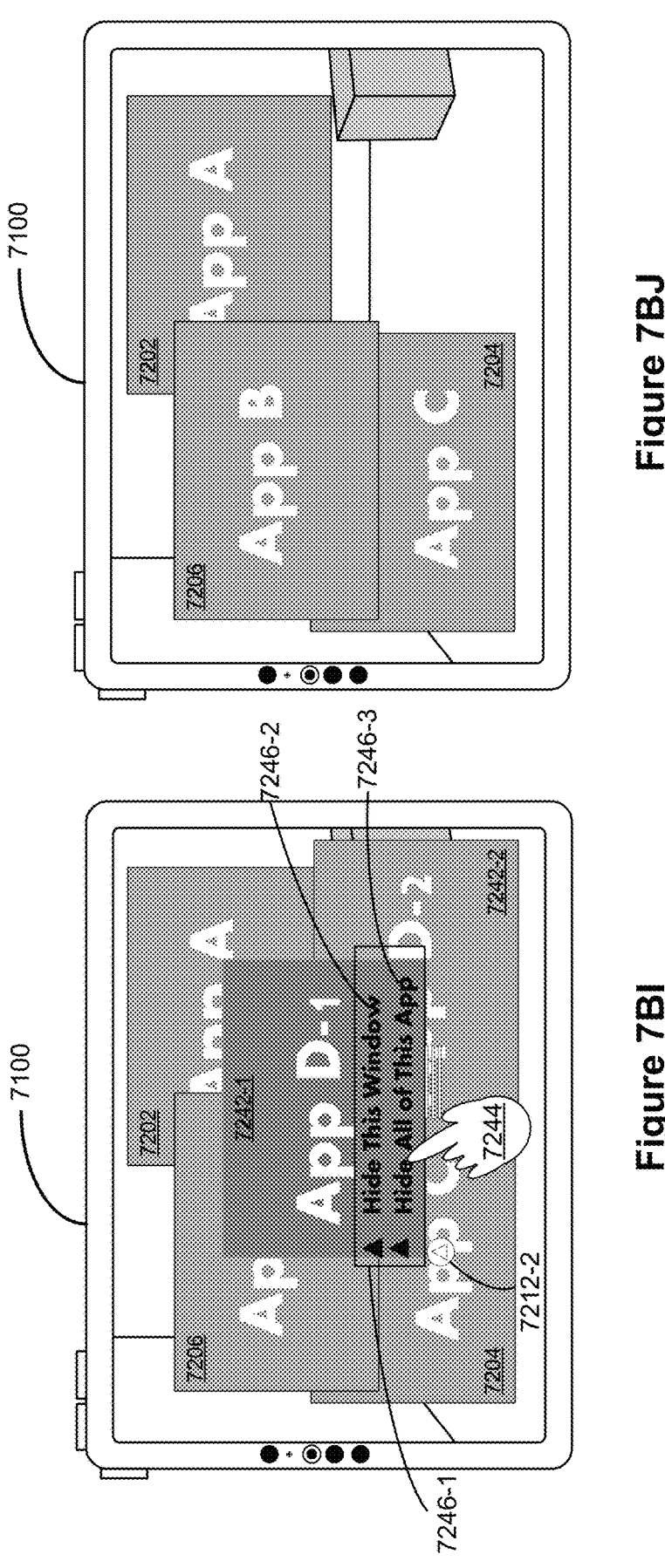
Figure 7B:
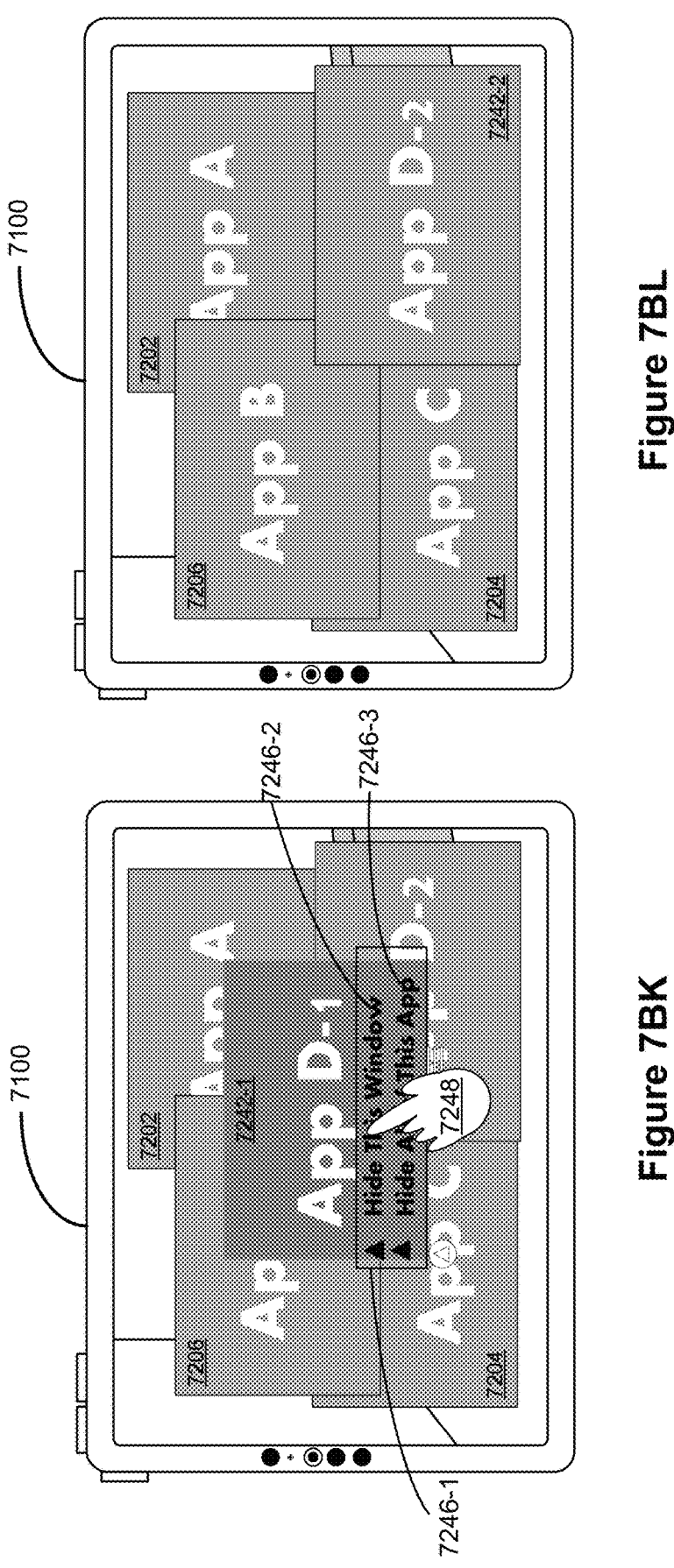
Figure 7B:
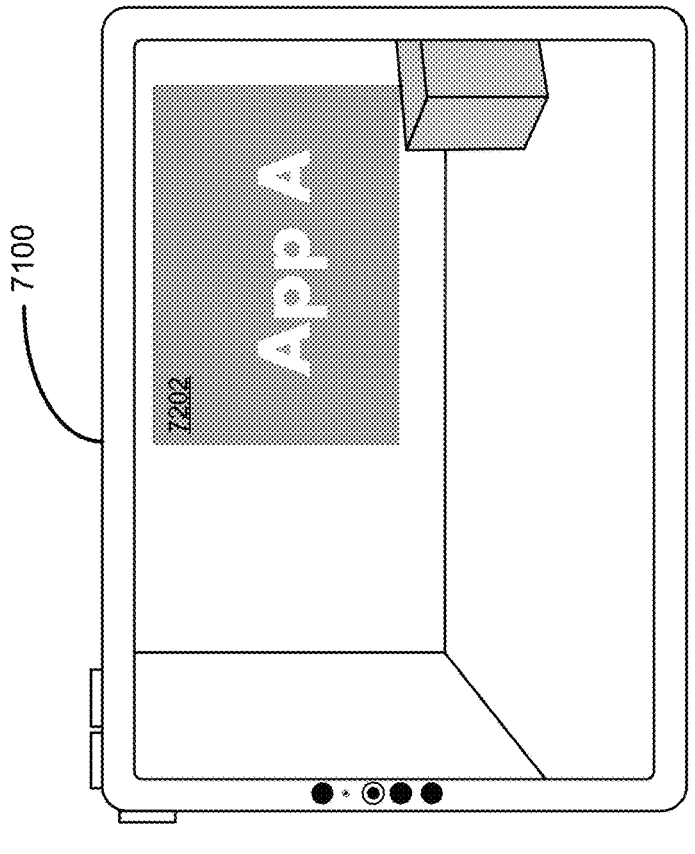
Figure 7B:
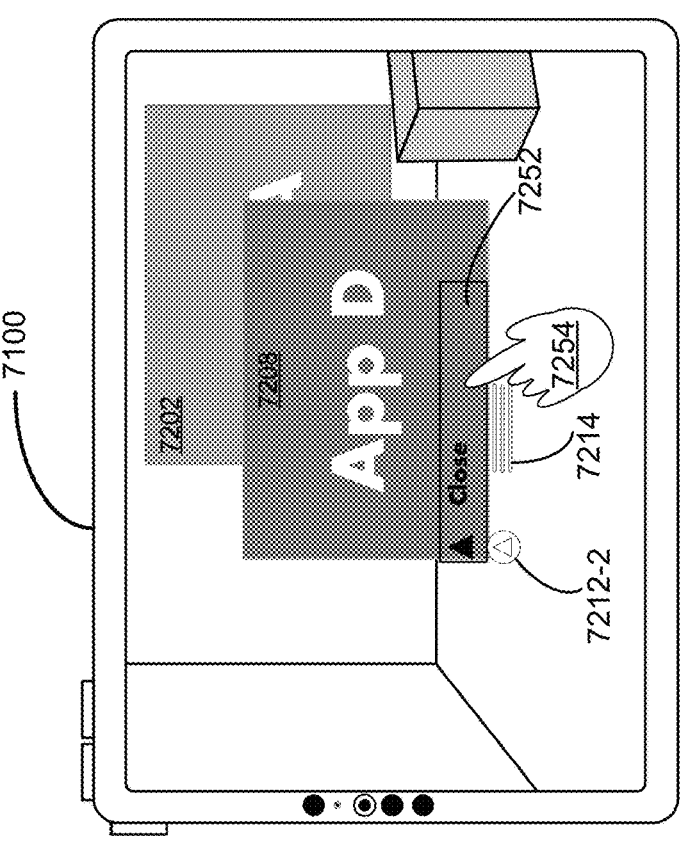
Figure 7B:
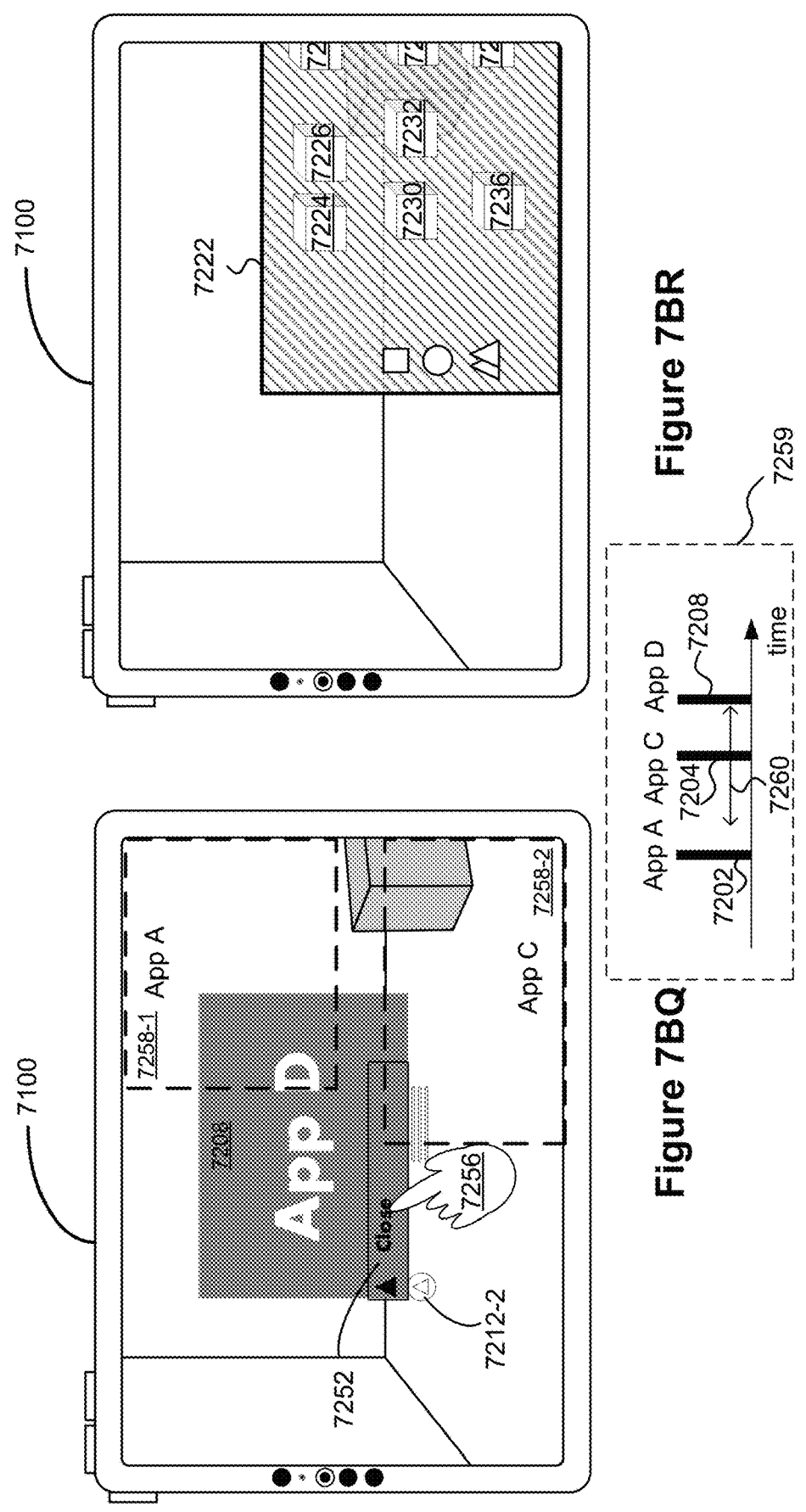
Figure 7B:
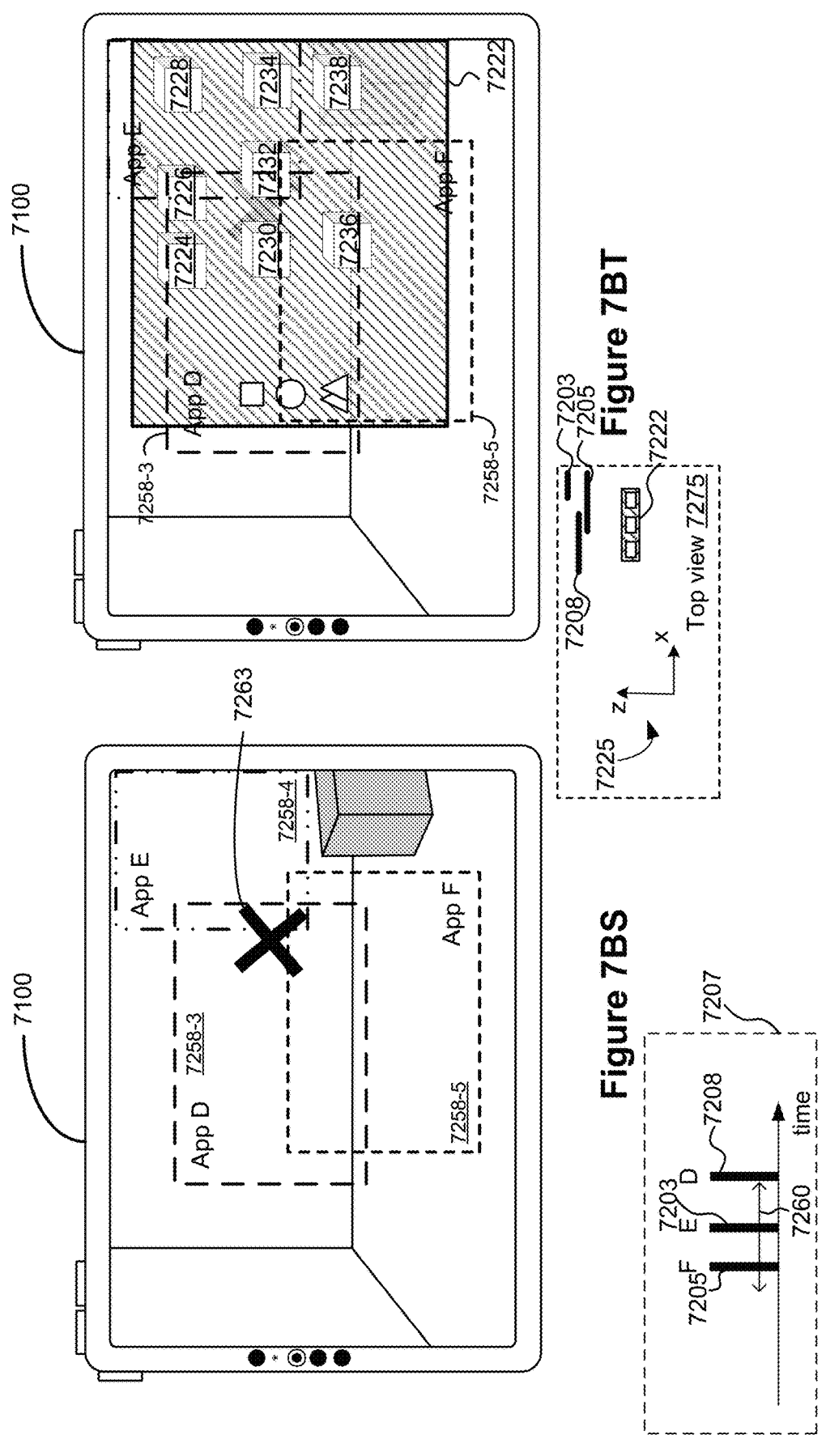
Figure 7B:
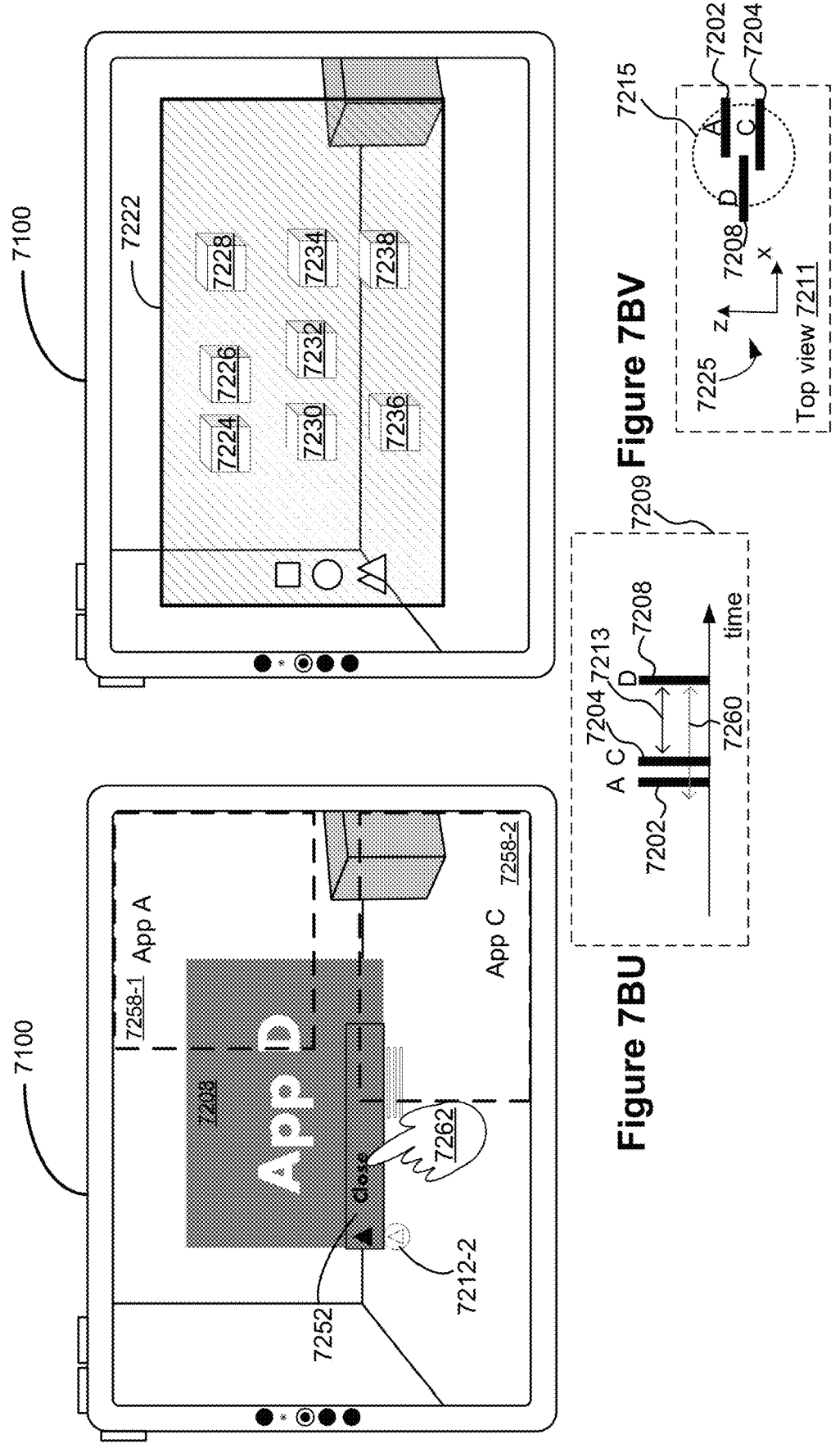
Figure 7B:
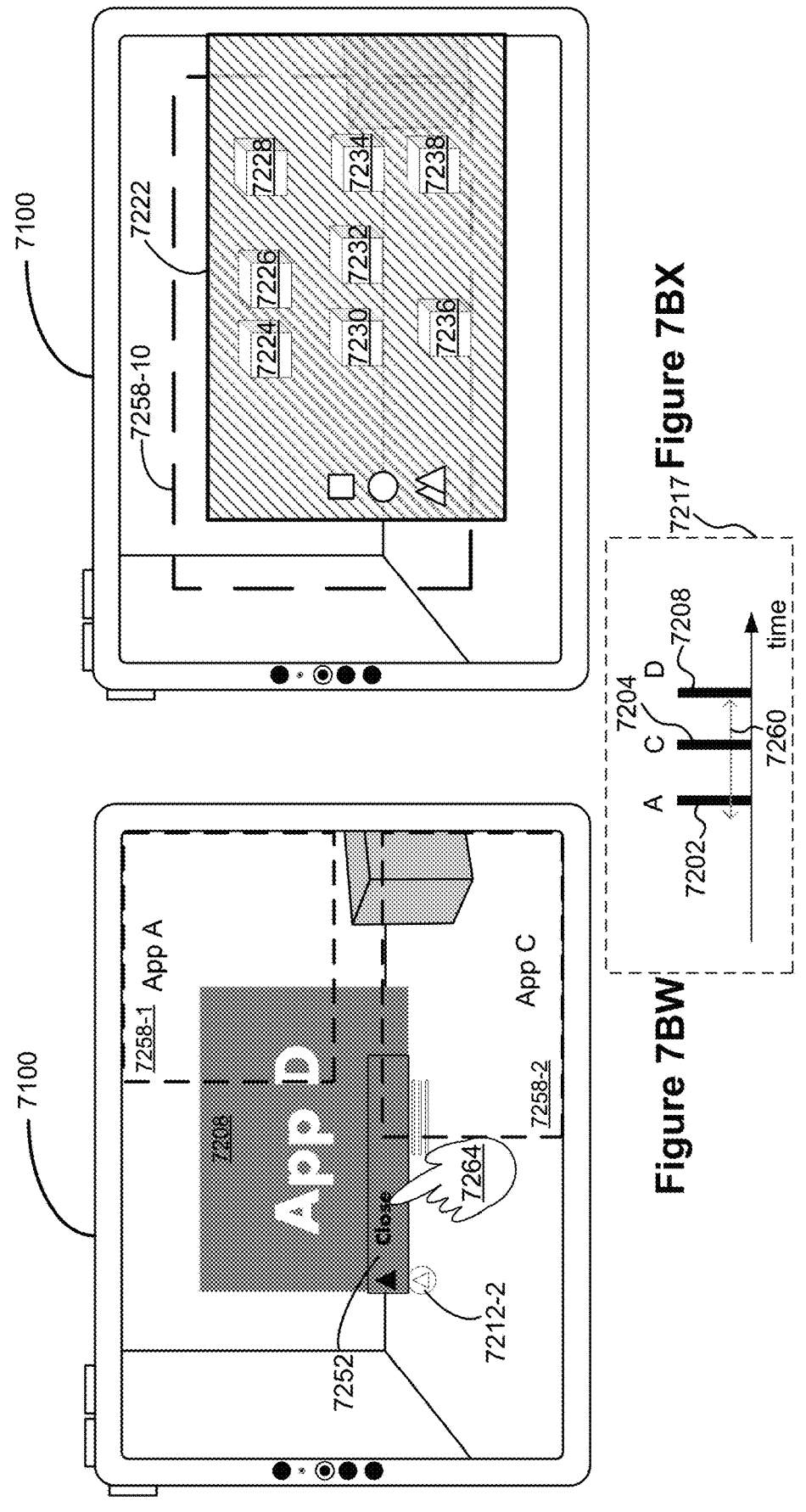
Figure 7B:
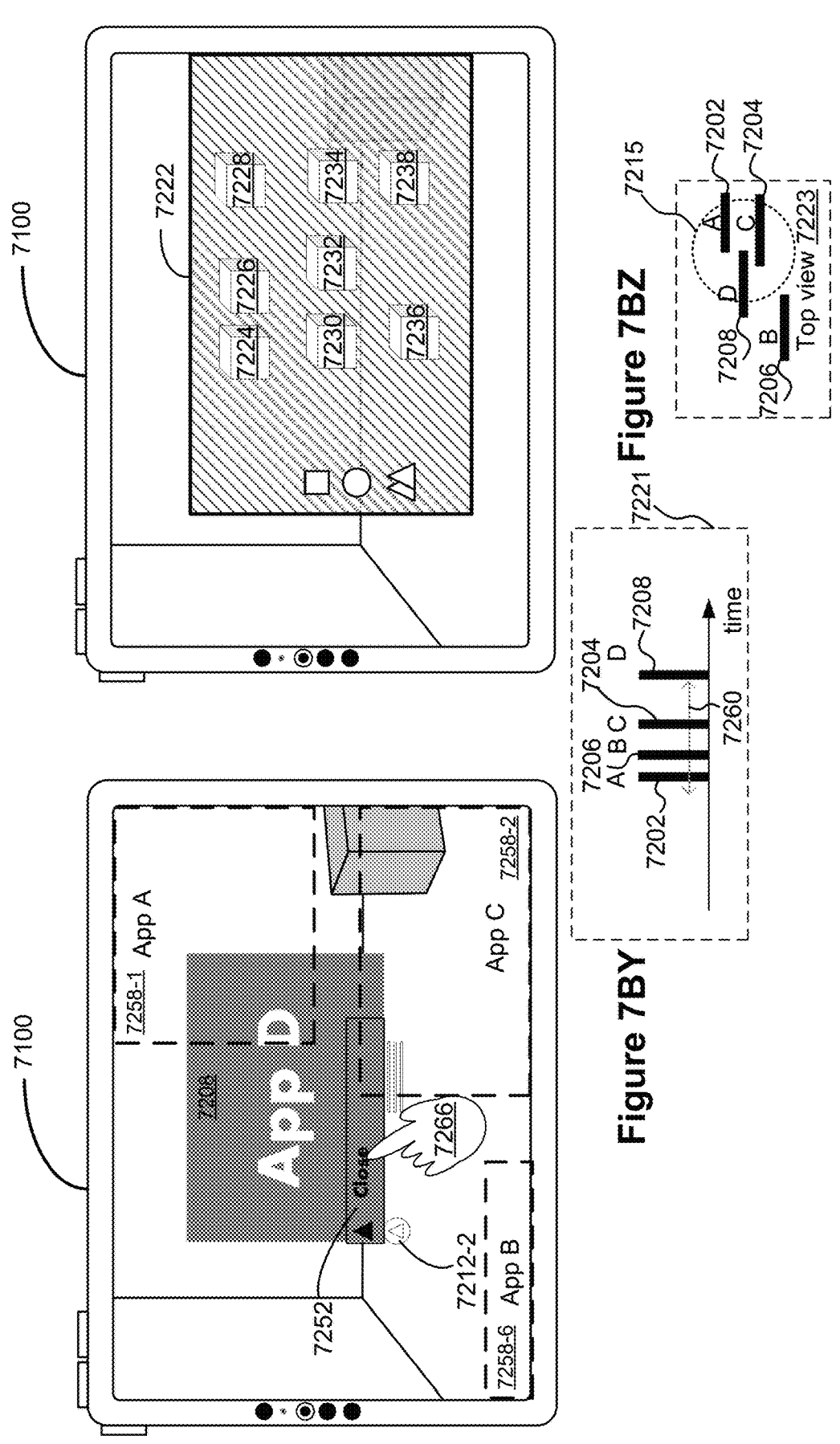
Figure 7C:
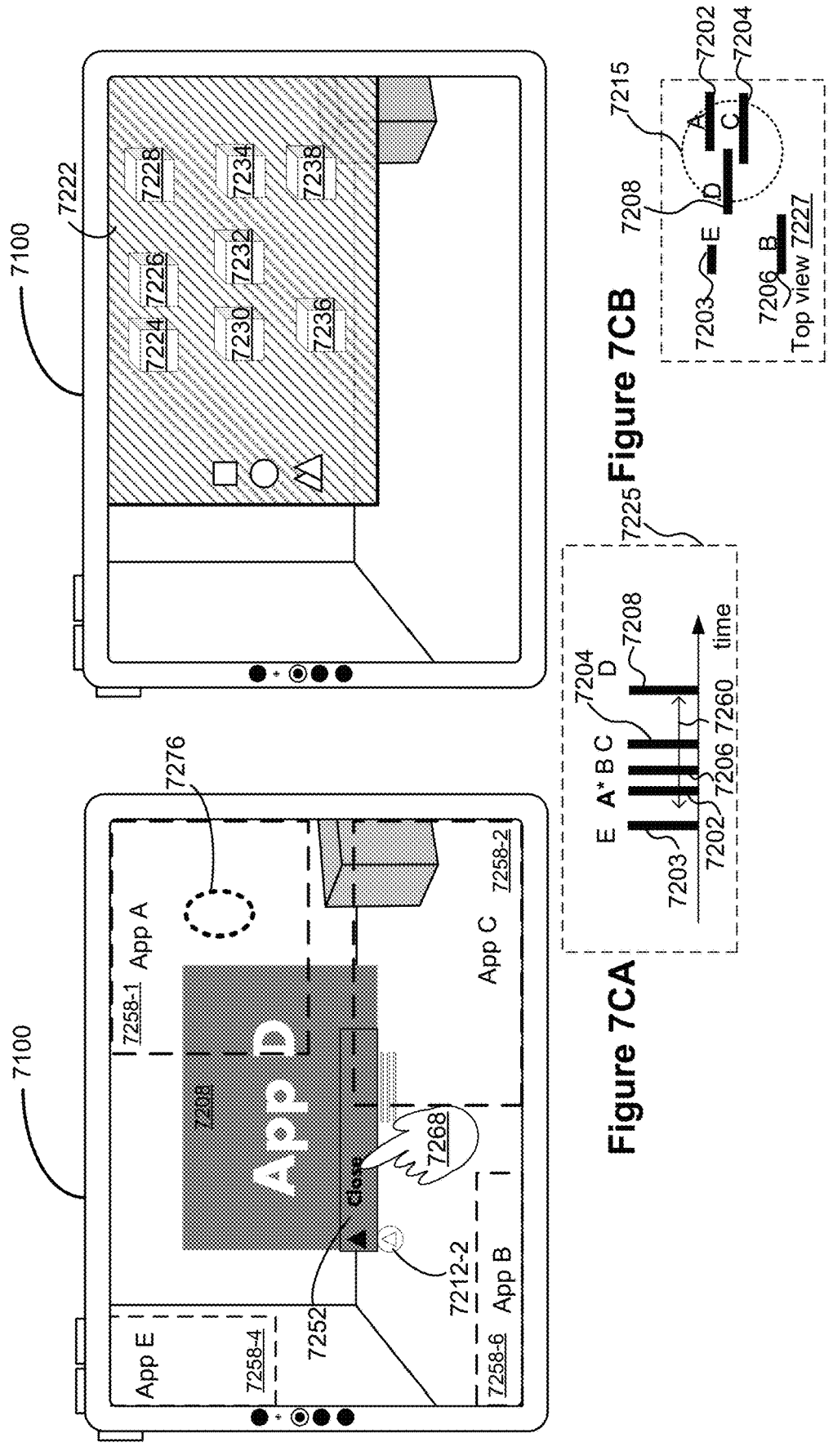
Figure 7C:
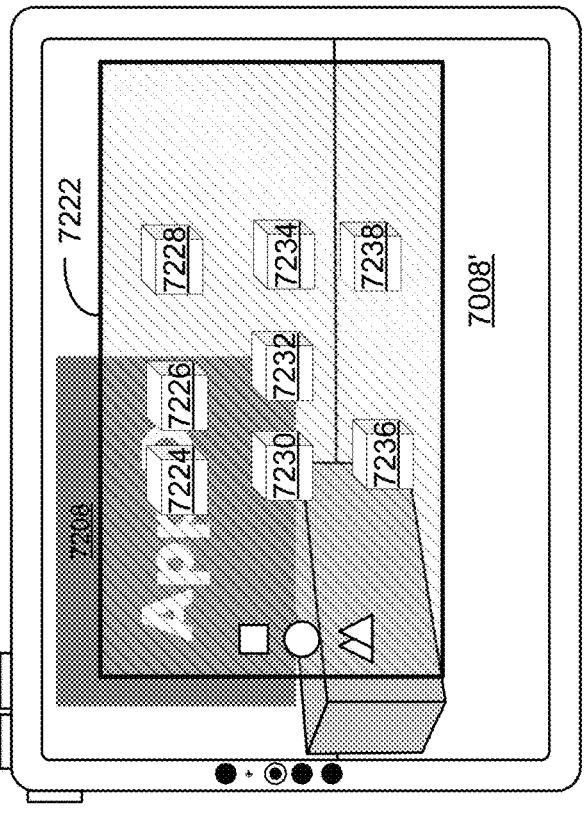
Figure 7C:
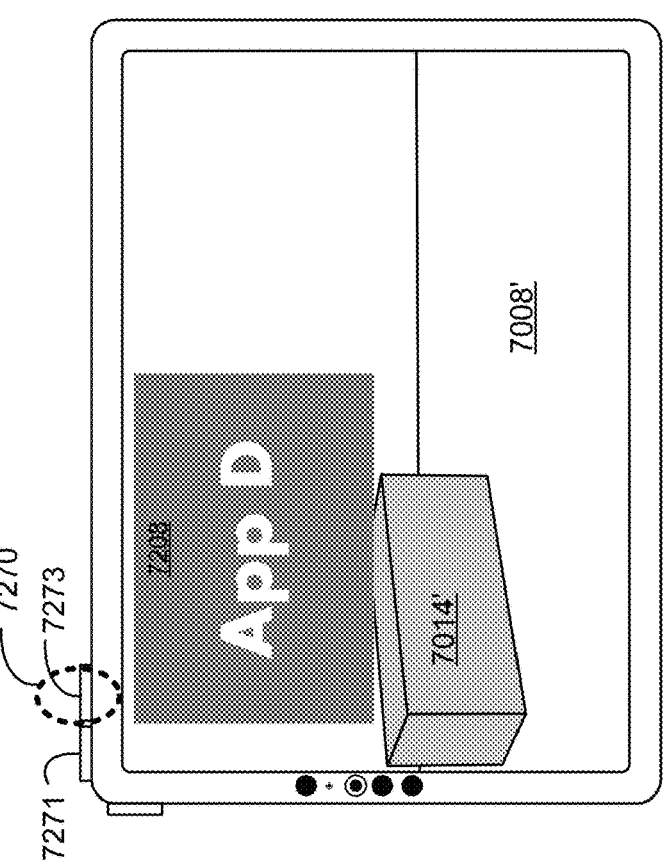
Figure 7C:
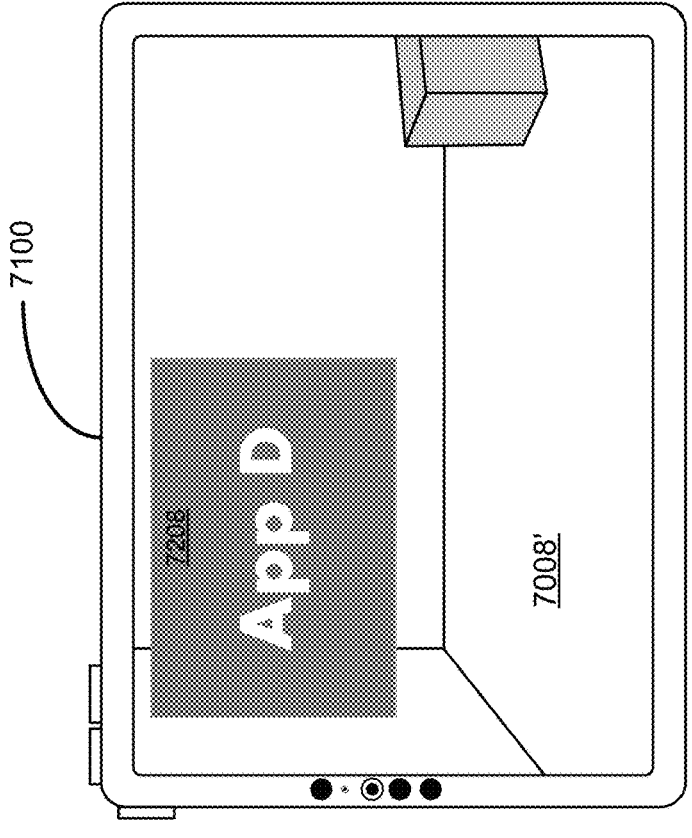
Figure 7C:
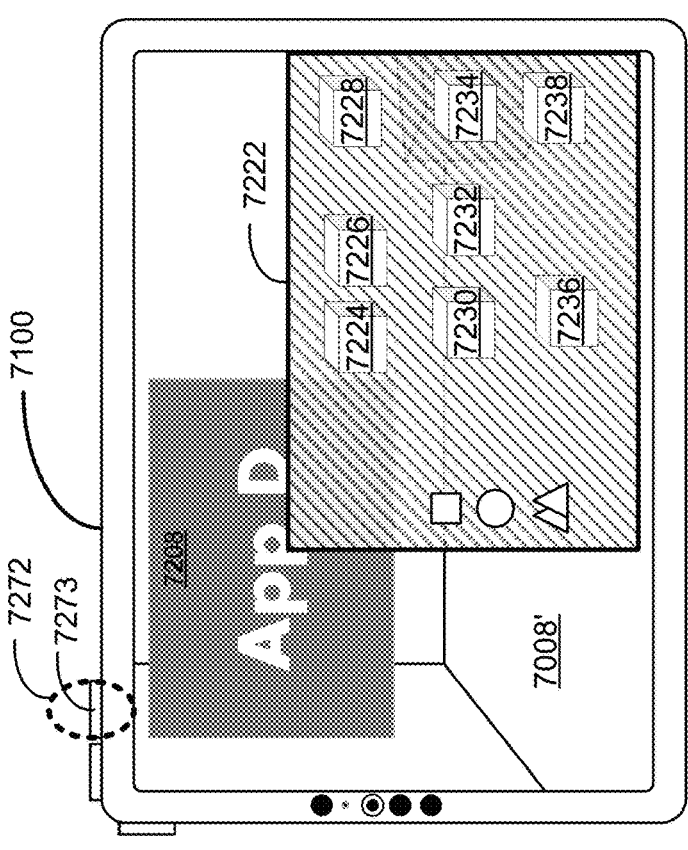
Figure 7C:
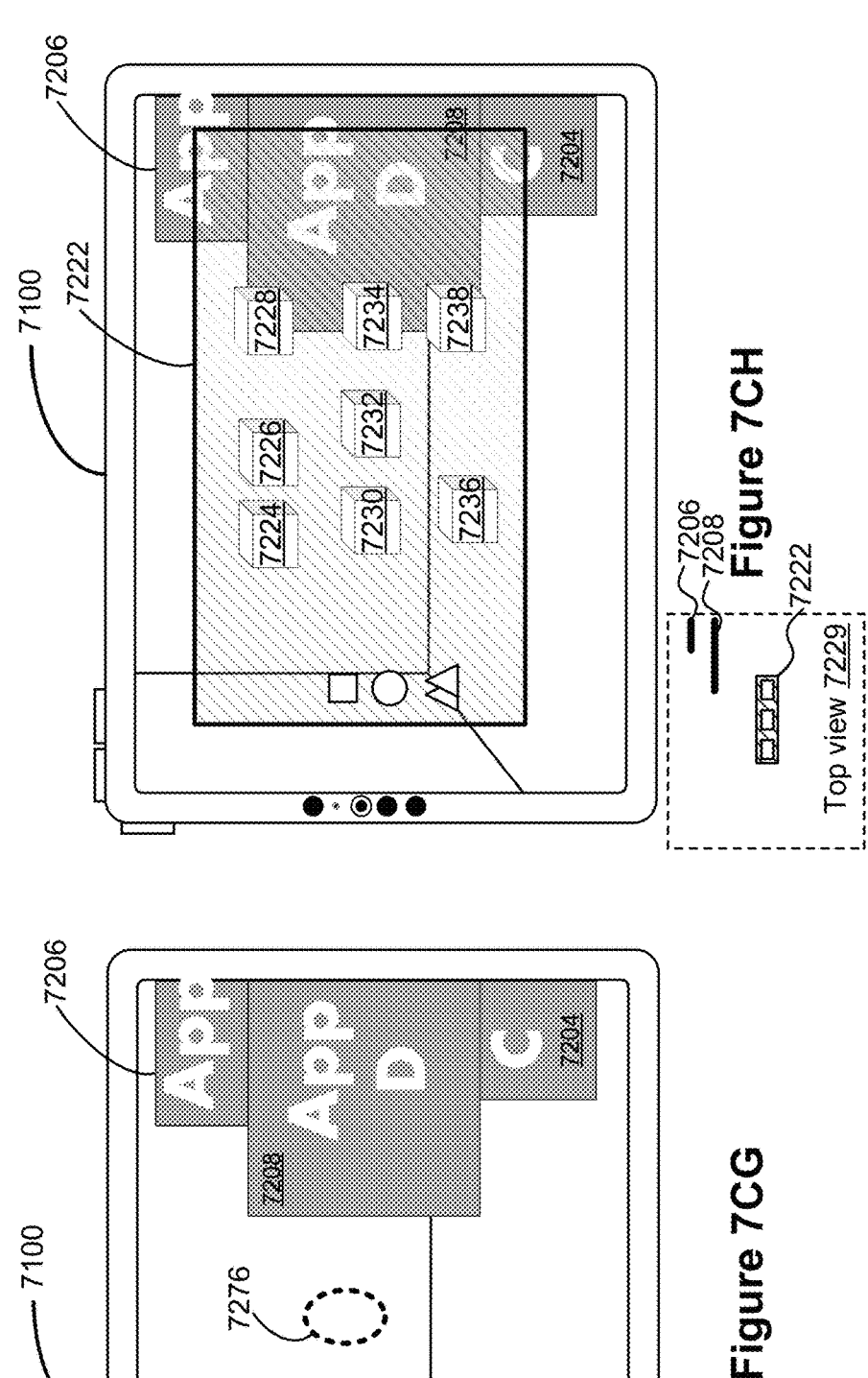

FIG. 7Y illustrates that, in response to the user's movement (e.g., from left to right and/or optionally away from the user's body) of the user's hand 7020 while a grabber 706-5 (e.g., which is analogous to the grabber 706-4, but represents the grabber as the user continues to interact with the grabber) is selected (e.g., and user's attention 710-22 is detected as directed to the grabber 706-5), the application window 702 moves in the three-dimensional environment in accordance with a position and/or amount of the movement of the user's hand 7020. For example, if the user moves the user's hand to the left, the application window 702 moves to the left in accordance with the user's hand movement. In some embodiments, the title bar 716 and/or the privacy indicator 718-1 continue to be displayed at a same respective position relative to the application window 702 as the user moves the application window 702 in the three-dimensional environment.

FIG. 7Z illustrates that, in response to detecting an end of a user input, for example the user releases a pinch gesture, or air pinch gesture (e.g., the user's movement of the user's hand 7020) directed to the grabber 706-5, stops moving the user's hand 7020, or liftoff (e.g., of a user input directed to the grabber 706-5), the grabber 706-6 is displayed without the updates to the one or more visual properties (e.g., the color of the grabber 706-6 is the same as the color of grabber 706-2 in FIG. 7V, before detecting user input and/or attention directed to grabber 706-2). In some embodiments, the grabber 706-6 is the same as the grabber 706-2 (e.g., the computer system 101 redisplays the grabber 706-2). FIG. 7Z also illustrates that the application window 702 has been repositioned (e.g., using the grabber 706-5) to a different position in the three-dimensional environment.

FIG. 7Z further illustrates that the title bar 716 and the privacy indicator 718-1 continue to be displayed at their same respective positions relative to the application window 702, even while the application window 702 was being moved (e.g., and after the application window 702 has been moved). For example, the title bar 716 continues to be displayed above the application window 702 at the center of the application window 702, and the privacy indicator 718-1 is displayed to the right of the title bar 716 and above the application window 702. It will be understood that alternative arrangements of the title bar 716 and/or the privacy indicator 718-1 relative to the application window 702 may be implemented (e.g., to the right and/or left of the application window 702), but that the respective position of the title bar and/or the respective position of the privacy indicator stays the same even as the application window 702 is moved to different positions within the three-dimensional environment. Further, in some embodiments, a size of the title bar 716 and/or privacy indicator 718-1 (e.g., and/or the privacy indicator 718-2) is based on a size of the application window 702, and the respective sizes of the title bar 716 and/or the privacy indicator 718-1 (e.g., and/or the privacy indicator 718-2) change as the application window 702 is resized and/or is positioned as farther away or closer to the user within the three-dimensional environment (e.g., where the application window 702 appears larger in size as it is positioned closer to the viewpoint of the user and smaller in size as it is positioned farther from the viewpoint of the user).

In some embodiments, in accordance with a determination that the application associated with the application window 702 is no longer accessing one or more sensors of the computer system that correspond to sensitive data, the privacy indicator 718-1 ceases to be displayed. As such, the privacy indicator 718-1 indicates to the user, in real-time, if an application is accessing a one or more sensors of the computer system.

In some embodiments, one or more additional indications are displayed above (or along another edge of) the application window 702. For example, a sharing indication 719 is optionally displayed above the application window 702, optionally to the right and/or left, or otherwise proximate to, the title bar 716. In some embodiments, the sharing indication 719 includes an indication of whether the content displayed in the application window 702 is shared by the user of computer system 101 with one or more other users. For example, the sharing indication 719 includes names, avatars, initials, and/or another indication of one or more other users that are able to view the content displayed in the application window 702 (e.g., at a respective computer system used by the other user). In some embodiments, the sharing indication 719 includes an indication of another user that is sharing content in the application window 702, if the content displayed in the application window 702 is being shared by another computer system used by the other user (e.g., the user of computer system 101 can view and/or interact with the application window 702, but optionally does not execute the application associated with application window 702). In some embodiments, if the content displayed in application window 702 is not shared with any other users and/or other devices, sharing indication 719 indicates that application window 702 is private by displaying text and/or an icon in sharing indication 719 and/or sharing indication 719 optionally ceases to be displayed.

FIG. 7Z illustrates an additional control option 721. In some embodiments, in response to detecting the user selecting an additional control option 721, one or more additional controls are displayed for the application window 702. In some embodiments, the additional control option 721 is a control for opening another application window and/or tab for the application window 702.

In some embodiments, the other control options are displayed proximate to the title bar 716 and/or are displayed along other edges of the application window 702 (e.g., to the right and/or left and/or under the application window 702). In some embodiments, the other control options include an option to enable and/or disable a gaze cursor. For example, while the gaze cursor is enabled, a cursor is displayed, via display generation component 7100, indicating the location corresponding to the user's attention (e.g., where the user is gazing). In some embodiments, the other control options include an option to display the application window 702 with a landscape orientation and/or a portrait orientation.

FIG. 7AA illustrates that, in response to detecting that the user's attention 710-23 directed to the title bar 716 (e.g., as shown in FIG. 7Z), an expanded title bar 716-2 is displayed (e.g., by increasing a size of the title bar 716). In some embodiments, the expanded title bar 716-2 includes one or more control options for interacting with the application window 702. In some embodiments, the one or more control options displayed in the expanded title bar 716-2 depend on the current content displayed in the application window 702. For example, while content for a first application is displayed in the application window 702, a first set of controls are displayed in the expanded title bar 716-2, and while content for a second application is displayed in the application window 702, a second set of controls are displayed in the expanded title bar 716-2. As such, the control options are based on the respective application and/or content in the application window 702.

In some embodiments, the expanded title bar 716-2 expands downward, such that it at least partially overlaps the application window 702. In some embodiments, the title bar 716-2 expands to the side (e.g., to the left and/or right) of the application window 702 and/or expands in another manner such that it does not obscure or overlay a portion of the application window 702.

In some embodiments, the user selects a respective control of the one or more control options displayed in expanded title bar 716-2. In some embodiments, the user selects a respective control by directing the user's attention 710-24 to the respective control and performing a user input to select the control (e.g., a gaze and air pinch gesture, a gaze and air tap gesture, or another selection input optionally coupled with a gaze input). For example, in FIG. 7AA, the user's hand 7020 performs a selection input (e.g., an air pinch gesture or an air tap) while the user's attention 710-25 is directed to the control "Open App 2" (e.g., as shown in FIG. 7AB).

In some embodiments, in response to detecting the user selecting the control to open App 2, an application window 720 is displayed in the three-dimensional environment, as illustrated in FIG. 7AB. In some embodiments, the application window 720 is associated with App 2. In some embodiments, the application window 720 and the application window 702 are associated with the same application (e.g., two windows for the same application are displayed). In some embodiments, the application window 720 and the application window 702 are associated with distinct applications.

In some embodiments, the computer system temporarily displays one or more of the available controls (e.g., close affordance, resize affordances, sharing indication, and/or other controls) at their respective positions to show the user that the controls are available (e.g., concurrently with displaying the application window 720). In some embodiments, the one or more available controls are displayed for a threshold amount of time (e.g., 2 seconds, 3 seconds, or another amount of time), and then cease to be displayed (e.g., unless the user's attention is directed to one of the available controls and/or the user's attention is redirected back to one of the available controls within the threshold amount of time). In some embodiments, ceasing to display the one or more available controls includes the available controls fading out and/or gradually disappearing, and/or displaying another animation as the one or more available controls cease to be displayed. In some embodiments, the one or more available controls gradually move toward the application window 720 (e.g., decrease a distance between the available controls and the application window 720), until the one or more available controls overlap with (e.g., or disappear behind) the application window 720, optionally while gradually fading the controls.

In some embodiments, in response to displaying the application window 720 (e.g., or while the application window 720 is displayed), the application window 702 is visually deemphasized in the three-dimensional environment. For example, the application window 702 is optionally pushed backwards (e.g., to appear father away from the user) in the three-dimensional environment, displayed with a different level of translucency, and/or dimmed relative to the three-dimensional environment and/or relative to the application window 720. As such, in some embodiments, the application window 702 is displayed with a visual deemphasis relative to the application window 720. In some embodiments, while the application window 702 is displayed with the visual deemphasis, the title bar 716 and/or the other controls are also visually deemphasized (e.g., in a same manner or a different manner as application window 702). In some embodiments, the privacy indicator 718-1 is not visually deemphasized while the application window 702 is visually deemphasized. For example, a size and/or translucency of the privacy indicator 718-1 is not changed in response to displaying the application window 720. In some embodiments, the grabber 706-6 is optionally displayed under the application window 702, even while the application window 702 is visually deemphasized.

In some embodiments, the application window 720 is displayed with a title bar 722 (similar to the title bar 716 described above for the application window 702) that indicates the content displayed in the application window 720. In some embodiments, the application window 720 is displayed with a grabber 726, which includes the same functionality described above with respect grabber 706-1.

In some embodiments, the application associated with the application window 720 is accessing one or more sensors that are associated with sensitive data. In response to detecting that the application associated with the application window 720 is accessing one or more sensors of the computer system 101, the computer system 101 displays a privacy indicator 724-1 above the application window 720. In some embodiments, the privacy indicator 724-1 is displayed at a same position relative to the application window 720 as the position of the privacy indicator 718-1 relative to the application window 702. In some embodiments, the privacy indicator 724-1 is displayed with a respective color based on the type of sensor that is being accessed by the application associated with the application window 720. For example, the privacy indicator 724-1 is displayed with a first color associated with a first type of sensor (e.g., a camera) while the application associated with the application window 720 is accessing the first type of sensor, and the privacy indicator 718-1 is displayed with a second color associated with a second type of sensor (e.g., a microphone) while the application associated with application window 702 is accessing the second type of sensor.

FIG. 7AB further illustrates detecting the user's attention 710-25 directed to the title bar 722 of the application window 720. In some embodiments, in response to detecting the user's attention is directed to the title bar 722, and optionally in accordance with a determination that the user's attention 710-25 remains directed to the title bar 722 for a threshold amount of time (e.g., or satisfies other attention-based criteria with respect to the title bar 722), the computer system displays an expanded title bar 722-2 for the application window 720, as illustrated in FIG. 7AC.

In some embodiments, the expanded title bar 722-2 includes one or more control options. In some embodiments, the user selects, using the user's hand 7020 in combination with a gaze input (e.g., user's attention 710-26), "Control C" from the expanded title bar 722-2. In some embodiments, in response to detecting user selection of Control C, the computer system 101 performs an operation associated with Control C, for example by displaying a user interface object C 728 in the application window 720, as illustrated in FIG. 7AD.

FIG. 7AD (e.g., FIGS. 7AD1, 7AD2 and 7AD3) illustrates that while the user's attention 710-27 is directed to the application window 720, in response to detecting that the application associated with the application window 720 is no longer accessing a sensor of the one or more sensors of the computer system 101, the privacy indicator 724-1 ceases to be displayed for the application window 720. In some embodiments, while the application associated with the application window 702 continues to access a sensor, the privacy indicator 718-1 continues to be displayed. Accordingly, the application windows 702 and 720 display distinct privacy indicators associated with the respective application window, such that the user is provided with information about which application is using a sensor at any given time. Further, because the respective privacy indicator moves with its respective application window within the three-dimensional environment, the user can easily identify the particular application that is accessing a sensor or other sensitive data.

FIG. 7AE further illustrates detecting the user's attention 710-28 directed to a top-center portion of the three-dimensional environment. In some embodiments, in response to detecting that the user's attention 710-28 is directed to the top-center portion of the three-dimensional environment, the computer system displays a dot indicator 730 that represents a launch control for launching a system control platter. For example, as illustrated in FIG. 7AF, in response to detecting the user's attention 710-29 directed to the dot indicator 730 for a threshold amount of time (e.g., the user's gaze lingers on dot indicator 730), the computer system displays a system control platter 734, as illustrated in FIG. 7AG.

In some embodiments, as illustrated in FIG. 7AG, the system control platter 734 is displayed proximate to the dot indicator 730. In some embodiments, the dot indicator 730 is optionally not displayed while the system control platter 734 is displayed. In some embodiments, the system control platter 734 includes one or more selectable controls for controlling and/or performing system functions of the computer system 101. For example, the system control platter 734 optionally includes a selectable control for changing a system volume, a selectable control for performing a search function on the computer system 101, a selectable control for viewing notifications, a selectable control for viewing and/or modifying one or more settings of the computer system, and/or a selectable control for invoking a virtual assistant of the computer system. In some embodiments, the system control platter 734 is concurrently displayed with system information, such as an indication of one or more sensors 732 that are being accessed by an application executing on the computer system 101, a connectivity indication (e.g., for WiFi and/or cellular connectivity), and/or a battery indication showing a battery level of the computer system.

In some embodiments, the indication of the one or more sensors 732 includes an icon displaying the type of sensor that is being accessed by one or more applications of the computer system. For example, a sensor indication 732 includes a microphone icon (e.g., or a location icon, or a camera icon, and/or another sensor icon) to indicate the microphone is currently being accessed by one or more applications. In some embodiments, an icon is displayed for each of the sensors that are currently being accessed by one or more applications.

In some embodiments, in response to detecting a user input (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) selecting the sensor icon 732, as illustrated in FIG. 7AG, the computer system 101 displays a user interface element that indicates the names of applications that are currently accessing the sensor corresponding to the selected sensor icon 732. For example, in FIG. 7AH, the computer system displays, in an expanded indicator 736, that the microphone is being accessed by App 1. In some embodiments, the expanded indicator 736 includes a listing of all of the applications that are currently accessing the respective sensor, such as the microphone.

Additional descriptions regarding FIGS. 7T-7AH are provided below in reference to methods 1000 and 1100 described with respect to FIGS. 10 and 11, respectively.

FIG. 7AI illustrates an exemplary view of a three-dimensional environment, as described above with respect to FIG. 7A, which includes a representation of a physical environment, in addition to multiple user interface elements. The view includes a representation of a physical environment, including a representation of a first wall 7006', a representation of a floor 7008', and a representation of a physical object 7014'. The view also includes a first title region 744 (also referred to herein as a title bar, such as title bar 716), a first content region 746 (e.g., optionally displayed in an application window, such as application window 702), a first user interface element 748, a second user interface element 750, and a first grabber 752. The view also includes a second title region 754, a second content region 756, a third user interface element 760, and a second grabber 756. For ease of discussion, the descriptions below reference the first content region 746 and the first title region 744, but one skilled in the art would understand that the descriptions specific to the first content region 746 and/or the first title region 744 are readily applicable to any suitable user interface element (e.g., any of the user interface elements of FIG. 7AI described above). In some embodiments, the user's attention 710-32 is directed to first content region 746.

In some embodiments, different user interface elements that are visible in the view of the three dimensional environment are displayed with different respective parameter values (e.g., respective brightness values, color values, or luminance values). For example, the first content region 746 includes first content, and the first content is constrained to having an appearance in which the respective parameter has a value that is within a first range of values (e.g., the respective parameter has a value that is below $T_2$, the respective parameter value is between $T_1$ and $T_2$). The first title region 744, that is concurrently displayed with the first content region 746 (e.g., and optionally displayed with the grabber 752) has an appearance in which the respective parameter has a value that is outside the first range of values (e.g., above $T_2$). In some embodiments, the display generation component 7100 is a HMD, which displays a view of a three-dimensional environment that includes representations of the physical environment around the user. One or more, or all, of the representations of objects in the physical environment (e.g., the representations 7004' and 7006' of walls, the representation 7008' of the floor, the representation 7014' of a physical object, and/or other representations of other objects in the physical environment) have an appearance in which the respective parameter value (e.g., a brightness, a color, and/or a luminance) has a value that is within the first range of values (e.g., an appearance of the physical environment in the view of the three-dimensional environment is constrained to a first range of values for the respective parameter). In contrast, one or more virtual objects (e.g., objects that are not present in the physical environment) have an appearance in which the respective parameter has a value that is outside the first range of values (e.g., with a higher brightness value, a different color, and/or a higher luminance value, compared to the representations of the physical environment). This increases the visibility of the one or more virtual objects in the view of the three-dimensional environment (e.g., when the one or more virtual objects are displayed over the representations of the physical environment), regardless of a viewpoint of the user (e.g., which changes frequently during the use of a HMD). In some embodiments, a user of the HMD interacts with the view of the three-dimensional environment through gaze gestures (e.g., and/or gaze gestures in combination with an air gesture or physical user input), and a virtual object that corresponds to the user's attention (e.g., a location at which the user is gazing), has an appearance in which the respective parameter has a value that is outside the first range of values (e.g., as discussed in greater detail below, with reference to a visual indicator 764 of FIG. 7AM), which assists the user in identifying the location the computer system detects the user's attention (e.g., gaze) is directed to.

In some embodiments, the first title region 744 has an appearance in which the respective parameter has a value that is outside the first range of values (e.g., above $T_2$) only if the first content is displayed within a sub-range of selectable values for the first content. For example, the range of selectable values for the first content is any value below $T_2$. If the respective parameter for the first content has a value that is below $T_1$, the first title region 744 has an appearance in which the respective parameter has a value that is not outside the first range of values (e.g., is below $T_2$). If the respective parameter for the first content has a value that is above $T_1$ but below $T_2$ (e.g., the sub-range $T_1$ to $T_2$ is a sub-range of a range of values that is below $T_2$), the first title region 744 has an appearance in which the respective parameter has a value that is outside the first range of values (e.g., is above $T_2$).

In some embodiments, the respective parameter is a brightness, and the patterned background of the first content region 746 reflects a lower brightness value (e.g., corresponding to a "normal white," which represents the brightest possible white value for content of the first content region 746) relative to the brightness value for the first title region 744, which has a pure white background (e.g., a brighter white than the brightest "normal white" for the first content region 746).

For example, the black bars displayed below the display generation component 7100 denote the range of selectable values for respective parameter for the first content region 746 and the first title region 763. The value for the first content region 746, which has selectable values for the respective parameter that are between $T_1$ and $T_2$. In contrast, the selectable values for the respective parameter for the first title region 744 are above $T_2$.

In some embodiments, the respective parameter is a color value, and the patterned background of the first content region 746 reflects a first color (or range of color values) that can be selected for the first content region 746. The pure white background of the first title region 744 reflects a color that is outside the possible colors that can be selected for the first content region 746 (e.g., some color values are reserved for use with the first title region 744, and reserved color values are not available for selection for the first content region 746).

In some embodiments, the first content region 746 is an application user interface (e.g., also referred to herein as an application window) for a first application, and the first application determines the first range of values that can be selected for the first content region 746. If the respective parameter is a brightness value, then the first application determines a first range of brightness values that can be selected for the first content region 746. For example, the first application determines that lower brightness values can be selected for the first content region 746. Higher brightness values are reserved (e.g., by the operating system, or by the first application) for the first title region 744. If the respective parameter is a color value, then the first application determines a first range of color values that can be selected for the first content region 746. For example, the first application determines that blue color values can be selected for the first content region 746, while green color values are reserved (e.g., by the operating system, or by the first application) for the first title region 744 (e.g., to ensure sufficient color contrast between the first content region 746 and the first title region 744).

In some embodiments, the first title region 744 includes a first portion (e.g., a top half) and a second portion (e.g., a bottom half), and the first portion of the first title region 744 is displayed with a first value for the respective parameter that is outside the first range of values, and the second portion of the first title region 744 is displayed with a second value for the respective parameter that is within the first range of values (e.g., to provide a smoother visual transition between the first content region 746 and the first portion of the first title region 744).

In some embodiments, the first portion of the first title region 744 is displayed with the first value for the respective parameter that is outside the first range of values, which includes changing an appearance of the first portion of the first title region 744 due to a simulated lighting effect (e.g., a specular highlighting effect, a glow effect, or a halo effect) that is applied to the first title region 744 (e.g., and localized to the first portion of the first title region). In some embodiments, the first portion of the first title region 744 is displayed with the first value for the respective parameter that is outside the first range of values, which includes changing an appearance of the first portion of the first title region 744 due to presence of a visual indication (e.g., a visual indicator 764 described below with reference to FIGS. 7AM-7AN (e.g., FIGS. 7AN1, 7AN2 and 7AN3)) of a location of a gaze of the user. In some embodiments, a first portion of a respective user interface element is displayed with the first value for the respective parameter that is outside the first range of values (and a second portion of the respective user interface element is displayed with a second value for the respective parameter that is within the first range of values), for respective user interface elements that are continuously displayed (e.g., regardless of user inputs and/or where the user's attention is currently directed), such as the first title region 744, the second title region 754, the first grabber 752, and/or the second grabber 758.

In some embodiments, the first title region 744 includes more than two portions, and at least one portion of the first title region 744 is displayed with a respective value for the respective parameter that is outside the first range of values, and at least one portion the first title region 744 is displayed with a respective value for the respective parameter that is within the first range of values.

In some embodiments, multiple user interface elements have an appearance in which the respective parameter has a value that is outside the first range of values, and the descriptions and examples above are applicable to each of the multiple user interface elements. For example, in FIG. 7AI, the dot indicator 730, the first grabber 752, the second title region 754, and/or the second grabber 758 have respective values for the respective parameter that are outside the first range of values (e.g., all at or above $T_2$), and have appearances analogous to that of the first title region 744 as described above. In some embodiments, one or more, and optionally all of, user interface elements of a particular type (e.g., title regions such as the first title region 744 and the second title region 754, and/or grabbers such as the first grabber 752 and the second grabber 758) have an appearance in which the respective parameter has a value that is outside the first range of values.

In FIG. 7AJ, in response to detecting the user's attention 710-33 directed to the bottom right corner of the first content region 746, the computer system displays an animated transition between displaying grabber 752 and a resize affordance 753 (e.g., as described above with respect to FIGS. 7E-7F). In some embodiments, detecting the user's attention 710-33 directed to the bottom right corner of the first content region 746 includes detecting a gaze input, an air gesture, or a combination of gaze input and air gesture. In some embodiments, the user's attention 710-33 represents a position of a cursor associated with an input device, or represents a gaze input of the user.

For example, the animated transition includes displaying the first grabber 752 gradually shifting to the right, until it is replaced with the resize affordance 753 displayed at the bottom right corner of the first content region 746 (e.g., in a similar manner as shown in, and described above with reference to, FIG. 7E). In some embodiments, the resize affordance 753 is displayed with an appearance in which the respective parameter has a value that is outside the first range of values (e.g., in addition to, and concurrently with, the first title region 744, which also has an appearance in which the respective parameter has a value that is outside the first range of values). In some embodiments, the value for the respective parameter for the resize affordance 753 is the same as the value for the first title region 744 (e.g., as described above with reference to FIG. 7AI). In some embodiments, the range of selectable values for the respective parameter for the resize affordance 753 is the same as the selectable range of values for the respective parameter for the first title region 744 (e.g., as shown by the identically sized black bars for the value of 744 and the value of 753, in FIGS. 7AI and 7AJ, respectively). In some embodiments, the range of selectable values for the respective parameter for the resize affordance 753 is different from the range of selectable values for the respective parameter for the first title region 744 (e.g., optionally the range of selectable values can overlap, such that, for example, both ranges of selectable values are above $T_2$).

In some embodiments, the first grabber 752 is not displayed with an appearance in which the respective parameter has a value that is outside the first range of values, but the resize affordance 753 is displayed with an appearance in which the respective parameter has a value that is outside the first range of values (e.g., to provide visual feedback that the first grabber 752 has been replaced with the resize affordance 753). In some embodiments, the first grabber 752 is displayed with an appearance in which the respective parameter has a value that is outside the first range of values (e.g., prior to being replaced by the resize affordance 753), and the resize affordance 753 is displayed with an appearance in which the respective parameter has a value that is outside the first range of values (e.g., after replacing the first grabber 752).

In some embodiments, the resize affordance 753 ceases to be displayed (e.g., and the first grabber 752 is redisplayed) when the computer system detects that the user's attention is no longer directed to the lower right corner of the first content area 746 (e.g., as shown in FIG. 7AK, where the user's attention 710-34 is directed to the upper right corner of the second content region 756, the first grabber 752 is redisplayed, and the resize affordance 753 is no longer displayed).

In FIG. 7AK, the computer system detects the user's attention 710-34 directed to an upper right corner of the second content region 756. In some embodiments, detecting the user's attention 710-34 directed to the upper right corner of the second content region 756 includes detecting a gaze input, an air gesture, or a combination of gaze input and air gesture. In some embodiments, user's attention 710-34 represents a position of a cursor associated with an input device.

In response to detecting the user's attention 710-34 directed to the upper right corner of the first content region 746, the computer system displays a close affordance 762 (e.g., a close affordance analogous to the close affordance 7030 described above with reference to FIG. 7C) for ceasing display of the first content region 746. In some embodiments, the close affordance 762 is displayed with an appearance in which the respective parameter has a value that is outside the first range of values (e.g., in addition to, and concurrently with, the first title region 744, which also has an appearance in which the respective parameter has a value that is outside the first range of values). For example, the range of selectable values for the respective parameter of the close affordance 762 being above $T_2$. In some embodiments, the close affordance 762 ceases to be displayed when the computer system detects that the user's attention is no longer directed to the upper right corner of the second content area 760.

In FIG. 7AL, the content in the second content region 756 changes (e.g., the appearance of the content in the second content region 756 is different in FIG. 7AL, as compared to the content in the second content region 756 in FIG. 7AK). For example, as illustrated in FIG. 7AL, the range of selectable values for the respective parameter for the second content region 756 is changed such that the range is between $T_3$ and $T_4$ (e.g., instead of ranging between $T_1$ and $T_2$, as in FIG. 7AK, where $T_3$ and $T_4$ are distinct from $T_1$ and $T_2$). In some embodiments, the content is dynamic content (e.g., a media item such as a video), which changes over time, including a change in the brightness, color, and/or luminance of the content over time. In some embodiments, the content in the second content region 756 changes in response to a user input (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) (e.g., in response to the user interacting with the content). In some embodiments, the content in the second content region 756 changes in response to detecting occurrence of an event (e.g., a night mode or dark mode may be activated in response to detecting that it is a certain time (e.g., 7:00 PM)). In some embodiments, the content in the second content region 756 changes in response to detecting a change in the physical environment (e.g., the computer system detects that the user has moved to a physical environment with an increased amount of and/or brighter lighting, such that a brightness of the content is automatically, without user input, increased to maintain visibility).

In some embodiments, in response to the content in the second content region 756 changing over time, the close affordance 762 is displayed with an updated value for the respective parameter that is outside the first range of values based on a current state of the content in the second content region. For example, the updated value for the respective parameter of close affordance 762 is selected in accordance with the change in the respective parameter of the content in the second content region 756. For example, if the respective parameter is brightness, and the content in the second content region 756 becomes brighter (e.g., as shown by the lower end of the range of selectable values, $T_3$. Being higher than $T_1$), the updated value for the brightness parameter of the close affordance 762 is higher than the original brightness parameter value for the close affordance 762 (e.g., the range of selectable values for the close affordance 762 is shifted upwards by the same (or proportional) amount as the difference between $T_3$ and $T_1$).

In some embodiments, the close affordance 762 is displayed with the updated value for the respective parameter that is outside the first range of values, in accordance with a determination that the content in the second content region is displayed with an appearance in which the respective parameter is within a first sub-range of values (e.g., the sub-range $T_3$ to $T_4$, which is a sub-range of the range $T_1$ to $T_2$).

FIG. 7AM shows the visual indicator 764, which reflects a location in the view of the three-dimensional environment that corresponds to the user's attention (e.g., a detected gaze of the user). In some embodiments, the visual indicator 764 changes location as the user's attention moves between different locations (e.g., the visual indicator 764 moves in accordance with the user's gaze). In some embodiments, the visual indicator 764 is displayed as overlaid with other visible user interface elements (e.g., the visual indicator 764 appears "on top" of any other user interface element and/or passthrough of the three-dimensional environment at the location of the visual indicator 764). In some embodiments, the visual indicator 764 is displayed with an appearance in which the respective parameter has a value that is outside the first range of values (e.g., to improve the visibility of the visual indicator 764, such that the user can easily identify where the computer system detects the user's attention as being focused). For example, the range of selectable values for the respective parameter of the visual indicator 764 is above $T_2$. In some embodiments, the visual indicator 764 is a circle (e.g., as shown in FIG. 7AM), or another shape.

In some embodiments, the visual indicator 764 is another suitable shape (e.g., a square, a diamond, or a cross shape). In some embodiments, the visual indicator 764 includes a virtual lighting effect (e.g., a specular highlighting effect, a glow effect, or a halo effect). In some embodiments, a feathering effect is applied to the visual indicator 764 (e.g., a smoothing and/or blurring effect is applied near the edges of, or to the entirety of, the visual indicator 764). In some embodiments, the visual indicator 764 is at least partially transparent (e.g., such that content in the first content region 746, over which the visual indicator 764 is displayed, is at least partially visible).

In FIG. 7AN (e.g., FIGS. 7AN1, 7AN2 and 7AN3), the user's attention is directed to the second user interface element 750. In some embodiments, the visual indicator 764 has a default shape (e.g., a circle shape, as in FIG. 7AM), and in response to the user's attention being directed to second user interface element 750, the shape of the visual indicator 764 is at least partially altered to conform to the outline of the second user interface element 750 (e.g., the left and bottom edges of the second user interface element 750). In some embodiments, the shape of the visual indicator 764 may be fully altered to conform to the outline of the second user interface element 750 (e.g., the default shape of the visual indicator 764 is a circle that is large enough to encompass the entirety of the second user interface element 750, and the altered shape of the visual indicator 764 is a rectangle that matches the boundaries of the second user interface element 750). As such, the visual indicator 764 is displayed as only appearing as overlapping second user interface element 750, without displaying portions of the visual indicator 764 that are positioned outside of the boundaries of second user interface element 750.

In some embodiments, the second user interface element 750 (e.g., and/or the first user interface element 748) is an affordance or control element for performing functions with the first content region 746. For example, the first content region 746 is an application user interface, and the second user interface element 750 (e.g., and/or the first user interface element 748) is a button, slider, or other control for performing functions (e.g., navigating within the application user interface, navigating to a different user interface, opening a new tab or window for the corresponding application, controlling media playback, starting a communication session, and/or adjusting settings) in the application user interface.

In some embodiments, the first user interface element 748 and/or the second user interface element 750 are displayed as overlaying the first content region 746, and the first user interface element 748 and the second user interface element 750 are displayed as a virtual augmentation (e.g., as augmenting portions of the content of the first content region 746, over which the first user interface element 748 and/or the second user interface element 750 are displayed). For example, the first content region 746 is a representation of a virtual three-dimensional environment (e.g., a virtual beach that includes sand and waves), the first user interface element 748 is displayed as a virtual augmentation that makes sand of the virtual beach appear to sparkle, and the second user interface element 750 is displayed as a virtual augmentation that makes waves of the virtual beach appear to sparkle (e.g., optionally in a different manner than the sand). In some embodiments, the first content region 746 includes a representation of a physical environment (e.g., and the first user interface element 748 and/or the second user interface element 750 augment representations of physical objects/features of the physical environment). In some embodiments, the first content region 746 includes a photo and/or video, and the first user interface element 748 and/or the second user interface element 750 augment one or more portions of the photo and/or video.

FIG. 7AO shows an alternative view of the three-dimensional environment, which includes a text object 766 displayed as overlaying a portion of the representation of the physical environment. In some embodiments, the text object 766 includes a title of a user interface element, such as an application name corresponding to an application icon, a contact name corresponding to an avatar for a user, a document name corresponding to a file, a title or description corresponding to a physical or virtual object that is visible in the view of the three-dimensional environment, and/or a textual indication of a virtual environment/experience. In some embodiments, the user interface object 766 includes text of media content, such as lyrics to a song that is playing, or closed captioning or subtitles for audio/video media that is playing.

In some embodiments, at least a portion of the representation of the physical environment (e.g., the representation of the wall 7006' and/or the representation of the physical object 7014') is constrained to have an appearance in which the respective parameter has a value that is within a first range of values, as illustrated by the patterned fill for the representation of the wall 7006' and by the value of 7006' being between $T_1$ and $T_2$. In contrast, the text object 766 has an appearance in which the respective parameter has a value that is outside the first range of values (e.g., to ensure the text object 766 is visible when displayed over the representation of the wall 7006'), as shown by the pure white fill of the letters in the text object 766, and the value of 766 being above $T_2$.

A user interface 769 (e.g., a third content region) overlays (e.g., occludes, from the current viewpoint of the user) a region 767 of the text object 766, and the region 767 of the text object 766 has an appearance in which the respective parameter has a different (e.g., lower) value (e.g., as compared to the other portions of the text object 766). For example, if the text object 766 is displayed as very bright (e.g., to ensure visibility over a "standard" white of the representation of the wall 7006'), the very bright appearance can cause visibility issues for the user interface 769 that is displayed over a portion of the text object 766, so the overlaid portion of the text object 766 is displayed with a different appearance (e.g., dimmed) to avoid visibility issues.

In some embodiments, the different value is also outside the first range of values (e.g., but less so than the value for the respective parameter for the other portions of the text object 766 that are not overlaid or occluded). In some embodiments, the different value is within the first range of values. In some embodiments, if the user interface 769 is moved or repositioned relative to the text object 766, the appearance of the text object 766 is updated to reflect the relative movement. For example, portions of the text object 766 that were not previously overlaid or occluded, that become overlaid or occluded as a result of the movement of the user interface 769, are displayed with the appearance in which the respective parameter has the different value. Portions of the text object 766 that were previously overlaid or occluded, that are no longer overlaid or occluded as a result of the movement of the user interface 769, are displayed with the appearance in which the respective parameter has the value that is outside the first range of values.

FIG. 7AP is analogous to FIG. 7AO, but shows that in some embodiments, the text object 766 has a value for the respective parameter that is below (and outside) the first range of values (e.g., the value of 766 is below $T_1$). For example, if the respective parameter is a brightness value, then in FIG. 7AO, the text object 766 appears brighter (e.g., more white) than the representation of the physical environment (e.g., the representation of the wall 7006', over which the text object 766 is displayed). In FIG. 7AP, the text object appears darker (e.g., more black) than the representation of the physical environment (e.g., the representation of the physical object 7014', over which the text object 766 is displayed). In FIG. 7AP, the user interface 769 overlays a different region 771 of the text object 766. The region 771 has an appearance in which the respective parameter has a different (e.g., higher) value (e.g., from the rest of the text object 766), and has analogous properties and behavior as the region 767 described with reference to FIG. 7AO (e.g., except that the region 771 is shown in FIG. 7AP as being less dark than the rest of the dark text object 766, in contrast to the region 767 which is shown in FIG. 7AO as being less bright than the rest of the bright text object 766).

Additional descriptions regarding FIGS. 7AI-7AP are provided below in reference to method 1200 described with respect to FIG. 12.

FIG. 7AQ illustrates a three-dimensional object 770a (e.g., a virtual chair or another virtual object). In some embodiments, three-dimensional object 770a is displayed in the three-dimensional environment in response to detecting a user input (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) requesting to view three-dimensional object 770a (e.g., in response to a request to open an application associated with three-dimensional object 770a and/or selection of three-dimensional object 770a from an application).

In some embodiments, three-dimensional object 770a is displayed with a platter 772. For example, three-dimensional object 770a is positioned atop platter 772. In some embodiments, platter 772 is a two-dimensional object (e.g., or a three-dimensional object with a small thickness (e.g., 1 mm, 5 mm, or another thickness)) that extends backwards (e.g., in the z-dimension and/or the depth dimension) in the three-dimensional environment. For example, platter 772 extends such that it appears as a flat surface under three-dimensional object 770a. In some embodiments, platter 772 is displayed as parallel, or substantially parallel, to the horizon (e.g., the floor or the latitudinal plane relative to the display of computer system 7100).

In some embodiments, a simulated shadow and/or reflection of three-dimensional object 770a is displayed on platter 772. For example, as the three-dimensional object 770a moves (e.g., rotates, scales, and/or otherwise updates), the simulated shadow and/or reflection of three-dimensional object 770a on platter 772 automatically, without additional user input, moves in accordance with the movement of the three-dimensional object 770a and, optionally, a direction of a simulated or real light source.

In some embodiments, three-dimensional object 770a is associated with one or more object management controls for the object 770a. For example, object 770a is displayed concurrently with grabber 7104a for moving a position of object 770a within the three-dimensional environment (e.g., grabber 7104a for object 770a having the same, analogous, or different, functionality as described with reference to grabber 706-1 for application window 702), and/or with affordance 774-1 (e.g., a minimized close affordance and/or a minimized controls menu). In some embodiments, additional and/or alternative object management controls are optionally displayed with object 770a, such as a resize affordance. In some embodiments, object management controls for object 770a are available (e.g., for the user to interact with and/or perform operations associated with the respective object management controls) but optionally not displayed (e.g., until the user's attention is directed to a respective region for the respective object management control), as described above with reference to FIGS. 7D1-7D2.

In some embodiments, the one or more object management controls include platter 772. In some embodiments, platter 772 is displayed under object 770a, regardless of whether the user's attention is directed to object 770a (e.g., and/or a region around object 770a). In some embodiments, platter 772 is displayed in response to detecting that the user's attention is directed to object 770a and optionally ceases to be displayed in accordance with a determination that the user's attention is no longer directed to object 770a.

In some embodiments, the one or more object management controls are displayed concurrently with object 770a without detecting a user input. In some embodiments, the one or more object management controls are displayed in response to detecting a user input directed to object 770a, for example, in response to detecting a gaze input (e.g., directed to a bottom portion, or other respective portion or region, of the object 770a), and/or another gesture (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) directed to object 770a. For example, the one or more object management controls are optionally not displayed concurrently with the object 770a until a user input is detected as being directed to the object 770a (e.g., a gaze input directed to a bottom of object 770a or another portion of object 770a). In some embodiments, the one or more object management controls are displayed in accordance with a determination that the gaze input is maintained for a threshold amount of time (e.g., the gaze input satisfies a gaze criterion).

In some embodiments, the one or more object management controls are displayed with an orientation that faces the user's current viewpoint (e.g., such that the user can more easily read and/or interact with the one or more object management controls without requiring the user to change position and/or change the user's viewpoint). As such, the one or more object management controls are displayed with an orientation selected based at least in part on the user's current viewpoint, and are displayed with a first spatial relationship relative to the object 770a (e.g., at a first size and at a first angle/orientation relative to the object 770a). In some embodiments, as described in more detail below, the one or more object management controls are optionally updated to be displayed with the same orientation relative to the user's current viewpoint, even while an orientation of the object 770a does not change relative to the user's viewpoint. As such, in some embodiments, the one or more object management controls are displayed with a different spatial relationship (e.g., different orientation, angle and/or size), distinct from the first spatial relationship, relative to the object 770a.

In some embodiments, before detecting the user's attention directed to affordance 774-1, affordance 774-1 is displayed as a minimized version of one or more object management controls, optionally displayed as a dot that is expanded in response to detecting the user's attention (e.g., for at least a threshold amount of time) directed to the dot. As such, if the user gazes and dwells on the dot, affordance 774-2 is displayed. For example, if the user's attention is detected for less than the threshold amount time, the dot does not expand to close affordance 774-2.

For example, in response to detecting the user's attention 710-36 (e.g., a gaze input and/or other input) directed to affordance 774-1 that satisfies attention criteria (e.g., that the user's attention has been detected for at least a threshold amount of time), affordance 774-1 expands to display close affordance 774-2 and/or to display title bar 7029, as illustrated in FIG. 7AR. In some embodiments, close affordance 774-2 is an expanded version of affordance 774-1. For example, close affordance 774-2 includes an icon and/or text (e.g., an "x" icon, or a "close" button). In some embodiments, in response to user selection of close affordance 774-2, object 770a ceases to be displayed (e.g., is closed and/or removed from the user interface). In some embodiments, close affordance 774-2 continues to be displayed while the user's attention 710-37 continues to be detected as being directed to close affordance 774-2.

In some embodiments, in response to detecting the user's attention 710-36, one or more additional object management controls are optionally displayed, such as title bar 7106 and/or other object management controls that were not displayed prior to detecting the user's attention as directed to affordance 774-1. In some embodiments, the one or more object management controls include a resize affordance (e.g., resize affordance 776), and/or an object menu that includes a plurality of selectable options for performing operations with respect to object 770a.

In some embodiments, in response to detecting the user's attention 710-36, one or more of the object management controls for object 770a are visually deemphasized (e.g., shrink in size, blur, decrease in luminance and/or cease to be displayed). For example, grabber 7104a decreases in size to grabber 7104b (FIG. 7AR) while the close affordance 774-2 is displayed. In some embodiments, grabber 7104b shrinks in size (e.g., to a decreased length) to create additional space for close affordance 774-2 (e.g., which is an expanded version of affordance 774-1), such that close affordance 774-2 does not overlap with grabber 7104b. In some embodiments, title bar 7106 is optionally also displayed with a size and/or at a position such that it does not overlap with close affordance 774-2 while close affordance 774-2 is displayed. In some embodiments, some of the object management controls, but not others, are visually deemphasized while the close affordance 774-2 (e.g., or another object management control) is visually emphasized (e.g., as an expanded version). In some embodiments, after close affordance 774-2 is minimized back to affordance 774-1, the visual deemphasis of the one or more object management controls is undone. For example, grabber 7104b increases to the size of grabber 7104a while affordance 774-1 is displayed in its minimized version.

In some embodiments, close affordance 774-2 includes a plurality of options for closing one or more objects and/or application windows, as illustrated in FIG. 7AS1. For example, close affordance 774-2 expands to include menu 774-3. In some embodiments, the plurality of options displayed in menu 774-3 include the options described with reference to FIGS. 7BC-7BL. In some embodiments, the menu 774-3 is displayed in accordance with a determination that the user's attention 774-2 is directed to affordance 774-1 (e.g., from the display in FIG. 7AQ to FIG. 7AS1 directly) and/or to close affordance 774-2 (e.g., from the display in FIG. 7AQ to FIG. 7AR to FIG. 7AS1) for at least a threshold amount of time, or satisfies one or more other attention criteria. For example, menu 774-3 is displayed in response to detecting a user input (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) directed to close affordance 774-2.

FIG. 7AS2 illustrates detecting the user's attention 710-38 directed to object 770a. In some embodiments, in response to detecting a user input (e.g., an air gesture or other input) (e.g., while the user's attention 710-38 is directed to object 770a), the object 770a is rotated. For example, the user's hand 7020 moves (e.g., in a drag gesture or other gesture) from left to right to rotate object 770a. For example, the user provides an input for turning the object 770a such that the orientation of object 770a (e.g., relative to the current viewpoint of the user) changes. For example, object 770a changes from a front view to a side view as object 770b, illustrated in FIG. 7AT. In some embodiments, close affordance 774-2, title bar 7106, grabber 7104b and/or one or more other object management controls continue to be displayed while the user interacts with object 770a. In some embodiments, at least a subset of the object management controls (e.g., a resize affordance and/or other controls) cease to be displayed while the user's attention is not detected as being directed to the respective controls.

FIG. 7AT illustrates that, in some embodiments, the one or more object management controls (e.g., at least one of the object management controls and/or all of the object management controls) do not rotate and/or change in position or viewing angle relative to the user's viewpoint. For example, the one or more object management controls do not rotate with the object 770b. As such, the one or more object management controls are displayed at a different orientation relative to the object 770b (as opposed to the orientation of the one or more object management controls displayed relative to the object 770a before rotating the object 770a). In some embodiments, the one or more object management controls are displayed to maintain the same orientation relative to the user's current viewpoint, without regard to the updated orientation of object 770b. As such, the one or more object management controls are displayed with a second spatial relationship relative to the object 770b (e.g., at a second size and/or at a second angle/orientation relative to the object 770a).

FIG. 7AT illustrates the user's attention 710-39 is directed to grabber 7104b. In some embodiments, while the user's attention 710-39 is directed to grabber 7104b, the computer system detects an input (e.g., an air gesture and/or other selection input) for moving object 770b using the grabber 7104b. For example, object 770b is moved, within the three-dimensional environment 7000′, from a first position illustrated in FIG. 7AT to a second position illustrated in FIG. 7AU (e.g., FIGS. 7AU1, 7AU2 and 7AU3).

In some embodiments, the computer system continues to detect the input (e.g., a drag input, a swipe input, and/or another type of input) for moving object 770b and updates the display to gradually show object 770b moving in accordance with a speed, direction and/or amount of movement indicated by the input (e.g., the displayed position of the object 770b changes over a period of time). For example, in FIG. 7AV, the object 770c appears closer to the viewpoint of the user and moved to the left relative to the position of object 770b in FIG. 7AU.

In some embodiments, in accordance with a determination that the user's attention is not directed to the close affordance 774-2 for at least a threshold amount of time (e.g., and/or that the user has not interacted with the close affordance 774-2 for at least a threshold amount of time), the close affordance 774-2 is visually deemphasized, for example, is redisplayed as its minimized version as affordance 774-1 (e.g., as illustrated in FIG. 7AU (e.g., FIGS. 7AU1, 7AU2 and 7AU3)) and/or ceases to be displayed.

In some embodiments, as illustrated in FIG. 7AV, the object 770c is displayed with a larger size (e.g., relative to object 770b) as the object 770c is moved closer to the viewpoint of the user. For example, the size of object 770c is updated based on a perceived distance between object 770c and the viewpoint of the user.

In some embodiments, the one or more object management controls optionally update in size based on the perceived distance between the object management controls and the viewpoint of the user (e.g., optionally by a lesser amount than the amount that size of object 770c is updated). For example, the displayed sizes of the object management controls are optionally not changed or change to a smaller extent than the change to the displayed size of the object 770c, such that the content of the one or more object management controls remains clear to the viewer (e.g., when the first virtual object gets farther away from the current viewpoint and becomes very small, the one or more object management controls also get farther away but increase in intrinsic size (e.g., the size of the one or more object management controls relative to the three-dimensional environment) so that the one or more object management controls are displayed at a size that is not too small for the user to see) and/or is not unnecessarily obtrusive (e.g., when the object 770c gets closer to the current viewpoint of the user and becomes very large, the one or more object management controls also get closer but shrink in intrinsic size so that their displayed size(s) are not overly large as perceived from the user's current viewpoint). As such, in some embodiments, the displayed size of the object 770c is changed by a different amount than the displayed size(s) of the one or more object management controls as the object 770c moves within the three-dimensional environment.

In some embodiments, the sizes of (e.g., and/or one or more other visual properties of) the one or more object management controls are updated gradually, over a period of time, as the object 770b is moved closer to the user, displayed as object 770c. For example, as the user is moving object 770b, the one or more object management controls change in size and/or position based on the movement of object 770b. For example, as object 770b gets moved farther away from the viewpoint of the user, the object management controls are displayed as gradually decreasing in size and/or the object management controls gradually increase in size relative to the three-dimensional environment (e.g., to a size that is selected based at least in part on their perceived size as they are moved away from and/or towards the user). In some embodiments, the visual appearance (e.g., amount of visual deemphasis) updates gradually (e.g., changes over a period of time) as the object 770b is moved in the three-dimensional environment.

FIG. 7AV further illustrates that, in some embodiments, the object management controls are optionally visually deemphasized while the user is interacting with object 770c. For example, as the user moves object 770c (e.g., using grabber 7104b and/or via another user input), the one or more object management controls, such as affordance 774-4, grabber 7104b and/or title bar 7106 are optionally blurred, faded, decreased in size and/or ceased to be displayed in FIG. 7AV while object 770c is being moved within the three-dimensional environment. In some embodiments, a subset, less than all, of the one or more object management controls are visually deemphasized while the user is interacting with object 770c. For example, platter 772 and/or grabber 7104b (e.g., and/or one or more other object management controls) are not visually deemphasized as the user moves the object 770c, while affordance 774-4 and/or title bar 7106 (e.g., and/or one or more other object management controls) are visually deemphasized. In some embodiments, one or more of the object management controls for object 770a gradually, over a time period, change in appearance (e.g., affordance 774-4 is visually deemphasized and/or changes its angle relative object 770a) while the object 770a is moved in the three-dimensional environment.

In some embodiments, after the object 770b is no longer being moved (e.g., the user input selecting and/or interacting with grabber 7104b is no longer detected), the one or more object management controls are no longer visually deemphasized and are returned to the same visual appearance as displayed before the object 770b was moved. For example, the one or more object management controls cease to be displayed as object 770b is being moved, and reappear after object 770b is displayed at its new position and is no longer being moved.

FIG. 7AW illustrates detecting a user input (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) to reposition the object 770d within the three-dimensional environment 7000'.

FIG. 7AX illustrates that object 770d (now labeled as 770e) is moved, within the three-dimensional environment, to a position that is closer to the viewpoint of the user. In some embodiments, the user's attention 710-42 is detected as being directed to a portion of platter 772. For example, in response to detecting the user's attention as being directed to a respective corner (e.g., or other area of the platter), resize affordance 776 is displayed (e.g., at the respective corner), as shown in FIG. 7AY. In some embodiments, resize affordance 776 is displayed at a position that corresponds to the detected user's attention 710-42.

In some embodiments, resize affordance 776 is displayed as shifting backwards in z-space. For example, in response to detecting that the user's attention is directed to a back corner of platter 772 (e.g., that is displayed farther away, in z-space, from the user's current viewpoint), the resize affordance appears at the respective back corner, and is displayed as being farther away, in z-space, from the user's current viewpoint.

FIG. 7AY illustrates that, while displaying resize affordance 776, in response to detecting the user's attention 710-43 directed to resize affordance 776 and/or in response to detecting a user input (e.g., an air gesture and/or other type of user input) from the user's hand 7020, resize affordance 776 is selected such that the user is enabled to change the size of object 770f. In some embodiments, resize affordance 776 optionally has at least some of the functionality of resize affordance 708-1, as described above with reference to FIGS. 7D1-7D3. For example, grabber 7104a (e.g., and/or one or more other object management controls) is optionally not displayed concurrently with resize affordance 776 and/or an animated transition is displayed whereby grabber 7104a gradually shifts to the right and/or morphs into resize affordance 776.

In some embodiments, in response to the user input illustrated in FIG. 7AY, object 770f is resized to a smaller size, illustrated as object 770g in FIG. 7AZ. In some embodiments, as described with reference to FIG. 7F (e.g., FIGS. 7F1, 7F2 and 7F3), in response to detecting that the user's attention is directed to the resize affordance 708-1 (e.g., detecting that the user is gazing at resize affordance 708-1), the computer system updates one or more visual properties of the resize affordance 708-1 to indicate that the computer system detects the user's attention directed to the resize affordance 708-1 (e.g., and/or while the user performs the resizing operation, the appearance of the resize affordance is updated to indicate that the resize affordance is currently selected).

FIG. 7AZ further illustrates an arrow indicating user movement (e.g., and/or movement of the user's viewpoint) in the physical environment. In some embodiments, in response to the user movement, the three-dimensional environment is updated in FIG. 7BA (e.g., FIGS. 7BA1, 7BA2 and 7BA3) to display the current view of the user. For example, the user moves to the right in the physical environment and/or turns the user's head to the right, such that the current view of the user is shifted to the right relative to the view of the user in FIG. 7AZ.

In some embodiments, object 770h continues to be displayed at its position relative to the three-dimensional environment (e.g., object 770h is world-locked). For example, object 770h does not shift to the right in response to the user movement. In some embodiments, after detecting user movement and updating the current view of the three-dimensional environment to correspond to the current viewpoint of the user, as illustrated in FIG. 7BA (e.g., FIGS. 7BA1, 7BA2 and 7BA3), the one or more object management controls are optionally maintained at a same position relative to object 770h in the current view. For example, the angle (e.g., orientation) at which the one or more object management controls are displayed relative to the object 770h is not changed (e.g., and thus, the angle at which the one or more object management controls are viewed from the current viewpoint of the user is distinct in the current view relative to the previous view illustrated in FIG. 7AZ).

In some embodiments, the angles of the one or more object management controls update in response to detecting that one or more criteria are met. For example, in response to detecting the user's attention directed and object 770h and/or at the one or more object management controls, the one or more object management controls optionally shift to an angle that faces the user as perceived at the current viewpoint of the user.

In some embodiments, if the user's viewpoint changes such that, in the current view, object 770h is no longer displayed in the three-dimensional environment, the one or more object management controls are also not displayed in the three-dimensional environment 7000', but are optionally maintained such that if the user's viewpoint changes to include (e.g., reinclude) object 770h, the one or more object management controls continue to be displayed with object 770h.

FIG. 7BB illustrates a second change in the current viewpoint of the user to a position behind object 770i (e.g., such that the back of the chair is in the current view). In some embodiments, in response to the second change in the current viewpoint of the user (e.g., and in accordance with a determination that the second change in the current viewpoint of the user satisfies update criteria for updating display of the one or more object management controls, such as criteria that are satisfied in accordance with the second change in the current viewpoint changing by at least a threshold amount of change (e.g., in distance, angle, and/or rate of change) relative to the previous viewpoint), and optionally in response to detecting a user input (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) corresponding to a request to move the object 770i, the one or more object management controls are shifted to preferred angle(s) and/or size(s) such that they are easily viewed by the user at the user's current viewpoint. As such, in some embodiments, the one or more object management controls are automatically updated to be displayed with preferred angle(s) and/or size(s) (e.g., that is determined based on a distance and/or angle between object 770i and the user's current viewpoint) in response to detecting a user input (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) for moving the object 770i and/or in response to detecting the user's attention is directed to the object 770i.

Additional descriptions regarding FIGS. 7AQ-7BB are provided below in reference to methods 1300 and 1500 described with respect to FIGS. 13 and 15, respectively.

FIGS. 7BC-7BL illustrate examples of closing different applications or groups of applications in a three-dimensional environment in response to different inputs. FIG. 14 is a flow diagram of an exemplary method 1400 for closing different applications or groups of applications in a three-dimensional environment in response to different inputs. The user interfaces in FIGS. 7BC-7BL are used to illustrate the processes described below, including the processes in FIG. 14.

FIGS. 7BC-7BE illustrate a close affordance displayed in proximity to a user interface of a first application (e.g., overlapping the user interface of the first application, or displayed with an offset from the user interface of the first application) and associated with the user interface of the first application. The close affordance includes or is activatable to cause display of an affordance to cease displaying other applications within a viewport of the three-dimensional environment. The close affordance is activatable for dismissing (e.g., closing or hiding) one or more user interfaces of the first application (e.g., including the main region and/or one or more, or all, auxiliary regions of the application user interface) and/or of other applications.

FIG. 7BC illustrates a viewport of a three-dimensional environment in which respective user interfaces of four applications are displayed. In some embodiments, one or more additional user interfaces of additional applications are also displayed in the three-dimensional environment outside the viewport shown in FIG. 7BC. In FIG. 7BC, the respective user interfaces of respective applications within the viewport include user interface 7202 of a first application, App A; user interface 7206 of a second application, App B; user interface 7204 of a third application, App C; and user interface 7208 application of a fourth application, App D. In the example of FIG. 7BC, attention of user (e.g., by a gaze input that meets a gaze dwell time threshold, a gaze input that has an associated movement that is below a movement threshold, and/or a gaze input that has a gaze velocity over a portion of the user interface of the application that is below a velocity threshold) is directed to user interface 7208 of App D, and optionally the user is providing user input (e.g., a direct air gesture such as an air tap or air pinch at a location with which the user is interacting, an indirect air gesture such as an air pinch while attention of the user or gaze of the user is directed toward at a location with which the user is interacting a hand gesture, tap inputs, press inputs, pinch inputs, body movements, gaze input and drag input, and/or voice commands) to user interface 7208 of App D to interact with the fourth application.

In some embodiments, a user interface of an application (e.g., user interface 7208 or a different user interface) to which attention of the user is directed is visually emphasized, relative to one or more other user interfaces (e.g., user interfaces 7202, 7204, and 7206, or one or more of user interfaces 7202, 7204, and 7206) in the viewport to which attention of the user is not directed to (e.g., in that attention or gaze input toward the one or more other user interfaces is not sustained and does not persist beyond a gaze dwell time threshold). In some embodiments, one or more of App A, App B, App C and/or App D are the same application (e.g., one or more of user interfaces 7202, 7204, 7206 and 7208 are different user interfaces of the same application). In some embodiments, App A, App B, App C and App D are distinct applications. In some embodiments, the user interfaces of respective applications in the viewport have similar visual appearance. For example, visual emphasis is not applied to a user interface of an application to which user attention is directed, and/or visual deemphasis is not provided to one or more user interfaces in the viewport to which user attention is not directed (e.g., a gaze input that does not meet a gaze dwell time threshold, and/or a gaze velocity of the gaze input that exceeds a velocity threshold).

FIG. 7BC illustrates close affordance 7212-1 associated with user interface 7208 of App D. In some embodiments, close affordance 7212-1 is displayed in proximity to, or within a threshold proximity of, user interface 7208 of App D as shown in FIG. 7BC. For example, user interface 7208 (e.g., the main user interface element, or a different portion of the user interface) has a dimension $d_1$ along a first dimension or first edge (e.g., a long edge) and a dimension $d_2$ along a second dimension or second edge (e.g., a short edge). Close affordance 7212-1 is displayed at a distance $g_2$ away from an edge (e.g., a lower edge or a top edge) of user interface 7208, in a direction of or parallel to dimension $d_2$, and at a distance $g_1$ away from an edge (e.g., a left edge or a right edge) of user interface 7208, in a direction of or parallel to dimension $d_1$. In some embodiments, close affordance 7212-1 is displayed in proximity to user interface 7208 such that distance $g_1$ is less than 30%, 20%, 15%, 10%, 5%, 1%, or other threshold percentage of dimension $d_1$ and/or distance $g_2$ is less than 30%, 20%, 15%, 10%, 5%, 1%, or other threshold percentage of dimension $d_2$. In some embodiments, $g_1$ extends left of the left edge of user interface 7208 instead of extending to the right of the left edge as shown in FIG. 7BC. In some embodiments, $g_2$ extends above the bottom edge of user interface 7208 instead of extending below the bottom edge as shown in FIG. 7BC, such that close affordance 7212-1 overlaps with a portion of user interface 7208 (optionally being offset from user interface 7208 along a simulated depth dimension, or a long a z-direction, such as in front of user interface 7208). In some embodiments, close affordance 7212-1 is displayed next to a second auxiliary user interface element of user interface 7208. In some embodiments, the second auxiliary user interface element is distinct from (and optionally separate from) the main user interface element (e.g., the main user interface element having the dimensions $d_1$ and $d_2$ as shown in FIG. 7BC, or a different user interface element having different dimensions). In some embodiments, the second auxiliary user interface element is also displayed within a threshold proximity to the main user interface element of user interface 7208, similar to close affordance 7212-1.

FIG. 7BC also illustrates user input 7210 (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) directed to close affordance 7212-1. In response to detecting user input 7210 directed to close affordance in 7212-1 (FIG. 7BC), and in accordance with a determination that user input 7210 is a first type of input, computer system 101 displays expanded close affordance 7212-2 and an option list 7216-1 corresponding to different options for closing one or more user interfaces of respective applications, as shown in FIG. 7BD (e.g., FIGS. 7BD1, 7BD2 and 7BD3).

Examples of the first type of user input include a gaze input that exceeds a dwell time threshold, a gaze input that has a gaze velocity that is below a velocity threshold, air gestures such as a long press or long pinch, a long tap, a tap sequence (e.g., one or more taps), a movement gesture that meets selection criteria (e.g., having a movement velocity below a threshold, and/or includes movement greater than distance threshold), a head motion (e.g., a head motion coupled with a gaze input and/or an air gesture), a hover input, or a passive input based on a body posture of the user that causes the close affordance to expand.

For example, close affordance 7212-1 is replaced by expanded close affordance 7212-2 in response to: a gaze input directed to close affordance 7212-1 (e.g., directly on close affordance 7212-1, or in proximity (e.g., within a threshold distance of close affordance 7212-1, optionally within the distance $g_1$ or distance $g_2$) for longer than a gaze dwell time threshold; a gaze input with a gaze velocity below a threshold velocity; and/or a hand gesture that includes a pinch gesture, with or without a movement input (e.g., a pinch or pinch and drag input and/or other air gesture). In some embodiments, close affordance 7212-2 is displayed in response to a first portion of user input 7210 directed to close affordance 7212-1 (e.g., including a gaze input directed to close affordance 7212-1) to indicate that the close affordance has focus for subsequent interaction. In some embodiments, display of close affordance 7212-1 is replaced with display of close affordance 7212-2 prior to detection of a second portion of user input 7210 that includes a hand gesture (e.g., in response to which options list 7216-1 is displayed). In some embodiments, a centroid of close affordance 7212-2 is coincident with a centroid of close affordance 7212-1. In some embodiments, computer system 101 displays an animated transition that transforms close affordance 7212-1 into close affordance 7212-2 by expanding close affordance 7212-1 to a size of close affordance 7212-2 and/or dynamically updating a graphical representation (e.g., a glyph or icon) displayed on or within close affordance 7212-2.

In the examples illustrated in FIGS. 7BC and 7BD (e.g., FIGS. 7BD1, 7BD2 and 7BD3), close affordances 7212-1 and 7212-2 are each displayed close to and/or collinear with another auxiliary user interface element of user interface 7208, such as grabber 7214. In some embodiments, close affordance 7212-1 is displayed at a location outside a main user interface element (e.g., platter) of user interface 7208 (e.g., where content of App D is presented).

In some embodiments, as illustrated in FIG. 7BD (e.g., FIGS. 7BD1, 7BD2 and 7BD3), option list 7216-1, displayed in response to the detection of user input 7210 and in accordance with the determination that user input 7210 is the first type of input, is a context menu and/or a pop-up user interface element. Options list 7216-1 includes one or more options for closing one or more user interfaces of respective applications. As shown in FIGS. 7BD, option 7216-2 (e.g., labeled "Hide This App Window") is an option for hiding user interface 7208 associated with close affordance 7212-2 (e.g., the user interface associated with the close affordance to which user input 7210 was directed). Hiding a respective user interface is sometimes referred to hereinafter as hiding an application window.

In some embodiments, hiding a user interface of an application includes ceasing to display the user interface of the application and optionally switching the application from running in a foreground state to running in a background state. In some embodiments, while running the application in a background state, information about a state and/or content of the user interface of the application is retained. In some embodiments, hiding a user interface of an application includes closing the application. In some embodiments, closing the application includes terminating all processes associated with the application that are running on computer system 101 and/or not retaining information about a state and/or content of the user interface of the application. In some embodiments, hiding a respective user interface of an application includes terminating processes associated with displaying content on the respective user interface, but allowing other processes associated with the application to continue (e.g., in a foreground state, or in a background state). In some embodiments, hiding a user interface of an application includes continuing to run the application in a foreground state but without displaying the user interface for that application in a viewport of the three-dimensional environment. For example, in such an approach, the hidden user interface may be quickly brought back into view (e.g., in response to a request to unhide and redisplay the user interface).

In some embodiments, as illustrated in FIGS. 7BD, option list 7216-1 includes option 7216-3 (e.g., labeled "Hide All Windows of this App") to hide all application user interfaces of the application associated with close affordance 7212-2. In some embodiments, option 7216-3 is displayed in accordance with a determination that two or more user interfaces of the application associated with close affordance 7212-2 are open in the three-dimensional environment, optionally including scenarios in which one or more of such user interfaces are outside the viewport. In some embodiments, option 7216-3 includes closing only user interfaces of the application associated with close affordance 7212-2 that are within the viewport. FIGS. 7BI-7BL further illustrate embodiments in which an option for closing two or more user interfaces of a respective application is provided (e.g., where the option for closing two or more user interfaces of the respective application is provided in response to detecting a second type of input that different from the first type of input). In some embodiments, in accordance with a determination that only a single user interface of this application is present in the three-dimensional environment, option 7216-3 is not displayed in option list 7216-1.

In some embodiments, as illustrated in FIGS. 7BD, option list 7216-1 includes option 7216-4 (e.g., optionally displayed as a second element in option list 7216-1 in scenarios in which option 7216-3 is not displayed and/or the order of the options displayed is changed). Option 7216-4 (e.g., labeled "Hide Other Apps"), when activated, allows a user to hide all other applications. In some embodiments, hiding all other applications includes hiding all user interfaces in the three-dimensional environment that are within the viewport and that are user interfaces of applications other than the application associated with close affordance 7212-2. In some embodiments, hiding all other applications includes hiding all user interfaces of applications in the three-dimensional environment other than user interfaces of the application associated with close affordance 7212-2, not just those within the viewport.

FIG. 7BD illustrates detecting user input 7218 (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) directed to option 7216-4 to hide all other applications. For example, FIG. 7BD2, illustrates a direct air gesture is performed using a gesture performed by the user's hand 7020 that is based on the position of the representation of the user's hand 7020' that is directed to a position, in the user interface, that intersects with the position of option 7216-4, and/or an indirect air gesture is performed (e.g., as an alternative to the direct air gesture and/or in addition to the direct air gesture) using a gesture performed by the user's hand 7022 while the user's gaze input 7218a is directed to option 7216-4, but is not based on the position of the representation of the user's hand 7022'. In some embodiments, user input 7218 is a same type of input as user input 7210. Optionally, user input 7218 includes a different type of input from the first type of input. For example, user input 7218 includes a quick pinch input, or a short tap or press input directed to option 7216-4. Providing an option to use a single input to hide all other applications allows a user to more quickly focus on an application of interest (e.g., hiding all other application user interfaces to watch a movie, or hiding all other application user interfaces to initiate an immersive communication session) without having to individually close each of the non-relevant applications.

FIG. 7BE illustrates that, in response to detecting user input 7218 directed to option 7216-4 (FIG. 7BD) for hiding user interfaces of other applications, different from the application associated with the close affordance 7212-2, computer system 101 ceases to display user interface 7202 of App A, user interface 7204 of App C, and user interface 7206 of App B. In FIG. 7BE, only user interface 7208 of App D remains in the viewport of the three-dimensional environment. In some embodiments, no other application user interfaces except those associated with App D remain in the three-dimensional environment. In some embodiments, other user interfaces of App D (e.g., either in the viewport or outside the viewport) remain open in the three-dimensional environment. In some embodiments, other user interfaces of applications other than App D remain opened in the three-dimensional environment outside of the viewport, after detecting user input 7218 directed to option 7216-4.

FIGS. 7BE-7BH illustrate different example scenarios resulting from a user input (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) directed to a close affordance displayed in proximity to a user interface of an application and associated with the user interface of the application, based on whether any other application user interfaces remain in a viewport of the three-dimensional environment after the user interface of the application is closed in response to the user input.

FIG. 7BE illustrates option list 7216-1 displayed in response to activation of close affordance 7212-2 associated with user interface 7208 of application App D. In some embodiments, FIG. 7BE illustrates a transition from FIG. 7BD upon detecting user input 7218 (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) directed to third option 7216-4 (e.g., the viewport illustrated in FIG. 7BE follows from the detection of user input 7218 of FIG. 7BD). In some embodiments, option list 7216-1 is no longer displayed once an operation is performed (e.g., other applications are hidden) in response to detecting input 7218. In some embodiments, display of option list 7216-1 is maintained for a first time period after user interfaces of other applications are hidden, and after the first time period, close affordance 7212-2 and option list 7216-1 cease to be displayed, and close affordance 7212-1 is redisplayed. In some circumstances, a time interval between computer system 101 detecting user input 7218 and detecting user input 7220 is longer than the first time period. In such circumstances, an additional user input (e.g., an input of the first type, including a gaze input, an air gesture, a head gesture, and/or other types of input) is directed to close affordance 7212 (e.g., displayed as close affordance 7212-1, or as close affordance 7212-2 following an initial gaze input directed to close affordance 7212-1), and option list 7216-1 is displayed in response, as shown in FIG. 7BE. Regardless of whether display of option list 7216-1 is maintained from the scenario of FIG. 7BD or redisplayed via a separate invocation, a user is enabled to continue interacting with option list 7216-1.

FIG. 7BE illustrates user input 7220 (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) directed to option 7216-2 for hiding user interface 7208 associated with close affordance 7212-2. In response to detecting user input 7220 directed to option 7216-2, computer system 101 hides user interface 7208 of application App D, as shown in FIG. 7BF. In addition, in accordance with a determination that no user interface of any application is visible in the viewport, computer system 101 automatically displays home menu user interface 7222 without any additional user input. In some embodiments, computer system 101 automatically displays home menu user interface 7222 without any additional user input in accordance with a determination that no user interface of any application is in the viewport (e.g., even if at least one user interface of an application is present in the three-dimensional environment outside the viewport shown in FIG. 7BF). In some embodiments, computer system 101 automatically displays home menu user interface 7222 without any additional user input when no user interface of any application is anywhere within the three-dimensional environment, including within and outside the viewport (e.g., computer system 101 would not automatically display home menu user interface 7222 if there is at least one application user interface outside the viewport, even if there is no user interface of any application in the viewport).

FIG. 7BF shows home menu user interface 7222 displaying a collection of representations 7224, 7226, 7228, 7230, 7232, 7234, 7236, and 7238 (also collectively referred to herein as representations 7224-7238). In some embodiments, representations 7224-7238 correspond to various software applications that can be executed on computer system 101 (e.g., an email application, a web browser, a messaging application, a maps application, a video player, or an audio player, or other software application), representations of one or more other people with whom a user is able to initiate or maintain (e.g., continue or resume) communication or otherwise interact with, or who are capable of interacting with the user, and/or a collection of computer generated (e.g., augmented reality, virtual reality, mixed reality, or other extended reality) three-dimensional environments that can be displayed as (or in) the three-dimensional environment. For example, user input (e.g., a direct air gesture such as an air tap or air pinch at a location with which the user is interacting, an indirect air gesture such as an air pinch while attention of the user or gaze of the user is directed toward at a location with which the user is interacting, a pinch input, a tap input, a gaze input, and/or other input) corresponding to selection of a representation (e.g., one of representations 7224-7238) in home menu user interface 7222 launches a software application associated with the representation, initiates or joins a communication session, or loads a computer-generated environment into the three-dimensional environment.

FIG. 7BG illustrates a different scenario from that depicted in FIG. 7BE in which one or more additional user interfaces are displayed in the viewport (e.g., FIG. 7BG is similar to FIG. 7BD except that user input 7240 (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) in FIG. 7BG is directed to option 7216-2, instead of to option 7216-4 as user input 7218 is in FIG. 7BD).

In response to detecting user input 7240 directed to option 7216-2 to hide the user interface associated with close affordance 7212-2 (FIG. 7BG), computer system 101 hides user interface 7208 of application App D, as shown in FIG. 7BH, without displaying home menu user interface 7222, as is the case in FIG. 7BF, due to the continued presence of user interface 7202 associated with application App A, user interface 7206 associated with application App B, and user interface 7204 associated with application App C in the viewport illustrated in FIG. 7BH. While FIG. 7BH shows more than one remaining user interface of one or more respective applications in the viewport, in some embodiments, home menu user interface 7222 is not displayed as long as there is at least one remaining user interface of an application in the viewport. In some embodiments, if no user interface of any application remains in the viewport, but at least one user interface is open in a portion of the three-dimensional environment outside the viewport, computer system 101 forgoes automatically displaying home menu user interface 7222. In some embodiments, however, if no user interface of any application remains in the viewport, computer system 101 automatically displays home menu user interface 7222 without regard to whether (e.g., even if) at least one user interface is open in a portion of the three-dimensional environment outside the viewport.

FIGS. 7BI-7BL illustrate example interactions with a close affordance, in response to a second type of input that is different from the first type of input described with reference to user input 7210 of FIG. 7BC.

FIGS. 7BI and 7BK illustrate that, in response to detecting a user input (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) directed to close affordance 7212 (e.g., whether displayed as close affordance 7212-1, or as close affordance 7212-2 in response to a gaze input directed to close affordance 7212-1), and in accordance with a determination that the user input is a second type of input, computer system 101 displays an option list 7246-1 corresponding to different options for closing one or more user interfaces of the application associated with close affordance 7212. Examples of the second type of input include a quick pinch shorter than a pinch threshold time, a pinch gesture that includes a movement velocity above a velocity threshold, a tap sequence (e.g., one or more taps), or a combination input that includes a pinch gesture and a movement input (e.g., an air pinch gesture and movement, and/or another type of air gesture). Although the viewport shown in FIGS. 7BI and 7BK is different from the viewport shown in FIG. 7BC (e.g., due to the presence of two user interfaces 7242-1 and 7242-2 associated with App D and the various user interfaces being at different locations in the three-dimensional environment), the close affordances 7212 of FIGS. 7BC, 7BI, and 7BK are all analogous. For example, close affordance 7212 of FIG. 7BC would also, if activated by a user input of the second type instead of the first type, result in display of option list 7246-1 instead of option list 7216-1 in the scenario of FIG. 7BD (e.g., if user input 7210 of FIG. 7BC were an instance of the second type of input instead of an instance of the first type of input).

In some embodiments, in response to detecting a user input of the second type directed to a close affordance, the user interface associated with the close affordance is closed. For example, in response to detecting a user input of the second type directed to close affordance 7212, computer system 101 closes just user interface 7242-1, instead of displaying option list 7264-1 (e.g., and without closing any other displayed user interfaces).

As shown in FIGS. 7BI and 7BK, option list 7246-1 includes: option 7246-2 (e.g., labeled "Hide This Window") to hide user interface 7242-1 of the application associated with close affordance 7212-2; and option 7246-3 (e.g., labeled "Hide All of This App") to hide all user interfaces of the application associated with close affordance 7212-2.

FIGS. 7BI-7BJ illustrate an example outcome in response to detecting a user input (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) directed to an option in option list 7246-1. In FIG. 7BI, user input 7244 (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) is directed to option 7246-3 to hide all user interfaces of the application associated with close affordance 7212-2. In response to detecting user input 7244, computer system 101 hides user interface 7242-1 and user interface 7242-2 of application App D, as shown in FIG. 7BJ, thereby hiding all user interfaces of application App D. In some embodiments, computer system 101 does not display home menu user interface 7222 in conjunction with or after hiding user interfaces 7242-1 and 7242-2, due to the continued presence of user interface 7202 associated with application App A, user interface 7206 associated with application App B, and user interface 7204 associated with application App C in the viewport as illustrated in FIG. 7BJ. While FIG. 7BJ shows no remaining user interface of application App D in the viewport, in some embodiments, one or more open user interfaces of application App D are permitted to remain in a portion of the three-dimensional environment outside the viewport. In some embodiments, in response to detecting user input 7244 selecting option 7246-3 (FIG. 7BI), computer system 101 closes all user interfaces of application App D both within and outside of the viewport, such that no user interface of application App D remains in any portion of the three-dimensional environment. Accordingly, in some embodiments, option 7246-3 is analogous to option 7216-3 described herein with reference to FIG. 7BD (e.g., to hide all application user interfaces of the application associated with close affordance 7212).

FIGS. 7BK-7BL illustrate another example outcome in response to detecting a user input (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) directed to an option in option list 7246-1, different from the outcome illustrated in FIGS. 7BI-7BJ. FIG. 7BK is analogous to FIG. 7BI, except that FIG. 7BK illustrates user input 7248 (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) directed to option 7246-2 to hide the user interface associated with close affordance 7212-2 instead of user input 7244 directed to option 7246-3 to hide all user interfaces of the application associated with close affordance 7212-2, as in FIG. 7BI. In response to detecting user input 7248 directed to option 7246-2, computer system 101 hides user interface 7242-1 of application App D, in accordance with user interface 7242-1 being associated with the close affordance 7212-2 via which option list 7246-1 was invoked, while maintaining display of user interface 7242-2 of application App D, as shown in FIG. 7BL. Accordingly, in some embodiments, option 7246-2 is analogous to option 7216-2 described herein with reference to FIGS. 7BE and 7BG (e.g., to close the current user interface associated with the activated close affordance 7212). In some embodiments, in addition to user interface 7242-2 of application App D, other user interfaces of the application App D remain open, within and/or outside of the viewport.

Additional descriptions regarding FIGS. 7BC-7BL are provided below in reference to method 1400 described with respect to FIG. 14.

FIGS. 7BM1-7CH illustrate examples of displaying a home menu user interface after closing one or more application user interfaces. FIG. 16 is a flow diagram of an exemplary method 1600 for displaying a home menu user interface after closing one or more application user interfaces. The user interfaces in FIGS. 7BM1-7CH are used to illustrate the processes described below, including the processes in FIG. 16.

FIGS. 7BM1-7BP illustrate different example scenarios resulting from the closing of a user interface of an application (e.g., in response to a user input directed to a close affordance), depending on whether any other application user interfaces remain in the viewport of the three-dimensional environment after the user interface of the application is closed.

FIG. 7BM (e.g., FIGS. 7BM1 and 7BM2) illustrates option 7252 that is associated with close affordance 7212 for user interface 7208 of application App D, and that in some embodiments or circumstances is displayed in response to an input directed to close affordance 7212 (optionally a particular type of input as described herein with reference to FIGS. 7BC-7BL). FIG. 7BM (e.g., FIGS. 7BM1 and 7BM2) also illustrates user input 7250 (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) directed to option 7252, labeled "Close," for closing a user interface associated with close affordance 7212-2 (e.g., user interface 7208 of application App D). For example, FIG. 7BM2, illustrates a direct air gesture is performed using a gesture performed by the user's hand 7020 that is based on the position of the representation of the user's hand 7020' that is directed to a position, in the user interface, that intersects with the position of option 7252, and/or an indirect air gesture is performed (e.g., as an alternative to the direct air gesture and/or in addition to the direct air gesture) using a gesture performed by the user's hand 7022 while the user's gaze input 7250a is directed to option 7252, but is not based on the position of the representation of the user's hand 7022'. FIG. 7BM is similar to FIG. 7BE, except that, for simplicity of illustration, FIG. 7BM includes just the single option 7252. One of ordinary skill in the art will readily appreciate that option 7252 is in some embodiments analogous to options 7216-2, 7216-3, 7246-2, or 7246-3 described herein with reference to FIGS. 7BC-7BL.

FIG. 7BN (e.g., FIGS. 7BN1 and 7BN2) illustrates that, in response to detecting user input 7250 corresponding to selection of option 7252 (e.g., in FIGS. 7BM), computer system 101 closes user interface 7208 of application App D (and optionally closes all user interfaces associated with application App D). In accordance with a determination that no user interface of any application is visible in the viewport (in some embodiments permitting one or more user interfaces of respective applications to remain in the three-dimensional environment outside the viewport), computer system 101 automatically displays home menu user interface 7222 without any additional user input.

In some embodiments, the location at which home menu user interface 7222 is displayed is based on the location of user interface 7208 of application App D just prior to user interface 7208 being closed. For example, the location of home menu user interface 7222 in FIG. 7BN (e.g., FIGS. 7BN1 and 7BN2) is based on user interface 7208 being closed from the location of user interface 7208 as shown in FIG. 7BM. If user interface 7208 were closed while displayed at different location, then home menu user interface 7222 would be displayed at a location that is based on the different location from which user interface 7208 was closed.

In FIG. 7B0, in contrast to FIGS. 7BM, one or more additional user interfaces are displayed in the viewport. In particular, FIG. 7B0 additionally shows user interface 7202 of application App A displayed in the viewport, in addition to user interface 7208 of application App D. FIG. 7B0 is thus similar to FIG. 7BG in that user interfaces of multiple applications are displayed in the viewport. FIG. 7B0 also shows user input 7254 (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) directed to option 7252.

In response to detecting user input 7254 corresponding to selection of option 7252 to close user interface 7208 associated with close affordance 7212-2 (FIG. 7B0), computer system 101 closes user interface 7208 of application App D, as shown in FIG. 7BP, without displaying home menu user interface 7222 (e.g., as shown in FIG. 7BN) due to the continued presence of user interface 7202 associated with application App A in the viewport illustrated in FIG. 7BP. In some embodiments, computer system 101 would also forgo automatically displaying home menu user interface 7222 if a user interface is open in a portion of the three-dimensional environment outside the viewport, even if no user interface of any application remains in the viewport.

In some embodiments, in circumstances in which closing an application user interface results in the home menu user interface being displayed in the three-dimensional environment (e.g., in accordance with a determination that no other application user interfaces remain displayed in the viewport or anywhere in the three-dimensional environment, as described herein with reference to FIGS. 7BF and 7BN), various criteria (e.g., timing and/or rate of closing application user interfaces, proximity of closed application user interfaces to each other in space in the three-dimensional environment, proximity of the closing of application user interfaces in time, attention paid to closed application user interfaces by a user, and/or other criteria) are considered in determining placement of the home user interface, as described herein with reference to FIGS. 7BQ-7CB.

FIGS. 7BQ-7BR illustrate placement of the home menu user interface in the three-dimensional environment, where the home menu user interface is displayed in accordance with closing a respective user interface, based on respective locations of the respective user interface and one or more other user interfaces (e.g., taking into account the location(s) of user interface(s) closed within a first time threshold from the closing of the respective user interface and not taking into account the location(s) of user interface(s) closed outside of the first time threshold).

FIG. 7BQ is similar to FIGS. 7BM, except that FIG. 7BQ additionally includes frame 7258-1 and frame 7258-2 (e.g., shown with dashed lines). Frame 7258-1 indicates the position at which user interface 7202 of application App A was closed, and frame 7258-2 indicates the position at which user interface 7204 of App C was closed, at respective times (e.g., shown in timing diagram 7259) prior to computer system 101 detecting user input 7256 (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) directed to option 7252 to close user interface 7208 of application App D.

Timing diagram 7259 shows an example temporal sequence of the closing of user interface 7202, user interface 7204, and user interface 7208 along a time axis or timeline extending to the right, in which later or subsequent events are placed along the timeline to the right of earlier events. Computer system 101 determines whether to position home menu user interface 7222 based on a location of user interface of the application that was just closed, or whether to take into account respective locations of additional user interfaces that were closed within a first time threshold 7260 (e.g., indicated with a left right arrow in timing diagram 7259) from a time an input corresponding to a request to close the last closed user interface was detected or a time the last closed user interface (e.g., user interface 7208 in timing diagram 7259) was closed. In some embodiments, however, there is a negligible difference in time between the detection of the user input for closing a user interface and the time a user interface is closed (e.g., ceases to be displayed, and/or one or more processes associated with the user interface of the application are terminated).

Timing diagram 7259 illustrates that user interface 7204 was closed prior to closing user interface 7208 and within the first time threshold 7260 of the closing of user interface

7208. User interface 7202, although also closed prior to closing user interface 7208, was closed at an earlier time that was beyond first time threshold 7260. As a result, in response to detecting user input 7256 (FIG. 7BQ), computer system 101 positions home menu user interface 7222 in a lower right portion of the viewport, as shown in FIG. 7BR, based on the position of frame 7258-2 in addition to the position of user interface 7208 of application App D, and not based on the position of frame 7258-1. The position of home menu user interface 7222 in FIG. 7BR is thus lower and shifted to the right compared to the position of home menu user interface 7222 in FIG. 7BN (e.g., where home menu user interface 7222 is placed based on the location of user interface 7208 alone).

FIGS. 7BS-7BT illustrate placement of the home menu user interface in the three-dimensional environment, where the home menu user interface is displayed in accordance with closing a respective user interface (e.g., in response to a user input directed to a close affordance associated with the respective user interface), based on respective locations of the respective user interface and one or more other user interfaces, all of which were closed within the first time threshold of the closing of the respective user interface.

FIG. 7BS shows three dashed-line frames of three closed user interfaces at their respective positions prior to being closed: frame 7258-5 representing the position of user interface 7205 of App F, frame 7258-4 representing the position of user interface 7203 of App E, and frame 7258-3 representing the position of user interface 7208 of App D. As shown in timing diagram 7207, user interface 7208 of application App D is the last closed user interface, and both user interface 7205 and user interface 7203 are closed within first time threshold 7260 of the closing of user interface 7208. In some embodiments, in conjunction with closing the last user interface (e.g., user interface 7208 of App D) of a cluster of user interfaces closed within the first time threshold 7260 of the closing of user interface 7208 (e.g., including user interface 7208 of App D, user interface 7203 of App E, and user interface 7205 of App F), computer system 101 places home menu user interface 7222 at a position corresponding to a characteristic portion 7263 of the cluster. For example, characteristic portion 7263 of the cluster is a centroid of the cluster, a region of maximum overlap between the dashed line frames, or a collective location of the cluster in one or more directions or dimensions (e.g., in a lateral dimension or x-direction or azimuthal direction; in a depth dimension or z-direction or distance from the viewpoint of the user; and/or in a height dimension or y-direction or altitudinal angle from the viewpoint of the user). As shown in FIG. 7BT, home menu user interface 7222 is automatically placed at position corresponding to characteristic portion 7263 of the cluster. In some embodiments, home menu user interface 7222 is displayed at a position that coincides with characteristic portion 7263 in one or more directions (e.g., in a lateral dimension or x-direction or azimuthal direction). In some embodiments, home menu user interface 7222 is displayed with an offset from characteristic portion 7263 in one or more directions (e.g., in a depth dimension or z-direction or distance from the viewpoint of the user; and/or in a height dimension or y-direction or altitudinal angle from the viewpoint of the user).

For example, home menu user interface 7222 in FIG. 7BS is laterally centered on characteristic portion 7263 of the cluster (e.g., along a lateral dimension or x-direction, and/or at a respective azimuthal angle with respect to a viewpoint of the user). In contrast, in other directions, home menu user interface 7222 is displayed offset from the positions of the respective dashed-line frames of the cluster, such as in front of the positions of the cluster (e.g., along the depth dimension, closer to the viewpoint of user, and/or at a lesser radial distance from the viewpoint of the user) (e.g., a respective distance in front of characteristic portion 7263, where the position of characteristic portion 7263 in the z-direction or radial direction is the position of the frame closest to the viewpoint of the user), and/or above characteristic portion 7263 of the cluster (e.g., a respective amount higher along a y-direction, further from representation 7008' of the floor, such as raised by between 1-10° relative to characteristic portion 7263 as determined from a viewpoint of the user, and/or a respective amount higher in altitudinal angle from the viewpoint of the user). In some embodiments, a central portion of home menu user interface 7222 is aligned with characteristic portion 7263, or a top portion of the home menu user interface 7222 is aligned with characteristic portion 7263.

Top view 7275 of FIG. 7BT illustrates a location of home menu user interface 7222, and locations of user interface 7203, user interface 7205, and user interface 7208 just prior to being closed, as seen from above (e.g., from the top, rather than from the front as in the viewport illustrated in FIG. 7BT as visible via computer system 101). Coordinate diagram 7225 in the coordinate system of the three-dimensional environment for top view 7275 shows the z-axis (e.g., depth dimension or radial direction) extending upwards and the x-axis extending to the right. For the viewport shown in FIG. 7BT, the depth dimension (e.g., z-direction or radial direction) extends into the page from a front view of home menu user interface 7222. Top view 7275 of FIG. 7BT shows that home menu user interface 7222 is placed in front of the locations of the closed user interfaces 7203, 7205, and 7208.

FIGS. 7BU-7BX illustrate different example placements of the home menu user interface, where the home menu user interface is displayed in accordance with closing a respective user interface, based on the amount of time between the closing of the respective user interface and the closing of another user interface (e.g., most recently closed) prior to detecting the user input corresponding to the request to close the respective user interface.

FIG. 7BU is similar to FIG. 7BS in that there are two other user interfaces that were closed (e.g., indicated by frame 7258-1 representing closed user interface 7202 of App A and frame 7258-2 representing closed user interface 7204 of App C) within first time threshold 7260 prior to the closing of the last user interface (e.g., user interface 7208). Timing diagram 7209 shows that user interface 7202 of App A is closed first, followed by user interface 7204 of App C, and finally user interface 7208 of App D is closed in response to detecting user input 7262 (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) (FIG. 7BU) directed to option 7252 for closing user interface 7208 associated with close affordance 7212. Both user interface 7202 and user interface 7204 are closed within first time threshold 7260 of the closing of user interface 7208. Timing diagram 7209 also shows a time delay 7213 (e.g., within first time threshold 7260) between the closing of the last user interface 7208 and the closing of the penultimately closed user interface 7204. For example, after closing user interface 7204 of App C, the user pauses (e.g., by directing attention to a different user interface, or to a different portion of the viewport, and/or interacting with one or more other user interface objects) for a length of time (e.g., time delay 7213) before closing the last user interface 7208 of App D.

FIG. 7BV illustrates that, in response to detecting user input 7262 (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) corresponding to selection of option 7252 associated with close affordance 7212-2 (FIG. 7BU), computer system 101 ceases to display user interface 7208, and automatically displays home menu user interface 7222 in three-dimensional environment at the location depicted in FIG. 7BV. In accordance with a determination that time delay 7213 between the closing of user interface 7208 and the penultimately closed user interface (e.g., user interface 7204) is greater than a delay time threshold (e.g., between 25-75% of first time threshold 7260, or defined independently of first time threshold 7260, such as a threshold of 1 s, 2 s, 5 s, 8 s, 10 s, 15 s, or other amount of time), computer system 101 disregards the positions of closed application user interfaces other than user interface 7208 (e.g., even other application user interfaces closed within first threshold time 7260) in determining where to display home menu user interface 7222. Accordingly, because the viewpoint of the user in FIGS. 7BU-7BV is the same as in FIGS. 7BM-7BN, and the position of user interface 7208 in the viewport is the same in FIG. 7BU as in FIG. 7BM (e.g., FIGS. 7BM1 and 7BM2), the position of home menu user interface 7222 in the viewport in FIG. 7BV is the same as in FIG. 7BN (e.g., FIGS. 7BN1 and 7BN2) (e.g., because the respective positions of the additional user interfaces that were closed within first time threshold 7260 in the example of FIG. 7BU were not taken into account in determining the placement of home menu user interface 7222 in FIG. 7BV). FIG. 7BV thus illustrates the impact of closing a last closed application user interface more than a delay time threshold after closing other application user interfaces.

It is noted that in FIG. 7BV, top view 7211 of FIG. 7BV illustrates that the respective locations of user interface 7202, user interface 7204, and user interface 7208, prior to being closed, as seen from above, are within spatial threshold 7215 from one another and thus satisfy a spatial proximity requirement for forming a cluster (e.g., in accordance with a determination that a respective application user interface at a respective location is within spatial threshold 7215 from another (e.g., one or more, or all) application user interfaces of the cluster). In some embodiments, pairwise distances between pairs (e.g., all pairs, or some of the pairs) of the closed user interfaces are determined and user interfaces having pairwise distances above a threshold are excluded from the cluster. Optionally, an average location (e.g., centroid) of a group of user interfaces is determined, and user interfaces that are outside a threshold radius from the average location are excluded from the cluster (e.g., a user interface is excluded from the cluster if a characteristic portion, such as a centroid or respective edge or respective corner, is outside the threshold radius, or if or any portion of the user interface is outside the threshold radius; or the user interface is included in the cluster if the characteristic portion is within the threshold radius or if any portion of the user interface is within the threshold radius).

More generally, in some embodiments, including as described with reference to FIG. 7BS, the placement of a home menu user interface such as home menu user interface

7222 is determined based on respective locations of a cluster of closed application user interface. In some embodiments, the cluster includes application user interfaces that meet proximity criteria (also called herein cluster criteria). In some embodiments, as described herein with reference to spatial threshold 7215 (FIG. 7BV), the proximity criteria include a spatial proximity requirement that respective closed application user interfaces be within a spatial threshold in order to be part of the cluster. In some embodiments, as described herein with reference to first time threshold 7260 (e.g., FIGS. 7BQ-7CB), the proximity criteria include a temporal proximity requirement that respective user interfaces be closed within a threshold time of the last closed user interface in order to be part of the cluster. In some embodiments, the proximity criteria include the temporal proximity requirement without the spatial proximity requirement, the spatial proximity requirement without the temporal proximity requirement, or both (e.g., with or without one or more other requirements). In some embodiments or circumstances, the user interfaces within a cluster change as a function of time, due to closure and/or display of additional user interfaces, and/or movement of user interfaces. In some embodiments, computer system 101 determines a placement position of home menu user interface 7222 based on respective locations of user interfaces in the cluster without taking into respective locations of user interfaces that are excluded from the cluster.

FIGS. 7BW-7BX, in contrast to FIGS. 7BU-7BV, illustrate placement of the home menu user interface in the three-dimensional environment in scenarios in which time intervals between closing successive user interfaces (e.g., and in particular the time interval between closing the penultimately closed user interface and the last closed user interface) do not exceed the delay time threshold.

FIG. 7BW shows the same viewport as in FIG. 7BU (e.g., with user interface 7208, frame 7258-1, and frame 7258-2 at the same respective locations), and user input 7264 (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) directed to option 7252 associated with close affordance 7212-2. In response to detecting user input 7264, computer system 101 ceases to display user interface 7208, and displays home menu user interface 7222 in three-dimensional environment at the location depicted in FIG. 7BX. In the scenario of FIGS. 7BW-7BX, a time interval between the closing of user interface 7208 and the closing of the most recent prior closed user interface 7204, as shown in timing diagram 7217, is less than the delay time threshold. As a result, the placement of home menu user interface 7222 in FIG. 7BX is based on locations of all user interfaces closed within the first time threshold 7260 (e.g., taking into account the respective positions of frames 7258-1 and 7258-2 in addition to the position of user interface 7208, optionally in accordance with a determination that frames 7258-1 and 7258-2 and user interface 7208 satisfy the spatial proximity requirement), in contrast to the scenario illustrated in FIGS. 7BU and 7BV (e.g., in which home menu user interface 7222 is positioned based on the position of user interface 7208 without taking into account the respective positions of frames 7258-1 and 7258-2). Thus, the position of home menu user interface 7222 in the viewport as illustrated in FIG. 7BX is different from the position of home menu user interface 7222 in the viewport illustrated in FIG. 7BV, which is depicted as dashed-line frame 7258-10 in FIG. 7BX for comparison. For example, due to dashed-line frames 7258-1 and 7258-2 being offset to the right of and, on average, downward from user interface 7208, home menu user interface 7222 in FIG. 7BX is positioned to the right of and downward from dashed-line frame 7258-10.

FIGS. 7BY-7BZ illustrate placement of the home menu user interface in the three-dimensional environment based on whether respective locations of closed user interfaces of respective applications meet proximity criteria that include both a spatial proximity requirement and a temporal proximity requirement.

In FIG. 7BY, the positions of dashed-line frames 7258-1 and 7258-2 and user interface 7208 are analogous to those depicted in FIG. 7BW, and FIG. 7BY further includes dashed-line frame 7258-6 indicating the position of user interface 7206 of application App B when closed. FIG. 7BY also shows user input 7266 (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) directed to option 7252 associated with close affordance 7212-2, to close associated user interface 7208. In timing diagram 7221, the timing of the respective closings of frames 7258-1 and 7258-2 and user interface 7208 are analogous to those in FIG. 7BW, and timing diagram 7221 additionally shows that user interface 7206 is also closed within first time threshold 7260, after the closing of user interface 7202 and before the closing of user interface 7204. In response to detecting user input 7266 (FIG. 7BY), computer system 101 ceases to display user interface 7208, and displays home menu user interface 7222 in three-dimensional environment at the location depicted in FIG. 7BZ. However, because user interface 7206 of App B is located outside of spatial threshold 7215, as depicted in top view 7223, computer system 101 does not take the position of frame 7258-6 into account in determining the location of home menu user interface 7222 shown in FIG. 7BZ. Because the position of frame 7258-6 is not included in the determination of the location of home menu user interface 7222, whereas the same respective positions of dashed-line frames 7258-1 and 7258-2 are taken into account in addition to the position of user interface 7208, the resulting placement of home menu user interface 7222 in FIG. 7BZ is the same as that depicted in FIG. 7BX.

FIGS. 7CA-7CB illustrate placement of the home menu user interface in the three-dimensional environment based on whether respective locations of user interfaces of respective applications meet proximity criteria that include attention criteria (e.g., optionally in addition to a spatial proximity requirement and/or a temporal proximity requirement).

In FIG. 7CA, the positions of dashed-line frames 7258-1, 7258-2, and 7258-6 and user interface 7208 are analogous to those depicted in FIG. 7BY, and FIG. 7CA further includes dashed-line frame 7258-4 indicating the position of user interface 7203 of App E when closed. FIG. 7CA also shows user input 7268 (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) directed to option 7252 associated with close affordance 7212-2, to close associated user interface 7208. In timing diagram

7225, the timing of the respective closings of frames 7258-1, 7258-2, and 7258-6 and user interface 7208 are analogous to those in FIG. 7BY. As shown in timing diagram 7225, user interface 7203 of App E was closed outside of first time threshold 7260, prior to the closing of user interface 7202, and as shown in top view 7227, user interface 7203 of App E was located outside of spatial threshold 7215.

FIG. 7CB illustrates that, in response to detecting user input 7268 (FIG. 7CA), computer system 101 ceases to display user interface 7208 and displays home menu user interface 7222 in the three-dimensional environment at the location depicted in FIG. 7CB. FIG. 7CB illustrates embodiments in which computer system 101 determines where to display home menu user interface 7222 based on which user interface(s) meet the attention criteria, such as which received the most attention (e.g., based on receiving attention for the longest time among all the user interfaces closed within first time threshold 7260, via a gaze input having a gaze movement that varies below a threshold amount, based on receiving a highest number of user interactions, based on involving a highest amount of cognitive engagement, and/or other factors). In some embodiments, computer system 101 generates a sorted list of descending amounts of attention, such as gaze time or a number of interactions, for one or more (e.g., all, or a majority) of the application user interfaces. In some embodiments, the user interface(s) that meet the attention criteria include the first element or top N elements in the sorted list of descending amounts of attention.

FIG. 7CA indicates that the user's attention 7276 was directed most to user interface 7202 (e.g., represented by dashed-line frame 7258-1 after closing of user interface 7202), of the user interfaces closed within the first time threshold 7260, such that user interface 7202 meets the attention criteria. Because user interface 7202 meets the attention criteria, the location of home menu user interface 7222 depicted in FIG. 7CB is determined based on the location of user interface 7208 (e.g., due to being the last remaining user interface in the three-dimensional environment just prior to being closed, in some embodiments even if user interface 7208 does not itself meet the attention criteria) and the location of frame 7258-1 corresponding to user interface 7202 as shown in FIG. 7CA. The locations of user interfaces 7206 and 7204 are disregarded for not meeting the attention criteria (and user interface 7206 also does not meet the spatial proximity requirement). Accordingly, the placement of home menu user interface 7222 in FIG. 7CB is higher than and to the right of the placement of home menu user interface 7222 in FIG. 7BN (e.g., FIGS. 7BN1 and 7BN2), because the position of dashed-line frame 7258-1 is taken into account in the placement of home menu user interface 7222 in FIG. 7CB. In addition, the placement of home menu user interface 7222 in FIG. 7CB is higher than the placement of home menu user interface 7222 in FIG. 7BZ, because the position of frame 7258-2, while considered in the placement of home menu user interface 7222 in FIG. 7BZ, is ignored in the placement of home menu user interface 7222 in FIG. 7CB.

In some embodiments, as illustrated in FIGS. 7CA-7CB, closed user interfaces that would otherwise meet attention criteria are excluded in determining the placement of the home menu user interface if the closed user interfaces do not meet one or more other requirements of the proximity criteria. For example, the location of frame 7258-4 corresponding to App E in FIG. 7CA is ignored in determining the placement of home menu user interface 7222 in FIG. 7CB, because App E was closed outside of the first time threshold 7260 as shown in timing diagram 7225 and/or because user interface 7203 of App E was outside the spatial threshold 7215 as shown in top view 7227 (e.g., even if the user paid the same or more attention to user interface 7203 of application App E as to the user interfaces of the other applications such that user interface 7203 of application App E meets the attention criteria).

FIGS. 7CC-7CH illustrate different example scenarios in response to detecting a user input (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) directed to a portion of computer system (e.g., a respective input device or input element) associated with the home menu user interface, based on whether a home menu user interface is within a viewport of the three-dimensional environment at the time the user input is detected.

FIG. 7CC illustrates a viewport of the three-dimensional environment that includes user interface 7208 and a passthrough view that includes representation 7008' of the floor and a representation 7014' of physical object 7014. The viewport of the three-dimensional environment illustrated in FIG. 7CC does not include home menu user interface 7222. Optionally, home menu user interface 7222 is present in a portion of the three-dimensional environment outside the viewport illustrated in FIG. 7CC. FIG. 7CC also illustrates user input 7270 (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) detected via button 7273 associated with the home menu user interface. In some embodiments, display generation component 7100 is provided within a housing of computer system 101, and one or more buttons 7271 and 7273 are provided on the housing that encloses or surrounds display generation component 7100. In some embodiments, user input 7270 is a respective type of input (e.g., a button press directed to one or more of button 7271 and/or button 7273, a rotational input to button 7271 and/or button 7273, a hand gesture such as an air gesture, a gaze and pinch gesture, a tap gesture, a long press gesture, or other system gesture associated with the home menu user interface).

FIG. 7CD illustrates that, in response to detecting user input 7270 (FIG. 7CC), computer system 101 displays home menu user interface 7222 in the three-dimensional environment at a characteristic portion relative to the current viewport (e.g., a central portion of the viewport, in a portion of the viewport that is lower, along a y-direction, than a viewpoint of the user, closer to representation 7008' of the floor, such as lowered by between 1-10° as determined from the viewpoint of the user, and/or a respective amount lower in altitudinal angle from the viewpoint of the user). In some embodiments, home menu user interface 7222 is displayed in the scenario of FIG. 7CD in accordance with a determination that home menu user interface 7222 was not displayed when user input 7270 was detected (FIG. 7CC). In some embodiments, as illustrated in FIG. 7CD, the home menu user interface 7222 is displayed at the characteristic portion of the viewport in accordance with being displayed in response to an input via button 7273, rather than being displayed based on a characteristic portion of a cluster of one or more application user interfaces in accordance with being displayed automatically in conjunction with the closing of an application user interface.

FIGS. 7CE-7CF stand in contrast to FIGS. 7CC-7CD with respect to the behavior of computer system 101 in response to detecting a user input (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) via button 7273. In particular, FIG. 7CE illustrates user input 7272 (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) detected via button 7273, which is optionally a same type of input as user input 7270 (FIG. 7CC). Unlike in FIG. 7CC where no home menu user interface was visible in the viewport, the viewport of the three-dimensional environment illustrated in FIG. 7CE includes home menu user interface 7222 in addition to user interface 7208 and a passthrough view that includes representation 7008' of the floor and representation 7014' of physical object 7014. FIG. 7CF illustrates that, in response to detecting user input 7272, computer system 101 ceases to display home menu user interface 7222 and in some embodiments also ceases to display user interface 7208 of application App D. In some embodiments, computer system 101 continues displaying user interface 7208 of application App D in response to detecting user input 7272 until detecting a repetition of user input 7272, in response to which computer system 101 then ceases to display user interface 7208 of application App D such that only the passthrough view is visible.

In some embodiments, if a user were to move away from the viewpoint corresponding to the viewport shown in FIG. 7CE to a viewpoint from which home menu user interface 7222 at the location in the three-dimensional environment shown in FIG. 7CE is no longer visible (e.g., if the user turns or moves in such a way that home menu user interface 7222 is no longer within the user's viewport), a user input (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) then directed to button 7273 while a home menu user interface is not visible in the user's current viewport would cause computer system 101 to reposition the home menu user interface 7222 from the location in the three-dimensional environment shown in FIG. 7CE to a characteristic portion of the current viewport (e.g., as described herein with reference to FIGS. 7CC-7CD).

FIGS. 7CG-7CH illustrate placement of the home menu user interface in the three-dimensional environment in response to detecting a user input (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) (e.g., user input 7274) via button 7273 while multiple application user interfaces and no home menu user interface (or portion thereof) are displayed in the viewport of the three-dimensional environment. FIGS. 7CG-7CH thus differ from FIGS. 7CC-7CD in that, in FIGS. 7CC-7CD, a single application user interface is displayed in the viewport when a user input via button 7273 is detected. FIGS. 7CG-7CH also differ from FIGS. 7BM-7BN and 7BQ-7CB in that, in FIGS. 7BM-7BN and 7BQ-7CB, the home menu user interface is displayed automatically in conjunction with closing a user interface rather than in response to a user input via button 7273.

In FIG. 7CG, user interface 7206 of App B, user interface 7208 of App D, and user interface 7204 of App C are displayed within the viewport of the three-dimensional environment, and no home menu user interface is displayed within the viewport. Even though FIG. 7CG depicts user interface 7206, user interface 7208, and user interface 7204 as being displayed in the viewport, in some scenarios, one or more of user interface 7206, user interface 7208, and user interface 7204 have been closed (e.g., within first time threshold 7620 or beyond first time threshold 7620 of each other). FIG. 7CG also illustrates user input 7274 (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) (e.g., a user input that is of a same type as user input 7272 (FIG. 7CE) and/or as user input 7270 (FIG. 7CC)) detected via button 7273. In some embodiments, computer system 101 detects user input 7274 while attention 7276 (e.g., representing a gaze input that meets attention criteria, and/or a head elevation or other posture of a user that meets attention criteria) of the user is directed to a target location in the three-dimensional environment. FIG. 7CH illustrates that, in response to detecting user input 7274 (FIG. 7CG), computer system 101 displays home menu user interface 7222 in the three-dimensional environment.

Because home menu user interface 7222 in FIG. 7CH is displayed in response to user input 7274 via button 7273 (e.g., manually requesting display of home menu user interface 7222) rather than automatically in conjunction with closing a user interface, home menu user interface 7222 in FIG. 7CH is displayed at the characteristic portion of the viewport, as described with reference to FIGS. 7CC-7CD, rather than a characteristic portion (e.g., a centroid or an edge) of a cluster of application user interfaces that satisfy the proximity criteria (e.g., user interfaces 7206, 7208, and 7204, via spatial proximity) as described herein with reference to FIGS. 7BS-7CB. Accordingly, in the example of FIG. 7CH, home menu user interface 7222 is displayed at a home location (e.g., in the characteristic portion of the viewport) that is independent of the respective locations of one or more of user interface 7206 of App B, user interface 7208 of App D, and user interface 7204 of App C, and independent of any characteristic portion of the cluster of user interfaces 7206, 7208, and 7204.

In some embodiments, the home location at which home menu user interface 7222 is placed is the target location of attention 7276, or is determined relative to the target location of attention 7276. In some embodiments, the home location is determined relative to the current viewport of the three-dimensional environment when user input 7274 (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) is detected (e.g., in a substantially central portion of the viewport), as described in reference to FIG. 7CD. For example, a centroid of home menu user interface 7222 is within a threshold angular distance (e.g., within 1°, 2°, 3°, 5°, 10°, or other angle) of a head elevation of the user (e.g., within the threshold angular distance of a normal vector originating from a head or eye portion of the user) or of the target location of attention 7276.

In some embodiments, the home location at which home menu user interface 7222 is displayed is at a respective (e.g., default) distance from a viewpoint of the user, such as a distance that is between 0.5 m to 5 m from the viewpoint of the user in a simulated depth dimension of the three-dimensional environment. In some embodiments, home menu user interface 7222 is displayed closer to the viewpoint of the user, in the simulated depth dimension of the three-dimensional environment, than one or more application user interfaces are to the viewpoint of the user (e.g., home menu user interface 7222 is positioned closer than the closest of the one or more application user interface), as shown in top view 7229 in FIG. 7CH.

Additional descriptions regarding FIGS. 7BM-7CH are provided below in reference to method 1600 described with respect to FIG. 16.

FIG. 8 is a flow diagram of an exemplary method 800 for conditionally displaying controls for applications, in accordance with some embodiments. In some embodiments, method 800 is performed at a computer system (e.g., computer system 101 in FIG. 1) including a display generation component (e.g., display generation component 120 in FIGS. 1A, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 800 are, optionally, combined and/or the order of some operations is, optionally, changed.

Method 800 describes conditionally displaying controls for an application window in response to detecting a user's gaze. Automatically displaying a control in response to detecting a user's gaze directed to an area of the control, without requiring additional user input, enables the user to access a particular control to perform an operation by shifting the user's gaze, without cluttering the user interface with display of all the available controls.

The method 800 is performed at a computer system that is in communication with a first display generation component (e.g., a first display generation component of a two-sided display generation component, a heads-up display, a head-mounted display (HMD), a display, a touchscreen, a projector, a standalone display, and/or a display that is enclosed in the same housing as another display generation component of the same type or a different type) and one or more input devices (e.g., cameras, controllers, touch-sensitive surfaces, joysticks, buttons, gloves, watches, motion sensors, and/or orientation sensors). In some embodiments, the first display generation component is a display component facing the user and provides an XR experience to the user. In some embodiments, the first display generation component includes two or more display components (e.g., one set for each eye) that display slightly different images to form a stereoscopic view of the three-dimensional environment. In some embodiments, the first display generation component and a second display generation component form a two-sided display device (e.g., a two-sided HMD) that displays a first user interface on a first side corresponding to the first display generation component, and a second user interface on the second side corresponding to the second display generation component. In some embodiments, the second display generation component is a display component facing away from the user and toward an external environment of the user and optionally provides status information related to the first display generation component (e.g., displayed content and/or operational state) and/or the user (e.g., movement of the user's eyes, and/or attention state of the user) to other users in the external environment. In some embodiments, the computer system is an integrated device with one or more processors and memory enclosed in the same housing as the first and the second display generation components and at least some of the one or more input devices. In some embodiments, the computer system includes a computing component (e.g., a server, a mobile electronic device such as a smart phone or tablet device, a wearable device such as a watch, wristband, or earphones, a desktop computer, or a laptop computer) that includes one or more processors and memory that is separate from the display generation component(s) and/or the one or more input devices. In some embodiments, the display generation component(s) and the one or more input devices are integrated and enclosed in the same housing.

The computer system displays (802), via the first display generation component, a first object (e.g., a user-interface object that is associated with an application and/or experience (e.g., an application window, a media display area, a viewport into a three-dimensional environment, and/or a user interface control region), an application view, and/or a virtual object) in a first view of a three-dimensional environment, wherein the first object includes at least a first portion of the first object (e.g., corners of the first object, and/or edges of the first object) and a second portion of the first object (e.g., an interior portion of the first object, and/or portions other than the first portion of the first object). For example, in FIG. 7B, display generation component 7100 displays application window 702 and virtual object 7028.

While displaying the first object, the computer system detects (804), via the one or more input devices, a first gaze input that meets first criteria, wherein the first criteria require that the first gaze input is directed to the first portion of the first object (e.g., a preselected point and/or segment along the boundary (e.g., corners and/or edges) of the first object) in order for the first criteria to be met. In some embodiments, the first object is an application window or a viewport into a three-dimensional environment. In some embodiments, the first portion of the first object is a corner or an edge of the first object (e.g., a respective one of the corners and/or edges of a rectangular object). In some embodiments, the first portion of the first object is one or more preselected points on a periphery of the first object (e.g., a respective one of the top, left, right, bottom points along the circumference of a circular or oval object). In some embodiments, the first criteria require that the first gaze input being maintained on the first portion of the first object for at least a threshold amount of time in order for the first criteria to be met. In some embodiments, the first criteria are not met if the first gaze input is detected outside of the first portion of the first object, (e.g., in the second portion of the first object). For example, as described with reference to FIGS. 7D, in response to detecting the user's attention 710-2 (e.g., a gaze input that meets the first criteria), the computer system displays resize affordance 708-1.

In response to detecting that the first gaze input meets the first criteria, the computer system displays (806) a first control element (e.g., an affordance or control object) (e.g., grabber 706-1, resize affordance 708-1, and/or close affordance 7030) that corresponds to a first operation associated with the first object, wherein the first control element was not displayed prior to detecting that the first gaze input met the first criteria (e.g., the first control element is a newly displayed user interface object or an initially displayed user interface object in response to the detection of the first gaze input meeting the first criteria). In some embodiments, the first control element is displayed at or next to the first portion of the first object (e.g., a grabber icon appears on or near the respective corner of the first object). In some embodiments, the first control element is selectively presented for display based at least in part on the respective portion of the first object on which the first gaze input has been detected. In some embodiments, the first criteria do not require another user input, such as a gesture input (e.g., an air gesture input) or an input provided via another input device, to be detected in conjunction with the first gaze input, in order for the first criteria to be met. In other words, in some embodiments, the first gaze input alone triggers the display of the first control element, without the accompaniment of other types of inputs from the user. For example, as described with reference to FIGS. 7D, in response to detecting the user's attention 710-2 (e.g., a gaze input that meets the first criteria), the computer system displays resize affordance 708-1.

While displaying the first control element, the computer system detects (808), via the one or more input devices, a first user input (e.g., a gaze and pinch gesture or another selection gesture or input) directed to the first control element. For example, as described with reference to FIG. 7K (e.g., FIGS. 7K1, 7K2 and 7K3), a user input is detected via the user's hand 7020 that is directed to resize affordance 708-5.

In response to detecting the first user input directed to the first control element, the computer system performs (810) the first operation with respect to the first object (e.g., increases or decreases the size of the first object, increases the length of a respective edge of the first object without changing the length of other edges of the first object, moves (e.g., translates and/or rotates) the first object as a whole, and/or closes the first object). In some embodiments, the first operation that is performed on the first object is chosen based at least in part on the type of the user input, the characteristic values of the user input, the type of the first user interface object, the location or type of the first portion of the first object, and/or the type of the first object. For example, as described with reference to FIG. 7L, application window 702 is resized in accordance with the movement of the user's hand 7020. As described with reference to FIGS. 7O-7P, in response to a user input directed to resize affordance 714-2, virtual object 7028 is resized to a smaller size. As another example, as described with reference to FIGS. 7W-7Z, in response to user input selecting grabber 706-3, application window 702 is moved in position within the three-dimensional environment.

In some embodiments, displaying the first object in the first view of the three-dimensional environment includes displaying an application window (e.g., application window 702) of a first application (e.g., a control panel application, a launchpad or home application, a communication application, an application providing a shared experience for multiple users, or another system or user application executable in a three-dimensional environment) in the first view of the three-dimensional environment (e.g., an AR or VR environment). For example, the first object is a virtual application window, such as a two-dimensional or pseudo-three-dimensional window that is displayed at a first position in the three-dimensional environment. In some embodiments, while displaying the virtual application window in the first view of the three-dimensional environment, the computer system detects, via the one or more input devices, a second gaze input that meets second criteria, wherein the second criteria require that the second gaze input is directed to a first portion of the virtual application window (e.g., one or more corners of the virtual application window or an edge of the virtual application window) (e.g., the first portion of the virtual application window is an instance of one or more example instances of the first portion of the first object) in order for the second criteria to be met; and in response to detecting that the second gaze input meets the second criteria, the computer system displays a second control element (e.g., the second control element is an instance of one or more example instances of the first control element) that corresponds to a second operation associated with the virtual application window (e.g., the second operation is an instance of one or more example instances of the first operation), wherein the second control element was not displayed prior to detecting that the second gaze input met the second criteria. In some embodiments, the second control element is an object resize control (e.g., resize control 708-1, FIG. 7F) that is displayed at or near a respective corner of the virtual application window. In some embodiments, the second control element is an object move control (e.g., grabber bar (e.g., grabber 706-1) or other affordance) for repositioning the virtual application window within the three-dimensional environment. In some embodiments, the second control element is an object close control (e.g., close affordance 7030, FIG. 7D3) for closing the virtual application window, wherein, in response to detecting selection of the object close control, the computer system ceases to display the virtual application window in the three-dimensional environment. Dynamically displaying a respective control in response to a user gazing at a corresponding respective portion of an application window in an AR/VR environment enables the user to access additional controls for the application window without displaying additional controls that obscure the user's view of the AR/VR environment.

In some embodiments, while displaying the first object, the computer system detects, via the one or more input devices, a third gaze input, directed to the second portion of the first object (e.g., an interior portion of the first object that is not near a corner and/or an edge included in the first portion of the first object) that is distinct from the first portion of the first object, that does not meet the first criteria. In some embodiments, the third gaze input does not meet the first criteria because the third gaze input is not directed to the first portion of the first object. For example, the first and second portions of the first object respectively correspond to distinct control elements that are associated with distinct operations that can be performed with respect to the first object. In some embodiments, the second portion of the first object does not correspond to a control element (e.g., the computer system does not display a control element for performing an operation associated with the first object). For example, a gaze input directed to an interior portion of the first object does not cause the computer system to display a resize control, a move control, a close control. For example, in FIG. 7S, while the user's attention 710-16 is directed to a center portion of application window 702, the computer system 101 forgoes displaying resize affordance 708-1 and close affordance 7030, and optionally forgoes displaying grabber 706-1.

In some embodiments, in response to detecting that the third gaze input does not meet the first criteria, the computer system forgoes display of the first control element that corresponds to the first operation associated with the first object. For example, in some embodiments, in accordance with a determination that the third gaze input is not directed to the first portion of the first object and/or does not meet the first criteria, the first control element (e.g., resize affordance, close affordance, and/or move affordance) is not displayed. In some embodiments, in response to detecting that the third gaze input satisfies third criteria, wherein the third criteria require that the third gaze input is directed to the second portion of the first object in order for the third criteria to be met, the device displays a third control element that corresponds to a third operation associated with the first object. For example, in some embodiments, the first portion is a lower corner of the first object, and in response to a gaze input on the lower corner, the computer system displays a resize affordance (e.g., the first control element); the second portion of and the second portion is an upper left corner of the first object, and in response to a gaze input on the upper left corner, the computer system displays a close affordance (e.g., a third control element), without displaying the resize affordance. For example, as described with reference to FIGS. 7H-7J, in response to detecting that the user's attention 710-6 is not directed to the bottom right corner, resize affordance 708-3 ceases to be displayed (e.g., and grabber 706-1 is optionally displayed in FIG. 7J). Forgoing display of a respective control in response to the user's gaze shifting away from the respective control provides feedback to the user that the user's gaze is no longer detected at the position corresponding to the respective control, thereby providing improved visual feedback about the state of the device.

In some embodiments, the first control element is a first resize affordance (e.g., also referred to as an "object resize control") (e.g., the first portion is a corner of the first object and the resize affordance is displayed at a position corresponding to the first portion of the first object, at or near the respective corner at which the first gaze input is detected). In some embodiments, while displaying the first resize affordance (e.g., at or near the first portion of the first object, and, optionally, while the gaze input is directed to the first resize affordance), the computer system detects, via the one or more input devices, a second user input directed to the first resize affordance (e.g., a pinch and drag gesture, or a tap and hold input followed by movement of the input object) and in response to detecting the second user input directed to the first resize affordance, resizes the first object (e.g., in accordance with the detected second user input, such as a direction and/or amount of movement of the second user input (e.g., the direction and movement of the pinch and drag gesture, or another user input that includes an amount and/or direction of movement of the user input)). For example, as described with reference to FIGS. 7K-7L, application window 702 is resized in accordance with a user input directed to resize affordance 708-5. As described with reference to FIGS. 7O-7P, virtual object 7028 is resized in response to a user input directed to resize affordance 714-1. Dynamically displaying a resize control for changing a size of a virtual object in response to detecting the user gazing at a corner of the object enables the user to access the resize control without displaying additional controls and reduces the number of inputs required to navigate complex menu hierarchies.

In some embodiments, detecting the second user input directed to the first resize affordance includes detecting a direction of movement of the second user input directed to the first resize affordance. In some embodiments, in response to detecting the second user input directed to the first resize affordance, resizing the first object includes: in accordance with a determination that the direction of movement of the second user input is a first direction, increasing a size of the first object; and in accordance with a determination that the direction of movement of the second user input is a second direction different from the first direction, decreasing the size of the first object. For example, in some embodiments, the first object is resized in accordance with the second user input. In some embodiments, the first direction is a direction that moves away from the first object (e.g., dragging a corner of the first object outward) to increase the size of the first object. In some embodiments, the second direction is a direction that moves toward the interior of the first object (e.g., dragging a corner of the first object inward) to decrease the size of the first object. For example, as described with reference to FIGS. 7K-7L, an amount and/or a direction of movement of the user's hand 7020 while resize affordance 708-5 is selected causes the application window 702 to increase and/or decrease in size. For example, moving the user's hand 7020 up and to the left in FIG. 7K (e.g., FIGS. 7K1, 7K2 and 7K3) causes the application window 702 to decrease in size, while moving the user's hand 7020 down and to the right causes the application window 702 to increase in size. Allowing a user to change a size of a virtual object by selecting and moving a resize control in a respective direction, wherein the resize control is automatically displayed while the user is gazing at a portion of the virtual object that corresponds to the resize control, reduces the number of inputs needed to resize an object without displaying additional controls.

In some embodiments, detecting the second user input directed to the first resize affordance includes detecting an amount of movement of the second user input (e.g., movement in a first direction, movement in a second direction, and/or net movement) directed to the first resize affordance. In some embodiments, in response to detecting the second user input directed to the first resize affordance, resizing the first object, includes: in accordance with a determination that the amount of movement of the second user input is a first amount of movement, changing a size of the first object to a first size that is selected based on the first amount of movement of the second user input (e.g., increasing by a first amount in a first direction, and/or decreasing by a first amount in a second direction); and in accordance with a determination that the amount of movement of the second user input is a second amount of movement different from the first amount of movement, changing the size of the first object to a second size different from the first size, the second size selected based on the second amount of movement of the second user input (e.g., increasing by a second amount in a first direction, and/or decreasing by a second amount in a second direction). In some embodiments, the size of the first object is changed by an amount that is proportional to or otherwise a function of the amount of movement of the user input directed to the first resize affordance. In some embodiments, the size of the first object is changed gradually as the amount of movement of the user input changes. For example, as the user increases an amount of movement away from the initial position of the user input, the size is changed (e.g., increased and/or decreased) by a corresponding amount, and as the user decreases an amount of movement away from the initial position of the user input, the size is changed by a corresponding amount. For example, as described with reference to FIGS. 7K-7L, an amount of movement of the user's hand 7020 causes the application window 702 to increase and/or decrease by a corresponding (e.g., proportional amount). For example, a smaller amount of movement of the user's hand 7020 relative to its initial position causes a smaller change in size of the application window 702. Allowing a user to change a size of a virtual object by selecting and moving a resize control by a respective amount, wherein the resize control is automatically displayed while the user is gazing at a portion of the virtual object that corresponds to the resize control, reduces the number of inputs needed to resize an object without displaying additional controls.

In some embodiments, detecting the first user input directed to the first control element includes detecting a first air gesture (e.g., a gaze input in combination with a selection input, such as a pinch input or a tap input and/or a drag input; or an air gesture, as described above) directed to the first control element. In some embodiments, the first object is resized in response to detecting the first air gesture directed to the first control element (and, optionally, in accordance with the direction and/or amount of movement of the first air gesture). For example, in response to detecting the air gesture directed to a resize affordance for an application window, the computer system changes a size of the application window in accordance with a direction and/or an amount of movement of the air gesture. In some embodiments, in response to detecting the air gesture directed to a move affordance for the application window, the computer system moves a position of the application window within the three-dimensional environment in accordance with a direction and/or an amount of movement of the air gesture. For example, in FIGS. 7K, the user input detected via the user's hand 7020 is an air gesture for resizing the application window 702. Allowing a user to perform an operation for a virtual object, such as moving or resizing the virtual object, by performing an air gesture without requiring the user to connect, set up, or use a separate input device to perform the operation, reduces the number of inputs needed.

In some embodiments, the first portion of the first object includes a first corner of the first object, and the first criteria require that the first gaze input is directed to the first corner of the first object in order for the first criteria to be met. In some embodiments, the first corner is a bottom corner, including a bottom left corner and/or a bottom right corner. In some embodiments, the first portion of the first object includes two or more corners of the first object (e.g., a bottom left and a bottom right corner), but does not include a space or an edge that is between the two or more corners). In some embodiments, the first portion of the first object includes a predefined area around the corner of the first object. For example, for the first criteria to be met, the gaze input is detected as being directed to the predefined area around the corner of the first object (e.g., including an end portion of the edge connected to the first corner, a region inside the first object near the first corner, and/or a region outside the first object near the first corner). For example, as described with reference to FIGS. 7D-7E, the user's attention 710-2 is directed to a bottom right corner of application window 702. Automatically displaying a respective control, such as a resize control, at a corner of a virtual object in response to detecting a user's gaze at the corner reduces the number of inputs needed to perform an operation using the control for the virtual object without displaying additional controls.

In some embodiments, the first portion of the first object includes a first sub-portion of the first object (e.g., a first corner of the first object, a left corner, and/or a lower left corner) and a second sub-portion of the first object (e.g., a second corner of the first object, the right corner, and/or the lower right corner), wherein the first sub-portion of the first object and the second sub-portion of the first object are separated by a third sub-portion of the first object (e.g., the central portion of the bottom edge, the central portion of the edge connecting the first corner and the second corner of the first object) that is not included in the first portion of the first object, and the first criteria require that the first gaze input is directed to at least one of the first sub-portion and the second sub-portion of the first object in order for the first criteria to be met. For example, in response to detecting a first gaze input directed to either the first sub-portion of the first object (e.g., a bottom left corner) or the second sub-portion of the first object (e.g., a bottom right corner), the computer system displays the first control element (e.g., a resize affordance) at or near at the respective sub-portion that is the target of the first gaze input. In some embodiments, the first control element is displayed with different visual properties depending on whether the user is gazing at the first sub-portion of the first object or the second sub-portion of the first object. For example, the first control element is displayed at a location proximate to the respective corner to which the gaze input is detected (e.g., if the user is gazing at the bottom left corner, the resize affordance is displayed proximate to the bottom left corner of the first object with an "L" shape; and if the user is gazing at the bottom right corner, the resize affordance is displayed proximate to the bottom right corner of the first object with a reversed "L" shape). For example, as described with reference to FIG. 7E, based on detecting which of the bottom corners the user's attention is directed to, the computer system displays a corresponding resize affordance at the respective corner (e.g., the bottom right and/or bottom left corner). Automatically displaying a respective control, such as a resize control, at one of multiple possible corners of a virtual object in response to detecting a user's gaze at the respective corner reduces the number of inputs needed to perform an operation using the control for the virtual object without displaying additional controls, including only displaying a control at the corner at which the user is gazing without displaying a control in the other corners at which the user is not gazing.

In some embodiments, detecting the first user input while displaying the first control element includes detecting the first user input directed to the first sub-portion of the first object or the second sub-portion of the first object. In some embodiments, performing the first operation with respect to the first object in response to detecting the first user input directed to the first control element includes: in accordance with a determination that the first user input is directed to the first sub-portion of the first object, changing a size of the first object to a first size (e.g., a larger size than the previous size of the first object) while maintaining a position of a center of the first object; and in accordance with a determination that the first user input is directed to the second sub-portion of the first object, changing the size of the first object to a second size (e.g., a smaller size than the previous size of the first object, and/or a size that is different from the first size) while maintaining the position of the center of the first object in the three-dimensional environment. For example, the location of the first object in the three-dimensional environment is maintained such that a center position of the first object does not move, as the edges and/or corners of the first object move closer and/or father away from the center portion while the first object is resized in accordance with the first user input. For example, as described with reference to FIG. 7L, resizing application window 702 includes maintaining a center position of application window 702, for example by moving the edges and corners of application window 702 inwards to decrease the size of the application window 702. Changing a size of a virtual object while maintaining a center of the virtual object's position within an AR/VR environment provides improved visual feedback about the state of the device and reduces the number of inputs required to move the virtual object after resizing by maintaining the center position of the virtual object during and after resizing.

In some embodiments, the first portion of the first object corresponds to a first edge of the first object (e.g., the edges that are connected to the respective corner of the first control element) and does not correspond to a second edge of the first object (e.g., the opposite edges that are not connected to the respective corner of the first control element). In some embodiments, performing the first operation with respect to the first object in response to detecting the first user input directed to the first control element includes: changing a size of the first object by moving the first edge of the first object while maintaining a position of the second edge of the first object in the three-dimensional environment (e.g., moving the two edges connected to the corner of the first control element, while keeping the opposite edges stationary, while resizing the first object). For example, as described with reference to FIG. 7L, resizing application window 702 includes maintaining the top left corner at its position (e.g., and the top edge and left edge at their respective positions) while moving the bottom right corner inward to decrease a size of application window 702. Changing a size of a virtual object while maintaining an edge and/or a corner of the virtual object at a same position within an AR/VR environment provides improved visual feedback about the state of the device and reduces the number of inputs required to move the virtual object after resizing the object by maintaining a position of a corner of the virtual object during and after resizing.

In some embodiments, while displaying the first object, the computer system detects, via the one or more input devices, a fourth gaze input, directed to a respective portion of the first object. In some embodiments, in response to detecting the fourth gaze input, the computer system: in accordance with a determination that the fourth gaze input is directed to the first portion of the first object and meets the first criteria with respect to the first portion of the first object, displays the first control element; and in accordance with a determination that the fourth gaze input is directed to a third portion of the first object (a second corner, a third corner, and/or a fourth corner of the first object, and/or central portion of a first edge, a second edge, a third edge, and/or a fourth edge of the first object), different from the first portion of the first object (and, optionally, different from the second portion of the first object), displays a second control element that corresponds to a second operation associated with the first object, wherein the second control element was not displayed prior to detecting that the fourth gaze input directed to the third portion of the first object. In some embodiments, while displaying the second control element, the computer system detects a third user input directed to the second control element and in response to detecting the third user input directed to the second control element, performs the second operation with respect to the first object. In some embodiments, the second operation is the same as the first operation, such as a resize operation. In some embodiments, the first control element and the second control element are a same type of user interface objects that are displayed at different positions relative to the first object, optionally with different appearances. For example, the first object comprises an application window, the first control element is a resize affordance displayed at a nonzero distance away from a bottom right corner of the application window, displayed with a curvature corresponding to the bottom right corner, and the second control element is a resize affordance displayed at a nonzero distance away from a bottom left corner of the application window, displayed with a curvature corresponding to the bottom left corner. In some embodiments, the first control element and the second control element correspond to distinct operations with respect to the first object. For example, the first control element that corresponds to the first operation includes a resize affordance for resizing the first object and the second control element that corresponds to the second operation includes a close affordance for closing the first object (e.g., the first portion is a bottom corner and the third portion is a top left corner of the first object). In some embodiments, the respective operation associated with a respective control element is based at least in part on the respective portion of the first object on which the gaze input is detected. For example, in response to detecting that the gaze input is directed to a top left corner of the first object, the computer system displays a close affordance (e.g., also referred to as an "object close control") for closing, removing, or ceasing display of the first object; and in response to detecting that the gaze input is directed to a bottom left corner of the first object, the computer system displays a resize affordance (e.g., also referred to as an "object resize control") for changing a size of the first object. For example, as described with reference to FIG. 7E, the user is enabled to resize application window 702 by gazing at the bottom right corner and/or at the bottom left corner, wherein a respective resize affordance 708-1 is displayed at the respective corner at which the user gazes. In some embodiments, the user is enabled to gaze at another portion of application window 702, such as the top left corner, to cause the computer system to display close affordance 7030. Detecting whether the user's gaze is directed to a first corner or a second corner and automatically displaying a control option, such as a resize control, for the respective corner that the user's gaze is detected without displaying a control option at the other corner, enables the user to perform an operation on the virtual object, such as resizing the virtual object, without displaying additional controls and provides improved visual feedback about the state of the device to indicate where the user's gaze is detected.

In some embodiments, the first control element is a close affordance (e.g., also referred to as an "object close control"). In some embodiments, some or all of the properties, appearances, inputs, behaviors, and/or interactions described with respect to the resize affordance are also applicable to the close affordance, and are not repeated herein in the interest of brevity. For example, as described with reference to FIG. 7D, close affordance 7030 is displayed in response to detecting the user's attention 710-1 at a top left corner of application window 702. In some embodiments, while displaying the close affordance, the computer system detects, via the one or more input devices, a fourth user input directed to the close affordance; and in response to detecting the fourth user input directed to the close affordance, closes the first object, including ceasing display of the first object in the first view of the three-dimensional environment, as described with reference to FIGS. 7R-7S for virtual object 7028. In some embodiments, the first portion of the first object is a top left corner of the first object, and in response to detecting a gaze input directed to the top left corner of the first object, the computer system displays the close affordance proximate to the top left corner. In some embodiments, the close affordance is displayed at a non-zero distance away from the first object (e.g., the close affordance is displayed as a separate user interface object than the first object). In some embodiments, performing the first operation with respect to the first object in response to detecting the first user input includes closing the first object, including ceasing display of the first object in the first view of the three-dimensional environment, along with ceasing display of the first control element (e.g., the closing affordance). In some embodiments, after ceasing display of the first object in the first view of the three-dimensional environment, other virtual objects continue to be displayed in the three-dimensional environment. In some embodiments, a portion of the three-dimensional environment that was obscured by display of the first object before closing the first object is displayed after the first object is closed. For example, ceasing display of the first object enables a portion of the three-dimensional environment (e.g., including any virtual objects and/or passthrough representations) that was behind the first object to be visible. Dynamically displaying a close control for closing a virtual object such that it is no longer displayed in the three-dimensional environment, in response to detecting the user gazing at a corner of the object, enables the user to access the close control and close the virtual object without displaying additional controls, and automatically displays the close control in response to the user gazing at a corner associated with the close control, thereby reducing the number of inputs required to access the close control.

In some embodiments, while displaying the first object and a second object in the first view of the three-dimensional environment (e.g., the first object and the second object are both application windows, both three-dimensional objects, or of the same object type), the computer system detects that a fifth gaze input is directed to the first object. In some embodiments, in response to detecting that the fifth gaze input directed to the first object: in accordance with a determination that the fifth gaze input is directed to a first sub-portion of the first object (e.g., a top left corner of the first object) and meets the first criteria with respect to the first sub-portion of the first object, the computer system displays a first close affordance for the first object (e.g., at or proximate to the first sub-portion of the first object) and in accordance with a determination that the fifth gaze input is directed to a second sub-portion of the first object (e.g., a lower left corner or lower right corner of the first object) and meets the first criteria with respect to the second sub-portion of the first object, the computer system displays a first resize affordance for the first object (e.g., at or proximate to the second sub-portion of the first object). In some embodiments, while displaying the first object and the second object in the first view of the three-dimensional environment (e.g., the first object and the second object are both application windows, both three-dimensional objects, or of the same object type), the computer system detects that a sixth gaze input is directed to the second object. In some embodiments, in response to detecting that the sixth gaze input directed to the second object: in accordance with a determination that the sixth gaze input is directed to a first sub-portion of the second object (e.g., a top left corner of the second object, and/or a portion of the second object that corresponds to the first sub-portion of the first object) and meets the first criteria with respect to the first sub-portion of the second object, the computer system displays a second close affordance for the second object (e.g., at or proximate to the first sub-portion of the second object) and in accordance with a determination that the sixth gaze input is directed to a second sub-portion of the second object (e.g., a lower left corner or lower right corner of the second object, and/or a portion of the second object that corresponds to the second sub-portion of the first object) and meets the first criteria with respect to the second sub-portion of the second object, the computer system forgoes display of a second resize affordance for the second object (e.g., in accordance with a determination that the second object is a second type of object (e.g., that cannot be resized), the computer system forgoes display of a user interface object (e.g., forgoes displaying a resize affordance for resizing the second object)). For example, as described with reference to FIG. 7E, some application windows and/or virtual objects cannot be resized, and a resize affordance is not displayed in response to the user gazing at a corner of the application window and/or virtual object. For example, in FIG. 7E, in response to detecting the user's attention 710-3, resize affordance 708-1 is not displayed if application window 702 cannot be resized. Displaying a close control for closing a virtual object in response to detecting the user gazing at a corner of the object associated with the close control, without displaying a resize control if the object cannot be resized, enables the user to access the close control and close the virtual object without displaying additional controls, and automatically displays the close control in response to the user gazing at a corner associated with the close control, thereby reducing the number of inputs required to close an object without requiring the user to navigate complex menu hierarchies.

In some embodiments, while displaying the first object and a third object in the first view of the three-dimensional environment (e.g., the first object and the third object are both application windows, both three-dimensional objects, or of the same object type), the computer system detects that a seventh gaze input directed to the first object. In some embodiments, in response to detecting that the seventh gaze input directed to the first object: in accordance with a determination that the seventh gaze input is directed to a first sub-portion of the first object (e.g., a top left corner of the first object) and meets the first criteria with respect to the first sub-portion of the first object, the computer system displays a first close affordance for the first object (e.g., at or proximate to the first sub-portion of the first object); and in accordance with a determination that the seventh gaze input is directed to a third sub-portion of the first object (e.g., a center portion of the bottom edge) and meets the first criteria with respect to the third sub-portion of the first object, the computer system displays a first move affordance (e.g., also referred to as an "object move control") for the first object (e.g., at or proximate to the third sub-portion of the first object). In some embodiments, while displaying the first object and the third object in the first view of the three-dimensional environment (e.g., the first object and the third object are both application windows, both three-dimensional objects, or of the same object type), the computer system detects that an eighth gaze input directed to the third object. In some embodiments, in response to detecting that the eighth gaze input directed to the third object: in accordance with a determination that the eighth gaze input is directed to a first sub-portion of the third object (e.g., a top left corner of the second object, and/or a portion of the second object that corresponds to the first sub-portion of the first object) and meets the first criteria with respect to the first sub-portion of the third object, the computer system displays a third close affordance for the third object (e.g., at or proximate to the first sub-portion of the third object); and in accordance with a determination that the eighth gaze input is directed to a second sub-portion of the third object (e.g., a center portion of the bottom edge of the third object, and/or a portion of the third object that corresponds to the third sub-portion of the first object) and meets the first criteria with respect to the second sub-portion of the third object, the computer system forgoes display of a second move affordance for the third object (e.g., in accordance with a determination that the third object is a second type of object (e.g., a world locked object, an object that is anchored or not movable), forgoing display of a user interface object (e.g., forgoes displaying a move affordance for repositioning the third object in the three-dimensional environment)). For example, as described with reference to FIG. 7E, one or more application windows and/or virtual objects cannot be repositioned within the three-dimensional object, and a grabber is not displayed for the one or more application windows and/or virtual objects. For example, in FIG. 7E, grabber 706-1 is optionally not displayed if application window 702 cannot be moved in position within the three-dimensional environment. In some embodiments, one or more other controls for application window 702 are displayed in response to detecting the user's attention at respective portions of the application window 702 (e.g., a resize affordance 708-1 is displayed, and/or close affordance 7030 is displayed) without displaying grabber 706-1 for moving the application window. Displaying a close control for closing a virtual object in response to detecting the user gazing at a corner of the object associated with the close control, without displaying a move grabber for changing a position of the object, enables the user to access the close control and close the virtual object without displaying additional controls, and automatically displays the close control in response to the user gazing at a corner associated with the close control, thereby reducing the number of inputs required to close an object without requiring the user to navigate complex menu hierarchies.

In some embodiments, while displaying the first object, the computer system displays a first move affordance for repositioning a position of the first object in the first view of the three-dimensional environment, detecting a ninth gaze input directed to a respective portion of the first object that corresponds to a first resize affordance (e.g., the ninth gaze input moved from the location that corresponds to the first move affordance to the location that corresponds to the first resize affordance; or the ninth gaze input is unrelated to the display of the first move affordance). In some embodiments, the first control element is the first move affordance. In some embodiments, the second control element is the first move affordance. In some embodiments, the first move affordance is optionally displayed for the first object in response to detecting a gaze input for the user that is directed to a center region of the first object (e.g., the first portion). In some embodiments, while detecting the user is gazing at any portion of the first object, the computer system automatically displays the move affordance for the first object and, optionally maintains display of the move affordance until detecting a gaze input is detected on another respective portion of the first object (e.g., a second portion, such as a corner, of the first object). In some embodiments, in response to detecting the ninth gaze input directed to the respective portion of the first object that corresponds to the first resize affordance (e.g., in response to detecting the ninth gaze input including detecting movement of a gaze input from a center of the first object, or from a center of the bottom edge (e.g., the first portion) of the first object, to a corner of the first object (e.g., the respective portion that corresponds to the first resize affordance)), the computer system ceases display of the first move affordance; and displays the first resize affordance for resizing the first object at or proximate to the respective portion of the first object that corresponds to the first resize affordance. In some embodiments, displaying the first resize affordance includes animating a transition between ceasing display of the first move affordance (e.g., by shifting or animating movement of the first move affordance in a direction toward the first resize affordance and/or gradually decreasing a size of the first move affordance until it disappears) and displaying the first resize affordance (e.g., by shifting or animating movement of the first resize affordance as coming from the first move affordance and/or gradually increasing a size of the first resize affordance). For example, as described with reference to FIGS. 7D-7F, the computer system replaces display of grabber 706-1 (e.g., a move affordance) with display of resize affordance 708-1. Replacing display of a move grabber for changing a position of a virtual object with display of a resize control in response to detecting the user gazing at a corner of the object associated with the resize control, enables the user to access the resize control and resize the virtual object without displaying additional controls, thereby reducing the number of inputs required to access the resize control, and providing improved visual feedback that the user is gazing at the corner of the object associated with the resize control.

In some embodiments, while displaying the first object, the computer system displays a second move affordance (e.g., same as the first move affordance, or different from the first move affordance) for repositioning a position of the first object in the first view of the three-dimensional environment, the computer system detects a tenth gaze input directed to a respective portion of the first object that corresponds to a second resize affordance (e.g., the same as the first resize affordance, or different from the first resize affordance) (e.g., the tenth gaze input moved from the location that corresponds to the second move affordance to the location that corresponds to the second resize affordance; or the tenth gaze input is unrelated to the display of the second move affordance). In some embodiments, the first control element is the second move affordance. In some embodiments, the second control element is the second move affordance. In some embodiments, the second move affordance is optionally displayed for the first object in response to detecting a gaze input for the user that is directed to a center region of the first object (e.g., the first portion). In some embodiments, while detecting the user is gazing at any portion of the first object, the computer system automatically displays the second move affordance for the first object and, optionally maintains display of the move affordance until detecting a gaze input is detected on another respective portion of the first object (e.g., a second portion, such as a corner, of the first object). In some embodiments, in response to detecting the tenth gaze input directed to the respective portion of the first object that corresponds to the second resize affordance (e.g., in response to detecting the tenth gaze input including detecting movement of a gaze input from a center of the first object, or from a center of the bottom edge (e.g., the first portion) of the first object, to a corner of the first object (e.g., the respective portion that corresponds to the first resize affordance)), the computer system displays an animated transition between displaying the second move affordance and displaying the second resize affordance, including: moving the second move affordance toward a location corresponding to the second resize affordance (e.g., at or proximate to a respective corner of the first object) (e.g., and ceasing display of the second move affordance before the second move affordance reaches the location corresponding to the second resize affordance, and/or before the second resize affordance is displayed at the location corresponding to the second resize affordance); and displaying the second resize affordance at the location corresponding to the second resize affordance. In some embodiments, displaying the second resize affordance includes animating a transition between ceasing display of the second move affordance (e.g., by shifting or animating movement of the move affordance in a direction toward the location corresponding to the second resize affordance and/or gradually decreasing a size of the second move affordance until it disappears) and displaying the second resize affordance (e.g., by shifting or animating movement of the resize affordance as coming from the second move affordance and/or gradually increasing a size of the second resize affordance until it is full displayed at the location corresponding to the second resize affordance). For example, the animated transition described with reference to FIGS. 7E-7F includes moving grabber 706-1 to the right as it morphs into resize affordance 708-1. Displaying an animated transition that shifts the move grabber in a first direction, such that the move grabber is moved over until it is animated into display of a resize control, enables the user to access the resize control and resize the virtual object without displaying additional controls, and provides improved visual feedback that the user is gazing at the corner of the object associated with the resize control.

In some embodiments, while displaying a respective move affordance (e.g., the first move affordance, and/or the second move affordance) for moving a position of the first object in the three-dimensional environment, the computer system detects a fifth user input directed to the respective move affordance for moving the position of the first object; and in response to detecting the fifth user input directed to the respective move affordance, updates display of the first object from being displayed at a first object position in the first view of the three-dimensional environment to being displayed at a second object position, distinct from the first object position, in the first view of the three-dimensional environment. In some embodiments, the second object position is determined based on the fifth user input directed to the respective move affordance (e.g., a pinch and drag gesture, wherein the user input drags the first object to the second object position). In some embodiments, the computer system displays the first object as gradually moving in accordance with a speed, distance, and/or direction of movement of the fifth user input directed to the respective move affordance. In some embodiments, the computer system maintains display of the respective move affordance as the first object is moved to the second object position. In some embodiments, the respective move affordance is displayed concurrently with the first object at the second object position (e.g., at an end of the fifth user input). For example, as described with reference to FIGS. 7V-7Z, the application window 702 is moved in response to a user input directed to grabber 706-3. Displaying a move grabber associated with a virtual object, and allowing a user to reposition the virtual object within a three-dimensional environment by selecting the move grabber reduces the number of inputs required access a move control without requiring the user to navigate complex menu hierarchies.

In some embodiments, updating the display of the first object from being displayed at the first object position in the first view of the three-dimensional environment to being displayed at the second object position includes updating the position of the first object in three different dimensions (e.g., x, y, z, directions in a Cartesian coordinate system; r, theta, phi in a polar coordinate system; or a horizontal dimension, a vertical dimension, and a visual depth dimension (e.g., a change in distance relative to a viewpoint of the user)) in the three-dimensional environment. In some embodiments, the user input for repositioning the first object from the first object position to the second object position includes movement of an input object in three different dimensions in the physical environment. For example, as described with reference to FIG. 7X, the user is enabled to move grabber 706-4 and associated application window 702 in at least three dimensions. Displaying a move grabber associated with a virtual object, and allowing a user to reposition the virtual object in three-dimensions, including a horizontal position, a vertical position, and a depth of the object within a three-dimensional environment by selecting the move grabber reduces the number of inputs required to navigate complex menu hierarchies, and provides improved visual feedback for repositioning the virtual object within the three-dimensional environment.

In some embodiments, while displaying the first object, the computer system displays a third move affordance for repositioning a position of the first object in the first view of the three-dimensional environment (e.g., the same as the first move affordance, and/or the second move affordance), and detects an eleventh gaze input directed to a respective portion of the first object (e.g., the eleventh gaze input moved from the location that corresponds to the third move affordance to the location that corresponds to a resize affordance; or the eleventh gaze input is unrelated to the display of the third move affordance). In some embodiments, the first control element is the third move affordance. In some embodiments, the second control element is the third move affordance. In some embodiments, the third move affordance is optionally displayed for the first object in response to detecting a gaze input for the user that is directed to a center region of the first object (e.g., the first portion). In some embodiments, while detecting the user is gazing at any portion of the first object, the computer system automatically displays the third move affordance for the first object and, optionally maintains display of the third move affordance until detecting a gaze input is detected on another respective portion of the first object (e.g., a second portion, such as a corner, of the first object). In some embodiments, in response to detecting the eleventh gaze input directed to the respective portion of the first object (e.g., in response to detecting the eleventh gaze input including detecting movement of a gaze input from a center of the first object, or from a center of the bottom edge (e.g., the first portion) of the first object, to a corner of the first object (e.g., the respective portion that corresponds to the first resize affordance)): in accordance with a determination that the respective portion of the first object corresponds to a first type of control element for the first object (e.g., the first type of control element includes a resize affordance), the computer system ceases display of the third move affordance and displays a respective instance of the first type of control element (e.g., displaying a third resize affordance for resizing the first object at or proximate to the respective portion of the first object that corresponds to the first type of control element). In some embodiments, displaying the respective instance of the first type of control element includes animating a transition between ceasing display of the third move affordance (e.g., by shifting or animating movement of the third move affordance in a direction toward the respective instance of the first type of control element and/or gradually decreasing a size of the third move affordance until it disappears) and displaying the respective instance of the first type of control element (e.g., by shifting or animating movement of the respective instance of the first type of control element as coming from the third move affordance and/or gradually increasing a size of the respective instance of the first type of control element). For example, the animated transition described with reference to FIGS. 7D-7F includes gradually shrinking grabber 706-1 until it is no longer displayed and gradually displaying resize affordance 708-4. Replacing display of a move grabber for changing a position of a virtual object with display of another type of control, such as a resize control, in response to detecting the user gazing at a corner of the object associated with the resize control, enables the user to access the resize control and resize the virtual object without displaying additional controls, reduces the number of inputs required to navigate complex menu hierarchies, and provides improved visual feedback that the user is gazing at the corner of the object associated with the resize control.

In some embodiments, in response to detecting the eleventh gaze input directed to the respective portion of the first object (e.g., in response to detecting the eleventh gaze input including detecting movement of a gaze input from a center of the first object, or from a center of the bottom edge (e.g., the first portion) of the first object, to a corner of the first object (e.g., the respective portion that corresponds to the first resize affordance)): in accordance with a determination that the respective portion of the first object corresponds to a second type of control element for the first object (e.g., the second type of control element includes a close affordance) that is different from the first type of control element, the computer system maintains display of the third move affordance and displaying a respective instance of the second type of control element (e.g., displaying a close affordance for closing the first object at or proximate to the respective portion of the first object that corresponds to the second type of control element). For example, while displaying close affordance 7030 in FIG. 7D3, grabber 706-1 continues to be displayed. Maintaining display of a move grabber for changing a position of a virtual object with display of another type of control, such as a resize control, in response to detecting the user gazing at a corner of the object associated with the other type of control, enables the user to access additional controls without requiring additional user input to navigate complex menu hierarchies.

In some embodiments, displaying the first control element that corresponds to the first operation associated with the first object in response to detecting that the first gaze input meets the first criteria with respect to the first portion of the first object includes: in accordance with a determination that the first object is displayed as a two-dimensional object in the three-dimensional environment, displaying the first control element (e.g., the resize affordances) at a first position with a first spatial relationship to the first object (e.g., the first control element is displayed at a position corresponding to the first portion of the first object). In some embodiments, as used herein, an object is considered a two-dimensional object even if the two-dimensional object has some thickness (e.g., a perceived depth such that the object is actually more than two-dimensional) but is treated as a two-dimensional object (e.g., in accordance with having a relatively small amount of thickness and/or appears mostly flat to the user). In some embodiments, in response to detecting the gaze input directed to a bottom right corner of an application window, a resize affordance is displayed proximate to the bottom right corner of the application window; and in response to detecting the gaze input directed to a bottom left corner of the application window, a resize affordance is displayed proximate to the bottom left corner of the application window. For example, resize affordance 708-1 in FIG. 7F (e.g., FIGS. 7F1 and 7F2) is displayed at a corner of application window 702. Displaying a resize affordance at a corner of a two-dimensional object in response to detecting the user gazing at the corner of the object, enables the user to access additional controls and provides improved visual feedback.

In some embodiments, displaying the first control element that corresponds to the first operation associated with the first object in response to detecting that the first gaze input meets the first criteria with respect to the first portion of the first object includes: in accordance with a determination that the first object is displayed as a three-dimensional object in the three-dimensional environment, displaying the first control element (e.g., the resize affordances) at a second position with a second spatial relationship to the first object (e.g., the first control element is displayed at a position corresponding a platter supporting the first object (e.g., corners of the platter), and not at a position of the first portion of the first object), wherein the first spatial relationship is different from the second spatial relationship. In some embodiments, the computer system displays a virtual platter at the bottom of the first object to support the first object, and the resize affordance(s) are displayed at the corners of the virtual platter. In some embodiments, the virtual platter is translucent or invisible in the first view of the three-dimensional environment, and the user perceives the presence of the virtual platter by the appearances of the control elements (e.g., resize affordances, move affordance, or other control affordances) that have been displayed for the first object. For example, as described with reference to FIGS. 7N-7P, resize affordance 714-1 is displayed at a corner of platter 7029. Displaying a platter underneath a three-dimensional virtual object, and automatically displaying a resize affordance at a corner of the platter displayed under the object in response to detecting the user gazing at the corner of the platter and/or object, enables the user to access additional controls and provides improved visual feedback.

In some embodiments, in response to detecting that the first gaze input meets the first criteria with respect to the first portion of the first object (e.g., the bottom portion of the first object, and/or within a threshold distance from the bottom portion of the first object): in accordance with a determination that the first object is displayed as a three-dimensional object in the three-dimensional environment, the computer system displays, via the first display generation component, a second object in the three-dimensional environment, wherein the second object is displayed as a three-dimensional application object with a third spatial relationship to the first object (e.g., at the bottom of the first object, supporting the first object). For example, in FIG. 7N, platter 7029 is displayed below virtual object 7028. Displaying a platter underneath and/or above a three-dimensional virtual object enables the user to more easily interact with the three-dimensional object, and provides improved visual feedback reflecting the dimension of the virtual object, including a depth of the virtual object.

In some embodiments, displaying (e.g., in response to detecting a gaze input directed to the bottom of the second object (e.g., a virtual platter supporting the first object) or below the second object, or automatically displayed when the second object is displayed) a second control element (e.g., a close affordance for closing the first object that is a three-dimensional object) below the second object. For example, as described with reference to FIG. 7R, in some embodiments, close affordance 717 is displayed below platter 7029. Automatically displaying a close affordance at a corner of a three-dimensional object in response to detecting the user gazing at the corner of the object, enables the user to access additional controls and provides improved visual feedback.

In some embodiments, prior to displaying the first object in the first view of the three-dimensional environment, the computer system detects a sixth user input that corresponds to a request to display the first object in the first view of the three-dimensional environment; and in response to detecting the sixth user input that corresponds to the request to display the first object in the first view of the three-dimensional environment: concurrently displays the first object in the first view of the three-dimensional environment with a first set of control elements for the first object, including the first control element (e.g., including the first control element described above that is displayed in response to detecting that the first gaze input meets the first criteria (e.g., the first resize affordance, the close affordance and/or the first move affordance)(e.g., to educate the user of the existence of the one or more control elements, and their corresponding locations); and after concurrently displaying the first object with the first set of control elements for the first object for a threshold amount of time, ceases display of the first set of control elements for the first object while maintaining display of the first object (e.g., automatically without additional user input). In some embodiments, after ceasing display of the first set of control elements, the computer system detects a gaze input directed to a respective portion of the first object, wherein the respective portion of the first object corresponds to a respective control element of the first set of control elements. In some embodiments, the first control element corresponds to the respective control element of the first set of control elements. For example, the computer system displays, upon display of the first object, a close affordance as the first control element (e.g., along with other control elements, such as the resize affordances, and/or move affordance); and after ceasing display of the close affordance, in response to detecting a gaze input on a first portion of the first object, the computer system redisplays the close affordance (e.g., the first control element). For example, as described with reference to FIG. 7AB, in some embodiments, in response to the opening application window 720, application window 720 is initially displayed with one or more controls that automatically disappear after a threshold amount of time has elapsed. Automatically displaying available control options before ceasing display of the control options, such that the user is enabled to invoke a respective control of the available control options, provides the user with improved visual feedback such that the user is aware of the available controls without displaying additional instructions and without cluttering the view of the three-dimensional environment by maintaining display the available control options.

In some embodiments, the first set of control elements includes a close affordance for ceasing display of the first object in the three-dimensional environment. In some embodiments, the computer system detects a gaze input that is directed to a respective portion of the first object that corresponds to the display location of the close affordance; and in response to detecting that the gaze input that is directed to the respective portion of the first object that corresponds to the display location of the close affordance, redisplaying the close affordance for the first object. In some embodiments, while displaying the close affordance and the first object, detecting, via the one or more input devices, a user input directed to the close affordance; and in response to detecting the user input directed to the close affordance, ceasing display of the first object in the three-dimensional environment. For example, after temporarily displaying the available controls as described with reference to FIG. 7AB, if the user gazes at the top left corner of application window 720, a close affordance for application window 720 would be redisplayed. Automatically displaying available control options at respective positions, including a close control, before ceasing display of the control options, such that the user is enabled to invoke the close control by gazing at the respective position corresponding to the close control, provides the user with improved visual feedback such that the user is aware of the available controls without displaying additional instructions and without cluttering the view of the three-dimensional environment by maintaining the available control options.

In some embodiments, after concurrently displaying the first object with the first set of control elements for the first object for the threshold amount of time, the computer system ceasing display of the first set of control elements for the first object while maintaining display of the first object, includes: moving the first set of control elements toward the first object while changing one or more visual properties of the first set of control elements (e.g., gradually reducing visual prominence of the first set of control elements by reducing the size, brightness, color saturation, and/or opacity of the first set of control elements, as the set of control elements are animated toward the first object from their respective display locations); and ceasing display of the first set of control elements after moving the first set of control elements and changing the one or more visual properties of the first set of control elements. For example, as described with reference to FIG. 7AB, in some embodiments, the available controls are animated as moving toward application window 720 as the available controls disappear. Animating available control options as moving toward a virtual object before ceasing display of the control options, such that the control options gradually disappear, provides the user with improved visual feedback.

In some embodiments, while displaying the first object, the computer system displays a fourth move affordance (e.g., same as the first, second, and third move affordance, or a different move affordance) for repositioning a position of the first object in the first view of the three-dimensional environment (e.g., the fourth move affordance is displayed without requiring a prior gaze input, or the fourth move affordance is displayed in response to a prior gaze input directed to a respective portion of the first object that corresponds to the reactive region for displaying the fourth move affordance). In some embodiments, while displaying the fourth move affordance with the first object, the computer system detects a twelfth gaze input (e.g., same as the first gaze input, the second gaze input, or is another gaze input) directed to a respective portion of the three-dimensional environment that corresponds to the first object (e.g., a respective portion that corresponds to a preview of the close affordance displayed next to the fourth move affordance, to a region proximate to the first object, or to a portion of the first object). In some embodiments, in response to detecting the twelfth gaze input directed to the respective portion of the three-dimensional environment that corresponds to the first object, the computer system: in accordance with a determination that the twelfth gaze input corresponds to a request to display a close affordance for the first object (e.g., the twelfth gaze input meets the first criteria, optionally, while the gaze input is directed to any portion of the first object, a portion of the first object that corresponds to a preview of the close affordance, or a portion of the first object that does not correspond to the reactive region for displaying the resizing affordance and does not correspond to the reactive region for dragging the fourth move affordance), displays a respective close affordance adjacent to the fourth move affordance (e.g., to the right and/or to the left of the fourth move affordance). In some embodiments, the close affordance and the move affordance are displayed concurrently below (e.g., along a Y-axis in three-dimensional space) the first object. In some embodiments, the first control element is a first preview of the close affordance (e.g., a dot) that, in response to detecting another gaze input directed to the first preview of the close affordance or a continuation of the first gaze input that caused the display of the first preview of the close affordance, the computer system transforms the first preview of the close affordance to the actual close affordance that, when activated, closes the first object. In some embodiments, the first control element is a close affordance, and the preview of the close affordance (e.g., an indicator in the shape of a dot, a miniature version of the close affordance, or another appearance) is displayed adjacent to the move affordance of the first object before any gaze input is detected to transform the preview of the close affordance into the actual close affordance adjacent to the move affordance. In some embodiments, in response to detecting the twelfth gaze input directed to the respective portion of the three-dimensional environment that corresponds to the first object: in accordance with a determination that the twelfth gaze input does not correspond to a request to display a close affordance for the first object (e.g., the twelfth gaze input does not meet the first criteria, or the gaze input is not directed to the first object, or a portion of the first object that corresponds to a preview of the close affordance), the computer system forgoes displaying a respective close affordance adjacent to the fourth move affordance (e.g., to the right and/or to the left of the fourth move affordance). For example, as described with reference to FIG. 7D1, in some embodiments, user interface object 705 (e.g., a close affordance and/or one or more other controls (e.g., a control menu)) is displayed proximate to grabber 706-1 (e.g., the fourth move affordance) in response to detecting the user's attention directed to a bottom portion of application window 702. Dynamically displaying a close control for closing an application window proximate to a grabber for moving the application window in response to a user gazing at a minimized version of the close control displayed proximate to the grabber in an AR/VR environment enables the user to access additional controls for the application window, including an expanded close control, without displaying additional controls that obscure the user's view of the AR/VR environment and reduces the number of inputs required to navigate complex menu hierarchies.

In some embodiments, prior to detecting the twelfth gaze input directed to the respective portion of the three-dimensional environment that corresponds to the first object, the computer system displays a first preview of the respective close affordance (e.g., a dot with a first size that does not include text or an icon, or another indicator appearance for the close affordance) adjacent to the fourth move affordance, wherein the determination that the twelfth gaze input corresponds to a request to display a close affordance for the first object includes a determination that the twelfth gaze input is directed to the first preview of the respective close affordance. In some embodiments, the first control element is a close affordance, and the first preview of the close affordance (e.g., an indicator in the shape of a dot, a miniature version of the close affordance, or another appearance) is displayed adjacent to the move affordance of the first object before the twelfth gaze input is detected to transform the first preview of the close affordance into the actual close affordance adjacent to the fourth move affordance. For example, as described with reference to FIG. 7D1, in some embodiments, the user interface object 705 is displayed next to grabber 706-1 before detecting the user's attention directed to the bottom portion of application window 702. Automatically displaying a respective control, such as a minimized dot that can be expanded into a close control, before detecting a user's gaze to access the close control, reduces the number of inputs needed to access the close control without obscuring the user's view of the AR/VR environment by continuing to display the minimized dot without requiring user input.

In some embodiments, while displaying the respective close affordance (e.g., displayed in response to detecting the twelfth gaze input, and/or displayed adjacent to the fourth move affordance), the computer system detects, via the one or more input devices, a seventh user input directed to the respective close affordance (e.g., an air tap gesture, an air pinch gesture, or another activation or selection gesture, optionally while a gaze input is directed to the respective close affordance); and in response to detecting the seventh user input directed to the respective close affordance, in accordance with a determination that the seventh user input meets selection criteria (e.g., the seventh user input includes a selection gesture, such as an air tap gesture or an air pinch gesture, at the location of the respective close affordance or the seventh user input includes a selection gesture detected in conjunction with a gaze input directed to the respective close affordance), the computer system closes the first object, including ceasing display of the first object in the first view of the three-dimensional environment (along with the control elements, such as the respective close affordance, the fourth move affordance, and/or other control objects, that are displayed with the first object and that corresponds to operations that can be performed with respect to the first object). For example, as described with reference to FIG. 7D2, in response to detecting the user input directed to the close affordance 7030-2, the computer system ceases display of the application window 702 (e.g., closes the application window 7020). Allowing a user to perform an operation for a virtual object, such as closing the virtual object such that the virtual object ceases to be displayed, by performing an air gesture without requiring the user to connect, set up, or use a separate input device to perform the operation, reduces the number of inputs needed to close the virtual object.

In some embodiments, while displaying the first object in the first view of the three-dimensional environment, the computer system detects, via the one or more input devices, a thirteenth gaze input moving relative to a respective portion of the first object that corresponds to a respective control element (e.g., the first control element, or another control element) of the first object (e.g., while the respective control element is not yet displayed, or while the respective control element is currently displayed). In some embodiments, in response to detecting the thirteenth gaze input moving relative to the respective portion of the first object that corresponds to the respective control element of the first object, the computer system determines whether user attention is directed to the respective portion of the first object that corresponds to the respective control element of the first object, including: in accordance with a determination that the thirteenth gaze input moving relative to the respective portion of the first object has moved into a first respective portion of the first object that corresponds to the respective control element of the first object, wherein the first respective portion of the first object that corresponds to the respective control element is of a first size, determining that user attention is directed to the respective portion of the first object that corresponds to the respective control element (and optionally, performing a respective operation (e.g., performing the first operation, or performing another operation different from the first operation) with respect to the respective control element (e.g., if the respective control element is not displayed yet, displaying the respective control element of the first object with the first object in the first view of the three-dimensional environment; or activating the respective control element if an activation input is detected in conjunction with the thirteenth gaze input)). In some embodiments, in accordance with a determination that the thirteenth gaze input moving relative to the respective portion of the first object has not yet entered the first respective portion of the first object, the computer system determines that user attention is not directed to the respective portion of the first object that corresponds to the respective control element. In some embodiments, in response to detecting the thirteenth gaze input moving relative to the respective portion of the first object that corresponds to the respective control element of the first object, the computer system determines whether user attention is directed to the respective portion of the first object that corresponds to the respective control element of the first object, including in accordance with a determination that the thirteenth gaze input moving relative to the respective portion of the first object has moved from within the first respective portion of the first object to a region outside of the first respective portion of the first object and within a second respective portion of the first object that corresponds to the respective control element of the first object, wherein the second respective portion of the first object that corresponds to the respective control element is of a second size, larger than the first size, determining that user attention is remaining on the respective portion of the first object that corresponds to the respective control element; and in accordance with a determination that the thirteenth gaze input moving relative to the respective portion of the first object has moved from within the first respective portion of the first object to a region outside of the second respective portion of the first object that corresponds to the respective control element of the first object, determining that user attention has left the respective portion of the first object that corresponds to the respective control element (and optionally, forgoing performing the respective operation or ceasing to perform the respective operation with respect to the respective control element (e.g., if the respective control element is displayed, ceasing to display the respective control element of the first object with the first object in the first view of the three-dimensional environment; or forgoing activating the respective control element if an activation input is detected in conjunction with the thirteenth gaze input outside of the second respective portion of the first object)). In some embodiments, the second respective portion of the first object encloses the first respective region of the first object (e.g., the second respective portion is the entire first object and the first respective portion is a portion, less than all, of the first object; or the second respective portion includes a portion of the first object and optionally a portion of the three-dimensional environment immediately outside of the first object, and the first respective portion includes a portion, less than all, of the second respective portion (e.g., the portion within the first object and/or the portion within the environment immediately outside of the first object)). For example, as described with reference to FIG. 7D3, in some embodiments, the user's attention 710-2 is directed to a first area having a first size that corresponds to a respective portion of the application window 702 (e.g., to determine that the user's attention is directed to the respective portion of the application window 702) and detecting that the user's attention is no longer directed to the bottom right corner of the application window 702 includes determining that the user's attention is directed outside of a second area having a second size (e.g., distinct from the first area having the first size that corresponds to a respective portion of the application window 702 used to determine that the user's attention satisfies attention criteria). Using a first sized region to determine that the user's gaze is directed to a respective control in an AR/VR environment, and dynamically displaying the control in response to detecting that the user's gaze is directed to the first sized region, while using a second sized region that is different from the first sized region to determine that the user's gaze is no longer directed to the respective control reduces the number of inputs needed for the user to specify whether the user intends to access the control, thereby providing improved feedback for the user and providing the user with access to additional control options by detecting the user's gaze directed to respective controls without requiring additional user input.

In some embodiments, while displaying the first object in the first view of the three-dimensional environment, the computer system detects an eighth user input while user attention is directed to the first portion of the first object; and in response to detecting the eighth user input while user attention is directed to the first portion of the first object, the computer system initiates performance of one or more operations corresponding to the first portion of the first object (e.g., displaying one or more control elements of the first object, activating one or more control elements of the first object, and/or using one or more control elements of the first object to interact with the first object) in accordance with the eighth user input. In some embodiments, while performing the one or more operations corresponding to the first portion of the first object, the computer system detects that user attention has moved away from the first portion of the first object (e.g., user's gaze has moved outside of the first respective portion and/or the second respective portion of the first object); and after (e.g., in response to) detecting that user attention has moved away from the first portion of the first object and in accordance with a determination that the one or more operations corresponding to the first portion of the first object is ongoing, the computer system continues to perform the one or more operations corresponding to the first portion of the first object (in accordance with one or more inputs such as a continuation of an air gesture that started before the user attention moved away from the first portion of the first object). For example, in some embodiments, once the user has initiated a dragging operation using a move affordance, the user can continue to move the first object in accordance with the movement gesture that was detected while the user's attention was directed to the move affordance and that is still continuing, even if the user's gaze has moved away from the move affordance. In another example, in some embodiments, once the user has initiated a resize operation using a resize affordance, the user can continue to resize the first object in accordance with the resize gesture that was detected while the user's attention was directed to the resize affordance and that is still continuing, even if the user's gaze has moved away from the resize affordance. In some embodiments, if the user is not currently interacting with the first object (e.g., the eighth user input has ceased and/or before detecting the eighth user input) and the attention of the user is not directed to the resize affordance, the user is not enabled to interact with (e.g., via a gaze and air gesture input) the resize affordance. For example, as described with reference to FIGS. 7K, after the use's attention shifts outside of the first area having the first size and/or the second area having the second size, the user input detected via the user's hand 7020 is enabled to continue (e.g., the user is enabled to continue resizing the window). Enabling a user to continue the user's interaction with a virtual object, even after detecting that the user's attention has shifted away from the virtual object, enables the user to continue to perform operations for the virtual object without displaying additional controls and without interrupting the user's interaction, thereby reducing the number of inputs required to continue performing the operations.

In some embodiments, the first criteria require that the first gaze input is maintained on the first portion of the first object for at least a first threshold amount of time in order for the first criteria to be met; and, displaying the first control element includes displaying the first control element after the first gaze input is directed to the first portion of the first object for at least the first threshold amount of time (e.g., display of the first control element is delayed until the first time threshold has been met). For example, as described with reference to FIG. 7D3, the resize affordance 708-1 is displayed in accordance with a determination that the user's attention 710-2 is detected for at least a threshold amount of time. For example, the display of resize affordance 708-1 is delayed until the threshold amount of time has been met. Dynamically displaying a respective control in response to a user gazing at a corresponding respective portion of an application window for at least a threshold amount of time in an AR/VR environment enables the user to access additional controls for the application window without displaying additional controls that obscure the user's view of the AR/VR environment.

In some embodiments, the computer system detects a start of a first portion of the first user input while the first gaze input is directed to the first portion of the first object and before the first control element is displayed. In some embodiments, in response to detecting the start of the first portion of the first user input while the first gaze input is directed to the first portion of the first object and before the first control element is displayed, the computer system: in accordance with a determination that operation performance criteria are met (e.g., operation performance criteria are met by the start of the first user input in accordance with a determination that the first gaze input has met the first criteria, and that the first portion of the first object corresponds to the first control element that is a first type of control element (e.g., a move affordance, a resize affordance, and/or a close affordance)), initiates performance of the first operation (e.g., performs an initial portion of the first operation, such as starting to resize the first object in accordance with the first portion of the first user input, or dragging the first object in accordance with the first portion of the first user input) in accordance with the first portion of the first user input, before the first control element is displayed, wherein: detecting the first user input directed to the first control element includes detecting a second portion of the first user input after detecting the first portion of the first user input and after the first control element is displayed; and performing the first operation with respect to the first object in response to detecting the first user input directed to the first control element includes continuing to perform the first operation in accordance with the second portion of the first user input. In some embodiments, in response to detecting the start of the first portion of the first user input while the first gaze input is directed to the first portion of the first object and before the first control element is displayed: in accordance with a determination that the operation performance criteria are not met (e.g., the first gaze input has not met the first criteria, and/or that the first portion of the first object corresponds to the first control element that is a second type of control element (e.g., a close affordance, or another type of affordance), forgoing initiating performance of the first operation (e.g., until after the first control element is displayed and/or until the operation performance criteria are met). For example, as described with reference to FIG. 7D3, before the resize affordance 708-1 is displayed, the computer system enables the user to access functionality and/or perform operations associated with the resize affordance 708-1. Enabling a user to initiate performing an operation, such as changing a size of a virtual object, before displaying an affordance corresponding to the operation enables the user to access additional functionality for the virtual object without displaying additional controls, and provides improved visual feedback by dynamically displaying the affordance while the user continues to perform the operation.

In some embodiments, aspects/operations of methods 900, 1000, 1100, 1200, 1300, 1400, 1500, 1600, 1800, and 20000 may be interchanged, substituted, and/or added between these methods. For example, the first object (e.g., application window or virtual object) in the method 800 has characteristics of the first user interface object (e.g., application window or virtual) in the method 900, and the first control elements that are displayed may be replaced by, or concurrently displayed with, other user interface elements (e.g., the first control element, as in the method 800 above, can be displayed as a title bar, as in the method 1000 below). For brevity, these details are not repeated here.

FIG. 9 is a flow diagram of an exemplary method 900 for updating visual properties of controls in response to user interactions, in accordance with some embodiments. In some embodiments, method 900 is performed at a computer system (e.g., computer system 101 in FIG. 1) including a display generation component (e.g., display generation component 120 in FIGS. 1A, 3, and 4 or display generation component 7100) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 900 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 900 are, optionally, combined and/or the order of some operations is, optionally, changed.

Method 900 is a method for displaying a control with a first appearance in response to the user gazing at the control, and displaying the control with a second appearance after detecting the user is interacting with the control to perform an operation. Automatically updating an appearance of the control when the user is gazing at the control and further updating the appearance of the move control when the user is interacting with the control provides the user with improved visual feedback of the user's interactions.

In some embodiments, method 900 is performed at a computer system that is in communication with a first display generation component (e.g., a first display generation component of a two-sided display generation component, a heads-up display, a head-mounted display (HMD), a display, a touchscreen, a projector, a standalone display, and/or a display that is enclosed in the same housing as another display generation component of the same type or a different type) and one or more input devices (e.g., cameras, controllers, touch-sensitive surfaces, joysticks, buttons, gloves, watches, motion sensors, and/or orientation sensors). In some embodiments, the first display generation component is a display component facing the user and provides an XR experience to the user. In some embodiments, the first display generation component includes two or more display components (e.g., one set for each eye) that display slightly different images to form a stereoscopic view of the three-dimensional environment. In some embodiments, the first display generation component and a second display generation component form a two-sided display device (e.g., a two-sided HMD) that displays a first user interface on a first side corresponding to the first display generation component, and a second user interface on the second side corresponding to the second display generation component. In some embodiments, the second display generation component is a display component facing away from the user and toward an external environment of the user and optionally provides status information related to the first display generation component (e.g., displayed content and/or operational state) and/or the user (e.g., movement of the user's eyes, and/or attention state of the user) to other users in the external environment. In some embodiments, the computing system is an integrated device with one or more processors and memory enclosed in the same housing as the first and the second display generation components and at least some of the one or more input devices. In some embodiments, the computing system includes a computing component (e.g., a server, a mobile electronic device such as a smart phone or tablet device, a wearable device such as a watch, wristband, or earphones, a desktop computer, or a laptop computer) that includes one or more processors and memory that is separate from the display generation component(s) and/or the one or more input devices. In some embodiments, the display generation component(s) and the one or more input devices are integrated and enclosed in the same housing.

The computer system displays (902), via the first display generation component, a first user interface object (e.g., the first user interface object is an application window, a media display area, a viewport into a three-dimensional environment, an application view, or a virtual object) and a first control element (e.g., a respective one of one or more grabbers or handles for dragging, resizing, adjusting a shape and/or size, adjusting a visual property of a corresponding object) that is associated with performing a first operation (e.g., dragging, resizing, adjusting a shape and/or size of, and/or adjusting a visual property of) with respect to the first user interface object, in a first view of a three-dimensional environment (e.g., a passthrough view of a physical environment, an AR environment, or a VR environment), wherein the first control element is spaced apart from (e.g., separate from, not attached to, changes size and/or location separately from, is spaced apart by a gap (e.g., content (e.g., passthrough content, and/or other objects and windows in the environment) behind the first user interface object and the first control element is visible to the user through the gap)) from) the first user interface object in the first view of the three-dimensional environment, and wherein the first control element is displayed with a first appearance (e.g., displayed with a first set of values for a first set of visual properties (e.g., brightness, color, luminance, translucency, opacity, color saturation, size, simulated optical property or lighting effect, and/or animated movements)). For example, in FIG. 7D3, application window 702 is displayed with close affordance 7030 and grabber 706-1, and in FIGS. 7F, application window 702 is displayed with resize affordance 708-1. In some embodiments, the first control element is close affordance 7030, grabber 706-1, and/or resize affordance 708-1.

While displaying the first control element with the first appearance, the computer system detects (904), via the one or more input devices, a first gaze input that is directed to the first control element. For example, in FIGS. 7F-7G, the user's attention 710-4 is directed to resize affordance 708-1.

In response to detecting the first gaze input that is directed to the first control element (e.g., in accordance with a determination that the gaze input is maintained on the first control element for at least a threshold amount of time, and/or a determination that the gaze input meets stability criteria with respect to the first control element), the computer system updates (906) an appearance of the first control element from the first appearance to a second appearance that is different from the first appearance (e.g., the first control element is displayed with a second set of values for the first set of visual properties, wherein the second set of values are different from the first set of values) (e.g., the first control element changes brightness, color, luminance, translucency, opacity, color saturation, simulated optical property or lighting effect, size, and/or animated movements, when a gaze input is directed to the first control element). For example, in FIG. 7G, a color of resize affordance 708-2 is updated in response to detecting the user's attention 710-4 directed to resize affordance 708-1.

While displaying the first control element with the second appearance, the computer system detects (908), via the one or more input devices, a first user input directed to the first control element (e.g., the user input is a gesture input or another type of input detected via an input device, where the first user input is detected in conjunction with the first gaze input). For example, as described with reference to FIGS. 7K, in some embodiments, a user input via the user's hand 7020 is detected.

In response to detecting the first user input directed to the first control element, in accordance with a determination that the first user input meets first criteria (e.g., the first user input meets the criteria for detecting a predetermined gesture (e.g., an air tap, or an air pinch gesture) with respect to the first control element, optionally, while the gaze input is maintained on the first control element), the computer system updates (910) the appearance of the first control element from the second appearance to a third appearance that is different from the first appearance and the second appearance and that indicates that additional movement associated with the first user input (e.g., a movement of the input object, and/or a drag gesture following the air tap or pinch gesture or while maintaining the pinch gesture) will cause the first operation (e.g., dragging, resizing, adjusting a shape and/or size, adjusting a visual property of a corresponding object (e.g., the first user interface object)) associated with the first control element to be performed (e.g., the first control element is displayed with a third set of values for the first set of visual properties that are different from the first set of values and the second set of values; or the first user interface object displayed with the second appearance and the third appearance have different sets of values for a second visual property that is different from the first visual property). For example, in some embodiments, the gaze of the user on the first control element with the first appearance causes the computer system to display the first control element with a bigger size, a greater brightness, and/or a different color; while the first user input directed to the first control element with the second appearance causes the computer system to further change the size, the shape and/or the simulated optical property and lighting effect of the first control element. For example, as described with reference to FIGS. 7K, the resize affordance 708-5 is updated in a second manner by changing a size of the resize affordance 708-5. Similarly, as described with reference to FIG. 7V-7X, grabber 706-4 is updated in two manners, a first manner in response to detecting the user's attention 710-20 and a second manner in response to detecting a user input via user's hand 7020.

In some embodiments, while displaying the first control element with the third appearance, the computer system detects a second user input that includes additional movement associated with the first user input directed to the first control element (e.g., the second user input is an extension of the first user input, for example a pinch gesture followed by a drag gesture while maintaining the pinched posture of the hand; or movement of the input object followed by a tap or tap hold input of the input object). In some embodiments, in response to detecting the second user input, the computer system performs the first operation with respect to the first user interface object in accordance with the additional movement of the second user input (e.g., resizes the first user interface object, moving the first user interface object, and/or adjusts a property of the first user interface object, e.g., by an amount and/or by a respective type of change, in accordance with a direction, distance, duration, speed, and/or or other characteristics of the additional movement of the second user input). For example, in FIGS. 7K-7L, application window 702 is resize in response to the user input directed to resize affordance 708-5, and in FIGS. 7X-7Z, application window 702 is moved in response to the user input directed to grabber 706-4. Allowing the user to perform an operation by providing an input that selects and moves a control that is dynamically displayed while the user is gazing at the control reduces the number of inputs needed to perform the operation without displaying additional controls.

In some embodiments, while displaying the first control element with the second appearance (e.g., before the second user input that includes the additional movement associated with the first user input is detected, and before the first control element takes on the third appearance), the computer system detects, via the one or more input devices, that the first gaze input is no longer directed to the first control element (e.g., the first gaze input is directed to a second control element, or to an area in the three-dimensional environment (e.g., a portion of the representation of the physical environment, the interior of the first user interface object, or other objects or controls in the three-dimensional environment) that does not correspond to the first control element; or no gaze input is detected). In some embodiments, in response to detecting that the first gaze input is no longer directed to the first control element while displaying the first control element with the second appearance, the computer system restores the appearance of the first control element from the second appearance to the first appearance. In some embodiments, the computer system detects the first gaze input moving away from the first control element, and in response to detecting the first gaze input moving away from the first control element, the computer system ceases to display the first control element with the changed visual appearance (e.g., cease the visual emphasis of the first control element). For example, while the first control element is no longer the subject of the user's attention, the first control element is restored to its normal appearance (e.g., is not visually emphasized, and/or its first appearance). For example, as described with reference to FIG. 7H, if the user's attention is no longer directed to resize affordance 708-2, the update to the color of resize affordance 708-2 is reversed, such that resize affordance 708-3 is displayed with the same visual properties of resize affordance 708-1. Automatically updating an appearance of the control when the user has looked away from the control provides the user with improved visual feedback of the user's interactions and where the computer system detects the user's attention.

In some embodiments, while displaying the first control element with the third appearance (e.g., after detecting the first user input directed to the first control element, and while detecting the second user input directed to the first control element), the computer system detects, via the one or more input devices, that the first gaze input is no longer directed to the first control element (e.g., the first gaze input is directed to a second control element, or to an area in the three-dimensional environment (e.g., a portion of the representation of the physical environment, the interior of the first user interface object, or other objects or controls in the three-dimensional environment) that does not correspond to the first control element; or no gaze input is detected). In some embodiments, in response to detecting that the first gaze input is no longer directed to the first control element while displaying the first control element with the third appearance, maintaining display of the first control element with the third appearance (e.g., after the first control element has been selected by the user with the first user input, the computer system maintains the third appearance of the first control element even if the user's gaze is no longer directed to the first control element, optionally until the user deselects the first control element (e.g., until the first user input ceases to be detected, and/or until the release of a tap-hold input or release of the pinch posture of the hand)). For example, as described with reference to FIGS. 7K, if the user looks away from resize affordance 708-5 after selecting the resize affordance, the resize affordance 708-5 continues to be displayed with the updated visual properties, including a change in color and a change in size as compared to resize affordance 708-1. Maintaining an appearance of a control, after the user has selected the control, even if the user looks away from the control after selecting the control, provides the user with improved visual feedback that the control is still selected and reduces a number of user inputs required to reselect the control by maintaining selection of the control even while the user has looked away.

In some embodiments, the first user interface object is a first application window (e.g., a window associated with a first application (e.g., a user application, a system application, a viewport of a three-dimensional experience, a control panel, a settings user interface, and/or a communication application providing a communication user interface or shared experience for multiple users)) displayed in the first view of the three-dimensional environment, and the first control element is associated with performing the first operation with respect to the first application window. In some embodiments, the first application window is displayed as a two-dimensional object or pseudo-three-dimensional object in the three-dimensional environment. For example, application window 702 is considered a two-dimensional application window and virtual object 7028 is considered a three-dimensional object. Automatically updating an appearance of a control for an application window displayed within an AR/VR environment when the user is gazing at the control and when the user is interacting with the control provides the user with improved visual feedback of the user's interactions within the AR/VR environment.

In some embodiments, updating the appearance of the first control element from the first appearance to the second appearance includes updating a color of the first control element from a first color to a second color that is different from the first color. In some embodiments, updating the appearance of the first control element includes changing a translucency and/or opacity of the first control element. In some embodiments, the first control element is updated from being displayed with a first color, such as grey, to a second color, such as white. For example, as described with reference to FIG. 7G, the color of resize affordance 708-2 is updated in response to detecting the user's attention is directed to the resize affordance. Similarly, in FIG. 7W, grabber 706-3 is displayed with an updated color in response to detecting the user's attention is directed to grabber 706-2. Automatically updating an appearance of a control by changing a color of the control in response to detecting that the user is looking at the control provides the user with improved visual feedback of the user's interactions.

In some embodiments, updating the appearance of the first control element from the second appearance to the third appearance includes updating a size of the first control element from a first size to a second size that is different from the first size. In some embodiments, the first control element decreases or increases in size to indicate that the user's gaze is detected on the first control (e.g., in addition to changing its color and/or translucency). In some embodiments, the first control element increases in size to a third size larger than the first size and the second size indicate that the first operation is about to be performed with respect to the first user interface object if additional movement associated with the first user input is detected. For example, as described with reference to FIGS. 7K, a size of resize affordance 708-5 is updated in response to detecting a user input selecting resize affordance 708-5. Similarly, a size of grabber 706-4 is updated in response to detecting a user input selecting grabber 706-4. Automatically updating an appearance of a control by changing a size of the control in response to detecting that the user has selected the control provides the user with improved visual feedback of the user's interactions, including visual feedback that the control is currently selected.

In some embodiments, updating the size of the first control element from the first size to the second size includes decreasing the size of the first control element from the first size to the second size that is smaller than the first size (e.g., the second size has a smaller bounding box, or a smaller size in a first dimension and a smaller or same size in other dimensions). In some embodiments, the first control element decreases in size and is maintained at the decreased size while the user's gaze is continued to be detected as directed to the first control element (e.g., before detecting user selection of the first control element by the first user input). For example, in FIGS. 7H and 7K (e.g., FIGS. 7K1 and 7K3), grabber 706-4 is displayed with a smaller size than grabber 706-3. Automatically updating an appearance of a control by decreasing a size of the control in response to detecting that the user has selected the control provides the user with improved visual feedback of the user's interactions, including visual feedback that the control is currently selected.

In some embodiments, decreasing the size of the first control element from the first size to the second size that is smaller than the first size includes decreasing a first dimension of the first control element by a first amount, and decreasing a second dimension of the first control element by a second amount that is different than the first amount (e.g., shrink the first control element in the horizontal dimension more than the vertical dimension, decrease the width more than decreasing the length, or changing an aspect ratio of the first control element while reducing the size of at least one dimension of the first control element). For example, as described with reference to FIGS. 7K, changing a size of resize affordance 708-5 includes changing a width, or thickness of resize affordance 708-5 without changing a length of resize affordance 708-5. For example, changing the size of resize affordance 708-5 changes a first dimension of resize affordance 708-5 without changing a second dimension of resize affordance 708-5. Automatically updating an appearance of a control by changing a size of the control in a first dimension without changing the size of the control in a second dimension, in response to detecting that the user has selected the control, provides the user with improved visual feedback of the user's interactions.

In some embodiments, the first control element is an object move control (e.g., a grabber) for moving the first user interface object (e.g., translating as a whole, and/or rotating around a pivot point or axis located within or outside of the first user interface object) within the three-dimensional environment. In some embodiments, the object move control is displayed at a first position relative to the first user interface object. For example, the object move control includes a grabber bar displayed at a nonzero distance (e.g., a gap through which content displayed behind the first user interface object and the grabber bar can become visible in the first view of the three-dimensional environment) from a bottom center edge of the first user interface object, in accordance with some embodiments. For example, grabber 706-1 is a move control for application window 702, and as described with reference to FIGS. 7V-7Y, the visual properties of grabber 706-1 are updated in accordance with the user's attention and a user input directed to grabber 706-1. Automatically updating an appearance of a move control for changing a position of an object when the user is gazing at the move control, and further updating the appearance of the move control when the user is interacting with the move control, reduces the number of inputs needed to reposition the object and provides the user with improved visual feedback of the user's interactions to move the object.

In some embodiments, while displaying the object move control with the third appearance, the computer system detects a third user input that includes first additional movement associated with the first user input directed to the object move control (e.g., the third user input is an extension of the first user input, for example a pinch gesture followed by a drag gesture while maintaining the pinched posture of the hand; or movement of the input object followed by a tap or tap hold input of the input object). In some embodiments, in response to detecting the third user input directed to the object move control, the computer system moves the first user interface object in the three-dimensional environment in accordance with the first additional movement of the third user input (e.g., moving the first user interface object by an amount in accordance with a direction, distance, duration, speed, and/or other characteristics of the additional movement of the third user input), as described with reference to FIG. 7W-7Z in response to selection of grabber 706-4. In some embodiments, the third user input is detected while displaying the object move control (e.g., the first control element) with the third appearance. For example, the object move control changes color in response to detecting the first gaze input directed to the object move control, and the object move control shrinks down in size in response to detecting the first user input selecting the object move control (optionally while maintaining its change in color). Allowing the user to move a position of a virtual object by providing an input that selects and moves a move control, and updating an appearance of the move control while the user is interacting with the move control reduces the number of inputs needed to move the object without displaying additional controls and improves visual feedback.

In some embodiments, the first control element is an object resize control for changing a size of the first user interface object within the three-dimensional environment. In some embodiments, the first control is an object resize control displayed at a nonzero distance from a respective characteristic point or location (e.g., a respective one of two or four corners of a rectangular window, a respective apex of a polygonal object, or a set of cardinal points on a circumference of a circular or oval object or on a surface of a three-dimensional objects) on the first user interface object, as described with reference to FIGS. 7K-7L. In some embodiments, the resize control is an L shape with a curvature that matches a curvature of the respective corner of the first user interface object at the characteristic point or location on the first user interface object. Allowing the user to change a size of a virtual object by providing an input that selects and moves a resize control, and updating an appearance of the resize control while the user is interacting with the resize control reduces the number of inputs needed to resize the object without displaying additional controls and improves visual feedback.

In some embodiments, while displaying the object resize control with the third appearance, the computer system detects a fourth user input that includes second additional movement of the first user input directed to the object resize control (e.g., the fourth user input is an extension of the first user input, for example a pinch gesture followed by a drag gesture while maintaining the pinched posture of the hand; or movement of the input object followed by a tap or tap hold input of the input object); and in response to detecting the fourth user input directed to the object resize control, changes the size of the first user interface object in accordance with the second additional movement of the fourth user input (e.g., changing the size and/or aspect ratio of the first user interface object by an amount in accordance with a direction, distance, duration, speed, and/or other characteristics of the second additional movement of the fourth user input). In some embodiments, the fourth user input is detected while displaying the object resize control (e.g., the first control element) with the third appearance. For example, the object resize control changes color in response to detecting the first gaze input directed to the object resize control, and the object resize control shrinks down in size in response to detecting the first user input selecting the object resize control (optionally while maintaining its change in color). For example, in FIGS. 7K-7L, resize affordance 708-5 is moved in accordance with movement of the user's hand 7020 to resize application window 702. Allowing the user to change a size of a virtual object by providing an input that selects and moves a resize control, and updating an appearance of the resize control while the user moves the user input to resize the object reduces the number of inputs needed to resize the object without displaying additional controls and improves visual feedback.

In some embodiments, the first control element is an object close control for ceasing display of the first user interface object in the three-dimensional environment. In some embodiments, the object close control is an "x" or other exit control that is displayed at a nonzero distance from a respective characteristic point or location (e.g., a respective one of two or four corners of a rectangular window, a respective apex of a polygonal object, or a set of cardinal points on a circumference of a circular or oval object or on a surface of a three-dimensional objects) on the first user interface object. In some embodiments, in response to detecting a user input directed to the object close control, the computer system ceases display of (or otherwise closes) the first user interface object in the three-dimensional environment. For example, in FIG. 7D3, close affordance 7030 is a close control for application window 702, and in FIG. 7R, close affordance 717 is a close control for virtual object 7028. Allowing the user to close a virtual object by providing an input that selects a close control, and updating an appearance of the close control while the user is interacting with the close control reduces the number of inputs needed to close the object without displaying additional controls and improves visual feedback.

In some embodiments, while displaying the first control element with a first respective appearance (e.g., the first appearance, the second appearance, or the third appearance), the computer system detects, via the one or more input devices, a second gaze input directed to a portion of the three-dimensional environment (e.g., the second gaze input is a continuation of the first gaze input following a movement of the user's gaze away from an initial location of the first gaze input on the first control element) (e.g., the second gaze input optionally is on a different portion of the first control element or has moved away from the first control element onto another object (e.g., from the corner of the first user interface object to the center of the bottom edge of the first user interface object)); and in response to detecting the second gaze input directed to the portion of the three-dimensional environment: in accordance with a determination that the second gaze input is directed to a first location relative to the first control element in the three-dimensional environment (e.g., the first location has a first spatial relationship with the first control element (e.g., is within a threshold distance of the first control element, is still on the first control element or the portion of the first user interface object that corresponds to the first control element)), updates the appearance of the first control element from the first respective appearance to a second respective appearance different from the first respective appearance (e.g., elongates one portion, shortens another portion of the first control element; elongates and narrows (e.g., stretches) the first control element in a direction of the movement of the user's gaze, and shortens the first control element in a direction different from the movement direction of the user's gaze); and in accordance with a determination that the second gaze input is directed to a second location relative to the first control element in the three-dimensional environment (e.g., the second location has a second spatial relationship with the first control element (e.g., is outside a threshold distance of the first control element, is no longer on the first control element or the portion of the first user interface object that corresponds to the first control element); and/or the second location has the first spatial relationship with a location associated with a second control element (e.g., is within a threshold distance of the display position of the second control element (e.g., center of the bottom edge of the first user interface object, a lower right corner of the first user interface object, or the upper left corner of the first user interface object))), ceases display of the first control element from the three-dimensional environment. In some embodiments, as described with reference to FIGS. 7G-7H, if the user gazes at the first location that corresponds to the first control element, the computer system displays the first control element and updates the appearance of the first control element to indicate that the user's gaze is detected as being directed to the first control element, if the user's gaze moves while the first control element is displayed, the first control element changes its appearance to indicate the movement of the gaze input but remains displayed as long as the gaze has not moved too far away from the first control element; and if the user's gaze moved to the location associated with another control element, such as a different corner of the first user interface object, or at a center portion of the first user interface object, the computer system ceases to display the first control element and, optionally, displays the second control element at or near the new location of the user's gaze. For example, in FIG. 7G, the user's attention 710-4 is directed to resize affordance 708-2, which is illustrated with an updated color (e.g., as compared to resize affordance 708-1) in response to the user gazing at the resize affordance. In FIG. 7H, as the user's attention 710-5 moves away from the resize affordance 708-2, in some embodiments, the color of resize affordance 708-2 is maintained as the updated color, in accordance with a determination that the user's attention 710-5 has shifted, or moved, away from the resize affordance 708-2 by less than a threshold amount (e.g., the user's gaze is still within a threshold proximity of the resize affordance 708-2 and/or is directed to application window 702). In some embodiments, the color of resize affordance is not maintained (e.g., as illustrated by resize affordance 708-3, FIG. 7H) as the updated color in accordance with a determination that the user's attention 710-5 has shifted, or moved, away from the resize affordance 708-2 by at least the threshold amount (e.g., the user's gaze is not within the threshold proximity of the resize affordance and/or is not directed to application window 702). Automatically updating an appearance of a control when the user has looked away from the control, including changing the appearance of the control in a first manner if the user looks at a first position, such as far away from the control, and changing the appearance of the control in a second manner if the user looks at a second position, such as close to the control, provides the user with improved visual feedback of the user's interactions to indicate where the user's gaze is detected.

In some embodiments, in response to detecting the second gaze input directed to the portion of the three-dimensional environment: in accordance with a determination that the second gaze input is directed to a second location relative to the first control element in the three-dimensional environment (e.g., the second location has a second spatial relationship with the first control element (e.g., is outside a threshold distance of the first control element, is no longer on the first control element or the portion of the first user interface object that corresponds to the first control element); and/or the second location has the first spatial relationship with a location associated with a second control element (e.g., is within a threshold distance of the display position of the second control element (e.g., center of the bottom edge of the first user interface object, a lower right corner of the first user interface object, or the upper left corner of the first user interface object))), the computer system displays a second control element that is associated with performing a second operation (e.g., dragging, resizing, adjusting a shape and/or size of, and/or adjusting a visual property of) with respect to the first user interface object, in the first view of the three-dimensional environment (e.g., a passthrough view of a physical environment, an AR environment, or a VR environment), wherein the second control element is spaced apart from (e.g., separate from, not attached to, changes size and/or location separately from, is spaced apart by a gap (e.g., content (e.g., passthrough content, and/or other objects and windows in the environment) behind the first user interface object and the second control element is visible to the user through the gap)) from) the first user interface object in the first view of the three-dimensional environment. For example, if the user gazes moves from the location associated with the first control element toward the location associated with the second control element, the appearance of the first control element changes to indicate the movement of the gaze; as the gaze moves to the location associated with the second control element, the computer system ceases to display the first control element and displays the second control element or changes the appearance of the second control element to indicate that the location of the gaze input is now on the second control element. Similarly, if the user gazes moves from the location associated with the second control element toward the location associated with the first control element, the appearance of the second control element changes to indicate the movement of the gaze; as the gaze moves to the location associated with the first control element, the computer system ceases to display the second control element and displays the first control element or changes the appearance of the first control element to indicate that the location of the gaze input is now on the first control element. In some embodiments, the first control element is an object resize control displayed proximate to a first corner of the first user interface object, and the second control element is an object move control displayed proximate to the center of the bottom edge of the first user interface object, as described with reference to FIG. 7I. For example, in FIGS. 7H-7I, the user's attention 710-6 has moved away from resize affordance 708-3, and, as the user's attention 710-6 moves to a center of the bottom edge of application window 702, resize affordance 708-4 is displayed as shifting over in a same direction as if to follow the user's attention 710-6, until grabber 706-1 replaces display of resize affordance 708-4 in FIG. 7J. In some embodiments, the second control element has some or all of the interactions, appearances, and properties described herein with respect to the first control element, and is an example of other types of control elements that can be concurrently displayed with the first user interface object. Determining a position of where the user is currently gazing, and automatically ceasing display of a first control when the user has looked away from the first control and displaying a second control based on the currently detected position of the user's gaze, reduces the number of inputs required to access various controls and provides the user with improved visual feedback of the user's interactions to indicate where the user's gaze is detected.

In some embodiments, the first view of the three-dimensional environment corresponds to a first viewpoint of the user, and displaying the first control element with the first appearance includes: in accordance with a determination that the first user interface object is displayed within the three-dimensional environment at a first position that is a first distance away from the first viewpoint of the user, displaying the first control element with a first simulated size (e.g., at or near the first distance away from the first viewpoint) that corresponds to the first distance; and in accordance with a determination that the first user interface object is displayed within the three-dimensional environment at a second position that is a second distance away from the first viewpoint of the user, displaying the first control element with a second simulated size (e.g., at or near the second distance away from the first viewpoint) that corresponds to the second distance. For example, as the first user interface object is pushed farther away from the first viewpoint of the user, the computer system increases the simulated size (e.g., an intrinsic size, as opposed to the size on the display) of the first control element, such that the first control element still appears roughly the same displayed size (e.g., angular extent) to the user as before, rather than becoming too small to see or manipulate for the user. Similarly, as the first user interface object is pulled closer to the first viewpoint of the user, the computer system decreases the simulated size (e.g., an intrinsic size, as opposed to the size on the display) of the first control element, such that the first control element is not blown up on the display by too much to obscure other content in the first view. For example, grabber 706-2 in FIG. 7M is displayed with a smaller size than grabber 706-1 after application window 702 is resized to a smaller size, such that the grabber is proportional to the size of the application window. Similarly, if application window 702 appears smaller based on its perceived distance from the user, grabber 706-2 is displayed with a proportional size to application window 702. Displaying a control associated with a virtual object with a simulated physical size that is based on a simulated distance between the virtual object and the user within the three-dimensional environment provides the user with improved visual feedback of the user's position within the three-dimensional environment.

In some embodiments, while the first user interface object is displayed within the three-dimensional environment at a first position that is a first distance away from a first viewpoint of the user, the first control element is displayed with a first size. In some embodiments, the computer system detects movement of the first user interface object (and correspondingly, detecting movement of the first control element) from the first position to a second position that is a second distance away from the first viewpoint of the user (e.g., in response to and in accordance with the additional movement associated with the first user input; or in accordance with other events occurring in the three-dimensional environment), wherein the second distance is greater than the first distance; and in response to the detecting the movement of the first user interface object from the first position to the second position that is farther away from the first viewpoint of the user than the first position (and in accordance with a determination that the first control element is moved together with the first user interface object from the first distance to the second distance away from the first viewpoint of the user), the computer system: displays the first control element at or near the second distance away from the first viewpoint of the user, with an increased simulated size as compared to when the first control element was displayed at or near the first distance away from the first viewpoint of the user. In some embodiments, the increase in simulated size of the first control element counteracts and/or offsets at least a portion of the scale down of the displayed size of the first control element due to the increased display depth away from the first viewpoint, so the first control element appears to the user with roughly the same displayed size, or slightly reduced displayed size that is larger than the normal scaled-down size of the first control element due to the increase in distance from the first viewpoint. For example, as described with reference to FIGS. 7K, in some embodiments, resize affordance 708-5 appears to change in size by an amount based on (i) being currently selected by a user input and (ii) a current size of application window 702. Increasing a simulated physical size of a control, while the control is selected, that is associated with a virtual object while the virtual object is displayed as decreasing in size based on an increased distance between the virtual object and the user within the three-dimensional environment provides the user with improved visual feedback of the user's position within the three-dimensional environment.

In some embodiments, while the first user interface object is displayed within the three-dimensional environment at a first position that is a first distance away from a first viewpoint of the user, the first control element is displayed with a first size. In some embodiments, the computer system detects movement of the first user interface object (and correspondingly, detecting movement of the first control element) from the first position to a third position that is a third distance away from the first viewpoint of the user (e.g., in response to and in accordance with the additional movement associated with the first user input; or in accordance with other events occurring in the three-dimensional environment), wherein the third distance is smaller than the first distance; and in response to the detecting the movement of the first user interface object from the first position to the third position that is closer to the first viewpoint of the user than the first position (and, optionally, in accordance with a determination that the first control element is moved together with the first user interface object from the first distance to the third distance away from the first viewpoint of the user): displays the first control element at or near the third distance away from the first viewpoint of the user, with a decreased simulated size as compared to when the first control element was displayed at or near the first distance away from the first viewpoint of the user. In some embodiments, the decrease in simulated size of the first control element counteracts and/or offsets at least a portion of the scale up of the displayed size of the first control element due to the decreased display depth to the first viewpoint, so the first control element appears to the user with roughly the same displayed size, or slightly increased displayed size that is smaller than the normal scaled-up size of the first control element due to the decrease in distance from the first viewpoint. For example, as described with reference to FIGS. 7K, resize affordance 708-5 appears to change in size by an amount based on (i) being currently selected by a user input and (ii) a current size of application window 702. Decreasing a simulated physical size of a control associated with a virtual object while the virtual object is displayed as increasing in size based on an decreased distance between the virtual object and the user within the three-dimensional environment provides the user with improved visual feedback of the user's position within the three-dimensional environment.

In some embodiments, the first view of the three-dimensional environment corresponds to a first viewpoint of the user, and displaying the first user interface object includes: in accordance with a determination that the first user interface object is displayed within the three-dimensional environment at a first position that is a first distance away from the first viewpoint of the user, displaying the first user interface object with a third simulated size that corresponds to the first distance; and in accordance with a determination that the first user interface object is displayed within the three-dimensional environment at a second position that is a second distance away from the first viewpoint of the user, displaying the first control element with a second simulated size that corresponds to the second distance. For example, as the first user interface object is pushed farther away from the first viewpoint of the user, the computer system increases the simulated size (e.g., an intrinsic size, as opposed to the size on the display) of the first user interface object, such that the first user interface object does not becoming too small to see or manipulate for the user. Similarly, as the first user interface object is pulled closer to the first viewpoint of the user, the computer system decreases the simulated size (e.g., an intrinsic size, as opposed to the size on the display) of the first user interface object such that the first user interface object is not blown up on the display by too much to obscure too much of other content in the first view. For example, as described with reference to FIG. 7M, if application window 702 is moved in position away from the user, application window 702 decreases in size, and if application window 702 (e.g., and its associated controls, such as grabber 706-1) is moved in position towards the user, application window (e.g., and its associated controls, such as grabber 706-1) increases in size in accordance with the closer position to the user. Displaying a virtual object with a simulated physical size that is based on a simulated distance between the virtual object and the user within the three-dimensional environment provides the user with improved visual feedback of the user's position within the three-dimensional environment.

In some embodiments, aspects/operations of methods 800, 1000, 1100, 1200, 1300, 1400, 1500, 1600, 1800 and 20000 may be interchanged, substituted, and/or added between these methods. For example, the first object (e.g., application window or virtual object) in the method 800 has characteristics of the first user interface object (e.g., application window or virtual) in the method 900, and the first control elements that are displayed may be replaced by, or concurrently displayed with, other user interface elements (e.g., the first control element, as in the method 900 above, can be displayed as a title bar, as in the method 1000 below). For brevity, these details are not repeated here.

FIG. 10 is a flow diagram of an exemplary method 1000 for displaying a title bar with information for an application, in accordance with some embodiments. In some embodiments, method 1000 is performed at a computer system (e.g., computer system 101 in FIG. 1) including a display generation component (e.g., display generation component 120 in FIGS. 1A, 3, and 4 or display generation component 7100) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1000 are, optionally, combined and/or the order of some operations is, optionally, changed.

Method 1000 is a method for displaying a title bar for an application window that dynamically increases in size, in response to detecting a user's attention is directed to the title bar, to automatically provide the user with access to additional controls, thereby reducing a number of inputs required to access additional controls for the application window and providing visual feedback about a state of the device.

In some embodiments, method 1000 is performed at a computer system that is in communication with a first display generation component (e.g., a first display generation component of a two-sided display generation component, a heads-up display, a head-mounted display (HMD), a display, a touchscreen, a projector, a standalone display, and/or a display that is enclosed in the same housing as another display generation component of the same type or a different type) and one or more input devices (e.g., cameras, controllers, touch-sensitive surfaces, joysticks, buttons, gloves, watches, motion sensors, and/or orientation sensors). In some embodiments, the first display generation component is a display component facing the user and provides an XR experience to the user. In some embodiments, the first display generation component includes two or more display components (e.g., one set for each eye) that display slightly different images to form a stereoscopic view of the three-dimensional environment. In some embodiments, the first display generation component and a second display generation component form a two-sided display device (e.g., a two-sided HMD) that displays a first user interface on a first side corresponding to the first display generation component, and a second user interface on the second side corresponding to the second display generation component. In some embodiments, the second display generation component is a display component facing away from the user and toward an external environment of the user and optionally provides status information related to the first display generation component (e.g., displayed content and/or operational state) and/or the user (e.g., movement of the user's eyes, and/or attention state of the user) to other users in the external environment. In some embodiments, the computing system is an integrated device with one or more processors and memory enclosed in the same housing as the first and the second display generation components and at least some of the one or more input devices. In some embodiments, the computing system includes a computing component (e.g., a server, a mobile electronic device such as a smart phone or tablet device, a wearable device such as a watch, wristband, or earphones, a desktop computer, or a laptop computer) that includes one or more processors and memory that is separate from the display generation component(s) and/or the one or more input devices. In some embodiments, the display generation component(s) and the one or more input devices are integrated and enclosed in the same housing.

The computer system concurrently displays (1002), via the first display generation component, a first application window and a first title bar of the first application window, wherein the first title bar of the first application window is separate from the first application window (e.g., changes size and/or location separately from the first application window and/or is spaced apart from the first application window by a gap (e.g., content (e.g., passthrough content, and/or other objects and windows in the environment) behind the first application window and the first title bar is visible to the user through the gap)) on a first side of the first application window (e.g., displayed above the top edge, below the bottom edge, left of the left edge, right of the right edge, and/or external to a respective corner of the first application window) and displays a respective identifier of the first application window (e.g., a respective identifier (e.g., a name and/or an application icon for an application, a name and/or avatar of a user or group engaged in an ongoing communication session) of a first application (e.g., a system application, a user application, or a three-dimensional experience) that generated the first application window, or a respective identifier (e.g., name, application type, and/or icon) of a document (e.g., a textual document, a graphic document, a media document, a data document, a project document, and/or a communication document) that is displayed within the first application window). For example, in FIG. 7S, title bar 716 is displayed concurrently with application window 702.

While displaying the first application window with the first title bar separate from the first application window, the computer system detects (1004), via the one or more input devices, that a user's attention is directed to the first title bar (e.g., detecting a gaze and/or gesture input directed to the first title bar, optionally, for at least a threshold amount of time and/or with sufficient specificity with respect to the first title bar). For example, in FIG. 7Z, user's attention 710-23 is directed to title bar 716.

In response to detecting that the user's attention is directed to the first title bar (1006), in accordance with a determination that the user's attention meets first criteria with respect to the first title bar (e.g., the gaze input is maintained on the first title bar for at least a threshold amount of time, and/or a predetermined gesture or interaction is detected in conjunction with the gaze input directed to the first title bar), the computer system expands (1008) the first title bar (e.g., in a direction away from the first application window, in a direction toward the interior of the first application window, and/or in a predetermined direction (e.g., downward, upward, to the left, to the right, or in another direction)) to display one or more first selectable controls for interacting with a first application corresponding to the first application window, wherein the one or more first selectable controls were not displayed prior to expanding the first title bar. In some embodiments, the expanded first title bar includes one or more selectable controls for interacting with the content of the first application window (e.g., performing an operation that changes the content of the first application window, updating at least a portion of the content of the first application window, changing the appearance of the content displayed in the first application window, and/or displaying different content in the first application window). In some embodiments, the one or more first selectable controls include selectable controls for interacting with the first application corresponding to the first application window (e.g., opening a new window of the first application, and/or navigating to a different user interface in the first application window). In some embodiments, before the first title bar is expanded, the first title bar is separate from the first application window by a gap; and after expanding the first title bar, the expanded first title bar visually obscure a portion of the first application window (e.g., expanded first title bar is displayed in front of the first application window, overlaying or covering at least a portion of the first application window). In some embodiments, the expanded first title bar expands in a direction away from the first application window and does not visually obscure the first application window. For example, in FIG. 7AA, title bar 716-2 expands to display additional controls.

In some embodiments, the computer system displays (e.g., concurrently with the first application window and the first title bar), via the first display generation component, a second application window (e.g., of a distinct application than the first application window or of the same application as the first application window) and a second title bar of the second application window, wherein the second title bar of the second application window is separate from the second application window (e.g., changes size and/or location separately from the second application window and or is spaced apart from the second application window, e.g., in a manner analogous to that of the first application window and the first title bar) on a first side of the second application window (e.g., displayed above the top edge, below the bottom edge, left of the left edge, right of the right edge, and/or external to a respective corner of the second application window) and displays a respective identifier of the second application window (e.g., a respective identifier (e.g., a name and/or an application icon for an application, a name and/or avatar of a user or group engaged in an ongoing communication session) of a second application (e.g., a system application, a user application, or a three-dimensional experience) that generated the second application window, or a respective identifier (e.g., name, application type, and/or icon) of a document (e.g., a textual document, a graphic document, a media document, a data document, a project document, and/or a communication document) that is displayed within the second application window). For example, in FIG. 7AB, application window 720 is also displayed with its own title bar 722. In some embodiments, while displaying the second application window with the second title bar separate from the second application window (e.g., displayed concurrently with the first application window and the first title bar), the computer system detects, via the one or more input devices, that the user's attention is directed to the second title bar of the second application window (e.g., detecting a gaze and/or gesture input directed to the second title bar, optionally, for at least a threshold amount of time and/or with sufficient specificity with respect to the second title bar); and in response to detecting that the user's attention is directed to the second title bar of the second application window: in accordance with a determination that the user's attention meets the first criteria with respect to the second title bar of the second application window (e.g., the gaze input is maintained on the second title bar for at least a threshold amount of time, and/or a predetermined gesture or interaction is detected in conjunction with the gaze input directed to the second title bar), expands the second title bar (e.g., in a direction away from the second application window, in a direction toward the interior of the second application window, and/or in a predetermined direction (e.g., downward, upward, to the left, to the right, or in another direction)) to display one or more second selectable controls for interacting with a second application corresponding to the second application window, wherein the one or more second selectable controls were not displayed prior to expanding the second title bar, as described with reference to FIGS. 7AB-7AC. In some embodiments, the second application is distinct from the first application corresponding to the first application window. In some embodiments, the second application is the same application as the first application (e.g., each application window represents a distinct tab and/or window of the same application). In some embodiments, the expanded second title bar includes one or more selectable controls for interacting with the content of the second application window (e.g., performing an operation that changes the content of the second application window, updating at least a portion of the content of the second application window, changing the appearance of the content displayed in the second application window, and/or displaying different content in the second application window). In some embodiments, the one or more second selectable controls include selectable controls for interacting with the second application corresponding to the second application window (e.g., opening a new window of the second application, and/or navigating to a different user interface in the second application window). In some embodiments, before the second title bar is expanded, the second title bar is separate from the second application window by a gap; and after expanding the second title bar, the expanded second title bar visually obscure a portion of the second application window (e.g., expanded second title bar is displayed in front of the second application window, overlaying or covering at least a portion of the second application window). In some embodiments, the expanded second title bar expands in a direction away from the second application window and does not visually obscure the second application window. For example, in FIG. 7AC, title bar 722-2 optionally expands to partially obscure application window 720. Displaying a respective title bar for distinct respective application windows, where the respective title bar dynamically increases in size, in response to detecting a user's attention is directed to the respective title bar, reduces a number of inputs required to access additional controls for the application window and provides visual feedback about a state of the device.

In some embodiments, in response to detecting that the user's attention is directed to the first title bar of the first application window: in accordance with a determination that the user's attention does not meet the first criteria with respect to the first title bar of the first application window (e.g., the gaze input is maintained on the first title bar for less than the threshold amount of time, and/or a predetermined gesture or interaction is not detected in conjunction with the gaze input directed to the first title bar), the computer system forgoes expanding the first title bar (e.g., maintaining the first title bar at a same size without expanding the first title bar to display one or more first selectable controls). In some embodiments, if the user's attention is not directed to the first title bar, the first title bar is not expanded. In some embodiments, in response to detecting that the user's attention is directed to the first title bar, the computer system updates one or more visual properties of the first title bar (e.g., changes a color, opacity, or other visual property of the first title bar) while detecting that the user's attention is directed to the first title bar. For example, in FIG. 7Z, in accordance with a determination that the user's attention 710-23 is not maintained for a threshold amount of time before the user's attention is directed elsewhere (e.g., not to title bar 716), expanded title bar 716-2 is not displayed. Displaying a respective title bar for distinct respective application windows, where the respective title bar dynamically increases in size, in response to detecting a user's attention is directed to the respective title bar, reduces a number of inputs required to access additional controls for the respective application window and provides visual feedback about a state of the device.

In some embodiments, in response to detecting that the user's attention is directed to the first title bar and in accordance with the determination that the user's attention meets the first criteria with respect to the first title bar, expanding the first title bar to display the one or more first selectable controls includes: expanding the first title bar to overlap at least a portion of the first application window; and displaying the one or more first selectable controls over the portion of the first application window. In some embodiments, the one or more first selectable controls include controls for the first application associated with the first application window. For example, the one or more first selectable controls include one or more of controls for: displaying details of an account, controlling media playback, changing one or more settings, closing the current or all documents or windows of the first application, starting or stopping sharing, zooming, renaming the current document or window, exporting the current document, duplicating the current document, performing a search, printing the content of the first application window, and/or other operations of the first application or operations for controlling the first application window and/or its content). In some embodiments, the sets of selectable controls displayed in the expanded title bars of different application windows and/or for different applications are the same. In some embodiments, the sets of selectable controls displayed in the expanded title bars of different application windows and/or for different applications are different for the different application windows and/or applications. For example, in FIG. 7AA, title bar 716-2 is expanded to display additional controls that overlap with application window 702. Displaying additional controls in an expanded title bar in response to detecting the user's gaze is directed to the title bar for an application window, reduces a number of inputs required to access additional controls for the respective application window.

In some embodiments, the first title bar is one of a set of one or more application control affordances (e.g., title bar, privacy indicator, tab indicator, sharing indicator, media playback indicator, location indicator, and other window control affordances) that are displayed (e.g., side by side, in a column, or in a row) separate from the first application window on a respective side of the first application window (e.g., some of the set of application control affordances are displayed above a top side of the first application window, some of the set of application control affordances are displayed below a bottom side of the first application window, some of the set of application control affordances are displayed left of a left side of the first application window, and/or some of the set of application control affordances are displayed right of a right side of the first application window). In some embodiments, while displaying the first application window with the set of one or more application affordances separate from the first application window, the computer system detects, via the one or more input devices, that a user's attention is directed to a respective application control affordance of the set of one or more application control affordances; and in response to detecting that the user's attention is directed to the respective application control affordance for the first application window: in accordance with a determination that the user's attention meets the first criteria with respect to the respective application control affordance of the first application window (e.g., the gaze input is maintained on the respective application control affordance for at least a threshold amount of time, and/or a predetermined gesture or interaction is detected in conjunction with the gaze input directed to the respective application control affordance), expands the respective application control affordance to display additional information and/or controls that are not displayed prior to detecting that the user's attention meets the first criteria with respect to the respective application control affordance; and in accordance with a determination that the user's attention does not meet the first criteria with respect to the respective application control affordance of the first application window (e.g., the gaze input is not maintained on the respective application control affordance for at least a threshold amount of time, and/or a predetermined gesture or interaction is not detected in conjunction with the gaze input directed to the respective application control affordance), forgoes expanding the respective application control affordance (e.g., if the user quickly looked past the respective application control affordance, the respective application control affordance is not expanded). In some embodiments, interactions and properties of the first title bar described herein are also applicable to one or more of other application control affordances of the set of application control affordances, and are not repeated in an interest of brevity. For example, as described with reference to FIG. 7Z, additional controls (e.g., sharing indication 719, privacy indicator 718-1, and/or additional control option 721) are displayed with title bar 716, and in response to the user gazing at one of the additional controls, the additional control expands (e.g., privacy indicator 718-1 expands to privacy indicator 718-2, as described with reference to FIG. 7V). Forgoing displaying additional controls for a title bar, or other affordance, that may be expanded, in response to determining that the user has looked over the title bar without maintaining the user's attention on the title bar, enables the user to quickly access controls by gazing at the title bar or other affordance, without displaying the controls if the user has not intended to expand the title bar or other affordance, and provides improved visual feedback that the user has not directed attention to the title bar or other affordance that satisfies attention criteria.

In some embodiments, the respective application control affordance includes information indicating content that is displayed in the first application window. For example, a document name is displayed in the respective application control affordance (e.g., the title bar, or another application control affordance) for a word processing and/or document viewer application to indicate the document that is displayed in the first application window. In some embodiments, the respective application control affordance includes an application icon indicating the first application associated with the first application window. In some embodiments, the information indicating content that is displayed in the first application window is displayed in an application control affordance separate from the title bar. For example, the title bar indicates a name of the first application associated with the first application window and a separate application control affordance indicates the document name (or website name) for the content displayed within the first application window. For example, title bar 716 in FIG. 7S displays information about the content displayed in application window 702. Displaying a title bar that includes information about content that is currently displayed in the application window associated with the title bar enables the user to quickly view information about and navigate between application windows without requiring the user to navigate through complex menu hierarchies.

In some embodiments, the set of application control affordances includes a first set of one or more privacy indicators for the first application, wherein the first set of one or more privacy indicators have been displayed in accordance with a determination that the first application is accessing one or more sensors of the computer system (e.g., using, collecting, and/or accessing data of one or more cameras, microphones, geolocation sensors, biometric sensors, and/or other sensors that collect personal or privacy-related information of the user), as described in more detail with respect to method 1100. In some embodiments, while displaying the first application window of the first application with the first set of one or more privacy indicators, the computer system detects that the first application associated with the first application window is no longer accessing the one or more sensors of the computer system; and in accordance with a determination that the first application is no longer accessing the one or more sensors of the computer system, ceases to display the first set of privacy indicators with the first application window. In some embodiments, a respective privacy indicator is displayed with a set of visual properties (e.g., a color, an opacity, and/or a size) that are selected in accordance with the sensor that is used to collect information. For example, the privacy indicator is displayed with a first set of visual properties, including a first color, in accordance with a determination that a microphone is being collected by the first application, and the privacy indicator is displayed with a second set of visual properties, including a second color distinct from the first color, in accordance with a determination that location information is being collected by the first application). In some embodiments, more than one privacy indicator are, optionally, concurrently displayed at a given moment in time, each corresponding to a respective type of sensor that is being accessed by the first application, as described with reference to privacy indicator 718-1 in FIG. 7T (e.g., FIGS. 7T1 and 7T2). Determining that an application is accessing sensitive user data and displaying a privacy indicator near an application window of the application that is accessing sensitive user data improves security and privacy of the system by providing real-time information about the specific application window that is accessing the sensitive user data.

In some embodiments, the first set of one or more privacy indicators includes a first privacy indicator that has been displayed in accordance with a determination that the first application is collecting audio information through at least one of the one or more sensors of the computer system (e.g., using, collecting, and/or accessing data of one or more cameras, and/or microphones). In some embodiments, the first set of one or more privacy indicators includes a single indicator and it is displayed with a first appearance that corresponds to the collection of audio information. In some embodiments, the first set of one or more privacy indicators include multiple indicators, the first privacy indicator that corresponds to the collection of audio information is one of the first set of one or more privacy indicators, and at least one other privacy indicator of the first set of privacy indicators corresponds to the collection of other types of privacy information (e.g., visual information, location information, and/or biometric information). For example, privacy indicator 718-1 is displayed with a first color indicating that audio information is being collected. Determining that an application is accessing a microphone to collect audio information, and displaying a privacy indicator that indicates audio information is being collected near an application window of the application that is accessing the audio information improves security and privacy of the system by providing real-time information about the specific application window that is accessing the microphone.

In some embodiments, the first set of one or more privacy indicators includes a second privacy indicator that has been displayed in accordance with a determination that the first application is collecting location information through at least one of the one or more sensors of the computer system (e.g., using, collecting, and/or accessing data of one or more GPS devices, WiFi devices, gyros, telephony devices, antennas, cellular phone component, and/or other location-determination devices of the computer system). In some embodiments, the first set of one or more privacy indicators includes a single indicator and it is displayed with a second appearance that corresponds to the collection of location information (e.g., different from the appearance that corresponds to collection of audio information and from the appearance that corresponds to collection of video information). In some embodiments, the first set of one or more privacy indicators include multiple indicators, the second privacy indicator that corresponds to the collection of location information is one of the first set of one or more privacy indicators, and at least one other privacy indicator of the first set of privacy indicators corresponds to the collection of other types of privacy information (e.g., audio information, visual information, and/or biometric information). For example, privacy indicator 718-1 is displayed with a different color if location information is being accessed (e.g., as compared to a color representing if other types of information are being accessed), as described with reference to FIG. 7T. Determining that an application is accessing location data of the computer system, and displaying a privacy indicator that indicates location data is being collected near an application window of the application that is accessing the location data improves security and privacy of the system by providing real-time information about the specific application window that is accessing the location data.

In some embodiments, the set of application control affordances includes a first sharing indicator for the first application, wherein the first sharing indicator has been displayed with a first appearance in accordance with a determination that the first application is sharing content with another device (e.g., the content of the first application window is shared with another user or made public via the first application and/or via another application, such as a videoconferencing or other sharing application; or the first application is sharing content with another user and/or device and the first application window is the active window of the first application). In some embodiments, while concurrently displaying the first application window and the first sharing indicator with the first appearance, the computer system detects that the first application is no longer sharing content with another device (e.g., the user has stopped sharing the first application window or the first application); and in accordance with a determination that the first application is no longer sharing content with another device, ceases to display the first sharing indicator with the first appearance (e.g., ceasing to display the first sharing indicator completely, or changing the appearance of the first sharing indicator from the first appearance to a second appearance different from the first appearance, to indicate that the first application is now private, no longer sharing the first application window, and/or no longer sharing content with another user). In some embodiments, the first sharing indicator optionally includes identifiers (e.g., avatar(s), name(s), initial(s) and/or picture(s)) associated with devices with which the first application window or content of the first application is being shared. In some embodiments, the computer system detects that the first application window and/or content of the first application is not being shared with another device, and in response to detecting that the first application window and/or content of the first application is not being shared with another device, the computer system displays the first sharing indicator with a second appearance (e.g., a dimmed user and/or device indication that indicates the first application window and/or the first application is only displayed for the user without being shared with another device). For example, as described with reference to FIG. 7Z, sharing indication 719 displays information about the users that have access to shared application window 702, and sharing indication 719 is updated to indicate that application window 702 is private in accordance with a determination that application window 702 is not part of a shared session. Determining whether an application window is being shared across multiple devices, and displaying a sharing indicator that indicates content of the application window is currently being shared across devices associated with other users improves security and privacy of the system by providing real-time information about the specific application window that is being shared and provides improved visual feedback to the user.

In some embodiments, displaying the first sharing indicator includes displaying the first sharing indicator proximate to (and optionally separate from and/or adjacent to) the first title bar on the first side of the first application window. In some embodiments, the computer system concurrently displays the first application window, the first title bar, the first set of one or more privacy indicators, and the first sharing indicator for the first application window, wherein the first sharing indicator is displayed proximate to the first privacy indicator and/or proximate to the first title bar. For example, sharing indicator 719 is a separate user interface element displayed at a nonzero distance away from application window 702 in FIG. 7Z. Displaying a sharing indicator that indicates content of an application window is currently being shared across devices associated with other users near the title bar that indicates content of the application window improves security and privacy of the system by providing real-time information about the application window that is being shared and provides improved visual feedback to the user.

In some embodiments, the computer system detects (e.g., while the first sharing indicator is displayed with a second appearance to indicate that the first application is not currently sharing content with another device, or while the first sharing indicator is not displayed) that the first application is sharing content with another device (e.g., the content of the first application window is shared with another user or made public via the first application and/or via another application, such as a videoconferencing or other sharing application; or the first application is sharing content with another user and/or device and the first application window is the active window of the first application). In some embodiments, in response to detecting that the first application sharing content with another device, the computer system: in accordance with a determination that said another device is associated with a first other user, displays, in the first sharing indicator, a first identifier corresponding to the first other user (e.g., the name and/or avatar, username, telephone number, ID number, and/or other identifiers of the first other user); and in accordance with a determination that said other device is associated with a second other user different from the first other user, displays, in the first sharing indicator, a second identifier corresponding to the second other user (e.g., the name and/or avatar, username, telephone number, ID number, and/or other identifiers of the second other user), the second identifier different from the first identifier. For example, as described with reference to FIG. 7Z, in some embodiments, sharing indicator 719 includes an indication of the user that has access to shared application window 702. Determining whether an application window is being shared across multiple devices, and displaying a sharing indicator that indicates the user of another device that is sharing the content of the application window with the computer system improves security and privacy of the system by providing real-time information about the specific application window that is being shared and provides improved visual feedback to the user about who is sharing the application window without requiring additional user input.

In some embodiments, the computer system detects (e.g., while the first sharing indicator is displayed with the first appearance to indicate that the first application is currently sharing content with another device) that the first application is no longer sharing content with another device (e.g., the content of the first application window is no longer shared with another user or made public via the first application and/or via another application, such as a videoconferencing or other sharing application; or the first application is no longer sharing content with another user and/or device). In some embodiments, in response to detecting that the first application is no longer sharing content with another device, displaying the first sharing indicator with a second appearance that is different from the first appearance to indicate that the first application is not sharing content with another device (e.g., the first application window and any other windows of the first application are private to the user). In some embodiments, the computer system displays a lock symbol indicating the first application window and/or the content of the first application are private and not being shared by, or with, other devices. For example, sharing indication 719 in FIG. 7Z displays an indication that application window 702 is private. Determining whether an application window is being shared across multiple devices, and displaying a private indicator that indicates the content of the application window is not currently being shared with other devices improves security and privacy of the system by providing real-time information about the sharing status of the application window and provides improved visual feedback to the user indicating the application window is private without requiring additional user input.

In some embodiments, the computer system detects (e.g., while the first sharing indicator is displayed with the second appearance to indicate that the first application is not currently sharing content with another device) that the first application is sharing content with another device (e.g., the content of the first application window is being shared with another user or made public via the first application and/or via another application, such as a videoconferencing or other sharing application; or the first application is sharing content with another user and/or device). In some embodiments, in response to detecting that the first application is sharing content with another device, the computer system displays the first sharing indicator with the first appearance to indicate that the first application is sharing content with another device. In some embodiments, the computer system displays an indication that the computer system is sharing the first application window, and/or displays indications of the other users (e.g., avatars, initials, and/or other identifiers) that are accessing (or provided with access to) the shared first application window. In some embodiments, the sharing indication is updated in real-time to indicate which users are currently participating in the shared session of the first application window. For example, as described with reference to FIG. 7Z, sharing indication 719 includes avatars or other user identifiers indicating that users that have access to the shared application window 702. Determining whether an application window is being shared across multiple devices, and displaying a sharing indicator that indicates the users of the devices that are viewing the shared content of the application window improves security and privacy of the system by providing real-time information about the who is accessing content shared by the computer system and provides improved visual feedback to the user about the other users of the devices accessing the application window without requiring user input.

In some embodiments, the first application window is displayed as a two-dimensional object in a three-dimensional environment (e.g., a passthrough view of the physical environment, an AR environment, an XR environment, or a virtual three-dimensional environment), and a respective application control affordance of the set of application control affordances associated with the first application (e.g., the first title bar, the one or more privacy indicators, the sharing indicator, or other application control affordances) is displayed on a first side of the two-dimensional object (e.g., above the top edge of the two-dimensional application window, or left of the left edge of the two-dimensional application window). In some embodiments, the computer system displays, via the first display generation component, a first three-dimensional object (e.g., a three-dimensional model of a physical object, a viewport into a three-dimensional XR experience, a three-dimensional user interface object, or other objects associated with the first application or another application or environment) and a second set of application control affordances that is associated with the first three-dimensional object, in the three-dimensional environment, wherein: the first three-dimensional object is associated with a third application (e.g., same as the first application, or different from the first application), the second set of application control affordances (e.g., including a third title bar and/or a set of other application control affordances described herein with respect to the first application window and the second application window) that is associated with the first three-dimensional object is separate from the first three-dimensional object on a second side (e.g., bottom side, or right side) of the first three-dimensional object (e.g., the third title bar displays a respective identifier of the first three-dimensional object (e.g., a name or icon of the first three-dimensional object), the privacy indicator indicates whether the third application is accessing the sensors, and/or the sharing indicator indicates whether the third application is sharing content with another device), the respective application control affordance of the set of application control affordances associated with the first application (e.g., including the first title bar, the first set of privacy indicators, and/or the first sharing indicator) is offset from the first side of the two-dimensional object in a first direction, and the second set of application control affordances (e.g., including the third title bar and/or a set of other application control affordances associated with the third application and/or the third application window) is offset from the second side of the first three-dimensional object in a second direction different from the first direction. In some embodiments, the respective side from which the title bar is offset away from the application object (e.g., a two-dimensional object, or a three-dimensional object) is determined based at least in part on whether the application object is displayed as a two-dimensional or a three-dimensional application object. For example, for application window 702, title bar 716 and/or other control affordances (e.g., close affordance 7030, privacy indicator 718-1, or another control) are displayed at first respective positions relative to application window 702, which is a two-dimensional object, and for virtual object 7028, a title bar, and/or other control affordance are displayed at different respective positions relative to virtual object 7028 (e.g., close affordance 717 is optionally displayed below virtual object 7028). Displaying a title bar of a two-dimensional object, such as an application window, on a first side of the two-dimensional object and displaying a title bar for a three-dimensional object on a different side of the three-dimensional object provides improved visual feedback to the user that differentiates between two-dimensional and three-dimensional objects.

In some embodiments, the computer system concurrently displays, via the first display generation component, the first application window and a third application control affordance (and optionally concurrently displaying one or more other application control affordances (e.g., the first title bar, the first set of privacy indicators, and/or the first sharing indicator)) associated with the first application window, wherein the third application control affordance is separate from the first application window and on a third side of the first application window (e.g., the third side is the same as the first side, or different from the first side) (e.g., the third application control affordance is an affordance for opening a new tab of the first application window). In some embodiments, the third application control affordance is a distinct control element that is displayed next to (e.g., to the left and/or right of) the first title bar of the first application window. In some embodiments, while displaying the first application window with the third application control affordance, the computer system detects, via the one or more input devices, a user input (e.g., a user's gaze directed to the third application control affordance, an air tap or air pinch gesture directed to the third application control affordance, and/or a selection input provided by a touch gesture or cursor click) directed to the third application control affordance; and in response to detecting the user input directed to the third application control affordance associated with the first application window, in accordance with a determination that the user input meets selection criteria with respect to the third application control affordance, displays a third application window (e.g., a new window of the first application, or a new window of a selection user interface for selecting an application, or a new window of a different application) (e.g., at a location of the first application window, replacing the first application window or pushing the first application window to the back of the third application window). In some embodiments, the third application window includes content of the first application window and additional new window content in separate display areas (e.g., tabbed pages, or tabbed display areas) that are selectively displayed in the third application window by selection of their respective tabs or title bars. In some embodiments, the first title bar of the first application window is displayed adjacent to the title bar of the third application window, and selection of the first title bar causes the first application window to be redisplayed and causing the third window to be pushed behind the first application window. In some embodiments, the title bars of the hidden window(s) are displayed with a smaller size than the title bar of the top layer window. For example, in FIG. 7Z, in some embodiments, control option 721 is a control for adding a new tab and/or window, and in response to detecting a user input selecting control option 721, a new application window is displayed and/or new content is displayed in application window 702. Displaying a control for opening an additional tab for an application window, reduces the number of inputs required to open a new tab by enabling the user to select the control for opening the additional tab without requiring the user to navigate through complex menu hierarchies.

In some embodiments, in response to detecting that the user's attention is directed to the first title bar and in accordance with the determination that the user's attention meets the first criteria with respect to the first title bar, the computer system expands the first title bar to display an application icon of the first application associated with the first application window (e.g., wherein the application icon was not displayed prior to expanding the first title bar). In some embodiments, when the first application window is replaced by the third application window, its title bar is reduced while the first application window stays underneath the third application window; and in response to detecting the user's attention on the reduced first title bar of the first application window (e.g., displayed adjacent to the title bar of the third application window), the computer system expands the reduced first title bar to show the application icon of the first application and/or the identifier of the first application window. If a user's input selecting the expanded title bar of the first application window, the first application window is brought to the foreground with its full set of application control affordances (e.g., the first title bar, the privacy indicators, and the sharing indicator for the first application window), while the title bar of the third application window is reduced into a reduced title bar that does not include an application icon or identifier for its corresponding application. For example, in FIG. 7AA, expanded title bar 716-2 optionally includes an application icon that represents the application associated with content displayed in application window 702. Displaying an application icon to indicate the application displaying the content in the title bar of the application window provides improved visual feedback to the user and enables the user to view information about the application without requiring additional user input.

In some embodiments, the computer system concurrently displays the first application window with the first title bar separate from (e.g., changes size and/or location separately from the first application window and/or is spaced apart from the first application window by a gap (e.g., content (e.g., passthrough content, and/or other objects and windows in the environment) behind the first application window and the first title bar is visible to the user through the gap)) the first application window and with one or more selectable controls separate from (e.g., separated by a gap from) the first application window and the title bar, on the first side of the first application window (e.g., the selectable controls are displayed proximate to the first title bar). In some embodiments, the selectable controls change sizes and/or locations separately from the first application window and the first title bar, and/or are spaced apart from the first application window by first gaps and are spaced apart from the first title bar by second gaps (e.g., content (e.g., passthrough content, and/or other objects and windows in the environment) behind the first application window, the first title bar, and the selectable controls is visible to the user through the first and second gaps)). In some embodiments, the one or more selectable controls are displayed next to (e.g., to the right and/or left of) the first title bar on the first side (e.g., on top of) the first application window. In some embodiments, the one or more selectable controls are buttons for controlling binary compatibility applications related to the first application window (e.g., controls for enabling or disabling a gaze cursor, toggling a portrait and landscape mode, or other binary functions associated with the computer system, the first application, and/or the first application window). For example, as illustrated in FIG. 7Z, additional control options are displayed to the right and/or left of title bar 716. Displaying user-selectable controls for performing operations for an application in the title bar of the application window of the application, enables the user to quickly perform a variety of operations without requiring the user to navigate through complex menu hierarchies.

In some embodiments, the one or more selectable controls displayed separate from the first application window and the first title bar, on the first side of the first application window include a first selectable control for enabling or disabling display of a gaze cursor (e.g., for the first application window, for the first application, and/or for the entire operating environment) (e.g., the first selectable control is a toggle control that causes the computer system to display or cease to display, via the first display generation component, a cursor indicating a position of a detected gaze of the user). For example, as described with reference to FIG. 7Z, an option to enable and/or disable a gaze cursor is provided. Displaying, near the title bar of the application window, a user-selectable control for enabling a gaze cursor that, when displayed, indicates a position of the user's detected gaze for the application window, enables the user to quickly turn on the gaze cursor without requiring the user to navigate through complex menu hierarchies.

In some embodiments, the one or more selectable controls displayed separate from the first application window and the title bar, on the first side of the first application window, include a second selectable control for changing an orientation mode of the first application window between a portrait mode and a landscape mode (e.g., the second selectable control is toggled on and/or off in response to detecting a user input selecting the control, and in response to toggling the control on and/or off, an orientation of the first application window is changed (e.g., from portrait to landscape, or vice-versa).). For example, as described with reference to FIG. 7Z, an option to switch between a portrait and/or a landscape orientation of application window 702 is provided. Displaying, near the title bar of the application window, a user-selectable control for toggling between portrait mode and landscape mode of the application window, enables the user to quickly change an orientation of the application window without requiring the user to navigate through complex menu hierarchies.

In some embodiments, the one or more selectable controls displayed separate from the first application window and the first title bar, on the first side of the first application window, includes a set of third selectable controls (e.g., a set of tabs for different sets of window content that can be selectively displayed at the location of the first application window (e.g., in the first application window)), wherein a respective third selectable control of the set of third selectable controls corresponds to a respective set of window content of the first application (e.g., the third selectable controls correspond to different tabs of window content for the first application). In some embodiments, a respective third selectable control is a respective tab that corresponds to respective content for the first application, such as respective instances or windows of the same first application. In some embodiments, the one or more tabs correspond to a plurality of different applications. In some embodiments, a respective tab corresponds to a respective title bar (e.g., is a reduced version of the title bar) for respective window content for the first application when the window content is not the currently displayed window content at the location of the first application window. In some embodiments, the computer system detects, via the one or more input devices, a first user input (e.g., a direct air gesture such as an air tap or air pinch at a location with which the user is interacting, an indirect air gesture such as an air pinch while attention of the user or gaze of the user is directed toward at a location with which the user is interacting a gaze input, a tap input, a pinch gesture, or other selection input) directed to a respective one of the first title bar and the respective third selectable control of the set of third selectable controls (e.g., a respective tab of the set of tabs; and/or reduced window title bars for hidden window content that can be displayed at the location of the first application window). In some embodiments, in response to detecting that the first user input is directed to the respective one of the first title bar and the respective third selectable control of the set of third selectable controls, the computer system: in accordance with a determination that the first user input meets activation criteria with respect to the first title bar, expands the first title bar (e.g., without expanding the respective third selectable control) to display one or more selectable controls (e.g., controls for interacting with the first application corresponding to the first application window, wherein the one or more selectable controls were not displayed prior to expanding the title bar); and in accordance with a determination that the first user input meets the activation criteria with respect to the respective third selectable control of the set of third selectable controls (e.g., a respective tab of the set of tabs; and/or reduced window title bars for hidden window content that can be displayed at the location of the first application window), displays (e.g., in the first application window, and/or at a location of the first application window) the respective set of window content of the first application that corresponds to the respective third selectable control (and ceasing display of the content displayed in the first application window before detecting the first user input, and without expanding the first title bar or the other third selectable controls in the set of third selectable controls). For example, as described with reference to FIGS. 7S, in some embodiments, a tab bar is displayed and the user is enabled to switch between content associated with a respective tab by selecting the tab in the tab bar. For example, title bar 716 in FIG. 7S is displayed next to, or within, a tab bar that includes indications of additional content that may be displayed in application window 702. In some embodiments, the user is enabled to select (e.g., via an air gesture) a respective tab in the tab bar to update the content displayed in application window 702. Determining whether the user is gazing at the title bar or at another tab, and based on where the user is gazing, expanding the title bar to display additional user-selectable controls or switching to another tab enables the user to view additional control options for the application window or to switch to a new tab without displaying additional controls.

In some embodiments, in response to detecting that the first user input is directed to the respective one of the first title bar and a respective third selectable control of the set of third selectable controls: in accordance with a determination that the first user input meets the activation criteria with respect to the respective third selectable control of the set of third selectable controls (e.g., a respective tab of the set of tabs; and/or reduced window title bars for hidden window content that can be displayed at the location of the first application window), the computer system changes a visual appearance of the respective third selectable control (e.g., the selected tab) (e.g., showing an application icon for an application associated with the newly displayed window content in the respective third selectable control, changing a graphical indicator (e.g., a chevron, or other mark) in the respective third selectable control, changing the luminance and/or color of the respective third selectable control) to indicate the respective third selectable control is selected (and, optionally, changing the visual appearance of the first title bar (e.g., reducing it to a respective tab) to indicate the application content corresponding to the first title bar is no longer displayed in the first application window). For example, as described with reference to FIG. 7S, the currently selected tab in the tab bar is displayed with a visual appearance that is different from the other tabs in the tab bar. Automatically updating display of tabs to visually distinguish the currently selected tab provides visual feedback about a state of the device.

In some embodiments, while displaying the respective third selectable control (e.g., the selected tab, which has expanded into a title bar for the window content) and displaying (e.g., in the first application window, and/or at a location of the first application window) the respective set of window content of the first application that corresponds to the respective third selectable control, the computer system detects that the user's attention is directed to the respective third selectable control; and in response to detecting that the user's attention is directed to the respective third selectable control, the computer system expands the respective third selectable control (e.g., in a direction away from the first application window, and/or in a predetermined direction (e.g., downward, upward, to the left, to the right, or in another direction)) to display one or more selectable controls (e.g., for interacting with an application corresponding to the newly displayed window content, wherein the one or more selectable controls were not displayed prior to expanding the respective third selectable control). In some embodiments, the respective third selectable control is an expanded tab that is converted into a title bar, and the title bar is further expanded to show the one or more selectable controls for interacting with the newly displayed window content and/or the window displaying the window content (e.g., the first application window, or a new window)). For example, as described with reference to FIG. 7S, in some embodiments, the active tab becomes the current title bar that is expanded in response to detecting the user's gaze directed to the active tab. For example, after the user has switched tabs to replace the content of App 1 displayed in application window 702 to display other content (e.g., of App 1 or of another application) in application window 702, title bar 716 is updated to display information about the current content displayed in application window 702, and in response to the user gazing at the updated title bar 716 (e.g., for the newly selected tab), the title bar 716 expands into title bar 716-2 (FIG. 7AA). In some embodiments, the one or more controls displayed in title bar 716-2 for the newly selected tab are optionally different than the one or more controls displayed in the expanded title bar 716-2 for the previous tab (e.g., App 1). Displaying a title bar for another tab of the application window, including expanding the title bar for the currently selected tab in response to detecting a user input directed to the title bar for the selected tab, enables the user to quickly access additional controls and reduces the number of inputs required to perform operations for the selected tab.

In some embodiments, while displaying the first application window with the first title bar and the set of third selectable controls (e.g., the tabs for different sets of window content), the computer system detects that the user's attention is directed to a location away from the first application window, the first title bar, and the set of third selectable controls (e.g., detecting that the user is not gazing at the first application window, the first title bar, or the one or more tabs); and in response to detecting that the user's attention is directed to a location away from the first application window, the first title bar, and the set of third selectable controls, the computer system: visually deemphasizes (e.g., by increasing a translucency of, darkening, and/or blurring) display of the first title bar and the set of third selectable controls (and, optionally, the first application window) relative to content that is displayed outside of the first application window, the first title bar, and the set of third selectable controls, as described with reference to FIG. 7S and FIG. 7AB. For example, in FIG. 7AB, in response to application window 720 being opened, application window 702 and its associated controls, including title bar 716 and optionally grabber 706-1, are visually deemphasized (e.g., pushed back, dimmed, blurred, or otherwise displayed with less prominence) relative to application window 720 and relative to the three-dimensional environment. In some embodiments, privacy indicator 718-1 is optionally not deemphasized, or deemphasized less than application window 702 and its associated controls. In some embodiments, the content outside the first application window, the first title bar, and the set of third selectable controls, is not visually deemphasized or deemphasized to a lesser degree, while the first title bar, the set of third selectable controls, and/or the first application window are visually deemphasized by increasing a translucency, reducing a luminance, and/or virtually pushing back a position of the first application window to appear farther away from the user.

Detecting when the user looks away from an application window, and automatically updating the title bar and tabs for the application window to be visually deemphasized relative to the three-dimensional environment, reduces the number of inputs needed to deemphasize the application window while the user is not directing attention to the application window and provides visual feedback about a state of the device.

In some embodiments, while displaying the first application window with the first title bar and the set of third selectable controls separate from the first application window, the computer system detects that the first application is accessing (e.g., collecting data or otherwise using) one or more sensors of the computer system (e.g., one or more cameras, one or more microphones, and/or a location detector (e.g., using GPS or WiFi/network data)); and in response to detecting that the first application is accessing one or more sensors of the computer system, displays an indication (e.g., a privacy indicator, as described with reference to method 1100) that the first application is accessing the one or more sensors of the computer system, with a first spatial relationship to the first application window and a second spatial relationship to (e.g., proximate to, next to, and/or within a predefined distance of) the set of third selectable controls of the first application window (e.g., right of the tabs, separated from the first title bar by the set of tabs). For example, as described with reference to FIGS. 7T, privacy indicator 718-1 is displayed for application window 702. Determining that an application is accessing sensitive user data and displaying a privacy indicator near the title bar and/or tab indications to indicate that the application is accessing sensitive user data improves security and privacy of the system by providing real-time information about the specific application window that is accessing the sensitive user data.

In some embodiments, aspects/operations of methods 800, 900, 1100, 1200, 1300, 1400, 1500, 1600, 1800 and 20000 may be interchanged, substituted, and/or added between these methods. For example, the first application window in the method 1000 has characteristics of the first user interface object (e.g., application window or virtual object) in the method 900. For brevity, these details are not repeated here.

FIG. 11 is a flow diagram of an exemplary method 1100 for displaying privacy indicators, in accordance with some embodiments. In some embodiments, method 1100 is performed at a computer system (e.g., computer system 101 in FIG. 1) including a display generation component (e.g., display generation component 120 in FIGS. 1A, 3, and 4 or display generation component 7100) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1100 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1100 are, optionally, combined and/or the order of some operations is, optionally, changed.

Method 1100 is a method for determining if an application is accessing sensitive user data and displaying a privacy indicator near an application window of the application that is accessing sensitive user data, even as the application window is repositioned to be displayed at a different location in a display area, improves security and privacy of the system by providing real-time information about the specific application window that is accessing the sensitive user data and maintaining the information as the application window moves within the display area.

In some embodiments, method 1100 is performed at a computer system that is in communication with a first display generation component (e.g., a first display generation component of a two-sided display generation component, a heads-up display, a head-mounted display (HMD), a display, a touchscreen, a projector, a standalone display, and/or a display that is enclosed in the same housing as another display generation component of the same type or a different type) having a first display area (e.g., corresponding to a three-dimensional environment and/or corresponding to a screen area) and one or more input devices (e.g., cameras, controllers, touch-sensitive surfaces, joysticks, buttons, gloves, watches, motion sensors, and/or orientation sensors). In some embodiments, the first display generation component is a display component facing the user and provides an XR experience to the user. In some embodiments, the first display generation component includes two or more display components (e.g., one set for each eye) that display slightly different images to form a stereoscopic view of the three-dimensional environment. In some embodiments, the first display generation component and a second display generation component form a two-sided display device (e.g., a two-sided HMD) that displays a first user interface on a first side corresponding to the first display generation component, and a second user interface on the second side corresponding to the second display generation component. In some embodiments, the second display generation component is a display component facing away from the user and toward an external environment of the user and optionally provides status information related to the first display generation component (e.g., displayed content and/or operational state) and/or the user (e.g., movement of the user's eyes, and/or attention state of the user) to other users in the external environment. In some embodiments, the computing system is an integrated device with one or more processors and memory enclosed in the same housing as the first and the second display generation components and at least some of the one or more input devices. In some embodiments, the computing system includes a computing component (e.g., a server, a mobile electronic device such as a smart phone or tablet device, a wearable device such as a watch, wristband, or earphones, a desktop computer, or a laptop computer) that includes one or more processors and memory that is separate from the display generation component(s) and/or the one or more input devices. In some embodiments, the display generation component(s) and the one or more input devices are integrated and enclosed in the same housing.

The computer system displays (1102), via the first display generation component, a first application window of a first application at a first window position in the first display area. For example, in FIGS. 7T, application window 702 is displayed.

In accordance with a determination that the first application is accessing (e.g., collecting data or otherwise using) one or more sensors of the computer system (e.g., one or more cameras, one or more microphones, and/or a location detector (e.g., using GPS or WiFi/network data)), the computer system displays (1104) a first indicator at a first indicator position in the first display area with a first spatial relationship to the first application window as an indication that the first application is accessing the one or more sensors of the computer system. In some embodiments, in accordance with a determination that the first application is not accessing one or more sensors of the computer system, the computer system forgoes displaying the first indicator (e.g., the first indicator is conditionally displayed at a predefined location associated with the first application (e.g., at or near the first application window of the first application, next to a title bar of an application window of the first application, or with other spatial relationships to a window or representation of the first application) while the one or more sensors are currently in use or was recently used by the first application). For example, in FIGS. 7T, privacy indicator 718-1 is displayed for application window 702 in accordance with a determination that the application associated with application window 702 is accessing sensitive data using one or more sensors of the computer system.

While displaying the first indicator at the first indicator position in the first display area with the first spatial relationship to the first application window, the computer system detects (1106) a first user input that corresponds to a request to move the first application window of the first application to a second window position in the first display area, the second window position being different from the first window position. In some embodiments, the first user input is a pinch and drag gesture detected in conjunction with a gaze input directed to the first application window. For example, as described with reference to FIGS. 7X-7Z, application window 702 is moved from a respective position to another position in response to a user input directed to grabber 706-4.

In response to detecting the first user input that corresponds to the request to move the first application window of the first application from the first window position to the second window position in the first display area (1108): the computer system displays (1110) the first application window of the first application at the second window position in the first display area (e.g., moves the first application window in accordance with the movement of the first user input; and/or ceasing to display the first application window at the first window position and displaying it at the second window position at the end of the first user input); and in accordance with a determination that the first application is accessing (e.g., currently collecting data or otherwise using, or has collected or used in a recent time frame (e.g., within the current hour, day, or other time period)) the one or more sensors of the computer system (e.g., one or more cameras, one or more microphones, and/or a location detector (e.g., using GPS or WiFi/network data)), the computer system displays (1112) the first indicator at a second indicator position in the first display area that is different from the first indicator position in the first display area, wherein the second indicator position in the first display area has the first spatial relationship to the first application window displayed at the second window position (and ceasing to display the first indicator at the first indicator position in the first display area). In some embodiments, in accordance with a determination that the first application is not (e.g., is no longer) accessing the one or more sensors of the computer system, the computer system ceases to display the first indicator and does not display the first indicator at the second indicator position that has the first spatial relationship with the first application window displayed at the second window position. For example, in FIG. 7Z, after application window 702 has moved position, privacy indicator 718-1 continues to be displayed at a same relative position to application window 702.

In some embodiments, displaying the first indicator at the first indicator position in the first display area with the first spatial relationship to the first application window includes displaying the first indicator as separate from (e.g., with a nonzero distance between) the first application window. For example, in FIGS. 7T, privacy indicator 718-1 is displayed as a distinct user interface object that is separate from application 702. Determining that an application is accessing sensitive user data and displaying a privacy indicator near an application window of the application that is accessing sensitive user data improves security and privacy of the system by providing real-time information about the specific application window that is accessing the sensitive user data and provides improved visual feedback to the user by displaying the indicator without requiring the user to provide user inputs to view privacy information.

In some embodiments, the computer system displays, via the first display generation component, a second application window of a second application at a third window position in the first display area and in accordance with a determination that the second application is accessing (e.g., collecting data or otherwise using) the one or more sensors of the computer system (e.g., one or more cameras, one or more microphones, and/or a location detector (e.g., using GPS or WiFi/network data)), the computer system displays a second indicator at a third indicator position in the first display area with a second spatial relationship to the second application window as an indication that the second application is accessing the one or more sensors of the computer system. In some embodiments, the first spatial relationship and the second spatial relationship are the same (e.g., same relative positions and distances between the indicator and its corresponding application window). For example, the first indicator and the second indicator are displayed at a same relative position to their respective application windows. In some embodiments, the respective indicator is displayed at a relative position to the respective application window based in part on the properties of the application window (e.g., a type of application associated with the application window and/or a size of the application window).) In some embodiments, in accordance with a determination that the second application is not (e.g., is no longer) accessing the one or more sensors of the computer system, the computer system ceases to display the second indicator and does not display the second indicator at the third indicator position that has the second spatial relationship with the second application window displayed at the third window position. For example, as illustrated in FIG. 7AB application window 720 is displayed with privacy indicator 724-1 while application window 702 is displayed with privacy indicator 718-1. Determining that one or more applications are accessing sensitive user data and displaying a privacy indicator for each respective application window of the applications that are accessing sensitive user data improves security and privacy of the system by providing real-time information about which application windows are accessing the sensitive user data and provides improved visual feedback to the user by displaying the indicator near the respective application window for the user to easily identify which application is accessing the sensitive user data.

In some embodiments, displaying the first indicator at the first indicator position in the first display area with the first spatial relationship to the first application window as an indication that the first application is accessing the one or more sensors of the computer system includes: in accordance with a determination that the first application is accessing (e.g., collecting data or otherwise using) a first sensor of the one or more sensors of the computer system, displaying the first indicator with a first appearance (e.g., with a first color, a first size, a first indicator shape, first text description, and/or a first sensor icon); and in accordance with a determination that the first application is accessing (e.g., collecting data or otherwise using) a second sensor of the one or more sensors, different from the first sensor, of the computer system, displaying the first indicator with a second appearance (e.g., with a second color, a second size, a second indicator shape, second text description, and/or a second sensor icon) different from the first appearance. For example, the first indicator changes in shape and/or color to indicate the sensor(s) that are currently being accessed by the first application have changed. In some embodiments, a first color of the first indicator represents a first sensor, and a second color of the first indicator represents a second senor. In some embodiments, the first indicator includes multiple sub-portions (e.g., multiple icons/colors in a row, in a pie-shaped composite icon with respective "slices" corresponding to respective active sensors), each corresponding to a respective sensor that is being accessed by the first application; and/or a composite of the different portions form the overall appearance of the first indicator. For example, as described with reference to FIGS. 7T, privacy indicator 718-1 is displayed with different visual appearance, such as a different color, depending on the type of sensor that is being accessed by the application associated with application window 702. Automatically displaying the privacy indicator with a different visual appearance, such as different colors, based on which sensor(s) the application is accessing improves security and privacy of the system by providing real-time information about the type of sensitive data being accessed by an application and provides improved visual feedback to the user by displaying the privacy indicator such that the user can easily identify the type of sensitive data being used by the application.

In some embodiments, displaying the first indicator at the first indicator position in the first display area with the first spatial relationship to the first application window as an indication that the first application is accessing the one or more sensors of the computer system includes: while the first application is accessing a first sensor of the one or more sensors of the computer system, displaying the first indicator with a first appearance; detecting that the first application is accessing a second sensor, different from the first sensor, of the computer system; in response to detecting that the first application is accessing the second sensor of the one or more sensors, updating display of the first indicator from the first appearance to display of the first indicator with a second appearance different from the first appearance. For example, in some embodiments, when the first application is initially accessing a microphone of the computer system, the indicator is displayed with an orange color. The first application is then accessing a camera of the computer system (in addition to, or instead of the microphone), and the indicator is displayed with a red color (e.g., in addition to the red color, or instead of the red color). In some embodiments, the types of sensors are ranked such that a highest-ranking sensor (e.g., representing a most-sensitive data type) is represented by the appearance of the first indicator. For example, if both the microphone and camera are being used, then the first indicator is displayed with a color that identifies the camera is being used (e.g., the red color, or another indicator appearance that is associated with the camera use), as described with reference to privacy indicator 718-1 in FIG. 7T. Automatically updating the privacy indicator to be displayed with a different visual appearance in response to determining that the application is accessing a different and/or additional sensor improves security and privacy of the system by providing real-time information about the type of sensitive data being accessed by an application and provides improved visual feedback to the user by displaying the privacy indicator with a visual appearance such that the user can easily identify the type of sensitive data being used by the application.

In some embodiments, while displaying the first indicator at a respective indicator position (e.g., the first indicator position, the second indicator position, or another indicator position that has the first spatial relationship with the application window of the first application displayed at a current window position of the application window) in the first display area with the first spatial relationship to the first application window, the computer system detects that the first application is not (e.g., is no longer or has stopped) accessing the one or more sensors of the computer system; and in response to detecting that the first application is not accessing the one or more sensors of the computer system, ceases display of the first indicator at the respective indicator position in the first display area with the first spatial relationship to the first application window. For example, once a respective application stops accessing the one or more sensors, the respective indicator displayed with the first spatial relationship to a respective application window of the respective application is no longer displayed. For example, as described with reference to FIGS. 7AD, in accordance with a determination that the application associated with application window 720 is no longer accessing a sensor that collects sensitive data, privacy indicator 724-1 ceases to be displayed for application window 720. Automatically ceasing display of the privacy indicator in response to determining that the application is no longer accessing sensitive user data using one or more sensors of the computer system improves security and privacy of the system by providing real-time information about whether or not sensitive data is currently being accessed by an application.

In some embodiments, while displaying the first indicator at a respective indicator position in the first display area with the first spatial relationship to the first application window, the computer system detects a gaze input directed to the first indicator at the respective indicator position in the first display area with the first spatial relationship to the first application window; and in response to detecting the gaze input directed to the first indicator, expands the first indicator (e.g., displaying more information related to the sensor access, displaying additional user interface objects associated with the sensor access, and/or increasing the size of the first indicator). For example, as described with reference to FIG. 7V, in response to the user's attention 710-18 directed to privacy indicator 718-1, privacy indicator 718-1 expands into privacy indicator 718-2. Allowing the user to expand a privacy indicator to view additional information about the privacy indicator improves security and privacy of the system by providing more detailed information about the sensitive data being accessed by an application and provides improved visual feedback to the user by displaying such that the user can easily identify the type of sensitive data being used by the application.

In some embodiments, in response to detecting the gaze input directed to the first indicator, the computer system displays information indicating the one or more sensors that are being accessed by the first application (e.g., in the expanded first indicator) after the first indicator has been expanded. For example, the first indicator is expanded from a small colored dot to a platter to display information about which of the one or more sensors are currently being accessed by the first application (e.g., a listing of icons identifying the sensors, and/or textual description of the sensor access), as described with reference to FIG. 7Z. Allowing the user to gaze at a privacy indicator to cause the computer system to display additional information about the privacy indicator improves security and privacy of the system by providing more detailed information about the sensitive data being accessed by an application and provides improved visual feedback to the user by displaying such that the user can easily identify the type of sensitive data being used by the application.

In some embodiments, the computer system displays, via the first display generation component, a first view of a three-dimensional environment (e.g., a passthrough view of the physical environment, an AR view of the physical environment, an XR environment that includes a representation of the physical environment), wherein displaying the first indicator at a respective window position that has the first spatial relationship with the first application window of the first application in the first display area includes: displaying, via the first display generation component, the first application window of the first application and the first indicator in the first view of the three-dimensional environment, wherein the first application window and the first indicator have the first spatial relationship in the three-dimensional environment. For example, application window 702 and privacy indicator 718-1 are displayed in a three-dimensional environment. Displaying a privacy indicator in an AR/VR environment improves security and privacy of the system by providing more detailed information about the sensitive data being accessed by an application while the user is experiencing the AR/VR environment.

In some embodiments, the computer system displays a title bar (e.g., a title bar is a user interface object that includes a name and/or an icon of the content and application type associated with the application window) of the first application window (optionally, the title bar is displayed separate from the first application window on a first side of the first application window and displays a respective identifier of the first application window (e.g., as described above with reference to method 1000)), wherein the first indicator that is displayed at a respective indicator position in the first display area with the first spatial relationship to the first application window has a second spatial relationship to the title bar. In some embodiments, the first indicator is above the application window and next to (e.g., to the right or left of) the title bar. For example, in FIGS. 7T, privacy indicator 718-1 is displayed next to title bar 716. Displaying information about the content of an application in a title bar that is displayed near a privacy indicator improves security and privacy of the system by notifying the user that a particular application is using the sensitive data.

In some embodiments, while displaying the first indicator at a respective indicator position in the first display area with the first spatial relationship to the first application window, the computer system detects, via the one or more input devices, that a user's attention is directed to a portion of the first display area outside of the first application window (e.g., the user's attention has moved from the first application window to another window or to the environment; the user's gaze has moved from the first application window or the first indicator to a location outside of the first application window and its associated user interface objects (e.g., its title bar, the first indicator, and/or other subsidiary user interface objects displayed attached to or adjacent to the first application window); and/or the user is providing inputs to another user interface object outside of the first application window and its associated subsidiary user interface objects); and in response to detecting that the user's attention is directed to the portion of the first display area outside of the first application window, the computer system visually emphasizes the first indicator relative to the first application window in the first display area. In some embodiments, visually emphasizing the first indicator relative to the first application window includes: reducing a visual prominence of the first application window in the first display area (e.g., changing values of one or more visual properties of the first application window by a first amount (e.g., shrinking, darkening, blurring, and/or making it more translucent or less saturated, or displaying a reduced representation thereof (e.g., ceasing to display the window content and keeping only the title bar or application icon)), to indicate that the attention of the user has shifted away from the first application window, and/or to indicate that the first application window is no longer an active window of the operating environment); and maintaining or increasing a visual prominence of the first indicator in the first display area (e.g., changing values of one or more visual properties of the first indicator by a second amount that is different than the first amount (e.g., enlarging, brightening, making it more saturated or vibrant, or otherwise increasing the visibility of the first indicator)). In some embodiments, visually emphasizing the first indicator relative to the first application window includes: maintaining the visual prominence of the first application window in the first display area; and increasing the visual prominence of the first indicator in the first display area (e.g., changing values of one or more visual properties of the first indicator (e.g., enlarging, brightening, making it more saturated or vibrant, or otherwise increasing the visibility of the first indicator)). In some embodiments, visually emphasizing the first indicator relative to the first application window includes: increasing the visual prominence of the first application window in the first display area by a first amount; and increasing the visual prominence of the first indicator in the first display area by a second amount that is greater than the first amount. In some embodiments, visually emphasizing the first indicator relative to the first application window includes: decreasing the visual prominence of the first application window in the first display area by a third amount; and decreasing the visual prominence of the first indicator in the first display area by a fourth amount that is less than the third amount. For example, in FIGS. 7T, if the user's attention 710-17 is shifted away from application window 702, privacy indicator 718-1 would be displayed with more prominence relative to application window 702.

Emphasizing a privacy indicator relative to an application window while the user is not paying attention to the application window improves security and privacy of the system by continuing to provide an indication that sensitive data is being accessed by an application even while the user is not paying attention to the application.

In some embodiments, visually emphasizing the first indicator relative to the first application window in the first display area includes: reducing a measure of visibility for the first application window by a first amount (e.g., pushing the first application window back in the display area and/or decreasing a size of the first application window, and/or increasing a translucency of the first application window); and maintaining the measure of visibility for the first indicator or reducing the measure of visibility for the first indicator by a second amount that is less than the first amount. For example, in some embodiments, the application window is visually deemphasized (e.g., blurred, change in opacity, change in size) and the first indicator is maintained without visual deemphasis, or visually deemphasized to a lesser degree as compared to the first application window. For example, as described with reference to FIG. 7AB, in some embodiments, application window 702 is visually deemphasized without deemphasizing privacy indicator 718-1. Emphasizing a privacy indicator while visually deemphasizing an application window associated with the privacy indicator while the user is not paying attention to the application window improves security and privacy of the system by continuing to provide an indication that sensitive data is being accessed by an application even while the user is not paying attention to the application.

In some embodiments, while displaying the first indicator at the respective indicator position in the first display area with the first spatial relationship to the first application window, the computer system displays one or more user interface objects that are associated with the first application window (e.g., a window grabber, a closing affordance, a resize control, a title bar that includes an indication of the application content in the first application window and/or its associated application, and/or other window controls or subsidiary user interface objects of the application window); and in response to detecting that the user's attention is directed to the portion of the first display area outside of the first application window, visually emphasizes the first indicator relative to the one or more user interface objects that are associated with the first application window in the first display area. For example, in some embodiments, the first indicator is visually emphasized (or not visually deemphasized) relative to the other window controls and subsidiary user interface objects associated with the first application window (e.g., the title bar, closing affordance, and/or a grabber for moving and/or resizing the application window). In some embodiments, the other window controls and subsidiary user interface objects associated with the first application window are visually deemphasized (e.g., displayed with a smaller size, decreased luminance and vibrancy, and/or increased translucency) while the first indicator is maintained with the same visibility (e.g., with a same size and/or a same translucency, luminance, and/or vibrancy), when the user's attention shifts away from the first application window and its associated user interface objects. For example, as described with reference to FIG. 7AB, in some embodiments, application window 702 is visually deemphasized without deemphasizing privacy indicator 718-1. Forgoing visually deemphasizing a privacy indicator while visually deemphasizing other controls displayed for an application window associated with the privacy indicator while the user is not paying attention to the application window improves security and privacy of the system by continuing to provide an indication that sensitive data is being accessed by an application even while the user is not paying attention to the application or the other controls for the application.

In some embodiments, the computer system detects that a user's attention is directed to a first predetermined location (e.g., a top center portion, a left side portion, a corner portion, a bottom center portion, or another predetermined portion) in the first display area (e.g., the user's gaze is directed to a predetermined position in the first display area, a user touches on a touch-sensitive surface at a location that corresponds to the predetermined position in the first display area, or the user air-taps or pinches the predetermined position in a view of a three-dimensional environment displayed via the first display generation component) and, in response to detecting that the user's attention is directed to the first predetermined location in the first display area: in accordance with a determination that one or more applications are accessing the one or more sensors of the computer system (e.g., different applications accessing different sensors of the one or more sensors, different applications accessing the same ones of the one or more sensors, at least one application is accessing at least one of the one or more sensors), the computer system displaying a third indicator at a fourth indicator position in the first display area, as an indication that one or more applications are accessing the one or more sensors of the computer system. In some embodiments, the fourth indicator position in the first display area is proximate to and/or expands from the predetermined location. In some embodiments, the fourth indicator position is in a top center portion of the display area. In some embodiments, the fourth indicator position is locked to the user's body, head, or torso (e.g., and not locked to a three-dimensional environment corresponding to the display area). In some embodiments, the third indicator has a different appearance from the first indicator. In some embodiments, the third indicator has a different appearance depending on the type(s) of sensor(s) and/or sensor information that are being accessed by the one or more applications. In some embodiments, the third indicator is concurrently displayed with one or more other system user interface objects corresponding to one or more system functions (e.g., launching a home user interface, displaying a control panel user interface, displaying a notification interface, and/or displaying other system user interfaces or performing other system functions). For example, as described with reference to FIG. 7AE, in response to detecting the user's attention 710-28 is directed to a top-center portion of the three-dimensional environment, the computer system displays dot indicator 730 (FIG. 7AF). Enabling a user to gaze at a predetermined location to view a privacy indicator without requiring additional user input improves security and privacy of the system by providing real-time information about whether or not sensitive data is currently being accessed by an application and reduces a number of inputs required to view information about applications using sensitive data.

In some embodiments, while displaying the third indicator at the fourth indicator position in the first display area, the computer system detects that the user's attention meets first criteria with respect to the first predetermined location in the first display area, wherein the first criteria require that the user's attention has been directed to the first predetermined location for more than a threshold amount of time in order for the first criteria to be met (e.g., with less than a threshold amount of movement during the threshold amount of time); and in response to detecting that the user's attention meets the first criteria, displays a user interface element that includes one or more selectable controls for accessing system functions of the computer system (e.g., user interface objects for launching the home user interface, the control panel, a contact list, and/or a plurality of XR experiences or system environments) (e.g., at or adjacent to the respective indicator position of the third indicator), wherein, in accordance with the determination that the one or more applications are accessing the one or more sensors of the computer system, the third indicator is displayed concurrently with the user interface element (e.g., the third indicator displayed at the fourth indicator position has a third spatial relationship to the user interface element (e.g., the third indicator moves with the user interface element, in accordance with the movement of the viewpoint)). For example, as described with reference to FIG. 7AG, system control platter 734 is displayed. Enabling a user to gaze at a predetermined location to view a system control platter reduces a number of inputs required to perform system functions.

In some embodiments, the user interface element that includes the one or more selectable controls includes status information corresponding to the computer system that updates as a status of the computer system changes (e.g., the status information includes information about screen recording, screen mirroring, and/or an ongoing communication session (e.g., phone call, videoconference, or copresence session)). For example, system control platter 734 in FIG. 7AG includes status information of the computer system. Enabling a user to interact with controls in a system control platter that is dynamically displayed in response to the user gazing at a predetermined location to view a system control platter reduces a number of inputs required to perform system functions and view information about a current state of the computer system.

In some embodiments, displaying the third indicator at the fourth indicator position in the first display area includes: in accordance with a determination that the one or more applications are accessing a first sensor of the one or more sensors of the computer system (e.g., the first sensor is of a first sensor type, and not of a second sensor type), displaying the third indicator with a first appearance of the third indicator (e.g., with a first color, a first shape, a first textual description, a first icon, and/or other characteristics associated with the first sensor type) and in accordance with a determination that the one or more applications are accessing a second sensor (e.g., the second sensor is of a second sensor type, and not of the first sensor type) (e.g., a same application is accessing the first sensor and the second sensor; a same application is no longer accessing the first sensor and begins accessing the second sensor; or two or more applications are accessing a combination of one or more of the sensors), different from the first sensor, of the computer system, displaying the third indicator with a second appearance of the third indicator (e.g., with a second color, a second shape, a second textual description, a second icon, and/or other characteristics associated with the second sensor type) that is different from the first appearance of the third indicator. In some embodiments, the third indicator changes its appearance in accordance with a change of the set of sensors (e.g., a set of zero or more sensors) that is being accessed by the one or more applications, based on the set of sensors that is being accessed (e.g., a set of zero or more sensors). For example, the indication of one or more sensors 732 is displayed in FIG. 7AG. Displaying an indication of sensors that are currently being accessed by one or more applications in a system platter improves security and privacy of the system by providing real-time information about whether or not sensitive data is currently being accessed by an application and reduces a number of inputs required to view information about applications using sensitive data.

In some embodiments, while displaying the third indicator at the fourth indicator position in the first display area, the computer system detects that the user's attention meets second criteria with respect to the third indicator in the first display area, wherein the second criteria require that the user's attention has been directed to the third indicator for more than a first threshold amount of time in order for the second criteria to be met (e.g., with less than a threshold amount of movement during the first threshold amount of time). In some embodiments, in response to detecting that the user's attention meets the second criteria with respect to the third indicator in the first display area, the computer system: displays information related to the one or more sensors that are being accessed by the one or more applications (e.g., in an expanded representation of the third indicator, or in a newly displayed user interface object). In some embodiments, the information identifies the one or more sensors that are being accessed. In some embodiments, the information identifies the one or more applications that are using one or more sensors (and optionally which applications are accessing which sensors). For example, as described with reference to FIGS. 7AG-7AH, in response to the user's attention 710-30, expanded indicator 736 is displayed. Displaying an expanded indicator that identifies a list of any applications that are using sensors improves security and privacy of the system by informing the user about applications that are currently accessing sensitive data.

In some embodiments, displaying the information related to the one or more sensors that are being accessed by the one or more applications includes displaying a first indication of a first sensor of the one or more sensors that is being accessed by the one or more applications. In some embodiments, while displaying the first indication of the first sensor that is being accessed by the one or more applications in the first display area, the computer system detects that the user's attention meets third criteria with respect to the first indication of the first sensor in the first display area, wherein the third criteria require that the user's attention has been directed to the first indication of the first sensor for more than a second threshold amount of time in order for the third criteria to be met (e.g., with less than a threshold amount of movement during the second threshold amount of time). In some embodiments, in response to detecting that the user's attention meets the third criteria with respect to the first indication of the first sensor in the first display area, the computer system: displays information related to a first application of the one or more applications that is accessing the first sensor of the one or more sensors (e.g., in an expanded representation of the third indicator or the first indication of the first sensor, or in a newly displayed user interface object). In some embodiments, the information identifies the one or more applications that are using the first sensor. In some embodiments, if the user's attention is directed to a second indicator of a second sensor that is being accessed by the one or more applications, and the user's attention meets the third criteria with respect to the second indication of the second sensor, the computer system displays information related to the second application. In some embodiments, if more than one application is accessing the first sensor, the computer system displays the information related to all of the applications that are accessing the first sensor or the application that most actively or recently accessed the first sensor. For example, in FIG. 7AH, expanded indicator 736 includes an indication that the microphone is being accessed and displays the name of application(s) accessing the microphone. Displaying an expanded indicator that identifies a list of any applications that are using sensors, and the type of sensor, improves security and privacy of the system by informing the user about applications that are currently accessing sensitive data and the type of sensitive data being accessed.

In some embodiments, the computer system concurrently displays, via the first display generation component, a plurality of application windows in the first display area, wherein the plurality of application windows are associated with different applications of a plurality of applications; and in accordance with a determination that (e.g., in response to detecting that) two or more applications from the plurality of applications are accessing the one or more sensors of the computer system, the computer system displays respective indicators to identify the two or more applications of the plurality of applications, including: displaying respective indicators with a fourth spatial relationship to respective application windows of the two or more applications as an indication that the two or more applications are accessing the one or more sensors of the computer system. For example, in FIG. 7AC, application window 720 is displayed with privacy indicator 724-1 and application window 702 is displayed with privacy indicator 718-1. Determining that two or more applications are accessing sensitive user data and displaying a distinct privacy indicator for each respective application window of the applications that are accessing sensitive user data improves security and privacy of the system by providing real-time information about which application windows are accessing the sensitive user data and provides improved visual feedback to the user by displaying the indicator near the respective application window for the user to easily identify which application is accessing the sensitive user data.

In some embodiments, in accordance with a determination that (e.g., in response to detecting that) one or more respective applications from the plurality of applications are not accessing the one or more sensors of the computer system, the computer system forgoes displaying a respective indicator to identify the one or more respective applications of the plurality of applications that are not accessing the one or more sensors of the computer system (e.g., some windows for applications that are not accessing the sensors are displayed without the privacy indicators, while other windows for applications that are accessing the sensors are displayed with their respective privacy indicators). For example, in FIGS. 7AD, the application associated with application window 720 is no longer accessing a sensor, and privacy indicator 724-1 is no longer displayed, even while privacy indicator 718-1 continues to be displayed for application window 702. Determining a first application is no longer accessing sensitive user data, and in response, ceasing display of a privacy indicator for the first application while maintaining a privacy indicator for a second application that continues accessing sensitive user data improves security and privacy of the system by providing real-time information about which application windows are accessing the sensitive user data.

In some embodiments, aspects/operations of methods 800, 900, 1000, 1200, 1300, 1400, 1500, 1600, 1800 and 20000 may be interchanged, substituted, and/or added between these methods. For example, the first application window in the method 1100 has characteristics of the first user interface object (e.g., application window or virtual object) in the method 800. For brevity, these details are not repeated here.

FIG. 12 is a flow diagram of an exemplary method 1200 for displaying some user interface elements with values for a parameter constrained to a first range, and displaying other user interface elements with values for the parameter that are outside the first range, in accordance with some embodiments. In some embodiments, method 1200 is performed at a computer system (e.g., computer system 101 in FIG. 1) including a display generation component (e.g., display generation component 120 in FIGS. 1A, 3, and 4 or display generation component 7100) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1200 are, optionally, combined and/or the order of some operations is, optionally, changed.

Method 1200 is a method for displaying some user interface elements with values for a parameter constrained to a first range, and displaying other user interface elements with values for the parameter that are outside the first range. Displaying the first user interface object with an appearance in which the respective parameter has a value that is outside of a first range of values and displaying the second user interface object with an appearance in which the respective parameter has a value that is outside of the first range of values, concurrently with displaying first content that is constrained to having an appearance in which a respective parameter is within the first range of values, provides improved visual feedback to the user (e.g., improved visual feedback that visually emphasizes or deemphasizes the first user interface object and the second user interface object, as needed).

In some embodiments, method 1200 is performed at a computer system that is in communication with a first display generation component (e.g., a first display generation component of a two-sided display generation component, a heads-up display, a head-mounted display (HMD), a display, a touchscreen, a projector, a standalone display, and/or a display that is enclosed in the same housing as another display generation component of the same type or a different type) and one or more input devices (e.g., cameras, controllers, touch-sensitive surfaces, joysticks, buttons, gloves, watches, motion sensors, and/or orientation sensors). In some embodiments, the first display generation component is a display component facing the user and provides an XR experience to the user. In some embodiments, the first display generation component includes two or more display components (e.g., one set for each eye) that display slightly different images to form a stereoscopic view of the three-dimensional environment. In some embodiments, the first display generation component and a second display generation component form a two-sided display device (e.g., a two-sided HMD) that displays a first user interface on a first side corresponding to the first display generation component, and a second user interface on the second side corresponding to the second display generation component. In some embodiments, the second display generation component is a display component facing away from the user and toward an external environment of the user and optionally provides status information related to the first display generation component (e.g., displayed content and/or operational state) and/or the user (e.g., movement of the user's eyes, and/or attention state of the user) to other users in the external environment. In some embodiments, the computer system is an integrated device with one or more processors and memory enclosed in the same housing as the first and the second display generation components and at least some of the one or more input devices. In some embodiments, the computer system includes a computing component (e.g., a server, a mobile electronic device such as a smart phone or tablet device, a wearable device such as a watch, wristband, or earphones, a desktop computer, or a laptop computer) that includes one or more processors and memory that is separate from the display generation component(s) and/or the one or more input devices. In some embodiments, the display generation component(s) and the one or more input devices are integrated and enclosed in the same housing. In some embodiments, the first display generation component is an integrated display of a smart phone, a mobile device, a smartwatch, a tablet device, or a standalone display in communication with a computer system.

The computer system displays (1202) a user interface (e.g., a first view of a three-dimensional environment, a user interface of an application or the operating system that is displayed in a three-dimensional environment, a user interface that is displayed in a two-dimensional environment or pseudo-three-dimensional environment with limited spatial properties (e.g., spatial extent and/or spatial movement) in a third dimension), wherein displaying the user interface includes concurrently displaying a content region with first content, a first user interface object, and a second user interface object in the user interface. For example, FIG. 7AK shows a content region (e.g., the second content region 756), concurrently displayed with a first user interface object and a second user interface object (e.g., the close affordance 762, the first title region 744, the first grabber 752, the second title region 754, and/or the second grabber 758).

Respective content in the content region is constrained (1204) to having an appearance in which a respective parameter is within a first range of values (e.g., a first range of brightness values, a first range of colors, or a first range of luminance values for the colors). For example, in FIG. 7AK, the second content region 756 has a respective parameter that is within a first range of values $T_1$-$T_2$. The first user interface object is displayed (1206) with an appearance in which the respective parameter has a value (e.g., a first value) that is outside of the first range of values. In some embodiments, the appearance in which the respective parameter has a value (e.g., the first value) that is outside of the first range of values of the first user interface object is the same as, or different from, the appearance of the respective content in the content region. For example, in FIG. 7AK, the close affordance 762 has an appearance in which the respective parameter has a value above $T_2$, that is outside the first range of values $T_1$-$T_2$. The second user interface object is displayed (1208) with an appearance in which the respective parameter has a value (e.g., a second value is the same as the first value, or the second value is also outside the first range of values, but is different than the first value) that is outside of the first range of values. In some embodiments, the appearance in which the respective parameter has a value (e.g., the second value) that is outside of the first range of values of the second user interface object is the same as, or different from, the appearance of the first user interface object and/or is the same as, or different from, the appearance of the respective content in the content region. For example, the first grabber 752 in Figure AI, which is also displayed in FIG. 7AK, has a value above $T_2$, which is outside the first range of values $T_1$-$T_2$. In some embodiments, the first content is a passthrough view of the physical environment (e.g., the physical environment 7000 in FIG. 7A), content of a user interface window, content of a digital document, and/or media content within a media display area of a media player user interface. In some embodiments, the first user interface object and the second user interface object are instances of various system user interface objects, such as title bars of windows, buttons, controls, menu options, status indicators, and/or system-generated text. In some embodiments, system-level visual effects, such as indication of gaze location, and/or indication of a current state of a user interface control, is applied to the first user interface object and/or the second user interface object to change their appearances, in accordance with the location of the gaze on the first and/or second user interface objects and/or the state changes of the first and/or second user interface objects.

While concurrently displaying the first content, the first user interface object, and the second user interface object, the computer system updates (1210) the user interface (e.g., in response to detecting a change in external physical environment (e.g., movement of objects in the physical environment, changes in ambient lighting, and/or other changes that affect the appearance of the passthrough content), detection of user inputs (e.g., input that causes changes in the appearance of the user interface objects, and/or display of additional user interface objects), detection of internal device events (e.g., generation of alerts, arrival of new communications, and/or other internal events that cause change in the appearance of the three-dimensional environment, the user interface objects, and/or display of additional user interface objects), and/or detection of temporal and/or spatial changes in the three-dimensional environment (e.g., movement of the display generation component that causes change in the view of the three-dimensional environment, and/or changes in time that causes the change in the physical environment or virtual augmentation of the physical environment); and/or as a result of programmed progression and ongoing changes in the respective content, the first user interface object, and/or the second user interface object which will happen and/or continue without requiring an additional triggering event or explicit input from the user (e.g., programmed progress of games, movies, and/or other media content; updating of document content based on time and location, and/or other changes that are ongoing without requiring continuing detection of a trigger event or user input)). For example, the appearance of the second content region 756 (e.g., and/or the content contained in and/or displayed in the second content region 756) changes from FIG. 7AK to FIG. 7AL.

To update the user interface, the computer system changes (1212) the first content to second content while the respective content in the content region continues to be constrained to having an appearance in which the respective parameter is within the first range of values (e.g., the content in the second content region 756 changes between FIG. 7AK and FIG. 7AL); the computer system updates (1214) the first user interface object in appearance (e.g., updating its size, shape, location and/or color) and continues to display the first user interface object with an appearance in which the respective parameter has a value (e.g., a third value is the same as the first value, or the third value that is also outside of the first range of values but is different from the first value) that is outside of the first range of values (e.g., the appearance of the close affordance 762 is updated in FIG. 7AL, and the updated appearance has a value above $T_4$ (which is above $T_2$), which is outside the first range of values $T_1$-$T_2$ (and the updated range of values $T_3$-$T_4$); and the computer system updates (1216) the second user interface object in appearance (e.g., updating its size, shape, location and/or color) and continues to display the second user interface object with an appearance in which the respective parameter has a value (e.g., a fourth value is the same as the second value, or the fourth value that is also outside of the first range of values but is different from the second value) that is outside of the first range of values (e.g., in FIG. 7AL, the appearance of the first grabber 752 is also updated to have the same value that is above $T_4$, for the respective parameter, as the close affordance 762).

In some embodiments, the first range of values is a first range of brightness values (e.g., gray values, luminance values, and/or values of other analogous measures of brightness). While concurrently displaying the content region with first content, the first user interface object, and the second user interface object in the user interface: the first user interface object is displayed with an appearance in which the respective parameter has a first brightness value that is outside the first range of brightness values (e.g., the respective parameter has a higher brightness value than a maximum brightness value of the first range of brightness values, or the respective parameter has a lower brightness value than a minimum brightness value of the first range of brightness values); and the second user interface object is displayed with an appearance in which the respective parameter has a second brightness value that is outside the first range of brightness values. In some embodiments, after (e.g., and while) updating the user interface: the first user interface object is displayed with an appearance in which the respective parameter has a third brightness value that is outside the first range of brightness values; and the second user interface object is displayed with an appearance in which the respective parameter has a fourth brightness value that is outside the first range of brightness values. In some embodiments, the first user interface object and the second user interface object are displayed with a brighter white compared to the brightest "normal white" that the respective content in the content region can be displayed with. In some embodiments, the first user interface object and the second user interface object are displayed with a darker black compared to the darkest "normal black" that the respective content in the content region can be displayed with. For example, in the description of FIG. 7AI, where the respective parameter is a brightness, and the patterned background of the first content region 746 reflects a lower brightness value (e.g., corresponding to a "normal white," which represents the brightest possible white value for content of the first content region 746) relative to the brightness value for the first title region 744, which has a pure white background (e.g., a brighter white than the brightest "normal white" for the first content region 746). Displaying the first user interface object with an appearance in which the respective parameter has a first brightness value that is outside of the first range of brightness values and displaying the second user interface object with an appearance in which the respective parameter has a second brightness value that is outside of the first range of brightness values, concurrently with displaying first content that is constrained to having an appearance in which a respective parameter is within the first range of brightness values, provides improved visual feedback to the user (e.g., improved visual feedback that visually emphasizes or deemphasizes the first user interface object and the second user interface object, as needed).

In some embodiments, the first range of values is a first range of color values (e.g., a range of color values that have a first range of color temperatures, and/or brightness). In some embodiments, while concurrently displaying the content region with first content, the first user interface object, and the second user interface object in the user interface: the first user interface object is displayed with an appearance in which the respective parameter has a first color value that is outside the first range of color values; and the second user interface object is displayed with an appearance in which the respective parameter a second color value that is outside the first range of color values. In some embodiments, after (e.g., and while) updating the user interface: the first user interface object is displayed with an appearance in which the respective parameter has a third color value that is outside the first range of color values; and the second user interface object is displayed with an appearance in which the respective parameter has a fourth color value that is outside the first range of color values. In some embodiments, the appearance of the first user interface object and/or the second user interface object (e.g., the first color, second color, third color, the fourth color, and other colors that are used in the first user interface object and/or the second user interface object) are constrained by a second range of colors that is outside of the first range of colors (e.g., the first user interface object and/or the second user interface object can have more vibrant red colors than the red colors that can be used for the content in the content region; and the first user interface object and/or the second user interface object can have paler colors (e.g., more white or gray mixed in, or less saturation) for the colors that can be used for the content in the content region). For example, in the description of FIG. 7AI, the respective parameter is a color value and the patterned background of the first content region 746 reflects a first color (or range of color values) that can be selected for the first content region 746, while the pure white background of the first title region 744 reflects a color that is outside the possible colors that can be selected for the first content region 746. Displaying the first user interface object with an appearance in which the respective parameter has a first color value that is outside of a first range of color values and displaying the second user interface object with an appearance in which the respective parameter has a second color value that is outside of the first range of color values, concurrently with displaying first content that is constrained to having an appearance in which a respective parameter is within the first range of color values, provides improved visual feedback to the user (e.g., improved visual feedback that visually emphasizes or deemphasizes the first user interface object and the second user interface object, as needed).

In some embodiments, the user interface is an application user interface for an application of the computer system, and the first range of values is selected by the application. In some embodiments, the application selects the values for the respective parameter, for content displayed in the content region, and the selected values are within the first range of values. In some embodiments, the application sets limits on the range of values for the respective parameters (e.g., color, luminance, brightness, and/or other parameters) to make the content more comfortable for viewing, clearer, and/or more consistent with a selected theme. In some embodiments, values for the respective parameter are chosen by the operating system and not by the application, for the first user interface object and/or the second user interface object. For example, in the description of FIG. 7AI, where the first content region 746 is an application user interface (e.g., for a first application), and the first application determines the first range of values that can be selected for the first content region 746. Displaying the first user interface object with an appearance in which the respective parameter has a value that is outside of a first range of values and displaying the second user interface object with an appearance in which the respective parameter has a value that is outside of the first range of values, concurrently with displaying first content that is constrained to having an appearance in which a respective parameter is within the first range of values, wherein the first range of values is selected by an application, allows the computer system to display user interface objects with appropriate values for the respective parameter. This simplifies the development of third-party applications (e.g., applications that are developed by a party other than the manufacturer of the computer system), by removing the need for third-party applications to determine appropriate values for the respective parameter (e.g., for the first user interface object and the second user interface object).

In some embodiments, the computer system detects a gaze input (e.g., or a gaze input in combination with an air gesture) directed to the first user interface object (e.g., an indicator, a representation of a system user interface, a viewpoint-locked or head-locked user interface object, a HUD dot that is described with respect to FIGS. 7AG-7AH). In response to detecting the gaze input directed to the first user interface object (and, optionally, in accordance with a determination that the gaze input meets first criteria (e.g., a dwell time threshold, and/or a stability criterion)), the computer system displays a system user interface for accessing functions of the computer system (e.g., the first user interface object provides an easy way for the user to access the system user interface (e.g., home user interface for launching applications, starting communications, starting XR experiences, control panel for controlling device functions, and/or notification-display user interface for display missed notifications and/or notification history), without having to have the system user interface displayed continuously). In some embodiments, the first user interface object is a small and lightweight user interface object that is consistently displayed in a variety of display conditions in the user interface (e.g., the three-dimensional environment and the content region change quickly, frequently, and with great variabilities). In some embodiments, utilizing a range that is outside of the range of values for the respective parameter for content in the content region allows the computer system to set apart the first user interface object from the other objects and content in the user interface (e.g., from the rest of the three-dimensional environment, and/or the content in the content region), and avoid confusion and/or input mistakes of the user. In some embodiments, the user interactions, functions, and/or visual changes described with respect to the first user interface object are implemented for the second user interface object (e.g., instead of the first user interface object, or together with the first user interface object). For example, in some embodiments, the computer system detects a gaze input (e.g., or a gaze input in combination with an air gesture) directed to the second user interface object (e.g., an indicator, a representation of a system user interface, a viewpoint-locked or head-locked user interface object, a HUD dot that is described with respect to FIGS. 7AG-7AH); and in response to detecting the gaze input directed to the second user interface object (and, optionally, in accordance with a determination that the gaze input meets first criteria (e.g., a dwell time threshold, and/or a stability criterion)), the computer system displays a system user interface for accessing functions of the computer system (e.g., the first same user interface as that shown for the first user interface object, a different system user interface from that shown for the first user interface object, or a system user interface unrelated to the function of the first user interface object (e.g., other functions and interactions described herein for the first user interface object and the second user interface object)). For example, in the description of FIGS. 7AH-7AI, where a user interface element has an appearance in which the respective parameter has a value that is outside the first range of values, and in some embodiments, the user interface element is the dot 730 shown in FIGS. 7AG-7AP. Displaying the first user interface object with an appearance in which the respective parameter has a value that is outside of a first range of values and displaying a system user interface for accessing functions of the computer system in response to detecting a gaze input directed to the first user interface object, provides improved visual feedback to the user (e.g., improved visual feedback that the user can interact with the first user interface object in order to display the system user interface).

In some embodiments, the computer system detects a first user input (e.g., a gaze input, an air gesture, a touch input, a voice command, and/or a combination of two or more of the above) directed to the first user interface object (e.g., a grabber that is displayed at or next to an edge or corner of a window that moves and/or resizes the window when dragged by the first user input, a close affordance that is displayed at or next to a window that closes the window when selected by the first user input, and/or another type of affordance or control element that performs an operation with respect to the user interface). In some embodiments, in response to detecting the first user input directed to the first user interface object (and, optionally, in accordance with a determination that the first user input meets selection and/or movement criteria (e.g., is of the correct input type, and meets the time, distance, and/or stability thresholds for selecting and/or moving the first user interface object)), the computer system performs a first operation with respect to the user interface (e.g., increasing or decreasing the scale of; increasing the length of a respective edge, without changing the length of other edges, of; and/or moving the user interface). In some embodiments, the user interface includes a window that includes a content region that displays content, and the user interface includes the first user interface object adjacent to the content region that, when activated by a user input, causes the computer system to perform a corresponding operation with respect to the window. In some embodiments, the user interactions, functions, and/or visual changes described with respect to the first user interface object are implemented for the second user interface object (e.g., instead of the first user interface object, or together with the first user interface object). For example, in some embodiments, the computer system detects a second user input (e.g., a gaze input, an air gesture, a touch input, a voice command, and/or a combination of two or more of the above) directed to the second user interface object (e.g., a grabber that is displayed at or next to an edge or corner of a window that moves and/or resizes the window when dragged by the first user input, a close affordance that is displayed at or next to a window that closes the window when selected by the first user input, and/or another type of affordance or control element that performs an operation with respect to the user interface); and in response to detecting the second user input directed to the second user interface object (and, optionally, in accordance with a determination that the second user input meets selection and/or movement criteria (e.g., is of the correct input type, and meets the time, distance, and/or stability thresholds for selecting and/or moving the second user interface object)), the computer system performs a second operation with respect to the user interface (e.g., increasing or decreasing the scale of; increasing the length of a respective edge, without changing the length of other edges, of; and/or moving the user interface). For example, in the description of FIGS. 7AH-7AI, a user interface element has an appearance in which the respective parameter has a value that is outside the first range of values, and in some embodiments, the user interface element is the first grabber 752 (or the second grabber 756) shown in FIG. 7AI. Displaying the first user interface object with an appearance in which the respective parameter has a value that is outside of a first range of values and performing a first operation with respect to the user interface in response to detecting a gaze input directed to the first user interface object, provides improved visual feedback to the user (e.g., improved visual feedback that the user can interact with the first user interface object in order to perform the first operation with respect to the user interface).

In some embodiments, prior to concurrently displaying the content region with the first content, the first user interface object, and the second user interface object, the computer system displays the user interface without displaying at least one of the first user interface object and the second user interface object (e.g., displays the content region with the first content, and one or none of the first and second user interface objects). In some embodiments, while displaying the user interface without displaying the at least one of the first user interface object and the second user interface object, the computer system detects a gaze input that meets first criteria (e.g., the gaze input is directed to a portion (e.g., an edge, corner, interior region, and/or other preselected portion) of the content region, the user interface, the second user interface object, and/or another user interface object present in the three-dimensional environment). In some embodiments, in response to detecting the gaze input that meets the first criteria, the computer system updates the user interface to concurrently display the content region with the first content, the first user interface object, and the second user interface object (e.g., said at least one of the first and second user interface objects is displayed in response to detecting the gaze input directed to a portion of the user interface (e.g., the content region, the other one of the first and second user interface objects, or a third user interface object in the user interface)). For example, in the description of FIGS. 7AJ-7AK, a user interface element has an appearance in which the respective parameter has a value that is outside the first range of values, and in some embodiments, the user interface element is the resize affordance 752 (or the close affordance 762), which is displayed in response to detecting that the user's attention 710-33 (or 710-35) meets first criteria (e.g., is directed to a bottom right corner of the first content region 746, as in FIG. 7AJ; or is directed to an upper right corner of the second content region 756, as in FIG. 7AK). Displaying the user interface without displaying at least one of the first user interface object and the second user interface object, prior to concurrently displaying the content region with the first content, the first user interface object, and the second user interface object, and then concurrently displaying the content region with the first content, the first user interface object, and the second user interface object, in response to detecting the gaze input that meets the first criteria, enhances the immersion level of a user of the computer system (e.g., by only displaying user interface elements when needed).

In some embodiments, at least one of the first user interface object and the second user interface object is a closing affordance corresponding to a first window (e.g., the user interface, the content region, or a window or content region other than the user interface including the content region) that is displayed via the first display generation component. In some embodiments, while concurrently displaying the content region and the at least one of the first user interface object and the second user interface object, the computer system detects a second user input (e.g., a gaze input, an air gesture, a touch input, a voice command, and/or a combination of two or more of the above) directed to the at least one of the first user interface object and the second user interface object (e.g., the closing affordance). In response to detecting the second user input directed to the at least one of the first user interface object and the second user interface object (and, optionally, in accordance with a determination that the second user input meets selection criteria (e.g., is of the correct input type, and meets the time, distance, and/or stability thresholds for selecting and/or activating the at least one of the first user interface object and the second user interface object)), the computer system ceases to display the first window via the first display generation component (e.g., ceases to display the user interface, the content region, or the window other than the user interface including the content region; and/or closes a corresponding application and/or experience in the three-dimensional environment). For example, in the description of FIG. 7AK, where a user interface element has an appearance in which the respective parameter has a value that is outside the first range of values, and in some embodiments, the user interface element is the close affordance 762, which is displayed in response to detecting that the user's attention 710-35 meets first criteria (e.g., is directed to an upper right corner of the second content region 756, as in FIG. 7AK). Displaying a first user interface object and/or a second user interface object that is a closing affordance for ceasing to display the first window, with an appearance in which the respective parameter has a value that is outside of a first range of values, provides improved visual feedback to the user (e.g., improved visual feedback that the user can interact with the first user interface object and/or the second user interface object to cease displaying the first window).

In some embodiments, at least one of the first user interface object and the second user interface object includes text (e.g., one or more application names, user interface titles, and/or a description in a title bar of a window, an avatar for a user, a document, and/or an XR environment or experience) that is displayed overlaid on a representation of a physical environment (e.g., a passthrough view of the physical environment (e.g., a camera view or an optical passthrough view of the physical environment through a transparent or semi-transparent portion of the first display generation component) or an image of a physical environment surrounding the first display generation component and/or the user) (e.g., the representation of the physical environment is included in the user interface, in the content region, in the first content and/or second content, in the first user interface object, in the second user interface object, and/or in other objects displayed with the user interface, the content region, and/or the first and second user interface objects). For example, in FIGS. 7AO-7AP, the text 766 is displayed overlaid on a representation of a physical environment (e.g., which includes the representation of the first wall 7006' and the representation of the floor 7008'), and the value for the respective parameter for the text 766 is outside the first range of values (e.g., the range T1-T2, which the value for the representation of the first wall 7006' must be within). Displaying a first user interface object and/or a second user interface object that includes text displayed overlaid on a representation of a physical environment, with an appearance in which the respective parameter has a value that is outside of a first range of values, ensures sufficient contrast between the first user interface object (and/or second user interface object) and the representation of the physical environment, without requiring additional user input (e.g., the user does not need to manually adjust the respective parameter for the first user interface object and/or the second user interface object to ensure visibility, regardless of what the respective user interface object is displayed overlaid on (e.g., regardless of what kind of physical environment is visible)).

In some embodiments, the respective content in the content region (e.g., the first content and the second content) includes the representation of the physical environment, and the representation of the physical environment is constrained to have an appearance in which the respective parameter is within the first range of values (e.g., a first range of brightness values, a first range of colors, or a first range of luminance values for the colors). For example, in some embodiments, despite strong lighting and/or presence of very bright or vibrant objects in the physical environment, the representation of the physical environment is automatically dimmed, desaturated, and/or darkened to limit the values of the respective parameter to the first range of values (e.g., a limited range of brightness and/or color values). For example, in FIGS. 7AO-7AP, the text 766 is displayed overlaid on a representation of a physical environment (e.g., which includes the representation of the first wall 7006' and the representation of the floor 7008'), the value for the respective parameter for the text 766 is outside the first range of values (e.g., the range T1-T2), and the representation of the first wall 7006' is constrained to have an appearance in which the respective parameter is within the first range of values (e.g., the range T1-T2). Displaying a first user interface object and/or a second user interface object that includes text with an appearance in which the respective parameter has a value that is outside of a first range of values, and displaying the first user interface object and/or the second user interface object overlaid on a representation of a physical environment that is constrained to have an appearance in which the respective parameter is within the first range of values, ensures sufficient contrast between the first user interface object (and/or second user interface object) and the representation of the physical environment, without requiring additional user input (e.g., the user does not need to manually adjust the respective parameter for the first user interface object and/or the second user interface object to ensure visibility, regardless of what the respective user interface object is displayed overlaid on (e.g., regardless of what kind of physical environment is visible)).

In some embodiments, the text includes a title of an object (e.g., an application icon, an avatar or representation of a user or a contact of the user, a representation or icon of an XR environment or experience, or other virtual objects and/or representation of physical objects in the three-dimensional environment) that is visible via the first display generation component, concurrently with the text and the representation of the physical environment. For example, in the description of FIG. 7AO, where the text object 766 can include the title of a user interface element. In FIGS.

7AO-7AP, the text 766 is displayed overlaid on a representation of a physical environment (e.g., which includes the representation of the first wall 7006' and the representation of the floor 7008'), and the value for the respective parameter for the text 766 is outside the first range of values (e.g., the range T1-T2, which the value for the representation of the first wall 7006' must be within). Displaying a first user interface object and/or a second user interface object that includes text that is a title of an object, displayed overlaid on a representation of a physical environment, with an appearance in which the respective parameter has a value that is outside of a first range of values, ensures sufficient contrast between the first user interface object (and/or second user interface object) and the representation of the physical environment, without requiring additional user input (e.g., the user does not need to manually adjust the respective parameter for the first user interface object and/or the second user interface object to ensure visibility, regardless of what the respective user interface object is displayed overlaid on (e.g., regardless of what kind of physical environment is visible)).

In some embodiments, the text includes descriptive text of media content (e.g., lyrics of a song is playing, closed captioning or subtitles for audio or video that is playing) that is displayed overlaid on the representation of the physical environment (e.g., over portions of the three-dimensional environment that corresponds to the physical environment) via the first display generation component. For example, in the description of FIG. 7AO, the text object 766 includes text of media content, such as lyrics to a song that is playing, closed captioning, or subtitles for audio/video media. In FIGS. 7AO-7AP, the text 766 is displayed overlaid on a representation of a physical environment (e.g., which includes the representation of the first wall 7006' and the representation of the floor 7008'), and the value for the respective parameter for the text 766 is outside the first range of values (e.g., the range T1-T2, which the value for the representation of the first wall 7006' must be within). Displaying a first user interface object and/or a second user interface object that includes descriptive text of media content displayed overlaid on a representation of a physical environment, with an appearance in which the respective parameter has a value that is outside of a first range of values, ensures sufficient contrast between the first user interface object (and/or second user interface object) and the representation of the physical environment, without requiring additional user input (e.g., the user does not need to manually adjust the respective parameter for the first user interface object and/or the second user interface object to ensure visibility, regardless of what the respective user interface object is displayed overlaid on (e.g., regardless of what kind of physical environment is visible)).

In some embodiments, the user interface includes a view of a three-dimensional environment (e.g., an augmented reality environment, or a system-provided three-dimensional experience) and at least one of the first user interface object and the second user interface object are displayed overlaid on the content region (e.g., a representation of a physical environment, a virtual three-dimensional environment) as virtual augmentation (e.g., sparkling stars in a virtual night sky, sparkling sand or waves on a virtual beach) of the respective content in the content region (e.g., the respective content includes passthrough content, passthrough content augmented with virtual scenery and/or selected virtual augmentation, and/or a virtual three-dimensional environment for an XR experience). For example, in the description of FIG. 7AN (e.g., FIGS. 7AN1, 7AN2 and 7AN3), where the first user interface element 748 and/or the second user interface element 750 are displayed as overlaying the first content region 746, and the first user interface element 748 and the second user interface element 750 are displayed as a virtual augmentation(s) that augments portions of the content of the first content region 746, over which the first user interface element 748 and/or the second user interface element 750 are displayed. Displaying a first user interface object and/or a second user interface object as virtual augmentation with an appearance in which the respective parameter has a value that is outside of a first range of values, displayed overlaid on the content region that is constrained to having an appearance in which a respective parameter is within the first range of values, increases the level of immersion of a user of the computer system (e.g., by visually augmenting the appearance of content in the content region to be more realistic and/or dynamic).

In some embodiments, at least one of the first user interface object and the second user interface object is a visual indicator that indicates a location of a gaze of a user. In some embodiments, the visual indicator that indicates the location of the gaze of the user moves in the three-dimensional environment in accordance with the movement of the gaze of the user. In some embodiments, the visual indicator is a spot light, a cross-hair, and/or other graphical object and/or visual effect (e.g., a glow, a highlight, and/or another visual effect filter) that has a location that corresponds to the location of the user's gaze. For example, in FIGS. 7AM-7AN, the visual indicator 764 indicates a location of a gaze of the user, and is displayed with a respective value (e.g., above T2) for the respective parameter that is outside the first range of values (e.g., the range T1-T2). Displaying a first user interface object and/or a second user interface object that is a visual indicator that indicates a location of a gaze of the user, with an appearance in which the respective parameter has a value that is outside of a first range of values, provides improved visual feedback to the user (e.g., improved visual feedback regarding the detected location of the user's gaze).

In some embodiments, the user interface includes two or more control elements for performing functions within the user interface (e.g., selectable options, buttons, sliders, and/or other controls in an application user interface or window of a respective application, which, when selected, causes the computer system to perform an operation within the application (e.g., navigate to another user interface, opening a new window, or performing an application function (e.g., control media playing, starting communication session, adjusting a setting for a physical or XR environment, and/or other application functions))). In some embodiments, the one or more control elements are the respective content in the content region and are constrained to having an appearance in which the respective parameter is within the first range of values. In some embodiments, the computer system detects that the gaze of the user is directed to a respective control element of the two or more control elements. In some embodiments, in response to detecting that the gaze of the user is directed to the respective control element of the two or more control elements: in accordance with a determination that the gaze of the user is directed to a first control element of the two or more control elements, the computer system displays the visual indicator over at least a portion of the first control element; and in accordance with a determination that the gaze of the user is directed to a second control element of the two or more control elements, the computer system displays the visual indicator over at least a portion of the second control element. In some embodiments, the visual indicator has a default shape (e.g., a circle, an oval, a cross-hair, or another preselected shape) that is fully displayed when the visual indicator moves in the three-dimensional environment in accordance with the movement of the user's gaze. In some embodiments, when the user's gaze is directed to a control element, the shape of the visual indicator maybe partially or fully altered by the outline or boundary of the control element depending on the position of the gaze relative to the control element, and/or the differences in size and shape between the default shape of the visual indication and the shape of the respective control element. For example, in some scenarios (e.g., when the gaze is not centered on the control element, and/or when the control element is larger and/or has a different shape than the visual indicator) the shape of the visual indicator includes at least one segment (e.g., side, edge, curved segment, or other boundary segment) that is bounded by a segment of the boundary of the control element (e.g., such that the visual indicator does not extend beyond the boundaries of the respective affordance). In some embodiments, the respective control element has a polygonal shape and a segment of the respective control element refers to a side of the respective control element. In some embodiments, the respective control element has a curved shape (e.g., a circular or elliptical shape), or the boundary of the respective control element includes at least one curve (e.g., a mix of straight sides and curved segments), and a segment of the respective control element refers to a side of the respective control element (e.g., if the default shape of the visual indicator would extend beyond a straight side), a curved segment of the respective control element (e.g., if the default shape of the visual indicator would extend beyond a curved segment), or both a side and a curved segment of the respective control element (e.g., if the default shape of the visual indicator would extend beyond both a side and a curved segment of the respective control element). In one example, in some embodiments, a default shape of the visual indicator is a circle, and when the gaze of the user is directed to a location corresponding to a respective control element that has a rectangular shape, if the user's gaze is directed to a left portion of the respective control element, such that the default circle shape of the visual indicator would normally extend beyond a left segment (e.g., the left side) of the rectangular shape of the respective control element, the default circle shape of the visual indicator is displayed with a left segment that corresponds to the left segment of the rectangular shape of the respective control element (and portions of the visual indicator that would extend beyond the left segment of the respective affordance are not displayed). The portions of the visual indicator that are within the boundaries of the respective control element are displayed with their default appearance (e.g., as much of the default shape of the visual indicator as fits within the respective control element). In some embodiments, if the default circle shape of the visual indicator would extend beyond more than one segment of the respective control element (e.g., the default circular shape of the visual indicator is displayed in the lower left of a rectangular shaped respective control element, and would extend beyond the left edge and the bottom edge of the respective control element), the shape of the visual indicator includes a plurality of segments (e.g., a number of segments corresponding to the number of segments of the respective control element that the default shape of the visual indicator would extend beyond). In some embodiments, if the default shape of the visual indicator would extend beyond all segments of the respective control element, the visual indicator is displayed with the same shape (e.g., and same size) as the respective control element. For example, in FIG. 7AN (e.g., FIGS. 7AN1, 7AN2 and 7AN3), the visual indicator 764 is displayed with a respective value (e.g., above T2) for the respective parameter that is outside the first range of values (e.g., the range T1-T2), and the visual indicator is displayed over a portion of the second user interface element 750. As described above with reference to FIGS. 7AN, in some embodiments, the second user interface element 750 is an affordance or control element for performing functions with the first content region 746. Displaying a first user interface object and/or a second user interface object that is a visual indicator that indicates a location of a gaze of the user, including displaying the visual indicator over at least a portion of a first control element and/or over at least a portion of a second control element, and displaying the visual indicator with an appearance in which the respective parameter has a value that is outside of a first range of values, provides improved visual feedback to the user (e.g., improved visual feedback regarding the detected location of the user's gaze) and ensures sufficient contrast between the first user interface object (and/or second user interface object) and the first control element (or second control element), without requiring additional user input (e.g., the user does not need to manually adjust the respective parameter for the visual indicator, to ensure visibility).

In some embodiments, the user interface includes application content of a first application (e.g., content displayed within an application window, content of a document, content of a movie, image, or video, content of a communication, and/or other content). In some embodiments, the application content is the respective content in the content region and is constrained to having an appearance in which the respective parameter is within the first range of values. The computer system detects that the gaze of the user is directed to the application content of the first application. In some embodiments, in response to detecting that the gaze of the user is directed to the application content of the first application: in accordance with a determination that the gaze of the user is directed to a first portion of the application content, the computer system displays the visual indicator over the first portion of the application content; and in accordance with a determination that the gaze of the user is directed to a second portion of the application content, the computer system displays the visual indicator over a second portion of the application content. In some embodiments, when the visual indicator is smaller in size than the application content, the visual indicator is displayed with its default shape and moves with its default shape in accordance with the movement of the gaze within the application content. In some embodiments, when the gaze intersects with a control element or the boundary of the application content, the shape of the visual indicator is altered by the boundary of the control element or the boundary of the application content. For example, in FIG. 7AM, the visual indicator 764 is displayed with a respective value (e.g., above T2) for the respective parameter that is outside the first range of values (e.g., the range T1-T2), and the visual indicator is displayed over a portion of the first content region 746. As described above with reference to FIG. 7AI, in some embodiments, the first content region 746 is an application user interface (e.g., that includes application content). Displaying a first user interface object and/or a second user interface object that is a visual indicator that indicates a location of a gaze of the user, including displaying the visual indicator over a respective portion of application content, and displaying the visual indicator with an appearance in which the respective parameter has a value that is outside of a first range of values, provides improved visual feedback to the user (e.g., improved visual feedback regarding the detected location of the user's gaze) and ensures sufficient contrast between the first user interface object (and/or second user interface object) and the application content, without requiring additional user input (e.g., the user does not need to manually adjust the respective parameter for the visual indicator, to ensure visibility).

In some embodiments, displaying the visual indicator that indicates the location of the gaze of the user includes applying a virtual lighting effect (e.g., a glow effect or a halo effect) to original content displayed at the location of the visual indicator, and the original content is constrained to having an appearance in which the respective parameter is within the first range of values (e.g., the original content includes application content, control elements, passthrough content, a representation of the physical environment, and/or the respective content within the content region). For example, in the description of FIG. 7AM, the visual indicator 764 includes a virtual lighting effect (e.g., a specular highlighting effect, a glow effect, or a halo effect). Displaying the visual indicator with an appearance in which the respective parameter has a value that is outside of a first range of values, including applying a virtual lighting effect to original content displayed at the location of the visual indicator, provides improved visual feedback to the user (e.g., improved visual feedback regarding the detected location of the user's gaze) and ensures sufficient contrast between the first user interface object (and/or second user interface object) and the underlying content, without requiring additional user input (e.g., the user does not need to manually adjust the respective parameter for the visual indicator to ensure visibility).

In some embodiments, displaying the visual indicator that indicates the location of the gaze of the user includes applying a feathering effect to at least a portion of a boundary between the visual indicator and original content displayed at the location of the visual indicator (e.g., a smoothing and/or blurring effect is applied at the boundaries around the visual indicator, and/or between the visual indicator and the underlying content), wherein the original content is constrained to having an appearance in which the respective parameter is within the first range of values (e.g., the original content includes application content, control elements, passthrough content, a representation of the physical environment, and/or the respective content within the content region). For example, in the description of FIG. 7AM, a feathering effect is applied to the visual indicator 764 (e.g., a smoothing and/or blurring effect is applied near the edges of, or to the entirety of, the visual indicator 764). Displaying the visual indicator with an appearance in which the respective parameter has a value that is outside of a first range of values, including applying a feathering effect to at least a portion of a boundary between the visual indicator and original content displayed at the location of the visual indicator, provides improved visual feedback to the user (e.g., improved visual feedback regarding the detected location of the user's gaze).

In some embodiments, displaying the visual indicator that indicates the location of the gaze of the user includes making the visual indicator partially transparent to reveal at least some visual characteristics of original content displayed at the location of the visual indicator (e.g., the original content over which the visual indicator is displayed is at least partially visible, although not fully visible to an extent as if the visual indicator were not displayed overlaying the original content), wherein the original content is constrained to having an appearance in which the respective parameter is within the first range of values (e.g., the original content includes application content, control elements, passthrough content, a representation of the physical environment, and/or the respective content within the content region). For example, in the description of FIG. 7AM, the visual indicator 764 is at least partially transparent (e.g., such that content in the first content region 746, over which the visual indicator 764 is displayed, is at least partially visible). Displaying a partially transparent visual indicator with an appearance in which the respective parameter has a value that is outside of a first range of values, provides improved visual feedback to the user (e.g., improved visual feedback regarding the detected location of the user's gaze) while maintaining visibility of the underlying content, which minimizes the amount of gaze adjustment needed by the user (e.g., the user does not need to move the user's gaze, and thus the visual indicator, away from the underlying content in order to view the underlying content (e.g., to verify the visual indicator is over an appropriate affordance)).

In some embodiments, while concurrently displaying the content region with the second content, the first user interface object, and the second user interface object in the user interface, the computer system further updates the user interface (e.g., in response to detecting another change in external physical environment (e.g., movement of objects in the physical environment, changes in ambient lighting, and/or other changes that affect the appearance of the passthrough content), detection of another set of user inputs (e.g., input that causes changes in the appearance of the user interface objects, and/or display of additional user interface objects), detection of another set of internal device events (e.g., generation of alerts, arrival of new communications, and/or other internal events that cause change in the appearance of the three-dimensional environment, the user interface objects, and/or display of additional user interface objects), and/or detection of additional temporal and/or spatial changes in the three-dimensional environment (e.g., movement of the display generation component that causes change in the view of the three-dimensional environment, and/or changes in time that causes the change in the physical environment or virtual augmentation of the physical environment); and/or as a result of programmed progression and ongoing changes in the respective content, the first user interface object, and/or the second user interface object which will happen and/or continue without requiring an additional triggering event or explicit input from the user (e.g., programmed progress of games, movies, and/or other media content; updating of document content based on time and location, and/or other changes that are ongoing without requiring continuing detection of a trigger event or user input)). In some embodiments, the computer system changes the second content to third content while the respective content in the content region continues to be constrained to having an appearance in which the respective parameter is within the first range of values. In some embodiments, in accordance with a determination that the third content is displayed with an appearance in which the respective parameter is within a first sub-range (e.g., the maximum and/or minimum values or a sub-range of values at or near the extreme values) (e.g., white or black values, and/or brightest or darkest values) of the first range of values, the computer system updates at least one of the first user interface object and the second user interface object in appearance and continues to display the at least one of the first user interface object and the second user interface object with an appearance in which the respective parameter has a value that is outside of the first range of values. In accordance with a determination that the third content is displayed with an appearance in which the respective parameter is within a second sub-range of the first range of values, different from the first sub-range of the first range of values, the computer system updates the at least one of the first user interface object and the second user interface object in appearance, and the computer system displays the at least one of the first user interface object and the second user interface object with an appearance in which the respective parameter is constrained to having values that are within of the first range of values (e.g., no value that is outside of the first range of values). For example, in some embodiments, the first user interface object and the second user interface object take on appearances that have values for the respective parameter outside of the first range of values, for only a sub-range of the first range of values, and not the entirety of the first range of values. For example, in some embodiments, when the respective content in the content region has an appearance that does not use values outside of that sub-range of the first range of values, the first user interface object and the second user interface object do not need to utilize the HDR range of values (e.g., values outside of the first range of values). For example, in FIG. 7AL, the close affordance 762 is displayed with an appearance in which the respective parameter has a value (e.g., above $T_2$) that is outside of the first range of values (the range $T_1$-$T_2$), in accordance with a determination that the second content region 756 is displayed with an appearance in which the respective parameter is within a first sub-range (e.g., the sub-range $T_3$-$T_4$, which is a sub-range of the range $T_1$-$T_2$). Continuing to display the at least one of the first user interface object and the second user interface object with an appearance in which the respective parameter has a value that is outside of the first range of values, in accordance with a determination that the third content is displayed with an appearance in which the respective parameter is within a first sub-range of the first range of values, and displaying the at least one of the first user interface object and the second user interface object with an appearance in which the respective parameter is constrained to having values that are within of the first range of values, in accordance with a determination that the third content is displayed with an appearance in which the respective parameter is within a second sub-range of the first range of values, different from the first sub-range of the first range of values, displays the first user interface object and/or the second user interface object with an appropriate value for the respective parameter, without the need for additional user input (e.g., additional user input to manually adjust the value for the respective parameter for the first user interface object and/or the second user interface object, each time the displayed content in the content region changes).

In some embodiments, the first user interface object is displayed with one or more first values of the respective parameter that are outside of the first range of values in one or more first portions of the first user interface object (e.g., portions of the edges that have specular highlighting, portions that is illuminated by a gaze glow, portions that include controls for moving and/or resizing the first user interface object or a window associated with the first user interface object), and the first user interface object is displayed with one or more second values of the respective parameter that are within the first range of values in one or more second portions of the first user interface object (e.g., portions outside of the first portions). In some embodiments, the second user interface object is displayed with one or more third values of the respective parameter that are outside of the first range of values in one or more first portions of the second user interface object (e.g., portions of the edges that have specular highlighting, portions that is illuminated by a gaze glow, portions that include controls for moving and/or resizing the first user interface object or a window associated with the first user interface object), and the second user interface object is displayed with one or more fourth values of the respective parameter that are within the first range of values in one or more second portions of the second user interface object (e.g., portions outside of the first portions). For example, in the description of FIG. 7AI, where the first title region 744 includes a first portion (e.g., a top half) and a second portion (e.g., a bottom half), and the first portion of the first title region 744 is displayed with a first value for the respective parameter that is outside the first range of values, and the second portion of the first title region 744 is displayed with a second value for the respective parameter that is within the first range of values (e.g., to provide a smoother visual transition between the first content region 746 and the first portion of the first title region 744). Displaying the first user interface object with one or more first values of the respective parameter that are outside of the first range of values in one or more first portions of the first user interface object, and displaying the first user interface object with one or more second values of the respective parameter that are within the first range of values in one or more second portions of the first user interface object, provides improved visual feedback to the user (e.g., improved visual feedback regarding the locations of the one or more first portions and one or more second portions of the first user interface object). This also ensures sufficient contrast between the one or more first portions of the first user interface object and the first content without needing to apply the same visual appearance to the one or more second portions of the first user interface object (e.g., which may cause visibility issues for the one or more second portions of the first user interface), which provides more granular control over the appearance of the first user interface object, minimizing the need for further adjustment (e.g., manually, by the user) or the need to compromise with respect to contrast for the one or more first portions and the one or more second portions of the first user interface object.

In some embodiments, the one or more first portions of the first user interface object includes a first change in appearance due to a simulated lighting effect applied to the first user interface object (e.g., a specular highlighting effect, a glow effect, or a halo effect). For example, in the description of FIG. 7AI, the first portion of the first title region 744 is displayed with the first value for the respective parameter that is outside the first range of values, which includes changing an appearance of the first portion of the first title region 744 due to a simulated lighting effect (e.g., a specular highlighting effect, a glow effect, or a halo effect) that is applied to the first title region 744 (e.g., and only applied to the first portion of the first title region 744). Displaying the first user interface object with one or more first values of the respective parameter that are outside of the first range of values in one or more first portions of the first user interface object that include a change in appearance due to a simulated lighting effect applied to the first user interface object, and displaying the first user interface object with one or more second values of the respective parameter that are within the first range of values in one or more second portions of the first user interface object, provides improved visual feedback to the user (e.g., improved visual feedback regarding the locations of the one or more first portions and one or more second portions of the first user interface object). This also ensures sufficient contrast between the one or more first portions of the first user interface object and the first content without needing to apply the same visual appearance to the one or more second portions of the first user interface object (e.g., which may cause visibility issues for the one or more second portions of the first user interface), which provides more granular control over the appearance of the first user interface object, minimizing the need for further adjustment (e.g., manually, by the user) or needing to compromise with respect to contrast for the one or more first portions and the one or more second portions of the first user interface object.

In some embodiments, the one or more first portions of the first user interface object includes a second change in appearance due to presence of a visual indication of a location of a gaze of the user (e.g., a gaze glow, or a highlighting effect) on the one or more first portions of the first user interface object. In some embodiments, the one or more third portions of the second user interface object includes a change in appearance due to presence of a visual indication of a location of a gaze of the user (e.g., a gaze glow, or a highlighting effect) on the one or more third portions of the second user interface object. For example, in the description of FIG. 7AI, the first portion of the first title region 744 is displayed with the first value for the respective parameter that is outside the first range of values, which includes changing an appearance of the first portion of the first title region 744 due to presence of a visual indication (e.g., the visual indicator 764 of FIGS. 7AM-7AN) of a location of a gaze of the user. Displaying the first user interface object with one or more first values of the respective parameter that are outside of the first range of values in one or more first portions of the first user interface object that include a change in appearance due to presence of a visual indication of a location of a gaze of the user on the one or more first portions of the first user interface object, and displaying the first user interface object with one or more second values of the respective parameter that are within the first range of values in one or more second portions of the first user interface object, provides improved visual feedback to the user (e.g., improved visual feedback regarding the locations of the one or more first portions and one or more second portions of the first user interface object). This also ensures sufficient contrast between the one or more first portions of the first user interface object and the first content without needing to apply the same visual appearance to the one or more second portions of the first user interface object (e.g., which may cause visibility issues for the one or more second portions of the first user interface), which provides more granular control over the appearance of the first user interface object, minimizing the need for further adjustment (e.g., manually, by the user) or the need to compromise with respect to contrast for the one or more first portions and the one or more second portions of the first user interface object.

In some embodiments, the one or more first portions of the first user interface object includes a control element for performing a first operation with respect to (e.g., increasing or decreasing the scale of; increasing the length of a respective edge, without changing the length of other edges, of; and/or moving) the first user interface object. For example, in the description of FIG. 7AI, a first portion of a respective user interface element (e.g., the first grabber 752 and/or the second grabber 758) is displayed with the first value for the respective parameter that is outside the first range of values (and a second portion of the respective user interface element is displayed with a second value for the respective parameter that is within the first range of values). Displaying the first user interface object with one or more first values of the respective parameter that are outside of the first range of values in one or more first portions of the first user interface object that include a control element for performing a first operation with respect to the first user interface object, and displaying the first user interface object with one or more second values of the respective parameter that are within the first range of values in one or more second portions of the first user interface object, provides improved visual feedback to the user (e.g., improved visual feedback regarding the locations of the one or more first portions and one or more second portions of the first user interface object). This also ensures sufficient contrast between the one or more first portions of the first user interface object and the first content without needing to apply the same visual appearance to the one or more second portions of the first user interface object (e.g., which may cause visibility issues for the one or more second portions of the first user interface), which provides more granular control over the appearance of the first user interface object, minimizing the need for further adjustment (e.g., manually, by the user) or needing to compromise with respect to contrast for the one or more first portions and the one or more second portions of the first user interface object.

In some embodiments, displaying a first view of a three-dimensional environment (e.g., an augmented reality environment, or a system-provided three-dimensional experience), wherein displaying the first view of the three-dimensional environment includes concurrently displaying the content region with the first content, the first user interface object, and the second user interface object in the three-dimensional environment. For example, in the description of FIGS. 7AN, the first content region 746 is a representation of a virtual three-dimensional environment (e.g., a virtual beach that includes sand and waves), and/or the first content region 746 includes a representation of a physical environment (e.g., and the first user interface element 748 and/or the second user interface element 750 augment representations of physical objects/features of the physical environment). Displaying a first view of a three-dimensional environment, including displaying respective content displaying the first user interface object with an appearance in which the respective parameter has a value that is outside of the first range of values, and displaying the second user interface object with an appearance in which the respective parameter has a value that is outside of the first range of values, in the first view of the three-dimensional environment, improves the level of immersion of the user of the computer system (e.g., displaying the first user interface object and the second user interface object with respective values for the respective parameter that are outside the first range of values includes displaying the first user interface object and the second user interface object with an increased level of realism). The user also receives improved visual feedback. For example, the first user interface object and second user interface object are interactable user interface objects (e.g., user interface objects described above with reference to FIGS. 7AH-7AH (e.g., a HUD Dot) and/or FIGS. 7AJ-7AL (e.g., a grabber, resize, or close affordance), and displaying the first user interface object and the second user interface object with respective values for the respective parameter that are outside the first range of values allows the user to easily identify interactable user interface objects in the first view of the three-dimensional environment. Virtual objects can also be displayed as less realistic (e.g., so the user can easily differentiate between representation of physical objects and virtual objects in the first view of the three-dimensional environment, to avoid collision with physical objects in the real world), and/or representation of physical objects (e.g., that the computer system detects as within a threshold distance of the user of the computer system) can be visually emphasized or distinguished to draw the user's attention to particular areas or physical objects in the user's surroundings (e.g., to identify physical locations where it is unsafe or unsuitable for the user while the user is using the computer system with an augmented reality experience, and/or physical objects in the user's surroundings which the user may collide with).

In some embodiments, while displaying the first user interface object (e.g., and/or the second user interface object) with the appearance in which the respective parameter has a respective value that is outside the first range of values (e.g., the first value and/or the third value), the computer system detects a change in state of (e.g., movement of, a change in size and/or shape of, and/or appearance of) a second user interface, wherein the change in state of the second user interface causes the second user interface to overlay (e.g., occlude and/or overlap) a respective portion of (e.g., some or all of) the first user interface object (e.g., and/or the second user interface object). In response to detecting the change in state of the second user interface, the computer system displays the respective portion of the first user interface object (e.g., and/or the second user interface object) with an appearance in which the respective parameter has a different value that is different from the respective value that is outside the first range of values. In some embodiments, a second portion of the first user interface object that is not overlaid by the second user interface continues to be displayed with the appearance in which the respective parameter has the respective value that is outside the first range of values. In some embodiments, the different value is outside the first range of values. In some embodiments, the different value is inside the first range of values. In some embodiments, the different value is closer to being within the first range of values than is the respective value. For example, very bright content that is outside of the range of brightness for standard user interface elements is dimmed to be at a brightness level that is within the range of brightness for standard user interface elements. For example, in FIG. 7AO, the user interface 769 overlays the region 767 of the text object 766, and the region 767 is displayed with a different (e.g., lower, and thereby less extreme) value than the non-overlaid portions of the text object 766. Similarly, in FIG. 7AP, the user interface 769 overlays the region 771 of the text object 766, and the region 771 is displayed with a different (e.g., higher, and thereby less extreme) value than the non-overlaid portions of the text object 766. Displaying a respective portion of the first user interface object with an appearance in which the respective parameter has a different value that is different from the respective value that is outside the first range of values, in response to detecting a change in state of the second user interface that causes the second user interface to overlay the respective portion of the first user interface object, causes the device to automatically adjust values for the respective parameter for different user interface elements (e.g., to improve and/or maintain visibility of user interface elements, as the spatial relationship between different user interface elements changes), without requiring additional user input (e.g., additional user inputs to adjust or update the appearance of respective portions of the first user interface object each time the respective portions of the first user interface are overlayed by other objects and/or user interfaces).

In some embodiments, the change in state of the second user interface causes the second user interface to at least partially overlay respective content (e.g., the first content and/or the second content) in the content region that is constrained to having an appearance in which the respective parameter is within the first range of values (e.g., and/or another user interface element that is constrained to have an appearance in which the respective parameter is within the first range of values) in addition to displaying the respective portion of the first user interface object (e.g., and/or the second user interface object) with the appearance in which the respective parameter has the respective value that is outside the first range of values. For example, the platter can be displayed on top of both first content that is very bright content that is outside of the range of brightness for standard user interface elements and second content that is within the range of brightness for standard user interface elements, where the first content that is very bright content that is outside of the range of brightness for standard user interface elements is dimmed relative to the second content that is within the range of brightness for standard user interface elements while the platter is overlaid on the first content and the second content; and the dimmed first content that is the dimmed version of the very bright content that is outside of the range of brightness for standard user interface elements is brightened relative to the second content that is within the range of brightness for standard user interface elements while the platter ceases to be overlaid on the dimmed version of the first content and the second content. For example, in FIG. 7AO, the user interface 769 overlays both the text object 766 (e.g., portions of which have a value that is above $T_2$), and the representation of the wall 7006' (e.g., which is constrained to values between $T_1$ and $T_2$). Similarly, in FIG. 7AP, the user interface 769 overlays the text object 766 (e.g., portions of which have a value that is above $T_1$), and the representation 7014' of the physical object 7014 (e.g., which is constrained to values between $T_1$ and $T_2$). Displaying a respective portion of the first user interface object with an appearance in which the respective parameter has a different value that is different from the respective value that is outside the first range of values, in response to detecting a change in state of the second user interface that causes the second user interface to at least partially overlay respective content in the content region that is constrained to having an appearance in which the respective parameter is within the first range of values, causes the device to automatically adjust values for the respective parameter for different user interface elements (e.g., to improve and/or maintain visibility of user interface elements, as the spatial relationship between different user interface elements changes).

In some embodiments, aspects/operations of methods 800, 900, 1000, 1100, 1300, 1400, 1500, 1600, 1800, and 20000 may be interchanged, substituted, and/or added between these methods. For brevity, these details are not repeated here.

FIG. 13 is a flow diagram of an exemplary method 1300 for displaying an object with an object management user interface (e.g., one or more object management controls) that moves in three-dimensions like the three-dimensional object, and in response to detecting a request to move the user interface object relative to the viewpoint of the user, displaying the object at a different location relative to the user, including displaying the object management user interface with a different appearance relative to the object, in accordance with some embodiments. Method 1300 describes displaying controls for a virtual object and automatically updating the displayed controls as the virtual object is moved within the AR/VR environment. Automatically updating a control for a virtual object in response to detecting that the virtual object is moving within the AR/VR environment, without requiring additional user input, enables the user to continue to access the control to perform an operation, and provides improved visual feedback by dynamically adjusting the controls to be easily viewed by the user, even as the position of the virtual object changes.

In some embodiments, method 1300 is performed at a computer system that is in communication with a first display generation component (e.g., a first display generation component of a two-sided display generation component, a heads-up display, a head-mounted display (HMD), a display, a touchscreen, a projector, a standalone display, and/or a display that is enclosed in the same housing as another display generation component of the same type or a different type) having a first display area (e.g., corresponding to a three-dimensional environment and/or corresponding to a screen area) and one or more input devices (e.g., cameras, controllers, touch-sensitive surfaces, joysticks, buttons, gloves, watches, motion sensors, and/or orientation sensors). In some embodiments, the first display generation component is a display component facing the user and provides an XR experience to the user. In some embodiments, the first display generation component includes two or more display components (e.g., one set for each eye) that display slightly different images to form a stereoscopic view of the three-dimensional environment. In some embodiments, the first display generation component and a second display generation component form a two-sided display device (e.g., a two-sided HMD) that displays a first user interface on a first side corresponding to the first display generation component, and a second user interface on the second side corresponding to the second display generation component. In some embodiments, the second display generation component is a display component facing away from the user and toward an external environment of the user and optionally provides status information related to the first display generation component (e.g., displayed content and/or operational state) and/or the user (e.g., movement of the user's eyes, and/or attention state of the user) to other users in the external environment. In some embodiments, the computing system is an integrated device with one or more processors and memory enclosed in the same housing as the first and the second display generation components and at least some of the one or more input devices. In some embodiments, the computing system includes a computing component (e.g., a server, a mobile electronic device such as a smart phone or tablet device, a wearable device such as a watch, wristband, or earphones, a desktop computer, or a laptop computer) that includes one or more processors and memory that is separate from the display generation component(s) and/or the one or more input devices. In some embodiments, the display generation component(s) and the one or more input devices are integrated and enclosed in the same housing. In some embodiments, the method 1300 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1300 are, optionally, combined and/or the order of some operations is, optionally, changed.

The computer system displays (1302), via the first display generation component, a first view of a three-dimensional environment that corresponds to a first viewpoint of a user. For example, as described with reference to FIG. 1A, an AR environment refers to a simulated environment in which one or more virtual objects are superimposed over a physical environment, or a representation thereof, where a system may transform one or more sensor images to impose a select perspective (e.g., viewpoint) different than the perspective captured by the imaging sensors.

While displaying, via the first display generation component, the first view of the three-dimensional environment that corresponds to the first viewpoint of the user, the computer system detects (1304) a first event that corresponds to a request to display a first virtual object (e.g., an application user interface, a window, a three-dimensional virtual object, a user interface object, or another type of virtual object) in the first view of the three-dimensional environment (e.g., receipt of a respective user input that corresponds to a request to display the first virtual object in the three-dimensional environment, and/or occurrence of an event (e.g., an event generated or detected by the computer system) that meets the condition for displaying the first virtual object in the first three-dimensional environment); For example, as described with reference to FIG. 7AQ, in some embodiments, three-dimensional object 770*a* is displayed in response to a user input requesting the view three-dimensional object 770*a*.

In response to detecting the first event that corresponds to a request to display the first virtual object in the first view of the three-dimensional environment, the computer system displays (1306), in the first view of the three-dimensional environment, the first virtual object a first position in the three-dimensional environment, wherein (optionally, in accordance with a determination that first criteria are met (e.g., user input and/or attention is directed to the first virtual object, or other criteria for displaying the object management user interface with its corresponding virtual object), the first virtual object is displayed with a first object management user interface (e.g., a control object, such as a supporting platter, a closing affordance, a grabber, a scrubber, a resizing affordance, a scrolling affordance, and/or a group of one or more object management user interface objects) that corresponds to the first virtual object, and wherein the first object management user interface has a first appearance (e.g., a first relative spatial relationship (e.g., angle, orientation, and/or distance) and/or relative size) relative to the first virtual object at the first position in the three-dimensional environment. For example, as described with reference to FIG. 7AQ, three-dimensional object 770*a* is displayed with one or more object management controls (e.g., grabber 7104*a*, a resize affordance, platter 772, title bar 7106 and/or other controls) for the object 770*a*.

The computer system detects (1308), via the one or more input devices, a first user input (e.g., a gaze and pinch gesture or another selection gesture, followed by a drag gesture; or other types of user inputs that select and moves (e.g., translates, and/or rotates) the first virtual object) that corresponds to a request to move the first virtual object in the three-dimensional environment. In some embodiments, the first user input is directed to the first user interface object that is associated with the first virtual object. In some embodiments, the first user input is directed to a portion of the first virtual object directly. For example, as described with reference to FIG. 7AT, while the user's attention 710-39 is directed to grabber 7104*b*, the computer system detects an input (e.g., an air gesture or other selection input) for moving object 770*b* using the grabber 7104*b*.

In response to detecting the first user input that corresponds to a request to move the first virtual object in the three-dimensional environment, the computer system: displays (1310), in the first view of the three-dimensional environment, the first virtual object at a second position, different from the first position (e.g., different in three-dimensional coordinates and/or different in orientation), in the three-dimensional environment, wherein (optionally, in accordance with a determination that the first criteria are met (e.g., user input and/or attention is directed to the first virtual object, or other criteria for displaying the object management user interface with its corresponding virtual object)) the first virtual object is displayed concurrently with the first object management user interface (e.g., a control object, such as a supporting platter, a closing affordance, a grabber, a scrubber, a resizing affordance, a scrolling affordance, and/or a group of one or more object management user interface objects) at the second position in the three-dimensional environment, and wherein the first object management user interface has a second appearance (e.g., a second relative spatial relationship (e.g., angle, orientation, and/or distance) and/or relative size) relative to the first virtual object, different from the first appearance. For example, as described with reference to FIG. 7AV, in some embodiments, the one or more object management controls are optionally visually deemphasized while the user is interacting with object 770*c*, and after moving the object 770*b* to a new position (object 770*b* is now labeled as object 770*c*), the object management controls update in size based on the perceived distance between the object management controls and the viewpoint of the user (e.g., optionally by a lesser amount than the amount that size of object 770*c* is updated).

In some embodiments, the first user input is detected while concurrently displaying the first virtual object (e.g., at the first object position, and with a first spatial relationship to the first viewpoint) and the first object management user interface (e.g., at a first interface position that has a second spatial relationship to the first virtual object, and a third spatial relationship to the first viewpoint), with the first object management user interface having the first appearance (e.g., an appearance based on the second spatial relationship (e.g., angle, orientation, and/or distance) and/or relative size) relative to the first virtual object. For example, as described with reference to FIG. 7AQ, in some embodiments, the one or more object management controls are displayed with an orientation that faces the user's current viewpoint, and are displayed with a first spatial relationship relative to the object 770*a* (e.g., with first size(s) and at first angle(s)/orientation(s) relative to the object 770*a*). Allowing a user to perform an operation for a virtual object using object management controls that are concurrently displayed with the virtual object provides the user with additional control options for the virtual object without requiring additional user input to navigate complex menu hierarchies in order to access the control options.

In some embodiments, displaying the first virtual object at the first position, with the first object management user interface having the first appearance relative to the first virtual object, includes displaying the first virtual object with a first orientation relative to the first viewpoint of the user and displaying the first object management user interface with a second orientation relative to the first virtual object. In some embodiments, displaying the first virtual object at the second position, with the first object management user interface having the second appearance relative to the first virtual object, includes displaying the first virtual object with a third orientation, distinct from the first orientation, relative to the first viewpoint of the user and displaying the first object management user interface with a fourth orientation, different from the second orientation, relative to the first virtual object (e.g., the spatial relationship between the first object management user interface and the first virtual object have changed, while the spatial relationship between the first object management user interface and the first viewpoint optionally does not change or change by a different (e.g., lesser, or greater) amount). In some embodiments, the fourth orientation and the second orientation are a same orientation relative to the first viewpoint of the user, such that the first object management user interface changes its orientation relative to the first virtual object, optionally without changing the orientation of the first object management user interface relative to the first viewpoint of the user. For example, as described with reference to FIGS. 7AS2-7AT, the user provides an input for turning the object 770*a* such that the orientation of object 770*a* (e.g., relative to the current viewpoint of the user) changes while the one or more object management controls (e.g., (e.g., title bar 7106, grabber 7104*b* and/or affordance 774-2) do not rotate and/or change in position or viewing angle relative to the user's viewpoint. Automatically updating display of the object management controls for a virtual object to be displayed with a different orientation relative to the virtual object provides improved visual feedback about a state of the device and enables the user to easily view and access the object management controls without requiring the user to change the user's viewpoint or provide an input to move a position and/or viewing angle of the object management controls.

In some embodiments, displaying the first object management user interface with the first appearance relative to the first virtual object includes displaying the first object management user interface with a respective orientation that faces toward the first viewpoint (e.g., a frontal surface, a point on the front surface, or the main object of the first object management user interface has the shortest distance from the first viewpoint, as compared to other parts of the first object management user interface); and displaying the first object management user interface with the second appearance relative to the first virtual object includes displaying the first object management user interface with the respective orientation that faces toward the first viewpoint (e.g., a frontal surface, a point on the front surface, or the main object of the first object management user interface has the shortest distance from the first viewpoint, as compared to other parts of the first object management user interface) while the first object management user interface is displayed with the first virtual object displayed at the second position in the three-dimensional environment. In some embodiments, the first object management user interface is displayed as shifting, moving, rotating, and/or updating to have a same or substantially the same orientation relative to the current viewpoint of the user as the first virtual object changes in position and/or orientation in the three-dimensional environment. For example, as described with reference to 7AT, in some embodiments, the one or more object management controls (e.g., title bar 7106, grabber 7104*b* and/or affordance 774-2) shift to be displayed as facing toward the without regard to the updated orientation of object 770*b* (e.g., such that the one or more object management controls are automatically updated to be displayed at an angle that faces the user as the user's viewpoint changes). Automatically updating display of the object management controls for a virtual object such that the object management controls shift to face the user provides improved visual feedback about a state of the device and enables the user to easily view and access the object management controls without requiring the user to change the user's viewpoint or provide an input to move a position and/or viewing angle of the object management controls.

In some embodiments, displaying the first virtual object at the first position, with the first object management user interface having the first appearance relative to the first virtual object, includes displaying the first virtual object with a first size and displaying the first object management user interface with a second size (e.g., with a first relative size difference in the three-dimensional environment, and/or a first visual difference in size when viewed from the first viewpoint); and displaying the first virtual object at the second position, with the first object management user interface having the second appearance relative to the first virtual object, includes displaying the first virtual object with the first size and displaying the first object management user interface with a third size, different from the second size (e.g., with a second relative size difference in the three-dimensional environment, and/or a second visual difference in size when viewed from the first viewpoint). In some embodiments, the displayed size of the first virtual object, from the first viewpoint of the user, changes when the first virtual object moved from the first position to the second position (e.g., becomes larger when the second position is closer to the first viewpoint than the first position, and/or becomes smaller when the second position is farther away from the first viewpoint than the first position), even though the intrinsic size of the first virtual object remains unchanged. However, the displayed size of the first object management user interface is optionally not changed or change to a smaller extent than the change to the displayed size of the first virtual object, such that the content of the first object management user interface remain clear to the viewer (e.g., when the first virtual object gets farther away from the current viewpoint and becomes very small, the first object management user interface also gets farther away but increases in intrinsic size so that its displayed size is not too small to see for the user) and/or is not unnecessarily obtrusive (e.g., when the first virtual object gets closer to the current viewpoint and becomes very large, the first object management user interface also gets closer but shrinks in intrinsic size so that its displayed size is not overly large in the viewpoint). Since the change applied to the displayed size of the first virtual object and the change applied to the displayed size of the first object management user interface have different relationships to the change in distance relative to the first viewpoint (e.g., same amount of change in distance results less change in displayed size in the first object management user interface, as compared to the change in the displayed size of the first virtual object), the relative displayed size between the first virtual object and the first object management user interface changes as the position of the first virtual object (and correspondingly, the position of the first object management user interface) changes relative to the current viewpoint of the user. For example, as described with reference to FIG. 7AV, in some embodiments, the object management controls (e.g., title bar 7106, grabber 7104*b* and/or affordance 774-4) update in size based on the perceived distance between the object management controls and the viewpoint of the user (e.g., optionally by a lesser amount than the amount that size of object 770*c* is updated) after object 770*c* has been moved within the three-dimensional environment (e.g., closer and/or farther away to the viewpoint of the user). Automatically updating display of the object management controls for a virtual object to be displayed with a different size as the virtual object is moved within the AR/VR environment enables the user to easily view and access the object management controls without requiring the user to provide an input to increase and/or decrease a size of the object management controls to make controls comfortable for the user to view.

In some embodiments, displaying the first virtual object with the first size and displaying the first object management user interface with the third size includes: in accordance with a determination that the second position is farther away from the first viewpoint than the first position, increasing a size of the first object management user interface (e.g., while the size of the first virtual object remains unchanged, and/or while the visual difference in size between the first object management user interface is reduced if the first virtual object is larger than the first object management user interface); and in accordance with a determination that the second position is closer to the first viewpoint than the first position, decreasing the size of the first object management user interface (e.g., while the size of the first virtual object remains unchanged, and/or while the visual difference in size between the first object management user interface is reduced if the first virtual object is smaller than the first object management user interface). For example, as described with reference to FIG. 7AV, the object management controls are maintained at a fixed size relative to the three-dimensional environment. For example, as the object 770c changes in size (e.g., to a smaller size to be perceived as farther away from the viewpoint of the user), the one or more object management controls (e.g., affordance 774-1, grabber 7104a and/or title bar 7106) appear larger relative to the object 770c (e.g., as illustrated in FIG. 7AZ) that is decreasing in size. Automatically increasing a size of the object management controls for a virtual object as the virtual object is moved farther away from the user within the AR/VR environment, enables the user to easily view and access the object management controls without requiring the user to provide an input to increase and/or decrease a size of the object management controls to make controls legible for the user to view.

In some embodiments, displaying the first virtual object with the first size at the second position includes: in accordance with a determination that the second position is farther away from the first viewpoint than the first position, displaying the first virtual object with a reduced displayed size without changing a size of the first virtual object relative to the three-dimensional environment; and in accordance with a determination that the second position is closer to the first viewpoint than the first position, displaying the first virtual object with an increased displayed size without changing the size of the first virtual object relative to the three-dimensional environment (e.g., while the size of the first virtual object remains unchanged, the first virtual object appears larger when it is moved toward the current viewpoint, and appears smaller when it is moved away from the current viewpoint (e.g., based on a distance between the first virtual object and the current viewpoint, and optionally the orientation of the first virtual object and the current viewpoint)). For example, as described with reference to FIG. 7AV, in some embodiments, the size of object 770c, within the three-dimensional environment, does not change, but the size of object 770c as perceived by the user is updated as the object 770c is moved closer and/or farther away from the viewpoint of the user. Maintaining an intrinsic size of the virtual object relative to the AR/VR environment, such that the size of the virtual object is perceived by the user as increasing and/or decreasing as the object is moved closer and/or farther from the user's viewpoint, provides improved visual feedback about the state of the device.

In some embodiments, in response to detecting the first user input that corresponds to a request to move the first virtual object in the three-dimensional environment, the computer system moves the first object management user interface through a plurality of intermediate positions in accordance with a current position of the first virtual object between the first position and the second position, and (gradually, over a period of time) updates an appearance of the first object management user interface through a plurality of intermediate appearances (e.g., a transitional appearance (e.g., a transitional size, orientation, and/or position) from the first appearance relative to the first virtual object to the second appearance relative to the first virtual object) relative to the first virtual object, in accordance with the current position of the first virtual object between the first position and the second position. For example, as described with reference to FIG. 7AT, in some embodiments, the size and/or other visual properties of the one or more object management controls is updated gradually, over a period of time, as the object 770b is moved closer to the user, displayed as object 770c. Gradually changing one or more visual properties of object management controls for a virtual object as the virtual object is moved within the AR/VR environment, provides improved visual feedback about the state of the device to indicate to the user that the virtual object is currently selected and being moved, and that the object management controls are unavailable for interaction.

In some embodiments, in response to detecting the first user input that corresponds to a request to move the first virtual object in the three-dimensional environment, the computer system: in accordance with a determination that the first virtual object is moving in response to the first user input (e.g., changing its position in accordance with the first user input by more than a threshold amount of distance per unit of time, and/or having not stopped moving for more than a threshold amount of time), reduces visual prominence (e.g., ceases to display or makes more translucent and/or dimmed) of the first object management user interface relative to the first virtual object while the first virtual object is moving (e.g., during at least a portion of a movement of the first virtual object between the first position and the second position, and optionally, while the first virtual object continues to move after pausing at the second position); and in accordance with a determination that the first virtual object has maintained its position for at least a threshold amount of time (e.g., has stopped moving during a break of the movement in the first user input, and/or after the end of the first user input has been detected) restores the visual prominence of the first object management user interface relative to the first virtual object while the first virtual object maintains its position (e.g., after the first virtual object has stopped at the second position, and/or while the first virtual object paused at an intermediate position on its way to the second position). For example, as described with reference to FIG. 7AV, the object management controls are optionally visually deemphasized while the user is interacting with object 770c and after the object 770b is no longer being moved (e.g., the user input selecting and/or interacting with grabber 7104b is no longer detected), the one or more object management controls are no longer visually deemphasized. Automatically fading, blurring, or otherwise reducing the visual prominence of object management controls for a virtual object as the virtual object is moved within the AR/VR environment, provides improved visual feedback about the state of the device to indicate to the user that the virtual object is currently selected and being moved, and that the object management controls are unavailable for interaction.

In some embodiments, prior to detecting the first user input, the computer system displays the first virtual object at the first position in the three-dimensional environment, without concurrently displaying the first object management user interface. In some embodiments, while displaying the first virtual object at the first position without concurrently displaying the first object management user interface, the computer system detects that user's attention is directed to a first portion of the first virtual object (e.g., the first portion of the first virtual object includes a bottom portion of the first virtual object, a corner of the first virtual object, an edge of the first virtual object, a top portion of the first virtual object, or another portion of the first virtual object that corresponds to the reactive region of the first object management user interface); and in response to detecting that the user's attention is directed to the first portion of the first virtual object, in accordance with a determination that the user's attention meets first criteria with respect to the first portion of the first virtual object (e.g., the user's attention is maintained on the first portion of the first virtual object for at least a threshold amount of time, and that the first portion of the first virtual object corresponds to the reactive region for triggering display of the first object management user interface), the computer system displays the first object management user interface (e.g., displayed in proximity to the first portion of the first virtual object, overlaying the first portion of the first virtual object, and/or overlaying a portion of the physical environment adjacent to the first portion of the first virtual object), with the first virtual object at the first position in the three-dimensional environment. In some embodiments, in response to detecting that the user's attention is directed to the first portion of the first virtual object, in accordance with a determination that the user's attention does not meet the first criteria with respect to the first portion of the first virtual object (e.g., the user's attention is not maintained on the first portion of the first virtual object for at least a threshold amount of time, and/or that the first portion of the first virtual object does not correspond to the reactive region for triggering display of the first object management user interface), the computer system forgoes displaying the first object management user interface with the first virtual object at the first position in the three-dimensional environment. In some embodiments, the computer system detects the user's attention based on a user's gaze directed to the three-dimensional environment. In some embodiments, the first object management user interface is displayed with the first virtual object in response to detecting a gaze input directed to the first virtual object (and optionally, is held at the first virtual object for at least a threshold amount of time), or a portion of the first virtual object that corresponds to the first object management user interface. In some embodiments, the first object management user interface includes different types of affordances depending on which portion of the first virtual object is the target of the user's attention (e.g., if the user's attention is directed to the bottom of the first virtual object, the close affordance and/or the object move affordance are displayed; and/or if the user's attention is directed to a corner of the first virtual object, a resize affordance is displayed in proximity to that corner, or in proximity to multiple corners of the first virtual object). For example, as described with reference to FIG. 7AQ, in some embodiments, the one or more object management controls are optionally not displayed concurrently with the object 770a until a user input is detected as being directed to the object 770a (e.g., a gaze input directed to a bottom of object 770a or another portion of object 770a). Dynamically displaying object management controls for an object in response to a user gazing at a corresponding respective portion of the object in an AR/VR environment enables the user to access additional controls for the object without displaying additional controls that obscure the user's view of the AR/VR environment.

In some embodiments, displaying the first virtual object with the first object management user interface includes one or more of: displaying a respective platter user interface object that provides a reference surface on which the first virtual object is placed (e.g., a planar background platter that lies in the same plane or in a parallel plane as the first virtual object, and/or a planner support platter that lies in a plane at an angle to the upright orientation of the first virtual object), displaying a respective move affordance (e.g., a window grabber, a title bar, or another type of move affordance) that, when dragged (e.g., by a selection input followed by a movement input, and/or by a movement input while the move affordance is selected or has input focus), causes the computer system to move the first virtual object with the move affordance, displaying a respective close affordance (e.g., a button with a close symbol on it, a cross, or another type of close affordance) that, when activated (e.g., by a selection input, such as a gaze and dwell input, or a gaze in combination with an air tap or air pinch gesture), causes the computer system to close the first virtual object and cease to display the first virtual object and its associated object management user interface in the three-dimensional environment, displaying a respective resize affordance (e.g., a grabber at a corner or edge of the first virtual object) that, when dragged (e.g., by a selection input followed by a movement input, and/or by a movement input while the move affordance is selected or has input focus), causes the computer system to change a size of the first virtual object relative to the three-dimensional environment (e.g., by an amount that corresponds to the distance and direction of the drag input), displaying a respective title bar that displays a title (e.g., name, filename, nickname, object type, and/or other brief segments of textual information describing the metadata of the first virtual object) of the first virtual object, and displaying a respective object menu that, when selected, displays a plurality of selectable options corresponding to different operations that are performable with respect to the first virtual object (e.g., closing the first virtual object, sharing the first virtual object via a respective communication method, saving a copy of the first virtual object, and/or other operations that is performed with respect to the first virtual object in the three-dimensional environment via an operating system or an application associated with the first virtual object). In some embodiments, the respective platter object has a shape, such as a square, rectangle, circle, or other shape that appears as a flat surface, optionally having a size determined based on a size of the first virtual object. In some embodiments, while displaying the move affordance, such as a grabber bar, the computer system detects a user input that is directed to the move affordance and that includes a first amount of movement in a first direction, and the computer system moves the first virtual object along with the move affordance within the three-dimensional environment in accordance with the first amount of movement in the first direction. In some embodiments, while displaying the close affordance, e.g., a minimized dot and/or a close icon, the computer system detects selection of the close affordance, and the computer system cease display of the first virtual object along with the object management user interface of the first virtual object. In some embodiments, while displaying the resize affordance with the first virtual object, the computer system detects a drag input directed to the resize affordance, and the computer system changes the size of the first virtual object by an amount that is based on the direction and movement distance of the drag input. In some embodiments, a combination of two or more of the platter, move affordance, close affordance, resize affordance, title bar, and/or object menu are displayed concurrently at a given time (e.g., based on the location of the user's attention on the first virtual object). For example, as described with reference to FIG. 7AQ, object 770a is displayed with a platter 772, grabber 7104a, a title bar 7029, close affordance 774-2, a resize affordance 776, and/or an object menu (e.g., menu 774-3 for closing options, or another control menu for performing operations on object 770a). Dynamically displaying object management controls, including one or more of a move affordance, a platter, an object title bar, a close affordance, a resize affordance and/or an object menu for performing one or more operations with respect to the object, in response to a user gazing at a corresponding respective portion of the object in an AR/VR environment enables the user to access additional controls for the object without displaying additional controls that obscure the user's view of the AR/VR environment.

In some embodiments, the first object management user interface includes the respective platter user interface object; and displaying the respective platter user interface object includes displaying a simulated reflection and/or a simulated shadow of the first virtual object on the respective platter user interface object, in accordance with a spatial relationship between the first virtual object and the respective platter user interface object (and, optionally, the simulated ambient lighting in the three-dimensional environment and/or the ambient lighting in the physical environment). In some embodiments, the first virtual object sits above the platter; and a shadow and/or reflection of the first virtual object is displayed on the platter such that, as the first virtual object moves, the shadow and/or reflection on the platter also updates based on the spatial relationship between the first virtual object and the ambient lighting (e.g., simulated or actual physical lighting). For example, as described with reference to FIG. 7AQ, in some embodiments, a simulated shadow and/or reflection of three-dimensional object 770a is displayed on platter 772. Displaying a reflection of a virtual object on a platter that is displayed under the virtual object in an AR/VR environment provides improved visual feedback about the state of the device.

In some embodiments, the first object management user interface includes the respective resize affordance (e.g., optionally in addition to the platter and/or other object management user interface affordances). In some embodiments, while the first virtual object is displayed at the first position, the respective resize affordance is displayed at a first depth relative to the first viewpoint in the three-dimensional environment; and while the first virtual object is displayed at the second position, the respective resize affordance is displayed at a second depth, different from the first depth, relative to the first viewpoint in the three-dimensional environment. For example, in some embodiments, the resize affordance is displayed along an edge of the platter (e.g., corresponding to a flat surface that extends backwards in z-space). In some embodiments, the resize affordance is displayed at a position along the edge of the platter based on a position corresponding to the user input. For example, if the user gazes at a back corner of the platter, the resize affordance is displayed at the back corner of the platter. In some embodiments, as the first virtual object is moved to a new position in the three-dimensional environment, the platter is rotated such that the close affordance and grabber continues to face toward the current viewpoint, and the resize affordance displayed at a corner or edge of the platter is rotated to a different depth (e.g., deeper in the depth dimension, or shallower in the depth dimension) relative to the current viewpoint. For example, as described with reference to FIG. 7AX, in some embodiments, in response to detecting that the user's attention is directed to a back corner of platter 772 (e.g., that is displayed farther away, in z-space, from the user's current viewpoint), the resize affordance appears at the respective back corner, also displayed as being farther away, in z-space, from the user's current viewpoint. Shifting the resize affordance backwards in z-space in response to a user's gaze directed to a position that is perceived as farther away in the AR/VR environment, provides the user with improved visual feedback and provides additional control options for the user to resize a three-dimensional object from a back corner of the three-dimensional object.

In some embodiments, while displaying the first virtual object at a respective position (e.g., the first position, the second position, or another position) in the three-dimensional environment, with the first object management user interface having a respective appearance (e.g., the first appearance, the second appearance, or another appearance) relative to the first virtual object, the computer system detects first movement of a current viewpoint of the user from the first viewpoint to a second viewpoint different from the first viewpoint (e.g., due to movement of the display generation component, and/or the user in the physical environment, and/or due to simulated locomotion within a virtual three-dimensional environment). In some embodiments, in response to detecting the first movement of the current viewpoint of the user from the first viewpoint to the second viewpoint, the computer system displays, in a second view of the three-dimensional environment that corresponds to the second viewpoint of the user, including displaying the first virtual object at the respective position in the three-dimensional environment, with the first object management user interface having the respective appearance relative to the first virtual object (e.g., as the viewpoint of the user changes, the object management user interface (and optionally the first virtual object) remain at a same position relative to the three-dimensional environment (e.g., the object management user interface does not update to follow or face the current viewpoint of the user)). In some embodiments, if the first virtual object moves to a new position within the three-dimensional environment, while the viewpoint remains unchanged, the object management user interface updates (e.g., its position and/or orientation) to continue to face toward the viewpoint of the user from the new position of the first virtual object. For example, as described with reference to FIG. 7AZ, the one or more object controls are optionally maintained at a same position relative to object 770h in the current view after the user has moved in the three-dimensional environment, while the one or more object management controls automatically update in response to the object moving (e.g., as the user is moving object 770b, the one or more object management controls change in size and/or position based on the movement of object 770b, as described with reference to FIG. 7AU). Automatically updating an appearance of the object management controls when the object has been moved, but not when the user's viewpoint has moved without moving the object within the AR/VR environment, provides the user with improved visual feedback of the user's interactions and where the computer system detects the user's attention.

In some embodiments, while displaying the first virtual object at the respective position in the second view of the three-dimensional environment that corresponds to the second viewpoint of the user, with the first object management user interface having the respective appearance relative to the first virtual object, the computer system detects a second user input (e.g., a direct air gesture such as an air tap or air pinch at a location with which the user is interacting, an indirect air gesture such as an air pinch while attention of the user or gaze of the user is directed toward at a location with which the user is interacting a gaze and pinch gesture, a gaze and drag gesture, or another type of user input) that corresponds to a request to move the first virtual object in the three-dimensional environment (e.g., to a third position different from the respective position). In some embodiments, in response to detecting the second user input that corresponds to a request to move the first virtual object in the three-dimensional environment, the computer system: displays, in the second view of the three-dimensional environment, the first virtual object at a third position, different from the respective position, in the three-dimensional environment, wherein the first virtual object is displayed at the third position with the first object management user interface having a third appearance (e.g., a third relative spatial relationship (e.g., angle, orientation, and/or distance) and/or relative size) relative to the first virtual object, different from the respective appearance. In some embodiments, the first object management user interface updates to maintain a same angle and/or size relative to the current viewpoint of the user, such that the first object management user interface updates in a different manner than the updates to the first virtual object that is displayed at a different position in the three-dimensional environment according to the second user input. For example, the second user input can rotate and/or move the first virtual object away from the user, but the first object management user interface is adjusted to be displayed at a preferred angle and/or size relative to the second viewpoint of the user. In some embodiments, the object management user interface is optionally moved in the three-dimensional environment in response to direct interaction with the object management user interface (e.g., a grabber moves in the three-dimensional environment in response to a drag input directed to the grabber, and/or a resize affordance moves in the three-dimensional environment in response to a drag input directed to the resize affordance). For example, as described with reference to FIG. 7BB, in response to detecting a user input corresponding to a request to move the object 770*i*, the one or more object management controls are shifted to a preferred angle and/or size such that they are easily viewed by the user at the user's current viewpoint. Automatically updating display of the object management controls for a virtual object to be displayed at an angle that faces the user and/or with a size that is comfortable for the user to view after the virtual object is moved within the AR/VR environment enables the user to easily view and access the object management controls without requiring the user to provide an input to change an angle and/or increase and/or decrease a size of the object management controls to make controls legible for the user.

In some embodiments, while displaying the first virtual object, the computer system detects, via the one or more input devices, a first gaze input that meets first criteria, wherein the first criteria require that the first gaze input is directed to a first portion of the three-dimensional environment (e.g., in a bottom portion of the first virtual object, and/or in a portion of the three-dimensional environment that corresponds to the location of the platter and/or grabber of the first virtual object) in order for the first criteria to be met. In some embodiments, in response to detecting that the first gaze input meets the first criteria, the computer system displays a close affordance for the first virtual object (e.g., adjacent to the grabber, and/or below the bottom portion of the first virtual object), wherein the close affordance was not displayed prior to detecting that the first gaze input met the first criteria. In some embodiments, the first object management user interface includes the platter and the grabber, and not close affordance initially, and the close affordance is displayed in response to detecting a gaze input directed to the platter and/or the grabber, and/or a region of the three-dimensional environment immediately surrounding the bottom portion of the first virtual object. For example, as described with reference to FIG. 7AQ, in some embodiments, the one or more object management controls (e.g., affordance 774-1 and/or close affordance 774-2) are displayed in response to detecting a user input directed to object 770*a*, for example, in response to detecting a gaze input (e.g., directed to a bottom portion, or other respective portion or region, of the object 770*a*), or another gesture directed to object 770*a*, the one or more object management controls, such as the close affordance, are displayed. Dynamically displaying a close control near a grabber for moving an object, in response to a user gazing at a corresponding respective portion of the object enables the user to access additional controls for the application window without displaying additional controls that obscure the user's view of the AR/VR environment.

In some embodiments, before displaying the close affordance in response to detecting the first gaze input that meets the first criteria, the computer system displays the first virtual object, concurrently with a move affordance for the first virtual object and a preview of the close affordance (e.g., a dot affordance is displayed next to a grabber bar, optionally under the platter of the first virtual object); and replaces display of the preview of the close affordance with display of the close affordance in response to detecting that the first gaze input meets the first criteria. In some embodiments, the preview of the close affordance expands to become a close affordance that includes an icon and/or text "close." For example, as described with reference to FIG. 7AQ, in response to detecting the user's attention 710-36 (e.g., a gaze input) directed to affordance 774-1, affordance 774-1 expands to display close affordance 774-2 and/or to display title bar 7029, as illustrated in FIG. 7AR. In some embodiments, close affordance 774-2 is an expanded version of affordance 774-1. For example, close affordance 774-2 includes an icon and/or text (e.g., an "x" icon). Automatically displaying a respective control, such as a minimized dot that can be expanded into a close control, before detecting a user's gaze to access the close control, reduces the number of inputs needed to access the close control without obscuring the user's view of the AR/VR environment by continuing to display the minimized dot without requiring user input In some embodiments, while displaying the close affordance with the first virtual object, the computer system detects, via the one or more input devices, a user input (e.g., a gesture, such as a gaze and pinch gesture or other air gesture) directed to the close affordance. In some embodiments, in response to detecting the user input directed to the close affordance, in accordance with a determination that the user input directed to the close affordance meets closing criteria (e.g., the gesture is a pinch gesture detected in conjunction with a gaze input directed to the close affordance, and/or the user input is a selection input performed at a location of the close affordance), the computer system ceases display of the first virtual object (e.g., and ceasing display of the first object management user interface). For example, as described with reference to FIG. 7AR, in some embodiments, in response to user selection of close affordance 774-2, object 770*a* ceases to be displayed (e.g., is closed). Enabling a user to perform an operation, such as closing a virtual object such that the virtual object is no longer displayed in the AR/VR environment, by performing an air gesture without requiring the user to connect, set up, or use a separate input device to perform the operation, reduces the number of inputs needed, and provides improved visual feedback about the user's input.

In some embodiments, aspects/operations of methods 800, 900, 1000, 1100, 1200, 1400, 1500, 1600, 1800, and 20000 may be interchanged, substituted, and/or added between these methods. For brevity, these details are not repeated here.

FIG. 14 is a flow diagram of an exemplary method 1400 for closing different applications or groups of applications in a three-dimensional environment in response to different inputs, in accordance with some embodiments. In some embodiments, method 1400 is performed at a computer system (e.g., computer system 101 in FIG. 1) that is in communication with one or more display generation components (e.g., display generation component 120 in FIGS. 1A, 3, and 4 or display generation component 7100) and one or more input devices (e.g., a camera (e.g., color sensors, infrared sensors, and other depth-sensing cameras) that points downward at a user's hand and/or forward from the user's head, a button, a dial, a rotatable input element, a switch, a moveable hardware input device, or a solid-state hardware input device). In some embodiments, the method 1400 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1400 are, optionally, combined and/or the order of some operations is, optionally, changed.

While displaying (e.g., in a three-dimensional environment such as an XR three-dimensional environment), via the one or more display generation components, a user interface of a first application (e.g., additionally displaying applications other than the first application) concurrently with a close affordance associated with the user interface of the first application, the computer system detects (1402) a first input directed to (e.g., corresponding to, or on) the close affordance. In some embodiments, the method further includes detecting another input that immediately precedes the first input (e.g., a hover input, gaze input, or other input based on a body posture of the user) that causes the close affordance to expand.

In response to detecting the first input: in accordance with a determination that the first input is a first type of input (e.g., long press, or a gaze exceeding a dwell time threshold), the computer system displays (1404) a first option (e.g., in a context menu, in a pop-up user interface element) to close applications other than the first application. In some embodiments, the first option to close applications other than the first application is displayed in accordance with a determination that other apps are displayed.

For example, in FIG. 7BC, in response to detecting user input 7210, and in accordance with a determination that user input 7210 is a first type of input that is directed to close affordance 7212, computer system 101 displays option 7216-4 in FIG. 7BD to close applications other than the application associated with close affordance 7212 (e.g., Application D).

Displaying an option to close applications other than the first application in accordance with a determination that the first input is a first type of input helps to reduce clutter in the three-dimensional environment. Displaying the option after detecting a user input indicating that the user is likely intending to interact with the close affordance, improves efficiency and productivity of the user when interacting with the computer system in a three-dimensional environment.

In some embodiments, the first input is detected while displaying the user interface of the first application concurrently with one or more user interfaces for one or more applications other than the first application. In some embodiments, the computer system detects a second input directed to (e.g., corresponding to, or on) the first option to close applications other than the first application and, in response to detecting the second input, ceases to display the one or more user interfaces for the one or more applications other than the first application (e.g., ceasing to display the one or more user interfaces for the one or more applications includes closing the one or more applications, and/or transitioning the one or more applications to run in the background, without displaying user interfaces of the one or more applications). For example, in response to detecting user input 7218 directed to option 7216-4 in FIG. 7BD to close applications other than Application D, computer system 101 ceases to display user interface 7202 of Application A, user interface 7204 of Application C, and user interface 7206 of Application B, as shown in FIG. 7BE. Closing applications other than the first application after the user selects the displayed option helps to reduce clutter in the three-dimensional environment to allow the user to focus on interacting with the current application of interest, and reduces the number of inputs and amount of time needed to close other application user interfaces by enabling control over the closing of the other application user interfaces from the close affordance displayed at the current application.

In some embodiments, determining that the first input is the first type of input includes determining that the first input includes a hand gesture (e.g., a direct air gesture such as an air tap or air pinch at a location with which the user is interacting, an indirect air gesture such as an air pinch while attention of the user or gaze of the user is directed toward at a location with which the user is interacting a tap gesture, a pinch gesture, a long press gesture, a long pinch gesture, and/or other gestures). For example, in FIG. 7BC, user input 7210 is an air gesture (e.g., a pinch, or a long press) that is directed to close affordance 7212. Detecting the first input as an air gesture allows the close affordance to be activated in a manner that is ergonomic and that reduces an amount of time needed to perform a respective operation on the computer system.

In some embodiments, in response to detecting the first input: in accordance with a determination that the first input is a second type of input (e.g., meeting targeted closing criteria that include requirements for closing only a specific application, including a time-based criterion that requires the first input to be maintained for less than a first threshold amount of time and/or requiring less than a first threshold amount of movement, a short pinch, and/or a gaze shorter than a dwell time threshold) different from the first type of input, the computer system closes the first application including ceasing to display the user interface of the first application (e.g., without closing applications other than the first application) (e.g., including transitioning the one or more applications to run in the background, forgoing displaying user interfaces of the one or more applications, and/or closing the application user interface of the first application optionally without displaying the first option for closing applications other than the first application). For example, as described herein with reference to FIGS. 7BI and 7BK, in accordance with a determination that the user input that triggered display of option list 7246-1 is a second type of input different from the first type of input directed to close affordance 7212 as described with reference to FIGS. 7BC-7BD, computer system 101 ceases to display user interface 7208 of Application D, as shown in FIG. 7BK (e.g., without first displaying option list 7246-1 and requiring selection of option 7216-2 to close user interface 7208). Closing the first application in response to the first input and in accordance with a determination that the first input is a second type of input, instead of the first type of input that can be used to close other applications, enables different operations to be performed in less time and without displaying additional controls, simply by providing different types of inputs.

In some embodiments, criteria for detecting the first type of input include a requirement that a respective set of one or more criteria including a time-based criterion be met in order for the first type of input to be detected (e.g., a time-based criterion that requires the first input to be maintained for at least a first threshold amount of time (optionally, with less than a threshold amount of movement), such as where the first type of input is a long pinch and press, and/or a gaze exceeding a dwell time threshold). In some embodiments, criteria for detecting the second type of input do not include the requirement that the respective set of one or more criteria including the time-based criterion be met in order for the second type of input to be detected. In some embodiments, the criteria for detecting the second type of input includes a requirement that the first input be maintained for less than the threshold amount of time in order for the second type of input to be detected (e.g., the second type of input is a tap gesture, a short pinch, a hand gesture that was maintained for less than the first threshold amount of time (optionally, with less than a threshold amount of movement), a hand gesture that includes hand movements exceeding a speed threshold, and/or a gaze that is shorter than the dwell time threshold). For example, the first type of input requires a time-based criterion to be met (e.g., the first type of input is a long press or long pinch air gesture or other longer gesture), as described herein with reference to FIG. 7BC, whereas the second type of input does not require the time-based criterion to be met (e.g., the second type of input is a tap or pinch air gesture or other shorter gesture), as described herein with reference to FIGS. 7BI and 7BK. Allowing the user to directly close the application by using a tap input, and presenting one or more options to the user in response to detecting a long press disambiguates user intent based on the type of input provided, which enables different responses of the application user interface to be performed without displaying additional controls.

In some embodiments, in response to detecting the first input: in accordance with the determination that the first input is the first type of input, the computer system displays a second option to close only the first application (e.g., in conjunction with or concurrently with displaying the first option to close applications other than the first application). In some embodiments, closing only the first application includes ceasing to display only one or more user interfaces of the first application (e.g., only the user interface where with which the close affordance is associated and displayed, multiple user interfaces of the first application, or all user interfaces of the first application) and maintaining display of user interfaces of applications other than the first application. For example, as described herein with reference to FIG. 7BD (e.g., FIGS. 7BD1, 7BD2 and 7BD3), in accordance with a determination that user input 7210 is the first type of input, computer system 101 displays option 7216-2 for closing the user interface of the application associated with close affordance 7212 to which user input 7210 is directed (e.g., Application D), concurrently with displaying option 7216-4 for closing applications other than the application associated with close affordance 7212. Displaying an additional option to close only the current application allows the user to quickly select which application user interface(s) should remain open and which application user interface(s) should be closed without having to navigate through additional user interface elements to make a selection, thereby reducing the number of inputs and amount of time needed to perform a respective operation on the computer system.

In some embodiments, the computer system detects an input corresponding to a request to close one or more user interfaces of one or more applications. In some embodiments, in response to detecting the input corresponding to the request to close the one or more user interfaces of the one or more applications, the computer system: closes the one or more user interfaces of the one or more applications; and, in accordance with a determination that respective criteria are met (e.g., that no other application user interface is open in the three-dimensional environment when the one or more user interfaces of the one or more applications were closed), displays a home menu user interface at a first location (e.g., the first location is determined based on respective positions of the one or more user interfaces of the one or more applications in the three dimensional environment, as described in further detail herein with reference to method 1600). For example, in FIG. 7BE, user input 7220 is directed to option 7216-2 for hiding user interface 7208 associated with close affordance 7212-2. In response to detecting user input 7220, computer system 101 hides user interface 7208 of application App D and, in accordance with a determination that no user interface of any application is visible in the viewport, automatically displays home menu user interface 7222 without any additional user input, as shown in FIG. 7BF. Displaying a home menu user interface when no application user interfaces are displayed (e.g., due to the last application(s) being closed, and/or due to a system reboot) causes the computer system to automatically (e.g., without requiring additional user input, and/or preempting a user input) present a user interface with which the user can interact after other interactive user interfaces have been dismissed, thereby reducing an amount of time needed for the user to continue interacting with the computer system in the three-dimensional environment.

In some embodiments, the close affordance associated with the user interface of the first application is displayed within a threshold distance (e.g., within 0.1, 0.2, 0.3, 0.5, 1, 2, 3, 5, or 10 inches) of the user interface of the first application. In some embodiments, the user interface of the first application has a first dimension, and the close affordance is displayed at a distance from a boundary of the user interface that is within 30% of the first dimension, along a direction of the first dimension. For example, as described herein with reference to FIG. 7BC, close affordance 7212-1 is displayed in proximity to user interface 7208 at a distance g2 away from an edge (e.g., a lower edge or a top edge) of user interface 7208, in a direction of or parallel to dimension d2, and at a distance g1 away from an edge (e.g., a left edge or a right edge) of user interface 7208, in a direction of or parallel to dimension d1, and distance g1 is less than 30%, 20%, 15%, 10%, 5%, 1%, or other threshold percentage of dimension $d_1$ and/or distance g2 is less than 30%, 20%, 15%, 10%, 5%, 1%, or other threshold percentage of dimension d2. Displaying the close affordance near the application user interface reduces the cognitive burden and amount of time required for the user to find the close affordance within the three-dimensional environment, and provides improved visual feedback about which application user interface the close affordance controls.

In some embodiments, the close affordance associated with the user interface of the first application is displayed in proximity to an application grabber user interface element of the user interface of the first application (e.g., the application grabber user interface element is activatable for selecting and optionally repositioning/moving the user interface of the first application). In some embodiments, the computer system detects an input corresponding to activation of the application grabber user interface element and, in response to detecting the input corresponding to the activation of the application grabber user interface element, initiates (e.g., enables a mode for) repositioning of user interface of the first application (e.g., in response to movement of the input corresponding to activation of the application grabber user interface element, the movement of the input optionally including movement in x-, y-, and/or z-directions or in polar, azimuthal, and/or radial directions in three-dimensional space). In some embodiments, the application grabber user interface element is positioned along one or more boundaries of the user interface of the first application. In some embodiments, a distance between the application grabber user interface element and the user interface of the first application is within 1-30% of a dimension of the user interface of the first application, and the close affordance is displayed at a first distance from the application grabber user interface element, wherein the first distance is less than a longest dimension of the application grabber user interface element. In some embodiments, the close affordance is outside of a platter of the user interface of the first application. In some embodiments, the close affordance is adjacent to the application grabber user interface element, and/or the close affordance is collinear with the application grabber user interface element. For example, in FIGS. 7BC and 7BD (e.g., FIGS. 7BD1, 7BD2 and 7BD3), close affordances 7212-1 and 7212-2 are each displayed close to and/or collinear with another auxiliary user interface element of user interface 7208, such as grabber 7214. Displaying the close affordance near the application grabber user interface element (e.g., which can be used to reposition the user interface of the first application, and/or perform other manipulation of the user interface of the first application) presents user interface elements that control display of the user interface of the first application in closer proximity, reducing the cognitive burden and amount of time required for the user to find the close affordance within the three-dimensional environment, and provides improved visual feedback about which application user interface the close affordance controls and which other user interface element(s) control the same application user interface.

In some embodiments, the computer system detects that attention of a user is directed to the close affordance and, in response to detecting that the attention of the user is directed to the close affordance, increases a size (e.g., an area, and/or a volume) of the close affordance (e.g., the first input directed to the close affordance is detected while the close affordance is displayed with the increased size). In some embodiments, the close affordance at least partially reverses the increase in size (e.g., shrinks, decreases in size, returns to its original size prior to expanding in response to detecting the attention of the user) when attention of the user is no longer directed to the close affordance. In some embodiments, detecting the attention of the user being directed to the close affordance includes a determination that the attention of the user meets a gaze dwell time threshold. For example, as described herein with reference to FIGS. 7BC-7BD, in response to detecting a portion of user input 7210 that includes a gaze input directed to close affordance 7212-1 (e.g., directly on or in proximity to close affordance 7212-1) (FIG. 7BC), computer system 101 displays expanded close affordance 7212-2 as shown in FIG. 7BD. Expanding the close affordance on gaze provides a more ergonomic way for the user to select an option for closing one or more application user interfaces and provides improved visual feedback indicating to the user which element in the three-dimensional environment has focus for further interaction.

In some embodiments, in response to detecting the first input: in accordance with a determination that the first input is a second type of input (e.g., a short pinch or quick pinch on the (optionally expanded) close affordance, or a gaze directed to the close affordance for shorter than the dwell time threshold (e.g., while the close affordance is expanded)) different from the first type of input, the computer system displays a second option (e.g., in a context menu, in a pop-up user interface element, or other user interface element) to close a plurality of (or, optionally, all) application user interfaces associated with the first application. In some embodiments, the second option to close a plurality of (or, optionally, all) application user interfaces associated with the first application is displayed in accordance with a determination that more than one application user interface associated with the first application are displayed. In some embodiments, the second option to close a plurality of (or, optionally, all) application user interfaces associated with the first application is displayed in conjunction with or concurrently with displaying a third option to close the user interface of the first application (e.g., the user interface with which the close affordance is associated) without closing other user interfaces associated with the first application. For example, as described herein with reference to FIGS. 7BI and 7BK, in response to detecting a user input directed to close affordance 7212 (e.g., displayed as close affordance 7212-1, or as close affordance 7212-2), and in accordance with a determination that the user input is a second type of input such as a quick pinch shorter than a pinch threshold time and/or a pinch gesture that includes a movement velocity above a velocity threshold, computer system 101 displays option 7246-3 (e.g., labeled "Hide All of This App") to hide all user interfaces of the application associated with close affordance 7212. Displaying an option (or an additional option) to hide a plurality of (or, optionally, all) application user interfaces for the first application allows the user to quickly select which application user interface(s) should remain open and which application user interface(s) should be closed without having to navigate through additional user interface elements to make a selection, thereby reducing the number of inputs and an amount of time needed to perform respective operations on the computer system.

In some embodiments, aspects/operations of methods 800, 900, 1000, 1100, 1200, 1300, 1500, 1600, 1800 and 20000 may be interchanged, substituted, and/or added between these methods. For brevity, these details are not repeated here.

FIG. 15 is a flow diagram of an exemplary method 1500 for displaying a control object for a virtual object, and in response to detecting a selection input followed by movement, reducing a prominence of the control object, optionally without changing a prominence of the virtual object, in accordance with some embodiments. Method 1500 describes displaying controls for an object and automatically reducing a prominent of the controls while the object is moved within the AR/VR environment. Automatically updating a control for a virtual object in response to detecting that the object is moving within the AR/VR environment, without requiring additional user input, enables the user to continue to access the control to perform an operation, and provides improved visual feedback by indicating the controls are not available for interaction while the object is being moved.

In some embodiments, method 1500 is performed at a computer system that is in communication with a first display generation component (e.g., a first display generation component of a two-sided display generation component, a heads-up display, a head-mounted display (HMD), a display, a touchscreen, a projector, a standalone display, and/or a display that is enclosed in the same housing as another display generation component of the same type or a different type) having a first display area (e.g., corresponding to a three-dimensional environment and/or corresponding to a screen area) and one or more input devices (e.g., cameras, controllers, touch-sensitive surfaces, joysticks, buttons, gloves, watches, motion sensors, and/or orientation sensors). In some embodiments, the first display generation component is a display component facing the user and provides an XR experience to the user. In some embodiments, the first display generation component includes two or more display components (e.g., one set for each eye) that display slightly different images to form a stereoscopic view of the three-dimensional environment. In some embodiments, the first display generation component and a second display generation component form a two-sided display device (e.g., a two-sided HMD) that displays a first user interface on a first side corresponding to the first display generation component, and a second user interface on the second side corresponding to the second display generation component. In some embodiments, the second display generation component is a display component facing away from the user and toward an external environment of the user and optionally provides status information related to the first display generation component (e.g., displayed content and/or operational state) and/or the user (e.g., movement of the user's eyes, and/or attention state of the user) to other users in the external environment. In some embodiments, the computing system is an integrated device with one or more processors and memory enclosed in the same housing as the first and the second display generation components and at least some of the one or more input devices. In some embodiments, the computing system includes a computing component (e.g., a server, a mobile electronic device such as a smart phone or tablet device, a wearable device such as a watch, wristband, or earphones, a desktop computer, or a laptop computer) that includes one or more processors and memory that is separate from the display generation component(s) and/or the one or more input devices. In some embodiments, the display generation component(s) and the one or more input devices are integrated and enclosed in the same housing. In some embodiments, the method 1500 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1500 are, optionally, combined and/or the order of some operations is, optionally, changed.

The computer system displays (1502), via the first display generation component, a first object (e.g., a window, a user interface object that displays content, a model, and/or another type of virtual object that can be closed and manipulated by a user in one or more manners using corresponding control objects displayed concurrently with the first object (e.g., resized, reshaped, rotated, and/or split or combined with other object(s))) at a first position in a first view of a three-dimensional environment.

While displaying, via the first display generation component, the first object at the first position in the first view of the three-dimensional environment, the computer system displays (1504) a first set of one or more control objects, wherein a respective control object of the first set of one or more control objects corresponds to a respective operation applicable to the first object (e.g., the control objects include a resize affordance for resizing and/or reshaping the first object, a closing affordance for closing the first object, a rotation affordance for rotating the first object, a grabber for moving the first object, and/or another affordance for changing another aspect of the first object) (e.g., a second object displayed in the first view optionally has its own set of control objects that correspond to different operations that are applicable to the second object, such that the user can use the respective set of control objects to perform operations to the corresponding object, and not to other objects in the same view). In some embodiments, the first set of one or more control objects includes a close affordance for first object. In some embodiments, the first set of one or more control objects are displayed with the first object in response to detecting a respective user input that corresponds to a request to display the first set of control objects (e.g., a gaze directed to the first object, formation of a ready state gesture while gazing at the first object, or other input indicating that the user intends to interact with the first object), and/or occurrence of an event (e.g., an event generated or detected by the computer system) that meets the condition for displaying the first set of control objects for the first object). In some embodiments, the operations that are applicable to the first object are different from operations that are performed in response to interaction with the content of the first object. For example, operations that are applicable to the first object changes the first object, based on input directed to one of the first set of control objects; and not based on input directed to the content of the first object. For example, as described with reference to FIG. 7AQ, one or more object management controls are displayed for performing operations with respect to object 770a.

The computer system detects (1506), via the one or more input devices, a first user input (e.g., a gaze and pinch gesture or another selection gesture, followed by a drag gesture; or other types of user inputs that selects and moves (e.g., translates, and/or rotates) the first object) that corresponds to a request to move the first object in the three-dimensional environment. In some embodiments, the first user input is directed to a first control affordance (e.g., a grabber or other object that is displayed for changing an orientation and/or position of the first object) that is associated with the first object. In some embodiments, the first user input is directed to a portion of the first object directly (e.g., not requiring a grabber to be displayed or used), and the request for moving the object is detected based on an input type of the first user input. For example, as described with reference to FIG. 7AT, in response to detecting the user's attention 7110-39 directed to grabber 7104*b*, the computer system detects an input for moving object 770*b* using the grabber 7104*b*.

In response to detecting the first user input that corresponds to a request to move the first object in the three-dimensional environment (1508), the computer system: moves the first object from the first position to a second position (e.g., the second position determined in accordance with the first user input, such as a position to which the first user input moves and/or drags the first object), and while moving the first object from the first position to the second position, visually deemphasizes (e.g., reduces a size, ceases to display, blurs, fades, darkens, makes more translucent, and/or otherwise reduces a visual prominence of), relative to the first object, at least one of the first set of one or more control objects that corresponds to the respective operation that is applicable to the first object (e.g., the closing affordance, the resizing affordance, the grabber for translation, the rotation affordance, or other one or more control affordances that correspond to operations that become non-applicable to the first object during the movement of the first object). For example, in some embodiments, a first control object and a second control object of the first set of one or more control objects are visually deemphasized (e.g., cease to be displayed, blurred, faded, and/or otherwise visually deemphasized). In some embodiments, the first control object is visually deemphasized in a first manner and the second control object is visually deemphasized in a second manner, optionally distinct from the first manner. For example, the first control object (e.g., a close affordance and/or grabber) ceases to be displayed while the second control object (e.g., a resizing affordance) is faded. In some embodiments, one or more controls objects of the first set of one or more control objects are not visually deemphasized while moving the first object. For example, in some embodiments, the first control object is visually deemphasized while a third control object of the first set of one or more control objects is not visually deemphasized. For example, as described with reference to FIG. 7AV, the object management controls (e.g., such as affordance 774-4, and/or title bar 7106) are optionally visually deemphasized while the user is moving object 770*c* (e.g., moving object 770*c* using grabber 7104*b*).

In some embodiments, the at least one of the first set of one or more control objects that is visually deemphasized during movement of the first object from the first position to the second position includes a closing affordance, and the method includes: while displaying the closing affordance with the first object (e.g., after the movement to the second position is completed and the visual prominence of the closing affordance is restored), detecting a second user input (e.g., a direct air gesture such as an air tap or air pinch at a location with which the user is interacting, an indirect air gesture such as an air pinch while attention of the user or gaze of the user is directed toward at a location with which the user is interacting a gaze and tap, a gaze and pinch, or another type of selection input) selecting the closing affordance; and in response to detecting the second user input selecting the closing affordance, ceasing to display the first object in the three-dimensional environment (e.g., along with the first set of one or more control objects). For example, in some embodiments, when the first object is stationary in the three-dimensional environment, the close affordance is displayed with the first object in the three-dimensional environment (optionally with a move affordance for the first object), and in response to detecting a user input that corresponds to move the first object (e.g., a selection and drag input directed to the move affordance, and/or a gaze directed to the grabber followed by a pinch and drag gesture), the computer system moves the first object in accordance with the user input and ceases to display the close affordance or make the close affordance less visible during the movement of the first object. For example, as described with reference to FIG. 7AQ, in some embodiments, the one or more object management controls include close affordance 774-2, that, when selected by the user, causes the computer system to cease display of object 770*a*. In some embodiments, as described with reference to FIG. 7AV, the object management controls (e.g., such as affordance 774-4 (e.g., a close affordance) and/or one or more other object management controls) are optionally visually deemphasized while the user is moving object 770*c* (e.g., moving object 770*c* using grabber 7104*b*). Dynamically displaying a close control for closing a virtual object, and visually deemphasizing the close control while the virtual object is moved within the AR/VR environment reduces the number of inputs needed to close the virtual object without displaying additional controls and improves visual feedback by indicating the close control is not available for interaction while the virtual object is moved.

In some embodiments, the at least one of the first set of one or more control objects that is visually deemphasized during movement of the first object from the first position to the second position includes a resizing affordance. In some embodiments, the computer system, while displaying the resizing affordance with the first object (e.g., after the movement to the second position is completed and the visual prominence of the resizing affordance is restored), detects a third user input selecting and dragging the resizing affordance (e.g., detects a pinch and drag user input such as a pinch and drag air gesture at a location of the resizing affordance, and/or detecting a drag gesture while the resizing affordance has input focus and/or is a target of the gaze input such as a pinch and drag air gesture); and in response to detecting the third user input selecting and dragging the resizing affordance, resizes the first object in accordance with the third user input (e.g., without moving at least a portion of the first object in the three-dimensional environment). In some embodiments, the user input selects and dragging the resizing affordance moves or otherwise shifts the selected resizing affordance in a respective direction, wherein the first object is enlarged or shrunken in size in accordance with the respective direction that the resizing affordance is dragged. For example, as described with reference to FIG. 7AQ, in some embodiments, the one or more object management controls include a resize affordance (e.g., resize affordance 776), that, when selected by the user, causes the computer system change the size of object 770*a*. In some embodiments, as described with reference to FIG. 7AZ, the object management controls (e.g., such as resize affordance 776-1 and/or one or more other object management controls) are optionally visually deemphasized while the user is resizing the object 770*g*. Allowing the user to resize a virtual object by providing an input that selects and moves a resize control and visually deemphasizing the resize control while the virtual object is moved within the AR/VR environment, reduces the number of inputs needed to move the object without displaying additional controls and improves visual feedback by indicating the resize control is not available for interaction while the virtual object is moved.

In some embodiments, visually deemphasizing, relative to the first object, the at least one of the first set of one or more control objects includes visually deemphasizing a first respective control object that corresponds to a first respective operation applicable to the first object and a second respective control object that corresponds to a second respective operation applicable to the first object (e.g., including two or more control affordances that correspond to operations that become non-applicable to the first object during the movement of the first object). For example, as described with reference to FIG. 7AV, as the user moves object 770c (e.g., using grabber 7104b), the one or more object management controls, such as affordance 774-4, grabber 7104b and/or title bar 7106 are optionally blurred, faded, decreased in size and/or ceased to be displayed. Automatically visually deemphasizing a plurality of object management controls for a virtual object while the virtual object is moved within the AR/VR environment, provides the user with additional control options for interacting with the virtual object and improves visual feedback by indicating when the plurality of object management controls are not available for interaction while the virtual object is moved.

In some embodiments, visually deemphasizing the at least one of the first set of one or more control objects relative to the first object during the movement of the first object, includes visually deemphasizing a fourth respective control object that corresponds to a fourth respective operation applicable to the first object (e.g., including one or more control objects such as the close affordance and/or the resize affordance) without visually deemphasizing a third respective control object that corresponds to a third respective operation applicable to the first object (e.g., including one or more control objects, such as the platter and/or the move affordance). For example, as described with reference to FIG. 7AV, in some embodiments, a subset, less than all, of the one or more object management controls are visually deemphasized while the user is interacting with object 770c. For example, platter 772 and/or grabber 7104b (e.g., and/or one or more other object management controls) are not visually deemphasized as the user moves the object 770c, while affordance 774-4 and/or title bar 7106 are visually deemphasized. Automatically visually deemphasizing at least one of the object management controls for a virtual object, without visually deemphasizing at least one of the other object management controls, while the virtual object is moved within the AR/VR environment, provides the user with additional control options for interacting with the virtual object and improves visual feedback by indicating which of the of object management controls are not available for interaction while the virtual object is moved.

In some embodiments, while displaying a fifth respective control object (e.g., the first control object, the second control object, or another control object) of the first set of one or more control objects with the first object (e.g., after the movement to the second position is completed and the visual prominence of the first control is restored, and/or before the movement of the first object is started), the computer system detects a fourth user input (e.g., a direct air gesture such as an air tap or air pinch at a location with which the user is interacting, an indirect air gesture such as an air pinch while attention of the user or gaze of the user is directed toward at a location with which the user is interacting a gaze and tap, a gaze and pinch, or another type of selection input) selecting the fifth respective control object; and in response to detecting the fourth user input selecting the fifth respective control object of the first set of one or more control objects, in accordance with a determination that the fifth respective control object is associated with a plurality of control options for performing respective operations with respect to the first object, displays the plurality of control options (e.g., with the first object, or obscuring at least a portion of the first object). For example, in some embodiments, in accordance with a determination that the respective control object is a close affordance, the computer system displays options for closing the first object or hiding the first object from the current view, respectively. In some embodiments, in accordance with a determination that the respective control object is a resize affordance, the computer system displays options for resizing with an anchor at the center of the object, or with an anchor at an edge or corner of the object). For example, as described with reference to FIG. 7AS1 and method 1400 (e.g., and FIGS. 7BC-7BL), in some embodiments, close affordance 774-2 includes a plurality of options for closing one or more objects and/or application windows. In some embodiments, the menu 774-3 is displayed in accordance with a determination that the user's attention 774-2 is directed to affordance 774-1 (e.g., from the display in FIG. 7AQ to FIG. 7AS1 directly) and/or to close affordance 774-2 (e.g., from the display in FIG. 7AQ to FIG. 7AR to FIG. 7AS1) for at least a threshold amount of time, or satisfies one or more other attention criteria. Dynamically displaying a menu with object management options for a virtual object in response to a user input directed to a close control enables the user to access additional controls for the virtual object without displaying additional controls that obscure the user's view of the AR/VR environment and reduces the number of inputs required to navigate complex menu hierarchies.

In some embodiments, visually deemphasizing the at least one of the first set of one or more control objects while moving the first object includes: displaying a sixth respective control object of the at least one of the first set of one or more control objects with a smaller size relative to a size of the sixth respective control object before the first object started moving. For example, the closing affordance, the resize affordance or another control object is displayed with a reduced size while the first object is being moved, and returns to its normal size after the move of the first object is stopped. In some embodiments, after the first object stops moving for at least a threshold amount of time, the computer system restores the size of the closing affordance, the resize affordance, or another control object, at a new position associated with the current position of the first object. For example, as described with reference to FIG. 7AV, as the user moves object 770c (e.g., using grabber 7104b), the one or more object management controls, such as affordance 774-4, grabber 7104b and/or title bar 7106 optionally decrease in size. Automatically reducing a visual prominence of a respective control, such as reducing a size of the respective control, while the virtual object is being moved within the AR/VR environment, improves the visual feedback by continuing to display the control, with a reduced prominence as to not obscure the user's view of the AR/VR environment.

In some embodiments, visually deemphasizing the at least one of the first set of one or more control objects while moving the first object includes: ceasing to display a seventh respective control object of the at least one of the first set of one or more control objects during at least a portion of the movement of the first object. For example, the closing affordance, the resize affordance or another control object ceases to be displayed (optionally after first shrinking in size) while the first object is being moved, and is redisplayed with its normal appearance after the move of the first object is stopped. In some embodiments, after the first object stops moving for at least a threshold amount of time, the computer system restores display and appearance of the closing affordance, the resize affordance, or another control object, at a new position associated with the current position of the first object. For example, as described with reference to FIG. 7AV, as the user moves object 770c (e.g., using grabber 7104b), the one or more object management controls, such as affordance 774-4, grabber 7104b and/or title bar 7106 optionally cease to be displayed. Automatically reducing a visual prominence of a respective control, such as ceasing display of the respective control, while the virtual object is being moved within the AR/VR environment, improves the visual feedback by indicating the control is not available for interaction without obscuring the user's view of the AR/VR environment.

In some embodiments, detecting the first user input that corresponds to a request to move the first object in the three-dimensional environment includes detecting an air gesture (e.g., an air pinch gesture or an air tap gesture, as described above with reference to FIG. 4, an air gesture is a gesture that is detected without the user touching (or independently of) an input element that is part of the computer system) directed to the first object (e.g., detected in conjunction with a gaze input directed to the first object and/or detected at a location that corresponds to the location of the first object), followed by a movement of the air gesture. In some embodiments, the air gesture is an air tap gesture or air pinch gesture detected in conjunction with a gaze input directed to a move affordance of the first object, followed by a movement of the hand that provided the air tap or air pinch gesture while the move affordance remains selected. For example, as described with reference to FIG. 7AT, while the user's attention 710-39 is directed to grabber 7104b, the computer system detects an air gesture or other selection input directed to the grabber 7104b to move object 770b. Allowing a user to perform an operation for a virtual object, such as moving the virtual object by selecting a grabber or other move affordance, by performing an air gesture without requiring the user to connect, set up, or use a separate input device to perform the operation, reduces the number of inputs needed to move the virtual object in the AR/VR environment.

In some embodiments, while displaying a first control object (e.g., the close affordance, the move affordance, or another control object) of the first set of one or more control objects with the first object, wherein the first control object corresponds to a first operation applicable to the first object, the computer system detects that user attention is directed to a respective portion of the first object that corresponds to a second operation, different from the first operation, that is applicable to the first object; and in conjunction with detecting that the user attention is directed to the respective portion of the first object that corresponds to the second operation that is applicable to the first object (e.g., while, in response to, and/or within a threshold time period of detecting that the user's attention has been directed to the respective portion of the first object, optionally, without detecting another intervening event after detecting that the user's attention has been directed to the respective portion of the first object), in accordance with a determination that the user attention meets attention criteria (e.g., that the attention of the user is directed to the respective portion of the first object for at least a threshold amount of time), the computer system visually deemphasizes (e.g., decreases in size, ceases to display, blurs, fades and/or otherwise reduces visual prominence of), relative to the first object, the first control object that corresponds to the first operation that is applicable to the first object. For example, the respective portion of the first object is a corner of the first object (e.g., a corner outside of the first object or a corner inside of the first object), bottom-center portion of the first object, a center of the first object, and/or an area surrounding (e.g., proximate to) the first object, which correspond to a move operation and/or a resize operation applicable to the first object, and in response to detecting that the user's attention is directed to the respective portion of the first object, the computer system reduces the visual prominence of the close affordance. In some embodiments, in accordance with a determination that the attention of the user no longer satisfies the attention criteria with respect to the respective portion of the first object, the computer system ceases visually deemphasizing the first control object (e.g., redisplays the first control object with its normal appearance that were displayed before detecting that the attention of the user was directed to the respective portion of the first object that corresponds to the second operation and/or that met the attention criteria). For example, as described with reference to FIG. 7AT, in accordance with a determination that the user's attention is not directed to the close affordance 774-2 for at least a threshold amount of time, the close affordance 774-2 is visually deemphasized, for example, displayed as its minimized version as affordance 774-1 (e.g., as illustrated in FIG. 7AU) or ceases to be displayed. Automatically reducing a visual prominence of a respective control for a virtual object, such as reducing a size of and/or ceasing display of the respective control, while the user's attention is not directed to a respective portion of the virtual object, provides additional control options for the user without obscuring the user's view of the AR/VR environment.

In some embodiments, in response to (e.g., while, or right after) detecting that the user attention is directed to the respective portion of the first object that corresponds to the second operation that is applicable to the first object, in accordance with a determination that the user attention meets the attention criteria (e.g., that the attention of the user is directed to the respective portion of the first object for at least a threshold amount of time), the computer system displays a second control object, different from the first control object, that corresponds to the second operation that is applicable to the first object (e.g., the first control object is the close affordance or move affordance, and the second control object is the resizing affordance). In some embodiments, the first control object is the close affordance and the second control object is the resize affordance, and the method includes, while displaying the resize affordance in proximity to the respective portion of the first object, detecting a user input that selects the resize affordance and moves relative to at least a portion of the first object; and in response to detecting the user input, the computer system visually deemphasizes the close affordance, moves the resize affordance in the three-dimensional environment, and resizes the first object in accordance with the movement of the resize affordance. For example, as described with reference to method 800, in some embodiments, the computer system conditionally displays controls for applications. For example, as described with reference to FIG. 7D3, in some embodiments, in response to detecting the user's attention 710-2 directed to the bottom right corner of the application window 702, the computer system displays a resize affordance 708-1 (e.g., the resize affordance 708-1 shown in FIG.

7F) corresponding to the bottom right corner. Dynamically displaying a resize control for changing a size of a virtual object in response to a user gazing at a respective portion of the virtual object associated with the resize control enables the user to access additional controls for the virtual object, including the resize control, without displaying additional controls that obscure the user's view of the AR/VR environment and reduces the number of inputs required to navigate complex menu hierarchies.

In some embodiments, while displaying a third control object (e.g., the close affordance, the move affordance, or another control object) of the first set of one or more control objects with the first object, wherein the third control object corresponds to a third operation applicable to the first object, the computer system detects that current user attention is directed to the third control object; and in conjunction with detecting that the current user attention is directed to the third control object (e.g., while, in response to, and/or within a threshold time period of detecting that the user's attention has been directed to the third control object, optionally, without detecting another intervening event after detecting that the user's attention has been directed to the third control object), in accordance with a determination that the current user attention meets second attention criteria (e.g., that the attention of the user is directed to the second control object for at least a threshold amount of time), the computer system visually emphasizes, relative to the first object, the third control object that corresponds to the third operation that is applicable to the first object. In some embodiments, the attention of the user is directed to a location within an area enclosing the third control object. In some embodiments, the area enclosing the third control object is larger than the third control object, so that the current attention of the user triggers the visual emphasizing of the third control object even if it is slightly outside of the area occupied by the third control object. In some embodiments, the third control object increases in size, is highlighted, and/or is otherwise increased in visual prominence relative to the first object while the user's attention is directed to the third control object. In some embodiments, visually emphasizing the third control object includes displaying a glyph (e.g., a symbol, icon, and/or text) in the third control object. For example, in some embodiments, the third control object is a small dot without a glyph before the attention of the user is directed to the third control object for at least a threshold amount of time, and the third control object increases in size and/or the glyph is added to the enlarged second control object in response to the user's attention being directed to the third control object for at least the threshold amount of time. For example, as described with reference to FIG. 7AQ, in response to detecting the user's attention 710-36 (e.g., a gaze input) directed to affordance 774-1 that satisfies attention criteria (e.g., that the user's attention has been detected for at least a threshold amount of time), affordance 774-1 increases in size and/or displays a glyph (e.g., icon and/or text, such as "x") as illustrated by close affordance 774-2. Automatically increasing a visual prominence of a respective control, such as increasing a size of the respective control and/or displaying additional information for the control, in response to a user's gaze being directed to the respective control, provides additional control options for the user and improves the visual feedback by indicating where the user's attention has been detected.

In some embodiments, in conjunction with detecting that the current user attention is directed to the third control object (e.g., while, in response to, and/or within a threshold time period of detecting that the user's attention has been directed to the second control object, optionally, without detecting another intervening event after detecting that the current user's attention has been directed to the third control object), in accordance with a determination that the user attention meets the attention criteria (e.g., that the attention of the user is directed to the third control object for at least a threshold amount of time), the computer system visually deemphasizes, relative to the first object, a fourth control object of the first set of one or more control objects, wherein the fourth control object corresponds to a third operation, different from the second operation, that is applicable to the first object. For example, in some embodiments, the third control object is a close affordance, and the fourth control object is a move affordance, and the move affordance shrinks in size, ceases to be displayed, reduces in luminance, increases in translucency, and/or is otherwise visually deemphasized relative to the first object, while the attention of the user is directed to the close affordance and the close affordance is visually emphasized relative to the first object. In some embodiments, the third control object is a resize affordance and the fourth control object is a close affordance, and the resize affordance shrinks in size, ceases to be displayed, reduces in luminance, increases in translucency, and/or is otherwise visually deemphasized relative to the first object, while the attention of the user is directed to the close affordance. For example, as described with reference to FIG. 7AR, grabber 7104a is visually deemphasized (e.g., shrinks in size, blur, decrease in luminance and/or cease to be displayed) to grabber 7104b while the close affordance 774-2 is displayed. Automatically decreasing a visual prominence of a first respective control, such as reducing a size of a grabber for moving the virtual object, while increasing the prominence of a second respective control, such as a close control, in response to a user's gaze being directed to the second respective control, provides additional control options for the user and improves the visual feedback by indicating where the user's attention has been detected and making it easier for the user to interact with the second respective control by reducing the prominence the first respective control.

In some embodiments, visually deemphasizing, relative to the first object, the fourth control object including reducing a size of the fourth control object relative to the first object. For example, the move affordance (e.g., a grabber bar, or other move affordance) decreases in size (e.g., reducing a length in an elongated grabber bar, or reducing a radius of a round grabber handle), while the user's attention is directed to the second control object or another control object different from the third control object. In some embodiments, the decreased size of the fourth control object is restored in response to detecting that the user's attention is no longer directed to the third control object or another control object different from the fourth control object. For example, as described with reference to FIG. 7AR, grabber 7104b decreases in length while the close affordance 774-2 is displayed. Automatically decreasing a size of a first respective control, such as reducing a size of a grabber for moving the virtual object, while increasing the prominence of a second respective control, such as a close control, in response to a user's gaze being directed to the second respective control, provides additional control options for the user and improves the visual feedback by indicating where the user's attention has been detected and making it easier for the user to interact with the second respective control by decreasing a size of the first respective control.

In some embodiments, visually deemphasizing, relative to the first object, the fourth control object includes reducing a spatial extent of the fourth control object such that the fourth control object does not intersect with a reactive region of the third control object. In some embodiments, the reactive region of the third control object includes an area that encloses the third control object and is larger than the third control object. In some embodiments, the reactive region of the third control object is enlarged from an initial area when the user's attention has moved within the initial area and is moving away from the initial area. For example, as described with reference to FIG. 7AR, grabber 7104*b* shrinks in size (e.g., to a decreased length) to create additional space for close affordance 774-2 (e.g., which is an expanded version of affordance 774-1), such that close affordance 774-2 does not overlap with grabber 7104*b*. Automatically decreasing a size of a first respective control, such as reducing a size of a grabber for moving the virtual object, such that the first respective control does not overlap with a selection area in which the user can select the second respective control without accidentally selecting the first respective control, improves the accuracy for detecting the user's interactions with the second respective control by decreasing a prominence of the first respective control that is displayed near the second respective control.

In some embodiments, the computer system detects that respective user attention is directed to a fifth control object (e.g., the first control object, the second control object, the third control object, or another control object) of the first set of one or more control objects; and in response to detecting that the respective user attention is directed to the fifth control object: in accordance with a determination that the respective user attention meets third attention criteria, wherein the third attention criteria require that the respective user attention has been directed to the fifth control object for at least a threshold amount of time, the computer system visually emphasizes (e.g., increases in size, decreases an amount of fading and/or blurring, increases a luminance of, and/or otherwise visually emphasizes), relative to the first object, the fifth control object. In some embodiments, visually emphasizing the fifth control object relative to the first object includes changing one or more visual properties of the first object to visually deemphasize (e.g., decrease in size, increase an amount of fading and/or blurring, decrease a luminance of) the first object relative to the fifth control object. In some embodiments, visually emphasizing the fifth control object relative to the first object includes changing one or more visual properties to visually emphasize the fifth control object and/or changing one or more visual properties to visually deemphasize the first object is used. In some embodiments, in accordance with a determination that the user attention does not meet the third attention criteria (e.g., that the attention of the user is directed to the respective control object for less than the threshold amount of time), the computer system forgoes visually emphasizing, relative to the first object, the fifth control object. For example, as described with reference to 7AQ, if the user's attention is detected as directed to the dot (e.g., affordance 774-1) for less than the threshold amount time, the dot does not expand to close affordance 774-2. Automatically increasing a visual prominence of a respective control, such as increasing a size of the respective control and/or displaying additional information for the control, in response to a user's gaze being directed to the respective control for at least a threshold amount of time, without increasing the visual prominence of the respective control if the user's gaze is detected as directed to the respective control for less than the threshold amount of time, provides additional control options for the user and improves the visual feedback by indicating whether the user is detected as focused on the respective control, without distracting the user by increasing the visual prominence of the respective control if the user is not focused on the respective control.

In some embodiments, aspects/operations of methods 800, 900, 1000, 1100, 1200, 1300, 1400, 1600, 1800, and 20000 may be interchanged, substituted, and/or added between these methods. For brevity, these details are not repeated here.

FIG. 16 is a flow diagram of an exemplary method 1600 for displaying a home menu user interface after closing one or more application user interfaces, in accordance with some embodiments. In some embodiments, method 1600 is performed at a computer system (e.g., computer system 101 in FIG. 1) that is in communication with a display generation component (e.g., display generation component 120 in FIGS. 1A, 3, and 4 or display generation component 7100) and one or more input devices (e.g., a camera (e.g., color sensors, infrared sensors, and other depth-sensing cameras) that points downward at a user's hand and/or forward from the user's head, a button, a dial, a rotatable input element, a switch, a moveable hardware input device, or a solid-state hardware input device). In some embodiments, the method 1600 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1600 are, optionally, combined and/or the order of some operations is, optionally, changed.

While displaying, via the display generation component, a first application user interface at a first location in (e.g., a first view of) a three-dimensional environment, the computer system detects (1602), at a first time via the one or more input devices, a first input corresponding to a request to close the first application user interface (e.g., ceasing display of the first application user interface includes closing the first application user interface, or switching to run a first application associated with the first application user interface in a background).

In response to detecting the first input corresponding to a request to close the first application user interface (1604): the computer system closes (1606) the first application user interface, including ceasing to display the first application user interface in the three-dimensional environment; and, in accordance with a determination that respective criteria are met (e.g., that no other application user interface is open (e.g., within a viewport of a user, or anywhere including outside of the viewport of the user) in the three-dimensional environment when the first application user interface was closed and/or the first application user interface is a lone application user interface), the computer system displays (1608) a home menu user interface at a respective home menu position (e.g., based on one or more locations of one or more application user interfaces that ceased to be displayed in the three-dimensional environment within a first time threshold of (e.g., prior to) the first time, wherein the one or more application user interfaces include the first application user interface) that is determined based on the first location of the first application user interface in the three-dimensional environment. In some embodiments, the home menu user interface is displayed at the respective home menu position in response to detecting the first input, without requiring the determination as to whether the respective criteria are met (e.g., even without the respective criteria being met). Accordingly, in some embodiments the home menu user interface is displayed at the respective home menu position in response to detecting the first input even if one or more other application user interfaces remain open after the first application user interface is closed.

For example, in FIG. 7BM (e.g., FIGS. 7BM1 and 7BM2), user input 7250 corresponds to a request for closing user interface 7208 associated with close affordance 7212-2, while user interface 7208 is at a first location. In FIG. 7BN (e.g., FIGS. 7BN1 and 7BN2), in response to detecting user input 7250, computer system 101 closes user interface 7208 of application App D and, in accordance with a determination that no user interface of any application is visible in the viewport, automatically displays home menu user interface 7222 without any additional user input.

Using respective criteria to determine whether to automatically display a home menu user interface enables the user to continue navigating through one or more collections of selectable representations displayed on the home menu user interface when no application user interface is displayed in a viewport of the user, without any active user input and without displaying additional controls. Displaying the home menu user interface at a location that is based on a location of one or more application user interfaces that have been recently closed reduces the need for the user to search within the viewport for the home menu user interface.

In some embodiments, displaying the home menu user interface at the respective home menu position that is determined based on the first location of the first application user interface in the three-dimensional environment includes: in accordance with a determination that the first application user interface is displayed at a first application position in the three-dimensional environment, displaying the home menu user interface at a first home menu position in the three-dimensional environment; and, in accordance with a determination that the first application user interface is displayed at a second application position in the three-dimensional environment that is different from the first application position, displaying the home menu user interface at a second home menu position in the three-dimensional environment that is different from the first home menu position in the three-dimensional environment. For example, as described herein with reference to FIGS. 7BM-7BN, upon closing user interface 7208, in accordance with a determination that no user interface of any application is visible in the viewport, computer system 101 automatically displays home menu user interface 7222 without any additional user input at a position that is based on the location of just-closed user interface 7208 in the three-dimensional environment (e.g., at the location of home menu user interface 7222 in FIG. 7BN if user interface 7208 is closed from a location as shown in FIG. 7BM, or, if user interface 7208 is closed from a different location, then home menu user interface 7222 is displayed at a location that is based on the different location of user interface 7208). Displaying the home menu user interface at a location that is based on a location of one or more application user interfaces that have been recently closed automatically places the home menu user interface at a location that reduces the need for the user to search within the viewport for the home menu user interface, without displaying additional controls.

In some embodiments, in response to detecting the first input corresponding to the request to close the first application user interface and in accordance with a determination that the respective criteria are not met because one or more other application user interfaces are open in the three-dimensional environment, the computer system forgoes displaying the home menu user interface in the three-dimensional environment (e.g., and continues to display the one or more other application user interfaces). For example, in response to detecting user input 7254 corresponding to selection of option 7252 to close user interface 7208 associated with close affordance 7212-2 (FIG. 7B0), computer system 101 closes user interface 7208 of application App D, as shown in FIG. 7BP, without displaying home menu user interface 7222 (e.g., as shown in FIG. 7BN) due to the continued presence of user interface 7202 associated with application App A in the viewport illustrated in FIG. 7BP. Forgoing automatically displaying the home menu user interface at a location upon closing a respective application user interface when one or more other application user interfaces are open in the three-dimensional environment enables the user to continue interacting with the one or more other application user interfaces without displaying additional controls.

In some embodiments, in accordance with a determination that a plurality of application user interfaces including the first application user interface ceased to be displayed (e.g., were closed) within a first time threshold from the first time, the computer system determines the respective home menu position based on respective locations of the plurality of application user interfaces (e.g., the respective locations include the first location). In some embodiments, in accordance with a determination that the plurality of application user interfaces did not cease to be displayed (e.g., were closed) within the first time threshold from the first time, the computer system determines the respective home menu position based on the first location of the first application user interface (e.g., without determining the respective home menu position based on respective locations of one or more application user interfaces other than the first application user interface). In some embodiments, the respective home menu position is determined based on the first location of the first application user interface and respective locations of one or more other application user interfaces that were closed within the first time threshold from the first time, and not based on respective locations of one or more other application user interfaces that were closed outside of (e.g., prior to) the first time threshold from the first time.

For example, in FIG. 7BQ, user interface 7204 was closed prior to closing user interface 7208 and within first time threshold 7260 of the closing of user interface 7208. User interface 7202, although also closed prior to closing user interface 7208, was closed at an earlier time that was beyond first time threshold 7260. As a result, in response to detecting user input 7256 (FIG. 7BQ), computer system 101 positions home menu user interface 7222, as shown in FIG. 7BR, based on the position of frame 7258-2 in addition to the position of user interface 7208 of application App D, and not based on the position of frame 7258-1. In FIG. 7BT, the position of home menu user interface 7222 is based on respective locations of user interface 7208, user interface 7203 and user interface 7205 (indicated as frames 7258 in FIG. 7BS), all of which were closed within first time threshold 7260 of the closing of user interface 7208. Displaying the home menu user interface at a location that is based on a location of one or more application user interfaces that have been recently closed within a first time threshold from a last closed application automatically places the home menu user interface at a location that is relevant to a user's recent interactions with the three-dimensional environment and thereby reduces the need for the user to search within the viewport for the home menu user interface, without displaying additional controls.

In some embodiments, displaying the home menu user interface at the respective home menu position includes displaying the home menu user interface at the respective home menu position when multiple application user interfaces including a first plurality of application user interfaces and a second plurality of application user interfaces were closed within a threshold amount of time, wherein: in accordance with a determination that attention of a user was directed to the first plurality of application user interfaces more recently than other application user interfaces outside of the first plurality of application user interfaces (e.g., the second plurality of application user interfaces and/or other application user interfaces), the respective home menu position is based on positions of the first plurality of application user interfaces; and, in accordance with a determination that the attention of the user was directed to the second plurality of application user interfaces more recently than other application user interfaces outside of the second plurality of application user interfaces (e.g., the first plurality of application user interfaces and/or other application user interfaces), the respective home menu position is based on positions of the second plurality of application user interfaces, wherein the respective home menu position based on positions of the second plurality of application user interfaces is different from the respective home menu position based on positions of the first plurality of application user interfaces. In some embodiments, the first plurality of application user interfaces corresponds to top N elements in a sorted list of descending amount of attention, such as gaze time, or a threshold number of interactions. In some embodiments, the second plurality of application user interfaces corresponds to top M elements in a sorted list of descending amount of attention, such as gaze time, or a threshold number of interactions.

For example, in FIG. 7CA, the user's attention 7276 was directed most to user interface 7202 (e.g., represented by dashed-line frame 7258-1 after closing of user interface 7202), of the user interfaces closed within the first time threshold 7260, such that user interface 7202 meets the attention criteria. Because user interface 7202 meets the attention criteria, the location of home menu user interface 7222 depicted in FIG. 7CB is determined based on the location of user interface 7208 and the location of frame 7258-1 corresponding to user interface 7202 as shown in FIG. 7CB. Displaying the home menu user interface at a location that is based on a location of one or more application user interfaces that have been recently closed within a first time threshold from a last closed application and to which attention of the user was directed automatically places the home menu user interface at a location that is relevant to a user's recent interactions with the three-dimensional environment and thereby reduces the need for the user to search within the viewport for the home menu user interface, without displaying additional controls.

In some embodiments, displaying the home menu user interface at the respective home menu position includes: in accordance with the determination that the plurality of application user interfaces ceased to be displayed within the first time threshold from the first time, and the first application user interface is a last closed application that ceased to be displayed within a third time threshold since closing any other application user interface within the plurality of application user interfaces, determining the respective home menu position based on the respective locations of the plurality of application user interfaces (e.g., including the first location of the first application user interface); and, in accordance with the determination that the plurality of application user interfaces ceased to be displayed within the first time threshold from the first time, and the first application user interface is the last closed application that ceased to be displayed beyond the third time threshold since closing any of the other application user interfaces within the plurality of application user interfaces, determining the respective home menu position based on the first location, wherein the respective home menu position based on the first location is different from the respective home menu position based on the respective locations of the plurality of application user interfaces (e.g., without determining the respective home menu position based on respective positions of any application user interface within the plurality of application user interfaces other than the first application user interface) (e.g., the respective home menu position coincides with the first location or has a respective offset from or other spatial relationship to the first location).

For example, in response to detecting user input 7262 corresponding to a request to close user interface 7208 (FIG. 7BU), computer system 101 automatically displays home menu user interface 7222 in three-dimensional environment at a location depicted in FIG. 7BV that is based on the location of user interface 7208 and does not take into account the respective positions of the additional user interfaces that were closed within first time threshold 7260 in the example of FIG. 7BU (e.g., user interfaces 7204 and 7202) because the last closed application user interface 7208 is closed more than a delay time threshold after closing other application user interfaces. Displaying the home menu user interface at a location that does not take into account locations of one or more application user interfaces that have been recently closed within a first time threshold but more than a time threshold earlier than a last closed application automatically places the home menu user interface at a location that is relevant to a user's recent interactions with the three-dimensional environment and thereby reduces the need for the user to search within the viewport for the home menu user interface, without displaying additional controls.

In some embodiments, determining the respective home menu position based on the respective locations of the plurality of application user interfaces includes: in accordance with a determination that a respective application user interface at a respective location is within a first distance threshold from other application user interfaces of the plurality of application user interfaces (e.g., or more specifically from the first application user interface), determining the respective home menu position based on a set of application user interface locations that includes the respective location of the respective application user interface; and, in accordance with a determination that the respective application user interface at the respective location is not within the first distance threshold from the other application user interfaces of the plurality of application user interfaces (e.g., or more specifically from the first application user interface), determining the respective home menu position based on a set of one or more application user interface locations that does not include the respective location of the respective application user interface. In some embodiments, the set of application user interface locations, based on which the respective menu position is determined, includes the location of the first application user interface (e.g., if the set does not include the location of any other of the plurality of application user interfaces). In some embodiments, in determining the respective home menu position, the computer system assesses, for multiple, and in some embodiments for each, application user interface of the plurality of application user interfaces, whether the application user interface is within the first threshold distance (e.g., of at least one other application user interface, such as the first application user interface, of the plurality of application user interfaces). In some embodiments, the respective home menu position is determined based on the location(s) of respective application user interface(s) of the plurality of application user interfaces that are within the first threshold distance and not based on the location(s) of respective application user interface(s) of the plurality of application user interfaces that are not within the first threshold distance.

For example, in response to detecting user input 7266 (FIG. 7BY), computer system 101 ceases to display user interface 7208, and displays home menu user interface 7222 in three-dimensional environment at the location depicted in FIG. 7BZ. The location of home menu user interface 7222 in FIG. 7BZ does not take the position of frame 7258-6 into account because the frame 7258-6 is located outside of spatial threshold 7215, as depicted in top view 7223 of FIG. 7BZ. The respective positions of dashed-line frames 7258-1 and 7258-2 are taken into account in addition to the position of user interface 7208, because they are within the spatial threshold 7215. Displaying the home menu user interface at a location that does not take into account locations of one or more application user interfaces that have been recently closed within a first time threshold when a respective application user interface is outside a first distance threshold from other application user interfaces that have been recently closed within the first time threshold automatically places the home menu user interface at a location that is relevant to a user's recent interactions with the three-dimensional environment and thereby reduces the need for the user to search within the viewport for the home menu user interface, without displaying additional controls.

In some embodiments, while displaying the home menu user interface (e.g., at the respective home menu position), the computer system detects a user input directed to the home menu user interface. In some embodiments, the home menu user interface includes one or more of (e.g., any combination of): one or more representations of software applications executable on the computer system; one or more representations of communication session participants (e.g., contacts, including persons or other entities, of a user of the computer system, with whom the user is enabled to initiate one or more communication sessions); and one or more representations of computer-generated (e.g., augmented reality, virtual reality, mixed reality, or other extended reality) three-dimensional environments. In some embodiments, in response to detecting the user input directed to the home menu user interface, the computer system initiates performance of a system operation, including one or more of displaying an application user interface of a software application, displaying a user interface for initiating a communication session with a communication session participant, and displaying a computer-generated three-dimensional environment in the three-dimensional environment.

In some embodiments, in response to detecting the user input directed to the home menu user interface: in accordance with a determination that the user input is directed to a respective representation of a software application executable on the computer system (e.g., of the one or more representations of software applications), the computer system displays an application user interface of the software application (e.g., launching or opening the software application); in accordance with a determination that the user input is directed to a respective representation of a communication session participant (e.g., of the one or more representations of communication session participants), the computer system displays a user interface for initiating a communication session with the communication session participant; and/or in accordance with a determination that the user input is directed to a representation of a computer-generated three-dimensional environment (e.g., of the one or more representations of computer-generated three-dimensional environments), the computer system displays the computer-generated three-dimensional environment in the three-dimensional environment (e.g., in at least the background).

For example, as described herein with reference to FIG. 7BF, home menu user interface 7222 displays representations 7224-7238 that correspond to various software applications that can be executed on computer system 101, and additionally representations of one or more other people with whom a user is able to initiate or maintain (e.g., continue or resume) communication or otherwise interact with, or who are capable of interacting with the user, and/or a collection of computer generated (e.g., augmented reality, virtual reality, mixed reality, or other extended reality) three-dimensional environments that can be displayed as (or in) the three-dimensional environment are displayed as other collections of home menu user interface 7222. Allowing the user to access an application, a person to initialize or maintain a communication session, or a XR environment from the home menu user when respective criteria are met, allows the user to interact more efficiently with the computer system. Displaying a home menu user interface when respective criteria are met, without displaying additional controls, minimizing the number of inputs required to select a desired operation.

In some embodiments, the computer system detects a second input (e.g., a press input to a hardware button, an air gesture, a gaze input, and/or other types of inputs directed to a system user interface object that corresponds to an explicit request to open a home menu user interface) corresponding to a request to invoke the home menu user interface (e.g., without corresponding to a request to close an application user interface). In some embodiments, in response to detecting the second input, the computer system displays the home menu user interface at a location that is independent of the first location of the first application user interface (e.g., independent of the first location of the first application user interface, and/or independent of the locations of a cluster of application user interfaces that includes the first application user interface). In some embodiments, displaying the home menu user interface at the respective home menu position that is determined based on the first location of the first application user interface in the three-dimensional environment is performed in accordance with a determination that the first user input corresponds to a request to close an application user interface such that no other application user interfaces remain open in the three-dimensional environment, and displaying the home menu user interface at a location that is independent of the first location of the first application user interface is performed in accordance with a determination that the first user input corresponds to a request to display the home menu user interface without closing an application user interface (e.g., although one or more application user interfaces may be temporarily hidden while the home menu user interface is displayed, the one or more application user interfaces remain open in the three-dimensional environment).

For example, in FIGS. 7CG-7CH, the home menu user interface in the three-dimensional environment is displayed in response to detecting user input 7274 via button 7273 while multiple application user interfaces are displayed in the viewport of the three-dimensional environment. FIG.

7CH illustrates that, in response to detecting user input 7274 (FIG. 7CG), computer system 101 displays home menu user interface 7222 in the three-dimensional environment at a location that is independent of the locations of the multiple application user interfaces. Displaying the home menu user interface at a location that is independent of the first location of the first application user interface, in response to detecting a second input corresponding to a request to invoke the home menu user interface, automatically places the home menu user interface at a location that reduces the need for the user to search within the viewport for the home menu user interface, without displaying additional controls.

In some embodiments, displaying the home menu user interface at the location that is independent of the first location of the first application user interface includes: in accordance with a determination that the second input is detected while current attention of a user is directed to a first target location in the three-dimensional environment (e.g., while a viewpoint of the user has a first elevation relative to a reference plane in the three-dimensional environment, as detected using a gyroscope, an inertia measurement unit, and/or other sensor of the computer system), displaying the home menu user interface at a first home menu location in the three-dimensional environment; and, in accordance with a determination that the second input is detected while the current attention of the user is directed to a second target location in the three-dimensional environment, wherein the second target location is different from the first target location, displaying the home menu user interface at a second home menu location in the three-dimensional environment, wherein the second home menu location is different from the first home menu location. For example, in FIG. 7CG, computer system 101 detects user input 7274 while a gaze input that meets attention criteria, and/or a head elevation or other posture of a user that meets attention criteria is directed to a target location in the three-dimensional environment, and the computer system 101 displays home menu user interface 7222 at a location that is based on the gaze direction or the head elevation of the user, as shown in FIG. 7CH. Displaying the home menu user interface at a location based on a location where attention of the user is directed in the three-dimensional environment automatically places the home menu user interface at a location that reduces the need for the user to search within the viewport for the home menu user interface, without displaying additional controls.

In some embodiments, displaying the home menu user interface at the first home menu location in the three-dimensional environment includes displaying the home menu user interface at a respective distance (e.g., along a z-direction, and/or along a radial direction) from a viewpoint of the user, and displaying the home menu user interface at the second home menu location in the three-dimensional environment includes displaying the home menu user interface at the respective distance from (e.g., a depth relative to) the viewpoint of the user. In some embodiments, the home menu user interface is displayed in a plane that is at the respective distance from the viewpoint of the user (e.g., for the shortest distance between the plane and the viewpoint of the user) or in a curved surface, such as a spherical surface, having a consistent radial distance from the viewpoint of the user in at least one direction). For example, as described herein with reference to FIG. 7CH, the computer system 101 displays home menu user interface 7222 at a location that is at a default distance from a viewpoint of the user, such as a distance that is between 0.5 m to 5 m from the viewpoint of the user in a simulated depth dimension of the three-dimensional environment, as shown in top view 7229 in FIG. 7CH. Displaying the home menu user interface at a respective distance from the viewpoint of the user automatically places the home menu user interface at an ergonomic location that reduces the need for the user to search within the viewport for the home menu user interface, without displaying additional controls.

In some embodiments, in response to detecting the first input, in accordance with a determination that one or more other respective application user interfaces (e.g., other than the first application user interface) meet cluster criteria with respect to the first application user interface (e.g., the one or more other application user interfaces were closed within a second time threshold (optionally the same as or different from the first time threshold) from the first time and/or were displayed within a second distance threshold (optionally the same as or different from the first distance threshold)) in the three-dimensional environment, displaying the home menu user interface at the respective home menu position that is determined based on the first location of the first application user interface in the three-dimensional environment includes displaying the home menu user interface at a characteristic location associated with the first application user interface and the one or more other respective application user interfaces (e.g., a centroid, edge, or other location that takes into account respective locations of the first application user interface and the one or more other application user interfaces). In some embodiments, the characteristic location coincides with the centroid, edge, or other collective location that takes into account respective locations of the first and one or more other application user interfaces. In some embodiments, the characteristic location is closer to a viewpoint of the user than the collective location of the first and one or more other application user interfaces (e.g., the home menu user interface is displayed with an offset from the collective location). For example, as described herein with reference to FIGS. 7BS-7BT, in conjunction with closing the last user interface, which is user interface 7208 of App D, of a cluster of user interfaces closed within the first time threshold 7260 of the closing of user interface 7208, computer system 101 places home menu user interface 7222 at a position corresponding to a characteristic portion 7263 of the cluster that is a centroid of the cluster. Displaying the home menu user interface at a characteristic location associated with the first application user interface and the one or more other application user interfaces automatically places the home menu user interface at a location that is relevant to a user's recent interactions with the three-dimensional environment and thereby reduces the need for the user to search within the viewport for the home menu user interface, without displaying additional controls.

In some embodiments, the computer system detects a third input. In some embodiments, in response to detecting the third input: in accordance with a determination that the home menu user interface is not within a portion of the three-dimensional environment that is included in a current viewport of the three-dimensional environment (e.g., because a viewpoint of the user in the three-dimensional environment has moved within the three-dimensional environment from a prior viewpoint with a prior viewport of the three-dimensional environment) when the third input is detected, the computer system displays the home menu user interface in the current viewport of the three-dimensional environment (e.g., in a region of the viewport of the three-dimensional environment that is visible to the user such as a central, upper, or lower region of the viewport). In some embodiments, the home menu user interface is thus repositioned from a prior position in the three-dimensional environment to within the current viewport of the three-dimensional environment. In some embodiments, in response to detecting the third input: in accordance with a determination that the home menu user interface is within the portion of the three-dimensional environment that is included in the current viewport of the three-dimensional environment when the third input is detected, the computer system ceases to display the home menu user interface (e.g., closing the home menu user interface, optionally while continuing to show the current viewport of the three-dimensional environment).

For example, in FIG. 7CD, in response to detecting user input 7270 (FIG. 7CC) and in accordance with a determination that home menu user interface 7222 was not displayed when user input 7270 was detected, computer system 101 displays home menu user interface 7222 in the three-dimensional environment at a characteristic portion relative to the current viewport. In FIG. 7CF, in response to detecting user input 7272 (FIG. 7CE), computer system 101 ceases to display home menu user interface 7222 when the viewport of the three-dimensional environment includes home menu user interface 7222 when user input 7272 was detected. Disambiguating whether to display a home menu interface or not based on whether a home menu user interface is already displayed in a viewport enables different operations associated with the home menu user interface to be performed without displaying additional controls.

In some embodiments, aspects/operations of methods 800, 900, 1000, 1100, 1200, 1300, 1400, 1500 and 1800 may be interchanged, substituted, and/or added between these methods. For brevity, these details are not repeated here.

FIGS. 17A1-17P illustrate example user interfaces for resizing an application window and/or application content, in accordance with some embodiments.

FIGS. 17A1-17B1 illustrate an application window 1702 displayed in a portion of a three-dimensional environment 7000' displayed in a user interface 17000 via display generation component 7100a. As described with reference to FIG. 7A, in some embodiments, display generation component 7100a is a head mounted display. It will be understood that the processes, features and functions described herein with reference to the display generation component 7100 described in FIGS. 17A2-17P are also applicable to HMD 7100a, illustrated in FIGS. 17A1-17B1.

In some embodiments, the application window 1702 includes application content, such as a user interface element 1708, that is provided by an application associated with application window 1702. In some embodiments, the application window 1702 is refreshed (e.g., updated, rendered, redrawn, or otherwise changed) by the application at a particular application refresh rate, measured in frames per second (fps). In some embodiments, the application refresh rate of a respective application window changes over time (e.g., based on the processing power and/or needs of the computer system). As described with reference to FIG. 17Q, the computer system determines an application refresh rate for a respective application window such that, when resizing the respective application window, a different amount of scaling is applied to the respective application window to make the application window appear responsive in the user interface of display generation component 7100a, even if the application window has not yet been refreshed by the application.

FIGS. 17A2 and 17B2 include analogous user interfaces (e.g., user interface 17000) to the user interfaces described with reference to FIGS. 17A1 and 17B1, displayed on display generation component 7100. As used herein, in some embodiments, the user's attention 1710 represents a gaze input and/or the location of a cursor for an input device (e.g., optionally an external input device such as a touch input (e.g., on a touch-sensitive display), a mouse, keyboard, stylus, trackpad, or other input device).

For example, in response to detecting the user's attention 1710 within a corner region of the application window 1702, the grabber 1706 (e.g., analogous to grabber 706-1) and/or the close affordance 1707 (e.g., analogous to close affordance 7030), transition to resize affordance 1712-2, as described with reference to FIG. 7E.

FIG. 17B (e.g., FIGS. 17B1 and 17B2) illustrate detecting a user input, such as a pinch gesture or other selection input, such as a tap input, while the user's attention 1710 (e.g., the user's gaze and/or a cursor) is directed to the resize affordance 1712.

In some embodiments, as explained with reference to FIGS. 7F-7G, one or more visual properties of the resize affordance 1712 (e.g., analogous to resize affordance 708-1) optionally change to indicate that the resize affordance 1712 is currently selected. In some embodiments, while the resize affordance 1712 is currently selected, application window 1702 is displayed with a reduced visual prominence, and/or with another change to one or more visual properties of the application window 1702. For example, application window 1702 is displayed as blurred, faded, with a reduced level of opacity and/or luminance, with a highlighted or bolded border, or otherwise displayed with a modified appearance. In some embodiments, the application window 1702 continues to be displayed with the modified appearance while the resize affordance 1712 is selected (e.g., while a resizing operation is being performed).

Although the examples below provide for resizing of application windows, it will be understood that the behaviors and functions described herein are also applicable to various user interface objects, such as three-dimensional user interface objects, and other user interface elements that are not application windows.

Figures 17C, 17D:
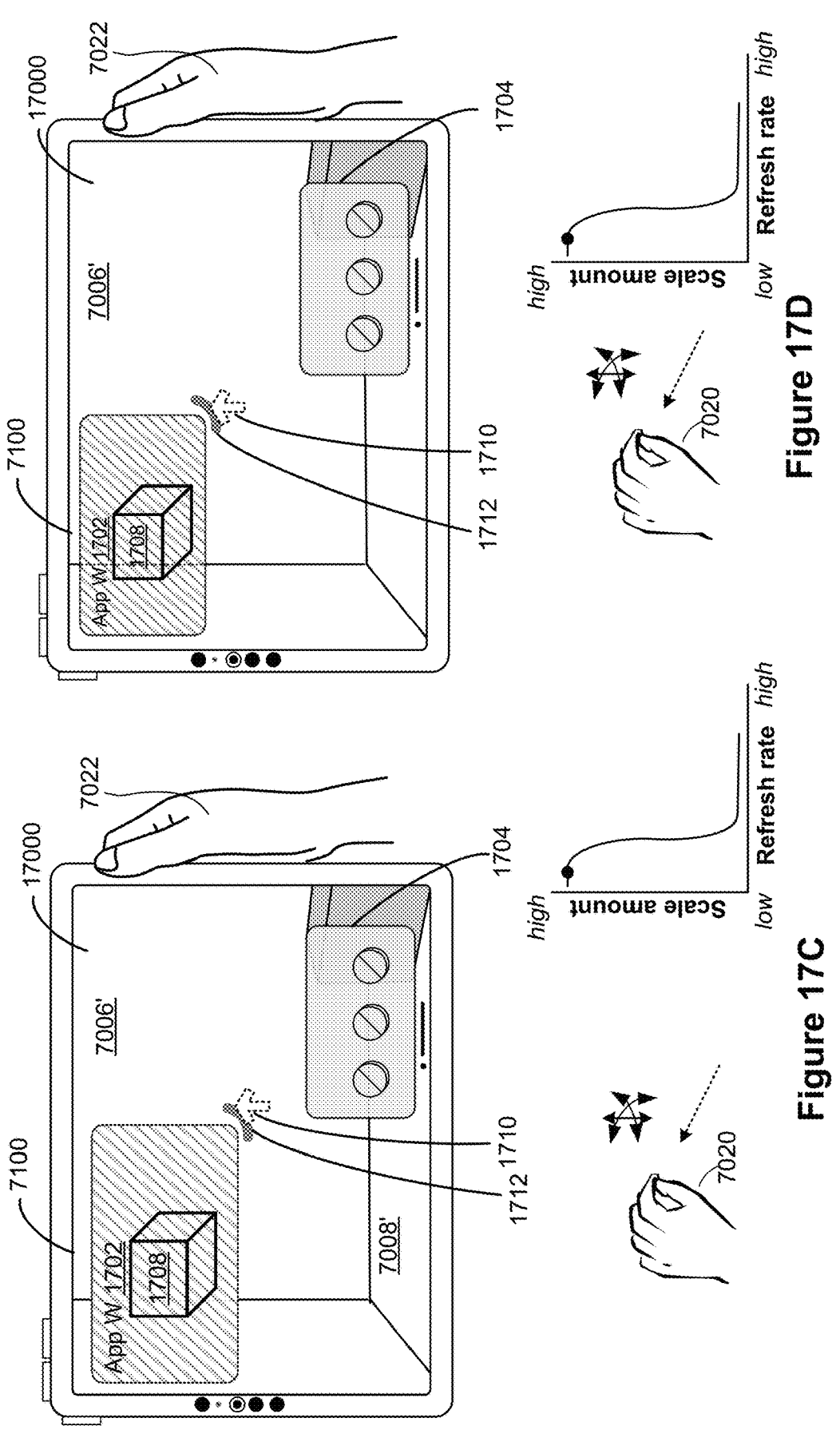

FIG. 17C illustrates in response to detecting a user input (e.g., performed using the user's hand 7020 or another input device) to resize the application window 1702, for example, a drag user input (e.g., an air drag user input), optionally in combination with a selection user input (e.g., an air gesture, such as a pinch and drag gesture, or other user input such as movement of a cursor or other input device), the application window 1702 is resized in accordance with the user input. For example, the application window 1702 changes in size based on a direction, speed, and/or movement of the user input. For example, dragging the resize affordance 1712 toward the application window 1702 (e.g., toward the top left corner, the bottom left corner and/or the top right corner of the application window 1702) causes the application window 1702 to resize to a smaller size, and dragging the resize affordance 1712 away from the application window 1702 (e.g., away from the top left corner, the bottom left corner and/or the top right corner of the application window 1702) causes the application window 1702 to resize to a larger size. In some embodiments, the application window 1702 is resized in proportion to an amount and/or speed of the user input. In some embodiments, the application window 1702 is enabled to be resized along a horizontal and/or vertical axis. For example, resizing the application window 1702 optionally includes changing an aspect ratio of the application window 1702 (e.g., a user input that moves along the horizontal axis without movement along the vertical axis changes a width of the application window 1702 without changing the height of the application window 1702).

In some embodiments, while the application window 1702 is resized, an application refresh rate of the application window 1702 is determined, as described with reference to FIG. 17Q.

In some embodiments, the application window 1702 is displayed, during the resize operation, with a respective amount of scaling based on the determined application refresh rate (e.g., measured in frames per second (fps)). For example, for a low application refresh rate, during the resize operation, the application window 1702 is not refreshed (e.g., updated, re-rendered and/or redrawn) by the application associated with the application window 1702 quickly enough to keep up with the user input corresponding to the resize operation, and thus the application window 1702 is scaled (e.g., stretched and/or compressed) during the resize operation to provide the user with feedback that the resize operation is successful, even before the application window 1702 is refreshed by the application at the application refresh rate of the application window 1702. In some embodiments, some applications change the layout or appearance of application components based on a size and/or aspect ratio of the application window, so when the size and/or aspect ratio of the application window change, the application determines a new layout and/or appearance of the application content. The process that determines new layout and/or appearance of the application content is frequently independent of the process that determines the size and/or aspect ratio of the application window (sometimes an operating system window management process).

In some embodiments, the amount of scaling that is based on the determined application refresh rate, is a proportion of the difference between the requested size of the application window at a current time (e.g., corresponding to a position of the resize affordance 1712 at the time corresponding to the current display frame) and the previous size of the application window 1702 determined at a previous time, as described with reference to FIGS. 17S-17T.

For example, the current scaled size for the an object (e.g., application window 1702 or another user interface object) is based on three factors: 1) a requested size for the object, at the current frame, based on the current position and/or speed of the user input (e.g., the speed of the user input is used to determine and/or predict a position of the user input at the next frame and/or another future frame), 2) the last updated size of the object, as updated by the application, and 3) the scaling factor. In some embodiments, the size of the scaled object for the current frame is:

$$DOS=AOS+(ROS-AOS)*SF$$

where DOS is the displayed object size (current display frame), AOS is the application object size (as determined by the application, the last time the application updated the application user interface or a portion of the application user interface that includes the object), ROS is the requested object size (e.g., as determined by a current or projected position of the resize affordance 1712, or more generally a user input, and a reference point on or corresponding to the object), and SF is a scaling factor. This sizing determination is made regardless of whether the difference between target size and the application object size is zero, positive or negative. The above equation may be used twice, once for horizontal scaling and again for vertical scaling, or in some implementations three times, for three dimensional scaling. In some embodiments, the scaling factor is less than 1.0 and greater than 0.

For example, the user interface 17000 is updated at a different refresh rate (e.g., a "UI refresh rate" that is deter-mined by a different process such as the operating system window management process) than the application refresh rate of the application window 1702 (e.g., and the application content, user interface element 1708). For example, the user interface is updated at a UI refresh rate of at least at a threshold fps (e.g., 30 fps, 90 fps, 120 fps, or another number of fps), such that the resize affordance 1712 (e.g., and/or other accessory user interface objects) in the user interface 17000 appears responsive to the user inputs for resizing the application window 1702. As described in more detail with reference to FIG. 17T, in some embodiments, control objects (e.g., accessory user interface objects, such as title bar 1730, control panel 1732, content controls 1738 (FIG. 17R) and/or other control objects) for a respective application window that are displayed separately from (e.g., outside of, proxi-mate to and/or overlapping with) the application window 1702 optionally update (e.g., at the UI refresh rate, or another refresh rate) independently of the application win-dow 1702 and/or application content (e.g., user interface element 1708 or other content) within the application win-dow 1702.

FIGS. 17C-17D illustrate that, while the application win-dow 1702 is resized (by the associated application) at a low application refresh rate (e.g., less than 2 fps, less than 5 fps, less than 10 fps, or less than another threshold number of fps), the application window 1702 is resized in accordance with a large scaling factor (e.g., 100%, 90%, or another amount), where the scaling amount or scaling factor is determined based on the determined application refresh rate of the application window 1702. As such, in FIG. 17D, the application window 1702 (e.g., and user interface element 1708 within the application window 1702) are scaled down, using a scaling factor of 1.0, sometimes called a scaling factor of 100%, such that they appear at the requested size of the application window corresponding to the position of the resize affordance 1712 in FIG. 17D. For example, in the current frame of the user interface, the application window 1702 and its application content are compressed, without refreshing the application window 1702 itself (e.g., the content of application window 1702 is not updated by the application in FIG. 17D, and remains the same as in FIG. 17C,) due to the low application refresh rate of the appli-cation window 1702.

Figures 17E, 17F:
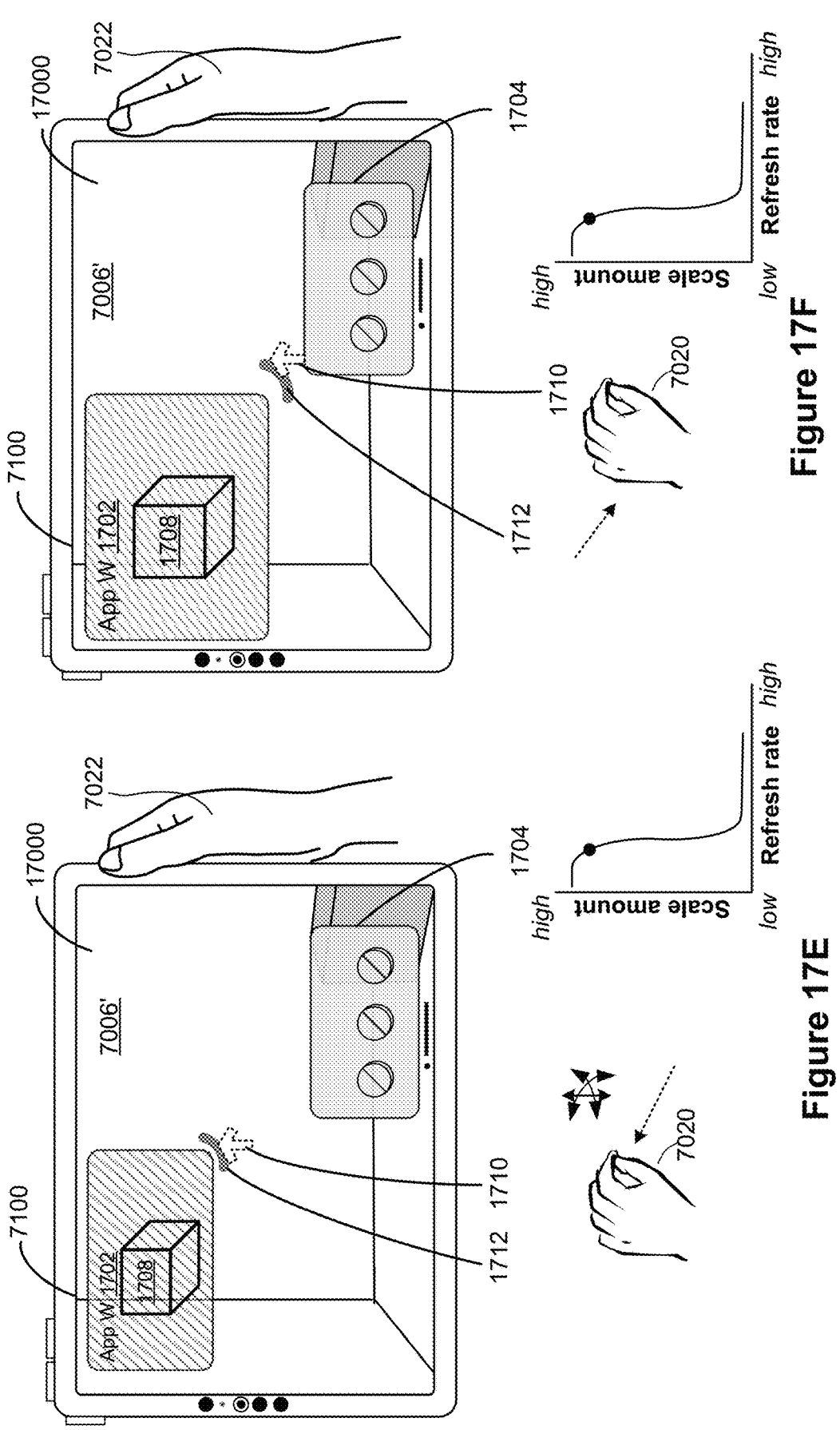

FIG. 17E illustrates the application window 1702 at a same size as the example in FIG. 17D, with a different application refresh rate of the application window 1702. Based on the application refresh rate of the application window 1702 in FIG. 17E, the amount of scaling the application window between FIGS. 17E-17F is different than (e.g., less than) the amount of scaling (e.g., a different scaling factor) described with reference to FIGS. 17C-17D (e.g., less than 100% in the example above). In some embodiments, in response to the user input corresponding to a request to increase the size of application window 1702, in a current frame of the user interface 17000, the resize affordance 1712 is displayed as having moved (e.g., at the UI refresh rate of the user interface 17000) in accordance with the user input, as illustrated in FIG. 17F, while appli-cation window 1702, and user interface element 1708 within application window 1702, are scaled (e.g., stretched, com-pressed, or otherwise distorted) by an amount (e.g., scaled in accordance with a scaling factor) indicated by the graphs in FIGS. 17E and 17F.

For example, because the application refresh rate of the application window 1702 is higher in FIGS. 17E-17F than the application refresh rate of the application window 1702 in the example described with reference to FIGS. 17C-17D, for a current frame of the user interface 17000, the resize affordance 1712 is displayed at a position corresponding to the requested window size, while application window 1702 appears to lag behind (e.g., due to the scaling factor that is less than 1.0) the resize affordance 1712, as illustrated in FIG. 17F. In some embodiments, the application window 1702 is stretched by a high amount (e.g., greater than 50%, 90%, or another amount) based on the determined application refresh rate, such that application window 1702 and user interface element 1708 appear stretched in accordance with the determined scaling amount (e.g., 50%, 90%, or another amount). The application window 1702 is displayed as being scaled by the determined amount until application window 1702 is updated (e.g., refreshed, rendered, and/or redrawn) by the device (e.g., by the application associated with application window 1702), at which point the application window 1708 catches up with the updated user interface 17000 (e.g., and a current position of the resize affordance 1712 in the user interface 17000), which is refreshed at the UI refresh rate.

For example, if the determined application refresh rate of the application window 1702 corresponds to a scaling amount of 75%, the computer system stretches the application window 1702 and/or user interface element 1708 by a factor of 0.75 of the difference between (i) the size of the respective requested application window 1702, calculated for the current frame of the user interface 17000 in FIG. 17F, and (ii) the size of the application window 1702 at the last time application window 1702 was updated by the application, such as, for example, the size of the application window 1702 illustrated in FIG. 17E (e.g., or the previous frame in which the application window 1702 was updated by the application). In some embodiments, scaling the application window 1702 according to the scale amount determined based on the application refresh rate provides a smoother transition, and displays a responsiveness of the application window 1702 and user interface element 1708, while resizing the application window 1702 until the application window 1702 and the content of application window 1702 (e.g., user interface element 1708) is able to be refreshed by the application.

Figures 17G, 17H:
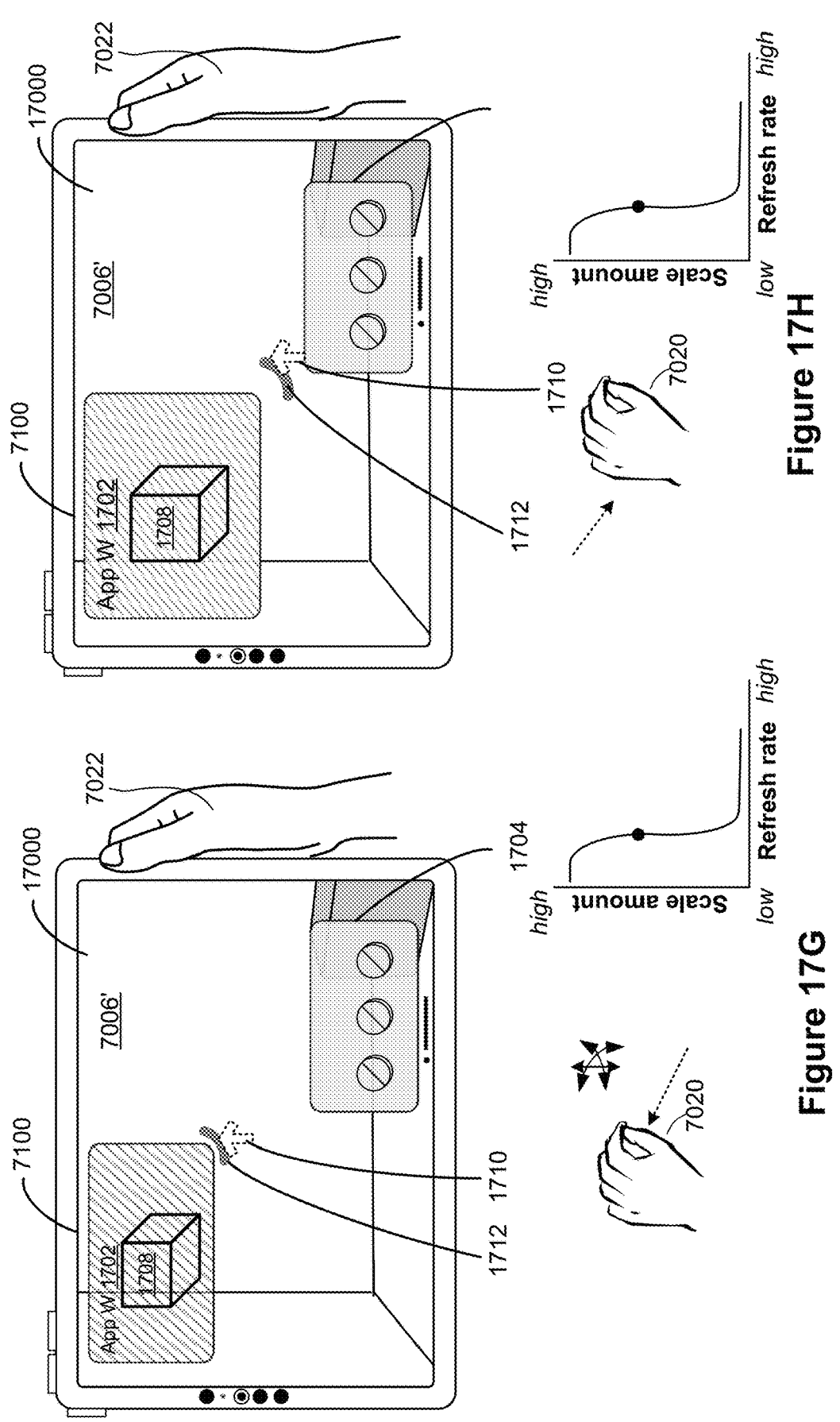

FIGS. 17G-17H illustrate the same example of the resize operation described with reference to FIGS. 17E-17F, with the determined application refresh rate (fps) of the application window 1702 at a higher application refresh rate relative to the application refresh rate of the application window 1702 determined in FIGS. 17E-17F. In some embodiments, in accordance with the determined application refresh rate illustrated in FIGS. 17G-17H, the application window 1702 is scaled by a smaller proportional amount than in the example of FIGS. 17E-17F. Accordingly, in the current frame of the user interface 17000 in FIG. 17H, the application window 1702 appears to lag even farther behind the resize affordance 1712, as compared to the application window 1702 lagging behind resize affordance 1712 in the user interface 17000 in FIG. 17F. Accordingly, the amount of scaling of the application window 1702 is dependent on the determined application refresh rate of the application window 1702, as described in more detail below with reference to FIGS. 17S-17T.

Figures 17I, 17J:
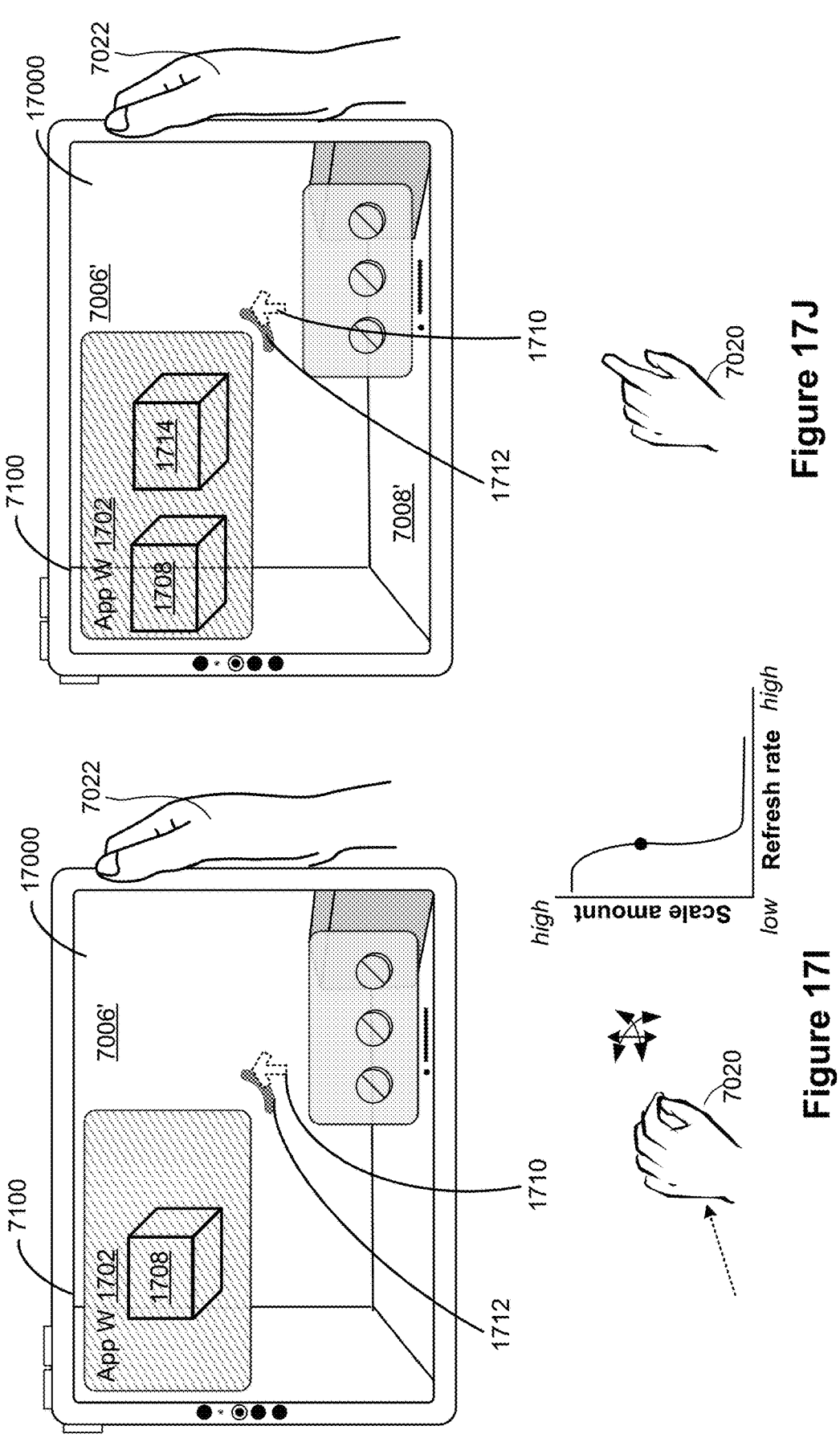

FIG. 17I illustrates that the user input corresponding to a request to resize the application window 1702 continues to move the user's hand 7020 to the right, as compared to the position of the user's hand 7020 in FIG. 17H, the resize affordance 1712 is updated within the user interface 17000, and the application window 1702 continues to be scaled according to the same scaling factor that is determined in the graphs of FIGS. 17G-17H (e.g., the application window 1702 in FIG. 17I is determined to have an application refresh rate that is the same as the application refresh rate of the application window 1702 in FIGS. 17G-17H). For example, in FIG. 17I, for the current frame of user interface 17000, the application window 1702 is scaled (e.g., re-scaled, after application window 1702 was scaled in the user interface 17000 in FIG. 17H) by the scaling factor according to the difference between the requested size of the application window 1702 (e.g., where the requested size of the application window 1702 corresponds to the size of the application window 1702 illustrated in FIG. 17J) and the previous size of the application window 1702 when application window 1702 was last updated by the application. In some embodiments, during the detection of the user input to resize the application window 1702, the requested size of the application window changes across multiple frames (e.g., as illustrated in FIGS. 17G-17I), such that the application window 1702 is displayed in the user interface 17000 with multiple intermediate sizes (e.g., the application window 1702 is scaled multiple times (e.g., in FIG. 17H, then in FIG. 17I), optionally by a different scaling factor) before the application window 1702 and the content of application window (e.g., user interface element 1708) update according to the application refresh rate, as illustrated in FIG. 17J.

FIG. 17J illustrates application window 1702 after the application window 1702, and the application content in application window 1702, has been refreshed. For example, upon the refresh of the application window 1702, the application window 1702 is re-rendered and is displayed at a position and with a size (e.g., at the requested size) indicating that the application window 1702 has caught up to resize affordance 1712. For example, a distance between the resize affordance 1712 and the application window 1702 returns to the standard space between the resize affordance 1712 and the application window 1702 without scaling of the application window 1702. In some embodiments, the content within application window 1702 is also updated via the application, for example, the user interface object element 1708 and user interface element 1714 are displayed in FIG. 17J as part of the refreshed application window 1702. As such, the application window 1702 and its content are not scaled in FIG. 17J.

FIG. 17J further illustrates detecting an end of the user input, for example, detecting that the user's hand 7020 is no longer performing the air gesture and/or has performed a depinch air gesture. In some embodiments, in response to detecting the end of the user input, the change to the one or more visual properties of the resize affordance 1712 and/or the change to the one or more visual properties of the application window 1702 that were changed during the resizing input, are reversed, as illustrated in FIG. 17K.

Figures 17K, 17L:
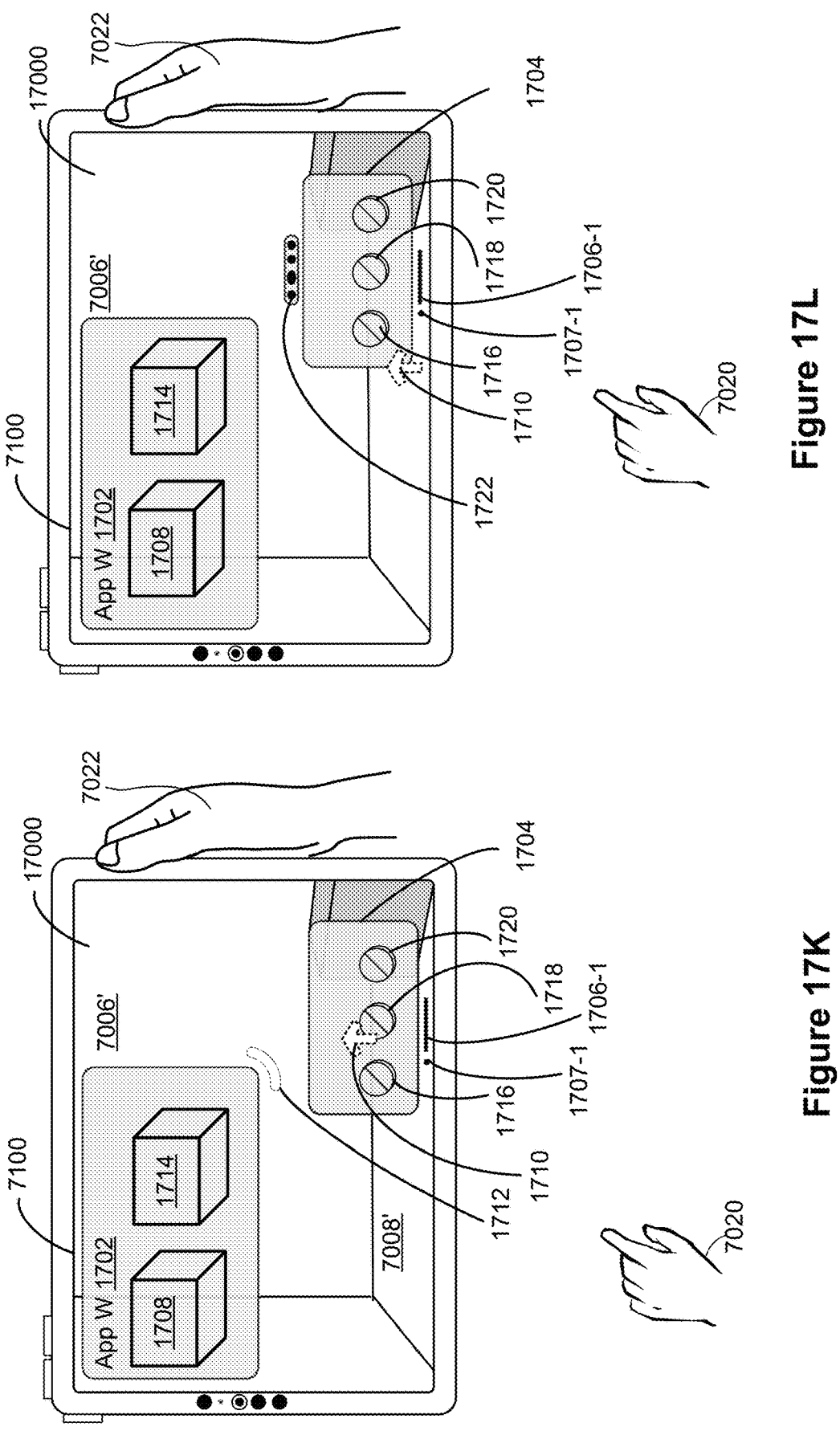

FIGS. 17K-17P illustrate an example of resizing an application window 1704 that is determined as having a high application refresh rate. In FIG. 17K, the user's attention 1710 is directed to the application window 1704. In some embodiments, the application window 1704 includes application content, such as user interface element 1716, user interface element 1718, and user interface element 1720.

In some embodiments, in response to detecting that the user's attention 1710 is directed to the application window 1704, one or more user interface objects for the application window dynamically appear (e.g., title bar 1722 and/or another accessory object). In some embodiments, one or more of the user interface objects for the application window 1704 are optionally displayed concurrently with the application window 1704 before detecting that the user's attention 1710 is directed to the application window 1704 (e.g., grabber 1706-1 and/or close affordance 1707-1). For example, in FIG. 17L, the application window 1704 is concurrently displayed with one or more user interface objects that are separate from the application window, including object 1722, such as a title bar (e.g., title bar 716, as described with reference to FIGS. 7S), one or more controls (e.g., grabber 1706-1 and/or close affordance 1707-1), one or more application menus, or other control panels that include controls for interacting with the application associated with application window 1704.

In some embodiments, the one or more user interface objects are displayed away from the application window 1704 (e.g., separate from the application window 1704 and/or with a nonzero distance between the user interface objects and the application window). In some embodiments, the one or more user interface objects are displayed as at least partially overlapping the application window 1704 (e.g., user interface object 1762a in FIG. 17T partially overlaps application window 1760a). In some embodiments, the one or more user interface objects are refreshed independently from the application window 1704. For example, the one or more user interface objects have a refresh rate (e.g., optionally, the UI refresh rate) that is faster (e.g., or the same, or slower) than the application refresh rate of the application window 1704. As such, as the application window 1704 is resized, in some embodiments, the one or more user interface objects are independently updated, without regard to the resizing input and/or without being scaled during the resize operation.

FIG. 17L illustrates the user's attention 1710 directed to a portion of the application window 1704 for causing the resize affordance 1712-2 to appear. In some embodiments, a user input selecting the resize affordance 1712-2 enables the user to resize the application window 1704, for example, using a pinch and drag gesture, or other resize input, to move the corner of the application window 1704, as described with reference to FIG. 17B1.

Figures 17M, 17N:
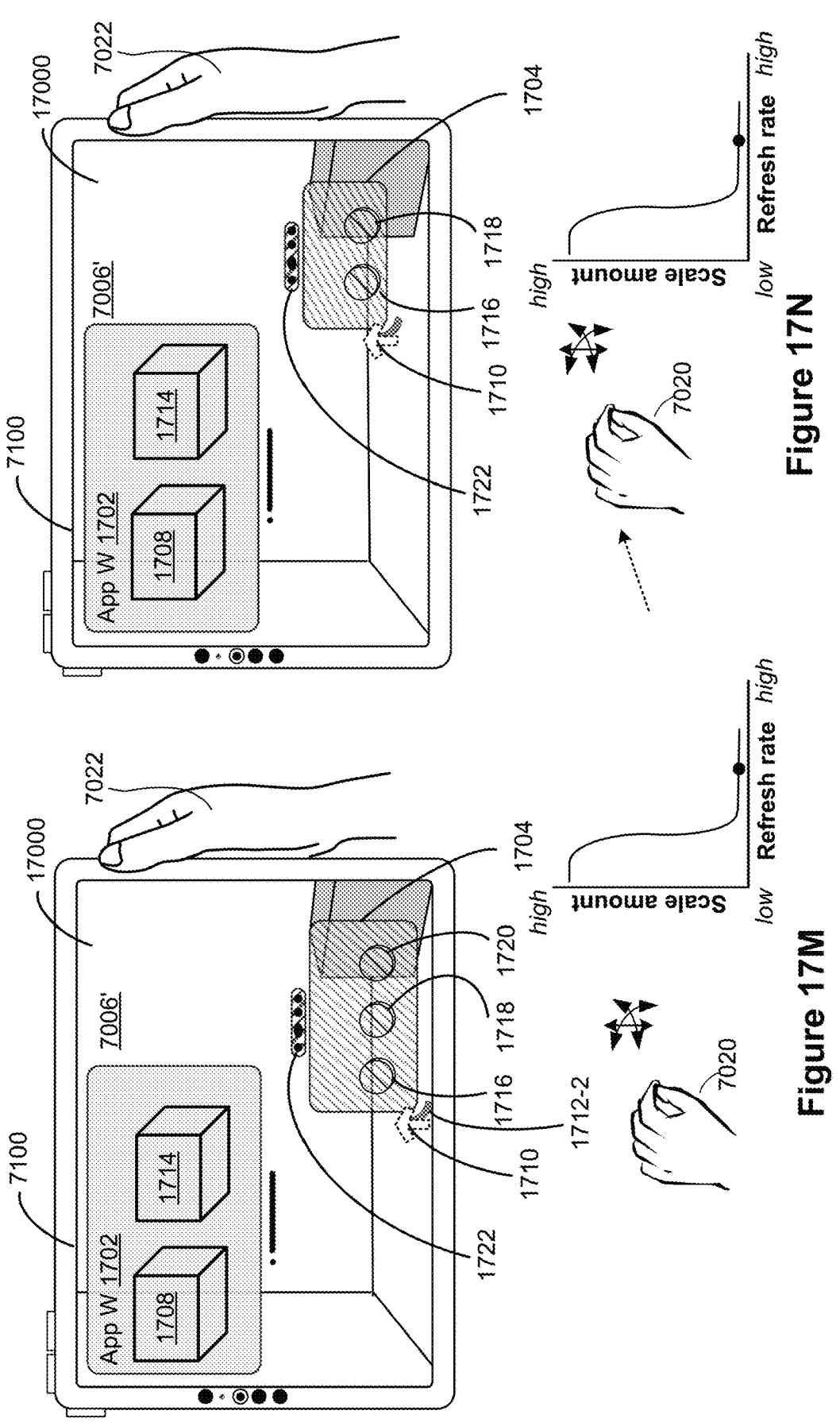

FIG. 17M illustrates detecting a user input, such as an air pinch input (or, alternatively a touch or click input), selecting the resize affordance 1712-2, and in response to detecting the user input, application window 1704 and/or object 1722 are visually deemphasized, or otherwise displayed with reduced visual prominence, relative to the application window 1704 and object 1722 illustrated in FIG. 17L. In some embodiments, the application window 1704 and/or object 1722 continue to be displayed with visually deemphasis while the resize operation is being performed.

FIG. 17M illustrates the graph for determining the scale amount (or scale factor) based on the application refresh rate for application window 1704. As illustrated in FIG. 17M, the application refresh rate is considered to be a high application refresh rate (e.g., an fps above 30, above 50, or another threshold amount) in this example. In some embodiments, based on the high application refresh rate of application window 1704, the scale amount (or scale factor) is low (e.g., or zero).

Figures 17O, 17P:
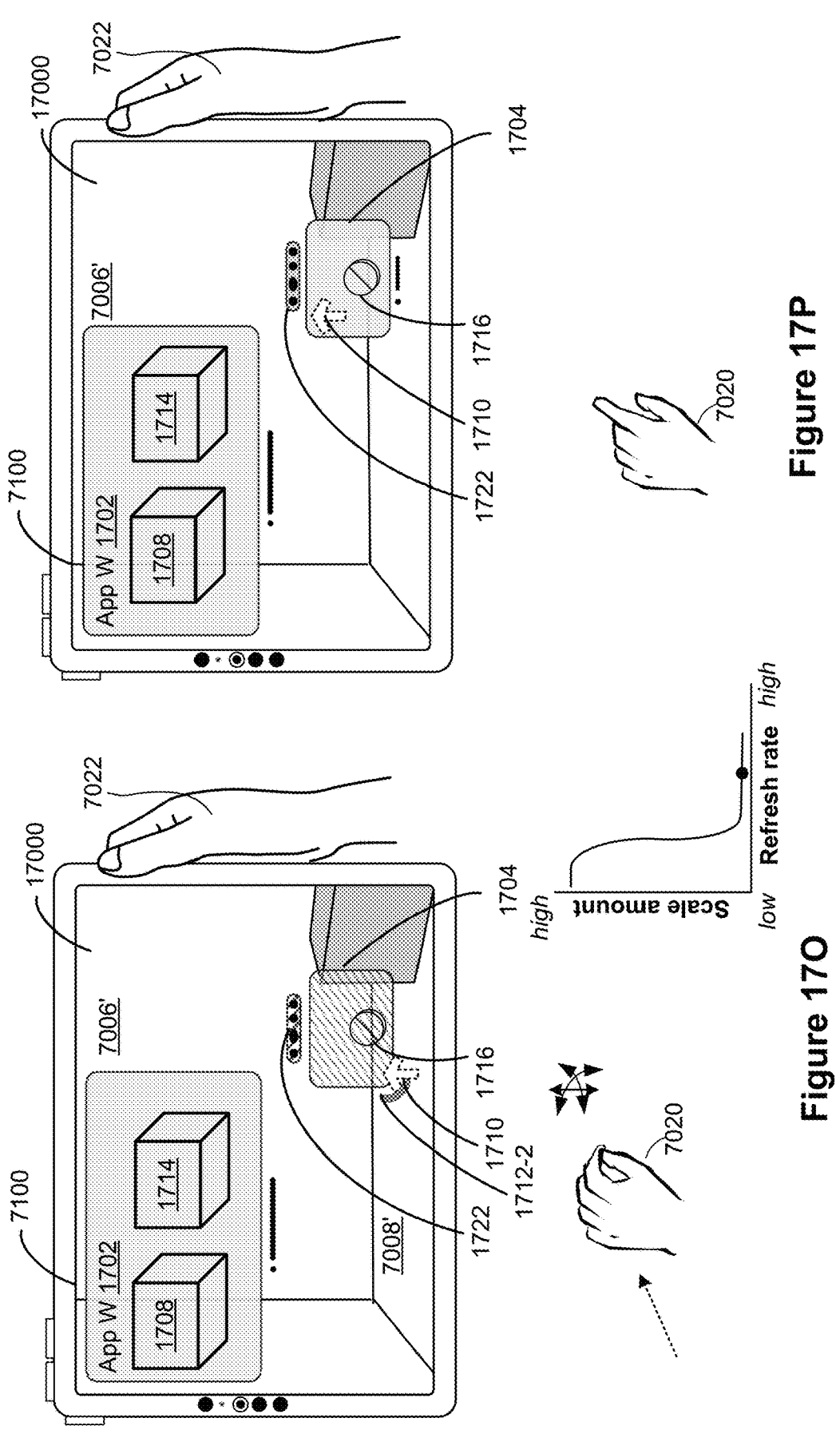

For example, as illustrated in FIGS. 17M-17O, while the application window 1704 is resized, the application window 1704 and the content of application window 1704 are updated, without scaling, in accordance with the resizing input. In some embodiments, the application window 1704 is updated (e.g., by the corresponding application) to display a different set of user interface elements and/or display a different arrangement of user interface elements. For example, user interface element 1716 and user interface element 1718 are refreshed (e.g., re-rendered and/or updated) in FIG. 17N to fit the updated window size in FIG. 17N. In FIG. 17O, the application window 1704 is refreshed again (e.g., at the high application refresh rate), and the user interface elements are rearranged, such that only user interface element 1716 is displayed within the application window 1704. Because the application refresh rate of the application window 1704 is high enough to update the application window 1704 and the content of the application window (e.g., high enough to give the appearance of updating in real time as the user input changes), the device 100 forgoes scaling (e.g., or scales by a small amount) the application window 1704 from FIG. 17M (e.g., as indicated by the graphs in FIGS. 17M-17O).

FIG. 17P illustrates that, in response to a second user input (e.g., and/or an end of the resizing user input), such as a depinch gesture, liftoff, or other release of the resize affordance 1712-2, the application window 1704 and/or the object 1722 are redisplayed without the visual deemphasis (e.g., return to a same level of opacity, blur, and/or luminance of the application window 1704 and/or the object 1722 as illustrated in FIG. 17L before the resize operation is performed). In some embodiments, object 1722 is not scaled or otherwise resized (e.g., relative to object 1722 illustrated in FIG. 17L) in accordance with the user inputs to resize application window 1704. Instead, object 1722 is independently updated by the application associated with application window 1704 to update its size and/or to change the controls provided within object 1722, as described with reference to FIG. 17T.

Figures 17Q, 17R:
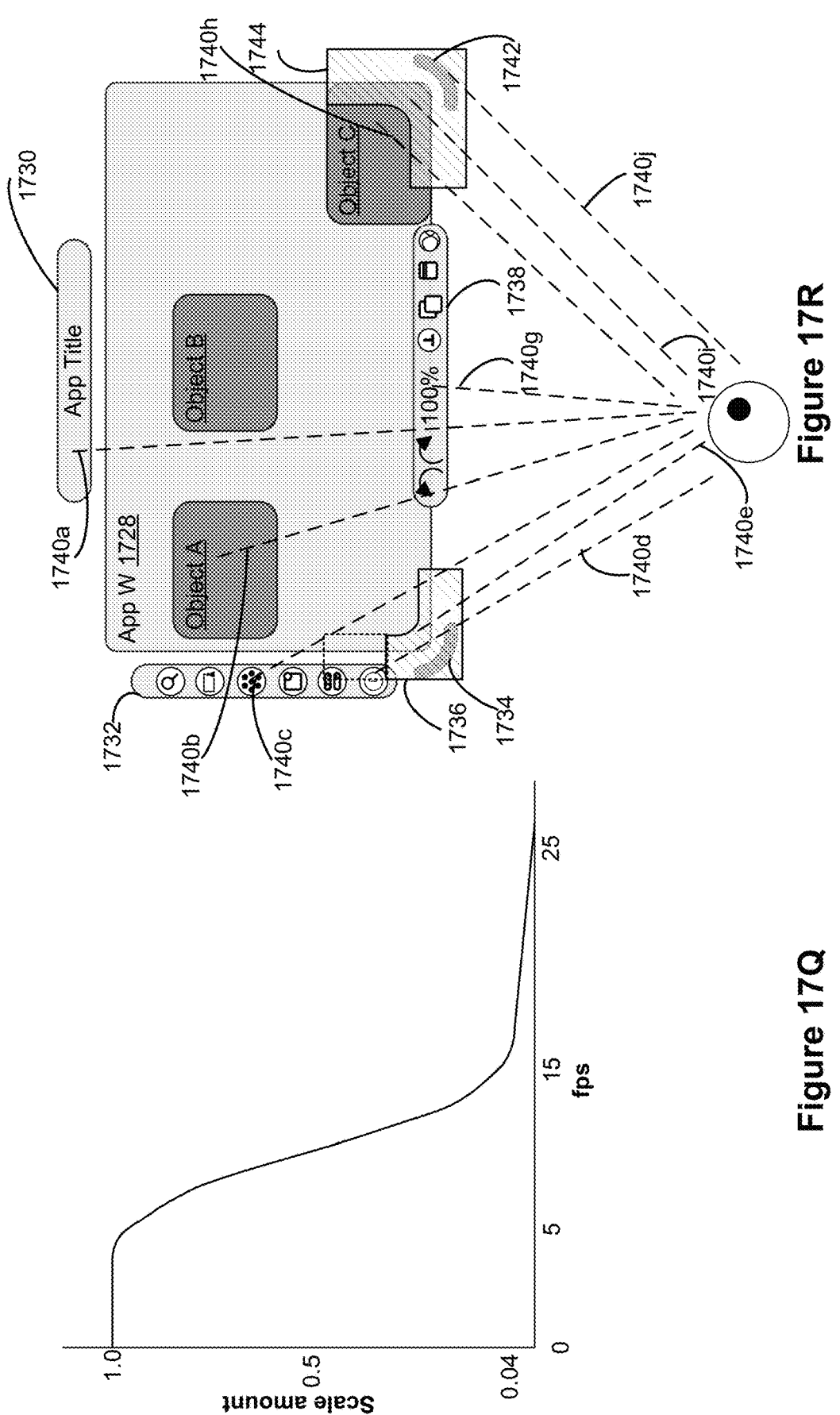

FIG. 17Q illustrates an example graph of a scale amount (e.g., scale factor) versus an application refresh rate for application content (e.g., an application window, user interface objects, or other application content). It will be understood that the values of the scale amount versus application refresh rate shown in FIG. 17Q provide one example of defining the scale amount as a function of the determined application refresh rate. In some embodiments, as illustrated in the graph, below 5 fps, the application content is scaled by a factor of 1.0 (e.g., stretched fully to the expected size indicated by the user's input during the resize operation). In some embodiments, between 5 fps and 15 fps, the application content is scaled by a factor between 0.99 and 0.04, based on the determined application refresh rate for the application content. In some embodiments, between 15 fps and 25 fps, the application content is scaled by a factor less than 0.04, and above 25 fps, the application is not scaled at all (e.g., the application content refreshes quickly enough where the content does not need to be scaled to indicate to the user that the application content is responsive to the resize operation).

In some embodiments, the application refresh rate is determined by performing a plurality of calculations, and the application refresh rate is determined as the shortest calculated application refresh rate (e.g., a smallest fps) of the plurality of calculations.

In some embodiments, the plurality of calculations includes determining the previously-calculated application refresh rate of the respective application window (e.g., calculated during the user's previous interaction with the respective application window). For example, the previously-calculated application refresh rate corresponds to the application refresh rate that was calculated last time a resizing operation was performed on the application window.

In some embodiments, the plurality of calculations includes determining an average refresh rate of the application window over two or more frames. For example, the time delay between sequential updates to the first content (e.g., that correspond to different sizes) by the corresponding application is recorded and used to calculate a running average of time delays for the last several updates (e.g., five updates, seven updates, or two updates). The running average of the time delays is then used to calculate a time-averaged frame rate for the first content, in accordance with some embodiments. Alternatively, in some embodiments, the time delay for each update is used to calculate a corresponding refresh rate, and the refresh rates for multiple updates are averaged to obtained a time-averaged refresh rate for the first content.

In some embodiments, the plurality of calculations includes determining the time delay between each updated size specified by a respective portion of a user input during the resize operation for an application window. In some embodiments, the actual update of the application window and its content for that updated size is recorded and the delay for the last update to the application window is used to calculate a frame rate for the last update.

FIG. 17R illustrates an example of a user's attention (e.g., and/or another user input) directed to various portions of an application window 1728. In some embodiments, the application window 1728 includes application content, such as Object A, Object B and Object C, at various respective positions within the application window 1728. In some embodiments, the user is enabled to interact with the objects (e.g., Object A, Object B and Object C) displayed in the application window 1728 by directing the user's attention to a respective object. For example, in response to detecting the user's attention 1740b to Object A, the user is enabled to perform one or more gestures to control or otherwise interact with Object A.

In some embodiments, the application window includes one or more user interface objects (e.g., also referred to herein as accessory objects) that are separate from, and displayed proximate to, the application window (e.g., as described with reference to object 1722 in FIG. 17L). In some embodiments, the accessory objects are related to the application window, for example, the accessory objects provide information about and/or controls for interacting with the application window. For example, in FIG. 17R, the application window 1728 is concurrently displayed with a title bar 1730 (e.g., optionally having analogous features to title bar 716), a control panel 1732, and/or content controls 1738. In some embodiments, the user is enabled to interact with the one or more user interface objects by directing the user's attention to a respective portion of the respective user interface object. For example, in response to detecting the user's attention 1740a directed to the title bar 1730, the user is enabled to view additional tabs of the application associated with application window 1728 and/or access menu controls for the application window 1728. In some embodiments, in response to detecting the user's attention 1740a directed to the title bar 1730, the user is enabled to interact with the title bar 1730 in analogous ways as described with reference to title bar 716. Similarly, in response to detecting the user's attention 1740c directed to a respective control within control panel 1732, the user is enabled to select the respective control (e.g., a playback control, window controls, and/or other types of controls) using one or more gestures (e.g., air gestures, touch gestures, or other types of gestures) or other user inputs. In some embodiments, in response to detecting the user's attention 1740g directed to a respective control displayed in the content controls 1738, the user is enabled to control one or more features of the application window 1728. For example, the user is enabled to change a zoom size of the application window 1728. In some embodiments, the controls that are available within the one or more user interface objects are dependent on the application associated with application window 1728 (e.g., different applications provide different sets of controls and/or different user interface objects that are displayed proximate to the respective application window).

In some embodiments, a resize affordance (e.g., resize affordance 1734 and/or resize affordance 1742) is displayed in response to detecting that the user's attention is directed within an active region (e.g., region 1736 and/or region 1744) of the application window 1728. For example, application window 1728 includes one or more active regions that cause one or more affordances to dynamically display. For example, within the corner active region 1736, in response to detecting the user's attention 1740e is directed to a portion within the active region 1736, resize affordance 1734 is displayed and the user is enabled to interact with the resize affordance 1734 by maintaining the user's attention within the corner active region 1736. FIG. 17R illustrates the corner active region comprises an L shape, where the inner curvature of the L shape matches a curvature of the corner of the application window 1728. It will be understood that alternative active region shapes may be selected or used in other implementations. For example, the L shape corner active region 1744 has different dimensions from the active region 1736. The active regions 1736 and 1744 illustrated in FIG. 17R are optionally not displayed to the user, but enable the user to access various controls that are dynamically displayed in response to detecting the user's attention within a respective active region associated with a respective control.

In some embodiments, the resize affordance 1734 and/or resize affordance 1742 are displayed with a shape that includes a radius of curvature that matches the radius of curvature of the corner of application window 1728. In some embodiments, the resize affordance 1734 and/or resize affordance 1742 are displayed with a size that is based on a size of the application window 1728. For example, the resize affordances scale with the size of the application window 1728. In some embodiments, the length of the resize affordance that extends along a respective edge of the application window 1728 is based on the length of the respective edge of the application window 1728.

In some embodiments, the active regions are defined as being in front of or behind, relative to the z-axis, the application window 1728 and/or the one or more user interface objects (e.g., title bar 1730, control panel 1732, and/or content controls 1738). For example, the active region 1736 and the active region 1744 are positioned in front of the application window such that, if the user's attention 1740i is directed to a portion of the active region 1744 that overlaps with application window 1728 (e.g., Object C in application window 1728), the resize affordance 1742 is displayed and the user is enabled to interact with the resize affordance 1742 (e.g., by directing the user's attention 1740j to the resize affordance 1742 (e.g., and/or to the active region 1744) and performing one or more inputs, such as air gestures to resize the application window 1728) that is dynamically displayed in response to detecting the user's attention within active region 1744. In some embodiments, the user is not able to interact with Object C while the user's attention 1740i is directed to a portion of the active region 1744 that does not overlap with or include Object C. But, if the user's attention 1740h shifts to a portion of the application window 1728 that overlaps with or includes Object C, outside of the active region 1744, the user is enabled to select or otherwise interact with Object C of the application window 1728.

In some embodiments, the application designer is enabled to control a size and shape of a respective active region, and is optionally further enabled to control whether the active region is positioned in front of or behind the application window. For example, the user's attention 1740*d* is directed to a control in the control panel 1732. In some embodiments, the active region 1736 does not overlap with the control in control panel 1732 such that the user is enabled to interact with the control (e.g., without causing the resize affordance 1734 to appear). In some embodiments, the active region 1736 extends higher along the edge of the application window 1728 such that it overlaps with the control in control panel 1732 at which the user's attention 1740*d* is directed. Accordingly, depending on whether the control panel 1732 is positioned in front of the active region 1736 or behind the active region 1736 determines whether the user is enabled to interact with the control in the control panel 1732 or is activating the resize affordance 1734.

Figure 17S:
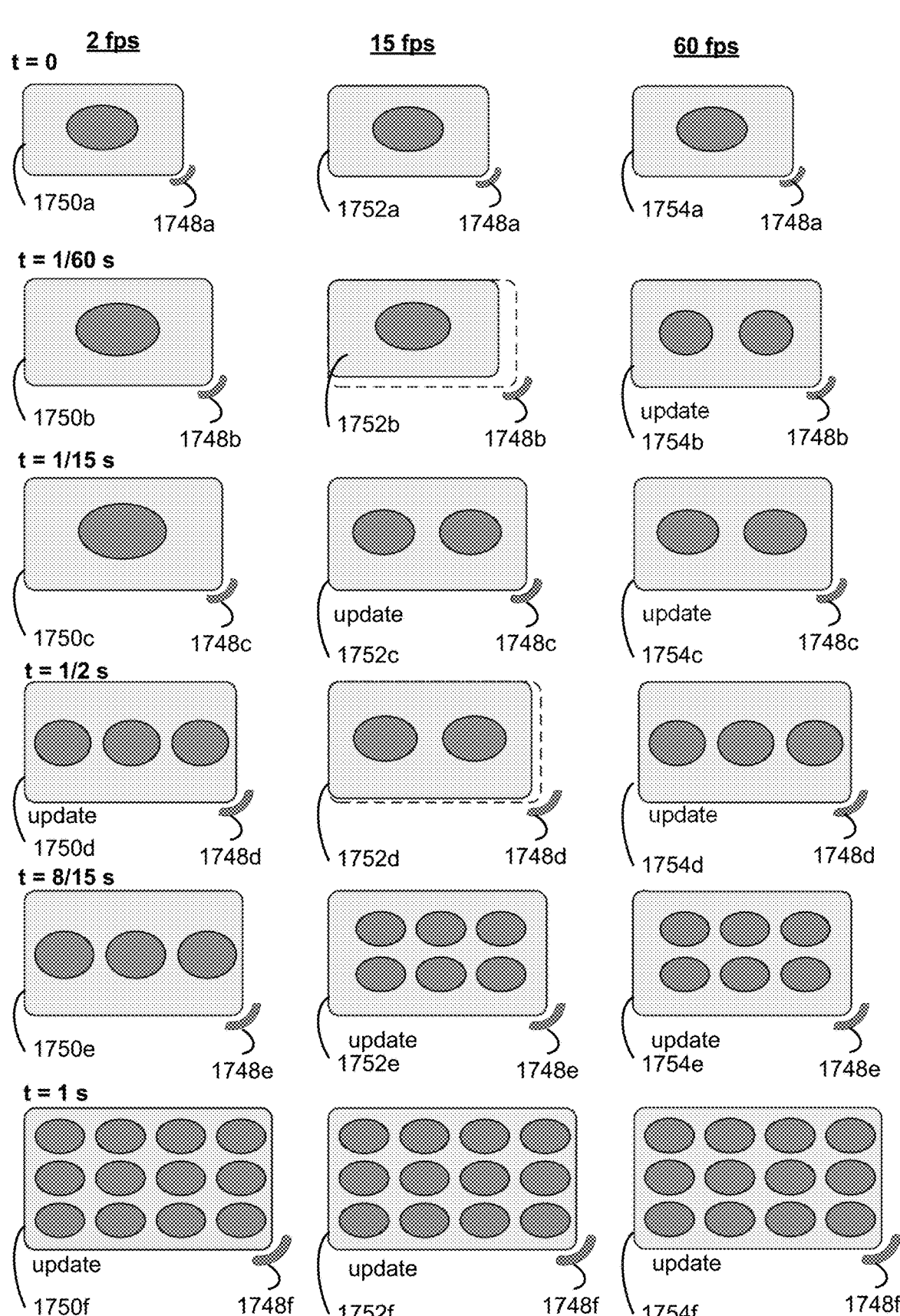
Figure 17T:
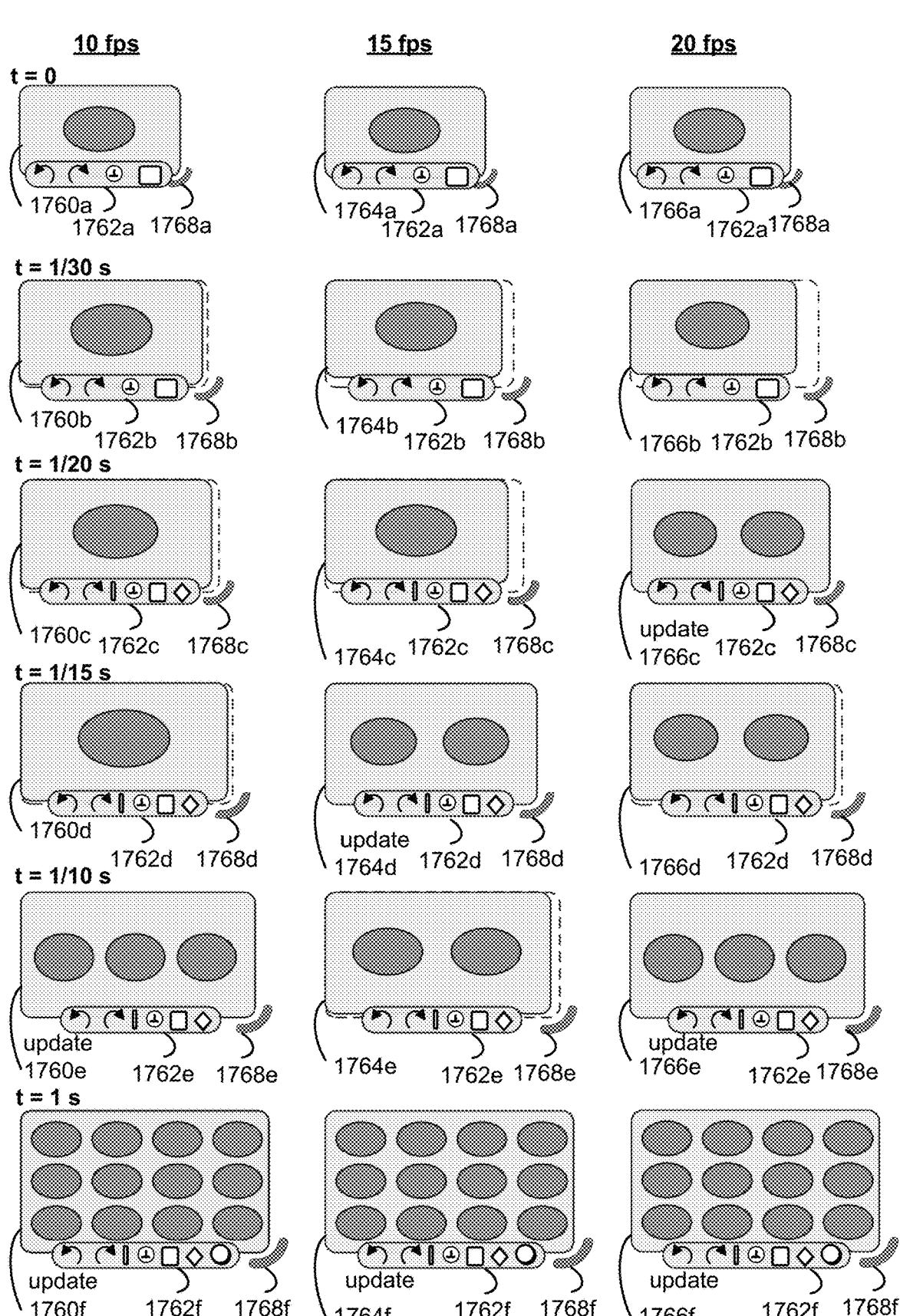

FIGS. 17S-17T illustrate examples of scaling application windows by different amounts based on an application refresh rate of the application window. For example, FIG. 17S illustrates resizing of an application window at different application refresh rates of 2 fps (e.g., application windows 1750), 15 fps (application windows 1752) and 60 fps (e.g., application windows 1754). In some embodiments, the resize requests described herein with respect to FIG. 17S illustrate different frames that are displayed during a single resize operation, where the user has continued interacting with the resize affordance 1748 by gradually moving the resize affordance 1748. As explained above, the resize affordance 1748 refreshes (e.g., according to the UI refresh rate, or another refresh rate) independently from the application windows 1750, 1752 and 1754. For example, the resize affordance 1748 has a refresh rate of at least 60 fps (e.g., and/or the UI refresh rate is at least 60 fps). As used herein, the dashed lines illustrated in FIGS. 17S-17T represent the requested application window corresponding to the size of the application that is requested by the user input, where the size of the requested application window is based at least in part on the position of the resize affordance at the respective time.

It will be understood that the different frames (e.g., different application windows), shown as progressing over time down each column of application windows, are not necessarily representative of successive frames, or frames displayed at equal times apart, but rather show a sequence of snapshots, at various times (t) (e.g., in FIG. 17S, t=0 seconds, t=¹⁄₆₀ of a second, t=¹⁄₁₅ of a second, t=½ of a second, t=⁸⁄₁₅ of the second, and t=1 second), of how the different application windows are scaled over time.

The application windows 1750 (e.g., application windows 1750*a*-1750*f*) have a low application refresh rate of 2 fps, which, based on the graph illustrated in FIG. 17Q, corresponds to scaling the application window by a scaling factor of 1.0. As such, in response to the resize affordance 1748 (e.g., resize affordance 1748*a*-1748*f*) moving to the position displayed for application window 1750*b* (e.g., at t=¹⁄₆₀ of a second), the application window 1750*a* is stretched in order to be displayed with the requested size of the application window 1750*b*. Accordingly, the application windows 1750 appear to stretch to 100% of their requested size in accordance with the movement of the resize affordance 1748. Thus, the application windows 1750 do not appear to lag behind the resize affordance 1748. However, because the application windows 1750 refresh at the low application refresh rate of 2 fps, the application windows 1750 and/or the content within the application windows are stretched, using by the scaling factor of 1.0, until the application window 1750*d* is refreshed (e.g., updated), at which point the application content within the application window 1750*d* is updated to display additional user interface elements within the application window 1750*d*. After the application window 1750*d* is updated, in response to a request to resize the application (e.g., corresponding to moving resize affordance 1748*d* to the position of resize affordance 1748*e*), at t=⁸⁄₁₅ of a second, the application window, as represented by application window 1750*e*, is stretched by 100% of the difference between the requested size, indicated by position of resize affordance 1748*e*, and the size of the application window 1750*c* (e.g., at the previous time, where t=½ s) (e.g., without refreshing the application window 1750*e* or its application content), until the application window 1750*f* refreshes (e.g., at t=1 second) and renders additional content within the application window 1750*f*, in accordance with the application window 1750*f* having an increased size corresponding to the position of resize affordance 1748*f*.

The application windows 1752 (e.g., application windows 1752*a*-1752*f*) are determined as having an application refresh rate of 15 fps, which, based on the graph illustrated in FIG. 17Q, corresponds to scaling the application windows 1752 by a factor of approximately 0.04. As such, in response to the resize affordance 1748*a* moving to the position of resize affordance 1748*b* corresponding to a request to increase the size of the application window to the requested size indicated by the dashed lines, the application window 1752*b* is stretched (e.g., at t=¹⁄₆₀ of a second) by 4% of the difference between the requested size indicated by the dashed lines and the size of the application window 1752*a* (e.g., at the previous time, where t=0).

The application window 1752*c* is refreshed (e.g., updated) at t=¹⁄₁₅ of a second, such that the application window 1752*c* is not scaled (e.g., there is no difference between the requested size of the application window 1752*c* and the rendered application window 1752*c*).

In some embodiments, after updating the application content in application window 1752*c*, in response to a request to resize the application window to a size (e.g., indicated by the dashed lines around application window 1752*d*) corresponding to the location of resize affordance 1748*d*, the application window 1752*c* is stretched to the size of application window 1752*d* (e.g., at t=½ of a second), which is 4% of the difference between the requested size (e.g., where calculating the size includes calculating the x-axis and the y-axis of the application window independently from each other) indicated by the dashed lines around application window 1752*d* and the size of application window at the time when the application window 1752*d* was updated by the application (e.g., at t=⁷⁄₁₅ of a second, based on the application refresh rate of 15 fps).

The application windows 1752*e* and 1752*f* are refreshed by the application at t=⁸⁄₁₅ of a second, and thus, no amount of stretching and/or scaling is performed as the application windows 1752*e* and 1752*f* are rendered with the requested size indicated by resize affordances 1748*e* and 1748*f*, respectively.

The application windows 1754 (e.g., application windows 1754*a*-1754*f*) have a high application refresh rate of 60 fps, which, based on the graph illustrated in FIG. 17Q, corresponds to scaling the application window by a factor of 0. For example, the application windows 1754 are refreshed every 60 fps, and thus the application windows 1754 and their respective application content are redrawn, re-rendered, or otherwise updated by the corresponding application at each instance of the application windows 1754 illustrated in FIG. 7S. For example, none of the application windows 1754 are stretched or otherwise scaled. Instead, for example, at each time shown in FIG. 7S, the requested size of the application window 1754 and its corresponding application content are determined and displayed (e.g., there is no delay between refreshing the application window 1752*b* and the refresh rate of the resize affordance 1748*b* (e.g., the UI refresh rate) as the resize affordance 1748*b* is moved from its previous position as resize affordance 1748*a*).

FIG. 17T illustrates resizing an application window at different application refresh rates of the application window, while concurrently displaying a user interface object 1762 (e.g., user interface objects 1762*a*-1762*f*) that is refreshed separately from the application windows 1760, 1764 and 1766.

In some embodiments, the resize requests described in FIG. 17T illustrate different frames that are displayed during a single resize operation, where the user has continued interacting with the resize affordance 1768 by gradually moving, via the same user input (e.g., a pinch and drag input, or other extended user input), the resize affordance 1768. As explained above, the resize affordance 1768 refreshes independently from the application windows 1760, 1764 and 1766. Further, the user interface object 1762 is refreshed independently from application windows 1760, 1764 and 1766, and, optionally, the user interface object 1762 and resize affordance 1768 are refreshed at a same refresh rate (e.g., the UI refresh rate, or another refresh rate that is optionally different from the application refresh rate). It will be understood that the different frames (e.g., different application windows), shown as progressing over time down each column of application windows, are not necessarily representative of successive frames, or frames displayed at equal times apart, but rather show snapshots, at various times (t) (e.g., t=0 seconds, t=$\frac{1}{30}$ of a second, t=$\frac{1}{20}$ of a second, t=$\frac{1}{15}$ of a second, t=$\frac{1}{10}$ of a second, and t=1 second), of how the different application windows are scaled over time.

FIG. 17T illustrates how the amount of scaling for a respective application window is different based on the determined application refresh rate for the respective application window. For example, application windows 1760 (e.g., application windows 1760*a*-1760*f*) have an application refresh rate of 10 fps, while application windows 1764 (e.g., application windows 1764*a*-1764*f*) have an application refresh rate of 15 fps, and application windows 1766 (e.g., application windows 1766*a*-1766*f*) have an application refresh rate of 20 fps. Accordingly, based on the graph illustrated in FIG. 17Q, the application windows 1760, with a lower application refresh rate than application windows 1764, are scaled by a larger amount than the application windows 1766, which have a higher application refresh rate than application windows 1760 and 1764. For example, application window 1760*b* is scaled by the greatest amount (e.g., appears larger than application window 1764*b*), and application window 1764*c* is scaled by a greater amount than application window 1766*b* (e.g., which is scaled by the smallest amount).

In some embodiments, application window 1766*c* is not scaled, while application windows 1760*c* and 1764*c* are scaled by respective amounts (e.g., determined based on the respective application refresh rates), because application window 1766*c* has been refreshed, and is thus caught up to the resize request illustrated across application windows 1760*c*, 1764*c* and 1766*c*.

After application window 1766*c* is refreshed at t=$\frac{1}{20}$ of a second, in response to a resize request that further increases the size of application window 1766*c*, application window 1766*c* and the application content is stretched, as illustrated by application window 1766*d*, while application window 1764*d* is not scaled and/or stretched because application window 1764*d* is refreshed at t=$\frac{1}{15}$ of a second. Accordingly, because the application refresh rates of the application windows 1760, 1764 and 1766 are different, the application windows refresh at different points in time, and are scaled by different amounts determined based on their respective application refresh rates. For example, because a higher application refresh rate will refresh a respective application window faster, there is less need to scale the application window between application refreshes of the respective application window, because the application window is updated relatively quickly, demonstrating to the user that the application window is responsive to the resize command, and thus a lower scaling factor is used while refreshing the user interface between application refreshes. In contrast, a lower application refresh rate corresponds to a greater need to scale the application window between application refreshes of the respective application window in order for the application window to be appear to be responsive to the resize command, and thus a greater scaling factor is used while refreshing the user interface between application refreshes of the respective application window.

FIG. 17T illustrates that the user interface object 1762 is scaled and/or updated independently of the application windows 1760, 1764 and 1766. For example, user interface object 1762 refreshes at a different refresh rate, for example, at the UI refresh rate, or at another refresh rate greater than a threshold refresh rate (e.g., greater than 30 fps, greater than 60 fps, greater than 90 fps, or another amount). For example, in response to resize operation between application window 1764*a* and 1764*b*, the user interface object 1762*a* is updated to user interface object 1762*b* at t=$\frac{1}{30}$ of a second without scaling or stretching user interface object 1762, but is instead refreshed (e.g., updated, rendered, and/or redisplayed), to be positioned at a bottom center of the size and/or position of the requested application window, indicated by the dashed lines around application window 1764*b*.

In some embodiments, the application associated with the application windows 1760, 1764 and 1766 controls (e.g., programs, determines, or otherwise sets) how to update the user interface object 1762. For example, the application is enabled to change one or more controls that are available within the user interface object 1762 and/or change a position, size, shape and/or appearance of the user interface object 1762. As explained with reference to FIG. 17R, the user is enabled to interact with the one or controls that are available within the user interface object 1762. In some embodiments, the application automatically adjusts the user interface object 1762 in accordance with a determination that the respective application window has a size that satisfies a threshold size. For example, the user interface object 1762 is updated to include additional controls (e.g., and/or different or fewer controls) in accordance with the respective application window having a size that satisfies the threshold size.

For example, the user interface object 1762*b* is updated to the user interface object 1762*c* at t=$\frac{1}{20}$ of a second, including increasing a size of, and displaying additional controls displayed in, the user interface object 1762*c*, regardless of whether application content in the application window 1760c, 1764c and/or 1766c has been refreshed. In some embodiments, the user interface object 1762d is maintained (e.g., at t=⅕ of a second) in a same position relative to the requested application window (e.g., at the bottom center of the requested application window). In some embodiments, the user interface object 1762e is maintained to have the same size, position, shape and/or available controls even while the application windows 1760e and 1766e are refreshed at t=¹⁄₁₀ of a second, based on their respective application refresh rates of 10 fps and 20 fps, while application window 1764e is not refreshed at t=¹⁄₁₀ of a second due to its 15 fps application refresh rate. For example, refreshing the application content and/or the application windows 1760e and 1766e is independent of refreshing the user interface object 1762e. In some embodiments, the user interface object 1762f is further updated to display additional controls in accordance with the application windows 1760f, 1764f and/or 1766f having a size that satisfies a threshold size.

FIG. 18 is a flow diagram of an exemplary method 1800 for scaling a user interface object, during a resize operation of the user interface object, by different scaling factors based on a refresh rate of content in the user interface object. Updating display of the user interface object by automatically scaling the user interface object by a first amount while content of the user interface object has a first refresh rate, and by a second amount while content of the user interface object has a second refresh rate, while the user interface object is being resized, reduces the processing load of the computer system and provides improved visual feedback to the user that the computer system is responsive to the resize operation, even when a refresh rate of content of the user interface object does not refresh content of the user interface object fast enough to appear responsive to the user input for the resize operation (e.g., instead of requiring a user interface object to update at a higher refresh rate, method 1800 reduces the processing burden of the system by using user interface object scaling, with varying amounts of scaling based on the refresh rate of the content of the user interface object, while continuing to visually update the user interface object, to display a smooth transition between sizes of the user interface object during resizing).

In some embodiments, method 1800 is performed at a computer system that is in communication with a first display generation component (e.g., a first display generation component of a two-sided display generation component, a heads-up display, a head-mounted display (HMD), a display, a touchscreen, a projector, a standalone display, and/or a display that is enclosed in the same housing as another display generation component of the same type or a different type) having a first display area (e.g., corresponding to a three-dimensional environment and/or corresponding to a screen area) and one or more input devices (e.g., cameras, controllers, touch-sensitive surfaces, joysticks, buttons, rotatable crown or wheel, gloves, watches (e.g., with rotatable crown, button(s) and/or touch-sensitive surface), motion sensors, and/or orientation sensors). In some embodiments, the first display generation component is a display component facing the user and provides an XR experience to the user. In some embodiments, the first display generation component includes two or more display components (e.g., one set for each eye) that display slightly different images to form a stereoscopic view of the three-dimensional environment. In some embodiments, the first display generation component and a second display generation component form a two-sided display device (e.g., a two-sided HMD) that displays a first user interface on a first side corresponding to the first display generation component, and a second user interface on the second side corresponding to the second display generation component. In some embodiments, the second display generation component is a display component facing away from the user and toward an external environment of the user and optionally provides status information related to the first display generation component (e.g., displayed content and/or operational state) and/or the user (e.g., movement of the user's eyes, and/or attention state of the user) to other users in the external environment. In some embodiments, the computing system is an integrated device with one or more processors and memory enclosed in the same housing as the first and the second display generation components and at least some of the one or more input devices. In some embodiments, the computing system includes a computing component (e.g., a server, a mobile electronic device such as a smart phone or tablet device, a wearable device such as a watch, wristband, or earphones, a desktop computer, or a laptop computer) that includes one or more processors and memory that is separate from the display generation component(s) and/or the one or more input devices. In some embodiments, the display generation component(s) and the one or more input devices are integrated and enclosed in the same housing. In some embodiments, the method 1800 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1500 are, optionally, combined and/or the order of some operations is, optionally, changed.

The computer system displays (1802), via the display generation component (e.g., display generation component 7100, an HMD (e.g., HMD 7100a), a touch-screen display, a standalone display), a first user interface object (e.g., an application window (e.g., application window 1702), a system user interface object, an internal object within another user interface object, a two-dimensional object, a three-dimensional object, and/or another type of object that is resizable and includes updatable content that updates differently for different sizes of the first user interface object), wherein the first user interface object includes first content (e.g., user interface element 1708 included in application window 1702) (e.g., a set of foreground objects spatially arranged in accordance with a first layout within the boundaries of the first user interface object, optionally overlaid on a first background of the first user interface object and optionally extends in two and/or three dimensions). In some embodiments, the first user interface object is a first application window that includes one or more user interface objects (e.g., controls, affordances, indicators, images, icons, text, thumbnails, selectable objects, two-dimensional objects, three-dimensional objects, and/or other types of user interface objects) and optionally a background (e.g., image, texture, platter, or other types of background with a size and shape indicating the boundaries of the first user interface object) on which the one or more user interface objects are laid out spatially). In some embodiments, the first user interface object is displayed concurrently with one or more accessory objects, such as a close affordance, a move affordance, one or more resize affordances, a title bar, a support platter, one or more menu affordances for displaying additional control objects and/or options, and/or one or more control objects (e.g., window management controls, tabs, and/or other control affordances for performing operations with respect to the first user interface object) for the first user interface object, where the one or more accessory objects move together with the first user interface object when the first user interface object is moved from one position to another position in the environment.

In some embodiments, the first user interface object is a graphical user interface object (e.g., webpage, menu, list, window, side bar, dock, 3D model, and other types of graphical user interface object) that is resizable (e.g., to have different sizes, dimensions, and/or aspect ratios) in accordance with a movement of a user input (e.g., a drag input, a swipe input, or other types of input that includes movement relative to the physical environment, a reference frame, and/or an input device) that is directed to the graphical user interface object or a resize control associated with the graphical user interface object. In some embodiments, the first user interface object, when displayed at different sizes, has different appearances (e.g., sizes, aspect ratios, levels of detail, spatial arrangements, amounts of internal objects included within, types of objects included within, backgrounds, and/or other characteristics and properties of content that affect the internal appearance of the first user interface object) for the content (e.g., images, thumbnails, text, user interface objects, container objects, controls, and/or other types of content displayed within the first user interface object) arranged or displayed inside the boundaries of the first user interface object. In some embodiments, the first content displayed in the first user interface object is determined, at least in part, by a first application corresponding to the first user interface object. For example, if the first user interface object is a first application window of a first application, the first application determines, for a respective size of the first user interface object, what content to include within the first user interface object, what sizes and shapes the content would have, and how the content is laid out spatially within the first user interface object. Examples of the first application window includes a window of an email application that displays email messages in one region of the window and various user interface controls in other regions of the window, a window of a browser application that displays a webpage along with various user interface objects for navigation and performing various operations with respect to webpages, a window of a media player application that displays a menu of available media objects and one or more user interface controls for controlling media playback and/or navigation within various hierarchies of a media library associated with the media player application, a window of a media player application that displays multimedia content such as a video or a media album during media playback along with various media playback controls, a window of a media editing application that displays media timelines, thumbnails of videos and images, and various media playback and editing controls, and application windows or other applications.

In some embodiments, the first user interface object is an object other than an application window corresponding to a respective application. Examples of the first user interface object include a system user interface object such as a quick launch menu that includes dynamically selected application icons, a dock that includes a set of application icons, a multitasking menu that includes respective representatives of a plurality of recently open applications and/or open application windows, a control panel that includes controls for various device functions, and/or other system-level user interface objects that are not associated with a particular application and that can be displayed by the operating system in multiple different contexts irrespective of which applications are currently displayed in the viewport provided by the display generation component. In some embodiments, the operating system of the computer system determines what content (e.g., icons, images, thumbnails, controls, background, container objects, windows, platters, and/or other user interface objects) to include within the first user interface object, the shape and dimensions of the content, and how the content is laid out spatially within the first user interface object. In some embodiments, the first user interface object is an internal element (e.g., an only internal element, or one of multiple internal elements) of a second user interface object (e.g., an application window, a system user interface object, a desktop, a page, and/or a two-dimensional or three-dimensional operating environment) and is resizable within the second user interface object, optionally while the second user interface object is resized, while other internal elements of the second user interface object are resized with the second user interface object, while the second user interface object is not resized, and/or while the other internal elements of the second user interface object are not resized with the second user interface object. In some embodiments, the first user interface object is an object displayed in a three-dimensional environment (e.g., an augmented reality environment, a virtual reality environment, a mixed reality environment, and/or other three-dimensional environments) via a display generation component, such as a head-mounted display (HMD) to heads-up display. The techniques disclosed herein allow the user to receive prompt and responsive visual feedback about the resizing input that is being provided via air gestures and/or remote controllers, despite a slower refresh rate for the internal content of the resized object, so that the computer system can assure and inform the user about the progress of the resizing operation and help avoiding user input mistakes, such are the user repeating an input or abandoning and restarting a new input unnecessarily. Furthermore, when the computer system displays the user interface object in a virtual reality and/or an augmented reality environment where the location, shape, and size of the user interface object are not as confined or limited as that shown on a conventional two-dimensional desktop or touch-screen, the techniques described herein facilitate the freeform stretching and resizing of the user interface object by a user, sometimes beyond the confines of the viewport provided by the display generation component, while continuing to provide responsive visual feedback to guide the user when the user performs the freeform resizing operation in the virtual reality and/or augmented reality environment. In some embodiments, the first user interface object is an object displayed in a two-dimensional environment, a pseudo-three-dimensional environment with simulated depths, or a three-dimensional environment via a handheld device, a tablet device, a standalone display, and/or other types of display generation components. As the computer system's processing power may vary greatly on different types of devices and the complexity of internal content may vary across different applications and object types, tailoring the visual feedback for the resizing input during a resizing operation of a respective object in accordance with the techniques described herein allows the computer system to optimize the visual feedback based on the processing power of the device, the system load, and the application and/or content type for the resized object, and balance the need for responsiveness and smoothness of the visual feedback in many different types of usage scenarios, thereby improving the operability of the devices and improve user experience under a wide variety of conditions, in accordance with various embodiments. In some embodiments, the user input that is used to resize the first user interface object includes a touch gesture input detected by a touch-sensitive surface, an air gesture, a motion input provided via a controller device, or other types of input including movement.

While displaying the first user interface object including the first content via the display generation component, the computer system detects (1804), via the one or more input devices, a first user input (e.g., an air gesture such as a pinch gesture, a pinch and drag gesture, a swipe gesture, and/or another type of air gesture, provided by a hand or fingers relative to one or more motion sensors and/or cameras; a touch gesture such as a touch-hold gesture, a tap gesture, a swipe gesture, and/or another type of gesture, provided by one or more contacts on a touch-sensitive surface; a motion input provided by a controller device such as a mouse, joystick, a pointer, or other input devices; and/or other types of inputs that include movement) that is directed to the first user interface object. For example, in some embodiments, the computer system detects the user input performed with the user's hand 7020 in FIG. 17B2. In some embodiments, the first user interface object is concurrently displayed with one or more other objects in the operating environment, and the first input is determined to be directed to the first user interface object when the first user interface object, a portion of the first user interface object, and/or an accessory object of the first user interface object is selected by the first user input in accordance with a determination that the location of the first user input corresponds to a selection region of the first user interface object, and/or in accordance with a determination that the first user input meets selection criteria (e.g., the first user input includes a pinch gesture while the user's gaze is directed to a location of the first user interface object in the three-dimensional environment, the first user input includes a tap-hold gesture at a location on a touch-sensitive surface corresponding to the first user interface object, or the first user input includes a confirmation input while a pointer device is pointing to the first user interface object).

In response to detecting the first user input that is directed to the first user interface object, in accordance with a determination that the first user input corresponds to a request to resize the first user interface object (e.g., an input to change the size and aspect ratio of the first user interface object, which may cause the first content to be changed and/or rearranged, rather than simply rescaled or moved to a different viewing distance), the computer system resizes (1806) the first user interface object in accordance with the first user input. For example, in some embodiments, in response to the user input detected in FIG. 17C, corresponding to a request to resize the application window 1702, the application window 1702 is resized. In some embodiments, the determination that the first user input corresponds to a request to resize the first user interface object is made by the computer system in accordance with a determination that a resize affordance of the first user interface object has been selected by the first user input and/or the first user input includes movements to increase and/or decrease one or more dimensions of the first user interface object; and/or in accordance with a determination that the first user input is directed to a resize affordance of the first user interface object, or a reactive region associated with a resize affordance of the first user interface object (e.g., a corner region of the first user interface object, an edge region of the first user interface object, and/or another region of and/or near the first user interface object) and includes movement to select and drag the resize affordance of the first user interface object. In some embodiments, the first user interface object is resized without altering the aspect radio or basic shape of the first user interface object (e.g., scaled as a whole to be larger or smaller). In some embodiments, the first user interface object is resized without maintaining the aspect ratio and/or basic shape of the first user interface object (e.g., the dimensions of the first user interface object are changed by a first amount in a first direction (e.g., along a first axis of the first user interface object, and/or change in height, width, short axis, radius, and/or girth) and by a second amount in a second direction different from the first direction (e.g., along a second, different, axis of the first user interface object, and/or change in width, height, depth, long axis, and/or length). In some embodiments, the first user interface object is resized by moving one edge of the first user interface object while other edges of the first user interface object remain stationary. In some embodiments, the first user interface object is resized by moving a corner of the first user interface object that causes multiple edges of the first user interface object to move synchronously with the corner.

In some embodiments, when the first user interface object is resized in accordance with the movement of a user input, the first content within the first user interface object is refreshed (e.g., updated in quantity, appearance, amount, type, spatial layout, and/or other properties and character-istics that affect the appearance of the first user interface object) to adapt to the new size (e.g., shape, aspect ratio, and/or dimensions) of the first user interface object. In some embodiments, the program (e.g., a respective application or the operating system) that is responsible for refreshing the first content within the first user interface object based on the updated size of the first user interface object determines and displays the updated first content in the first user interface object within a finite amount of time (e.g., 0.01 s, 0.02 s, 0.03 s, 0.07 s, 0.1 s, 0.2 s, or 0.5 s) after receiving the user input or a portion thereof specifying the updated size of the first user interface object. In some embodiments, the amount of time between the receipt of an input or a portion thereof that specifies an updated size for the first user interface object and the actual display of the updated first content for that updated size in the first user interface object is fixed (e.g., according to a fixed refresh rate (e.g. a fixed frame rate, or other frame rate equivalents) specified by the program or operating system, and/or by the hardware used to process and display content at the computer system), or dynamically variable (e.g., according to the complexity of the content update and/or the load and limitations on the computer system at the moment). As a result, there is a finite delay between the receipt of the user input that specifies the updated size for the first user interface object (e.g., the current location of the user input relative to the original location or the last displayed location of the boundary and/or corner that is being dragged by the user input) and the moment that the first content within the first user interface object is refreshed (e.g., in appearance, constituent elements, size, and/or layout) to match the size of the first user interface object specified by the user input. As described in more details below, with reference to FIGS. 17A1-17T, there are various ways to mitigate the undesirable effect of the delay on the user's experience when the user interacts with the first user interface object to resize the first user interface object, in accordance with various embodiments. In some embodiments, the computer system choses different approaches to mitigate the delay between the time when the newly updated size of the first user interface object is determined based on the user input (e.g., the currently detected portion of the user input, and/or the most recently processed portion of the user input) and the time when the first content corresponding to the newly updated size of the first user interface object is determined and available for display within the first user interface object. In some embodiments, the specific approach(es) that are chosen for a respective portion of the resizing operation and/or one or more parameters of the execution of the chosen approach(es) are selected in accordance with the magnitude of the delay (e.g., selected in accordance with whether a content refresh rate for the first content is greater than or less than a respective threshold content refresh rate, a known, fixed value of the content refresh rate, a time-averaged value of the content refresh rate, and/or an instantaneous refresh rate based on the time of the last update to the first content), the nature of the delay (e.g., system-wide delay due to load on the computer system, processing delay within the application, and/or processing delay due to complexity of content), and/or one or more characteristics of the user input (e.g., movement speed, movement direction, movement magnitude, and/or movement pattern of the user input).

Resizing the first user interface object in accordance with the first user input includes: one or more temporary resizing operations (1808) (e.g., the resizing operation applied to application window 1752*b* in FIG. 17S and/or the resizing operations applied to application windows 1764*b* and 1764*c* in FIG. 17T) (e.g., visually updating the size and/or shape of the first user interface object by moving the boundaries of the first user interface object through a plurality of intermediate positions in accordance with the direction, speed, and/or magnitude of the movement of the first user input while the updated version of the first content within the first user interface object is not yet available to be displayed in the first user interface object), including: in accordance with a determination that a characteristic refresh rate (e.g., a characteristic frame rate, the last known frame rate, a time-averaged frame rate, the time elapsed since the last update to the first content, and/or other measures of how quickly and/or frequently the first content is refreshed based on a change in the size and/or shape of the first user interface object) of the first content within the first user interface object is a first refresh rate (e.g., a first value for the characteristic refresh rate, and/or a value within a first range of refresh rates), scaling (1810) the first user interface object with the first content (e.g., stretching, compressing, and/or make proportionally larger or smaller across the entire region of the first content and the area enclosed by the boundaries of the first user interface object) by a first amount of scaling before the first content is updated (e.g., by an application corresponding to the first user interface object) within the first user interface object in accordance with a first updated size of the first user interface object that is specified by the first user input. In some embodiments, scaling the first content with the first user interface object causes the appearance of the first content as a whole to be distorted, e.g., when the first user interface object is being resized to a different shape and/or aspect ratio in accordance with the first user input and the first content is not yet updated to adapt to the new shape and/or aspect ratio of the first user interface object. In some embodiments, scaling the first content with the first user interface object does not cause the appearance of the first content as a whole to be distorted, e.g., when the first user interface object is being resized to a different size but maintains its shape and/or aspect ratio in accordance with the first user input, even when the first content is not yet updated to adapt to the new size of the first user interface object. However, in some cases, the configuration and layout of the first content is later updated within the first user interface at the updated size when the first content is finally refreshed based on the updated size of the first user interface object. In some embodiments, scaling the first user interface object with the first content with a first amount of scaling includes displaying a first scaled image of the first user interface object with the first content, where a size of the first scaled image is determined by multiplying a first multiplier (e.g., a value between 0 and 1, such as 50%, 75%, or other percentage) with a difference (e.g., a respective difference in a respective dimension that is being changed for the first user interface object) in the current size and the requested size of the first user interface object, where the first multiplier is chosen based on the first refresh rate.

The one or more temporary resizing operations include, in accordance with a determination that the characteristic refresh rate of the first content within the first user interface object is a second refresh rate (e.g., a second value for the characteristic refresh rate, and/or a value within a second range of refresh rates) different from the first refresh rate (e.g., the second refresh rate is greater than, less than, and/or belongs to a different range of refresh rates than the first refresh rate), scaling (1812) the first user interface object with the first content by a second amount of scaling different from the first amount of scaling (e.g., the second amount of scaling is less than, greater than, and/or belongs to a different range of scaling than the first amount of scaling) before the first content is updated (e.g., by an application corresponding to the first user interface object) within the first user interface object in accordance with the first updated size of the first user interface object that is specified by the first user input. For example, in some embodiments, the application refresh rate of the windows 1760 in leftmost column of FIG. 17T is 10 fps, and the application windows 1760 are scaled by a first amount (e.g., optionally the first amount is determined using the graph illustrated in FIG. 17Q) during the resize operation, while the application refresh rate of the windows 1764 is 15 fps, and the application windows 1764 are scaled by a second amount (e.g., optionally the second amount is determined using the graph illustrated in FIG. 17Q), that is different from the first amount. In some embodiments, scaling the first user interface object with the first content with a second amount of scaling includes displaying a second scaled image of the first user interface object with the first content, where the second scaled image is generated by multiplying a second multiplier (e.g., a value between 0 and 1, such as 50%, 75%, or other percentage) with a difference (e.g., a respective difference in a respective dimension that is being changed for the first user interface object) in the current size and the requested size of the first user interface object, where the second multiplier is chosen based on the second refresh rate and is different from the first multiplier. In some embodiments, depending on the magnitude of the characteristic refresh rate of the first content within the first user interface object, the boundaries of the first user interface object are moved by a respective percentage of the total movement specified by the first user input (e.g., 100%, 95%, 75%, 50%, or another percentage amount chosen based on the currently detected value of the characteristic refresh rate of the first content within the first user interface object, and, optionally, based on the values of characteristics (e.g., direction, magnitude, speed, and/or movement pattern) of the movement of the first user input). For example, at a relatively high refresh rate for the first content (e.g., a refresh rate in the range above 30 frames per second, or a range above 60 frames per second), the first content and the first user interface object do not need to be scaled by a significant amount or at all, as their currently displayed appearances and scales already match closely to the updated appearances and scales specified by the first user input at a given instant in time (e.g., due to the minimal amount of delay between the requested appearances and the corresponding updated appearances of the first user interface object and its content). In contrast, at a relatively low refresh rate for the first content (e.g., a refresh rate in the range below 5 frames per second, or a range below 10 frames per second), the first content and the first user interface object are scaled by a significant amount in size and shape in an attempt to proximate the updated appearances and scales specified by the first user input at a given instant in time, until the appearances of the first content and the first user interface object are updated (e.g., actually refreshed by the application/program in control of the appearance of the first user interface object and its content) in accordance with the updated size specified by the first user input. In some embodiments, the amount of scaling that is applied for a relatively low refresh rate at a given moment is a percentage of the required change from the current size to the updated size that is specified by the first user input at or within a short time window (e.g., a time window corresponding to how frequently the user input is processed, how finely movement of the user input is measured, and/or how finely the size of the first user interface object can be changed) of that given moment. In some embodiments, a higher refresh rate of the first content corresponds to a scaling at a lower percentage of the required change from the current size to the updated size of the first user interface object, while a lower refresh rate of the first content corresponds to a scaling at a higher percentage of the required change from the current size to the updated size of the first user interface object, optionally, with a cutoff at a minimum threshold refresh rate (e.g., at or below 5 frames per second, 7 frames per second, 10 frames per second, or another relatively low frame rate) for 100% scaling and/or a cutoff at a maximum threshold refresh rate (e.g., at or above 20 frames per second, 30 frames per second, 45 frames per second, or another relatively high frame rate) for no scaling. An example of the correlation between refresh rates and scaling is shown in FIG. 17Q. Other relationships analogous to that shown in FIG. 17Q are possible for various embodiments, and may be utilized together for different user interface objects, different applications, and/or different usage scenarios (e.g., different computer systems, different load, processing power, time of day, and/or different user and/or system settings).

Resizing the user first user interface object in accordance with the first user input includes: after the one or more temporary resizing operations, displaying (1814) the first user interface object at the first updated size that is specified by the first user input, and updating the first content within the first user interface object (e.g., scaling, stretching, compressing, resizing, shifting, and/or changing the sizes, levels of detail, object types, layout, and/or other aspects that affect the appearance of the first content in ways other than its scale) in accordance with the first updated size that is specified by the first user input (e.g., the computer system updates the appearance of the first content in the first user interface object at the first updated size in accordance with the inputs to the program that is responsible for controlling the first content of the first user interface object (e.g., the operating system if the first user interface object is a system user interface object, and/or an application if the first user interface object is an application window and/or a user interface object of the application)). For example, in FIG. 17T, in some embodiments, the application window 1764_d_ and the content within the application window 1764_d_ are updated based on the specified size indicated by a position of the resize affordance 1768_d_, and application window 1764_f_ and the content within the application window 1764_f_ are updated again based on the specified size indicated by a position of the resize affordance 1768_f_. In some embodiments, the computer system has a characteristic refresh rate for the environment in which the first user interface is displayed that is higher than the characteristic refresh rate for the first user interface object, and thus the computer system is able to provide visual feedback to the user input in a more fluid and prompt manner than the program that is responsible for updating the content within the first user interface object in response to the change in size of the first user interface object. In some embodiments, the operating system of the computer system performs the scaling to create responsive visual feedback at the higher refresh rate of the operating system, despite that the updated first content has not been made available by the program due to the lower refresh rate of the program. In some embodiments, the operating system adjusts the amount of scaling that is applied based on the difference between the higher refresh rate of the operating system and the lower refresh rate of the program, e.g., a lower amount of scaling for a smaller difference in refresh rates for the first content within the first user interface object and the environment outside of the first user interface object, and a higher amount of scaling for a larger difference in refresh rates for the first content within the first user interface object and the environment outside of the first user interface object. In some embodiments, for different user interface objects, e.g., that are concurrently displayed with the first user interface object, or not concurrently displayed with the first user interface object, the computer system optionally performs different amounts of scaling of their content based on the respective characteristic refresh rates of the user interface objects before the content of the user interface objects are updated (e.g., by the applications corresponding to those user interface objects) based on the updated sizes of the user interface objects as specified by respective resizing inputs directed to the respective user interface objects at different times.

In some embodiments, the one or more temporary resizing operations include: while displaying the first user interface object and the first content with a respective scaled size (e.g., the first scaled size obtained by scaling the first user interface object with the first content by the first amount of scaling, the second scaled size obtained by scaling the first user interface object with the first content by the second amount of scaling, or another scaled size obtained for the first user interface object with the first content before the first user interface object is displayed at the first updated size and with the updated first content for the first updated size) and before the first user interface object is displayed at the first updated size with the updated first content corresponding to the first updated size of the first user interface object: in accordance with a determination that the characteristic refresh rate of the first content within the first user interface object is a third refresh rate (e.g., a third value for the characteristic refresh rate, and/or a value within a third range of refresh rates) (e.g., same as the first refresh rate, same as the second refresh rate, or different from the first and second refresh rates), scaling the first user interface object with the first content (e.g., stretching, compressing, and/or making proportionally larger or smaller across the entire region of the first content and the area enclosed by the boundaries of the first user interface object) by a third amount of scaling, different from the first amount of scaling and the second amount of scaling (e.g., the third amount of scaling is chosen in accordance with the characteristic refresh rate of the first content which may have changed since the time of the previous scaling). For example, in FIG. 17I, in some embodiments, the application window 1702 is scaled by a different amount than the application window 1702 in FIG. 17F, before the application window 1702 is updated in FIG. 17J. In some embodiments, during the detection of the first user input, the first user interface object is displayed at multiple intermediate sizes before reaching the first updated size, and depending on the refresh rate of the first content, the computer system may need to scale the first user interface object with the first content multiple times before the updated first content becomes available for display within the first user interface object. In some embodiments, the number of times that the computer system performs the scaling depends on how quickly the computer system processes the movement of the first user input to obtain the intermediate sizes specified by the first user input, and/or the characteristic refresh rate of the computer system for the environment including the first user interface object. In some embodiments, as shown in FIGS. 17Q and 17S, for the low frame rate of 2 frames per second, the computer system performs the scaling on the first user interface object with the first content at least two times during the first user input, before the first content is updated within the first user interface object to the updated first size specified by the first user input, in accordance with some embodiments. Automatically updating display of the user interface object by scaling and/or rescaling the user interface object while the user interface object is being resized, before the user interface object has been updated (e.g., by an application corresponding to the user interface object) according to the refresh rate of the content of the user interface object, provides improved visual feedback to the user that the computer system is responsive to the resize operation, even when the refresh rate of the content of the user interface object is insufficient to keep up with the user's resizing input, and reduces the amount of time and number of inputs required by the user to resize the user interface object by demonstrating that the current user input is successful.

In some embodiments, displaying the first user interface object includes displaying a first application window that corresponds to a first application and displaying first application content (e.g., generated and updated by the application, at an application refresh rate (e.g., a fixed refresh rate, and/or a variable refresh rate)) (e.g., text, user interface objects, menu, menu items, icons, graphics, images, thumbnails, messages, dividers, controls, panels, and/or other content generated and updated by the application) within the first application window (e.g., application window 1702, application window 1728, application windows 1750, application windows 1752, application windows 1754, application windows 1760, application windows 1764, and/or application windows 1766). In some embodiments, the first application window includes visual indications (e.g., boundaries, background platter, corners, and/or other visual indications) marking the size and shape of the first application window.

In some embodiments, the first application window is displayed with a set of one or more accessory objects (e.g., title bar, close affordance, move affordance, resize affordance, menu affordance, platter, appearance controls, tabs, paging control, and other window management controls and/or content management controls) that move together with the first user interface object and that correspond to various operations that are performed (e.g., that are available to be performed, using the one or more accessory objects)

with respect to the first user interface object and/or its content (e.g., closing, resizing, rotating, pivoting, navigating to a new tab or page, displaying side-by-side with another window, changing color, translucency, luminance, and other visual properties). In some embodiments, the one or more accessory objects are displayed with respective spatial relationships to the first user interface object, where the respective spatial relationships are maintained when the first user interface object is displayed at different positions (e.g., positions in a plane, and/or positions in three-dimensional space) in the operating environment (e.g., after being dragged from position to position within the operating environment, and/or dismissed at one position and then recalled at a different position in the operating environment). In some embodiments, the one or more accessory objects are displayed adjacent to the first user interface object, optionally with or without a gap from the first user interface object, and/or displayed in a peripheral region of the first user interface object.

In some embodiments, the first content included in the first application window includes one or more user interface objects, images, icons, thumbnails, and/or controls, spatially arrangement in accordance with a respective layout, optionally overlaying a background image or texture. In some embodiments, the first content within the first application window is translucent, and/or has visual characteristics that are generated based on visual characteristics of the background environment behind the first application window and/or ambient lighting (e.g., virtual and/or real lighting) in the operating environment. Automatically updating display of the an application window by scaling and/or rescaling the application window and the application content within the application window while the application window is being resized, before the application of the application window has been updated according to the refresh rate of the application content, provides improved visual feedback to the user that the computer system is responsive to the resize operation, even when the refresh rate of the application window is unable to refresh the application window and/or application content to keep up with the user's resizing input, and reduces the amount of time and number of inputs required by the user to resize the user interface object by demonstrating that the current user input is successful.

In some embodiments, scaling (and/or distorting) the first user interface object with the first content includes stretching or shrinking the first content as a whole (e.g., without distinguishing internal objects and determining spatial layout of objects within the first content, and/or scaling an image of the first content) in accordance with a difference between a current displayed size and a currently requested size that is specified by the first user input. In some embodiments, due to lack of information for a higher resolution image of the first content, the image of the first content is interpolated and/or down-sampled to generate the scaled image of the first content (e.g., the scaled image produced using the first scaling amount, the second scaling amount, the third scaling amount, and/or another scaling amount that is selected based on the characteristic refresh rate of the content within the first user interface object). In some embodiments, the scaling (and/or distorting) is performed by a system process (e.g., an operating system) that is separate from an application associated with the content (e.g., the operating system scales and/or distorts the content without involvement from the application). For example, in some embodiments, in FIG. 17T, the application window 1764c is scaled by stretching the application window 1764c (e.g., as compared to application window 1764a), and stretching content displayed in application window 1764*c*. In some embodiments, updating the first content within the first user interface object includes changing the first content in one or more aspects other than a scale of the first content as a whole (e.g., changing the constituent objects, changing the layout, quantity, types, and/or appearances of the internal constituent objects of the first user interface object, changing a background image or texture, changing a spatial extent of the background pattern, and/or dimensions of panels within the first user interface object). In some embodiments, the updating is performed by an application process that is separate from the system process. For example, in FIG. 17T, application window 1764*d* is updated (e.g., according to its application refresh rate) to display different content within the application window (e.g., two objects instead of the single stretched object in application window 1764*c*). Automatically scaling a user interface object while the user interface object is being resized by stretching or shrinking the user interface object and the content in the user interface object, as compared to updating, refreshing, rendering, or otherwise redrawing the content in the user interface object, which is limited by the refresh rate of the content of the user interface object, enables the computer system to provide immediate visual feedback to the user before the user interface object is able to update according to its refresh rate, thereby providing improved visual feedback to the user that the computer system is responsive to the resize operation, and reduces the amount of time and number of inputs required by the user to resize the user interface object by demonstrating that the current user input is successful.

In some embodiments, the computer system displays, concurrently with the first user interface object, one or more accessory objects (e.g., object management controls (e.g., object management controls for object 770*a*, such as grabber 7104*a*, affordance 774-1 and close affordance 774-2, and menu 774-3, title bar 1730, control panel 1732, content controls 1738, user interface object 1762, or other object management controls), window management objects (e.g., platter 772, grabber 7104*a*, title bar 7029, close affordance 774-2, title bar 1730, control panel 1732, content controls 1738, user interface object 1762, or other window management objects), close affordance (e.g., close affordance 774-2, close affordance 1707), resize affordance (e.g., resize affordance 776, resize affordance 1712, resize affordance 1712-2, resize affordance 1748, resize affordance 1768, or another resize affordance), move affordance, title bar (e.g., title bar 7106, or another title bar), section controls, tab controls, paging controls, playback controls, menu affordance, tools, settings controls, and/or other types of accessory objects and object management controls) that correspond to the first user interface object, wherein the one or more accessory objects maintain their respective spatial relationships to the first user interface object when the first user interface object is displayed at a first position and at a second position different from the first position (e.g., the one or more accessory objects remain at their respective positions relative to the first user interface object as the first user interface object is moved around in the environment).

In some embodiments, the one or more accessory objects correspond to respective operations that can be performed with respect to the first user interface object and/or the content within the first user interface object, e.g., through manipulation and/or interaction with the accessory objects. In response to detecting the first user input that is directed to the first user interface object, in accordance with a determination that the first user interface object corresponds to a request to resize the first user interface object, the computer system: forgoes scaling the one or more accessory objects (e.g., maintaining the currently displayed size of the one or more accessory objects, optionally while maintaining the respective spatial relationships between the accessory objects and the scaled image of the first user interface object) when scaling the first user interface object with the first content (e.g., scaling by a respective amount of scaling chosen based on the characteristic refresh rate of the first content); and while the first user interface object is displayed with the first updated size and updated first content, displays the one or more accessory objects with their respective spatial relationships to the first user interface object displayed with the first updated size. In some embodiments, the respective sizes of at least some of the one or more accessory objects remain unchanged, when displayed with the first user interface object having the first updated size. In some embodiments, the respective sizes of at least some of the one or more accessory objects are also updated to different sizes chosen based on the first updated size of the first user interface object, when displayed with the first user interface object having the first updated size. In some embodiments, the sizes of the accessory objects are updated at the same rate and/or pace, and/or with the same timing as the first content within the first user interface object; but unlike the first content, the accessory objects are not scaled with the first user interface object before the updated first content and updated sizes of the accessory objects are determined and available to be displayed. In one example, a menu bar that includes a number of control objects displayed above, below, or adjacent to the application window of an application is not scaled and remains with its original appearance while the application window is scaled with its content in response to the movement of a drag input, before the content of the window is updated in accordance with the requested size of the window specified by the drag input. When the content of the window is updated in accordance with a requested size of the window specified by the drag input, the menu bar is optionally resized to match the updated size of the window (e.g., depending on the updated size of the window, and/or depending on the movement speed and pattern of the drag input). For example, in some embodiments, as described with reference to FIGS. 17R and 17S, the title bar 1730, control panel 1732, content controls 1738, user interface object 1762, and/or other accessory objects associated with the application window that is being resized, are updated independently from the application window (e.g., have a different refresh rate, such as the UI refresh rate, than the application refresh rate). Concurrently displaying accessory controls for a user interface object, and independently updating the accessory controls from the user interface object while resizing the user interface object, enables the accessory controls to refresh and remain available to the user even as the user interface object is being resized, thereby reducing a number of inputs required to access the accessory controls and providing improved visual feedback about the current state of the computer system.

In some embodiments, in response to detecting the first user input that is directed to the first user interface object, the computer system: in accordance with a determination that the first user input corresponds to a resizing operation on the first user interface object (e.g., the resizing operation includes resizing the first user interface object in accordance with subsequent movement of the first user input), decreases a visual prominence of the first user interface object (e.g., changes one or more display properties (e.g., opacity, luminance, contrast, color saturation, translucency, and/or other display properties that affect the visibility of the first user interface object and its content against the background environment) of the first user interface object with the first content (e.g., as a whole, and/or as an image of the first user interface object with the first content) from a first set of values (e.g., a first opacity, a first level of luminance, a first level of color saturation, a first level of contrast, and/or a first translucency) to a second set of values (e.g., a second opacity, a second level of luminance, a second level of color saturation, a second level of contrast, and/or a second translucency) for the one or more display properties), while resizing the first user interface object in accordance with the first user input. In some embodiments, the change in the one or more display properties occurs when the input is detected and before resizing starts. In some embodiments, the change in the one or more display properties occurs in conjunction with (e.g., when or slightly after) the resizing starts. In some embodiments, changing the one or more display properties of the first user interface object with the first content from the first set of values to a second set of values causes the appearance of the first user interface object with the first content as a whole to change from higher visibility, higher contrast, higher opacity, higher color saturation level, and/or higher luminance states, to lower visibility, lower contrast, lower opacity, lower color saturation level, and/or lower luminance states, before the scaling and updating of the first user interface object and first content are performed in accordance with the subsequent movement of the first user input. In some embodiments, the first user interface object and its content (e.g., scaled versions, and/or the updated versions of the first user interface object and its content) continue to have the second set of values for the one or more display properties during the resizing of the first user interface object in accordance with the continuation of the first user input. In a more specific example, in the case where the first user interface object is an application window including first application content, when an pinch gesture is detected while the user's gaze is directed to the reactive region of the resize affordance for the application window, the computer system first displays the resize affordance near the corner of the application window and makes the window and its content more translucent, less vibrant in color, and overall less visible in the environment (e.g., over the background environment and/or content). Subsequently, as the user provides a drag gesture while maintaining the pinched posture of the hand to move the resize affordance, the computer system performs the scaling and/or updating of the window and its content as described above, as the window and its content is displayed with the more translucent, less vibrant, and overall less visible appearance. For example, in some embodiments, as described with reference to FIGS. 17B-1 and 17B-2, the application window 1702 is displayed with a change to one or more visual properties (e.g., visual deemphasis or another change) in response to the pinch input detected in FIG. 17B-1 or 17B-2 corresponding to a request to resize the application window 1702. Automatically fading, blurring, or otherwise visually deemphasizing a user interface object while the user is providing an input to resize the user interface object, provides improved visual feedback about the state of the device to indicate to the user that the user interface object is currently selected and being resized.

In some embodiments, after decreasing the visual prominence of the first user interface object with the first content in accordance with the determination that the first user input corresponds to a resize operation on the first user interface object (and optionally, after scaling and updating the first user interface object and the first content (e.g., with the changed values of the display properties) in accordance with the movement of the first user input (e.g., a pinch and drag gesture, a swipe gesture on a touch-sensitive surface, and/or a movement of a controller while a control button on the controller is pressed down)), the computer system detects a termination of the first user input (e.g., detects a release of the pinch gesture, detects lift-off of a drag gesture on a touch-sensitive surface, detects an end of movement of the first user input, and/or detects release of a control button on a controller); and in response to detecting the termination of the first user input, increases the visual prominence of the first user interface object (e.g., at least partially (or fully) restoring the one or more display properties of the first user interface object to the first set of values for the one or more display properties) (e.g., at the currently displayed size of the first user interface object, with the currently displayed first content in the first user interface object). For example, in some embodiments, as described with reference to FIG. 17K, after the user input corresponding to the request to resize the application window 1702 ceases (e.g., detecting an end of the user input, such as an end of movement of the user input, a depinch gesture or a liftoff of the user input), the changes to the one or more visual properties of the application window 1702 are reversed. Automatically reversing the visual deemphasis of the user interface object after the user input to resize the user interface object has ceased, provides improved visual feedback about the state of the device to indicate to the user that the user interface object is no longer selected, and reduces a number of inputs needed for the user to manually select the user interface object after resizing the user interface object.

In some embodiments, resizing the first user interface object in accordance with the first user input includes: in accordance with a determination that the characteristic refresh rate of the first content within the first user interface object is above a first threshold refresh rate (e.g., above 30 frames per second, 45 frames per second, a refresh rate that is close to or higher than the refresh rate of the surrounding environment of the first user interface object, or another relatively high refresh rate), forgoing scaling the first user interface object with the first content, before displaying the first user interface object at the first updated size with the updated first content that corresponds to the first updated size of the first user interface object. For example, in some embodiments, when the first user interface object is an application window, and the refresh rate of the application content within the application window is at or above a (e.g., first, or higher) threshold refresh rate of 30 fps, the computer system does not display a scaled image of the application window with its un-updated content, prior to displaying the application window with its updated size and updated content corresponding to the updated size, because the lag between the detection of the user input that specifies the requested size of the application window and the actual update of the content to match the requested size is minimal, and the scaling is not necessary and may add flickering visual artifacts to the application window as the computer system switches between the scaled image and the updated appearance of the application window repeatedly during the movement of the first user input. For example, in some embodiments, as illustrated in FIG. 17Q, when the fps (e.g., application refresh rate) is above a threshold amount of fps, such as 25 fps, the scale amount is 0, such that the user interface object that is being resized (e.g., application window 1702) is not scaled, as described with reference to the example in FIGS. 17L-17P and application windows 1754 in FIG. 17S. Maintaining a size of a user interface object without scaling the user interface object during a resize operation, when content of the user interface object is determined as having a high enough refresh rate, such that the user interface object and its content update, according to the refresh rate of the content of the user interface object, fast enough to provide visual feedback during the user input to resize the object, reduces the power consumption of the device by forgoing the additional processing of scaling the user interface object, while continuing to provide visual feedback about the state of the device during the resize operation.

In some embodiments, resizing the first user interface object in accordance with the first user input includes: in accordance with a determination that the characteristic refresh rate of the first content within the first user interface object is below a second threshold refresh rate (e.g., below 5 frames per second, 7 frames per second, a refresh rate that is much lower than the refresh rate of the surrounding environment of the first user interface object, or another relatively low refresh rate), scaling the first user interface object with the first content to the first updated size, before displaying the first user interface object at the first updated size with the updated first content that corresponds to the first updated size of the first user interface object. For example, in some embodiments, when the first user interface object is an application window, and the refresh rate of the application content within the application window is below a lower threshold refresh rate of 7 fps, the computer system displays a fully scaled image of the application window with its un-updated content that matches the size requested by the first user input, prior to displaying the application window with its updated size and updated content corresponding to the updated size, because the lag between the detection of the user input that specifies the requested size of the application window and the actual update of the content to match the requested size is so significant, the scaling makes the user interface more responsive to the user input, and reduces the sudden changes in the user interface that would otherwise occur when the computer system finally displays the updated appearance of the application window requested by the movement of the first user input.

In some embodiments, at least one of the first amount of scaling and the second amount of scaling corresponds to a scaling to the first updated size, as the first refresh rate or the second refresh rate is determined to be below the second threshold refresh rate. For example, in some embodiments, as illustrated in FIG. 17Q, when the fps (e.g., application refresh rate) is less a threshold amount of fps, such as 5 fps, the scale amount is 1.0, such that the user interface object that is being resized (e.g., application window 1702) is scaled at 100% to appear at the requested size of the user interface object, as described with reference to the example in FIGS. 17C-17D and application windows 1750 in FIG. 17S. Automatically scaling a user interface object that has a low refresh rate, during a resize operation of the user interface object, such that the user interface object and the content of the user interface object dynamically adjust with movement of the displayed resize control, provides improved visual feedback to the user to indicate the resize operation is successful and displays the requested size of the user interface object, even before the content of the user interface object is updated according to its refresh rate, thereby minimizing the need for further adjustment (e.g., manually, by the user) of the resize operation after waiting for the user interface object to update its content according to its refresh rate.

In some embodiments, resizing the first user interface object in accordance with the first user input includes: in accordance with a determination that the characteristic refresh rate of the first content within the first user interface object is within a first range of refresh rates (e.g., an intermedia range that is above the lower threshold refresh rate and below a higher threshold refresh rate, a range of refresh rates that is above 7 frames per second and below 30 frames per second, and/or another range where full scaling or no scaling are not desirable), scaling the first user interface object with the first content by a respective amount of scaling that is selected from a range of scaling amounts based on a current value of the characteristic refresh rate of the first content among the first range of refresh rates, before displaying the first user interface object at the first updated size with updated first content that corresponds to the first updated size of the first user interface object. In some embodiments, the range of scaling amounts includes respective scaling amounts for different refresh rates in the first range of refresh rates, and the respective scaling amounts decrease in value as the refresh rates increase in value. In some embodiments, the first scaling amount and the second scaling amount are different scaling amounts selected from the range of scaling amounts, while the first refresh rate and the second refresh rate are refresh rates that fall within the first range of refresh rates. For example, in some embodiments, as illustrated in FIG. 17Q, when the fps (e.g., application refresh rate) is between a range of refresh rates, such as between 5 and 25 fps, the scale amount gradually changes based on the refresh rate. For example, FIG. 17T illustrates application windows 1760, application windows 1764, and application windows 1766, each of which has a different respective application refresh rate, such that the amount of stretching applied to each of the application windows at a particular time, t, is different. Automatically scaling a user interface object, during a resize operation of the user interface object, based on a determined refresh rate of the content of the user interface object, including gradually changing an amount of scaling of the user interface object for different refresh rates within a range of refresh rates, such that the user interface object dynamically adjusts with movement of the displayed resize control, provides improved visual feedback to the user to indicate the resize operation is successful and displays the requested size of the user interface object, thereby minimizing the need for further adjustment (e.g., manually, by the user) of the resize operation after waiting for the user interface object to update its content according to its refresh rate and providing real-time feedback to the user at various processing capabilities of the computer system.

In some embodiments, the computer system calculates two or more candidate refresh rates for the first content using two or more different metrics; and chooses a lowest refresh rate among the two or more candidate refresh rates as the characteristic refresh rate of the first content. For example, in some embodiments, the computer system determines a refresh rate of the first content based on the last known refresh rate based on the actual delay between receipt of a portion of the first user input that specifies the last updated size for the first user interface object and the actual update of the first content for the last updated size specified by the portion of the first user input (e.g., an inverse of the delay in time is used to calculate the last known refresh rate). In another example, the computer system calculates a moving average of multiple known refresh rates (e.g., the refresh rates for the past five updates, the refresh rates for the past three seconds (or other predefined amount of time), or another set of known refresh rates), or delays for multiple updates during the previous portions of the first user input (e.g., an inverse of an average delays is used to calculate the average refresh rate). In yet another example, the computer system calculates a frame rate based on historic data on how quickly the content of the first user interface object was updated and/or how quickly the program that controls the update of the first user interface object updated the first content in previous instances of resize operations. Other ways of calculating a refresh rate of the first content of the first user interface object are possible, and different ways of calculating refresh rates may result in the lowest refresh rate in different scenarios when a resize operation is performed on the first user interface object and/or another object of the application or program that controls the update of the first user interface object. In some embodiments, the characteristic refresh rate may be chosen based on an average of the multiple refresh rates calculated using different metrics. In some embodiments, the characteristic refresh rate is chosen based on the median of the multiple refresh rates calculated using different metrics. In some embodiments, the characteristic refresh rate is chosen based on the highest refresh rate of the multiple refresh rates calculated using different metrics. For example, in some embodiments, as described with reference to FIG. 17Q, the application refresh rate is optionally determined by performing a plurality of calculations to determine a plurality of possible refresh rates, and selecting the lowest application refresh rate that is calculated. Performing a plurality of calculations to determine two or more metrics that represent a refresh rate of content in a respective user interface object, and selecting, from the two or more metrics, the metric with the lowest refresh rate, enables the computer system to more accurately estimate the refresh rate of the content of the user interface object, and thus apply an improved amount of scaling, during a resize operation of the user interface object, that is selected based on the estimated refresh rate, thereby providing improved visual feedback by displaying a smooth transition of the user interface object that indicates a progress of the resize operation to the user.

In some embodiments, the computer system determines a first candidate refresh rate for the first content in accordance with a recorded refresh rate obtained during one or more previous resize operations (e.g., the last resizing operation, or the last several resizing operation) performed on the first user interface object or another object analogous to the first user interface object (e.g., another object controlled or refreshed by the same application as the first user interface object, another application window of the same application, and/or a type of user interface object that is of similar complexity and time delay as the first user interface object during resizing). For example, in some embodiments, as described with reference to FIG. 17Q, the application refresh rate is optionally determined based on a previously observed application refresh rate from a previous user input with the user interface object. Determining the refresh rate based on a metric that accounts for an observed refresh rate of the content of the user interface object, or of an equivalent (or similar or analogous) user interface object (e.g., rendered by a same application or otherwise similar to the user interface object), enables the computer system to more accurately estimate the refresh rate of the content of the user interface object and to provide real-time feedback to the user at various processing capabilities of the computer system, as measured based on the previously observed refresh rate.

In some embodiments, the computer system determines a second candidate refresh rate for the first content in accordance with respective rates of one or more updates to the first content that have been performed on the first content during a current resize operation of the first user interface object. In some embodiments, the time delay between sequential updates to the first content (e.g., that correspond to different sizes) during (or before) the resize operation and the actual update of the first user interface object and its content for that updated size is recorded and used to calculate a running average of time delays for the last several updates (e.g., five updates, seven updates, or two updates). The running average of the time delays is then used to calculate a time-averaged frame rate for the first content, in accordance with some embodiments. Alternatively, in some embodiments, the time delay for each update is used to calculate a corresponding refresh rate, and the refresh rates for multiple updates are averaged to obtained a time-averaged refresh rate for the first content. For example, in some embodiments, as described with reference to FIG. 17Q, the application refresh rate is optionally determined based on a moving average of application refresh rates from a previous set of updates to the user interface object. Determining the refresh rate based on a metric that accounts for an observed refresh rate of the content of the user interface object, or of an equivalent user interface object (e.g., rendered by a same application or otherwise similar to the user interface object), over a timeframe, such as the refresh rate observed over a previous number of frames, enables the computer system to more accurately estimate the refresh rate of the content of the user interface object and to provide real-time feedback to the user while taking into account processing capabilities of the computer system, as measured based on previous results of a refresh rate within a previous timeframe.

In some embodiments, the computer system determines a third candidate refresh rate for the first content in accordance with a last update to the first content that has been performed on the first content during a current resize operation of the first user interface object. In some embodiments, the time delay between each updated size specified by a respective portion of the first user input during the resize operation and the actual update of the first user interface object and its content for that updated size is recorded and the delay for the last update to the first content is used to calculate a frame rate for the last update, in accordance with some embodiments. In some embodiment, the frame rate for the last update to the first content is used as a candidate refresh rate for the characteristic refresh rate of the first content. For example, in some embodiments, as described with reference to FIG. 17Q, the application refresh rate is optionally determined based on an amount of time it took for the user interface object to refresh (e.g., during the same resize operation). For example, in FIG. 17I, the application refresh rate is determined to be the same as the application refresh rate that was determined in FIG. 17G (e.g., the previously calculated application refresh rate) and/or FIG. 17H. Determining the refresh rate based on a metric that accounts for an observed refresh rate of the content of the user interface object, or of an equivalent user interface object (e.g., rendered by a same application or otherwise similar to the user interface object), based on the last update to the content of the user interface object during the current resize operation of the user interface object, enables the computer system to accurately estimate the refresh rate of the content of the user interface object and to provide real-time feedback to the user at various processing capabilities of the computer system, as measured based on previous results of a refresh rate.

In some embodiments, the computer system, in response to detecting the first user input, displays a resize affordance at a location at or near a moveable portion of the first user interface object (e.g., a corner, and/or an edge of the first user interface object, and/or a corner and/or edge of a platter supporting the first user interface object). In some embodiments, the resize affordance is displayed on a corner of a window or immediately outside of the corner of the window, when the resizing operation is to be performed by dragging the corner of the window. In some embodiments, the resize affordance is displayed on an edge of a window or immediately outside of the edge of the window, when the resizing operation is to be performed by dragging the edge of the window. In some embodiments, the resize affordance remains displayed with the first user interface object during the resizing operation, and ceases to be displayed when the first user input is terminated and the resizing operation is completed. In some embodiments, the resize affordance is displayed with a regular visibility level while the first user interface object and its content are displayed with a reduced level of visibility (e.g., reduced luminance, reduced opacity, reduced color saturation, reduced resolution, increased translucency, and/or other values of other display properties that correspond to a reduced level of visibility). In some embodiments, As described with respect to FIGS. 17B-1, 17B-2 and 17R, the first user input includes an initial portion that corresponds to a request to display and/or select the resize affordance (e.g., a gaze directed to a corner or edge of the first user interface object, an air pinch gesture that is detected while the gaze is directed to a corner or edge of the first user interface object or a resize affordance that is already displayed, a tap gesture directed to a corner or edge of the first user interface object or a resize affordance that is already displayed, activation of a control button while a focus selector is at a location of a corner or edge of the first user interface object or a resize affordance that is already displayed, or another type of input that causes display and/or selection of the resize affordance or otherwise enables the resizing of the first user interface object), and a subsequent portion or portions that include movement to indicate a direction, speed, and/or magnitude for the resize operation on the first user interface object and that triggers the scaling and/or updating of the first user interface object and its content as described herein. For example, in some embodiments, as described with reference to FIGS. 17B-1 and 17B-2, the resize affordance 1712 is displayed at a corner of application window 1702, and as described with reference to FIG. 17R, resize affordance 1734 is dynamically displayed at the bottom left corner of application window 1728, and resize affordance 1742 is dynamically displayed at the bottom right corner of application window 1728. Enabling a user to interact with a resize affordance that is dynamically displayed near a corner of a user interface object, in response to the user gazing at the corner of the user interface object, reduces a number of inputs required to perform system functions, such as to resize the user interface object, and view information about a current state of the computer system.

In some embodiments, in response to detecting the first user input that is directed to the first user interface object, the computer system: in accordance with a determination that a start of the first user input is directed to a first location that is outside of the first user interface object and within a first region outside the first user interface object (e.g., user's attention 1740*h* in FIG. 17R, or another reactive region outside the first user interface object), provides an indication that a respective resize operation is initiated by the start of the first user input (e.g., displays a resize affordance, starts a resizing operation, and/or selects the resize affordance (and updates the user interface to indicate selection of the resize affordance) for subsequent movement); in accordance with a determination that the start of the first user input is directed to a second location that is outside of the first user interface object and not within the first region outside the first user interface object, forgoes providing the indication that the respective resize operation is initiated by the start of the first user input; in accordance with a determination that the start of the first user input is directed to a third location that is within the first user interface object and within a second region in the first user interface object (e.g., user's attention 1740*i* in FIG. 17R, or another reactive region inside the first user interface object), provides the indication that the respective resize operation is initiated by the start of the first user input; and in accordance with a determination that the start of the first user input is directed to a fourth location that is within the first user interface object and not within the second region in the first user interface object, forgoes providing the indication that the respective resize operation is initiated by the start of the first user input. For example, in some embodiments, the reactive region of the resize operation for a respective edge or corner of the first user interface object encompasses both a region outside of the boundaries of the first user interface object and a region within the boundaries of the first user interface object, such that the user's gaze input does not have to aim precisely at the corner or edge of the first user interface object in order to start the resizing operation on the first user interface object. Expanding the reactive region for initiating the resizing operation to include both an area inside the first user interface object and an area outside the first user interface object allows users of different interactive habits to successfully trigger a resize operation, in accordance with some embodiments. It is to be noted that, the indication (e.g., displaying a resizing affordance, starting a resizing operation, and/or selecting the resizing affordance for subsequent movement) is not provided in response to any user interaction with the content within the first user interface object (e.g., selecting a user interface object within the content of the first user interface object, providing an input to an input region within the content of the first user interface object, or otherwise interacting with the content of the first user interface object); instead, the indication is provided in response to determining that the first user input is a request for resizing the first user interface object.

Even though, in some embodiments, the reactive region of the resize operation for the first user interface object extends into an area within the first user interface object that may overlap with the content within the first user interface object, the interaction with that portion of the content is suppressed or disabled to allow the resize operation to take precedence over the function associated with that portion of the content. For example, in some embodiments, as shown in FIG. 17R, the "object C" overlaps with the reactive region 1744 for the resize operation, and a user input directed to the region occupied "object C" either causes interaction with "object C" or causes display of the resize affordance 1742, depending on whether the user input falls within the overlapping area between "object C" and the reactive region 1744 for the resize operation. In an example, the "object C" could be a text input region inside the window 1728, and a gaze input 1740*h* directed to the "object C" in the area outside of the reactive region 1744 causes a virtual keyboard to be displayed and enables a text input operation in the "object C" without causing display of the resize affordance 1742, while a gaze input 1740*i* directed to the "object C" in the area within the reactive region 1744 causes the resize affordance

1742 to be displayed and enables a resize operation on the window 1728 without causing display of the virtual keyboard. In another example, the "object A" could be an interactive user interface element displayed in the window 1728 that is associated with resizing and/or change in appearance for some content or object within the window 1728 (e.g., "object B", or some other image, text, or object that is displayed within the window 1728), and a user input directed to "object A" may cause some content or object within the window 1728 to be resized, scaled, and/or updated, but will not cause the window 1728 itself to be resized, scaled, and/or updated as a whole. Accordingly, the refresh rate dependent scaling of the window and its content in the temporary resizing operations as described herein is performed in response to a resize operation performed on the whole window in accordance with a user input (e.g., through a window management control, such as a resize affordance), and not in response to a user interaction with the content of the window (e.g., a button, a textual input region, or a resize control for an image or object displayed as part of the content within the window) or an automatic operation of a program for purposes other than resizing the window in accordance with a user input. Providing an active region that partially overlaps with the user interface object, whereby, in response to the user's attention being directed within the active region, the computer system dynamically displays a resize affordance and enables the user to interact with the resize affordance, without displaying the resize affordance while the user's attention is not directed within the active region, reduces a number of inputs required to perform system functions, such as to resize the user interface object, and improves the user's ability to direct the user's attention to the active region by overlapping the active region with the user interface object that the resize affordance controls.

In some embodiments, the computer system displays a resize affordance with a respective spatial relationship to a portion of the first user interface object (e.g., on or near a moveable corner or edge of the first user interface object, and/or on or near a platter supporting the first user interface object) before resizing the first user interface object in accordance with the first user interface object (e.g., the resize affordance is displayed in response to a start of the first user input, and/or already displayed as part of the accessory objects concurrently displayed with the first user interface object); and during resizing of the first user interface object in accordance with the first user input, moves the resize affordance in accordance with the first user input, wherein: for a first value of the characteristic refresh rate of the first content, the resize affordance has a first distance to the portion of the first user interface object, positioned in accordance with the respective spatial relationship (e.g., resizing affordance is within the boundary of the first user interface object, or outside the boundary of the first user interface object), and for a second value of the characteristic refresh rate of the first content, the resize affordance has a second distance to the portion of the first user interface object, positioned in accordance with the respective spatial relationship (e.g., resizing affordance is within the boundary of the first user interface object, or outside the boundary of the first user interface object), wherein the first distance is greater than the second distance when the first value of the characteristic refresh rate is higher than the second value of the characteristic refresh rate and/or when the first amount of scaling is smaller than the second amount of scaling (e.g., there is a bigger distance between the current location of the resize affordance and the respective spatial relationship to the portion of the first user interface object as currently scaled and/or updated, when the characteristic refresh rate of the first content is higher, and there is a lower amount of scaling on the first content before the actual update of the first content). In some embodiments, the first distance is greater than the second distance when the first value of the characteristic refresh rate is higher than the second value of the characteristic refresh rate and both the first value and the second value are within an intermediate range of refresh rates (e.g., between 7 fps and 30 fps, or between another two threshold refresh rates). For example, in some embodiments, as illustrated in FIG. 17T, for the lowest application refresh rate of 10 fps, there is a smaller gap (e.g., less of a lag) between the displayed position of the resize affordance 1768*b* and the bottom right corner of the application window 1760*b* due to the amount of scaling of application window 1760*b*, as compared to the higher refresh rate of 20 fps of application window 1766*b*, where there is a larger gap (e.g., appears as more of a lag) between the displayed position of the resize affordance 1768*b* and the bottom right corner of the application window 1766*b* due to the (e.g., smaller) amount of scaling of application window 1766*b*. Automatically updating display of a resize affordance to a position determined relative to a requested size of the user interface object, while scaling the user interface object, during a resize operation of the user interface object, based on a determined refresh rate of the content of the user interface object, such that the scaled user interface object appears to lag behind the movement of the resize affordance by an amount based on the respective refresh rate (e.g., and/or the amount of scaling), provides improved visual feedback to the user to indicate the resize operation is successful and displays the requested size of the user interface object, thereby minimizing the need for further adjustment (e.g., manually, by the user) of the resize operation after waiting for the user interface object to update its content according to its refresh rate and providing real-time feedback to the user at various processing capabilities of the computer system.

In some embodiments, the resize affordance has a shape and/or size that are based on a spatial characteristic of the moveable portion of the first user interface object (e.g., a corner radius of the window, a corner radius of a platter supporting the first user interface object, and/or a corner radius of the first user interface object). In some embodiments, the spatial characteristic of the movable portion of the first user interface object that affects the shape and/or size of the resize affordance includes the corner radius of the moveable portion of the first user interface object, and/or the size of the moveable portion of the first user interface object (e.g., a size that corresponds to the size of the reactive region of the resize operation, or the size of the rounded corner relative to the overall size of the two edges adjacent to the corner). For example, in some embodiments, as described with reference to FIG. 17R, resize affordance 1734 and/or resize affordance 1742 are displayed with a size and/or shape that is based on a corner of the application window 1728. Providing a resize affordance that enables the user to resize a user interface object, where the resize affordance is displayed with a size and/or shape based on a portion of the user interface object, such as a corner of the user interface object, optionally without overlapping the resize affordance with the user interface object, provides additional control options for the user for resizing the user interface object without obscuring the user interface object, which reduces a number of inputs required to perform an operation and improves visual feedback about a state of the computer system.

In some embodiments, the resize affordance is of a first length and/or size for a first value of the spatial characteristic of the moveable portion of the first user interface object, and the resize affordance is of a second length and/or size for a second value of the spatial characteristic of the moveable portion of the first user interface object, wherein the first length and/or size is different from the second length and/or size, when the first value of the spatial characteristic is different from the second value of the spatial characteristic. For example, in some embodiments, when the corner radius of the corner of the first user interface object is larger, the resize affordance is longer and larger, while when the corner radius of the corner of the first user interface object is smaller, the resize affordance is shorter and smaller. In some embodiments, as the first user interface object is resized to be bigger and having a larger corner radius, the resize affordance is also displayed with a larger size and length. Correspondingly, as the first user interface object is resized to be smaller and having a smaller corner radius, the resize affordance is also displayed with a smaller size and length. For example, in some embodiments, as described with reference to FIG. 17R, resize affordance 1734 and/or resize affordance 1742 are displayed as extending along an edge of the application window 1728 by an amount (e.g., a length of the resize affordance 1734 and/or resize affordance 1742) that is based on curvature of the corner of the application window 1728. Providing a resize affordance that enables the user to resize a user interface object, where the resize affordance is displayed with a size and/or length that is based on a curvature, or other characteristic, of a portion of the user interface object, provides additional control options for the user for resizing the user interface object without obscuring the user interface object, which reduces a number of inputs required to perform and operation and improves visual feedback about a state of the computer system In some embodiments, the resize affordance is displayed with a first curvature when the moveable portion of the first user interface object has the first value for the spatial characteristic, and the resize affordance is displayed with a second curvature when the moveable portion of the first user interface object has the second value for the spatial characteristic, wherein the first curvature and the second curvature are different when the first value of the spatial characteristic is different from the second value of the spatial characteristic. For example, in some embodiments, the resize affordance has a smaller curvature when the corner radius of the first user interface object is larger, and has a larger curvature when the corner radius of the first user interface object is smaller. In some embodiments, a "corner radius" of the first user interface object at the moveable portion of the first user interface object (e.g., a corner, apex, or other movable portions of the first user interface object that move in accordance with the movement of the first user input (e.g., in a direction, with a magnitude, and/or with a speed that correspond to the direction, magnitude, and/or speed of the movement of the first user input)) is defined by the radius of the "rounded" curve that joins two straight edges of the first user interface object. A larger corner radius corresponds to a more rounded corner of the first user interface object, and a smaller corner radius corresponds to a sharper corner. In some embodiments, the curvature of the resize affordance is selected to correspond to the corner radius of the corner that is moved in accordance with the movement of the first user input, such that the resize affordance appears to "curve around" the rounded corner of the first user interface object with a consistent gap distance between the resize affordance and the corner and adjacent edges of the first user interface object, along substantially the full length of the resize affordance. For example, in some embodiments, as described with reference to FIG. 17R, resize affordance 1734 and/or resize affordance 1742 are displayed with a radius of curvature that is based on a radius of curvature of the corner of the application window 1728. Providing a resize affordance that enables the user to resize a user interface object, where the resize affordance is displayed with shape that curves with a curvature selected based on a curvature of a portion of the user interface object, such as a corner of the user interface object, provides additional control options for the user for resizing the user interface object without obscuring the user interface object, which reduces a number of inputs required to perform an operation and improves visual feedback about a state of the computer system.

In some embodiments, aspects/operations of methods 800, 900, 1000, 1100, 1200, 1300, 1400, 1500, 1600, and 20000 may be interchanged, substituted, and/or added between these methods. For example, the user interface objects, application windows, accessory objects, object management controls, window management controls, resize affordances, resize controls, grabbers, move controls, move affordances, applications, gaze, pinch gesture, and/or reactive regions, in the method 1800 has characteristics of analogous objects and inputs in methods 800, 900, 1100, 1200, 1300, 1400, 1500, 1600, and 20000. For brevity, these details are not repeated here.

FIGS. 19A-19S illustrate example user interfaces for scaling a user interface object (e.g., an application window, application content within an application window, window management objects associated with the application window, and/or other types of user interface objects that include internal content, a boundary, and/or object management controls) in accordance with a respective gesture (e.g., an air gesture, a touch gesture, an expansion gesture, a depinch gesture, and/or other gestures that optionally has a corresponding operation within the user interface object if the location targeted by the respective gesture is within the reactive region of the respective gesture for the corresponding operation within the user interface object), in accordance with some embodiments.

FIGS. 19A-19S illustrate an application window 1902 of an application (e.g., an application installed on the operating system, a system application provided by the operating system, or the operating system itself) displayed in a portion of a three-dimensional environment 7000' displayed in a user interface 17000 via HMD 7100a, as described with reference to FIG. 7A. It will be understood that the processes, features and functions described herein with reference to HMD 7100a are also applicable to display generation component 7100, and/or other types of display generation component, such as a standalone display device, a touch-screen display, and/or a projector.

In some embodiments, the application window 1902 includes application content, such as a user interface element 1908, that is provided by an application associated with the application window 1902. In some embodiments, the user interface element 1908 is scalable content, scalable by the application, within the application window 1902, such that the application increases and/or decreases a size of the user interface element 1908 within the application window 1902 in response to a user request to change a size of the user interface element 1908 and/or a user request to change other content (e.g., deleting, adding, and/or resizing other content) in the application window 1902. In some embodiments, the application window 1902 includes one or more other content that is not scalable by the application, such as the button 1914, the button 1916, the button 1918, and the button 1920, and/or other user interface, within the application window 1902 (such as one or more other elements that can be selected and or manipulated based on user inputs). In some embodiments, as the one or more buttons are not scalable within the application window 1902 by the application, the application does not respond to a user request to increase and/or decrease the size of the one or more buttons individually within the application window 1902. In some embodiments, the application window 1902 includes additional scalable and/or non-scalable content. In some embodiments, the application window 1902 is concurrently displayed with one or more accessory objects such as one or more window management controls (e.g., the grabber 1906 and/or the close affordance 1907). In some embodiments, the one or more accessory objects such as the one or more window management controls are non-scalable content that the application does not increase and/or decrease in size. As used herein, "non-scalable content" refers to content associated with the application window 1902 (e.g., user interface objects within the application window, and/or accessory objects that are outside of the boundary of the application window and that move with the application window) that cannot be scaled by the application; however, as described with reference to FIGS. 19I-19J, the non-scalable content is scalable, by the operating system of the computer system, in conjunction with scaling the application window 1902 as a whole by the operating system of the computer system. In some embodiments, a higher level software application that manages multiple applications may serve the role of the operating system to scale an application window of an application it manages.

In some embodiments, the user's attention 1910 (e.g., including the user's attention 1910a, 1910b, 1910c, 1910d, 1910e and 1910f) represents a gaze input and/or the location of a cursor for an input device (e.g., optionally an external input device such as a touch input (e.g., on a touch-sensitive display), a mouse, keyboard, stylus, trackpad, or other input device).

FIG. 19A illustrates the user's attention 1910a directed to the user interface element 1908 (e.g., as an example of scalable content within the application window) in the application window 1902 and illustrates the user's attention 1910b directed to a corner of the application window 1902 (e.g. as an example of window resizing performed by the application), in the alternative (e.g., at different times, and/or as part of an input for disambiguation), in accordance with some embodiments.

FIG. 19B illustrates that, in some embodiments, while the user's attention 1910a is directed to the user interface element 1908, the computer system detects a user input, such as an air gesture, a touch gesture and/or another input using the input device. In some embodiments, the computer system detects that the user input is a two-handed pinch gesture, or another type of two-handed gesture, in which a first hand of the user corresponding to the representation 7020' of the user's first hand and a second hand of the user corresponding to the representation 7022' of the user's second hand, each perform a pinch gesture at substantially the same time (e.g., forming and/or holding the pinch posture at the same time for at least a threshold period of time within a threshold amount of time such as 0.01, 0.02, 0.05, 0.1, 0.2. 0.5. 1, or 2 seconds). In some embodiments, the two-handed gesture includes movement of one and/or both of the user's hands, optionally while maintaining the pinch gesture of one or both of the user's hands. In some embodiments, the two-handed gesture corresponds to a resize request for the user interface element 1908 as recognized by the application. For example, the resize request includes increasing and/or decreasing a size of the content (e.g., the user interface element 1908) to which the user's attention is currently directed while the user's hands move closer together (e.g., to decrease a size of the content) and/or farther apart (e.g., to increase a size of the content).

In some embodiments, in response to detecting the two-handed gesture, a first input event corresponding to the two-handed gesture is provided to: an application gesture recognizer for the application corresponding to the application window 1902 to which the user's attention 1910a is directed, a system gesture recognizer for the operating system of the computer system, and, optionally an extension gesture recognizer for an embedded application extension associated with other content (e.g., that is optionally displayed in the application window 1902) that links to one or more other applications.

In some embodiments, although the first input event is provided to the application gesture recognizer, the system gesture recognizer, and/or the extension gesture recognizer, the system gesture recognizer performs a waiting, or hold, operation, for the first input event (e.g., the system gesture recognizer forgoes handling the first event), unless the application gesture recognizer (e.g., and/or the extension gesture recognizer) releases the instruction that the application did not consume the first input event. As such, if the application gesture recognizer associated with application window 1902 consumes the first input event and performs a corresponding operation in the application, the system gesture recognizer takes no action. For example, the system gesture recognizer only handles the first input event if the first input event is not handled by the application gesture recognizer and/or the extension gesture recognizer.

In some embodiments, the application gesture recognizer for the application corresponding to the application window 1902 determines whether the user input corresponds to an operation that can be performed by the application. For example, the application determines, based on the first input event, whether the user's attention 1910a is directed to scalable content (e.g., content scalable by the application). For example, the user interface element 1908 is scalable content, such that, in response to the determining that the user's attention 1910a is directed to the user interface element 1908, the application gesture recognizer handles the received first input event, including performing an operation in accordance with the first input event, such as resizing (e.g., increasing and/or decreasing the size of) the user interface element 1908 within the application window 1902, without changing a size of the application window 1902 and/or without changing a size of other content displayed in the application window, such as the button 1914, the button 1916, the button 1918, and the button 1920, and/or without changing the size of accessory objects (e.g., the grabber 1906 and the close affordance 1907) as illustrated in FIG. 19C.

In some embodiments, the amount of resizing of the user interface element 1908 is based on an amount of movement, a direction of movement and/or a speed of movement of one of the user's hands relative to the other user's hand. For example, in FIG. 19C, the distance between the representation of the user's hand 7022' and the representation of the user's hand 7020' is greater than the distance between the representations of the user's hands in FIG. 19B, and thus the size of the user interface element 1908 increases to a size or by a proportional amount determined at least in part on the change in distance between the representations of the user's hands.

Figures 19C, 19D:
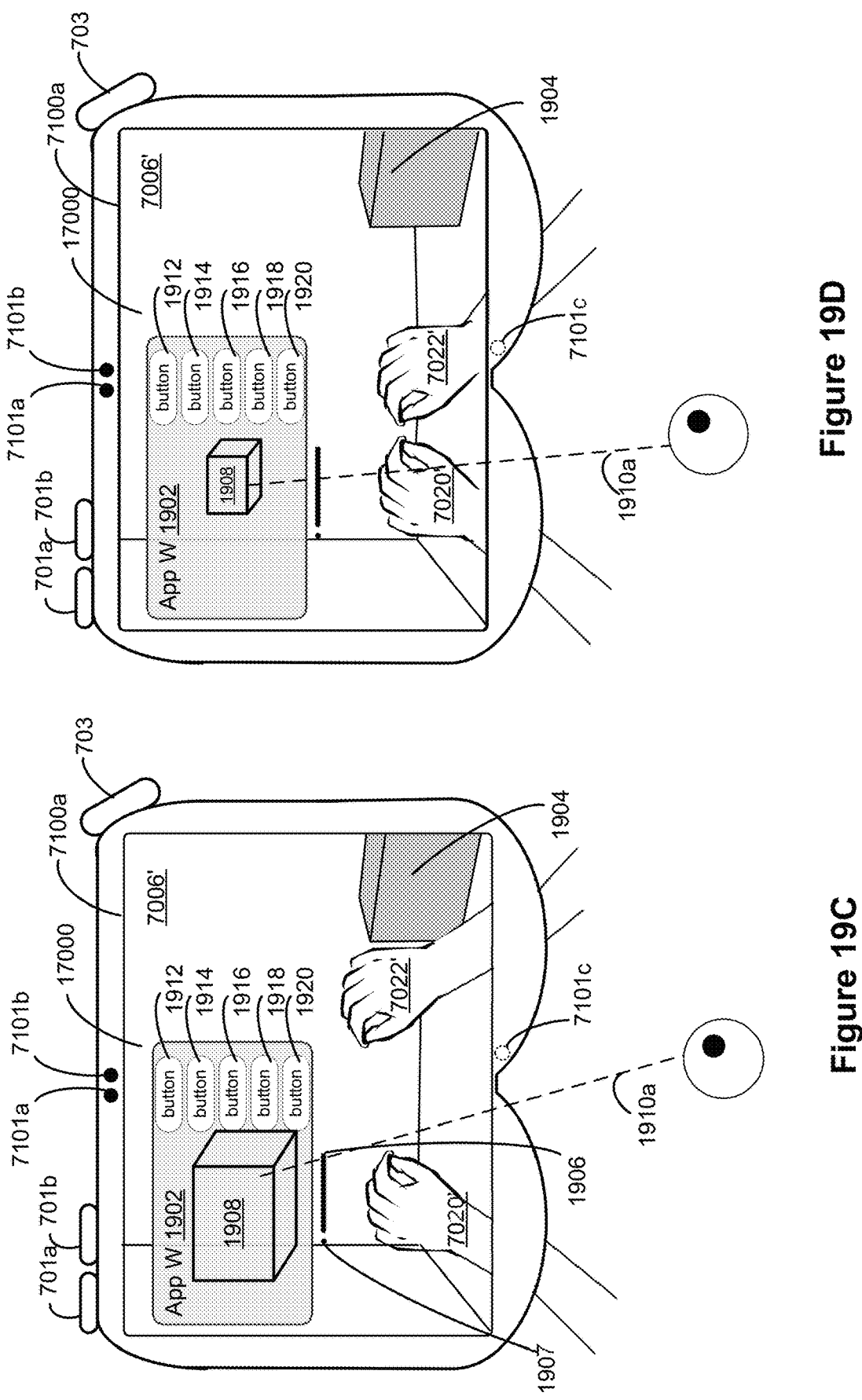

FIG. 19D illustrates that, while the user's attention 1910a continues to be directed to the user interface element 1908, the user continues to provide a request (e.g., and/or provides an additional user input corresponding to another request) to resize the user interface element 1908, including requesting to decrease the size of the user interface element 1908 in accordance with the user's hands moving toward each other (e.g. as illustrated by the representation of the user's hand 7022' moving closer to (e.g., resulting in a shorter distance between) the representation of the user's hand 7020'). In response to the user's hands moving toward each other (e.g., as illustrated by the representations of the user's hands moving closer together), the size of the user interface element 1908 is decreased to a size or by a proportional amount based at least in part on the change in distance between the representations of the user's hands (and, optionally, based on other parameters such as the direction, speed, and/or acceleration of the movement of the hand(s)). FIG. 19D further illustrates that, while the user's attention 1910a is directed to scalable content (e.g., the user interface element 1908), the scalable content is resized in accordance with the user's resizing input, while other content (e.g., other scalable content to which the user's attention is not directed and/or other non-scalable content) of the application window 1902 and/or the application window 1902 are not resized.

Figures 19E, 19F:
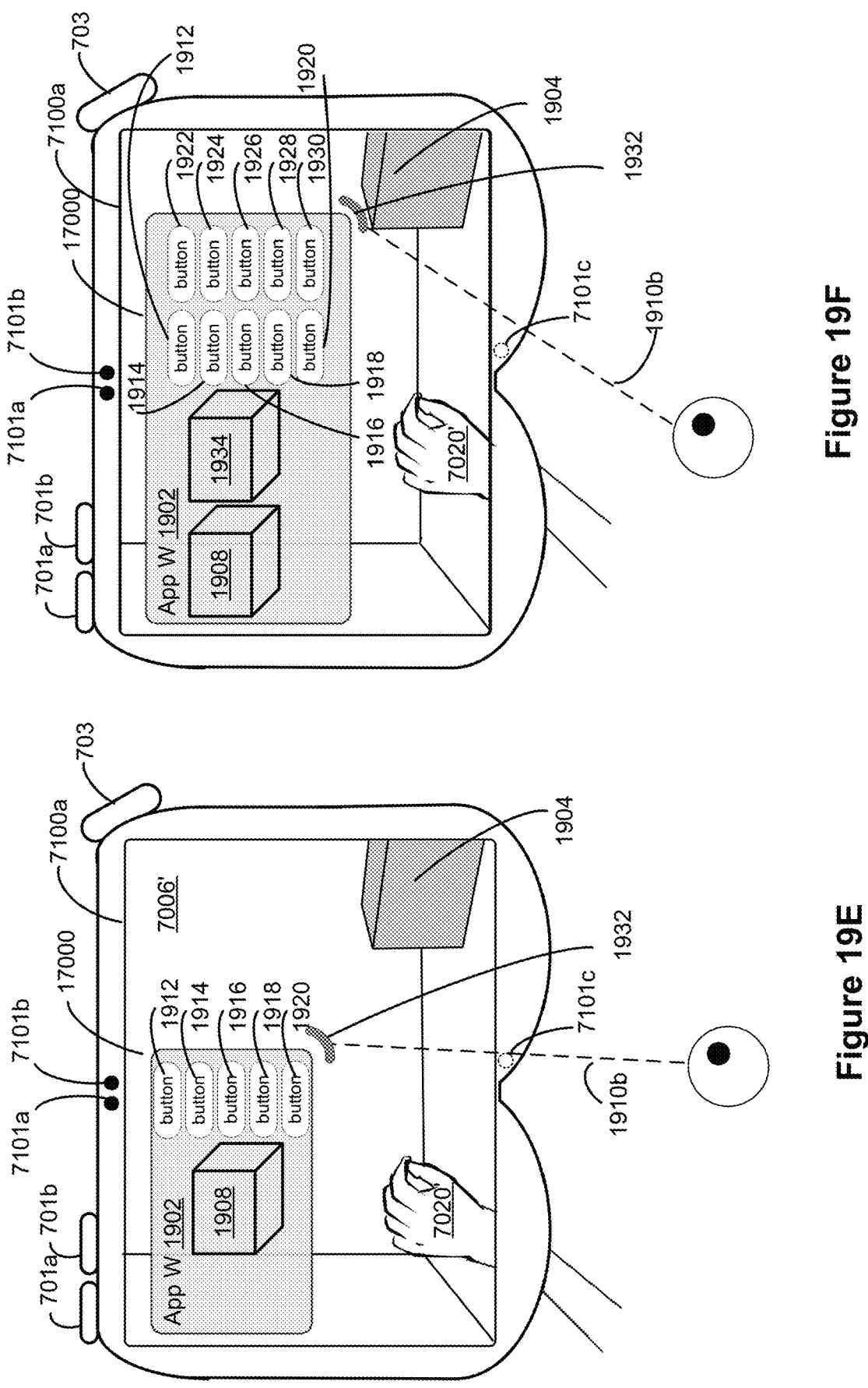

FIG. 19A further illustrates the user's attention 1910b directed to an active region (e.g., also referred to herein as a reactive region) of the application window 1902 corresponding to a resize affordance 1932 (e.g., analogous to resize affordance 1734, resize affordance 1742 and/or resize affordance 708-1, described with respect to other Figures in this disclosure). In some embodiments, as described with reference to FIG. 17R, in response to detecting the user's attention 1910b directed to the active region of the application window 1902, the resize affordance 1932 is displayed, as illustrated in FIG. 19E. In some embodiments, the resize affordance for the whole window is displayed persistently with the window (e.g., as persistently displayed resize handles attached to the corners and/or edges) and/or is part of the window (e.g., draggable corners and/or edges of the window). c In some embodiments, while the user's attention 1910b is directed to the resize affordance 1932, as illustrated in FIG. 19E, a user input, such as a pinch gesture or other selection input, corresponding to selection of the resize affordance 1932, is detected. In some embodiments, in response to the user input selecting the resize affordance 1932, the application window 1902 is resized in accordance with movement of the user input. For example, the representation 7020' of the user's hand moves to the right, away from the application window 1902, while the resize affordance 1932 is selected by the pinch gesture of the user's hand, to increase the size of the application window 1902 (e.g., a resize operation, as described with reference to FIGS. 7K-7M and FIGS. 17A1-17P, is performed on the application window 1902).

In some embodiments, in response to the user input corresponding to the request to resize the application window 1902, as a result of the user's attention 1910b being directed to the resize affordance 1932 when the pinch gesture was first detected, the computer system 101 changes (e.g., increases and/or decreases) the size of the application window 1902 in accordance with the detected user input, as illustrated in FIG. 19F.

As described with reference to FIGS. 17A1-17P, in some embodiments, the application window 1902 is refreshed (e.g., updated, re-rendered and/or redrawn) (e.g., at a particular application refresh rate) by the application, such that the content within the application window 1902 is refreshed (e.g., updated, re-rendered and/or redrawn) according to the requested size of the application window 1902 illustrated in FIG. 19F. For example, the application window 1902, at its requested size illustrated in FIG. 19F, is refreshed to include additional content as compared to the application window 1902 illustrated in FIG. 19E. FIG. 19F illustrates that the application window 1902 includes the user interface element 1908, the user interface element 1934 (e.g., optionally corresponding to scalable content), and the button 1912, the button 1914, the button 1916, the button 1918, the button 1920, the button 1922, the button 1924, the button 1926, the button 1928 and the button 1930. In some embodiments, the size of the accessory objects of the application window 1902 are optionally updated based on the requested size of the application window 1902 in FIG. 19F (e.g., the accessory objects optionally scale by an amount determined based at least in part on the requested size of the application window 1902). In some embodiments, the sizes of at least some of the accessory objects of the application window 1902 (e.g., move affordance, close affordance, title bar, and/or other window management controls) are not updated based on the requested size of the application window 1902 in FIG. 19F. It is to be emphasized that, resizing the application window 1902 by the application using the resizing affordance of the application window includes changing the overall size of the application window by moving the boundaries of the application window and refreshing the internal content of the application window (e.g., including add, deleting, reflowing content and/or individual user interface objects contained in the application window), rather than merely taking a snapshot of the image of the application window and stretching or shrinking the image as a whole irrespective of the nature and appearance of content that is displayed within the application window.

Figures 19G, 19H:
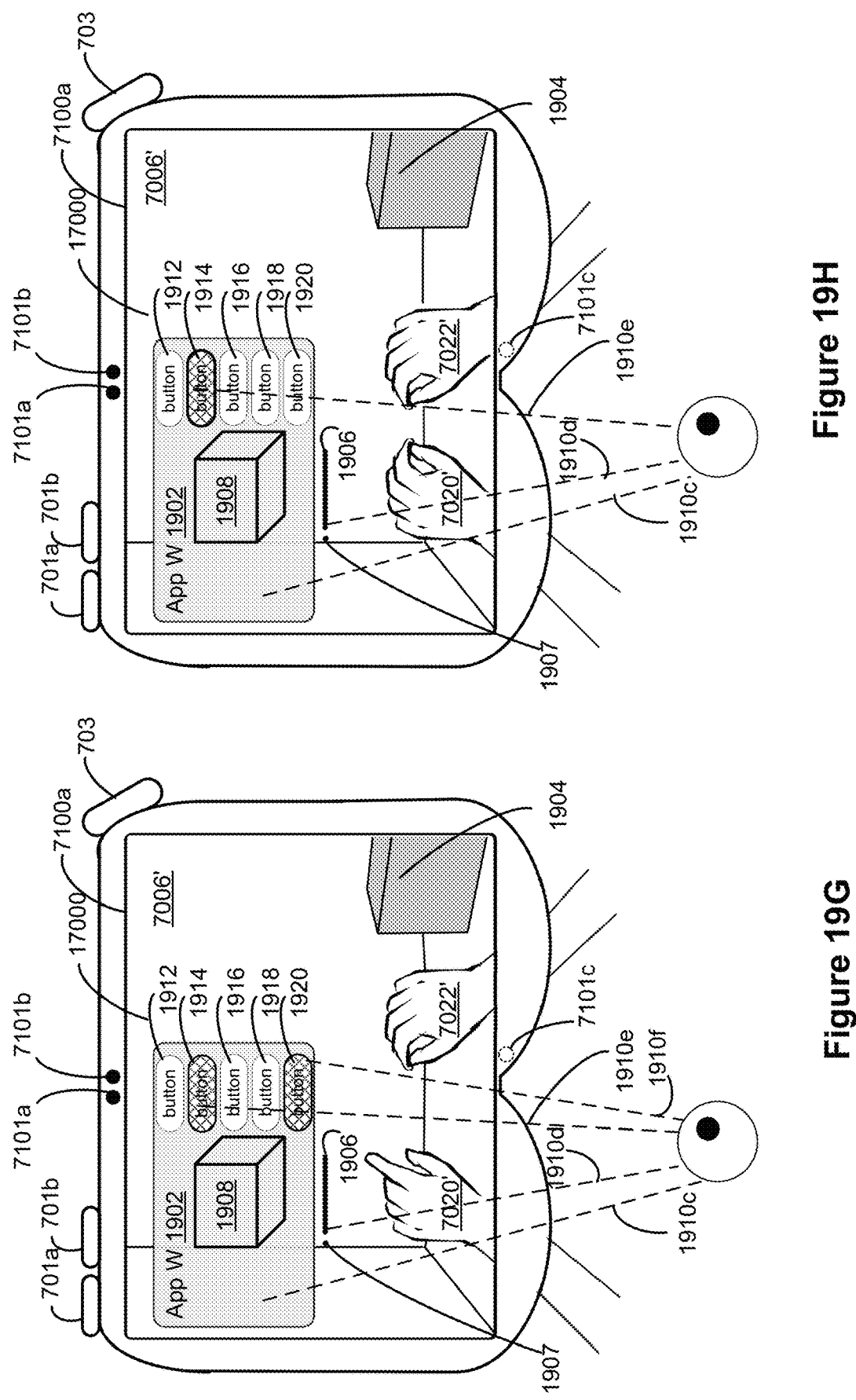

FIG. 19G illustrates the application window 1902 having the same size, position, and content as the application window 1902 described with reference to FIG. 19A. In some embodiments, the user interacts with (e.g., selects, modifies, and/or otherwise engages with) content in the application window 1902 by directing the user's attention to respective content and providing a user input. In some embodiments, the user interacting with content in the application window 1902 includes one or more of: navigating through content in the application window, scrolling through content in the application window, selecting one or more objects in the application window, adding content to the application window, removing content from the application window, and/or otherwise changing the content displayed within the application window in accordance with the program and design of the application. In some embodiments, the user interactions with content in the application window 1902 are also applicable to other application windows described herein, such as application window 702 and/or application window 1702.

For example, in response to detecting that the user's attention 1910e is directed to the button 1914, and while the user's attention 1910e is directed to the button 1914, detecting a selection input, such as a pinch input, an air gesture, or other selection input, for example from the user's hand corresponding to representation 7022' of the user's hand, the computer system, through the event recognizers of the application, selects the button 1914 and causes the application associated with application window 1902 to perform one or more operations associated with the button 1914. For example, in some embodiments, the button 1914 corresponds to a navigation button, such as a back button, an up button, or a reverse button, for navigating to previously displayed content within application window 1902, such that, in response to detecting user selection of the button 1914, the application updates the content displayed in the application window 1902 to navigate to the previously displayed content. Similarly, while the user's attention 1910*f* is directed to the button 1920, in response to detecting a selection input, such as a pinch input, an air gesture, or other input, for example from the user's hand corresponding to representation 7022' of the user's hand, the computer system, through the event recognizers of the application, selects the button 1920 and causes the application associated with application window 1902 to perform one or more operations associated with the button 1920 (e.g., scrolling the portion of window content associated with the button 1920, opening a new window, displaying new content in the window, or performing other operations that change the content and/or the appearance thereof in the application window). In some embodiments, each of the buttons displayed in the application window 1902 corresponds to a respective operation to be performed by the application. In some embodiments, as described with reference to FIGS. 7V-7Z, in response to detecting the user's attention 1910*d* directed to the grabber 1906 (e.g., which is analogous to the grabber 706-1) and detecting a selection input directed to the grabber 1906, the user is enabled to reposition or otherwise move the application window 1902 (e.g., as a whole, and with its window management control) within the three-dimensional environment 7000'.

Figures 19I, 19J:
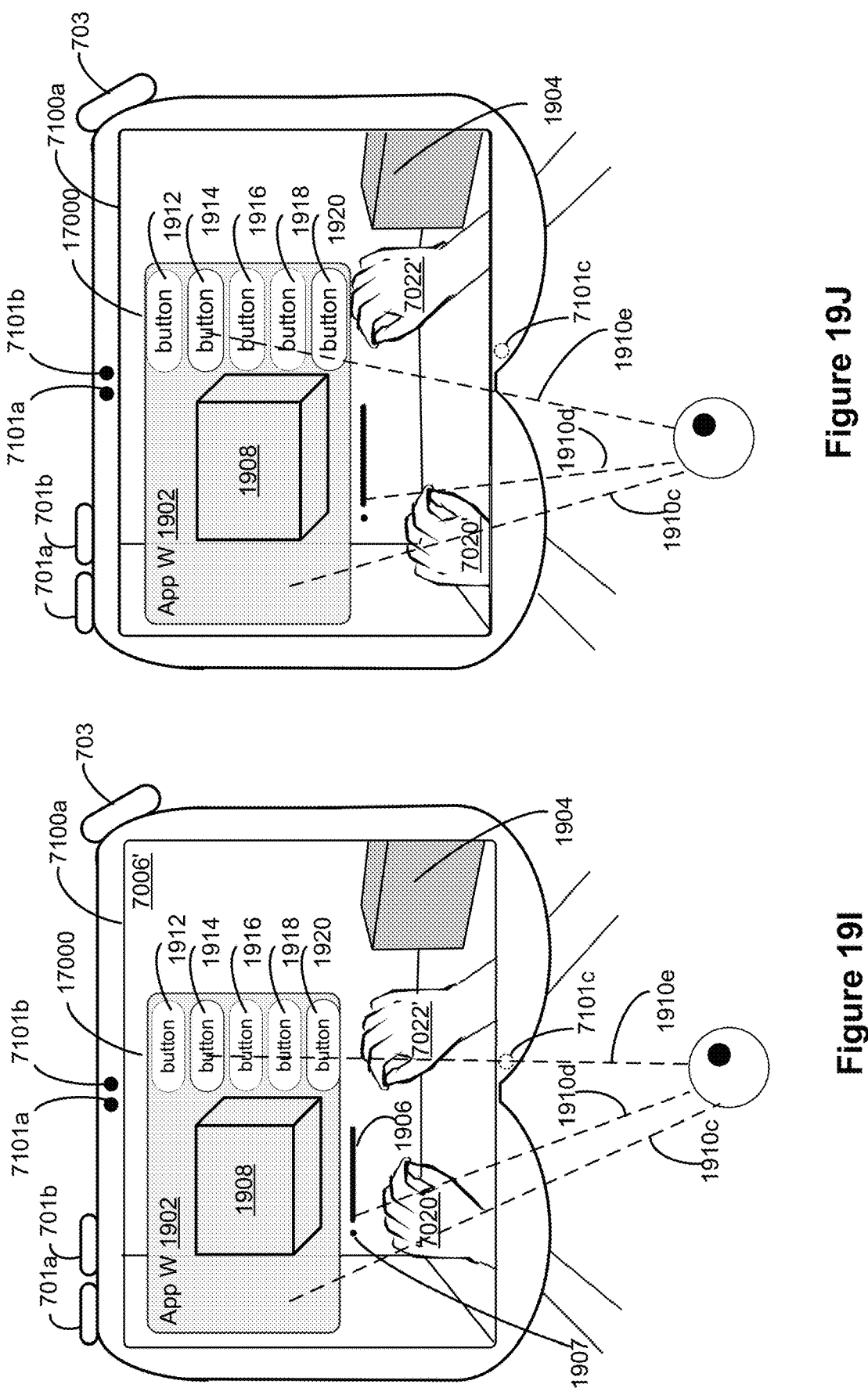

In some embodiments, in accordance with a determination that the user's attention (e.g., the user's attention 1910*c*, the user's attention 1910*d*, the user's attention 1910*e* and/or the user's attention 1910*f*) is being directed to a piece of non-scalable content in the application window, as illustrated in FIG. 19G, in response to a user input (e.g., a two-handed gesture or other user input) corresponding to a request to resize the piece of non-scalable content, the application window 1902 and its content, are scaled in accordance with the user input (e.g., stretched or shrunken as a whole, without change in relative appearance between the content within the application window and the boundaries of the application window), as described with reference to FIGS. 19H-19J.

For example, in FIG. 19H, in accordance with a determination that the user's attention 1910*c* is directed to a portion of the application window 1902 that does not correspond to scalable content (e.g., the user's attention is not directed to the user interface element 1908 or another scalable content in the application window 1902), and/or that the user's attention 1910*d* is directed to the grabber 1906 (e.g., and/or another accessory object of the application window 1902), that the user's attention 1910*e* is directed to the button 1914, and/or that the user's attention is directed to other non-scalable content associated with the application according to the application, in response to detecting a user input corresponding to a resize request, such as a double pinch gesture or other gesture, the computer system scales the application window 1902, including the content within the application window 1902, and the accessory objects of the application window 1902, in accordance with the user input corresponding to the resize request, as illustrated in FIG. 19I.

For example, as the distance between the two hands of the user, as illustrated by the distance between the representation 7020' of the user's first hand and the representation 7022' of the user's second hand, increases, the application window 1902 and its content, including the user interface element 1908, the button 1912, the button 1914, the button 1916, the button 1918, and the button 1920, and optionally one or more accessory objects (e.g., the grabber 1906 and/or the close affordance 1907) of the application window 1902, increase in size, without refreshing (e.g., updating, re-rendering and/or redrawing) the content in the application window 1902. As such, because the resize operation is performed while the user's attention is directed to non-scalable content of the application window, the entire application window and its content are resized with no relative change in appearance between the content of the application window, the accessory objects of the application window, and the boundaries of the application window. In some embodiments, the application window 1902 and its content, including the user interface element 1908, the button 1912, the button 1914, the button 1916, the button 1918, and the button 1920, and optionally one or more accessory objects (e.g., the grabber 1906 and/or the close affordance 1907) of the application window 1902 are grouped as a single object for the computer system to scale the application window and its content as a whole.

In some embodiments, increasing the size of the entire application window 1902, including non-scalable content, increase the sizes and/or reactive regions of the non-scalable content, and enables the user to more easily target, select, or otherwise interact with, the content and/or accessory objects of application window 1902. For example, if the user has difficulty selecting an accessory object (e.g., the grabber 1906, the close affordance 1907 and/or another accessory object) associated with the application window 1902, the user is enabled to increase a size of the application window 1902 and its accessory objects by performing a resize operation on the whole window including the accessory objects of the window, without causing the content of the window to be refreshed and/or changed, while directing the user's attention (e.g., the user's attention 1910*c*, the user's attention 1910*d*, and/or the user's attention 1910*e*) to non-scalable content associated with the application window 1902, thereby making it easier for the user to target, select, or otherwise interact with the content displayed at its increased size (e.g., including scalable content, non-scalable content within the window, and the accessory objects outside of boundaries of the window).

In some embodiments, in response to detecting the two-handed gesture or other user input, a second input event corresponding to the two-handed gesture is provided to: an application gesture recognizer for the application corresponding to the application window 1902 to which the user's attention 1910*c*, the user's attention 1910*d*, and/or the user's attention 1910*e*, is directed, a system gesture recognizer for the operating system of the computer system, and, optionally an extension gesture recognizer for an embedded application extension associated with other content that links to one or more other applications.

In some embodiments, the application gesture recognizer for the application corresponding to the application window 1902 determines, based on the second input event, whether the user's attention 1910*c*, the user's attention 1910*d*, and/or the user's attention 1910*e* is directed to scalable content. For example, the portion of the application window 1902 to which the user's attention 1910c is directed is content that is not independently resizable (e.g., content that does not separately change size relative to the window in response to a resize gesture directed toward the non-scalable content), the grabber bar 1906 to which the user's attention 1910d is directed that is not independently resizable, and the button 1914 to which the user's attention 1910e is directed that is not independently resizable, such that, in response to the determining that the user's attention 1910c, the user's attention 1910d, and/or the user's attention 1910e is not directed to scalable content (e.g., the user interface element 1908), the application gesture recognizer does not handles the received second input event, and the application gesture recognizer sends an indication to system gesture recognizer that the second input event was not handled by the application gesture recognizer. In some embodiments, object(s) that are not independently resizable can still be resized when the entire window is rescaled, where the object(s) are rescale concurrently with (and, optionally, proportionally with) resizing the window. In some embodiments, in response to receiving the indication that the second input event was not handled by the application gesture recognizer (e.g., and/or by the extension gesture recognizer), the system gesture recognizer handles the second input event (e.g., the operating system performs one or more operations, if any, that are associated with the second input event). In some embodiments, the second input event corresponds to a system instruction to scale (e.g., increase and/or decrease the size of or otherwise resize) the application window 1902, and the content displayed in the application window 1902, such as the button 1914, the button 1916, the button 1918, and the button 1920, and/or the size of the accessory objects (e.g., the grabber 1906 and/or the close affordance 1907).

For example, in response to receiving the second input event, the system gesture recognizer performs a waiting, or hold, operation, for the second input event, until the application gesture recognizer releases the instruction that the application did not handle the second input event (e.g., the application did not respond to the second input event because the user's attention is not directed to scalable content of the application). As such, the application gesture recognizer associated with application window 1902 authorizes the system gesture recognizer to use the second input event to perform one or more system operations, if the second input event corresponds to a respective system operation.

FIG. 19J illustrates that, as the distance between the hands of the user, as illustrated by the distance between the representation 7020' of the user's first hand and the representation 7022' of the user's second hand, increases, relative to the distance between the hands of the user, as illustrated by the distance between the representation 7020' of the user's first hand and the representation 7022' of the user's second hand illustrated in FIG. 19I, the application window 1902 and its content (e.g., the user interface element 1908, the button 1912, the button 1914, the button 1916, the button 1918, and the button 1920, and optionally one or more accessory objects (e.g., the grabber 1906 and/or the close affordance 1907)) continue to increase in size. For example, the amount of scaling applied to the application window 1902 and its content is based on an amount of movement, a direction of movement and/or a speed of movement of the user's hands corresponding to the representation 7020' and the representation 7022' (e.g., a greater amount of distance between the user's hands corresponds to a greater increase in size of the application window 1902 and its content).

In some embodiments, while the application window 1902 is displayed with the increased size, the user interacts with content in the application window 1902, including one or more of: navigating through content in the application window, scrolling through content in the application window, selecting one or more objects in the application window, adding content to the application window, removing content from the application window, and/or otherwise changing the content displayed within the application window in accordance with the program and design of the application. As such, changing the scale of the application window 1902 and its content provides better visibility of the application window 1902 and its content without limiting the functionality of the application associated with the application window 1902.

In some embodiments, the distance between the two hands of the user, as illustrated by the distance between the representation 7020' of the user's first hand and the representation 7022' of the user's second hand, increases by an amount that corresponds to a maximum amount of scaling (e.g., also referred to herein as a scale limit, or an upper scaling limit) for the application window 1902 (e.g., the application window 1902 cannot be scaled by a greater amount). In some embodiments, in accordance with a determination that the maximum amount of scaling for the application window 1902 is reached, the application window 1902 is temporarily increased beyond the maximum amount of scaling, before displaying an animation, that automatically, without additional user input, decreases the application window 1902 from its temporary size that is beyond the maximum amount of scaling, to within the maximum amount of scaling (e.g., or at the maximum amount of scaling).

Figures 19K, 19L:
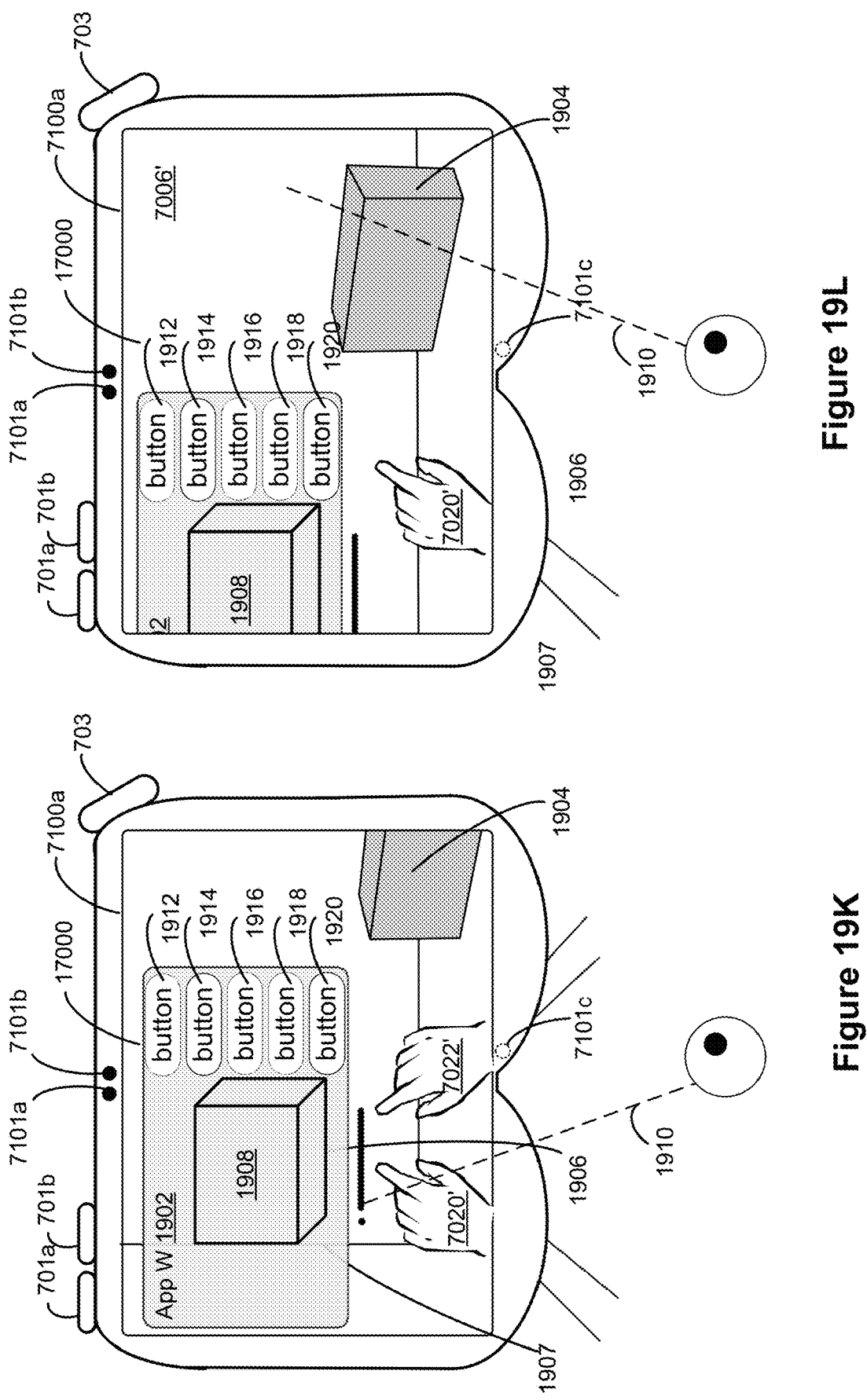

FIGS. 19K-19L illustrate that, while the application window 1902 and the user interface element 1908, the button 1912, the button 1914, the button 1916, the button 1918, and the button 1920, and optionally, the one or more accessory objects (e.g., the grabber 1906 and/or the close affordance 1907) of the application window 1902 are displayed with the increased size, the attention of the user 1910 is detected as shifting away from the application window 1902. In some embodiments, the increased size of the application window 1902 and its content is maintained while the user's viewpoint changes. In some embodiments, the user optionally moves, for example, to turn or otherwise move away from the application window 1902. In some embodiments, the user optionally moves the user's head and/or the user's torso to change the current viewpoint of the user, as illustrated in FIG. 19M, such that the application window 1902 is no longer displayed in the current view of the three-dimensional environment 7000' provided by the display generation component 7100a.

Figures 19M, 19N:
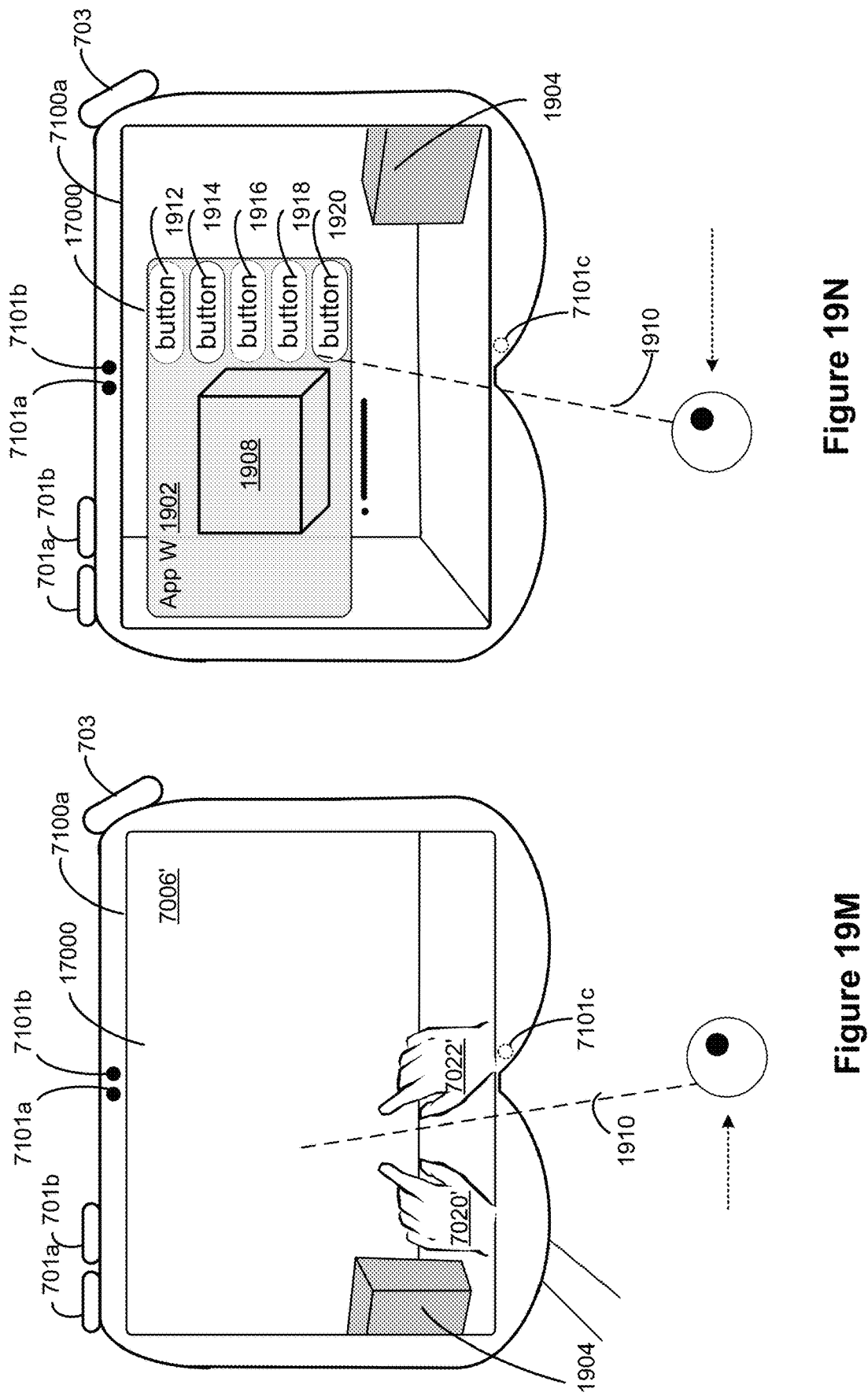

In some embodiments, in response to detecting that the user moves the user's head, torso, or otherwise changes the user's viewpoint such that the current view of the user returns to a view that includes the application window 1902, as illustrated in FIG. 19N, the application window 1902 and its content continue to be displayed with the increased size.

Figures 19O, 19P:
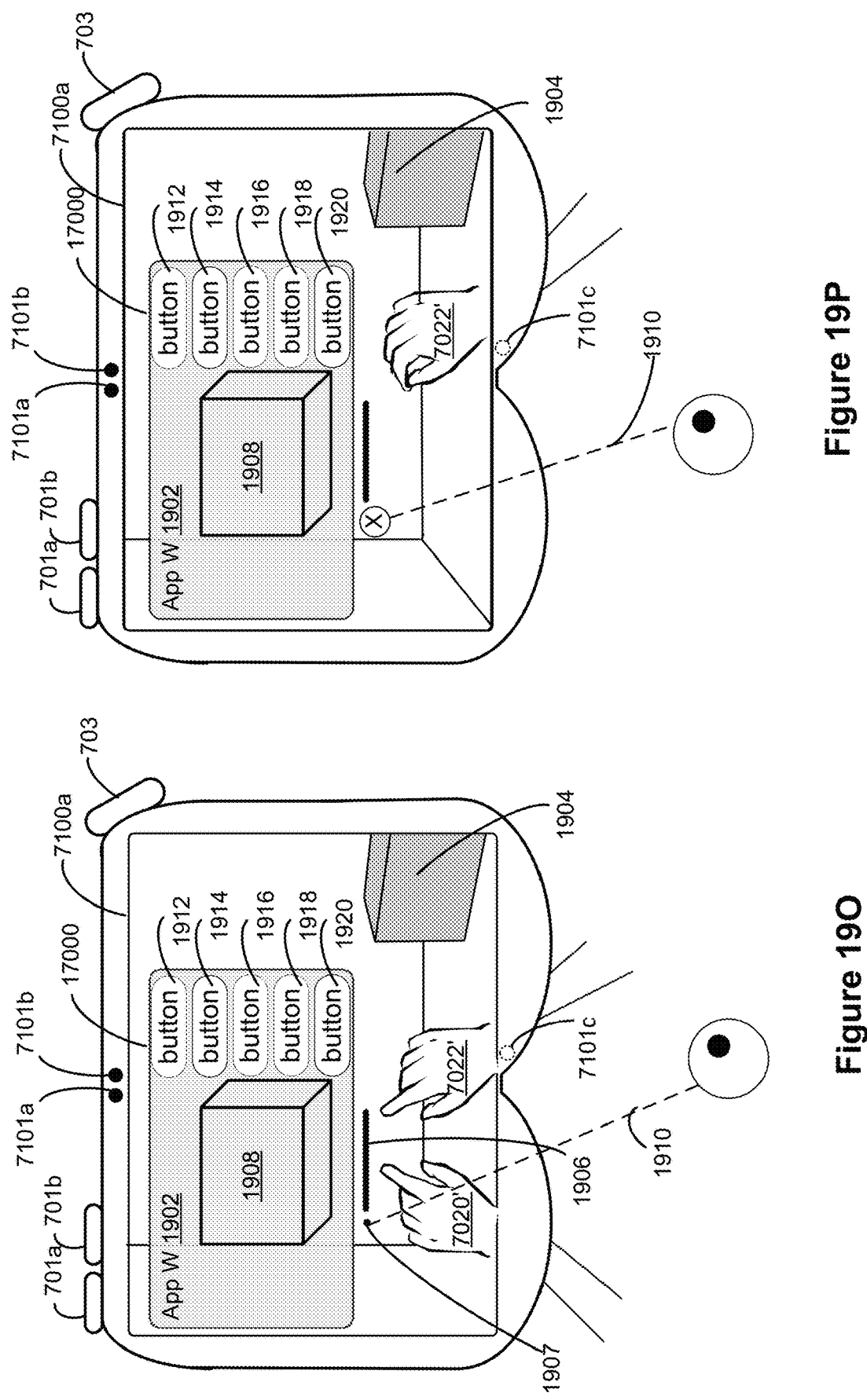
Figure 19Q:
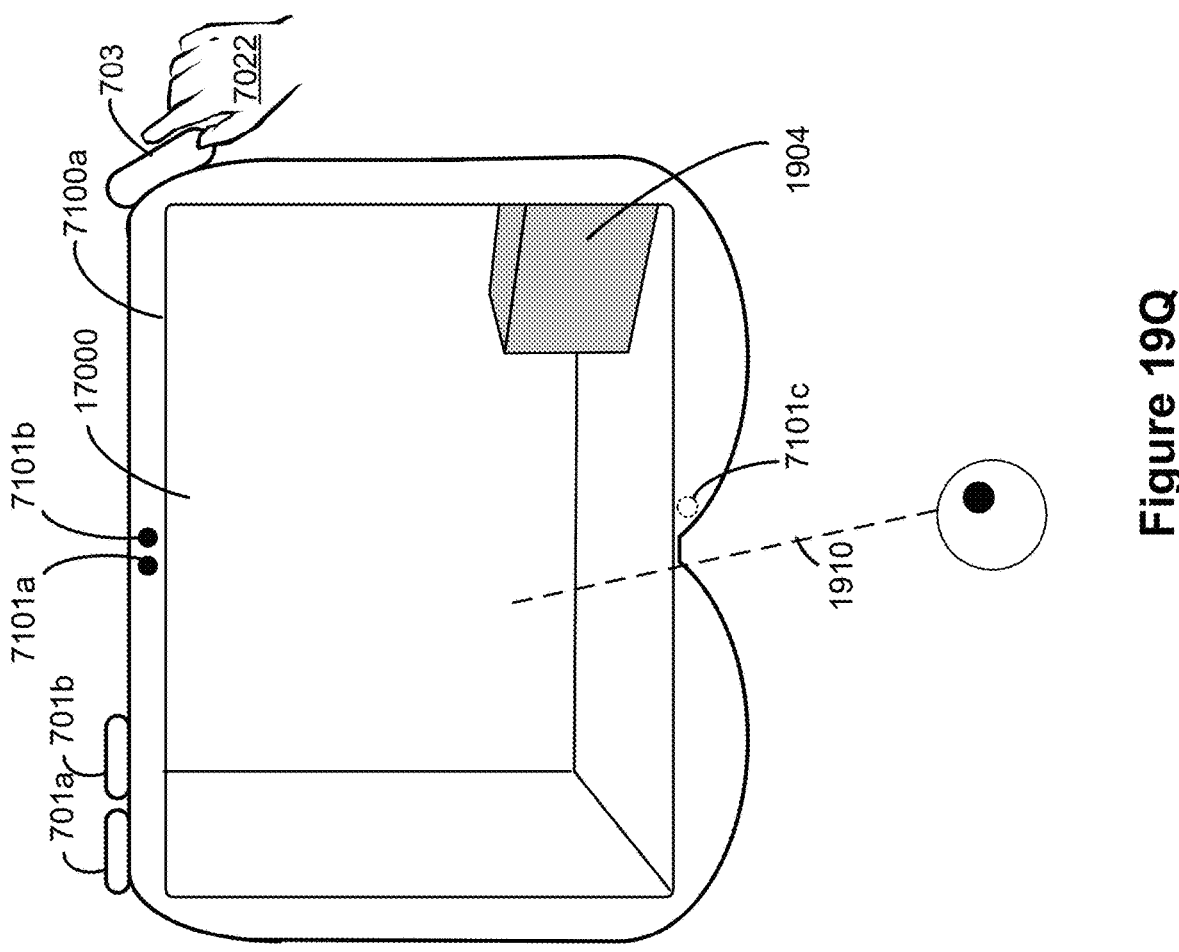
Figures 19R, 19S:
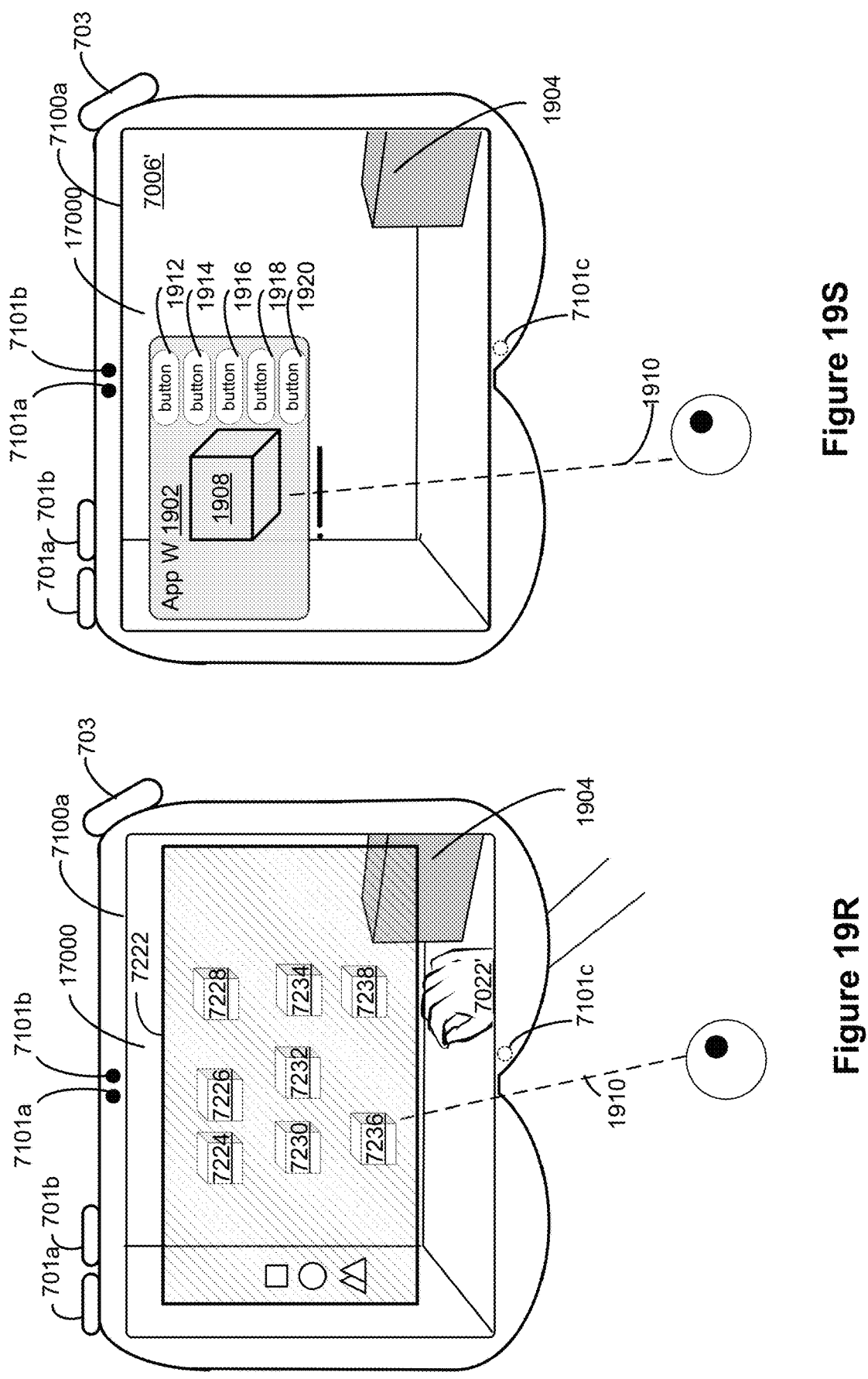

FIG. 19O illustrates the user's attention 1910 being directed to the close affordance 1907 of the application window 1902. In some embodiments, as described with reference to FIGS. 7AQ-7AR, in response to detecting that the user's attention 1910 is directed to the close affordance 1907 (e.g., analogous to affordance 774-1, close affordance 1707 and/or close affordance 7030 described in other portions of the present disclosure) (e.g., a minimized close affordance, and/or a minimized controls menu), an expanded version (e.g., expanded relative to its size immediately prior to detecting the user's attention 1910 on the close affordance 1907, which is optionally already expanded relative to its original size due to prior scaling of the application window using a resize input on non-scalable content of the application window) of the close affordance 1907 is displayed, as illustrated in FIG. 19P. In some embodiments, in response to a user selection of the expanded version of the close affordance 1907, the application window 1902 is closed, minimized, or otherwise ceases to be displayed in the three-dimensional environment 7000', as illustrated in FIG. 19Q.

FIG. 19R illustrates a home menu user interface 7222 is displayed in the three-dimensional environment 7000', as described with reference to FIG. 7BF. In some embodiments, the home menu user interface 7222 is displayed automatically, without additional user input, when no user interface of any application is opened within the three-dimensional environment 7000', including within and outside the viewport through which the three-dimensional environment is visible to the user. In some embodiments, the home menu user interface 7222 is displayed in response to detecting a user input directed to digital crown 703 (e.g., corresponding to button 7273, as described with reference to FIG. 7CC), as illustrated in FIG. 19Q.

FIG. 19R further illustrates detecting a user input, such as a pinch gesture or other selection input, while the user's attention 1910 is directed to the representation 7236. In some embodiments, the representation 7236 corresponds to the application associated with the application window 1902, and in response to the user input, the application window 1902 is relaunched and/or redisplayed, as illustrated in FIG. 19S. In some embodiments, the application window 1902 is displayed with a default size other than the increased size last shown. For example, the application window 1902, when relaunched and/or redisplayed after being closed and/or minimized, is displayed at a default and/or non-scaled size (e.g., the size of the application window 1902 illustrated in FIG. 19H before performing the resize operation described with reference to FIGS. 19I-19J).

Although the above examples in FIGS. 19A-19S are focused on resizing and/or rescaling user interface objects, such as application windows, user interface objects within an application window, and/or accessory objects associated with an application window, a person skilled in the art can appreciate that, another type of input that is consumable by the application to cause an operation to be performed within the application, can be utilized by the operating system to cause scaling of the application window as a whole without updating or refreshing its content relative to the application window. For example, in some embodiments, a depinch gesture directed to a map shown in the application window can be consumed by the application to zoom into a location in the map, without altering the appearance other content in the application window or the boundary of the application window; while the same depinch gesture directed to a button overlaid on the map causes the whole window to be scaled as a whole without updating or refreshing the content of the application window or the accessory objects of the application window, including the map, the button, the boundary of the application window, and the accessory objects of the application window. In another example, in some embodiments, a drag gesture directed to a scrollable list shown in the application window can be consumed by the application to scroll the list, without altering the appearance other content in the application window or the boundary of the application window; while the same drag gesture directed to a button in the window causes the whole window to be scaled as a whole without updating or refreshing the content of the application window or the accessory objects of the application window, including the list, the button, the boundary of the application window, and the accessory objects of the application window.

FIG. 20 is a flow diagram of an exemplary method 20000 for scaling an application window in different manners based on a gesture. Method 20000 enables a user to perform various gestures to perform different types of resize operations for an application window. Using a first gesture to increase a size of an application window and a second gesture to increase a size of content, including selectable targets, within the application window, without changing the size of the application window, allows a user to quickly resize (e.g., increase and/or decrease) a portion of, or all of, an application window based on the gesture, thereby making user interaction with a mixed-reality three-dimensional environment more efficient (e.g., by reducing the number of needed inputs to perform a resize operation) and more accessible to a wider population (e.g., by changing the size of the application window and the size of selectable targets for the application window), such as users with reduced vision or other visual impairments.

In some embodiments, method 20000 is performed at a computer system (e.g., a first computer system, a desktop computer, a tablet device, a smart phone, a gaming console, and/or other types of computer systems) that is in communication with one or more display generation components (e.g., one or more touch-screen display(s), one or more stand-alone display(s), one or more projectors, an HMD(s), an outward-facing display of an HMD, an inward-facing display of an HMD, and/or other types of display generation components) and one or more input devices (e.g., one or more cameras, one or more touch-sensitive surfaces, touch-screen displays, joysticks, controllers, trackpads, styluses, pointing devices, motion sensors, light sensors, position sensors, microphones, and/or other types of input devices).

The computer system (e.g., the first computer system) displays (20002), via the one or more display generation components, a first application window at a first scale (e.g., a first size and/or a first aspect ratio). For example, in some embodiments, the application window 1902 is displayed at the first scale in FIGS. 19A-19E and FIGS. 19G-19H. In some embodiments, the first application window includes a respective window of a first application, such as a system application (e.g., an operating system or a controller that provides a user interface region containing a control panel, an application launcher, an application switcher, and/or a low-power or sleep screen of the computer system and/or display generation components) or a user application (e.g., a communication application, a word processing application, a game application, a browser application, a media player application, a document management application, and/or other types of user applications that provide user interfaces for interacting with the user applications). In some embodiments, the first application window includes an indication of a boundary of the content display portion of the first application window (e.g., the content display region of the first application window is a rectangular shape or circular shape, or a two-dimensional simulated portal (e.g., a circular portal, a rectangular portal, or a portal of another shape) with a view into a three-dimensional content display region). In some embodiments, the first application window includes a plurality of accessory objects (e.g., window management objects or other control objects), such as a move affordance, a closing affordance, a minimize affordance, a title bar, a resize affordance, a rotation affordance, and/or other types of affordances for adjusting one or more attributes of the first application window. In some embodiments, some or all of the accessory objects are displayed as part of the first application window, and within the boundary of the first application window (e.g., in the peripheral region, such as the edges and/or corner regions of the first application window). In some embodiments, some or all of the accessory objects are displayed outside of the boundary of the content display region of the first application window, but move and, optionally, are resized with, the content display region of the first application window. In some embodiments, at least some of the accessory objects of the first application window are displayed in response to some types of user input, such as the user's attention directed to respective reactive regions (e.g., also referred to herein as active regions) of the accessory objects (e.g., corner region of the window for triggering display of the resize affordance, and/or bottom edge of the window for triggering display of the move affordance and close affordance), as described with reference to FIG. 17R (e.g., region 1736 and/or region 1744). In some embodiments, the content display region of the first application window includes content provided by the first application, including graphics, text, images, selectable objects, indicators, modal windows (e.g., pop-up windows that are generated from the first application window and that requests user inputs and/or attention in order to be dismissed from the view obscuring the first application window), user interface controls (e.g., buttons, selectable options, sliders, toggles, and/or other types of controls), and/or other types of content). For example, the application window 1902 includes the user interface element 1904, the button 1914, the button 1916, the button 1918, and the button 1920. In some embodiments, when the first application window is displayed at the first scale, the content displayed in the content display region of the first application window, and/or the accessory object(s) (e.g., window management object(s) and/or other control object(s)) associated with the first application window, are displayed at their own respective first scales corresponding to the first scale of the first application window.

The computer system, while displaying the first application window at the first scale, detects (20004), via the one or more input devices, a first gesture directed toward the first application window (e.g., two pinch inputs performed in conjunction with each other (e.g., a two-handed expansion gesture, and/or a two-handed shrinking gesture), a pinch gesture (e.g., a one-handed depinch gesture, and/or a one-handed pinch gesture), a double pinch gesture (e.g., a pinch gesture with two contacts, and/or a depinch gesture with two contacts), and/or other types of air gestures and/or touch gestures that are directed to a region occupied by the first application window (e.g., as determined based on a location of the user's attention and/or the locations of the user's hand(s) and/or contacts)). For example, in some embodiments, as described with reference to FIGS. 19B, 19E, and 19H, a user input, such as a two-handed pinch gesture and/or a selection input of the resize affordance 1932, is detected while the user's attention is directed to the application window 1902. In some embodiments, the first application window is displayed in a three-dimensional environment (e.g., an augmented reality environment with a view of the physical environment surrounding the display generation component, or a virtual three-dimensional environment) (e.g., optionally, concurrently with one or more other windows of the same application or different applications, and optionally, at different depths relative to the viewpoint of the currently displayed view of the three-dimensional environment). In some embodiments, the first application window is displayed on a desktop, optionally, concurrently with one or more other windows and/or user interface objects (e.g., in a stack, partially or completely overlapping with another window or user interface object; or spatially non-overlapping). In some embodiments, the first application window has input focus at a time when the first gesture is detected. In some embodiments, the first application window gains input focus as a result of the first gesture directed toward the first application window.

The computer system, in response to detecting the first gesture, in accordance with a determination that the first gesture is directed toward a respective portion of the first application window that is not associated with an application-specific response (e.g., a respective response that is applicable to the first application window, e.g., including its content and the accessory objects (e.g., a change in displayed content relative to the first application window, performance of a respective application function, navigation within the application window, generating another window from the first application window, closing the first application window, and/or other operations that is to be performed with respect to the first application window), and not applicable to other application window(s) that are concurrently displayed with the first application window) to the first gesture, changes (20006) a respective scale of the first application window from the first scale to a second scale (e.g., a second size and/or a second aspect ratio) that is different from the first scale (e.g., without performing the application-specific response to the first gesture by changing an appearance of the respective content relative to an appearance of the application window). For example, in some embodiments, as described with reference to FIGS. 19H-19J, in accordance with a determination that the user's attention 1910c, 1910d and/or 1910e is directed to non-scalable content while the user input is detected, the application does not scale the content, and instead, the operating system of the computer system changes a size of the application window 1902 and its content in accordance with the user input. In some embodiments, the second scale is bigger than the first scale. In some embodiments, the second scale is smaller than the first scale. In some embodiments, the respective portion of the first application window that is not associated with an application-specific response to the first gesture can be any of one or more portions of the first application window that do not respond to the first gesture in accordance with the program and design of the first application (e.g., portion(s) that are outside of one or more content objects and/or control objects of the first application window that do respond to a gesture that is of the same gesture type as the first gesture), even though one or more other portions of the first application window may, optionally, respond to the first gesture if the first gesture were detected in those one or more other portions of the first application window. In some embodiments, the techniques described herein with respect to the first application window are also applicable and can be similarly implemented for user interface objects that are not application windows. For example, similar features can be implemented for user interface objects such as one or more system user interfaces, individual user interface controls, accessory objects, window management controls, and/or other content or objects that are displayed via the display generation components. In some embodiments, increasing the scale of a user interface object such as a window enables more accurate and faster interaction with elements in the window (or other user interface object). This is helpful for many types of inputs but is particularly helpful for air gestures and/or indirect inputs which can be less precise than direct inputs or inputs using other types of inputs. Additionally, using multiple elements (or, optionally any elements) of an object that are not independently resizable (or do not otherwise respond to a two-handed pinch input) to rescale the object is more difficult when the user interface is smaller (e.g., with air gestures and/or indirect inputs). Enabling more accurate and faster interaction with elements in a window (or other user interface object) enhances the operability of the computer system and makes the user-device interface more efficient.

In some embodiments, the computer system, in response to detecting the first gesture: in accordance with a determination that the first gesture is directed toward a respective portion of the first application window (e.g., content, such as an image, text, a model, and/or a control, that is displayed within the content display region in the first application window) that is associated with an application-specific response to the first gesture (e.g., a portion of the first application window that displays a scalable and/or adjustable object that is adjusted in one or more aspects in response to the first gesture, while other portions of the first application windows are not scaled and/or adjusted in response to the first gesture or while other portions of the first application window are, optionally, resized and/or reflowed due to the rescaling and the adjusting made to the scalable and/or adjustable object of the first application window as a result of the first gesture), performs a first application-specific response (e.g., rescales, resizes, and/or adjusts in one or more aspects) to the first gesture by changing an appearance of respective content of the respective portion of the first application window that is associated with an application-specific response to the first gesture, relative to an appearance of the first application window (e.g., while maintaining other portions of the first application window at the first scale and/or without: changing a scale of the application window from the first scale to a second scale that is different from the first scale, or resizing and reflowing the content in the other portions of the first application window as a result of the respective portion of the first application window that is directly scaled and/or adjusted by the first gesture, in accordance with the program and design of the first application). For example, in some embodiments, as described with reference to FIGS. 19A-19C, in accordance with a determination that the user's attention 1910a is directed to the user interface element 1908, which is scalable content, the user interface element 1908 is scaled in accordance with the user input, without changing a scale of the application window 1902. Using a gesture, such as a pinch or a two-handed pinch gesture, that is directed to content within an application window to perform a resize operation or otherwise manipulate the content, without causing a change in size to the first application window, enables the user to provide different types of inputs to cause different resizing operations to be performed, thereby providing the user with additional control options by using different types of inputs, without requiring the user to navigate through complex menu hierarchies.

In some embodiments, performing the first application-specific response to the first gesture includes resizing the respective content relative to other portions of the first application window in accordance with the first gesture (e.g., resizing the respective content by an amount that is based on a magnitude of the first gesture (e.g., change in length(s) by a first amount in response to a first amount of change in distance or absolute distance between the two hands or two contacts of the first gesture, change in length(s)

by a second amount in response to a second amount of change in distance or absolute distance between the two hands or two contacts of the first gesture, and/or change in length(s) by a first amount and/or with a first speed in accordance with a first amount of change and/or a first speed of change in the distance between the two hands or two contacts of the first gesture) and/or resizing the respective content in a direction that is based on a direction of the first gesture (e.g., increasing in length(s) in response to an increase in distance between the two hands or two contacts of the first gesture, and/or decreasing in length(s) in response to a decrease in distance between the two hands or two contacts of the first gesture)). In some embodiments, the boundary of the first application window remains unchanged while the respective content is resized in response to the first gesture. For example, in some embodiments, as described with reference to FIGS. 19B-19C, in accordance with a determination that the user's attention 1910a is directed to the user interface element 1908, which is scalable content, the user interface element 1908 is scaled in accordance with the user input, without changing a scale of other content in the application window 1902, including the buttons 1912, 1914, 1916, 1918, and 1920, and/or the accessory objects (e.g., grabber 1906 and/or close affordance 1907). Using a gesture, such as a pinch or a two-handed pinch gesture, that is directed to content within an application window to perform a resize operation of the content, without resizing other content in the first application window and/or the first application window, enables the user to provide different types of inputs to independently resize different content within the application window and/or the application window, thereby providing the user with additional control options using different types of inputs, without requiring the user to navigate through complex menu hierarchies.

In some embodiments, the first gesture is an air gesture (e.g., an air gesture that includes relative movement of two hands, two fingers of two hands, or two controllers held by the two hands of the user, away from or toward each other; relative movement of two fingers of a single hand away from or toward each other; and/or a movement of a finger or another portion of the hand relative to the physical environment, optionally, while an attention of the user is directed to a portion of the first application window and/or while the first application window has input focus). In some embodiments, the first gesture is a touch gesture detected by a touch-sensitive surface corresponding to the display region of the first display generation component. For example, in some embodiments, as described with reference to FIGS. 19B, 19E, and 19H, the user input comprises an air gesture, such as a pinch input and/or a two-handed pinch input. Recognizing an air gesture as the user's input corresponding to a request to interact with and/or manipulate content, enables the user to provide different types of inputs by using different air gestures that are recognized, in order to cause different operations to be performed, thereby providing the user with additional control options using different types of air gestures, without requiring the user to have access to a separate input device.

In some embodiments, the first gesture is a two-handed air gesture (e.g., an air pinch gesture with a first hand that is detected concurrently with an air pinch gesture with a second hand, where the first hand and the second hand move relative to each other, or a pointing gesture with a first hand that is detected concurrently with a pointing gesture with a second hand, where the first hand and the second hand move relative to each other, or other types of two-handed air gestures). In some embodiments (e.g., when implemented for an application window displayed on a touch-screen display, a standalone display, and/or an HMD), the first gesture can be a pinch gesture performed with two fingers of the same hand, or two fingers of two different hands, that move relative to each other on a touch-sensitive surface (e.g., touch-screen display, and/or trackpad). In some embodiments, the first gesture is a two-handed gesture performed with one or more input devices. In some embodiments, a first hand performs a first portion of the two-handed gesture using a first input device (e.g., a first controller, a first mouse, and/or a first key of a keyboard) and the second hand performs a second portion of the two-handed gesture using a second input device (e.g., a second controller different from the first controller, a second mouse different form the first mouse and/or a second key of a keyboard different from the first key of a keyboard (e.g., the second key of the same or different keyboard as the first key). For example, in some embodiments, as described with reference to FIGS. 19B, and 19H, the user input comprises a two-handed pinch input, where each of the user's hands performs a pinch gesture, and the scaling of the application window 1902 is based at least in part on a change in distance between the user's hands, as illustrated by the distance between the representation 7020' of the user's first hand and the representation 7022' of the user's second hand. Recognizing a two-handed air gesture that uses a gesture from both of the user's hands, where different air gestures correspond to different types of request to interact with and/or manipulate content, provides the user with additional control options by using a combination of one and/or two hands of the user to perform different types of air gestures, without requiring the user to have access to one or more separate input devices.

In some embodiments, the first application window includes (e.g., within the boundary of the content display region of the first application window, and optionally, separate from the window management objects) first content and second content that is separate from the first content (e.g., the first application window includes a scalable and/or zoomable content (e.g., text, and/or image) along with a user interface control, such as a button, a toggle control, or a slider; the first application window includes a canvas area for displaying and/or receiving sketch inputs and/or a viewport for displaying three-dimensional content, along with one or more user interface controls, images, menus, lists, and/or other content that is separate from and/or adjacent to the canvas area or viewport; or the first application window includes two or more user interface objects such as buttons, menus, lists, and/or other types of content). In some embodiments, changing the scale of the first application window from the first scale to the second scale includes concurrently changing a respective size of the first content and a respective size of the second content (e.g., concurrently increasing or decreasing respective sizes of all of the content of the first application window, including user interface objects, images, text, and other content of the first application window that is individually scalable or individually non-scalable according to the program and design of the first application that provides the first application window). In some embodiments, the first content and the second content are scaled as a unitary image (e.g., the first content and the second content are grouped as a single object such that the first content and the second content are scaled by a same amount at the same time) in accordance with the first gesture, without causing relative movement or relative change in size between the first content and the second content. For example, in some embodiments, as described with reference to FIGS. 19H-19J, the application window

1902 increases in size concurrently with the content of the application window 1902 that is increasing in size. For example, in some embodiments, the user interface element 1908 and the buttons 1912, 1914, 1916, 1918, and 1920 in the application window 1902, are scaled together. Enabling the user to change a size and/or scale of an application window, and automatically also changing a size and/or scale of the content (e.g., including selectable targets and/or other content) of the application window when the size and/or scale of the application window changes, reduces the number of inputs required to resize individual portions of an application window without requiring the user to provide independent inputs to resize different content items associated with the application window and makes user interaction with the computer system more efficient and more accessible to a wider population, such as users with reduced vision or other visual impairments, by making it easier to interact with the content (e.g., including selectable targets and/or other content) of the application window.

In some embodiments, the first application window includes first content and one or more window management controls (e.g., and/or one or more accessory objects) (e.g., a window move affordance, a window close affordance, a document name affordance (e.g., a title bar, or another user interface object displaying the window name or document name of the document opened inside the first application window), and/or an application section navigation affordance (e.g., a "back" button, a "forward" button, a "root" or "home" button, a "upper" button, a "lower" button, a "previous" button, a "next" button, and/or other navigation affordances for navigating within the hierarchy of user interfaces or states of the first application, optionally, inside the boundary of the first application window)) that are separate from the first content (e.g., the second content mentioned above may include one or more window management controls or are separate from the window management controls, in accordance with various embodiments). In some embodiments, the one or more window management controls are displayed outside of the boundary of the content display region of the first application window. In some embodiments, the one or more window management controls are displayed within the boundary of the first application window, as part of the content display region of the first application window. In some embodiments, changing the respective scale of the first application window from the first scale to the second scale includes concurrently changing a respective size of the first content and respective sizes of the one or more window management controls (e.g., concurrently increasing or decreasing a size of the internal content of the first application window and the one or more window management controls, in accordance with the first gesture (e.g., with an amount of change and/or a direction of change in scale that corresponds to an amount of movement, an amount of change in distance, a speed of change, and/or a direction of change of the first gesture)). In some embodiments, the first content and the one or more window management controls are scaled as a unitary image (e.g., the first content and the one or more window management controls are grouped as a single object such that the first content and the one or more window management controls are scaled by a same amount at the same time) in accordance with the first gesture, without causing relative movement or relative change in size between the first content and the one or more window management controls. For example, in some embodiments, as described with reference to FIGS. 19H-19J, one or more accessory objects associated with the application window 1902, such as the grabber 1906 and/or the close affordance 1907 increase in size with the application window 1902. Enabling the user to change a size and/or scale of an application window, and automatically changing a size and/or scale of one or more controls (e.g., accessory objects) that are associated with the application window when the size and/or scale of the application window changes, reduces the number of inputs required to resize the one or more controls associated with the application window without requiring the user to provide independent inputs to resize different the controls and makes user interaction with the computer system more efficient and more accessible to a wider population, such as users with reduced vision or other visual impairments, by making it easier to interact with the one or more controls for the application window.

In some embodiments, changing the respective scale of the first application window includes changing a respective size of the first application window without changing what content is displayed in the first application window (e.g., the first application window changes in size without reflowing the content in the first application window, and/or the first application window along with its content and window management objects are scaled as a unitary object or image, in accordance with the first gesture). In some embodiments, the computer system detects a first window resizing input directed toward the first application window (e.g., detects an input that includes movement such as an air pinch gesture directed toward a resize affordance for the first application window followed by a movement of the hand, as a whole, maintaining the air pinch gesture, or another air gesture or touch gesture selecting the resize affordance and dragging the resize affordance to resize the first application window). In some embodiments, in response to detecting the first window resizing input directed toward the first application window, the computer system changes a respective size of the first application window (e.g., changes the dimension(s) and/or aspect ratio of the first application window), including maintaining respective scales of one or more elements of the first application window (e.g., one or more window management controls of the first application window, and/or one or more user interface objects within the first application window that are not resizable according to the first application providing the first application window) at the first scale while at least some content of the first application window is changed based on the respective size of the first application window that has been changed (e.g., content in the first application window is re-rendered and/or re-flowed based on the changed application window size of the first application window, optionally with the content maintaining a size that it was displayed prior to the resizing input but with additional content being displayed if the size of the first application window has increased, or less content being displayed if the size of the window has decreased). For example, in some embodiments, as described with reference to FIG. 17J, application window 1702 is re-rendered and is displayed at a position and with a size (e.g., at the requested size) indicating that the application window 1702 has caught up to resize affordance 1712 based on the application refresh rate. In some embodiments, as described with reference to application window 1902 in FIG. 19F, the application window 1902 is resized, including re-rendering the content of application window 1902. In some embodiments, at least some of the content of application window 1902, such as user interface element 1908, the button 1914, the button 1916, the button 1918, and/or the button 1920 continue to be displayed at the first scale, and optionally different and/or additional content is displayed in the application window 1902 (e.g., additional user interface element 1934 and button

1922, button 1924, button 1926, button 1928 and button 1930). Automatically updating, refreshing, rendering, or otherwise redrawing the content in the application window while changing a size of the application window in accordance with a determination that the user input is directed to the resize affordance (e.g., or otherwise toward the application window), without changing the size of non-resizable content in the application window even as the size of the application window changes, provides the user with additional controls options by using a different user input to change the size of an application with refreshed content as opposed to changing the size of both the application window and its content (e.g., without refreshing the content), thereby enabling the user to view refreshed application content even while changing a size of the application window.

In some embodiments, the respective portion of the first application window that is not associated with an application-specific response to the first gesture includes one or more window management controls of the first application window (e.g., one or more accessory objects of the first application window) (e.g., a window move affordance, a window close affordance, a document name affordance (e.g., a title bar, or another user interface object displaying the window name or document name of the document opened inside the first application window), and/or an application section navigation affordance (e.g., a "back" button, a "forward" button, a "root" or "home" button, a "upper" button, a "lower" button, a "previous" button, a "next" button, and/or other navigation affordances for navigating within the hierarchy of user interfaces or states of the first application, optionally, inside the boundary of the first application window)). For example, in some embodiments, as described with reference to FIG. 19H, in accordance with a determination that the user's attention 1910*d* is directed to the grabber 1906 (e.g., and/or another accessory object), which is considered non-scalable content, the application window 1902 and its content are scaled. Concurrently displaying accessory controls for an application window, and automatically resizing the application window, including resizing its accessory controls, if a user input for performing a resize operation is directed to one of the accessory controls as opposed to being directed content that can be independently resized within the application window, provides additional control options for the user based on where the user input is directed to resize an application window, thereby enabling the user to interact with scaled content, including selectable targets (e.g., the accessory controls and/or other selectable targets), in an application window, making it easier to interact with selectable targets for the application window.

In some embodiments, the first application window has a respective scale limit (e.g., a maximum size, a maximum width, a maximum height, a minimum size, a minimum width, a minimum height, and/or others limit in length in one or more respective dimensions of the first application window). In some embodiments, changing the respective scale of the first application window from the first scale to the second scale that is different from the first scale includes: changing (e.g., temporarily changing) the respective scale of the first application window to a third scale that is beyond of the respective scale limit (e.g., the third scale is larger/longer than the maximum scale limit, or the third scale is smaller/shorter than the minimum scale limit) while detecting the first gesture (e.g., remaining at the third scale or with increased simulated resistance to further change) while the magnitude of the first gesture (e.g., distance between the two air pinch gestures, or distance between the two contacts of a touch gesture) continues to increase or continues to decrease. In some embodiments, after changing the respective scale of the first application window to the third scale that is beyond of the respective scale limit, the computer system detects that an end of the respective input has been detected (e.g., an end of one or more air pinch gestures, or an end of movement of one or more hands performing the respective input) and in response to detecting the end of the first gesture (e.g., release of at least one of the two air pinch gestures, or lift-off of at least one of the contacts of the touch gesture), the computer system changes the respective scale of the first application window to a fourth scale that is at or within the respective scale limit (e.g., a scale or steady state scale for the first application window that is supported by the operating system, a default scale or default steady state scale that is chosen by the operating system for the first application window and/or the user providing the first gesture (e.g., a vision-impaired user or another user that needs accessibility assistance, that is known to the operating system)). For example, in some embodiments, as described with reference to FIG. 19J, in accordance with the application window 1902 reaching a maximum size, the application window 1902 is temporarily displayed with a size that is larger than the maximum size before automatically displaying an animation that decreases the application window 1902 to be at, or within, the maximum size. Automatically rescaling the application window after the end of the user input for resizing the application window, such that the application window is displayed at a scale that is within the scale limit, even when the user input has requested to resize the application window to a scale that is outside of the scale limit, provides visual feedback to the user that the application window was scaled beyond its limit, and automatically adjusts the application window to be within the limit without requiring additional user input from the user, thereby improving visual feedback about a state of the device and reducing a number of inputs to resize the application window to be within the scale limit.

In some embodiments, the first application window has an upper scale limit (e.g., a maximum size, a maximum width, a maximum height, and/or others upper limits in length in one or more respective dimensions of the first application window) and a lower scale limit (e.g., a minimum size, a minimum width, a minimum height, and/or others lower limits in length in one or more respective dimensions of the first application window). In some embodiments, changing the respective scale of the first application window to the fourth scale that is at or within the respective scale limit includes: in accordance with a determination that the respective scale limit is the upper scale limit, reducing the respective scale of the first application window to a respective upper scale that is at or below the upper scale limit; and in accordance with a determination that the respective scale limit is the lower scale limit, reducing the respective scale of the first application window to a respective lower scale that is at or above the lower scale limit. For example, in some embodiments, as described with reference to FIG. 19J, in accordance with the application window 1902 reaching a maximum size, the application window 1902 is temporarily displayed with a size larger than the maximum size before automatically displaying an animation that decreases the application window 1902 to be at, or within, the maximum size of the application window 1902. In some embodiments, in accordance with the application window 1902 reaching a minimum size, the application window 1902 is temporarily displayed with a size smaller than the minimum size before automatically displaying an animation that increases the application window 1902 to be at, or above, the minimum size of the application window 1902. Automatically rescaling the application window after the end of the user input for resizing the application window, such that the application window is displayed at a scale that is within the scale limit, including for a maximum size (e.g., an upper scale limit) and for a minimum size (e.g., a lower scale limit) of the application window, even when the user input has requested to resize the application window to a scale that is outside of the range of the maximum or minimum size, provides visual feedback to the user that the application window was scaled beyond its limit, and automatically adjusts the application window to be within the limit without requiring additional user input from the user, thereby improving visual feedback about a state of the device and reducing a number of inputs to resize the application window.

In some embodiments, after changing the respective scale of the first application window from the first scale to the second scale that is different from the first scale, the computer system detects an end of the first gesture (e.g., an end of one or more air pinch gestures of the first gesture, an end of movement of one or more hands performing the first gesture, lift-off of at least one contact performing the first gesture). In some embodiments, in response to detecting the end of the first gesture, the computer system maintains the respective scale of the first application window at the second scale. For example, in some embodiments, the scaled application window 1902 continues to be displayed, even after the end of the user input, as illustrated in FIG. 19K where the user's hands, as illustrated by representations 7020' and 7022' of the user's hands, are no longer performing the two-handed pinch gesture. Maintaining a size of the application window after the user has provided a user input to perform the resize operation on the application window, even after user is no longer providing the user input, enables the user to continue viewing the application window at the requested size, thereby making user interaction with the computer system more efficient and more accessible to a wider population, such as users with reduced vision or other visual impairments, by making it easier to interact with the application window while it is displayed at the requested size.

In some embodiments, the computer system, while the first application window is displayed at the second scale, detects a request to close the first application window (e.g., detects an event or user input that corresponds to a request to close the first application window (e.g., by individually closing the first application window while maintaining other content that were displayed in the same environment, closing the first application, including all currently displayed windows of the first application, and/or shutting down and restarting the operating system)). In some embodiments, in response to detecting the request to close the first application window, the computer system closes the first application window (e.g., ceases to display the first application window in the three-dimensional environment or on the desktop, and optionally, saves the last displayed state of the first application window). In some embodiments, after closing the first application window, the computer system detects a user input corresponding to a request to open the first application window (e.g., a user input that relaunches the first application, a user input that causes the redisplay of the content of the first application window (e.g., selection of a user interface object in another window of the first application, opening the same document that was displayed in the first application window, or other interactions with the first application and/or the operating system that cause the redisplay of the first application window)). In some embodiments, in response to detecting the user input corresponding to the request to open the first application window (e.g., optionally using home menu user interface 7222 as described with reference to FIG. 19R), the computer system displays the first application window at the first scale (e.g., and not at the second scale that was the last displayed scaled of the first application window prior to closing the first application window). For example, in some embodiments, when a scale of an application window is changed as a whole in response to the first gesture that is directed to a portion of the application window that is not associated with an application-specific operation for the first gesture, the changed scale of the application window is reset when the application window is closed, and is not reused when the application window is opened again the next time. In some embodiments, a default scale is used for the application window when it is opened again the next time after the rescaling. For example, in some embodiments, as described with reference to FIGS. 19O-19S, the application window 1902, after being scaled, is closed and reopened, such that the application window 1902 is redisplayed at a default size without being scaled, as illustrated in FIG. 19S. Automatically redisplaying the application window at a default size, in response to a request to open the application window, instead of displaying the scaled application window at a previous size after the user has closed the scaled application window, enables the user to reset the scale of the application window by closing the application, without requiring the user to manually undo the resize operation, thereby providing improved visual feedback to the user and providing additional control options for the user to reset the size of the application window to a default size.

In some embodiments, while the first application window is displayed at the second scale, the computer system detects a request to close the first application window (e.g., detects an event or user input that corresponds to a request to close the first application window (e.g., by individually closing the first application window while maintaining other content that were displayed in the same environment, closing the first application, including all currently displayed windows of the first application, and/or shutting down and restarting the operating system)). In some embodiments, in response to detecting the request to close the first application window, the computer system closes the first application window (e.g., ceases to display the first application window in the three-dimensional environment or on the desktop, and optionally, saves the last displayed state of the first application window). In some embodiments, after closing the first application window, the computer system detects a user input corresponding to a request to open the first application window (e.g., a user input that relaunches the first application, a user input that causes the redisplay of the content of the first application window (e.g., selection of a user interface object in another window of the first application, opening the same document that was displayed in the first application window, or other interactions with the first application and/or the operating system that cause the redisplay of the first application window)). In some embodiments, in response to detecting the user input corresponding to the request to open the first application window, the computer system displays the first application window at the second scale (e.g., the last displayed scale of the first application window before it was closed and reopened), including: in accordance with a determination that the first application window was displayed at a first adjusted scale when it was last closed, displaying the first application window at the first adjusted scale in response to the user input corresponding to the request to open the first application window; and in accordance with a determination that the first application window was displayed at a second adjusted scale when it was last closed, displaying the first application window at the second adjusted scale in response to the user input corresponding to the request to open the first application window. In some embodiments, the first application window may be scaled multiple times by one or more gestures of the same type as the first gesture, and may have different last displayed adjusted scales when the request to close the first application window was detected. Thus, in some embodiments, depending on the adjusted scale of the first application window that was last displayed prior to the closing and reopening of the first application window, the reopened first application window may be displayed at different scales, optionally the same as the last displayed scale, or chosen based on the last displayed scale of the first application window (e.g., the adjusted scale can be more finely controlled (e.g., has more finely divided discrete levels, or is continuously adjustable), while the redisplayed scale of the window is more coarsely controlled (e.g., has fewer discrete levels between a maximum scale and a minimum scale, and is chosen based on the closest discrete level to the last displayed scale of the window)). For example, in some embodiments, as described with reference to FIGS. 19O-19S, the application window 1902, after being scaled, is closed and reopened, and redisplaying the application window 1902 includes displaying the application window 1902 at its scaled size (e.g., at the size of the application window 1902 before the application window was closed, as illustrated in FIG. 19P). Maintaining a size of the application window, in response to a request to open the application window after the scaled application window was closed, enables the user to continue viewing the application window at the requested size, thereby reducing a number of inputs required to perform the resizing operation again in order to view the application window at the scaled size and making user interaction with the computer system more efficient and more accessible to a wider population, such as users with reduced vision or other visual impairments, by making it easier to interact with the application window at its scaled size.

In some embodiments, the first application window is displayed in a three-dimensional environment (e.g., an augmented reality environment that includes virtual content at respective spatial positions relative to a view of the physical environment, a virtual three-dimensional environment, or another extended reality environment) that is visible via a viewport provided by the one or more display generation components (e.g., a viewport provided by one or more display generation components of an HMD, a viewport provided by a standalone display, and/or a viewport provided by a touch-screen display). In some embodiments, a world-locked object moves relative to the viewport when the viewpoint from which the content of the three-dimensional environment is visible to a user moves relative to the physical environment. In some embodiments, a world-locked object may move relative to the viewport due to the operation(s) of the operating system, the user, and/or the application providing the world locked object, while the viewpoint from which the content of the three-dimensional environment is visible to a user does not change. In some embodiments, the first application window is a world-locked object in the three-dimensional environment. In some embodiments, only a portion of the three-dimensional environment is visible through the viewport at a given time, and other portions of the three-dimensional environment become visible through the viewport when the viewpoint of the current view of the three-dimensional environment moves relative to the three-dimensional environment (e.g., through movement of the user's head or movement of the user as a whole, paging or scrolling of the content in the viewport, and/or through movement of the display generation component(s)). In some embodiments, while the first application window is displayed at a respective scale (e.g., the first scale, the second scale, or another adjusted scale caused by one or more gestures that are of the same type as the first gesture), the computer system detects a change in a position of the first application window relative to the viewport (e.g., movement of the first application window in the three-dimensional environment and/or movement of a point of view of a user that moves the viewpoint relative to the three-dimensional environment) that causes the first application window to cease to be displayed in the viewport (e.g., a different portion of the three-dimensional environment that does not include the first application window has become visible in the viewport, while the first application window is not explicitly closed by the user and presumable remains open at its world-locked position in the three-dimensional environment). In some embodiments, after causing the first application window to cease to be displayed in the viewport, the computer system detects a user input corresponding to a request to display the first application window in the viewport (e.g., movement of the first application window in the three-dimensional environment caused by the user (e.g., through the use of a map that includes a movable representation of the first application window, or through a selection menu (e.g., a list of open windows, a multitasking user interface, an application or window switcher user interface) that includes a selectable representation of the first application window), and/or movement of a point of view of a user that moves the viewpoint relative to the three-dimensional environment (e.g., the user looking back to the region in the three-dimensional environment where the first application window was last displayed)). In some embodiments, in response to detecting the user input corresponding to the request to display the first application window in the viewport, the computer system displays the first application window in the viewport at the respective scale (e.g., the last displayed scale of the first application window before it ceases to be displayed in the viewport without being closed), including: in accordance with a determination that the first application window was displayed at a third adjusted scale when it ceased to be displayed in the viewport, displaying the first application window at the third adjusted scale in response to the user input corresponding to the request to display the first application window in the viewport (e.g., after ceasing to display the first application window in the viewport without closing the first application window); and in accordance with a determination that the window was displayed at a fourth adjusted scale when it ceased to be displayed in the viewport, displaying the first application window at the fourth adjusted scale in response to the user input corresponding to the request to display the application window in the viewport (e.g., after ceasing to display the first application window in the viewport without closing the first application window). In some embodiments, the first application window may be scaled multiple times by one or more gestures of the same type as the first gesture, and may have different last displayed adjusted scales right before the first application window ceases to be displayed in the viewport. Thus, in some embodiments, depending on the adjusted scale of the first application window that was last visible in the viewport, when the first application window becomes visible again in the viewport, the first application window may be displayed at different scales, optionally the same as the last displayed scale in the viewport (e.g., a respective scale that is between the maximum steady state scale and a minimum steady state scale). For example, in some embodiments, as described with reference to FIGS. 19K-19N, the current viewpoint of the user changes such that the resized application window 1902 is no longer displayed in the viewport, without closing the application window, and the size of the application window 1902 is maintained after the current viewpoint of the user returns to include the application window 1902 being displayed in the viewport. Maintaining a size of the application window, as the current view of the user changes such that the application window is not in the current view, and then reenters the user's view, enables the user to continue viewing the application window at the requested size without resetting the application window, thereby reducing a number of inputs required to perform the resizing operation again in order to view the application window at the scaled size and making user interaction with the computer system more efficient and more accessible to a wider population, such as users with reduced vision or other visual impairments, by making it easier to interact with the application window at its scaled size.

In some embodiments, while the first application window is displayed at the second scale, the computer system detects one or more inputs directed to the first application window that are different from the first gesture (e.g., a selection input, a content creation input, a content editing input, a typing input, a scrolling input, and/or other inputs that interact with the content of the first application window and/or the first application, in accordance with the program and design of the first application that provides the first application window). In some embodiments, in response to detecting the one or more inputs directed to the first application window that are different from the first gesture, the computer system performs one or more operations associated with a first application that provides the first application window, based on the one or more inputs directed to the first application window (e.g., navigates through content in the first application window, scrolls through content in the first application window, selects one or more objects in the first application window, adds content to the first application window, removes content from the first application window, and/or otherwise changes the content displayed within the first application window in accordance with the program and design of the first application) while maintaining the first application window at the second scale. In some embodiments, one or more inputs directed to the first application window displayed at other scales, such as the first scale, the third scale, or other scales, are detected, and in response to these inputs, the computer system performs one or more operations associated with the first application (e.g., navigating through content in the first application window, scrolling through content in the first application window, selecting one or more objects in the first application window, adding content to the first application window, removing content from the first application window, and/or otherwise changing the content displayed within the first application window in accordance with the program and design of the first application) based on the one or more inputs, while maintaining the first application window at the currently displayed scale, such as the first scale, the third scale, or other currently displayed scales. For example, as described with reference to FIGS. 19G and 19J, in some embodiments, before and after the application window 1902 and its content are scaled, the functionality of the application is maintained such that the user is enabled to interact with the content in the application window 1902 in a same manner as before the application window 1902 was scaled (e.g., the user selects the button 1914 and causes the application associated with application window 1902 to perform one or more operations associated with the button 1914). Maintaining a size of the application window, and enabling the user to interact with content of the application window while the application window is displayed at the scaled size, makes it easier for the user to provide inputs while the content (e.g., and/or selectable targets) is displayed at the scaled size, thereby reducing the number of inputs required to re-perform the resize operation and making user interaction with the three-dimensional environment more accessible to a wider population by enabling the users to interact with the application window content and/or selectable targets for the application window at the scaled size.

In some embodiments, while displaying, via the one or more display generation components, the first application window at the second scale (e.g., an adjusted scale caused by one or more gestures, including the first gesture and optionally one or more other gestures of the same type as the first gesture), the computer system detects, via the one or more input devices, a second gesture directed toward the first application window (e.g., a two-handed expansion gesture, a two-handed shrinking gesture, a one-handed depinch gesture, a one-handed pinch gesture, a pinch gesture with two contacts, a depinch gesture with two contacts, and/or other types of air gestures and/or touch gestures that are directed to a region occupied by the first application window (e.g., as determined based on a location of the user's attention and/or the locations of the user's hand(s) and/or contacts)). In some embodiments, the first application window has input focus at a time when the second gesture is detected. In some embodiments, the first application window gains input focus as a result of the second gesture directed toward the first application window. In some embodiments, the second gesture is of the same type as the first gesture, but may optionally cause scaling in a different direction from that caused by the first gesture. In some embodiments, in response to detecting the second gesture, in accordance with a determination that the second gesture is directed toward a respective portion of the first application window that is not associated with an application-specific response to the second gesture (e.g., the same portion of the respective portion of the first application window that is not associated with an application-specific response to the first gesture, or a portion of the first application window that is not associated with an application-specific response to the first gesture, but not associated with any application-specific response to the second gesture), the computer system changes the respective scale of the first application window from the second scale to a fifth scale that is different from the second scale (e.g., without performing the application-specific response to the second gesture, by changing an appearance of the respective content relative to an appearance of the first application window). In some embodiments, the fifth scale is bigger than the second scale. In some embodiments, the fifth scale is smaller than the second scale. In some embodiments, the fifth scale is the same as the first scale. For example, after the first gesture changes the scale of the first application window, the second gesture can restore the scale of the first application window. In some embodiments, the fifth scale is different from the first scale. More details of the scaling in accordance with various embodiments are described with respect to the scaling caused by the first gesture above and below, and not repeated herein in the interest of brevity. For example, in some embodiments, as described with reference to FIG. 19D, decreasing a distance between the representations 7020' and 7022' of the user's hands causes the user interface object 1908 (e.g., and/or the application window 1902, if the user's attention is directed to a non-scalable object while performing the resize operation) to decrease in size. Recognizing different gestures to resize an application window in different manners, including to decrease a size of the application window in accordance with the gesture corresponding to an inward pinch gesture and/or to increase a size of the application window in accordance with a gesture corresponding to an outward pinch, provides the user with additional control options by performing different types of gestures to perform different operations for the application window, without requiring the user to have access to one or more separate input devices.

In some embodiments, in response to detecting the second gesture, the computer system: in accordance with a determination that the second gesture is directed toward a respective portion of the first application window (e.g., content in the first application window) that is associated with an application-specific response to the second gesture (e.g., a portion of the first application window that displays a scalable and/or adjustable object that is adjusted in one or more aspects in response to the second gesture, while other portions of the first application windows are not scaled and/or adjusted in response to the second gesture or while other portions of the first application window are, optionally, resized and/or reflowed due to the rescaling and the adjusting made to the scalable and/or adjustable object of the first application window as a result of the second gesture), performs a second application-specific response (e.g., rescales, resizes, and/or adjusts in one or more aspects; the same response as the first application-specific response to the first gesture; and/or different from the first application-specific response to the first gesture) to the second gesture by changing an appearance of respective content of the respective portion of the first application window that is associated with an application-specific response to the second gesture, relative to an appearance of the first application window (e.g., while maintaining other portions of the first application window at the second scale and/or without changing a scale of the first application window from the second scale to another scale that is different from the second scale). For example, in some embodiments, as described with reference to FIGS. 19B-19D, in accordance with a determination that the user's attention 1910*a* is directed to the user interface object 1908, which is scalable content, the user interface object 1908 is scaled without scaling the application window 1902. Maintaining a size of the application window that has been scaled, and enabling the user to interact with content, including selectable targets that have also been scaled with the application window, makes it easier for the user to provide inputs while the content, including the selectable targets, is displayed at the scaled size, thereby reducing the number of inputs required to re-perform the resize operation and making user interaction with the three-dimensional environment more accessible to a wider population by enabling the users to interact with the application window and/or selectable targets for the application window at the scaled size.

In some embodiments, one or more input events corresponding to a respective gesture directed to the first application window are evaluated by one or more gesture recognizers associated with the first application window; and in accordance with a determination by the one or more gesture recognizers associated with the first application window that the one or more input events corresponding to the respective gesture directed to the application window do not correspond to input that will be consumed by the one or more gesture recognizers associated with the first application window, the computer system authorizes a system gesture recognizer to use the one or more input events for one or more system operations (e.g., to change the scale of the first application window (e.g., from the first scale to the second scale and/or from the second scale to another scale)). In some embodiments, the input events are provided to the system gesture recognizer when the system gesture recognizer is authorized to use the one or more input events to change the scale of the first application window. In some embodiments, the input events are provided to the system gesture recognizer concurrently with being provided to the one or more gesture recognizers associated with the first application window and the authorization enables the system gesture recognizer to begin acting on the input events that it has been processing concurrently with the one or more gesture recognizers associated with the first application window. In some embodiments, in accordance with a determination by the one or more gesture recognizers associated with the first application window that the one or more input events corresponding to the respective gesture directed to the application window correspond to input that will be consumed by the one or more gesture recognizers associated with the first application window, the computer system forgoes authorizing the system gesture recognizer to use the one or more input events for one or more system operations (e.g., to change the scale of the first application window (e.g., from the first scale to the second scale and/or from the second scale to another scale)). In some embodiments, in conjunction with forgoing authorizing the system gesture recognizer to use the one or more input events to change the scale of the first application window, the one or more of the gesture recognizers associated with the first application window perform one or more application-specific responses to the one or more input events by changing an appearance of the respective content of the first application window relative to an appearance of the first application window (e.g., changing content, adding content, reflowing content, reducing content, navigating within content, and/or otherwise changing the appearance with the internal content displayed within the first application window while maintaining the size and aspect ratio of the first application window). For example, as described with reference to FIG. 19H, in some embodiments, a second input event is provided to the application gesture recognizer and the system gesture recognizer, and the application gesture recognizer does not handle and/or perform an operation based on the second input event, such that the system gesture recognizer performs the scaling operation (e.g., and/or one or more other system operations) based on the second input event. Processing a same user input using a plurality of gesture recognizers, including by prioritizing an application gesture recognizer over a system gesture recognizer such that the system gesture recognizer responds to the user input only if the application gesture recognizer does not consume the user input event corresponding to the user input, enables the computer system to respond to the user input using the appropriate gesture recognizer to perform an operation that is intended by the user input, thereby reducing a number of user inputs required to perform an expected user interface response and reducing an amount of time needed to perform operations on the computer system.

In some embodiments, the one or more gesture recognizers associated with the first application window include a set of gesture recognizers that have different priorities for processing the one or more input events, and a first gesture recognizer in the set of gesture recognizers that is responsible for performing one or more application-specific responses to the respective gesture by changing an appearance of respective content relative to an appearance of the first application window has a higher priority for processing the one or more input events than a second gesture recognizer in the set of gesture recognizers that is responsible for authorizing the system gesture recognizer to use the one or more input events for one or more system operations (e.g., to change the scale of the application window (e.g., from the first scale to the second scale and/or from the second scale to another scale)). In some embodiments, the second gesture recognizer does not know the specific system operation for which the input events are being authorized, but is informing the system gesture recognizer that the first application will not be consuming the input events and thus that the system gesture recognizer is free to use the input events to perform a system operation. For example, as described with reference to FIG. 19H, in some embodiments, a second input event is provided to the application gesture recognizer and the system gesture recognizer, and the application gesture recognizer and/or the extension gesture recognizer (e.g., or any other gesture recognizer other than the system gesture recognizer) does not handle and/or perform an operation based on the second input event, such that the system gesture recognizer performs the scaling operation (e.g., and/or one or more other system operations) based on the second input event. Processing a same user input using a plurality of gesture recognizers, including by prioritizing other gesture recognizers over a system gesture recognizer, and using a final gesture recognizer to give permission to the system gesture recognizer to respond to the user input if no other gesture recognizer responds to the user input, enables the computer system to respond to the user input using the appropriate gesture recognizer to perform an operation that is intended by the user input, thereby reducing a number of user inputs required to perform an expected user interface response and reducing an amount of time needed to perform operations on the computer system.

In some embodiments, aspects/operations of methods 800, 900, 1000, 1100, 1200, 1300, 1400, 1500, 1600 and 1800 may be interchanged, substituted, and/or added between these methods. For example, the user interface objects, application windows, accessory objects, object management controls, window management controls, resize affordances, resize controls, grabbers, move controls, move affordances, applications, gaze, pinch gesture, and/or reactive regions, in the method 20000 has characteristics of analogous objects and inputs in methods 800, 900, 1100, 1200, 1300, 1400, 1500, 1600, and 1800. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to by applications that are executing on a computer system to improve and/or personalize XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide data for customization of services. In yet another example, users can select to limit the length of time data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app. In addition, the present disclosure contemplates providing real-time indications that identify which applications are currently accessing or using personal information data that is collected using sensors of the computer system.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

What is claimed is:
1. A method, comprising:
at a computer system that is in communication with a first display generation component and one or more input devices:
displaying, in a first view of a three-dimensional environment, via the first display generation component, a first user interface object and a first control element that is associated with performing a first operation with respect to a spatial arrangement of the first user interface object in the three-dimensional environment, wherein the first control element is spaced apart from the first user interface object in the first view of the three-dimensional environment, and wherein the first control element is displayed with a first appearance;
while displaying the first control element with the first appearance, detecting, via the one or more input devices, a first gaze input that is directed to the first control element;
in response to detecting the first gaze input that is directed to the first control element, updating an appearance of the first control element from the first appearance to a second appearance that is different from the first appearance;

while displaying the first control element with the second appearance, detecting, via the one or more input devices, a first user input directed to the first control element; and in response to detecting the first user input directed to the first control element:

in accordance with a determination that the first user input meets first criteria, updating the appearance of the first control element from the second appearance to a third appearance that is different from the first appearance and the second appearance, wherein the third appearance indicates that additional movement associated with the first user input will cause the first operation associated with the first control element to be performed, and wherein the first operation includes changing the spatial arrangement of the first user interface object in the three-dimensional environment.

2. The method of claim 1, including:

while displaying the first control element with the third appearance, detecting a second user input that includes additional movement associated with the first user input directed to the first control element; and in response to detecting the second user input, performing the first operation with respect to the first user interface object in accordance with the additional movement of the second user input.

3. The method of claim 1, including:

while displaying the first control element with the second appearance, detecting, via the one or more input devices, that the first gaze input is no longer directed to the first control element; and in response to detecting that the first gaze input is no longer directed to the first control element while displaying the first control element with the second appearance, restoring the appearance of the first control element from the second appearance to the first appearance.

4. The method of claim 1, including:

while displaying the first control element with the third appearance, detecting, via the one or more input devices, that the first gaze input is no longer directed to the first control element; and in response to detecting that the first gaze input is no longer directed to the first control element while displaying the first control element with the third appearance, maintaining display of the first control element with the third appearance.

5. The method of claim 1, wherein the first user interface object is a first application window displayed in the first view of the three-dimensional environment, and the first control element is associated with performing the first operation with respect to the first application window.

6. The method of claim 1, wherein updating the appearance of the first control element from the first appearance to the second appearance includes updating a color of the first control element from a first color to a second color that is different from the first color.

7. The method of claim 1, wherein updating the appearance of the first control element from the second appearance to the third appearance includes updating a size of the first control element from a first size to a second size that is different from the first size.

8. The method of claim 7, wherein updating the size of the first control element from the first size to the second size includes decreasing the size of the first control element from the first size to the second size that is smaller than the first size.

9. The method of claim 7, wherein decreasing the size of the first control element from the first size to the second size that is smaller than the first size includes decreasing a first dimension of the first control element by a first amount, and decreasing a second dimension of the first control element by a second amount that is different than the first amount.

10. The method of claim 1, wherein the first control element is an object move control for moving the first user interface object within the three-dimensional environment.

11. The method of claim 10, including:

while displaying the object move control with the third appearance, detecting a third user input that includes first additional movement associated with the first user input directed to the object move control; and in response to detecting the third user input directed to the object move control, moving the first user interface object in the three-dimensional environment in accordance with the first additional movement of the third user input.

12. The method of claim 1, wherein the first control element is an object resize control for changing a size of the first user interface object within the three-dimensional environment.

13. The method of claim 12, including:

while displaying the object resize control with the third appearance, detecting a fourth user input that includes second additional movement of the first user input directed to the object resize control; and in response to detecting the fourth user input directed to the object resize control, changing the size of the first user interface object in accordance with the second additional movement of the fourth user input.

14. The method of claim 1, wherein the first control element is an object close control for ceasing display of the first user interface object in the three-dimensional environment.

15. The method of claim 1, including:

while displaying the first control element with a first respective appearance, detecting, via the one or more input devices, a second gaze input directed to a portion of the three-dimensional environment; and in response to detecting the second gaze input directed to the portion of the three-dimensional environment:

in accordance with a determination that the second gaze input is directed to a first location relative to the first control element in the three-dimensional environment, updating the appearance of the first control element from the first respective appearance to a second respective appearance different from the first respective appearance; and in accordance with a determination that the second gaze input is directed to a second location relative to the first control element in the three-dimensional environment, ceasing display of the first control element from the three-dimensional environment.

16. The method of claim 15, including:

in response to detecting the second gaze input directed to the portion of the three-dimensional environment:

in accordance with a determination that the second gaze input is directed to the second location relative to the first control element in the three-dimensional environment, displaying a second control element that is associated with performing a second operation with respect to the first user interface object, in the first view of the three-dimensional environment, wherein the second control element is spaced apart from the first user interface object in the first view of the three-dimensional environment.

17. The method of claim 1, wherein:

the first view of the three-dimensional environment corresponds to a first viewpoint of a user of the computer system; and displaying the first control element with the first appearance includes:

in accordance with a determination that the first user interface object is displayed within the three-dimensional environment at a first position that is a first distance away from the first viewpoint of the user of the computer system, displaying the first control element with a first simulated size that corresponds to the first distance; and in accordance with a determination that the first user interface object is displayed within the three-dimensional environment at a second position that is a second distance away from the first viewpoint of the user, displaying the first control element with a second simulated size that corresponds to the second distance.

18. The method of claim 1, wherein:

while the first user interface object is displayed within the three-dimensional environment at a first position that is a first distance away from a first viewpoint of a user of the computer system, the first control element is displayed with a first size; and the method further includes:

detecting movement of the first user interface object from the first position to a second position that is a second distance away from the first viewpoint of the user, wherein the second distance is greater than the first distance; and in response to the detecting the movement of the first user interface object from the first position to the second position that is farther away from the first viewpoint of the user than the first position:

displaying the first control element at or near the second distance away from the first viewpoint of the user, with an increased simulated size as compared to when the first control element was displayed at or near the first distance away from the first viewpoint of the user.

19. The method of claim 1, wherein:

while the first user interface object is displayed within the three-dimensional environment at a first position that is a first distance away from a first viewpoint of a user of the computer system, the first control element is displayed with a first size; and the method further includes:

detecting movement of the first user interface object from the first position to a third position that is a third distance away from the first viewpoint of the user, wherein the third distance is smaller than the first distance; and in response to the detecting the movement of the first user interface object from the first position to the third position that is closer to the first viewpoint of the user than the first position:

displaying the first control element at or near the third distance away from the first viewpoint of the user, with a decreased simulated size as compared to when the first control element was displayed at or near the first distance away from the first viewpoint of the user.

20. The method of claim 1, wherein:

the first view of the three-dimensional environment corresponds to a first viewpoint of a user; and displaying the first user interface object includes:

in accordance with a determination that the first user interface object is displayed within the three-dimensional environment at a first position that is a first distance away from the first viewpoint of the user, displaying the first user interface object with a third simulated size that corresponds to the first distance; and in accordance with a determination that the first user interface object is displayed within the three-dimensional environment at a second position that is a second distance away from the first viewpoint of the user, displaying the first control element with a second simulated size that corresponds to the second distance.

21. A non-transitory computer-readable storage medium storing one or more programs configured to be executed by one or more processors of a computer system that is in communication with a first display generation component and one or more input devices, the one or more programs including instructions for:

displaying in a first view of a three-dimensional environment, via the first display generation component, a first user interface object and a first control element that is associated with performing a first operation with respect to a spatial arrangement of the first user interface object in the three-dimensional environment, wherein the first control element is spaced apart from the first user interface object in the first view of the three-dimensional environment, and wherein the first control element is displayed with a first appearance;

while displaying the first control element with the first appearance, detecting, via the one or more input devices, a first gaze input that is directed to the first control element;

in response to detecting the first gaze input that is directed to the first control element, updating an appearance of the first control element from the first appearance to a second appearance that is different from the first appearance;

while displaying the first control element with the second appearance, detecting, via the one or more input devices, a first user input directed to the first control element; and in response to detecting the first user input directed to the first control element:

in accordance with a determination that the first user input meets first criteria, updating the appearance of the first control element from the second appearance to a third appearance that is different from the first appearance and the second appearance, wherein the third appearance indicates that additional movement associated with the first user input will cause the first operation associated with the first control element to be performed, and wherein the first operation includes changing the spatial arrangement of the first user interface object in the three-dimensional environment.

22. A computer system that is in communication with a first display generation component and one or more input devices, the computer system comprising:

one or more processors; and memory storing one or more programs configured to be executed by the one or more processors, the one or more programs including instructions for:

displaying in a first view of a three-dimensional environment, via the first display generation component, a first user interface object and a first control element that is associated with performing a first operation with respect to a spatial arrangement of the first user interface object in the three-dimensional environment, wherein the first control element is spaced apart from the first user interface object in the first view of the three-dimensional environment, and wherein the first control element is displayed with a first appearance;

while displaying the first control element with the first appearance, detecting, via the one or more input devices, a first gaze input that is directed to the first control element;

in response to detecting the first gaze input that is directed to the first control element, updating an appearance of the first control element from the first appearance to a second appearance that is different from the first appearance;

while displaying the first control element with the second appearance, detecting, via the one or more input devices, a first user input directed to the first control element; and in response to detecting the first user input directed to the first control element:

in accordance with a determination that the first user input meets first criteria, updating the appearance of the first control element from the second appearance to a third appearance that is different from the first appearance and the second appearance, wherein the third appearance indicates that additional movement associated with the first user input will cause the first operation associated with the first control element to be performed, and wherein the first operation includes changing the spatial arrangement of the first user interface object in the three-dimensional environment.

23. The non-transitory computer-readable storage medium of claim 21, wherein the one or more programs include instructions for:

while displaying the first control element with the third appearance, detecting a second user input that includes additional movement associated with the first user input directed to the first control element; and in response to detecting the second user input, performing the first operation with respect to the first user interface object in accordance with the additional movement of the second user input.

24. The non-transitory computer-readable storage medium of claim 21, wherein the one or more programs include instructions for:

while displaying the first control element with the second appearance, detecting, via the one or more input devices, that the first gaze input is no longer directed to the first control element; and in response to detecting that the first gaze input is no longer directed to the first control element while displaying the first control element with the second appearance, restoring the appearance of the first control element from the second appearance to the first appearance.

25. The non-transitory computer-readable storage medium of claim 21, wherein the one or more programs include instructions for:

while displaying the first control element with the third appearance, detecting, via the one or more input devices, that the first gaze input is no longer directed to the first control element; and in response to detecting that the first gaze input is no longer directed to the first control element while displaying the first control element with the third appearance, maintaining display of the first control element with the third appearance.

26. The non-transitory computer-readable storage medium of claim 21, wherein the first user interface object is a first application window displayed in the first view of the three-dimensional environment, and the first control element is associated with performing the first operation with respect to the first application window.

27. The non-transitory computer-readable storage medium of claim 21, wherein updating the appearance of the first control element from the first appearance to the second appearance includes updating a color of the first control element from a first color to a second color that is different from the first color.

28. The non-transitory computer-readable storage medium of claim 21, wherein updating the appearance of the first control element from the second appearance to the third appearance includes updating a size of the first control element from a first size to a second size that is different from the first size.

29. The non-transitory computer-readable storage medium of claim 21, wherein the first control element is an object move control for moving the first user interface object within the three-dimensional environment.

30. The non-transitory computer-readable storage medium of claim 29, wherein the one or more programs include instructions for:

while displaying the object move control with the third appearance, detecting a third user input that includes first additional movement associated with the first user input directed to the object move control; and in response to detecting the third user input directed to the object move control, moving the first user interface object in the three-dimensional environment in accordance with the first additional movement of the third user input.

31. The non-transitory computer-readable storage medium of claim 21, wherein the first control element is an object resize control for changing a size of the first user interface object within the three-dimensional environment.

32. The non-transitory computer-readable storage medium of claim 31, wherein the one or more programs include instructions for:

while displaying the object resize control with the third appearance, detecting a fourth user input that includes second additional movement of the first user input directed to the object resize control; and in response to detecting the fourth user input directed to the object resize control, changing the size of the first user interface object in accordance with the second additional movement of the fourth user input.

33. The non-transitory computer-readable storage medium of claim 21, wherein the first control element is an object close control for ceasing display of the first user interface object in the three-dimensional environment.

34. The non-transitory computer-readable storage medium of claim 21, wherein the one or more programs include instructions for:

while displaying the first control element with a first respective appearance, detecting, via the one or more input devices, a second gaze input directed to a portion of the three-dimensional environment; and in response to detecting the second gaze input directed to the portion of the three- dimensional environment:

in accordance with a determination that the second gaze input is directed to a first location relative to the first control element in the three-dimensional environment, updating the appearance of the first control element from the first respective appearance to a second respective appearance different from the first respective appearance; and in accordance with a determination that the second gaze input is directed to a second location relative to the first control element in the three-dimensional environment, ceasing display of the first control element from the three-dimensional environment.

35. The non-transitory computer-readable storage medium of claim 34, wherein the one or more programs include instructions for:

in response to detecting the second gaze input directed to the portion of the three-dimensional environment:

in accordance with a determination that the second gaze input is directed to the second location relative to the first control element in the three-dimensional environment, displaying a second control element that is associated with performing a second operation with respect to the first user interface object, in the first view of the three-dimensional environment, wherein the second control element is spaced apart from the first user interface object in the first view of the three-dimensional environment.

36. The computer system of claim 22, wherein the one or more programs include instructions for:

while displaying the first control element with the third appearance, detecting a second user input that includes additional movement associated with the first user input directed to the first control element; and in response to detecting the second user input, performing the first operation with respect to the first user interface object in accordance with the additional movement of the second user input.

37. The computer system of claim 22, wherein the one or more programs include instructions for:

while displaying the first control element with the second appearance, detecting, via the one or more input devices, that the first gaze input is no longer directed to the first control element; and in response to detecting that the first gaze input is no longer directed to the first control element while displaying the first control element with the second appearance, restoring the appearance of the first control element from the second appearance to the first appearance.

38. The computer system of claim 22, wherein the one or more programs include instructions for:

while displaying the first control element with the third appearance, detecting, via the one or more input devices, that the first gaze input is no longer directed to the first control element; and in response to detecting that the first gaze input is no longer directed to the first control element while displaying the first control element with the third appearance, maintaining display of the first control element with the third appearance.

39. The computer system of claim 22, wherein the first user interface object is a first application window displayed in the first view of the three-dimensional environment, and the first control element is associated with performing the first operation with respect to the first application window.

40. The computer system of claim 22, wherein updating the appearance of the first control element from the first appearance to the second appearance includes updating a color of the first control element from a first color to a second color that is different from the first color.

41. The computer system of claim 22, wherein updating the appearance of the first control element from the second appearance to the third appearance includes updating a size of the first control element from a first size to a second size that is different from the first size.

42. The computer system of claim 22, wherein the first control element is an object move control for moving the first user interface object within the three-dimensional environment.

43. The computer system of claim 42, wherein the one or more programs include instructions for:

while displaying the object move control with the third appearance, detecting a third user input that includes first additional movement associated with the first user input directed to the object move control; and in response to detecting the third user input directed to the object move control, moving the first user interface object in the three-dimensional environment in accordance with the first additional movement of the third user input.

44. The computer system of claim 22, wherein the first control element is an object resize control for changing a size of the first user interface object within the three-dimensional environment.

45. The computer system of claim 44, wherein the one or more programs include instructions for:

while displaying the object resize control with the third appearance, detecting a fourth user input that includes second additional movement of the first user input directed to the object resize control; and in response to detecting the fourth user input directed to the object resize control, changing the size of the first user interface object in accordance with the second additional movement of the fourth user input.

46. The computer system of claim 22, wherein the first control element is an object close control for ceasing display of the first user interface object in the three-dimensional environment.

47. The computer system of claim 22, wherein the one or more programs include instructions for:

while displaying the first control element with a first respective appearance, detecting, via the one or more input devices, a second gaze input directed to a portion of the three-dimensional environment; and in response to detecting the second gaze input directed to the portion of the three- dimensional environment:

in accordance with a determination that the second gaze input is directed to a first location relative to the first control element in the three-dimensional environment, updating the appearance of the first control element from the first respective appearance to a second respective appearance different from the first respective appearance; and in accordance with a determination that the second gaze input is directed to a second location relative to the first control element in the three-dimensional environment, ceasing display of the first control element from the three-dimensional environment.

48. The computer system of claim 47, wherein the one or more programs include instructions for:

in response to detecting the second gaze input directed to the portion of the three-dimensional environment:

in accordance with a determination that the second gaze input is directed to the second location relative to the first control element in the three-dimensional environment, displaying a second control element that is associated with performing a second operation with respect to the first user interface object, in the first view of the three-dimensional environment, wherein the second control element is spaced apart from the first user interface object in the first view of the three-dimensional environment.

* * * * *